US006880086B2

(12) United States Patent
Kidder et al.

(10) Patent No.: US 6,880,086 B2
(45) Date of Patent: Apr. 12, 2005

(54) SIGNATURES FOR FACILITATING HOT UPGRADES OF MODULAR SOFTWARE COMPONENTS

(75) Inventors: Joseph D. Kidder, Arlington, MA (US); Michael B. Mahler, Boylston, MA (US); Edward L. Perreault, Dunstable, MA (US); Margaret Stearns, Hollis, NH (US); Jim Hurley, Acton, MA (US)

(73) Assignee: CIENA Corporation, Linthicum, MD (US)

( * ) Notice: Subject to any disclaimer, the term of this patent is extended or adjusted under 35 U.S.C. 154(b) by 814 days.

(21) Appl. No.: 09/777,468

(22) Filed: Feb. 5, 2001

(65) Prior Publication Data

US 2004/0031030 A1 Feb. 12, 2004

Related U.S. Application Data

(63) Continuation-in-part of application No. 09/718,224, filed on Nov. 21, 2001, which is a continuation-in-part of application No. 09/756,936, filed on Jan. 9, 2001, which is a continuation-in-part of application No. 09/711,054, filed on Nov. 9, 2000, which is a continuation-in-part of application No. 09/703,856, filed on Nov. 1, 2000, which is a continuation-in-part of application No. 09/687,191, filed on Oct. 12, 2000, now abandoned, which is a continuation-in-part of application No. 09/669,364, filed on Sep. 26, 2000, which is a continuation-in-part of application No. 09/663,947, filed on Sep. 18, 2000, now abandoned, which is a continuation-in-part of application No. 09/656,123, filed on Sep. 6, 2000, now abandoned, which is a continuation-in-part of application No. 09/653,700, filed on Aug. 31, 2000, now abandoned, which is a continuation-in-part of application No. 09/637,800, filed on Aug. 11, 2000, which is a continuation-in-part of application No. 09/633,675, filed on Aug. 7, 2000, which is a continuation-in-part of application No. 09/625,101, filed on Jul. 24, 2000, which is a continuation-in-part of application No. 09/616,477, filed on Jul. 14, 2000, which is a continuation-in-part of application No. 09/613,940, filed on Jul. 11, 2000, which is a continuation-in-part of application No. 09/596,055, filed on Jun. 16, 2000, which is a continuation-in-part of application No. 09/593,034, filed on Jun. 13, 2000, now abandoned, which is a continuation-in-part of application No. 09/574,440, filed on May 20, 2000, now Pat. No. 6,654,903, and a continuation-in-part of application No. 09/591,193, filed on Jun. 9, 2000, now Pat. No. 6,332,198, which is a continuation-in-part of application No. 09/588,398, filed on Jun. 6, 2000, now abandoned, which is a continuation-in-part of application No. 09/574,341, filed on May 20, 2000, and a continuation-in-part of application No. 09/574,343, filed on May 20, 2000, now Pat. No. 6,639,910.

(51) Int. Cl.[7] .................................................. G06F 9/00
(52) U.S. Cl. ........................ 713/191; 713/200; 713/177
(58) Field of Search ................................ 713/191, 200, 713/177

(56) References Cited

U.S. PATENT DOCUMENTS

| | | | |
|---|---|---|---|
| 4,750,136 A | 6/1988 | Arpin et al. ................ | 364/514 |
| 4,942,540 A | 7/1990 | Black et al. ................ | 364/514 |

(Continued)

FOREIGN PATENT DOCUMENTS

| | | |
|---|---|---|
| WO | 9826611 | 6/1998 |
| WO | 9905826 | 2/1999 |

(Continued)

OTHER PUBLICATIONS

"The Abatis Network Services Contractor," Abatis Systems Corporation product literature, 1999.

(Continued)

*Primary Examiner*—Norman M. Wright
(74) *Attorney, Agent, or Firm*—Thomas J. Engellenner; Reza Mollaaghababa; Nutter, McClennen & Fish

(57) ABSTRACT

The present invention provides a method and apparatus for facilitating hot upgrades of software components within a telecommunications network device through the use of "signatures" generated by a signature generating program. After installation of a new software release within the network device, only those software components whose signatures do not match the signatures of corresponding and currently executing software components are upgraded. Signatures promote hot upgrades by identifying only those software components that need to be upgraded. Since signatures are automatically generated for each software component as part of putting together a new release a quick comparison of two signatures provides an accurate assurance that either the software component has changed or has not. Thus, signatures provide a quick, easy way to accurately determine the upgrade status of each software component.

25 Claims, 269 Drawing Sheets

U.S. PATENT DOCUMENTS

| | | | | | |
|---|---|---|---|---|---|
| 5,515,403 | A | | 5/1996 | Sloan et al. | 375/371 |
| 5,638,410 | A | | 6/1997 | Kuddes | 375/357 |
| 5,726,607 | A | | 3/1998 | Brede et al. | 331/2 |
| 5,850,399 | A | | 12/1998 | Ganmukhi et al. | 370/412 |
| 5,903,564 | A | | 5/1999 | Ganmukhi et al. | 370/399 |
| 5,905,730 | A | | 5/1999 | Yang et al. | 370/429 |
| 5,926,463 | A | | 7/1999 | Ahearn et al. | 370/254 |
| 5,953,314 | A | | 9/1999 | Ganmukhi et al. | 370/220 |
| 5,991,163 | A | | 11/1999 | Marconi et al. | 361/788 |
| 5,991,297 | A | | 11/1999 | Palnati et al. | 370/389 |
| 5,995,511 | A | | 11/1999 | Zhou et al. | 370/412 |
| 6,008,805 | A | | 12/1999 | Land et al. | 345/335 |
| 6,008,995 | A | | 12/1999 | Pusateri et al. | 361/796 |
| 6,015,300 | A | | 1/2000 | Schmidt, Jr. et al. | 439/61 |
| 6,021,116 | A | | 2/2000 | Chiussi et al. | 370/236 |
| 6,021,263 | A | | 2/2000 | Kujoory et al. | 395/200.62 |
| 6,033,259 | A | | 3/2000 | Daoud | 439/573 |
| 6,041,307 | A | | 3/2000 | Ahuja et al. | 705/8 |
| 6,044,540 | A | | 4/2000 | Fontana | 29/505 |
| 6,049,671 | A | * | 4/2000 | Slivka et al. | 717/173 |
| 6,078,595 | A | | 6/2000 | Jones et al. | 370/503 |
| 6,202,207 | B1 | * | 3/2001 | Donohue | 717/173 |
| 6,327,617 | B1 | * | 12/2001 | Fawcett | 709/219 |
| 6,425,126 | B1 | * | 7/2002 | Branson et al. | 717/168 |
| 6,675,205 | B2 | * | 1/2004 | Meadway et al. | 709/219 |
| 2002/0166001 | A1 | * | 11/2002 | Cheng et al. | 710/1 |
| 2003/0195949 | A1 | * | 10/2003 | Slivka et al. | 709/219 |
| 2004/0107349 | A1 | * | 6/2004 | Sasselli et al. | 713/176 |

FOREIGN PATENT DOCUMENTS

| | | |
|---|---|---|
| WO | 9911095 | 3/1999 |
| WO | 9914876 | 3/1999 |
| WO | 9927688 | 6/1999 |
| WO | 9930530 | 6/1999 |
| WO | 9935577 | 7/1999 |

OTHER PUBLICATIONS

AtiMe–3E Data Sheet, 1–17 (Mar. 8, 2000).

Black, D., "Building Switched Networks," pp. 85–267.

Black, D., "Managing Switched Local Area Networks A Practical Guide" pp. 324–329.

"Configuration," Cisco Systems Inc. webpage, pp. 1–32 (Sep. 20, 1999).

Leroux, P., "The New Business Imperative: Achieving Shorter Development Cycles while Improving Product Quality," QNX Software Systems Ltd. webpage, (1999).

NavisXtend Accounting Server, Ascend Communications, Inc. product information (1997).

NavisXtend Fault Server, Ascend Communications, Inc. product information (1997).

NavisXtend Provisioning Server, Ascend Communications, Inc. product information (1997).

Network Health LAN/WAN Report Guide, pp. 1–23.

"Optimizing Routing Software for Reliable Internet Growth," JUNOS product literature (1998).

PMC–Sierra, Inc. website (Mar. 24, 2000).

Raddalgoda, M., "Failure–proof Telecommunications Products: Changing Expectations About Networking Reliability with Microkernel RTOS Technology," QNX Software Systems Ltd. webpage, (1999).

"Real–time Embedded Database Fault Tolerance on Two Single–board Computers," Polyhedra, Inc. product literature.

"Start Here: Basics and Installation of Microsoft Windows NT Workstation," product literature (1998).

Syndesis Limited product literature, 1999.

"Using Polyhedra for a Wireless Roaming Call Management System," Polyhedra, Inc., (prior to May 20, 2000).

Veritas Software Corporation webpage, 2000.

* cited by examiner

FROM FIG. 3I

```
      ATMIfName=ATMIf11/1/1
      Concatenated=false
      Name=Path11/1/1
      Operant=SPATH
      Operator=Create
      PortID=1
915   Position=1
      Service=ATM
      ShelfID-11
      SlotID=1
      Type=Terminated
      Version=V1_1_Ø_Ø
      Width=STS3
      Enetcli>
      Enetcli>
      Enetcli>
916   Enetcli> showTemplate SPATH
      ATMIfName=<String>[TerminatedOnly]
      Concatenated=<true:false>
      Name=<String>
      Operant=SPATH
      Operator=<Create:Replace:Update:Delete>
      PortID=<Integer><1-16>
917   Position=<Integer>
      Service=<None :ATM>
      ShelfID=<11[top],13[bottom]>
      SlotID=<Integer><1-8>
      Type=<switched :Terminated>
      Version=V1_1_Ø_Ø
      Width=<STS1:STS3:STS12:STS48
      Enetcli>
      Enetcli>
918   Enetcli> status
919   Not currently connected to server
920   Supporting templates: CONTROL, PVC, SPATH, SPVC,TD, and VAIF
      Enetcli>
```

FIG. 3I CONTINUED

BATCH
924

Operant=BATCH
Operator=Execute
Version=V1_1_0_0
924a TASK1=execute-SPATH
924b TASK2=execute-PVC
924c TASK3=execute-SPVC
924d TASK4=load-SPVC-spvc1
924e TASK5=execute-SPVC
924f TASK6=load-SPVC-spvc2
924e TASK7=execute-SPVC
•
•
•
924g TASK50=set-SPATH-PortID-3
924h TASK51=execute-SPATH
924i TASK52=set-SPATH-SlotID-2
924j TASK53=execute-SPATH

Operant=BATCH
Operator=Execute
Version=V1_1_0_0
925a TASK1=execute-CONTROL
925b TASK2=execute-SPATH
925c TASK3=set-SPATH-PortID-3
925d TASK4=execute-SPATH
•
•
•
925e TASK61=set-CONTROL-System-192.168.9.201
925f TASK62=execute-CONTROL
925g TASK63=execute-SPATH
•
•
•
925h TASK108=close
925i TASK109=set-CONTROL-Server-Server1
925j TASK110=set-CONTROL-System-192.168.8.200
925k TASK111=execute-CONTROL
925l TASK112=execute-SPATH
•
•
•

MANAGED RESOURCE GROUP TABLE 1008

| LID (1008a) | MANAGED DEVICE PID (1008b) | GROUP NAME (1008c) |
|---|---|---|
| 1145 | 1 | WALMART-EAST (1008d) |
| ⋮ | ⋮ | ⋮ |

FIG. 11L

MANAGED RESOURCE TABLE 1007

| LID (1007a) | RESOURCE LID (1007b) | MANAGE RESOURCE GROUP LID (1007c) |
|---|---|---|
| 4443 | 901 | 1145 |
| ⋮ | ⋮ | ⋮ |

FIG. 11M

USER TABLE 1010

| LID (1010a) | USERNAME (1010b) | PASSWORD (1010c) | GROUP LEVEL ACCESS (1010d) |
|---|---|---|---|
| 2012 | DAVE | MARBLE | PROVISIONER (1010e) |
| ⋮ | ⋮ | ⋮ | |

FIG. 11P

USER MANAGED DEVICE TABLE 1012

| LID (1012a) | USER LID (1012b) | HOST LID (1012c) | RETRY (1012d) | TIMEOUT (1012e) |
|---|---|---|---|---|
| 7892 | 2012 | 9046 | | |
| ⋮ | ⋮ | ⋮ | ⋮ | ⋮ |

FIG. 11Q

ADMINISTRATION MANAGED DEVICE TABLE 1014

1014a, 1014b, 1014c, 1014d, 1014e

| LID | HOST ADDRESS | PORT ADDRESS | RETRY | TIMEOUT | ADMIN. PASSWORD | PROV. PASSWORD | VIEWER PASSWORD |
|---|---|---|---|---|---|---|---|
| 9046 | 192.168.9.202 | 1521 | | | TEAM 1 | TEAM 2 | TEAM 3 |
| ⋮ | ⋮ | ⋮ | ⋮ | ⋮ | ⋮ | ⋮ | ⋮ |

FIG. 11R

USER RESOURCE GROUP MAP TABLE 1016

1016a, 1016b, 1016c

| LID | USER LID | USER RESOURCE GROUP LID |
|---|---|---|
| 8086 | 2012 | 1024 |
| ⋮ | ⋮ | ⋮ |

FIG. 11T

USER RESOURCE GROUP TABLE 1018

1018a, 1018b, 1018c, 1018d

| LID | HOST LID | GROUP NAME |
|---|---|---|
| 1024 | 9046 | WALMART-EAST |
| ⋮ | ⋮ | ⋮ |

FIG. 11U

CARD TABLE 47

| | PID | CWD TYPE | VERSION NO. | SLOT NO. | ••• |
|---|---|---|---|---|---|
| 16a | 500 | 0XF002 | 3 | 1 | |
| 16b | 501 | 0XF002 | 4 | 2 | |
| | ⋮ | ⋮ | ⋮ | ⋮ | ⋮ |
| 16e | 505 | 0X6002 | 1 | 5 | |
| | ⋮ | ⋮ | ⋮ | ⋮ | ⋮ |
| 16n | 513 | 0XF002 | 1 | 12 | |
| | ⋮ | ⋮ | ⋮ | ⋮ | ⋮ |

FIG. 12B

PORT TABLE 49

| | PID | PORT TYPE | VERSION NO. | SLOT NO. | ... |
|---|---|---|---|---|---|
| 44a | 1500 | 00620 | 1 | 1 | |
| 44b | 1501 | 00620 | 1 | 1 | |
| 44c | 1502 | 00620 | 1 | 1 | |
| 44d | 1503 | 00620 | 1 | 1 | |
| 44a | 1504 | 00820 | | | |
| 46a | ⋮ | ⋮ | ⋮ | ⋮ | ⋮ |
| | 1600 | OO620 | 1 | 8 | |
| | ⋮ | ⋮ | ⋮ | ⋮ | ⋮ |

FIG. 12C

SERVICE ENDPOINT TABLE 76

| | SERVICE ENDPOINT # | PORT PID |
|---|---|---|
| 78 | 1 | 1500 |
| 80 | 2 | 1501 |
| 82 | 3 | 1501 |
| 84 | 4 | 1501 |
| 86 | 5 | 1502 |
| 88 | 6 | 1502 |
| 90 | 7 | 1503 |
| 92 | 8 | 1503 |
| 94 | 9 | 1503 |
| 168 | 10 | 1502 |
| | ⋮ | ⋮ |

FIG. 14A

LOGICAL TO PHYSICAL CARD TABLE 100

| | LID (98) | PRIMARY PID (102) | BACK-UP PID (104) |
|---|---|---|---|
| 106 | 30 | 500 | 513 |
| 109 | 31 | 501 | 513 |
| | ⋮ | ⋮ | ⋮ |

FIG. 14B

LOGICAL TO PHYSICAL PORT TABLE 101

| | LID (98) | PRIMARY PID (102) | BACK-UP PID (104) |
|---|---|---|---|
| 107 | 40 | 1500 | 1600 |
| | ⋮ | ⋮ | ⋮ |

FIG. 14C

ATM GROUP TABLE 108

| GROUP # | CARD LID | ... |
|---|---|---|
| 1 | 30 | |
| 2 | 30 | |
| 3 | 30 | |
| 4 | 30 | |

FIG. 14D

ATM INTERFACE TABLE 114

| ATM IF | ATM GROUP | SE | ... |
|---|---|---|---|
| 1 | 1 | 1 | |
| 2 | 1 | 1 | |
| 3 | 1 | 1 | |
| 4 | 2 | 2 | |
| 5 | 2 | 3 | |
| 6 | 2 | 4 | |
| ⋮ | ⋮ | ⋮ | ⋮ |
| 12 | 3 | 10 | |
| ⋮ | ⋮ | ⋮ | ⋮ |

170 (row 12)

FIG. 14E

SOFTWARE LOAD RECORD 128a

| CONTROL SHIM (130) | LID (132) |
|---|---|
| atm-cntl.exe (134) | 30 |

FIG. 14F

SMS TABLE 192

| | 1226 | 1228 | 1230 | |
|---|---|---|---|---|
| | IMAGE LID | VERIFICATION STATUS | UPGRADE MODES | • • • |
| 1227 | 9623 | PASSED | X2348 | • • • |
| | ⋮ | ⋮ | ⋮ | ⋮ |

UPGRADE CONTROL TABLE 1248

| | IMAGE LID | COMMAND (1252) | TIME FOR INSTALLATION (1253) | STATUS (1255) | ... |
|---|---|---|---|---|---|
| 1251 | 9623 | x2344 | | | ... |
| | ⋮ | ⋮ | ⋮ | ⋮ | ⋮ |

(Header row: 1250)

FIG. 21G

GROUP TABLE 108′

| | GROUP # | PRIMARY CARD LID (447) | BACKUP CARD LID (449) | ... |
|---|---|---|---|---|
| 450 | 1 | 30 | 31 | |
| 451 | 2 | 30 | 31 | |
| 452 | 3 | 30 | 31 | |
| 453 | 4 | 30 | 31 | |
| 454 | 5 | 31 | 32 | |
| 455 | 6 | 31 | 32 | |
| 456 | 7 | 31 | 32 | |
| 457 | 8 | 31 | 32 | |
| 458 | 9 | 32 | 30 | |
| 459 | 10 | 32 | 30 | |
| 460 | 11 | 32 | 30 | |
| 461 | 12 | 32 | 30 | |
| | ⋮ | ⋮ | ⋮ | ⋮ |

FIG. 30

PATH TABLE 600

602

| PATH LID | UP PORT LID | TIME SLOT | # OF TIME SLOTS | • • • |
|---|---|---|---|---|
| 1666 | 1231 | 4 | 3 | |
| ⋮ | ⋮ | ⋮ | ⋮ | ⋮ |

FIG. 38

SERVICE END POINT TABLE 76′

| SE # | Q # | FC LID (606) | FC SLICE (608) | FC TIME SLOT (610) | PATH PID | • • • |
|---|---|---|---|---|---|---|
| 878 (604) | 1 | | | | 1666 | |
| ⋮ | ⋮ | ⋮ | ⋮ | ⋮ | ⋮ | ⋮ |

FIG. 39

TEST PATH TABLE 841

| | PATH LID | UP PORT LID | TIME SLOT | # OF TIME SLOTS | MONITOR (844) | ENABLE PORT RECEIVER (845) | ... |
|---|---|---|---|---|---|---|---|
| 842 | 1666 | 1232 | 4 | 3 | INGRESS | NO | |
| 843 | 1666 | 1233 | 4 | 3 | EGRESS | NO | |
| 844 | 1666 | 1233 | 4 | 3 | INGRESS | YES | |
| | ⋮ | ⋮ | ⋮ | ⋮ | | | ⋮ |

FIG. 58

MANAGED DEVICE TABLE 983

983b, 983a

| PID | A1 | • • • | An |
|---|---|---|---|
| 1 | | | |

FIG 60A

CHASSIS TABLE 988

988b, 988c, 988a

| PID | A1 | • • • | An | MANAGED DEVICE PID |
|---|---|---|---|---|
| 1 | | | | 1 |
| ⋮ | ⋮ | ⋮ | ⋮ | ⋮ |

FIG 60B

SHELF TABLE 989

989a, 989b

| PID | A1 | • • • | An | CHASSIS PID |
|---|---|---|---|---|
| 3 | | | | 2 |
| 4 | | | | 2 |
| ⋮ | ⋮ | ⋮ | ⋮ | ⋮ |
| 18 | | | | 2 |

FIG 60C

SLOT TABLE 990

990a, 990b, 990c, 990d

| PID | A1 | • • • | An | SHELF PID |
|---|---|---|---|---|
| 20 | | | | 3 |
| 21 | | | | 3 |
| ⋮ | ⋮ | ⋮ | ⋮ | ⋮ |
| 116 | | | | 18 |

FIG 60D

CARD TABLE 47′

47a 47b

| PID | CWD TYPE | VERSION NO. | SLOT PID | • • • |
|---|---|---|---|---|
| 120 | 0XF002 | 3 | 20 | |
| 121 | 0XF002 | 4 | 21 | |
| ⋮ | ⋮ | ⋮ | ⋮ | ⋮ |
| 124 | 0X6002 | 1 | 24 | |
| ⋮ | ⋮ | ⋮ | ⋮ | ⋮ |
| 131 | 0XF002 | 1 | 31 | |
| ⋮ | ⋮ | ⋮ | ⋮ | ⋮ |

FIG 60E

PORT TABLE 49′

49a 49b

| PID | PORT TYPE | VERSION NO. | CARD PID | • • • |
|---|---|---|---|---|
| 300 | 00620 | 1 | 20 | |
| 301 | 00620 | 1 | 20 | |
| 302 | 00620 | 1 | 20 | |
| 303 | 00620 | 1 | 20 | |
| 304 | 00820 | 1 | 20 | |
| ⋮ | ⋮ | ⋮ | ⋮ | ⋮ |
| 400 | OO620 | 1 | 39 | |
| ⋮ | ⋮ | ⋮ | ⋮ | ⋮ |

FIG 60F

SONET PATH TABLE 600′

600a, 600b

| PATH LID | PORT LID | TIME SLOT | # OF TIME SLOTS | ... |
|---|---|---|---|---|
| 901 | 304 | 4 | 3 | |
| ⋮ | ⋮ | ⋮ | ⋮ | ⋮ |

FIG. 60G

SERVICE ENDPOINT TABLE 76″

76a, 76c, 76d, 76e, 76b

| SE LID | Q # | FC PID | FC SLICE PID | FC TIME SLOT | PATH LID | ... |
|---|---|---|---|---|---|---|
| 3000 | | | | | 901 | |
| ⋮ | ⋮ | ⋮ | ⋮ | ⋮ | ⋮ | ⋮ |

FIG. 60H

ATM IF TABLE 114″

114a, 114b

| ATM IF LID | ATM GROUP LID | SE LID | ... |
|---|---|---|---|
| 5054 | | 3000 | ... |
| ⋮ | ⋮ | ⋮ | ... |

FIG. 60I

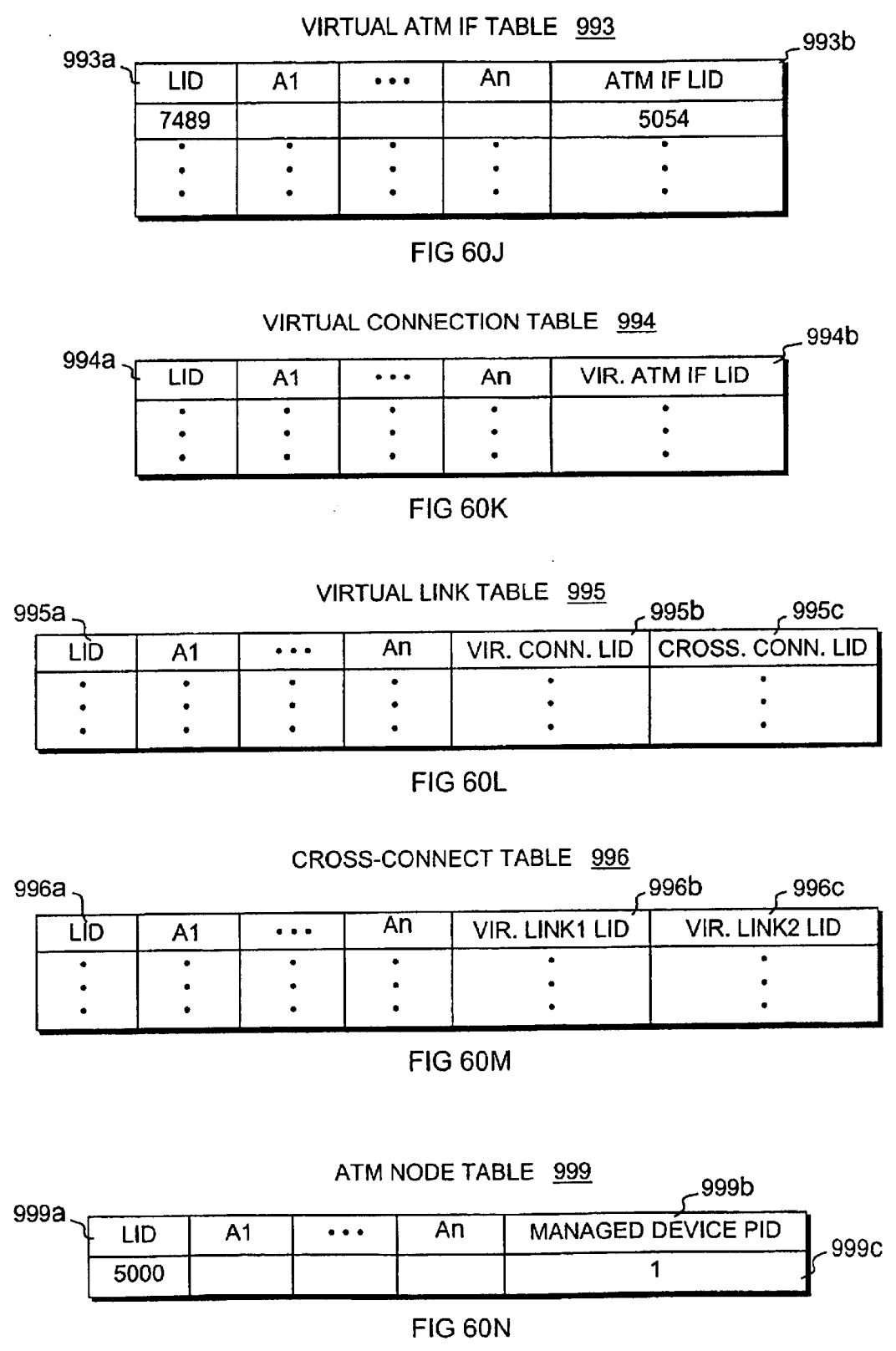

VIRTUAL ATM IF TABLE 993

993a 993b

| LID | A1 | • • • | An | ATM IF LID |
|---|---|---|---|---|
| 7489 | | | | 5054 |
| ⋮ | ⋮ | ⋮ | ⋮ | ⋮ |

FIG 60J

VIRTUAL CONNECTION TABLE 994

994a 994b

| LID | A1 | • • • | An | VIR. ATM IF LID |
|---|---|---|---|---|
| ⋮ | ⋮ | ⋮ | ⋮ | ⋮ |

FIG 60K

VIRTUAL LINK TABLE 995

995a 995b 995c

| LID | A1 | • • • | An | VIR. CONN. LID | CROSS. CONN. LID |
|---|---|---|---|---|---|
| ⋮ | ⋮ | ⋮ | ⋮ | ⋮ | ⋮ |

FIG 60L

CROSS-CONNECT TABLE 996

996a 996b 996c

| LID | A1 | • • • | An | VIR. LINK1 LID | VIR. LINK2 LID |
|---|---|---|---|---|---|
| ⋮ | ⋮ | ⋮ | ⋮ | ⋮ | ⋮ |

FIG 60M

ATM NODE TABLE 999

999a 999b 999c

| LID | A1 | • • • | An | MANAGED DEVICE PID |
|---|---|---|---|---|
| 5000 | | | | 1 |

FIG 60N

ADMINISTRATION MANAGED DEVICE TABLE 1014′

1014a′ 1014e′ 1014f′

| LID | HOST ADDRESS | PORT ADDRESS | RETRY | TIMEOUT | ADMIN. PASSWORD | PROV. PASSWORD | VIEWER PASSWORD | PHYSICAL ID | PHYSICAL ID |
|---|---|---|---|---|---|---|---|---|---|
| 9046 | 192.168.9.202 | 1521 | | | TEAM 1 | TEAM 2 | TEAM 3 | | |
| ⋮ | ⋮ | ⋮ | ⋮ | ⋮ | ⋮ | ⋮ | ⋮ | ⋮ | ⋮ |

FIG. 64

DYNAMIC THRESHOLD TABLE 1048

| RESOURCE ID (1048a) | ATTRIBUTE (1048c) | SAMPLING FREQ. (1048d) | ACTION (1048e) | RULE (1048f) |
|---|---|---|---|---|
| 901 (1048g) | UNAVAILABLE SECONDS (PATH END) | 15 min | LOG | IF ATTRIBUTE > 10 |
| 901 | PATH ERRORS (PATH END) | 15 min | TRAP | IF ATTRIBUTE < 5 OR >10 |
| 901 | PATH ERRORS (PATH END) | 5 min | LOG & TRAP | IF ATTRIBUTE < 5 OR >10 |
| ⋮ | ⋮ | ⋮ | ⋮ | ⋮ |
| 5054 | FAILED CALL ATTEMPTS | 10 min | TRAP | IF ATTRIBUTE > 8 BETWEEN 8:00am-7:00pm OR > 2 BETWEEN 7:00pm-8:00am |
| 5054 (1048h) | HCS ERRORS | 12 min | TRAP | IF ATTRIBUTE > 13 |
| ⋮ | ⋮ | ⋮ | ⋮ | ⋮ |
| 7312 | Rx TRAFFIC | 1 HOUR | TRAP | IF ATTRIBUTE < 4 |
| 7312 | Tx TRAFFIC | 1 HOUR | TRAP | IF ATTRIBUTE = 0 |
| | ⋮ | ⋮ | ⋮ | ⋮ |

FIG. 68

DYNAMIC THRESHOLD TABLE 1048′

| THR. GROUP LID (1048a′) | RESOURCE (1048b′) | ATTRIBUTE (1048c′) | SAMPLING FREQ. (1048d′) | ACTION (1048e′) | RULE (1048f′) |
|---|---|---|---|---|---|
| 8312 | SONET PATH | UNAVAILABLE SECONDS (PATH END) | 15 min | LOG | IF ATTRIBUTE > 10 |
| 8312 | SONET PATH | PATH ERRORS (PATH END) | 15 min | TRAP | IF ATTRIBUTE < 5 OR >10 |
| 8312 | SONET PATH | PATH ERRORS (FAR END) | 5 min | LOG & TRAP | IF ATTRIBUTE < 5 OR >10 |
| ⋮ | ⋮ | ⋮ | ⋮ | ⋮ | ⋮ |
| 8433 | ATM IF | FAILED CALL ATTEMPTS | 10 min | TRAP | IF ATTRIBUTE > 8 BETWEEN 8:00am-7:00pm OR > 2 BETWEEN 7:00pm-8:00am |
| 8433 | ATM IF | HCS ERRORS | 12 min | TRAP | IF ATTRIBUTE > 13 |
| ⋮ | ⋮ | ⋮ | ⋮ | ⋮ | ⋮ |
| 8542 | VIRTUAL CONN. | Rx TRAFFIC | 1 HOUR | TRAP | IF ATTRIBUTE < 4 |
| 8542 | VIRTUAL CONN. | Tx TRAFFIC | 1 HOUR | TRAP | IF ATTRIBUTE = 0 |
| | ⋮ | ⋮ | ⋮ | ⋮ | ⋮ |

FIG. 69A

THRESHOLD GROUP TABLE 1052

1052a 1052b

| RESOURCE ID | THRESHOLD GROUP LID |
|---|---|
| 901 | 8312 |
| 902 | 8313 |
| 903 | 8312 |
| ⋮ | ⋮ |
| 5054 | 8433 |
| ⋮ | ⋮ |
| 7312 | 8542 |

FIG. 69B

DYNAMIC THRESHOLD TABLE 1048''

1048a'' 1048b'' 1048c'' 1048d'' 1048e'' 1048f'' 1048g'' 1048h'' 1048i'' 1048j'' 1048k'' 1048l'' 1048t''

| THR. GROUP LID | RESOURCE | ATTRIBUTE | SAMPLING FREQ. | ACTION | RULE LID | VARIAB. a | VARIAB. b | VARIAB. c | VARIAB. d | VARIAB. e | VARIAB. f | ... | VARIAB. n |
|---|---|---|---|---|---|---|---|---|---|---|---|---|---|
| 8312 (1048u'') | SONET PATH | UNAVAILABLE SECONDS (PATH END) | 15 min | LOG | 9421 | 10 | | | | | | | |
| 8312 | SONET PATH | PATH ERRORS (PATH END) | 15 min | TRAP | 9422 | 5 | 10 | | | | | | |
| 8312 | SONET PATH | PATH ERRORS (FAR END) | 5 min | LOG & TRAP | 9422 | 5 | 10 | | | | | | |
| ⋮ | ⋮ | ⋮ | ⋮ | ⋮ | ⋮ | ⋮ | ⋮ | ⋮ | ⋮ | ⋮ | ⋮ | ⋮ | ⋮ |
| 8433 | ATM IF | FAILED CALL ATTEMPTS | 10 min | TRAP | 9423 | 8 | 8:00am | 7:00pm | 2 | 7:00pm | 8:00am | | |
| 8433 (1048v'') | ATM IF | HCS ERRORS | 12 min | TRAP | 9421 | 13 | | | | | | | |
| ⋮ | ⋮ | ⋮ | ⋮ | ⋮ | ⋮ | ⋮ | ⋮ | ⋮ | ⋮ | ⋮ | ⋮ | ⋮ | ⋮ |
| 8542 | VIRTUAL CONN. | RX TRAFFIC | 1 HOUR | TRAP | 9424 | 4 | | | | | | | |
| 8542 | VIRTUAL CONN. | Tx TRAFFIC | 1 HOUR | TRAP | 9425 | | | | | | | | |
| | ⋮ | ⋮ | ⋮ | ⋮ | ⋮ | ⋮ | ⋮ | ⋮ | ⋮ | ⋮ | ⋮ | ⋮ | ⋮ |

FIG. 70A

THRESHOLD RULE TABLE 1050

1050a 1050b 1050c

| RULE LID | EXPRESSION |
|---|---|
| 9421 | IF ATTRIBUTE > a |
| 9422 | IF ATTRIBUTE < a OR > b |
| 9423 | IF ATTRIBUTE > a BETWEEN b-c OR > d BETWEEN e-f |
| 9424 | IF ATTRIBUTE < a |
| 9425 | IF ATTRIBUTE = 0 |
| 9426 | RMON |
| 9427 | FOE |
| 9428 | IF ATTRIBUTE < a GO TO RULE LID b |
| ⋮ | ⋮ |

FIG. 70B

DYNAMIC THRESHOLD TABLE 1048'''

1048a''' 1048b''' 1048c''' 1048d''' 1048e''' 1048f''' 1048g''' 1048h''' 1048i''' 1048j''' 1048k''' 1048l''' 1048t''' 1048w'''

| | THR. GROUP LID | RESOURCE | ATTRIBUTE | SAMPLING FREQ. | ACTION | RULE LID | VARIAB. a | VARIAB. b | VARIAB. c | VARIAB. d | VARIAB. e | VARIAB. f | ... | VARIAB. n | ACTIVE/ INACTIVE |
|---|---|---|---|---|---|---|---|---|---|---|---|---|---|---|---|
| 1048u''' | 8312 | SONET PATH | UNAVAILABLE SECONDS (PATH END) | 15 min | LOG | 9421 | 10 | | | | | | | | |
| | 8312 | SONET PATH | PATH ERRORS (PATH END) | 15 min | TRAP | 9422 | 5 | 10 | | | | | | | |
| | 8312 | SONET PATH | PATH ERRORS (FAR END) | 5 min | LOG & TRAP | 9422 | 5 | 10 | | | | | | | |
| | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| | 8433 | ATM IF | FAILED CALL ATTEMPTS | 10 min | TRAP | 9423 | 8 | 8:00am | 7:00pm | 2 | 7:00pm | 8:00am | | | |
| 1048v''' | 8433 | ATM IF | HCS ERRORS | 12 min | TRAP | 9421 | 13 | | | | | | | | |
| | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| | 8542 | VIRTUAL CONN. | Rx TRAFFIC | 1 HOUR | TRAP | 9424 | 4 | | | | | | | | |
| | 8542 | VIRTUAL CONN. | Tx TRAFFIC | 1 HOUR | TRAP | 9425 | | | | | | | | | |
| | | ⋮ | ⋮ | ⋮ | ⋮ | ⋮ | ⋮ | ⋮ | ⋮ | ⋮ | ⋮ | ⋮ | ⋮ | ⋮ | ⋮ |
| 1048x''' | 8588 | HARD DRIVE | UNUSED DISK SPACE | 5 min | LOG | 9428 | 80 | 9424 | | | | | | | ACTIVE |
| 1048y''' | 8588 | HARD DRIVE | UNUSED DISK SPACE | 30 sec | TRAP | 9424 | 20 | | | | | | | | INACTIVE |

FIG. 71

SIGNATURES FOR FACILITATING HOT UPGRADES OF MODULAR SOFTWARE COMPONENTS

RELATED APPLICATIONS

This application is a continuation-in-part of application number

Ser. No. 09/756,936 files Jan. 9, 2001 which is a C-I-P of
Ser. No. 09/718,224 filed Nov. 21, 2001 which is a C-I-P of
Ser. No. 09/711,054 filed Nov. 9, 2000 which is a C-I-P of
Ser. No. 09/703,856 filed Nov. 1, 2000 which is a C-I-P of
Ser. No. 09/687,191 filed Oct. 12, 2000 now abandoned which is a C-I-P of
Ser. No. 09/669,364 filed Sep. 26, 2000 which is a C-I-P of
Ser. No. 09/663,947 filed Sep. 18, 2000 now abandoned which is a C-I-P of
Ser. No. 09/656,123 filed Sep. 6, 2000 now abandoned which is a C-I-P of
Ser. No. 09/653,700 filed Aug. 31, 2000 now abandoned which is a C-I-P of
Ser. No. 09/637,800 filed Aug. 11, 2000 which is a C-I-P of
Ser. No. 09/633,675 filed Aug. 7, 2000 which is a C-I-P of
Ser. No. 09/625,101 filed Jul. 24, 2000 which is a C-I-P of
Ser. No. 09/616,477 filed Jul. 14, 2000 which is a C-I-P of
Ser. No. 09/613,940 filed Jul. 11, 2000 which is a C-I-P of
Ser. No. 09/596,055 filed Jun. 16, 2000 which is a C-I-P of
Ser. No. 09/593,034 filed Jun. 13, 2000 now abandoned which is a C-I-P of
Ser. No. 09/574,440 filed May 20, 2000 now U.S. Pat. No. 6,654,903 on Nov. 25, 2003 and
Ser. No. 09/591,193 filed Jun. 9, 2000 U.S. Pat. No. 6,332, 198 which is a C-I-P of
Ser. No. 09/588,398 filed Jun. 6, 2000 now abandoned which is a C-I-P of
Ser. No. 09/574,341 filed May 20, 2000; and
Ser. No. 09/574,343 filed May 20, 2000 now U.S. Pat. No. 6,639,910 on Oct. 28, 2003.

BACKGROUND

The majority of Internet outages are directly attributable to software upgrade issues and software quality in general. Mitigation of network downtime is a constant battle for service providers. In pursuit of five 9□s availability or 99.999% network up time, service providers must minimize network outages due to equipment (i.e., hardware) and all too common software failures.

Service providers not only incur downtime due to failures, but also for upgrades (i.e., deployment of new or improved software and/or hardware) or software and/or hardware patches that are needed to correct current network problems. A network outage can also occur after an upgrade has been installed if the upgrade itself includes undetected problems (i.e., bugs) or if the upgrade causes other software or hardware to have problems. Data merging, data conversion and untested compatibilities contribute to downtime. Upgrades often result in data loss due to incompatibilities with data file formats. Downtime may occur unexpectedly days after an upgrade due to lurking software or hardware incompatibilities.

Often, the upgrade of one process results in the failure of another process. Sometimes one change can cause several other components to fail; this is often called the ripple effect. Typically, the software is assigned a version number and each time the software is upgraded it is assigned a new version number. To avoid compatibility problems, different versions of the same software are not executed at the same time.

Most computer systems are based on inflexible, monolithic software architectures that consist of one massive program or a single image. Though the program includes many sub-programs or applications, when the program is linked, all the subprograms are resolved into one image. Monolithic software architectures are chosen because writing subprograms is simplified since the locations of all other subprograms are known and straightforward function calls between subprograms can be used. Unfortunately, the data and code within the image is static and cannot be changed without changing the entire image. Such a change is termed an upgrade and requires creating a new monolithic image including the changes and then rebooting the computer to cause it to use the new image. Thus, to upgrade, patch or modify the program requires that the entire computer system be shut down and rebooted. Shutting down a network router or switch immediately affects the network up time or availability. To minimize the number of reboots required for software upgrades and, consequently, the amount of network down time, new software releases to customers are often limited to a few times a year at best. In some cases, only a single release per year is feasible.

In addition, new software releases are also limited to a few times a year due to the amount of testing required to release a new monolithic software program. As the size and complexity of the program grows, the amount of time required to test and the size of the regress matrix used to test the software also grows. Forcing more releases each year may negatively affect software quality as all bugs may not be detected. If the software is not fully tested and a bug is not detected or even after extensive testing a bug is not discovered and the network device is rebooted with the new software, more network down time may be experienced if the device crashes due to the bug or the device causes other devices on the network to have problems and it and other devices must be brought down again for repair or another upgrade to fix the bug. In addition, after each software release, the size of the monolithic image increases leading to a longer reboot time. Moreover, a monolithic image requires contiguous memory space, and thus, the computer system□s finite memory resources will limit the size of the image.

Unfortunately, limiting the number of software releases also delays the release of new hardware. New hardware modules, usually ready to ship between major software releases, cannot be shipped more than a few times a year since the release of the hardware must be coordinated with the release of new software designed to upgrade the monolithic software architecture to run the new hardware.

An additional and perhaps less obvious issue faced by customers is encountered when customers need to scale and enhance their networks. Typically, new and faster hardware is added to increase bandwidth or add computing power to an existing network. Under a monolithic software model, since customers are often unwilling to run different software revisions in each network element, customers are forced to upgrade the entire network. This may require shutting down and rebooting each network device.

Dynamic loading is one method used to address some of the problems encountered with upgrading monolithic software. The core or kernel software is loaded on power-up but the dynamic loading architecture allows each application to be loaded only when requested. In some situations, instances of these software applications may be upgraded without having to upgrade the kernel and without having to reboot the system (i.e., "hot upgrade"). The software applications are often assigned a version number to track the changes in each application. The assignment of a version number is an administrative task that is generally completed by the person changing the application and is a procedure prone to errors. If an application is changed and a new version number is not assigned or an incorrect version number is assigned, the application may not be recognized as an upgraded application and, thus, not hot upgraded with other upgraded applications. This may cause serious errors, including a network device failure.

Unfortunately, even for dynamic loading, much of the data and code required to support basic system services, for example, event logging and configuration remain static in the kernel. Application program interface (API) dependencies between dynamically loaded software applications and kernel resident software further complicate upgrade operations. Consequently, many application fixes or improvements and new hardware releases, require changes to the kernel code which, similar to monolithic software changes, requires updating the kernel and shutting down and rebooting the computer.

In addition, processes in monolithic images and those which are dynamically loadable typically use a flat (shared) memory space programming model. If a process fails, it may corrupt memory used by other processes. Detecting and fixing corrupt memory is difficult and, in many instances, impossible. As a result, to avoid the potential for memory corruption errors, when a single process fails, the computer system is often re-booted.

All of these problems impede the advancement of networks, a situation that is completely incongruous with the accelerated need and growth of networks today.

SUMMARY

The present invention provides a method and apparatus for facilitating hot upgrades of software components within a telecommunications network device through the use of "signatures" generated by a signature generating program. After installation of a new software release within the network device, only those software components whose signatures do not match the signatures of corresponding and currently executing software components are upgraded. Signatures promote hot upgrades by identifying only those software components that need to be upgraded. Since signatures are automatically generated for each software component as part of putting together a new release a quick comparison of two signatures provides an accurate assurance that either the software component has changed or has not. Thus, signatures provide a quick, easy way to accurately determine the upgrade status of each software component.

In one aspect, the present invention provides a method for operating a telecommunications network device including a modular architecture, comprising operating the network device using a first set of software components from a first release, receiving a request for a hot upgrade to a second release, determining if signatures for software components in the first set of software components match signatures for corresponding software components in a second set of software components from the second release, continuing to operate the network device using software components in the first set of software components having signatures that match the signatures of corresponding software components in the second set of software components and operating the network device using software components in the second set of software components having signatures that did not match the signatures of corresponding software components in the first set of software components.

In another aspect, the present invention provides a method for operating a telecommunications network device including a modular architecture, comprising operating the network device using a first set of software components from a first release, receiving a request for a hot upgrade to a second release, opening a first packaging list from the first release, wherein the first packaging list includes a list of software components in the first release and a list of corresponding signatures for the software components in the first release, opening a second packaging list from the second release, wherein the second packaging list includes a list of software components in the second release and a list of corresponding signatures for the software components in the second release, comparing, for each software component, the signatures in the first packaging list to the signatures in the second packaging list, continuing to operate the network device using software components in the first set of software components having signatures that match the signatures of corresponding software components in the second set of software components and operating the network device using software components in the second set of software components having signatures that did not match the signatures of corresponding software components in the first set of software components.

In yet another aspect, the present invention provides a method for generating software for a telecommunications network device including a modular architecture, comprising creating a set of software components, generating a signature for each software component using a signature generating program, appending the signature for each software component to each software component, generating a packaging list including a list of each software component and a list of the signatures for each software component and building a release including the software components and the packaging list.

In still another aspect, the present invention provides a telecommunications network device, comprising a modular software architecture including a first release, including a first set of software components, for operating the network device, a second release, including a second set of software components, for operating the network device, a first process capable of receiving a request for a hot upgrade from the first release to the second release, a second process capable of determining if signatures for software components in the first set of software components match signatures for corresponding software components in the second set of software components and a third process capable of continuing to operate the network device using software components in the first set of software components having signatures that match the signatures of corresponding software components in the second set of software components and capable of operating the network device using software components in the second set of software components having signatures that did not match the signatures of corresponding software components in the first set of software components.

BRIEF DESCRIPTION OF THE DRAWINGS

FIGS. 11L–11*m* are tables representing data in a configuration database;

FIGS. 11*p*–11*r* and 11*t*–11*u* are tables representing data in a network management system (NMS) database;

FIGS. 12*b*–12*c* and 14*a*–14*f* are tables representing data in a configuration database;

FIGS. 21*b* and 21*g* are tables representing data in a configuration database;

FIG. 30 is a table representing data in a configuration database;

FIGS. 38 and 39 are tables representing data in a configuration database;

FIG. 58 is a block diagram of a test path table;

FIGS. 60*a*–60*n* are tables representing data in a configuration database;

FIG. 64 is a table representing data in an NMS database;

FIGS. 68, 69*a*–69*b*, 70*a*–70*b* and 71 are tables representing data in a configuration database;

DETAILED DESCRIPTION

Modular Software

Figure 1:
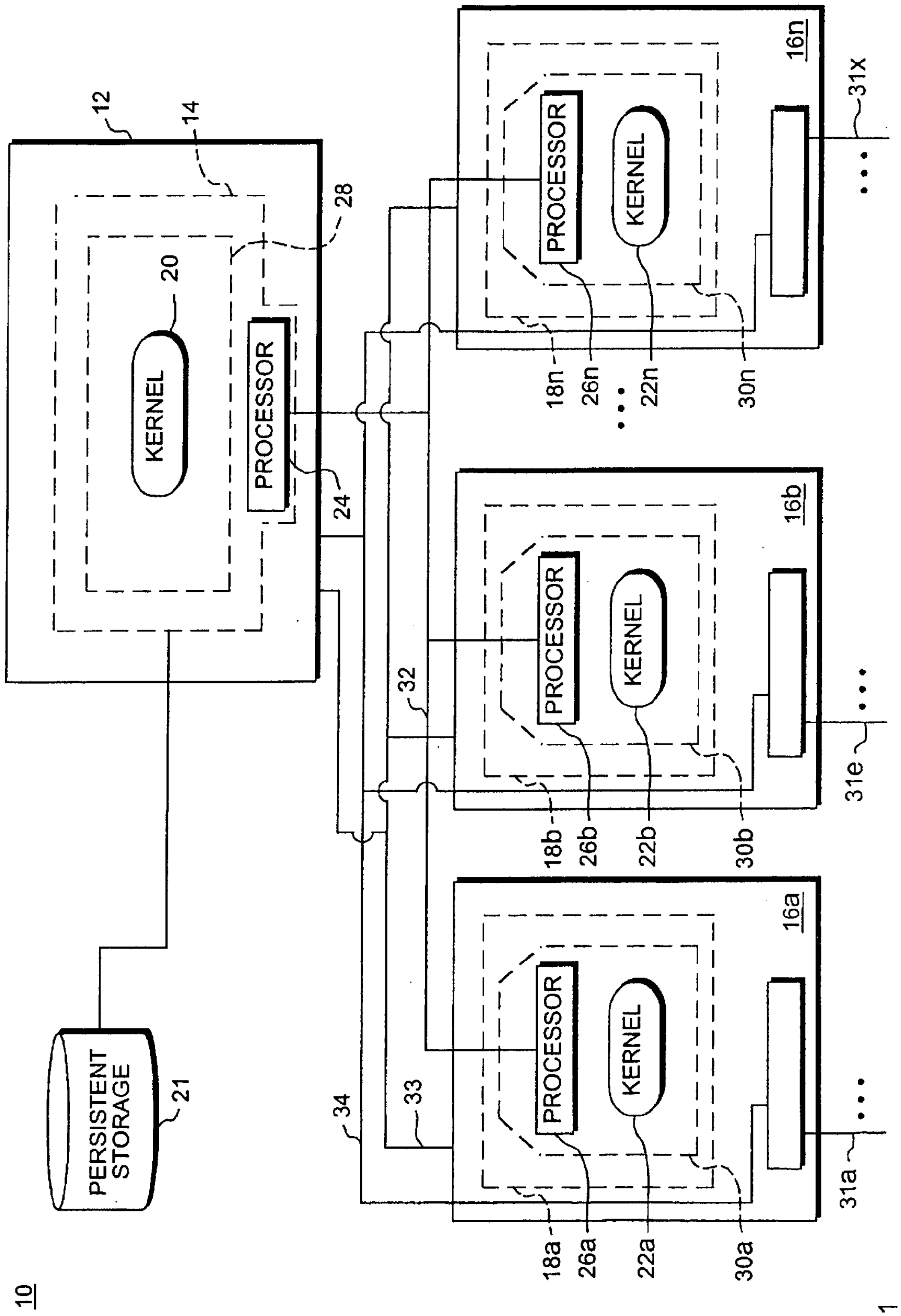
FIG. 1 is a block diagram of a computer system with a distributed processing system.

A modular software architecture solves some of the more common scenarios seen in existing architectures when software is upgraded or new features are deployed. Software modularity involves functionally dividing a software system into individual modules or processes, which are then designed and implemented independently. Inter-process communication (IPC) between the processes is carried out through message passing in accordance with well-defined application programming interfaces (APIs) generated from the same logical system model using the same code generation system. A database process is used to maintain a primary data repository within the computer system/network device, and APIs for the database process are also generated from the same logical system model and using the same code generation system ensuring that all the processes access the same data in the same way. Another database process is used to maintain a secondary data repository external to the computer system/network device; this database receives all of its data by exact database replication from the primary database.

A protected memory feature also helps enforce the separation of modules. Modules are compiled and linked as separate programs, and each program runs in its own protected memory space. In addition, each program is addressed with an abstract communication handle, or logical name. The logical name is location-independent; it can live on any card in the system. The logical name is resolved to a physical card/process during communication. If, for example, a backup process takes over for a failed primary process, it assumes ownership of the logical name and registers its name to allow other processes to re-resolve the logical name to the new physical card/process. Once complete, the processes continue to communicate with the same logical name, unaware of the fact that a switchover just occurred.

Like certain existing architectures, the modular software architecture dynamically loads applications as needed. Beyond prior architectures, however, the modular software architecture removes significant application dependent data from the kernel and minimizes the link between software and hardware. Instead, under the modular software architecture, the applications themselves gather necessary information (i.e., metadata and instance data) from a variety of sources, for example, text files, JAVA class files and database views, which may be provided at run time or through the logical system model.

Metadata facilitates customization of the execution behavior of software processes without modifying the operating system software image. A modular software architecture makes writing applications—especially distributed applications—more difficult, but metadata provides seamless extensibility allowing new software processes to be added and existing software processes to be upgraded or downgraded while the operating system is running (hot upgrades and downgrades). In one embodiment, the kernel includes operating system software, standard system services software and modular system services software. Even portions of the kernel may be hot upgraded under certain circumstances. Examples of metadata include, customization text files used by software device drivers; JAVA class files that are dynamically instantiated using reflection; registration and deregistration protocols that enable the addition and deletion of software services without system disruption; and database view definitions that provide many varied views of the logical system model. Each of these and other examples are described below.

The embodiment described below includes a network computer system with a loosely coupled distributed processing system. It should be understood, however, that the computer system could also be a central processing system or a combination of distributed and central processing and either loosely or tightly coupled. In addition, the computer system described below is a network switch for use in, for example, the Internet, wide area networks (WAN) or local area networks (LAN). It should be understood, however, that the modular software architecture can be implemented on any network device (including routers) or other types of computer systems and is not restricted to a network switch.

A distributed processing system is a collection of independent computers that appear to the user of the system as a single computer. Referring to FIG. 1, computer system 10 includes a centralized processor 12 with a control processor subsystem 14 that executes an instance of the kernel 20 including master control programs and server programs to actively control system operation by performing a major portion of the control functions (e.g., booting and system management) for the system. In addition, computer system 10 includes multiple line cards 16*a*–16*n.* Each line card includes a control processor subsystem 18*a*–18*n,* which runs an instance of the kernel 22*a*–22*n* including slave and client programs as well as line card specific software applications. Each control processor subsystem 14, 18*a*–18*n* operates in an autonomous fashion but the software presents computer system 10 to the user as a single computer.

Each control processor subsystem includes a processor integrated circuit (chip) 24, 26*a*–26*n,* for example, a Motorola 8260 or an Intel Pentium processor. The control processor subsystem also includes a memory subsystem 28, 30*a*–30*n* including a combination of non-volatile or persistent (e.g., PROM and flash memory) and volatile (e.g., SRAM and DRAM) memory components. Computer system 10 also includes an internal communication bus 32 connected to each processor 24, 26*a*–26*n*. In one embodiment, the communication bus is a switched Fast Ethernet providing 100 Mb of dedicated bandwidth to each processor allowing the distributed processors to exchange control information at high frequencies. A backup or redundant Ethernet switch may also be connected to each board such that if the primary Ethernet switch fails, the boards can fail-over to the backup Ethernet switch.

In this example, Ethernet 32 provides an out-of-band control path, meaning that control information passes over Ethernet 32 but the network data being switched by computer system 10 passes to and from external network connections 31*a*–31*xx* over a separate data path 34. External network control data is passed from the line cards to the central processor over Ethernet 32. This external network control data is also assigned a high priority when passed over the Ethernet to ensure that it is not dropped during periods of heavy traffic on the Ethernet. In addition, another bus 33 is provided for low level system service operations, including, for example, the detection of newly installed (or removed) hardware, reset and interrupt control and real time clock (RTC) synchronization across the system. In one embodiment, this is an Inter-IC communications ($I^2C$) bus.

Alternatively, the control and data may be passed over one common path (in-band).

Network/Element Management System (NMS)

Exponential network growth combined with continuously changing network requirements dictates a need for well thought out network management solutions that can grow and adapt quickly. The present invention provides a massively scalable, highly reliable comprehensive network management system, intended to scale up (and down) to meet varied customer needs.

Within a telecommunications network, element management systems (EMSs) are designed to configure and manage a particular type of network device (e.g., switch, router, hybrid switch-router), and network management systems (NMSs) are used to configure and manage multiple heterogeneous and/or homogeneous network devices. Hereinafter, the term "NMS" will be used for both element and network management systems unless otherwise noted. To configure a network device, the network administrator uses the NMS to provision services. For example, the administrator may connect a cable to a port of a network device and then use the NMS to enable the port. If the network device supports multiple protocols and services, then the administrator uses the NMS to provision these as well. To manage a network device, the NMS interprets data gathered by programs running on each network device relevant to network configuration, security, accounting, statistics, and fault logging and presents the interpretation of this data to the network administrator. The network administrator may use this data to, for example, determine when to add new hardware and/or services to the network device, to determine when new network devices should be added to the network, and to determine the cause of errors.

Figure 2A:
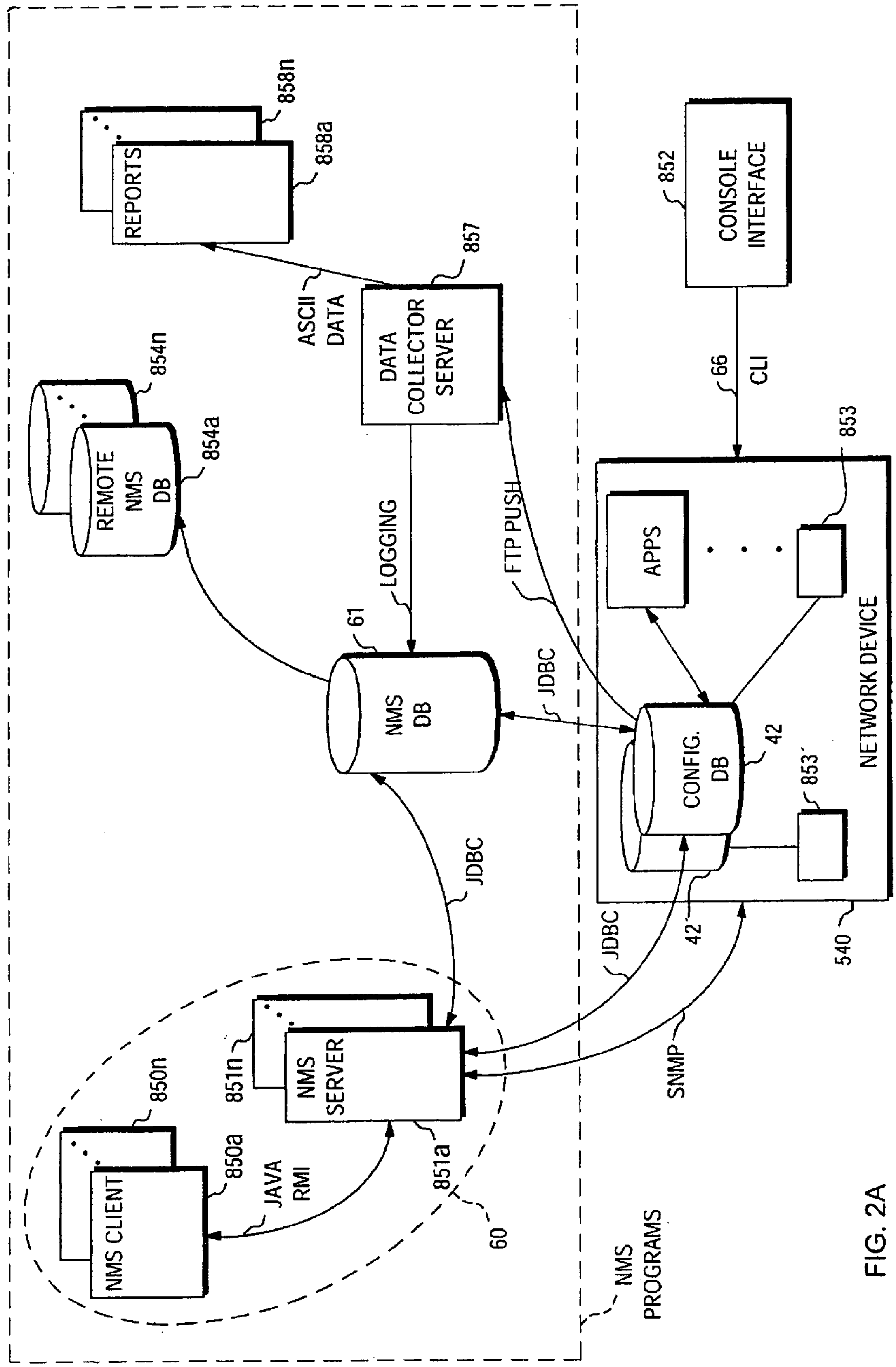
FIGS. 2*a*–2*b* are block and flow diagrams of a distributed network management system.

Preferably, NMS programs and programs executing on network devices perform in expected ways (i.e., synchronously) and use the same data in the same way. To avoid having to manually synchronize all integration interfaces between the various programs, a logical system model and associated code generation system are used to generate application programming interfaces (APIs)—that is integration interfaces/integration points—for programs running on the network device and programs running within the NMS. In addition, the APIs for the programs managing the data repositories (e.g., database programs) used by the network device and NMS programs are also generated from the same logical system model and associated code generation system to ensure that the programs use the data in the same way. Further, to ensure that the NMS and network device programs for managing and operating the network device use the same data, the programs, including the NMS programs, access a single data repository for configuration information, for example, a configuration database within the network device. Referring to FIG. 2*a,* in the present invention, the NMS 60 includes one or more NMS client programs 850*a*–850*n* and one or more NMS server programs 851*a*–851*n,* The NMS client programs provide interfaces for network administrators. Through the NMS clients, the administrator may configure multiple network devices (e.g., computer system 10, FIG. 1; network device 540, FIG. 35). The NMS clients communicate with the NMS servers to provide the NMS servers with configuration requirements from the administrator. In addition, the NMS server provides the NMS client with network device management information, which the client then makes available to the administrator. "Pushing" data from a server to multiple clients synchronizes the clients with minimal polling. Reduced polling means less management traffic on the network and more device CPU cycles available for other management tasks. Communication between the NMS client and server is done via Remote Method Invocation (RMI) over Transmission Control Protocol (TCP), a reliable protocol that ensures no data loss.

The NMS client and server relationship prevents the network administrator from directly accessing the network device. Since several network administrators may be managing the network, this mitigates errors that may result if two administrators attempt to configure the same network device at the same time.

The present invention also includes a configuration relational database 42 within each network device and an NMS relational database 61 external to the network device. The configuration database program may be executed by a centralized processor card or a processor on another card (e.g., 12, FIG. 1; 542, FIG. 35) within the network device, and the NMS database program may be executed by a processor within a separate computer system (e.g., 62, FIG. 13*b*). The NMS server stores data directly in the configuration database via JAVA Database Connectivity (JDBC) over TCP, and using JDBC over TCP, the configuration database, through active queries, automatically replicates any changes to NMS database 61. By using JDBC and a relational database, the NMS server is able to leverage database transactions, database views, database journaling and database backup technologies that help provide unprecedented system availability. Relational database technology also scales well as it has matured over many years. An active query is a mechanism that enables a client to post a blocked SQL query for asynchronous notification by the database when data changes are made after the blocked SQL query was made.

Similarly, any configuration changes made by the network administrator directly through console interface 852 are made to the configuration database and, through active queries, automatically replicated to the NMS database. Maintaining a primary or master repository of data within each network device ensures that the NMS and network device are always synchronized with respect to the state of the configuration. Replicating changes made to the primary database within the network device to any secondary data repositories, for example, NMS database 61, ensures that all secondary data sources are quickly updated and remain in lockstep synchronization.

Instead of automatically replicating changes to the NMS database through active queries, only certain data, as configured by the network administrator, may be replicated. Similarly, instead of immediate replication, the network administrator may configure periodic replication. For example, data from the master embedded database (i.e., the configuration database) can be uploaded daily or hourly. In addition to the periodic, scheduled uploads, backup may be done anytime at the request of the network administrator.

Figure 35A:
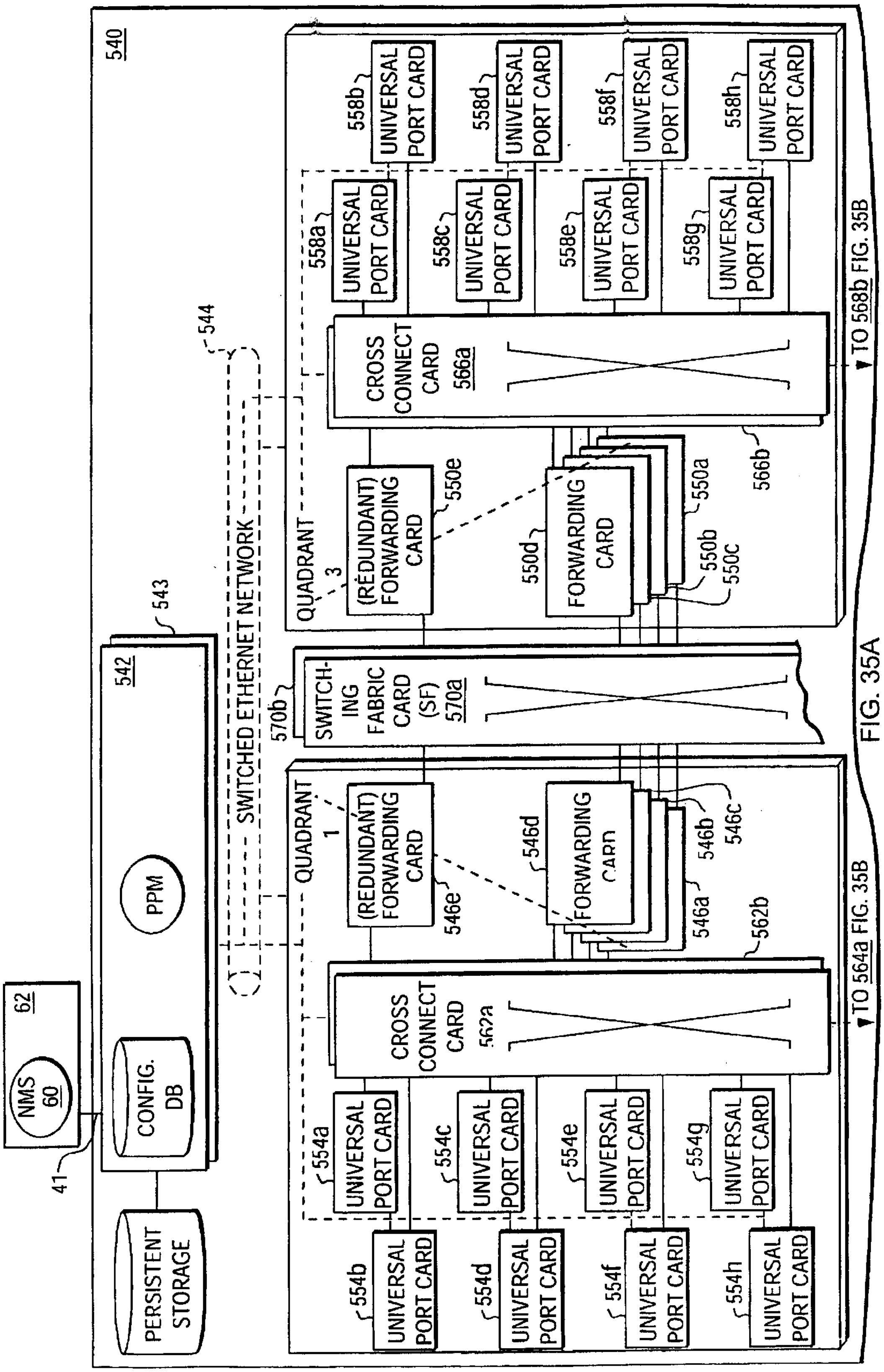
FIG. 35 is a block diagram of a network device.
Figure 35B:
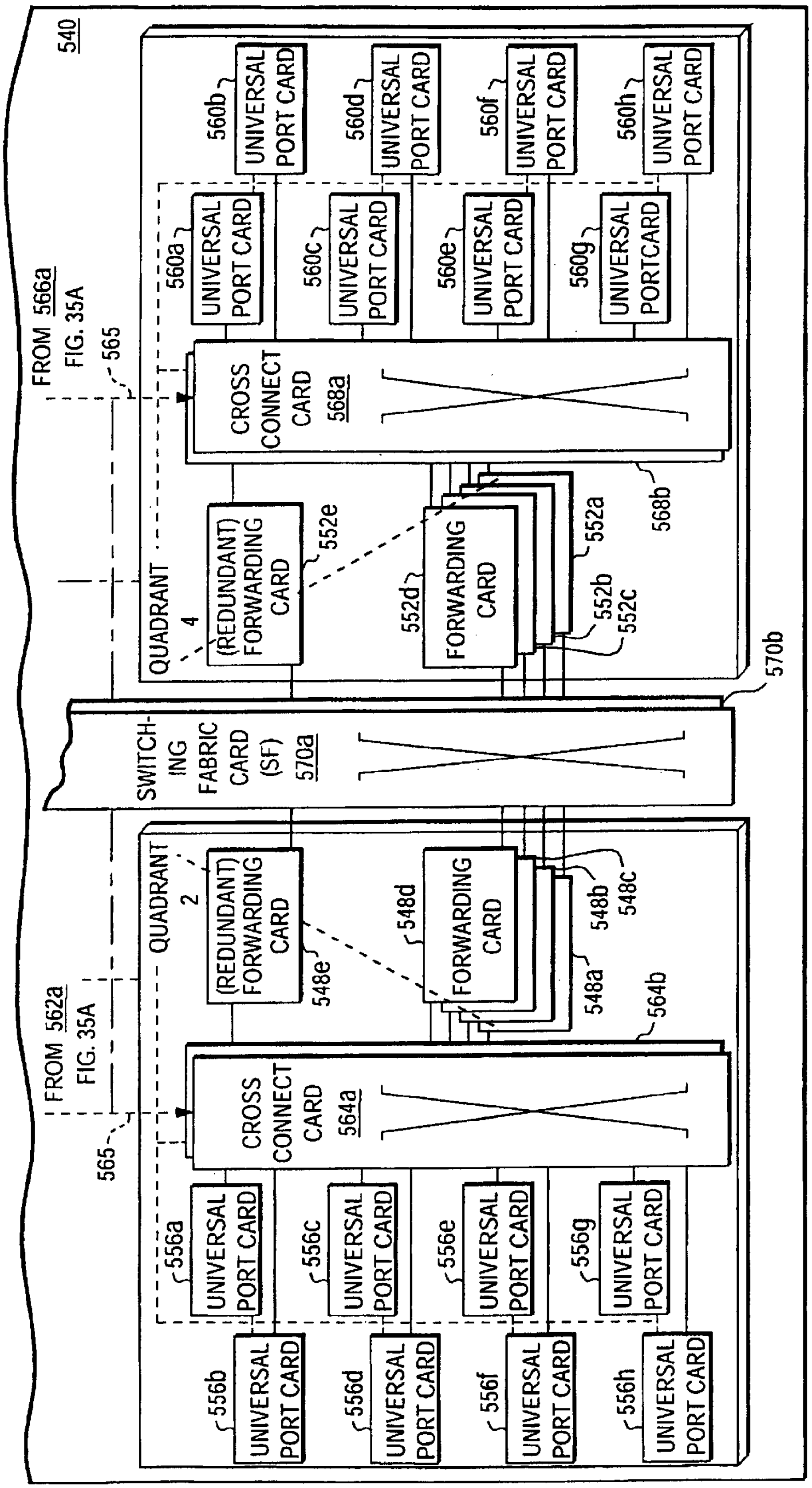

Referring again to FIG. 2*a,* for increased availability, the network device may include a backup configuration database 42' maintained by a separate, backup centralized processor card (e.g., 12, FIG. 1; 543, FIG. 35). Any changes to configuration database 42 are replicated to backup configuration database 42'. If the primary centralized processor card experiences a failure or error, the backup centralized processor card may be switched over to become the primary processor and configuration database 42' may be used to keep the network device operational. In addition, any changes to configuration database 42 may be written immediately to flash persistent memory 853 which may also be located on the primary centralized processor card or on another card, and similarly, any changes to backup configuration database 42' may be written immediately to flash persistent memory 853' which may also be located on the backup centralized processor card or another card. These flash-based configuration files protect against loss of data during power failures. In the unlikely event that all copies of the database within the network device are unusable, the data stored in the NMS database may be downloaded to the network device.

Figure 41A:
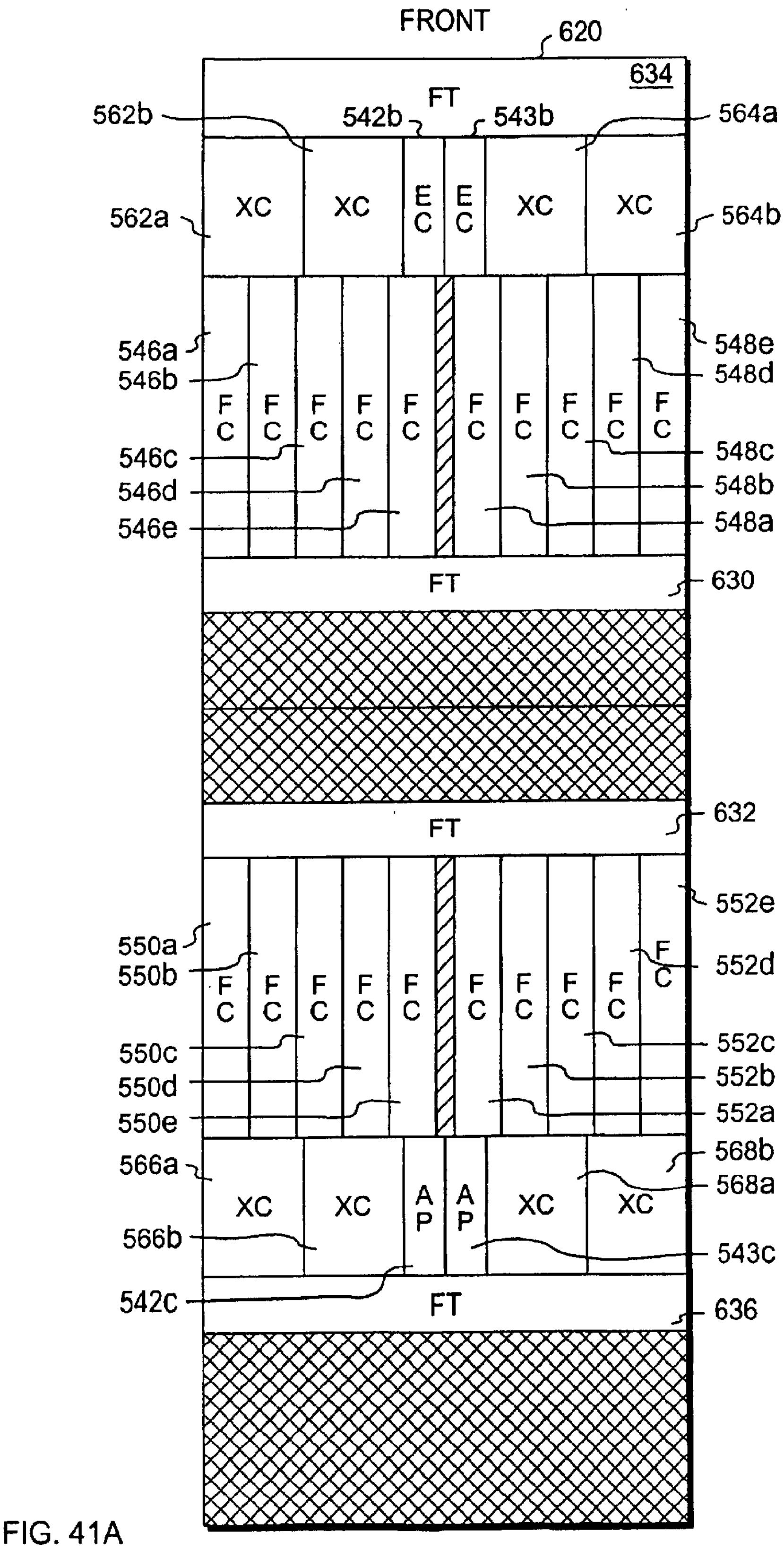
FIGS. 41*a*–41*c* are front, back and side block diagrams, respectively, of components and modules within the network device of FIG. 40.
Figure 41B:
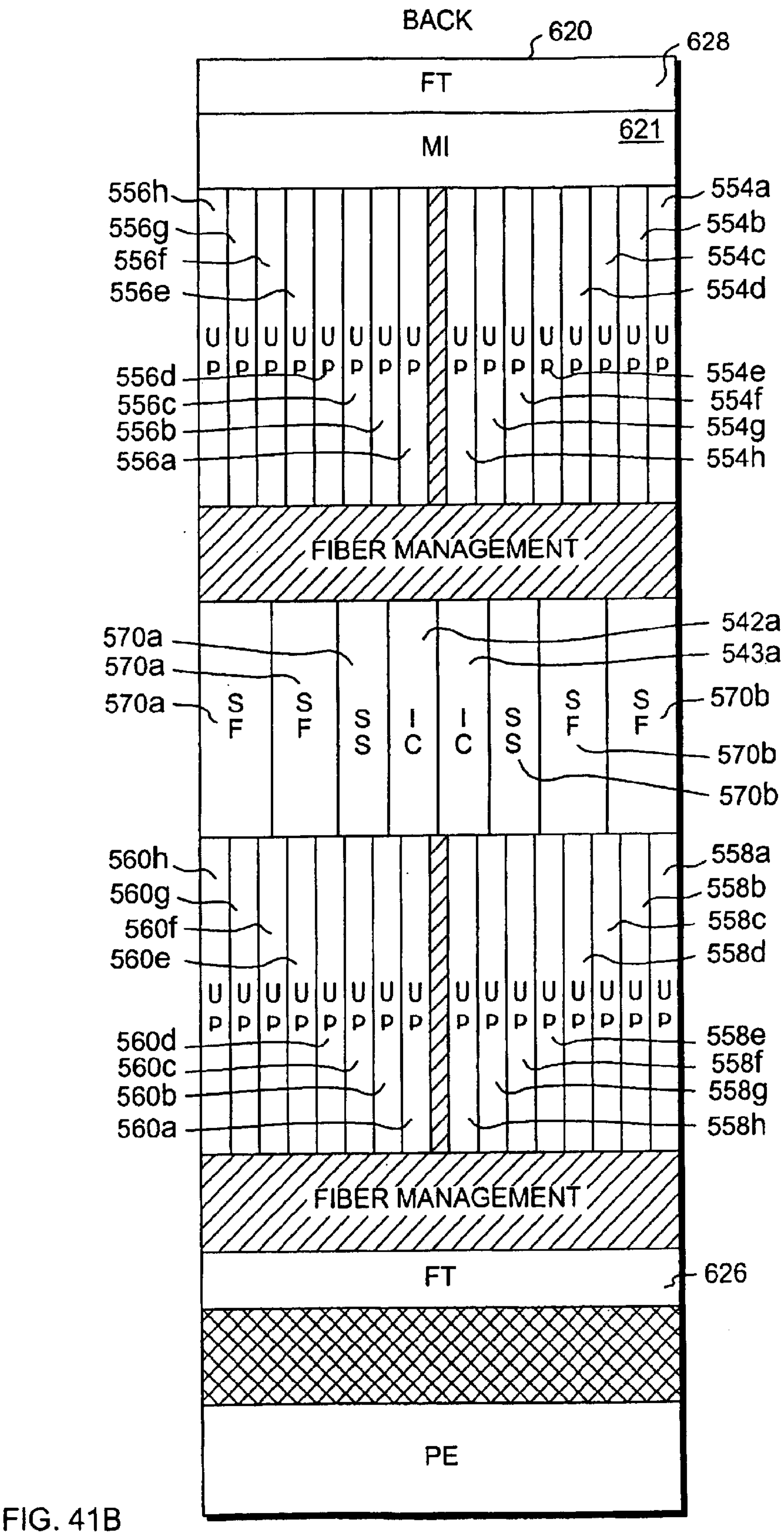

Instead of having a single central processor card (e.g., 12, FIG. 1; 543, FIG. 35), the external control functions and the internal control functions may be separated onto different cards as described in U.S. patent application Ser. No. 09/574,343, filed May 20, 2000 and entitled "Functional Separation of Internal and External Controls in Network Devices", which is hereby incorporated herein by reference. As shown in FIGS. 41*a* and 41*b,* the chassis may support internal control (IC) processor cards 542*a* and 543*a* and external control (EC) processor cards 542*b* and 543*b.* In this embodiment, configuration database 42 may be maintained by a processor on internal control processor card 542*a* and configuration database 42' may be maintained by a processor on internal control processor card 543*a,* and persistent memory 853 may be located on external control processor card 542*b* and persistent memory 853' may be located on external control processor card 543*b.* This increases intercard communication but also provides increased fault tolerance.

The file transfer protocol (FTP) may provide an efficient, reliable transport out of the network device for data intensive operations. Bulk data applications include accounting, historical statistics and logging. An FTP push (to reduce polling) may be used to send accounting, historical statistics and logging data to a data collector server 857, which may be a UNIX server. The data collector server may then generate network device and/or network status reports 858*a*–858*n* in, for example, American Standard Code for Information Interchange (ASCII) format and store the data into a database or generate Automatic Message Accounting Format (AMA/BAF) outputs.

Selected data stored within NMS database 61 may also be replicated to one or more remote/central NMS databases 854*a*–854*n,* as described below. NMS servers may also access network device statistics and status information stored within the network device using SNMP (multiple versions) traps and standard Management Information Bases (MIBs and MIB-2). The NMS server augments SNMP traps by providing them over the conventional User Datagram Protocol (UDP) as well as over Transmission Control Protocol (TCP), which provides reliable traps. Each event is generated with a sequence number and logged by the data collector server in a system log database for in place context with system log data. These measures significantly improve the likelihood of responding to all events in a timely manner reducing the chance of service disruption.

The various NMS programs—clients, servers, NMS databases, data collector servers and remote NMS databases—are distributed programs and may be executed on the same computer or different computers. The computers may be within the same LAN or WAN or accessible through the Internet. Distribution and hierarchy are fundamental to making any software system scale to meet larger needs over time. Distribution reduces resource locality constraints and facilitates flexible deployment. Since day-to-day management is done in a distributed fashion, it makes sense that the management software should be distributed. Hierarchy provides natural boundaries of management responsibility and minimizes the number of entities that a management tool must be aware of. Both distribution and hierarchy are fundamental to any long-term management solution. The client server model allows for increased scalability as servers and clients may be added as the number of network managers increase and as the network grows.

The various NMS programs may be written in the JAVA programming language to enable the programs to run on both Windows/NT and UNIX platforms, such as Sun Solaris. In fact the code for both platforms may be the same allowing consistent graphical interfaces to be displayed to the network administrator. In addition to being native to JAVA, RMI is attractive as the RMI architecture includes (RMI) over Internet Inter-Orb Protocol (IIOP) which delivers Common Object Request Broker Architecture (CORBA) compliant distributed computing capabilities to JAVA. Like CORBA, RMI over IIOP uses IIOP as its communication protocol. IIOP eases legacy application and platform integration by allowing application components written in C++, SmallTalk, and other CORBA supported languages to communicate with components running on the JAVA platform. For "manage anywhere" purposes and web technology integration, the various NMS programs may also run within a web browser. In addition, the NMS programs may integrate with Hewlett Packard's (HP's) Network Node Manager (NNM™) to provide the convenience of a network map, event aggregation/filtering, and integration with other vendor's networking. From HP NNM a context-sensitive launch into an NMS server may be executed.

The NMS server also keeps track of important statistics including average client/server response times and response times to each network device. By looking at these statistics over time, it is possible for network administrators to determine when it is time to grow the management system by adding another server. In addition, each NMS server gathers the name, IP address and status of other NMS servers in the telecommunication network, determines the number of NMS clients and network devices to which it is connected, tracks its own operation time, the number of transactions it has handled since initialization, determines the "top talkers" (i.e., network devices associated with high numbers of transactions with the server), and the number of communications errors it has experienced. These statistics help the network administrator tune the NMS to provide better overall management service.

NMS database 61 may be remote or local with respect to the network device(s) that it is managing. For example, the NMS database may be maintained on a computer system outside the domain of the network device (i.e., remote) and communications between the network device and the computer system may occur over a wide area network (WAN) or the Internet. Preferably, the NMS database is maintained on a computer system within the same domain as the network device (i.e., local) and communications between the network device and the computer system may occur over a local area network (LAN). This reduces network management traffic over a WAN or the Internet.

Figure 2B:
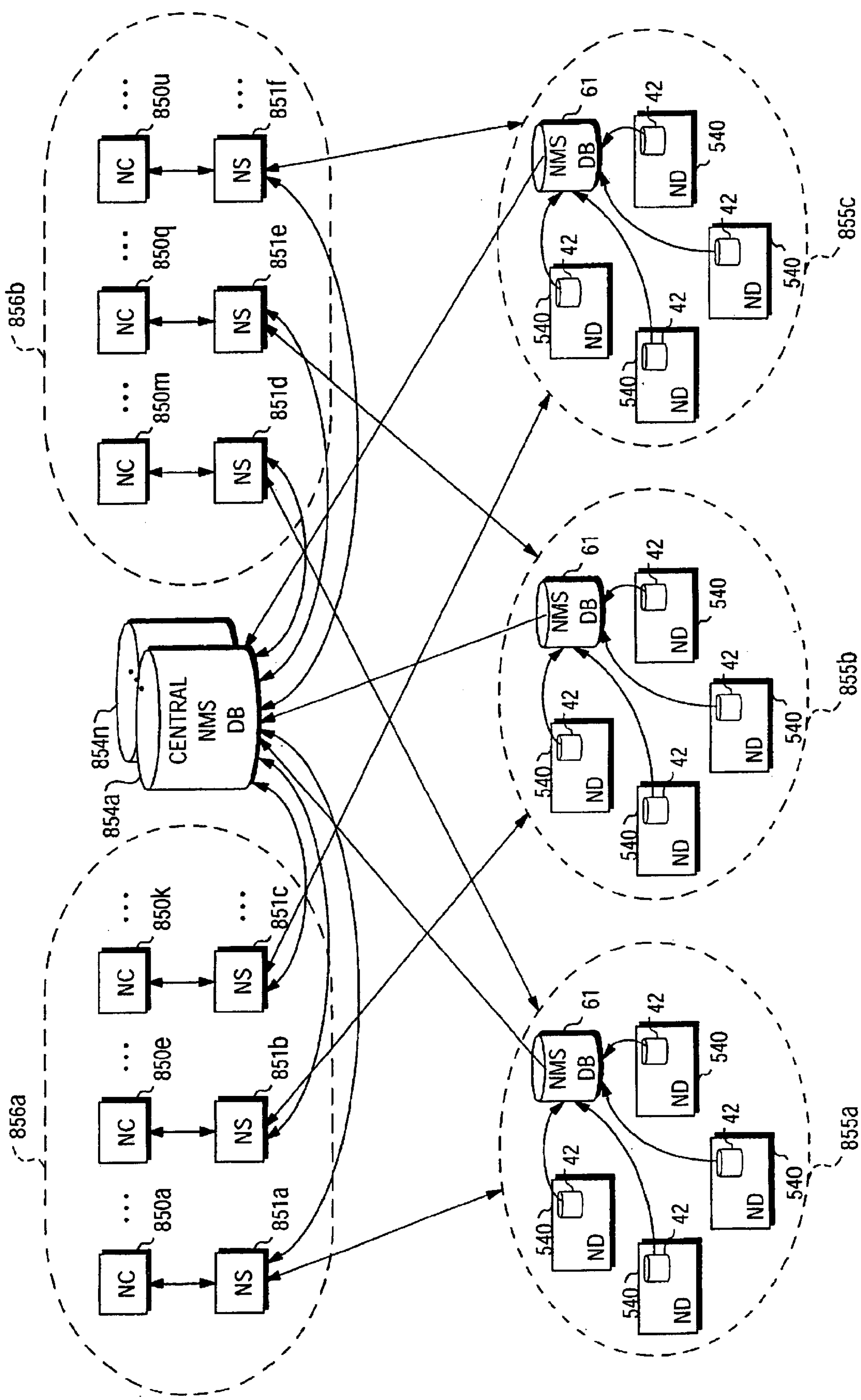

Many telecommunications networks include domains in various geographical locations, and network managers often need to see data combined from these different domains to determine how the overall network is performing. To assist with the management of wide spread networks and still minimize the network management traffic sent over WANs and the Internet, each domain may include an NMS database 61 and particular/selected data from each NMS database may be replicated (or "rolled up") to remote NMS databases 854*a*–854*n* that are in particular centralized locations. Referring to FIG. 2*b*, for example, a telecommunications network may include at least three LAN domains 855*a*–855*c* where each domain includes multiple network devices 540 and an NMS database 61. Domain 855*a* may be located in the Boston, Mass. area, domain 855*b* may be located in the Chicago, Ill. area and domain 855*c* may be located in the San Francisco, Calif. area. NMS servers 851*a*–851*f* may be located within each domain or in a separate domain. Similarly, one or more NMS clients may be coupled to each NMS server and located in the same domain as the NMS server or in different domains. In addition, one NMS client may be coupled with multiple NMS servers. For example, NMS servers 851*a*–851*c* and NMS clients 850*a*–850*k* may be located in domain 856*a* (e.g., Dallas, Tex.) while NMS servers 851*d*–851*f* and NMS clients 850*m*–850*u* may be located in domain 856*b* (e.g., New York, N.Y.). Each NMS server may be used to manage each domain 855*a*–855*c* or, preferably, one NMS server in each server domain 856*a*–856*b* is used to manage all of the network devices within one network device domain 855*a*–855*c*. A single domain may include network devices and NMS clients and servers.

Network administrators use the NMS clients to configure network devices in each of the domains through the NMS servers. The network devices replicate changes made to their internal configuration databases (42, FIG. 2*a*) to a local NMS database 61. In addition, the data collector server copies all logging data into NMS database 61 or a separate logging database (not shown). Each local NMS database may also replicate selected data to central NMS database(s) 854*a*–854*n* in accordance with instructions from the network administrator. Other programs may then access the central database to retrieve and combine data from multiple network devices in multiple domains and then present this data to the network administrator. Importantly, network management traffic over WANs and the Internet are minimized since all data is not copied to the central NMS database. For example, local logging data may only be stored in the local NMS databases 61 (or local logging database) and not replicated to one of the central NMS database.

Logical System Model

As previously mentioned, to avoid having to manually synchronize all integration interfaces between the various programs, the APIs for both NMS and network device programs are generated using a code generation system from the same logical system model. In addition, the APIs for the data repository software used by the programs are also generated from the same logical system model to ensure that the programs use the data in the same way. Each model within the logical system model contains metadata defining an object/entity, attributes for the object and the object's relationships with other objects. Upgrading/modifying an object is, therefore, much simpler than in current systems, since the relationship between objects, including both hardware and software, and attributes required for each object are clearly defined in one location. When changes are made, the logical system model clearly shows what other programs are affected and, therefore, may also need to be changed. Modeling the hardware and software provides a clean separation of function and form and enables sophisticated dynamic software modularity.

A code generation system uses the attributes and metadata within each model to generate the APIs for each program and ensure lockstep synchronization. The logical model and code generation system may also be used to create test code to test the network device programs and NMS programs. Use of the logical model and code generation system saves development, test and integration time and ensures that all relationships between programs are in lockstep synchronization. In addition, use of the logical model and code generation system facilitates hardware portability, seamless extensibility and unprecedented availability and modularity.

Figure 3A:
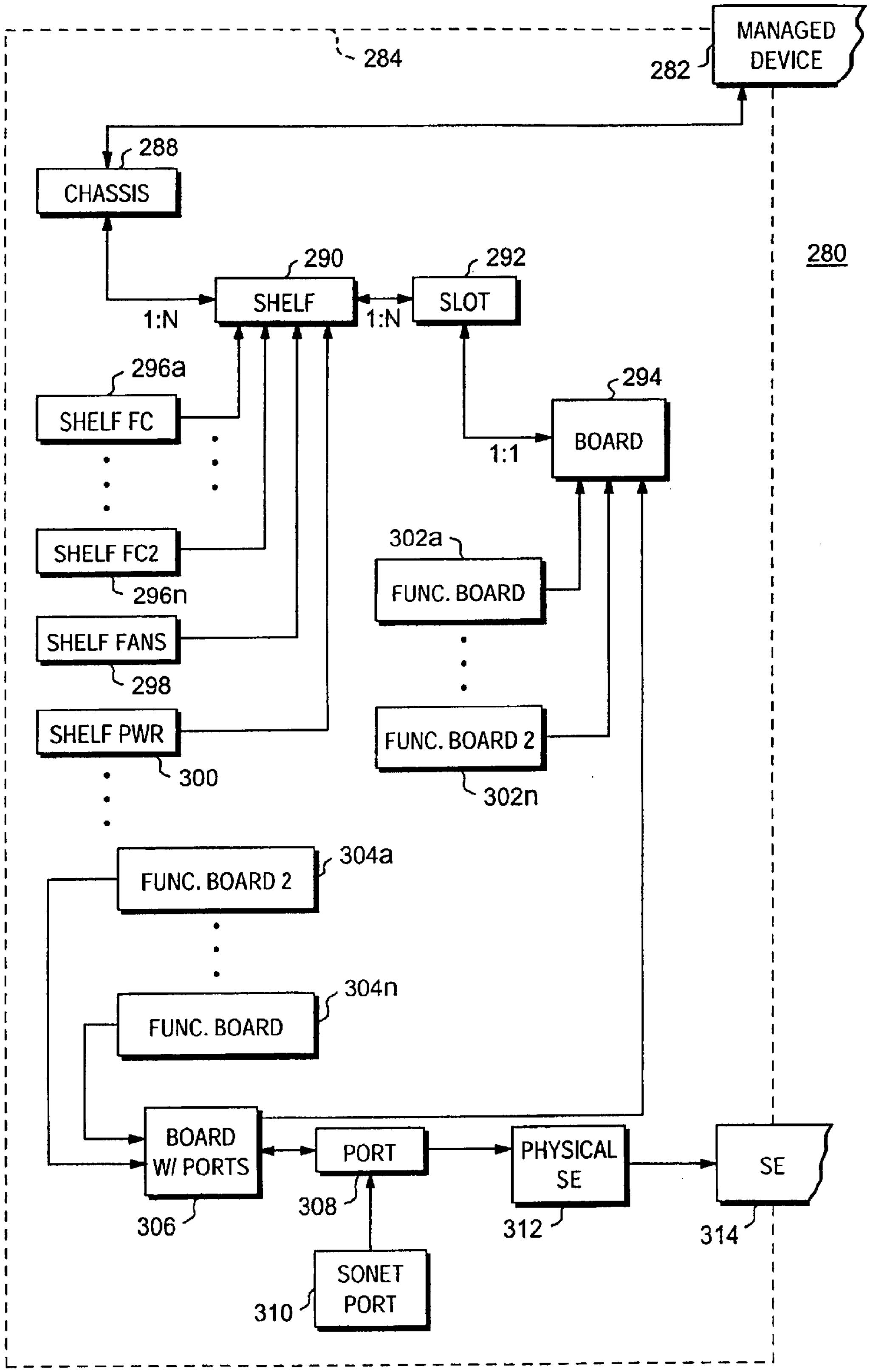
FIG. 3*a* is a block diagram of a logical system model.
Figure 3A:
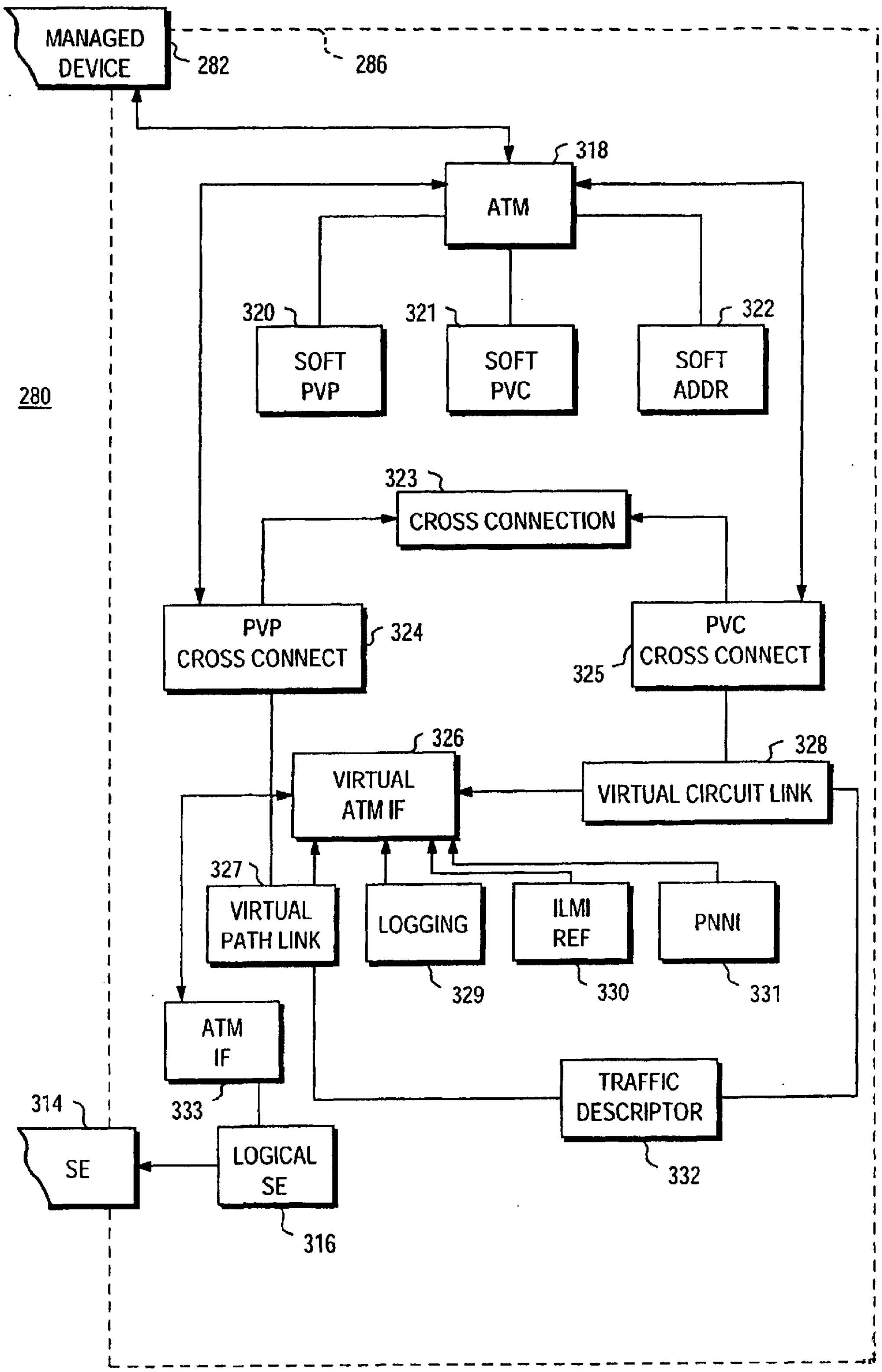

Referring to FIG. 3*a*, a logical system model 280 is created using the object modeling notation and a model generation tool, for example, Rational Rose 2000 Modeler Edition available from Rational Software Corporation in Lexington, Mass. A managed device 282 represents the top level system connected to models representing both hardware 284 and data objects used by software applications 286. Hardware model 284 includes models representing specific pieces of hardware, for example, chassis 288, shelf 290, slot 292 and printed circuit board 294. The logical model is capable of showing containment, that is, typically, there are many shelves per chassis (1:N), many slots per shelf (1:N) and one board per slot (1:1). Shelf 290 is a parent class generalizing multiple shelf models, including various functional shelves 296*a*–296*n* as well as one or more system shelves, for example, for fans 298 and power 300. Board 294 is also a parent class having multiple board models, including various functional boards without external physical ports 302*a*–302*n* (e.g., central processor 12, FIG. 1; 542–543, FIG. 35; and switch fabric cards, FIG. 35) and various functional boards 304*a*–304*n* (e.g., cross connection cards 562*a*–562*b* and forwarding cards 546*a*–546*e*, FIG. 35) that connect to boards 306 with external physical ports (e.g., universal port cards 554*a*–554*h*, FIG. 35). Hardware model 284 also includes an external physical port model 308. Port model 308 is coupled to one or more specific port models, for example, synchronous optical network (SONET) protocol port 310, and a physical service endpoint model 312.

Hardware model 284 includes models for all hardware that may be available on computer system 10 (FIG. 1)/network device 540 (FIG. 35) whether a particular computer system/network device uses all the available hardware or not. The model defines the metadata for the system whereas the presence of hardware in an actual network device is represented in instance data. All shelves and slots may not be populated. In addition, there may be multiple chassis. It should be understood that SONET port 310 is an example of one type of port that may be supported by computer system 10. A model is created for each type of port available on computer system 10, including, for example, Ethernet, Dense Wavelength Division Multiplexing (DWDM) or Digital Signal, Level 3 (DS3). The NMS (described below) uses the hardware model and instance data to display a graphical picture of computer system 10/network device 540 to a user.

Service endpoint model 314 spans the software and hardware models within logical model 280. It is a parent class including a physical service endpoint model 312 and a logical service endpoint model 316. Since the links between the software model and hardware model are minimal, either may be changed (e.g., upgraded or modified) and easily integrated with the other. In addition, multiple models (e.g., 280) may be created for many different types of managed devices (e.g., 282). The software model may be the same or similar for each different type of managed device even if the hardware—and hardware models—corresponding to the different managed devices are very different. Similarly, the hardware model may be the same or similar for different managed devices but the software models may be different for each. The different software models may reflect different customer needs.

Software model 286 includes models of data objects used by each of the software processes (e.g., applications, device drivers, system services) available on computer system 10/network device 540. All applications and device drivers may not be used in each computer system/network device. As one example, ATM model 318 is shown. It should be understood that software model 286 may also include models for other applications, for example, Internet Protocol (IP) applications, Frame Relay and Multi-Protocol Label Switching (MPLS) applications. Models of other processes (e.g., device drivers and system services) are not shown for convenience.

For each process, models of configurable objects managed by those processes are also created. For example, models of ATM configurable objects are coupled to ATM model 318, including models for a soft permanent virtual path (SPVP) 320, a soft permanent virtual circuit (SPVC) 321, a switch address 322, a cross-connection 323, a permanent virtual path (PVP) cross-connection 324, a permanent virtual circuit (PVC) cross-connection 325, a virtual ATM interface 326, a virtual path link 327, a virtual circuit link 328, logging 329, an ILMI reference 330, PNNI 331, a traffic descriptor 332, an ATM interface 333 and logical service endpoint 316. As described above, logical service endpoint model 316 is coupled to service endpoint model 314. It is also coupled to ATM interface model 333.

The logical model is layered on the physical computer system to add a layer of abstraction between the physical system and the software applications. Adding or removing known (i.e., not new) hardware from the computer system will not require changes to the logical model or the software applications. However, changes to the physical system, for example, adding a new type of board, will require changes to the logical model. In addition, the logical model is modified when new or upgraded processes are created. Changes to an object model within the logical model may require changes to other object models within the logical model. It is possible for the logical model to simultaneously support multiple versions of the same software processes (e.g., upgraded and older). In essence, the logical model insulates software applications from changes to the hardware models and vice-versa.

To further decouple software processes from the logical model—as well as the physical system—another layer of abstraction is added in the form of version-stamped views. A view is a logical slice of the logical model and defines a particular set of data within the logical model to which an associated process has access. Version stamped views allow multiple versions of the same process to be supported by the same logical model since each version-stamped view limits the data that a corresponding process "views" or has access to, to the data relevant to the version of that process. Similarly, views allow multiple different processes to use the same logical model.

Code Generation System

Figure 3B:
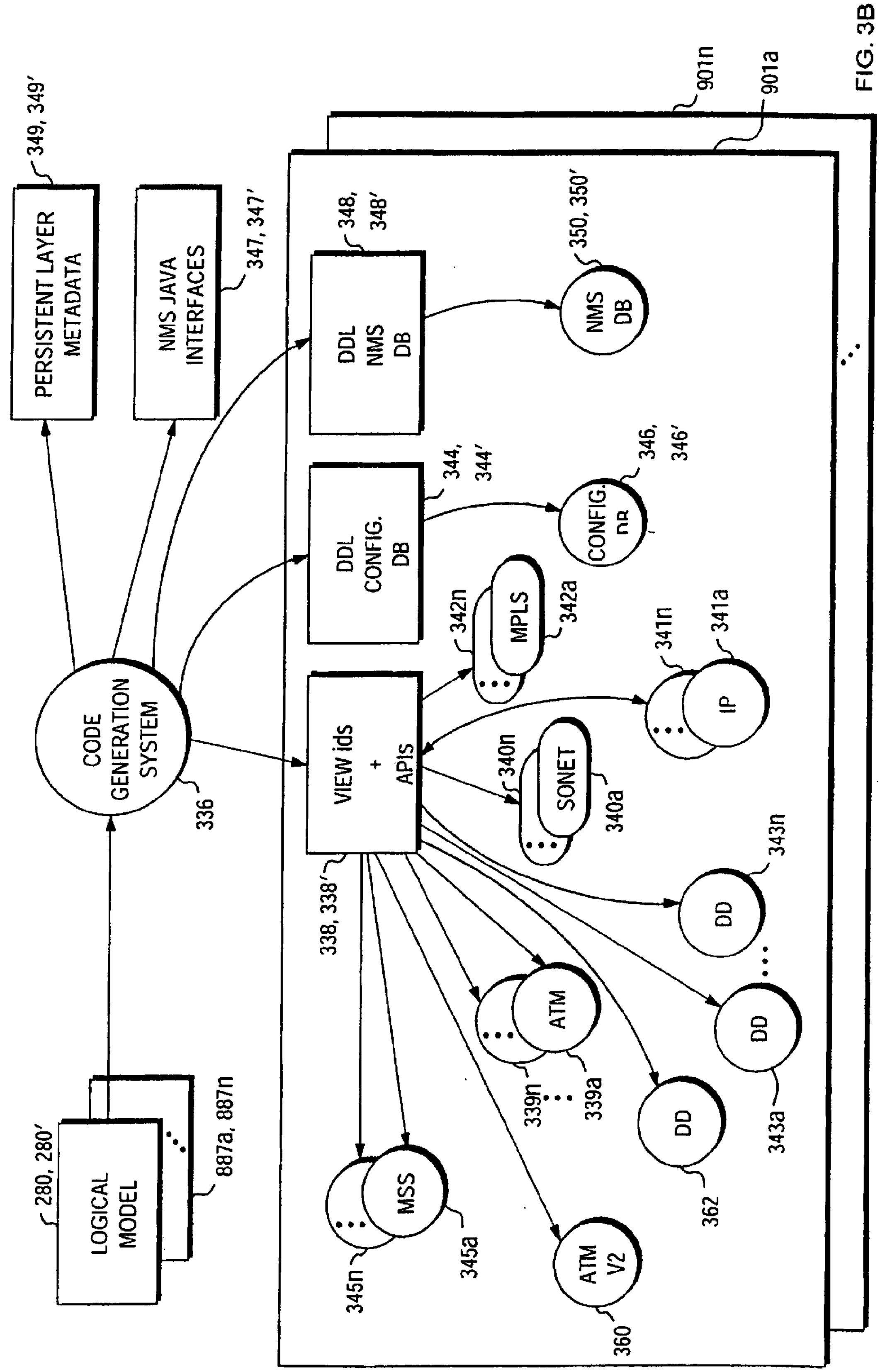
FIGS. 3*b* and 3*d*–3*d* are flow diagrams depicting a software build process using a logical system model.

Referring to FIG. 3*b*, logical model 280 is used as input to a code generation system 336. The code generation system creates a view identification (id) and an application programming interface (API) 338 for each process that requires configuration data. For example, a view id and an API may be created for each ATM application 339*a*–339*n*, each SONET application 340*a*–340*n*, each MPLS application 342*a*–342*n* and each IP application 341*a*–341*n*. In addition, a view id and API is also created for each device driver process, for example, device drivers 343*a*–343*n*, and for modular system services (MSS) 345*a*–345*n* (described below), for example, a Master Control Driver (MCD), a System Resiliency Manager (SRM), and a Software Management System (SMS). The code generation system provides data consistency across processes, centralized tuning and an abstraction of embedded configuration and NMS databases (described below) ensuring that changes to their database schema (i.e., configuration tables and relationships) do not affect existing processes.

The code generation system also creates a data definition language (DDL) file 344 including structured query language (SQL) commands used to construct the database schema, that is, the various tables and views within a configuration database 346, and a DDL file 348 including SQL commands used to construct various tables and SQL views within a network management (NMS) database 350 (described below). This is also referred to as converting the logical model into a database schema and various SQL views look at particular portions of that schema within the database. If the same database software is used for both the configuration and NMS databases, then one DDL file may be used for both.

The databases do not have to be generated from a logical model for views to work. Instead, database files can be supplied directly without having to generate them using the code generation system. Similarly, instead of using a logical model as an input to the code generation system, a MIB "model" may be used. For example, relationships between various MIBs and MIB objects may be written (i.e., coded) and then this "model" may be used as input to the code generation system.

Figure 3C:
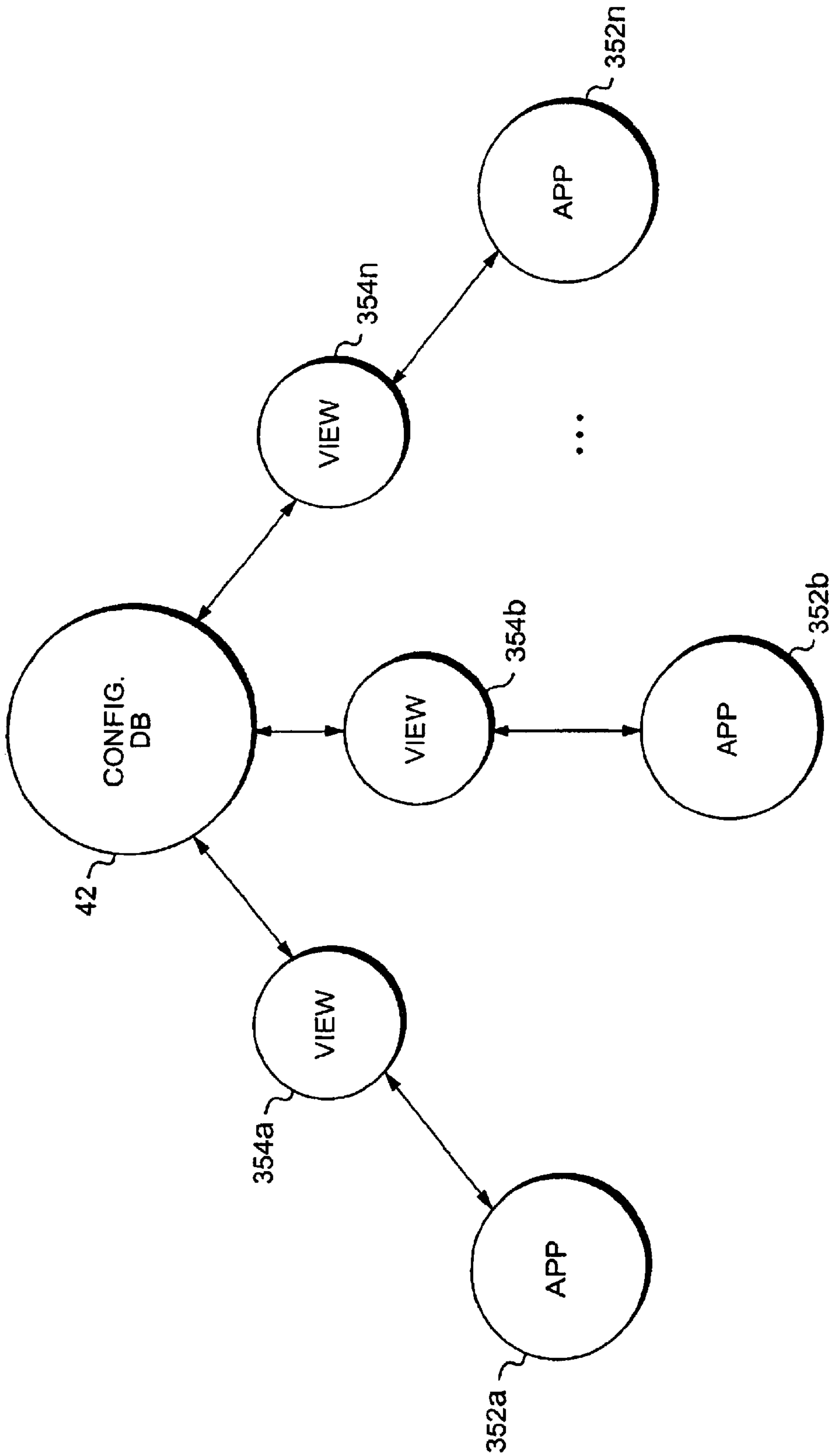
FIG. 3*c* is a flow diagram illustrating a method for allowing applications to view data within a database.

Referring to FIG. 3*c*, applications 352*a*–352*n* (e.g., SONET driver 863, SONET application 860, MSS 866, etc.) each have an associated view 354*a*–354*n* of configuration database 42. The views may be similar allowing each application to view similar data within configuration database 42. For example, each application may be ATM version 1.0 and each view may be ATM view version 1.3. Instead, the applications and views may be different versions. For example, application 352*a* may be ATM version 1.0 and view 354*a* may be ATM view version 1.3 while application 352*b* is ATM version 1.7 and view 354*b* is ATM view version 1.5. A later version, for example, ATM version 1.7, of the same application may represent an upgrade of that application and its corresponding view allows the upgraded application access only to data relevant to the upgraded version and not data relevant to the older version. If the upgraded version of the application uses the same configuration data as an older version, then the view version may be the same for both applications. In addition, application 352*n* may represent a completely different type of application, for example, MPLS, and view 354*n* allows it to have access to data relevant to MPLS and not ATM or any other application. Consequently, through the use of database views, different versions of the same software applications and different types of software applications may be executed on computer system 10 simultaneously.

Views also allow the logical model and physical system to be changed, evolved and grown to support new applications and hardware without having to change existing applications. In addition, software applications may be upgraded and downgraded independent of each other and without having to re-boot computer system 10/network device 540. For example, after computer system 10 is shipped to a customer, changes may be made to hardware or software. For instance, a new version of an application, for example, ATM version 2.0, may be created or new hardware may be released requiring a new or upgraded device driver process. To make this a new process and/or hardware available to the user of computer system 10, first the software image including the new process must be re-built.

Referring again to FIG. 3*b,* logical model 280 may be changed (280') to include models representing the new software and/or hardware. Code generation system 336 then uses new logical model 280' to re-generate view ids and APIs 338' for each application, including, for example, ATM version two 360 and device driver 362, and DDL files 344' and 348'. The new application(s) and/or device driver(s) processes then bind to the new view ids and APIs. A copy of the new application(s) and/or device driver process as well as the new DDL files and any new hardware are sent to the user of computer system 10. The user can then download the new software and plug the new hardware into computer system 10. The upgrade process is described in more detail below. Similarly, if models are upgraded/modified to reflect upgrades/modifications to software or hardware, then the new logical model is provided to the code generation system which re-generates view ids and APIs for each process/program/application. Again, the new applications are linked with the new view ids and APIs and the new applications and/or hardware are provided to the user.

Again referring to FIG. 3*b,* the code generation system also creates NMS JAVA interfaces 347 and persistent layer metadata 349. The JAVA interfaces are JAVA class files including get and put methods corresponding to attributes within the logical model, and as described below, the NMS servers use the NMS JAVA interfaces to construct models of each particular network device to which they are connected. Also described below, the NMS servers use the persistent layer metadata as well as run time configuration data to generate SQL configuration commands for use by the configuration database.

Figure 3D:
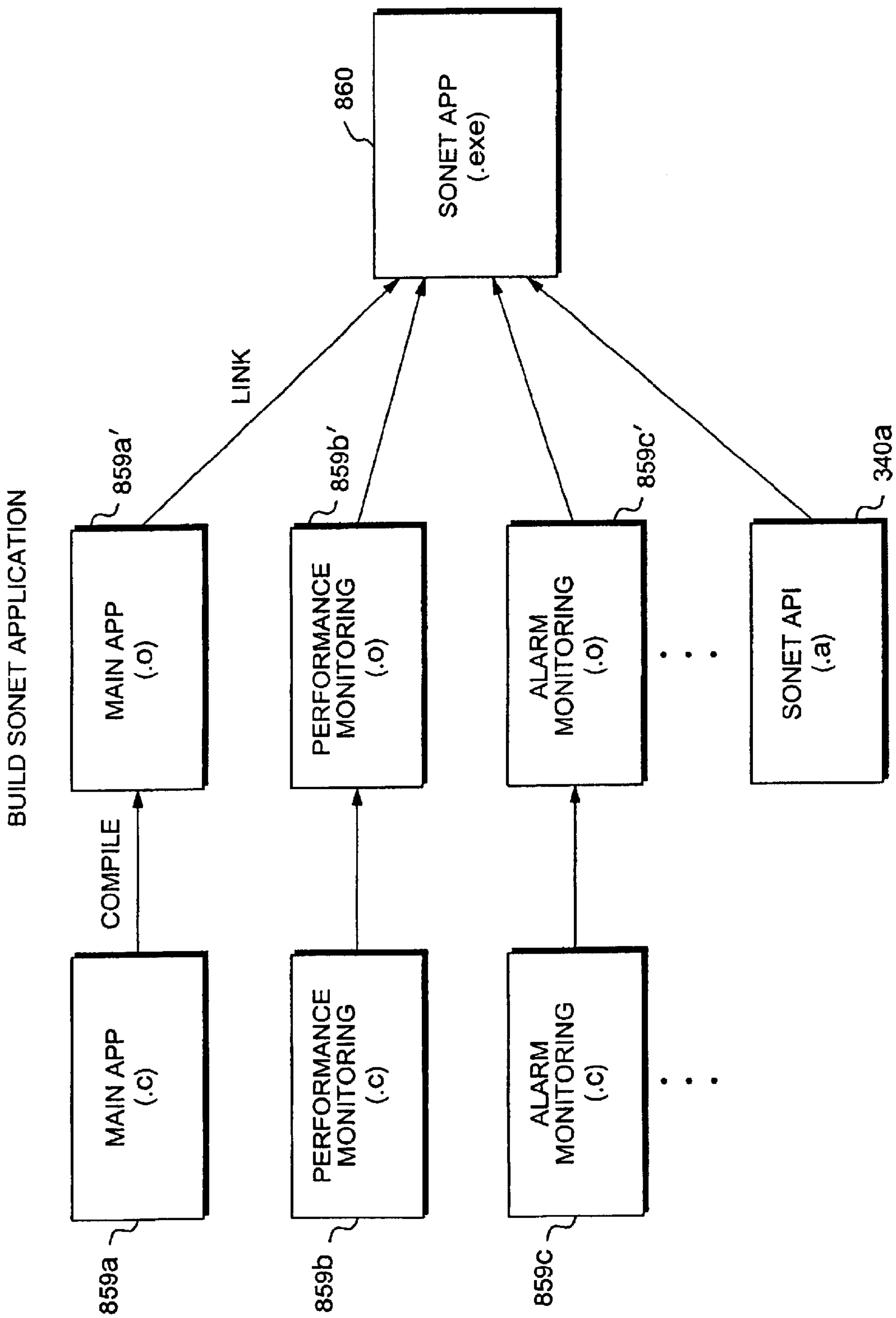

Prior to shipping computer system 10 to customers, a software build process is initiated to establish the software architecture and processes. The code generation system is the first part of this process. Following the execution of the code generation system, each process when pulled into the build process links the associated view id and API into its image. For example, referring to FIG. 3*d,* to build a SONET application, source files, for example, a main application file 859*a,* a performance monitoring file 859*b* and an alarm monitoring file 859*c,* written in, for example, the C programming language (.c) are compiled into object code files (.o) 859*a*', 859*b*' and 859*c*'. Alternatively, the source files may be written in other programming languages, for example, JAVA (.java) or C++ (.cpp). The object files are then linked along with view ids and APIs from the code generation system corresponding to the SONET application, for example, SONET API 340*a*. The SONET API may be a library (.a) of many object files. Linking these files generates the SONET Application executable file (.exe) 860.

Figure 3E:
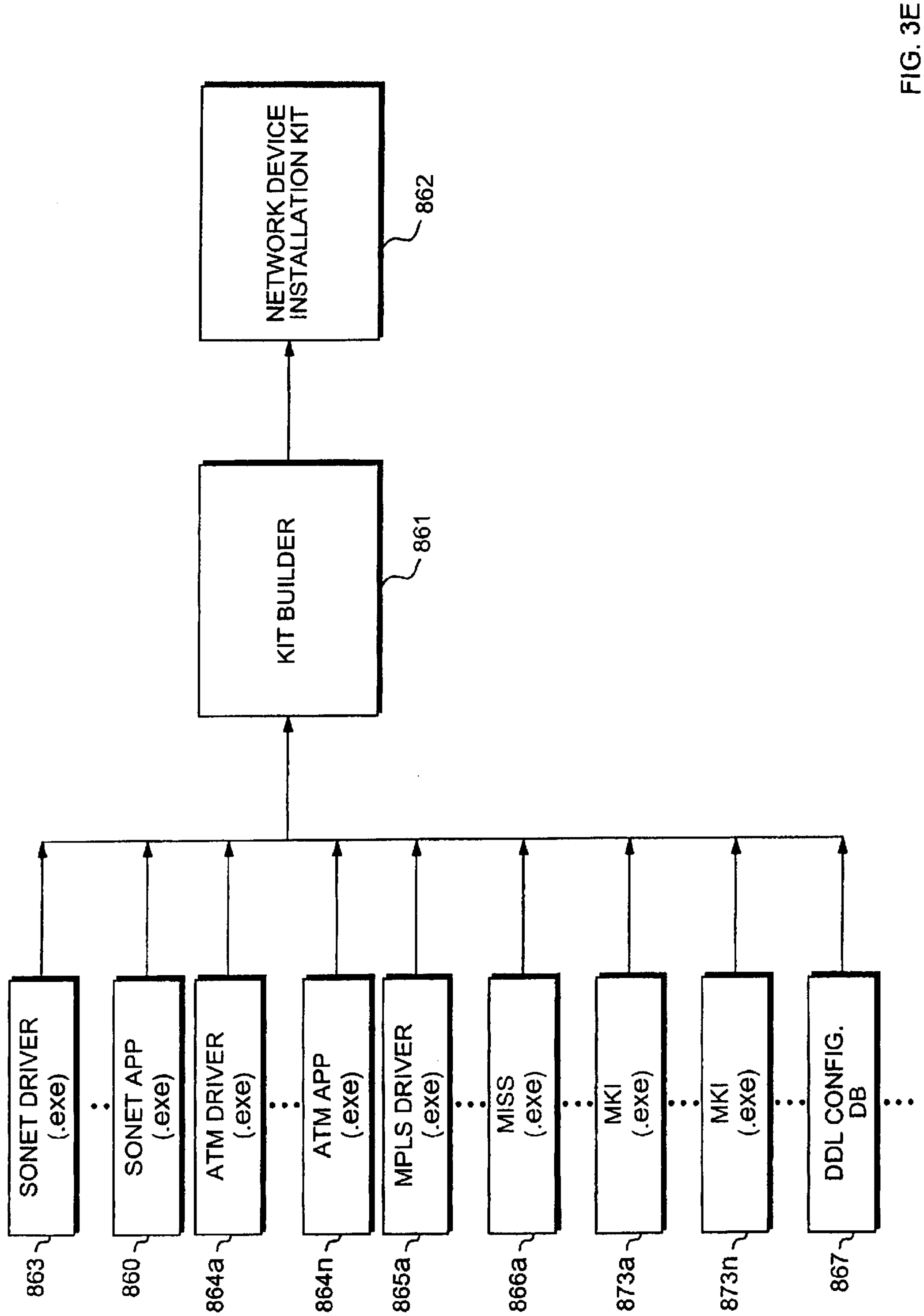
FIG. 3*g* is a flow diagram depicting a configuration process.
FIGS. 3*h* and 3*j* are flow diagrams depicting template driven network services provisioning processes.
FIGS. 3*i* and 3*k*–3*m* are screen displays of an OSS client and various templates.

Referring to FIG. 3*e,* each of the executable files for use by the network device/computer system are then provided to a kit builder 861. For example, several SONET executable files (e.g., 860, 863), ATM executable files (e.g., 864*a*–864*n*), MPLS executable files (e.g., 865*a*–865*n*), MSS executable files 866*a*–866*n,* MKI executable 873*a*–873*n* files for each board and a DDL configuration database executable file 867 may be provided to kit builder 861. The OSE operating system expects executable load modules to be in a format referred to as Executable & Linkable Format (.elf). Alternatively, the DDL configuration database executable file may be executed and some data placed in the database prior to supplying the DDL file to the kit builder. The kit builder creates a computer system/network device installation kit 862 that is shipped to the customer with the computer system/network device or, later, alone after modifications and upgrades are made. To save space, the kit builder may compress each of the files included in the Installation Kit (i.e., .exe.gz, .elf.gz), and when the files are later loaded in the network device, they are de-compressed.

Figure 3F:
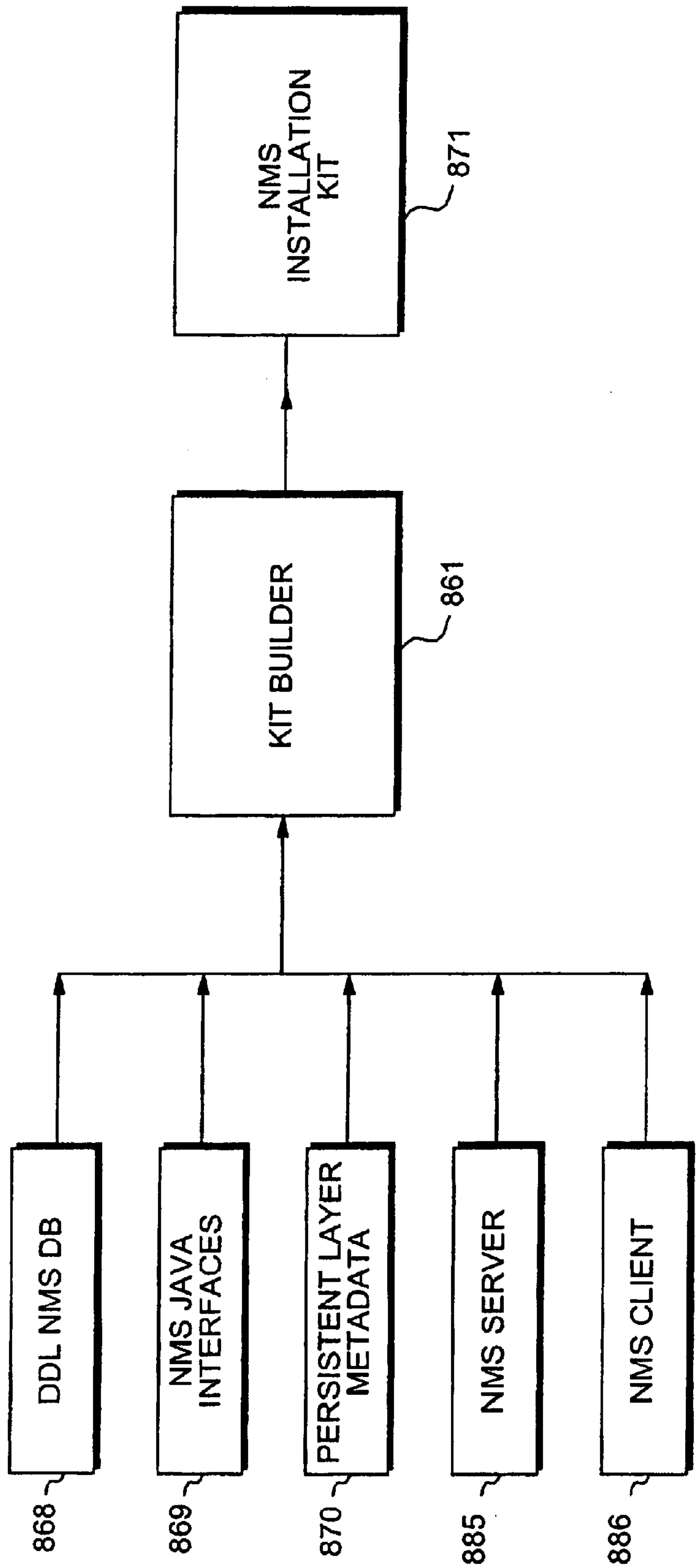
Figure 13A:
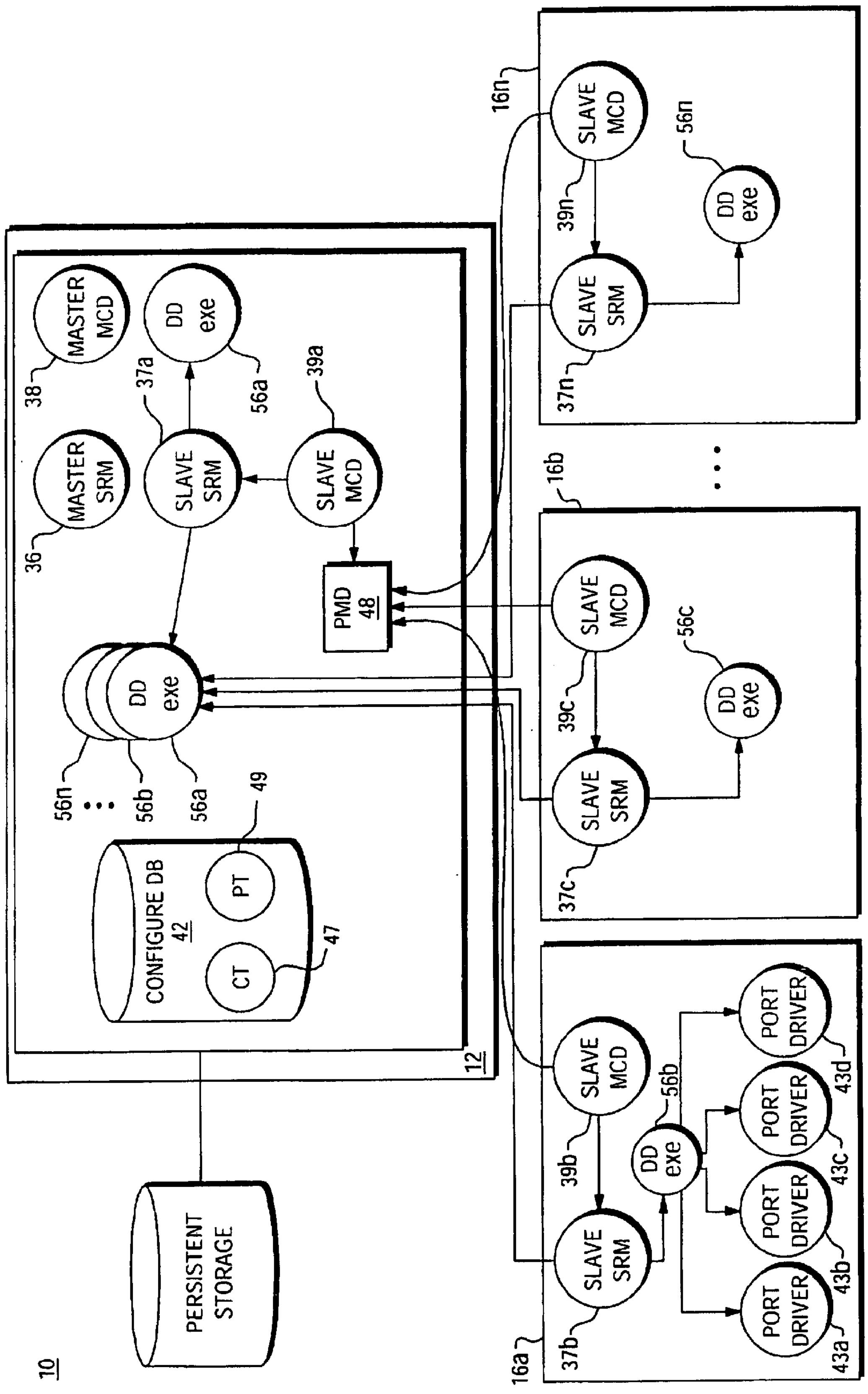
Figure 13B:
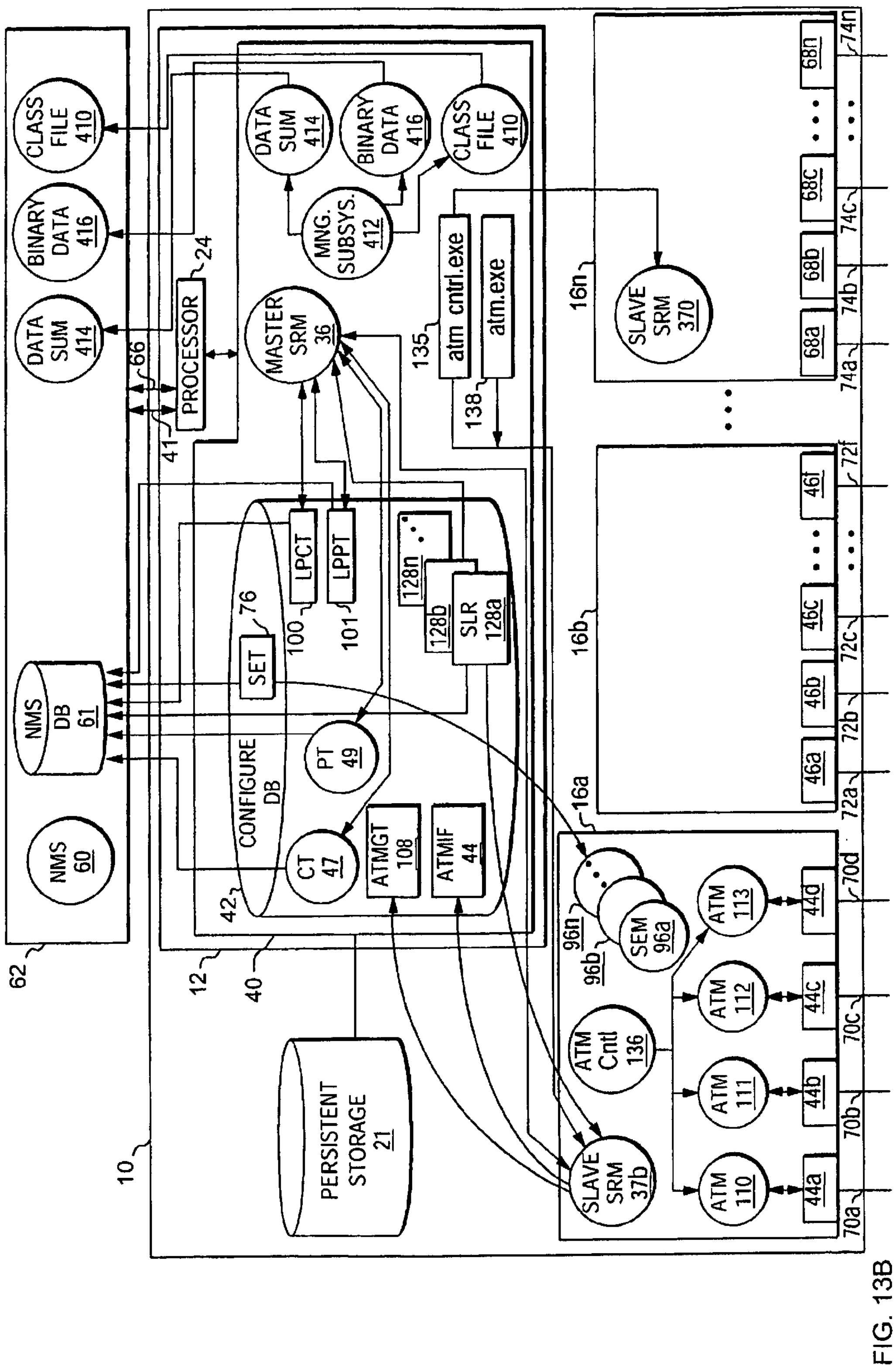
FIG. 13*b* is a block and flow diagram of a computer system incorporating a modular system architecture and illustrating a method for configuring the computer system using a network management system.

Referring to FIG. 3*f,* similarly, each of the executable files for the NMS is provided separately to the kit builder. For example, a DDL NMS database executable file 868, an NMS JAVA interfaces executable file 869, a persistent layer metadata executable file 870, an NMS server 885 and an NMS client 886 may be provided to kit builder 861. The kit builder creates an NMS installation kit 871 that is shipped to the customer for installation on a separate computer 62 (FIG. 13*b*). In addition, new versions of the NMS installation kit may be sent to customers later after upgrades/modifications are made. When installing the NMS, the customer/network administrator may choose to distribute the various NMS processes as described above. Alternatively, one or more of the NMS programs, for example, the NMS JAVA interfaces and Persistent layer metadata executable files may be part of the network device installation kit and later passed from the network device to the NMS server, or part of both the network device installation kit and the NMS installation kit.

When the computer system is powered-up for the first time, as described below, configuration database software uses DDL file 867 to create a configuration database 42 with the necessary configuration tables and active queries. The NMS database software uses DDL file 868 to create NMS database 61 with corresponding configuration tables. Memory and storage space within network devices is typically very limited. The configuration database software is robust and takes a considerable amount of these limited resources but provides many advantages as described below.

As described above, logical model 280 (FIG. 3*b*) may be provided as an input to code generation system 336 in order to generate database views and APIs for NMS programs and network device programs to synchronize the integration interfaces between those programs. Where a telecommunications network includes multiple similar network devices, the same installation kit may be used to install software on each network device to provide synchronization across the network. Typically, however, networks include multiple different network devices as well as multiple similar network devices. A logical model may be created for each different type of network device and a different installation kit may be implemented on each different type of network device.

Instead, of providing a logical model (e.g., 280, FIG. 3b) that represents a single network device, a logical model may be provided that represents multiple different managed devices—that is, multiple network devices and the relationship between the network devices. Alternatively, multiple logical models 280 and 887a–887n—representing multiple network devices—may be provided, including relationships with other logical models. In either case, providing multiple logical models or one logical model representing multiple network devices and their relationships as an input(s) to the code generation system allows for synchronization of NMS programs and network device programs (e.g., 901a–901n) across an entire network. The code generation system in combination with one or more logical models provides a powerful tool for synchronizing distributed telecommunication network applications.

The logical model or models may also be used for simulation of a network device and/or a network of many network devices, which may be useful for scalability testing.

In addition to providing view ids and APIs, the code generation system may also provide code used to push data directly into a third party code API. For example, where an API of a third party program expects particular data, the code generation system may provide this data by retrieving the data from the central repository and calling the third-party programs API. In this situation, the code generation system is performing as a "data pump".

Configuration

Figure 4A:
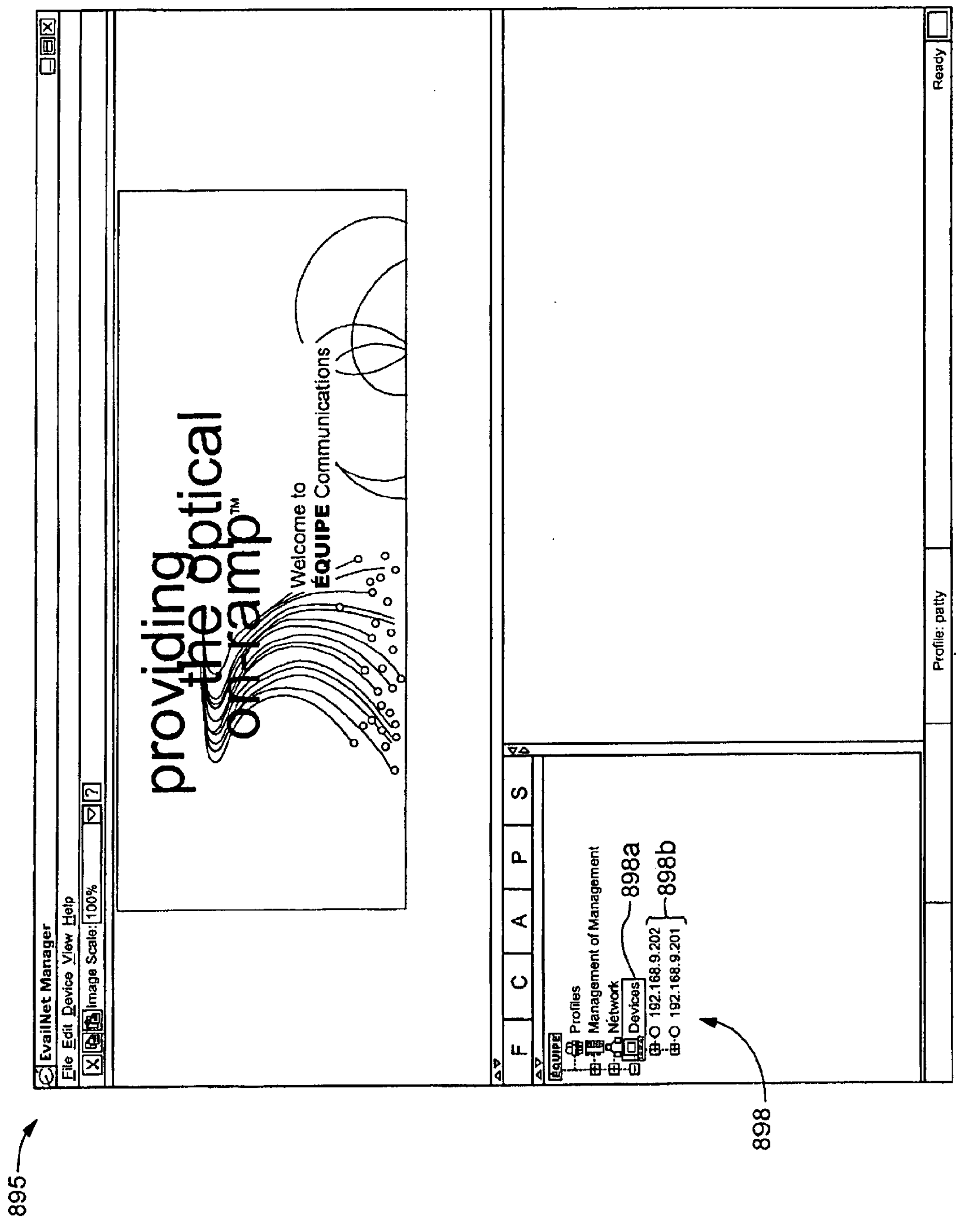
FIGS. 4*a*–4*z*, 5*a*–5*z*, 6*a*–6*p*, 7*a*–7*y*, 8*a*–8*e*, 9*a*–9*n*, 10*a*–10*i*, 11*a*–11*k*, 11*n*–11*o*, 11*s* and 11*x* are screen displays of graphical user interfaces.

Once the network device programs have been installed on-network device 540 (FIG. 35), and the NMS programs have been installed on one or more computers (e.g., 62), the network administrator may configure the network device/provision services within the network device. Hereinafter, the term "configure" includes "provisioning services". Referring to FIG. 4a, the NMS client displays a graphical user interface (GUI) 895 to the administrator including a navigation tree/menu 898. Selecting a branch of the navigation tree causes the NMS client to display information corresponding to that branch. For example, selecting Devices branch 898a within the tree causes the NMS client to display a list 898b of IP addresses and/or domain name server (DNS) names corresponding to network devices that may be managed by the administrator. The list corresponds to a profile associated with the administrator's user name and password. Profiles are described in detail below.

Figure 4B:
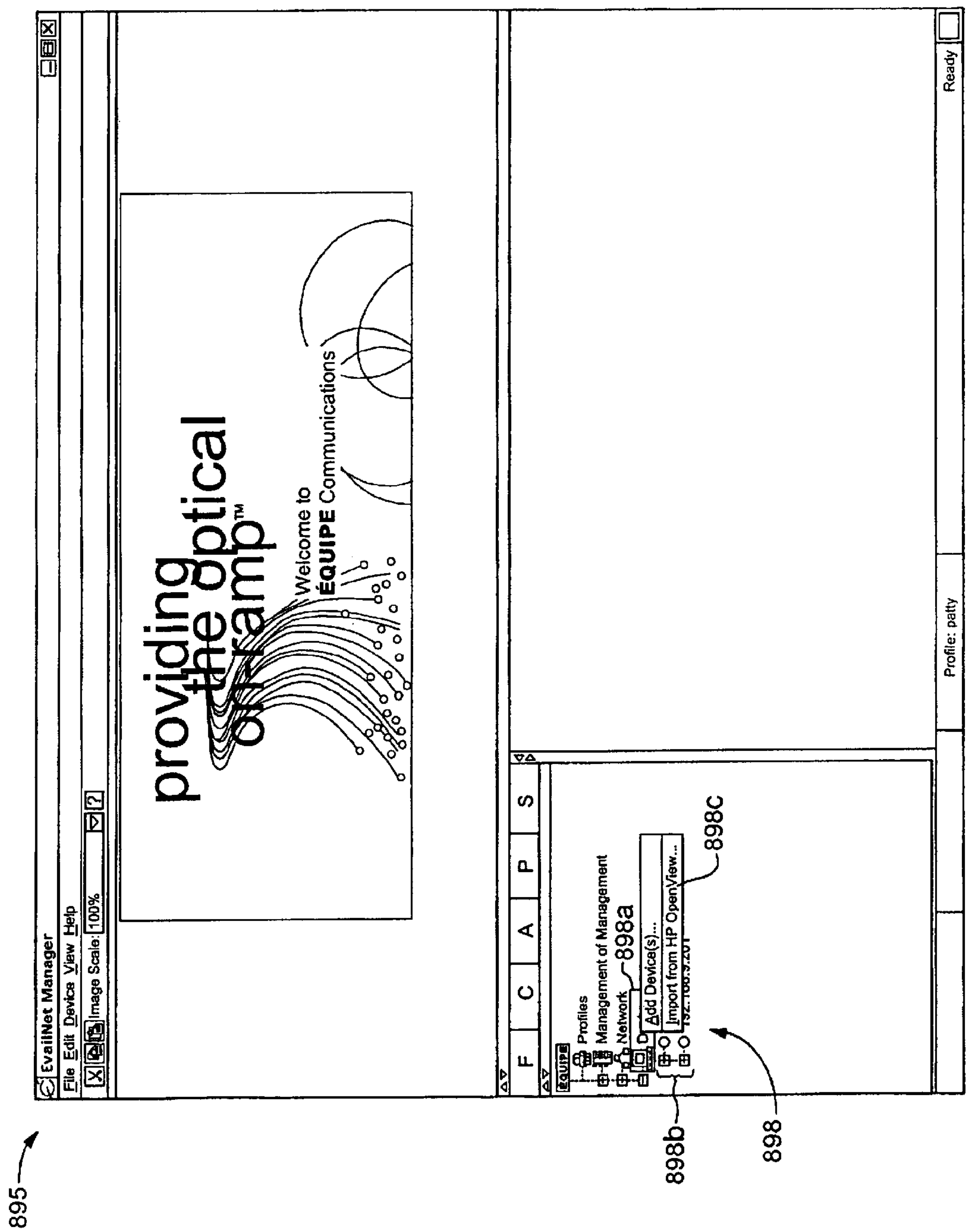
Figure 4C:
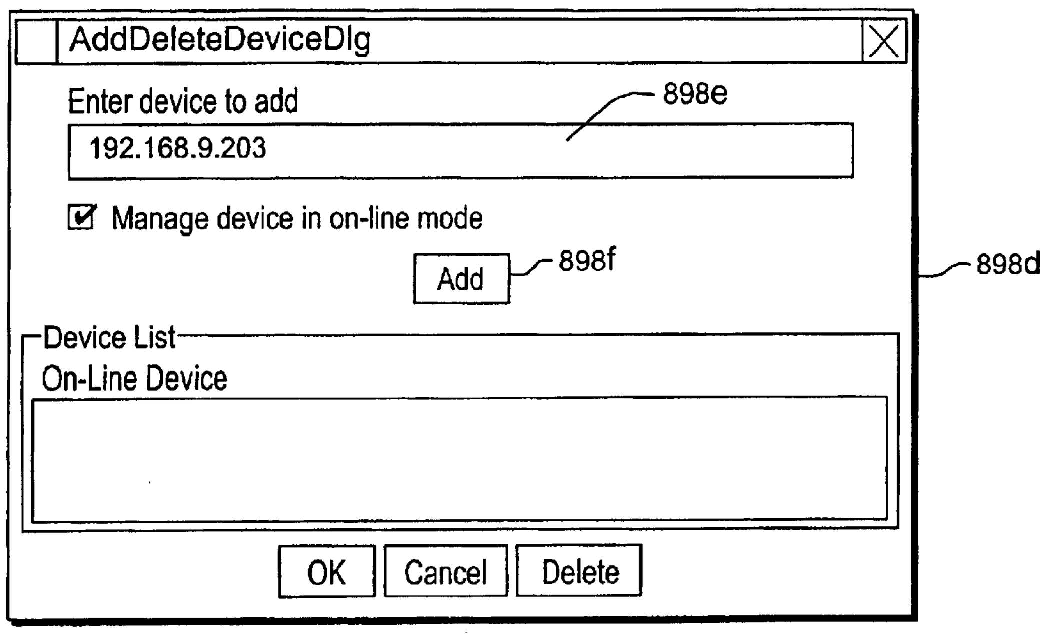
Figure 4D:
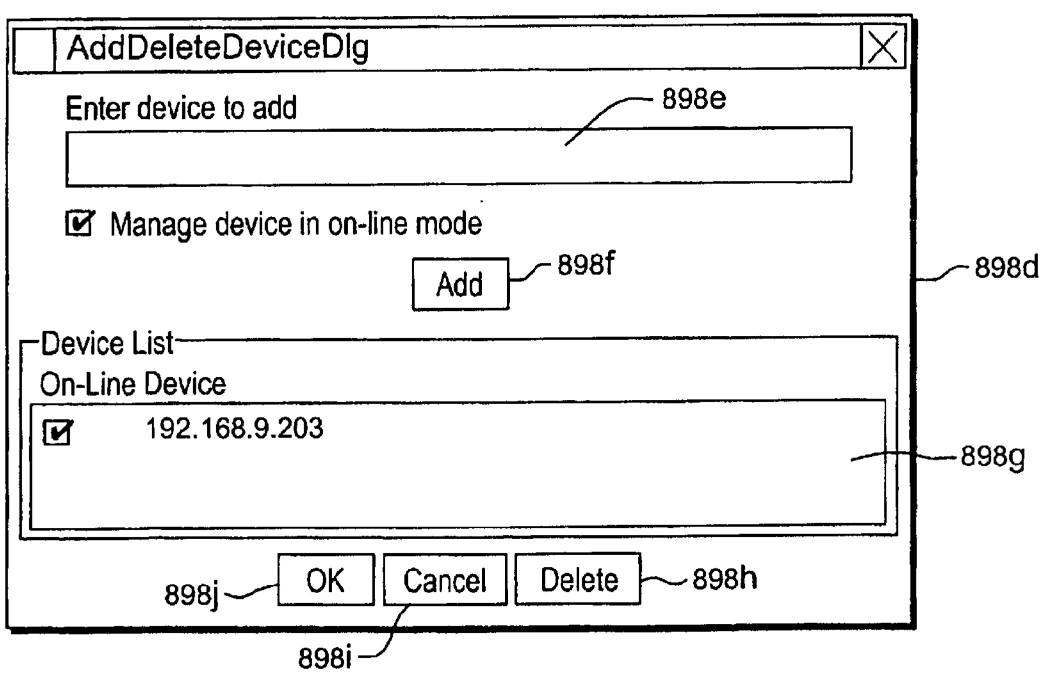
Figure 4E:
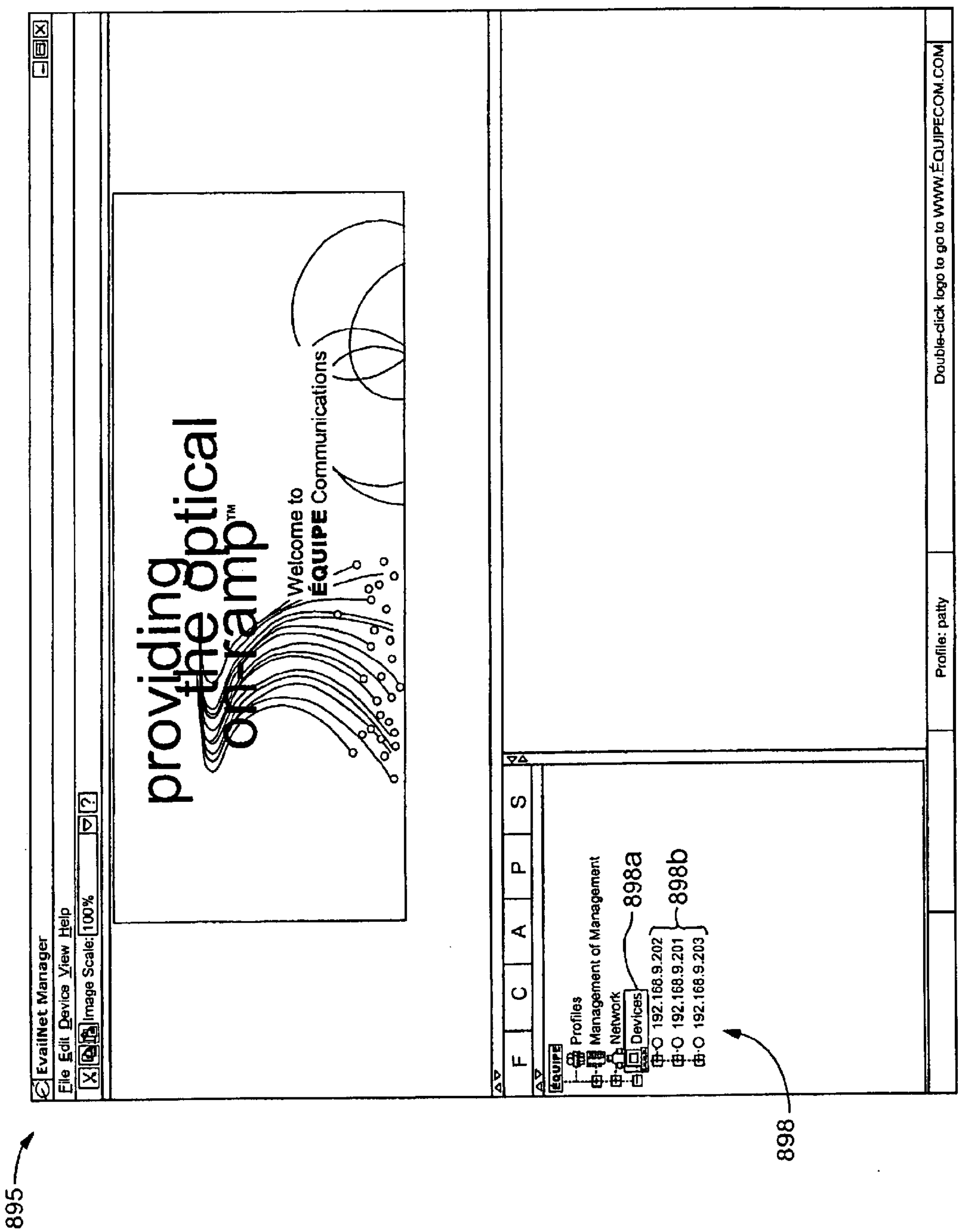

If the administrator's profile includes the appropriate authority, then the administrator may add new devices to list 898b. To add a new device, the administrator selects Devices branch 898a and clicks the right mouse button to cause a pop-up menu 898c (FIG. 4b) to appear. The administrator then selects the Add Devices option to cause a dialog box 898d (FIG. 4c) to appear. The administrator may then type in an IP address (e.g., 192.168.9.203) or a DNS name into field 898e and select an Add button 898f to add the device to Device list window 898g (FIG. 4d). The administrator may then add one or more other devices in a similar manner. The administrator may also delete a device from the Device list window by selecting the device and then selecting a Delete button 898h, or the administrator may cancel out of the dialog box without adding any new devices by selecting Cancel button 898i. When finished, the administrator may select an OK button 898j to add any new devices in Device list 898g to navigation tree 898a (FIG. 4e).

Figure 3G:
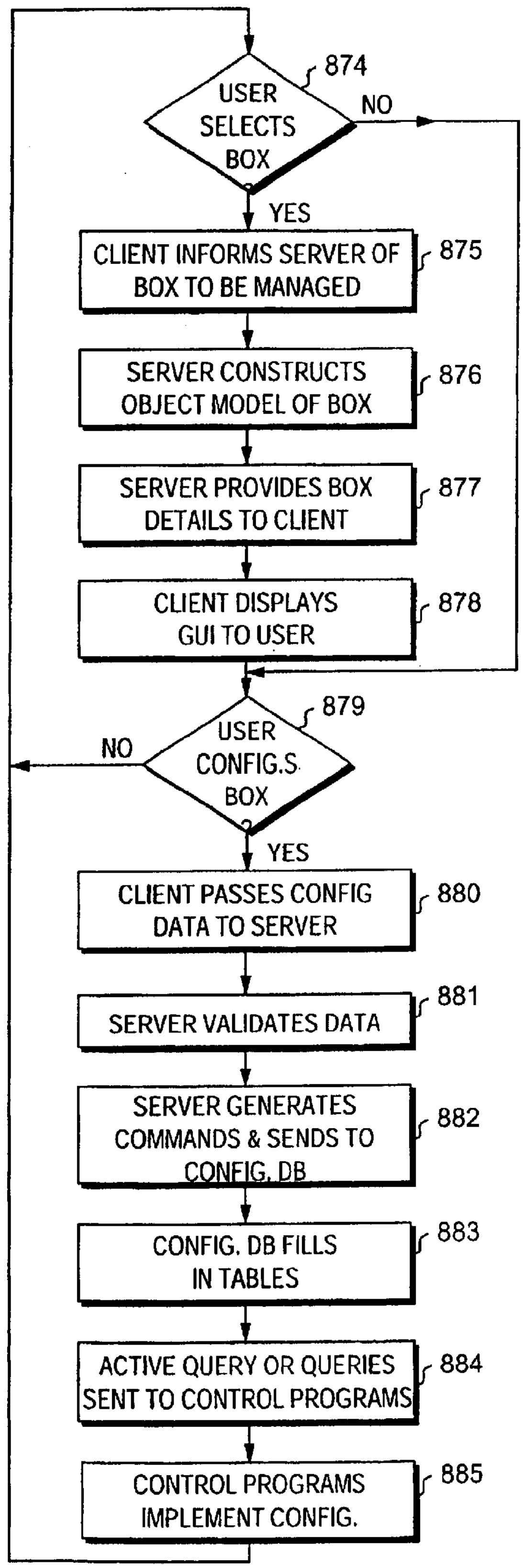
Figure 4F:
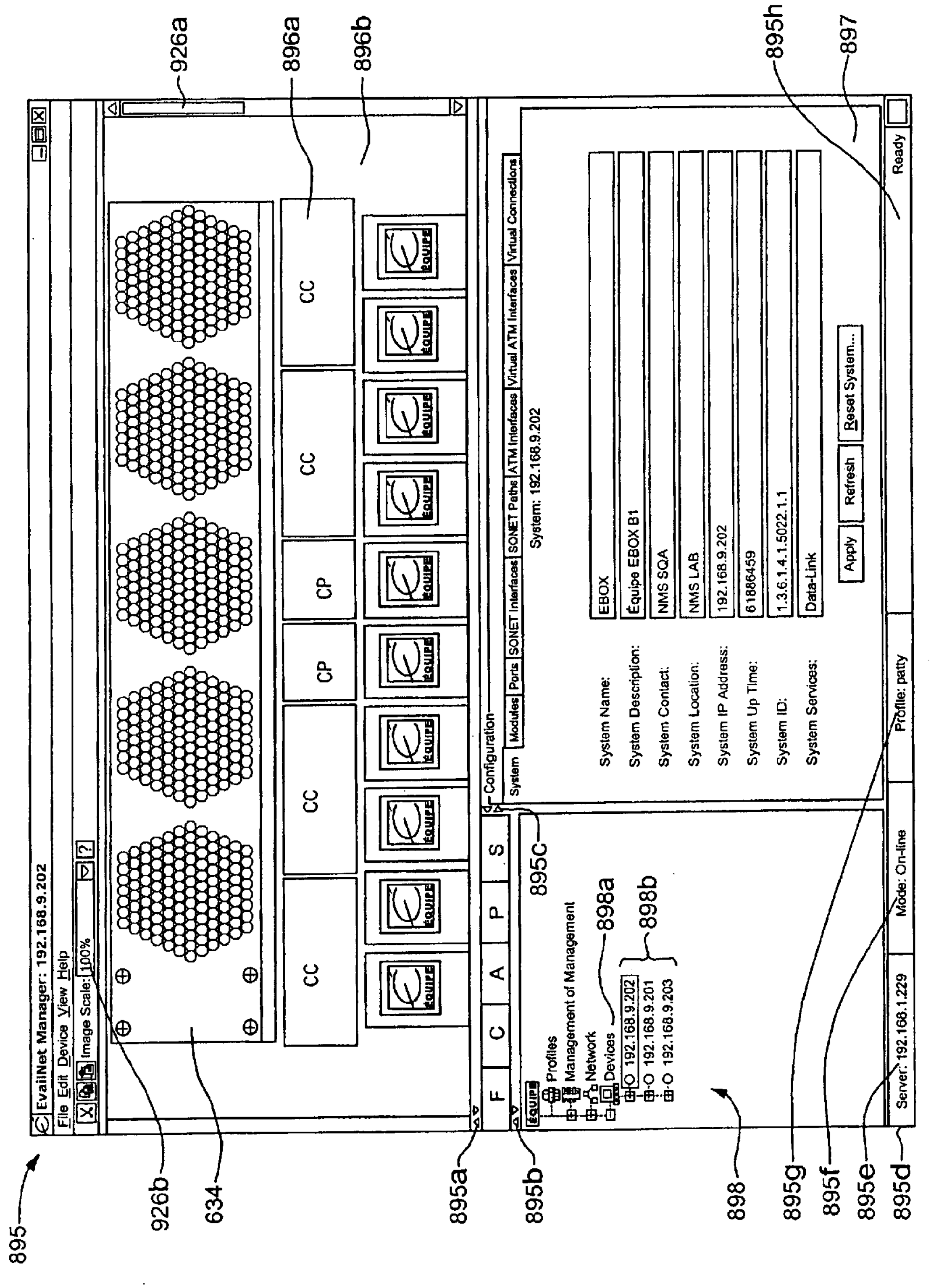

To configure a network device, the administrator begins by selecting (step 874, FIG. 3g) a particular network device to configure, for example, the network device corresponding to IP address 192.168.9.202 (FIG. 4f). The NMS client then informs (step 875, FIG. 3g) an NMS server of the particular network device to be configured. Since many NMS clients may connect to the same NMS server, the NMS server first checks its local cache to determine if it is already managing the network device for another NMS client. If so, the NMS server sends data from the cache to the NMS client. If not, the NMS server using JDBC connects to the network device and reads the data/object structure for the physical aspects of the device from the configuration database within the network device into its local cache and uses that information with the JAVA interfaces to construct (step 876) a model of the network device. The server provides (step 877) this information to the client, which displays (step 878) a graphical representation 896a (FIG. 4f) of the network device to the administrator indicating the hardware and services available in the selected network device and the current configuration and currently provisioned services. Configuration changes received by an NMS server—from either an NMS client or directly from the network device's configuration database when changes are made through the network device's CLI interface—are sent by the NMS server to any other NMS clients connected to that server and managing the same network device. This provides scalability, since the device is not burdened with multiple clients subscribing for traps, and ensures each NMS client provides an accurate view of the network device.

Figure 4G:
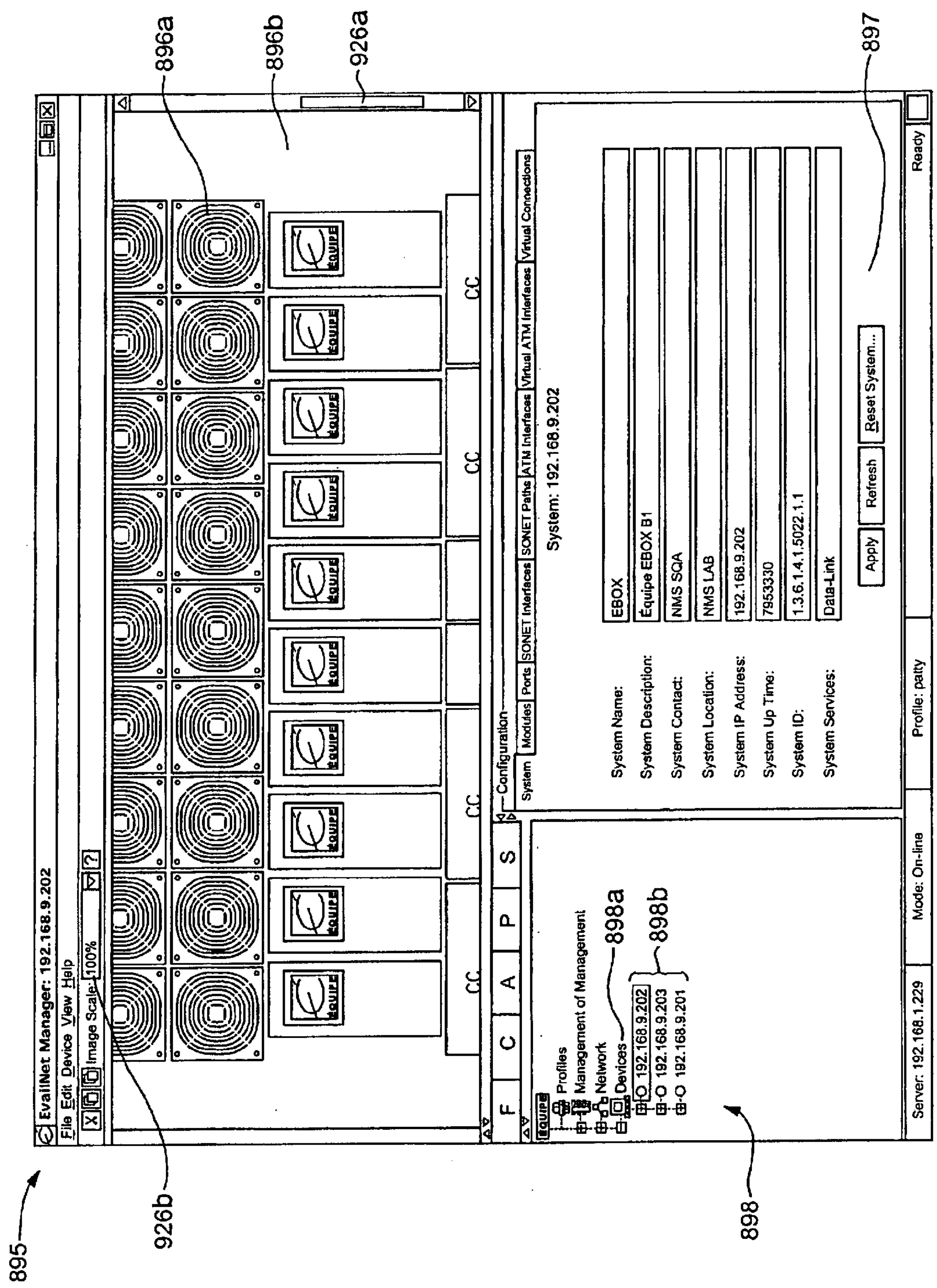
Figure 4H:
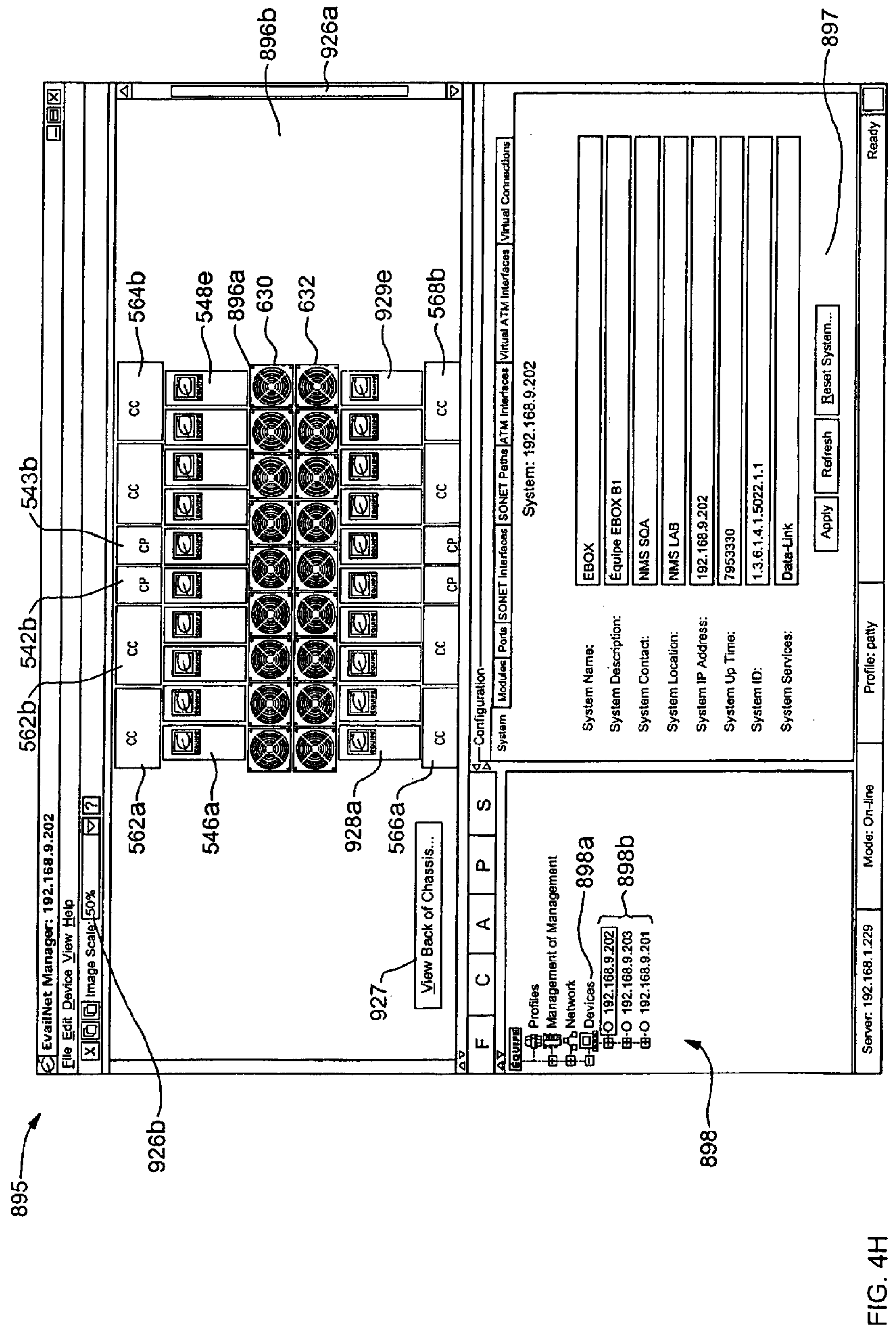

Referring to FIGS. 4f–4l, graphical representation 896a (i.e., device view, device mimic) in graphic window 896b may include many views of the network device. For example, device mimic 896a is shown in FIG. 4f displaying a front view of the components in the upper portion of network device 540 (FIG. 35). The administrator may use scroll bar 926a to scroll down and view lower portions of the front of the network device as shown in FIG. 4g. The administrator may also use image scale button 926b to change the size of graphic 896a. For example, the administrator may shrink the network device image to allow more of the device image to be visible in graphic window 896b, as shown in FIG. 4h. This view corresponds to the block diagram of network device 540 shown in FIG. 41a. For instance, upper fan tray 634 and middle fan trays 630 and 632 are shown. In addition, forwarding cards (e.g., 546a and 548e), cross-connection cards (e.g., 562a, 562b, 564b, 566a, 568b), and external processor control cards (e.g., 542b and 543b) are shown.

GUI 895 also includes several splitter bars 895a–895c (FIG. 4f) to allow the administrator to change the size of the various panels (e.g., 896b, 897 and 898). In addition, GUI 895 includes a status bar 895d. The status bar may include various fields such as a server field 895e, a Mode field 895f, a Profile field 895g and an active field 895h. The server filed may provide the IP address or DNS name of the NMS server, and the profile field may provide the username that the administrator logged in under. The active field will provide updated status, for example, ready, or ask the administrator to take particular steps. The mode field will indicate an on-line mode (i.e., typical operation) or an off-line mode (described in detail below).

Device mimic 896a may also provide one or more visual indications as to whether a card is present in each slot or whether a slot is empty. For example, in one embodiment, the forwarding cards (e.g., 546a and 548e) in the upper portion of the network device are displayed in a dark color to indicate the cards are present while the lower slots (e.g., 928a and 929e) are shown in a lighter color to indicate that the slots are empty. Other visual indications may also be used. For example, a graphical representation of the actual card faceplate may be added to device mimic 896a when a card is present and a blank faceplate may be added when the slot is empty. Moreover, this may be done for any of the cards that may or may not be present in a working network device. For example, the upper cross-connection cards may be displayed in a dark color to indicate they are present while the lower cross-connection card slots may be displayed in a lighter color to indicate the slots are empty.

In addition, a back view and other views of the network device may also be shown. For example, the administrator may use a mouse to move a cursor into an empty portion of graphic window 896b and click the right mouse button to cause a pop-up menu to appear listing the various views available for the network device. In one embodiment, the only other view is a back view and pop-up menu 927 is displayed. Alternatively, short cuts may be set up. For example, double clicking the left mouse button may automatically cause graphic 896a to display the back view of the network device, and another double click may cause graphic 896a to again display the front view. As another alternative, a pull down menu may be provided to allow an administrator to select between various views.

Figure 4I:
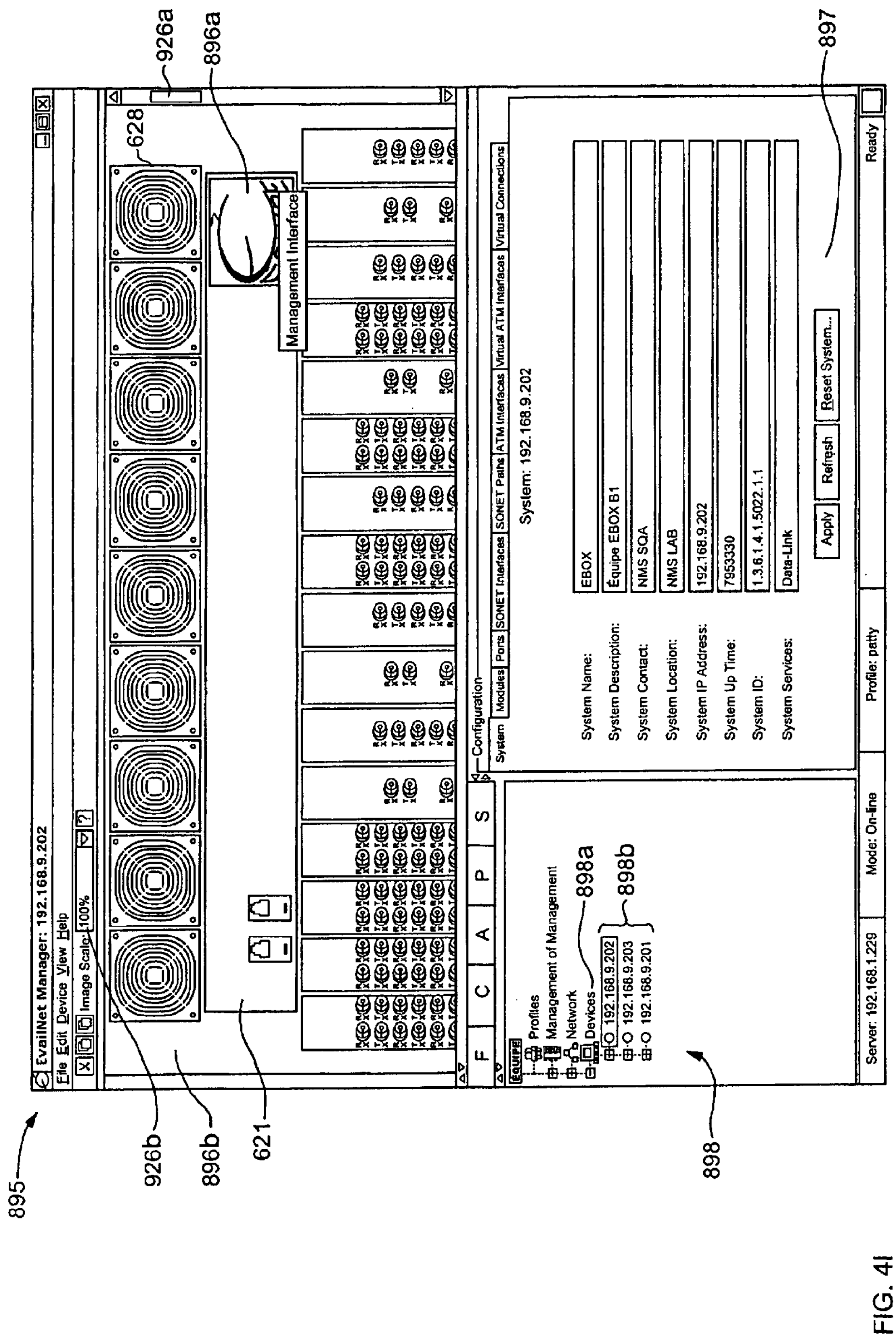
Figure 4J:
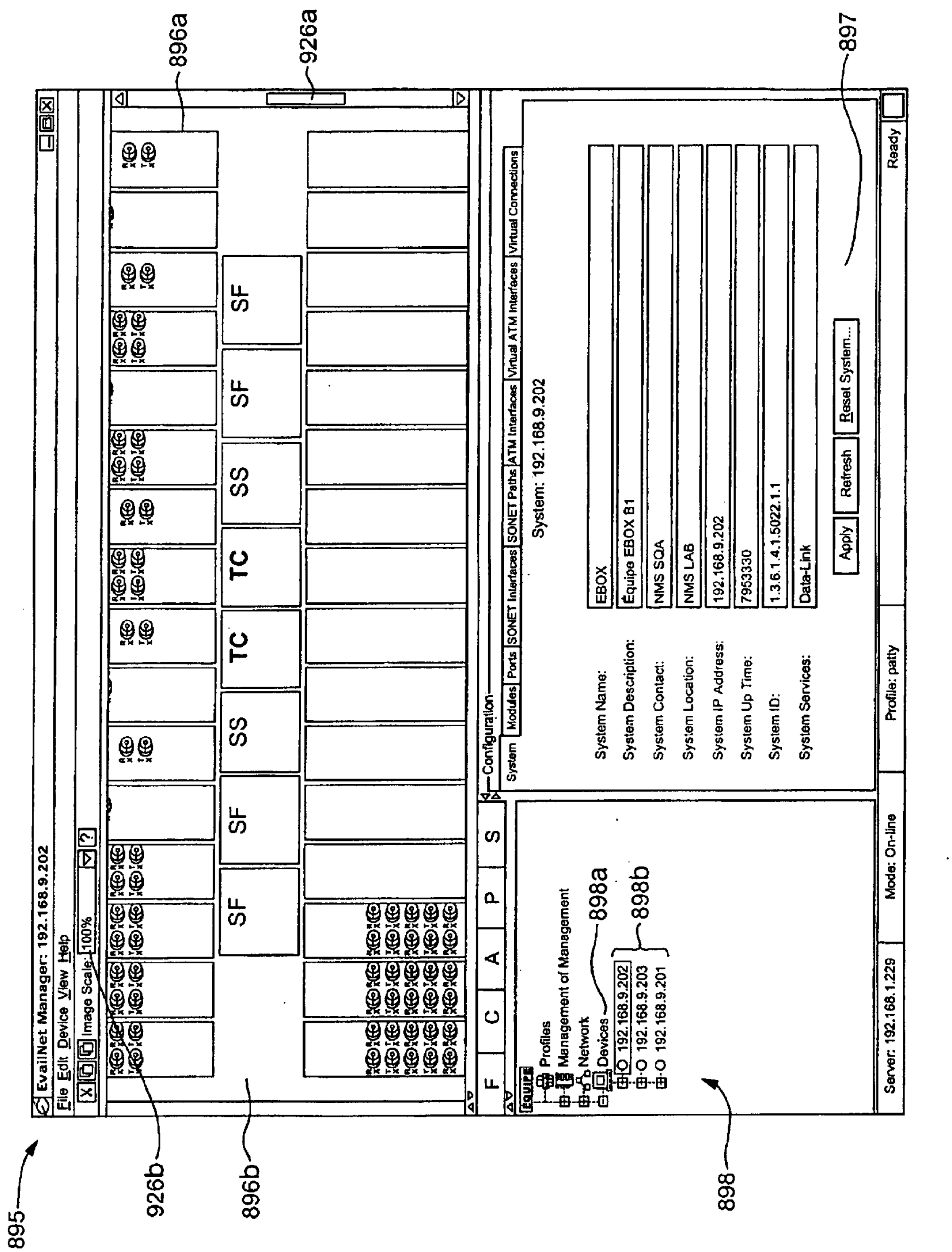
Figure 4K:
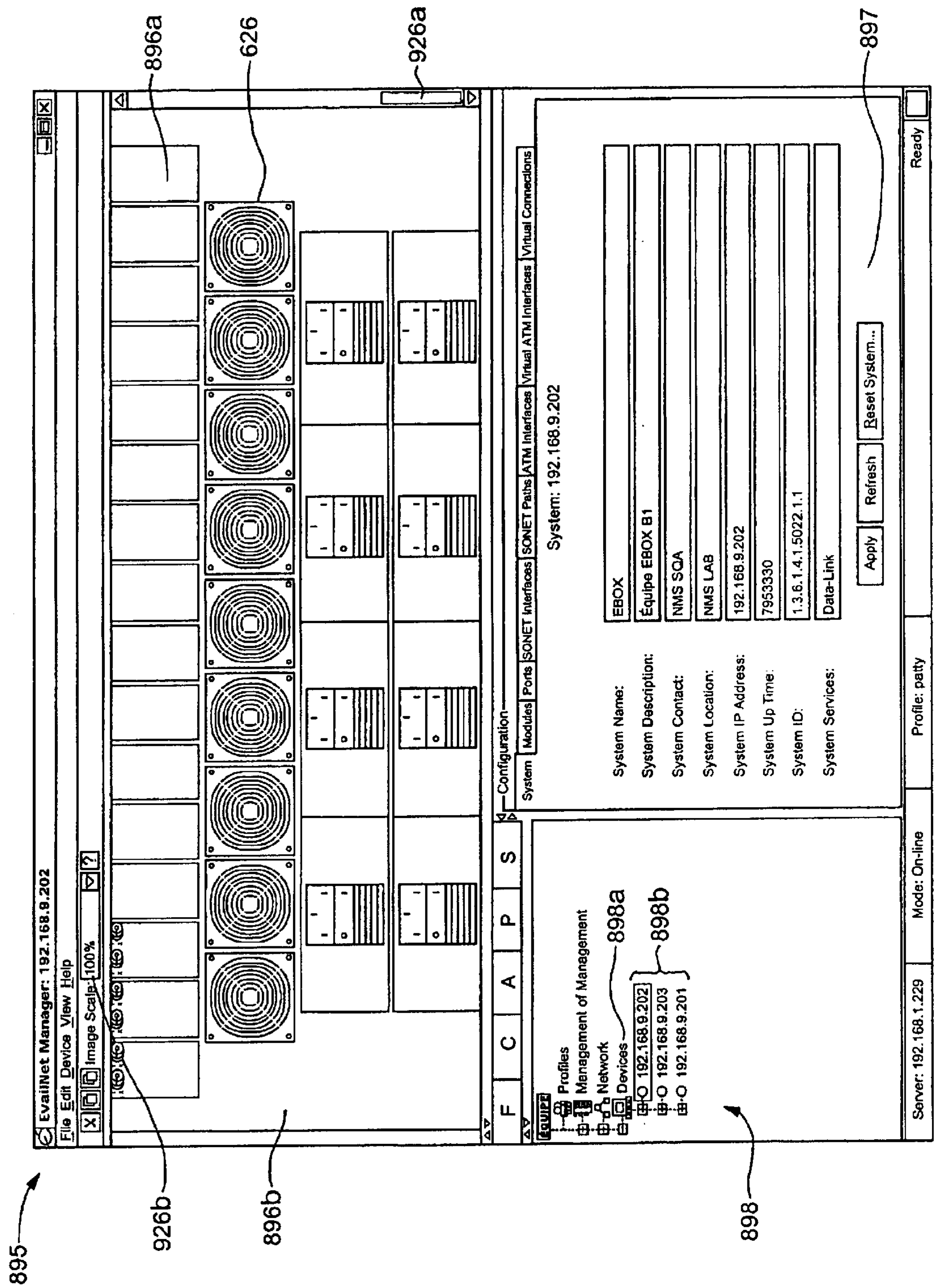
Figure 4L:
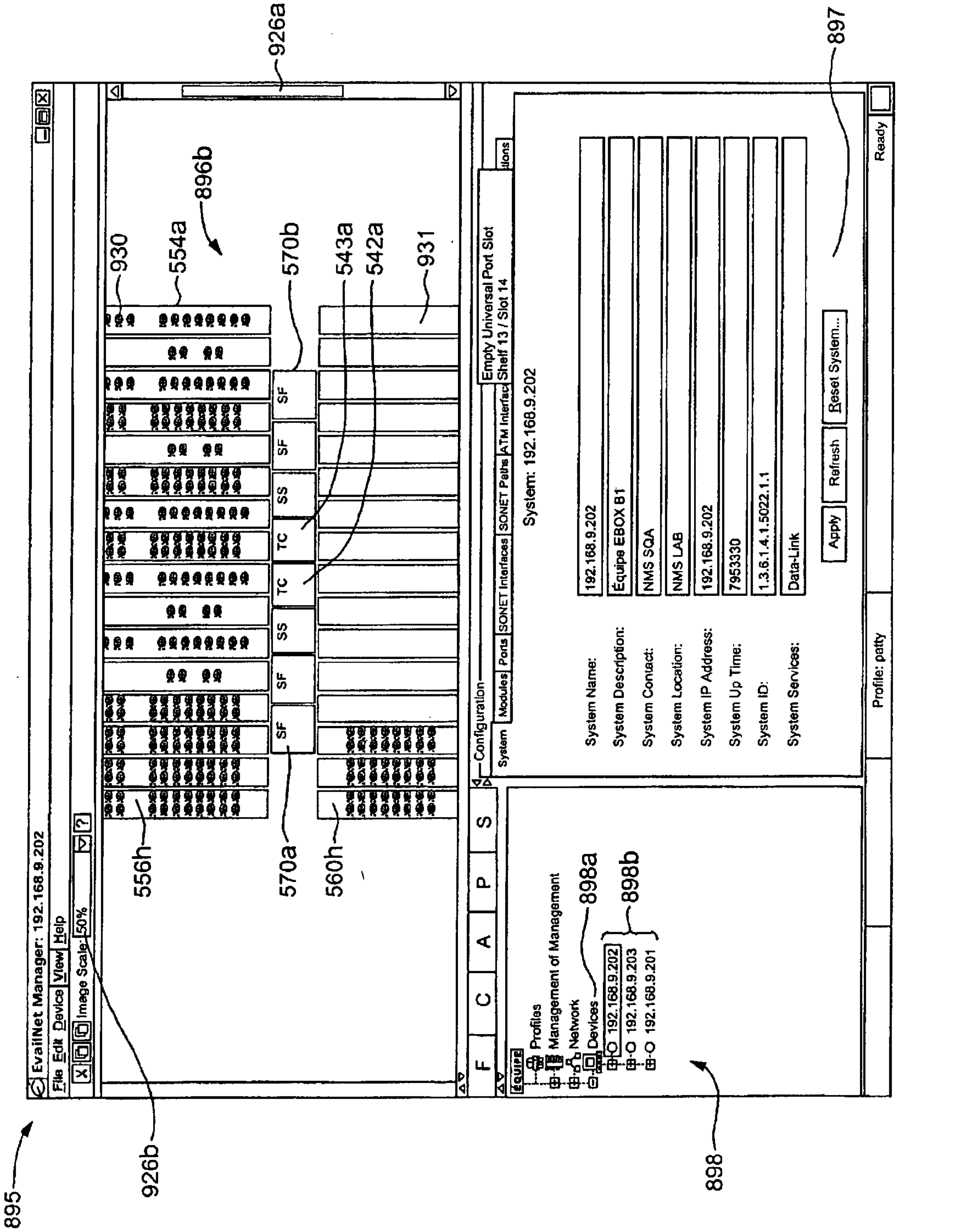

Device mimic 896a is shown in FIG. 4i displaying a back view of the components in the upper portion of network device 540 (FIG. 35). Again the administrator may use scroll bar 926a and/or image scale button 926b to view lower portions (FIGS. 4j and 4k) of the back of the network device or more of the network device by shrinking the graphic (FIG. 4l). These views correspond to the block diagram of network device 540 shown in FIG. 41b. For example, upper fan tray 628 (FIG. 4i), management interface (MI) card 621 (FIG. 4i) and lower fan tray 626 (FIG. 4k) are shown. In addition, universal port cards (e.g., 556h, 554a and 560h, FIG. 4l), switch fabric cards (e.g., 570a and 570b) and internal processor control cards (e.g., 542a and 543a) are also shown. Again, graphic 896a may use a visual indicator to clearly show whether a card is present in a slot or whether the slot is empty. In this example, the visual indicator for universal port cards is the display of the ports available on each card. For example, universal port card 554a is present as indicated by the graphical representation of ports (e.g., 930, FIG. 4l) available on that card, while universal port card 558a (FIG. 41b) is not present as indicated by a blank slot 931.

Figure 4M:
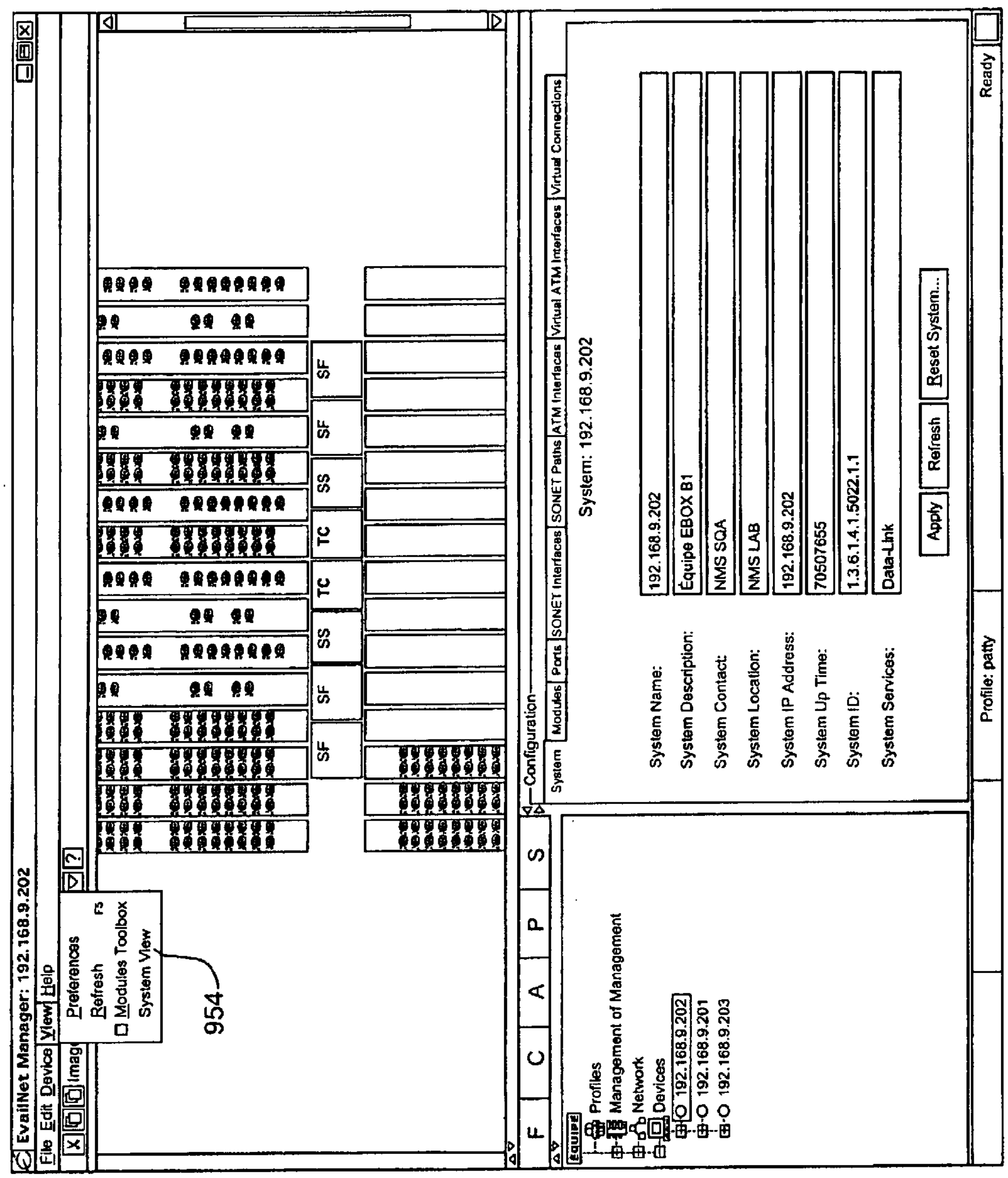
Figure 4N:
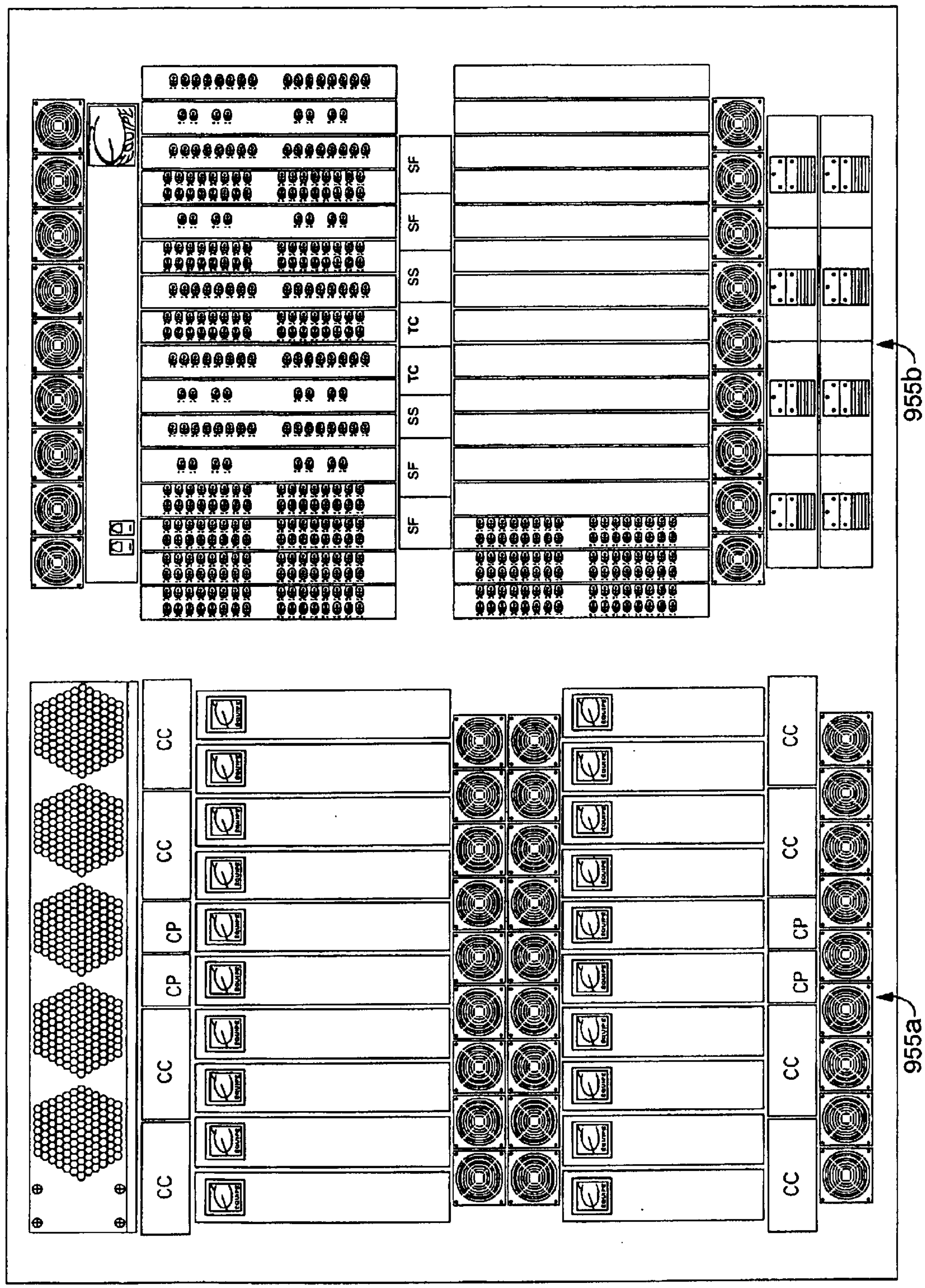

Since the GUI has limited screen real estate and the network device may be large and loaded with many different types of components (e.g., modules, ports, fan trays, power connections), in addition to the device mimic views described above, GUI 895 may also provide a system view menu option 954 (FIG. 4m). If an administrator selects this option, a separate pull away window 955 (FIG. 4n) is displayed for the administrator including both a front view 955a and a back view 955b of the network device corresponding to the front and back views displayed by the device mimic. The administrator may keep this separate pull away window up and visible while provisioning services through the GUI. Moreover, the GUI remains linked with the pull away window such that if the administrator selects a component in the pull away window, the device mimic displays that portion of the device and highlights that component. Similarly, if the administrator selects a component within the device mimic, the pull away window also highlights the selected component. Thus, the pull away window may further help the administrator navigate in the device mimic.

Figure 4O:
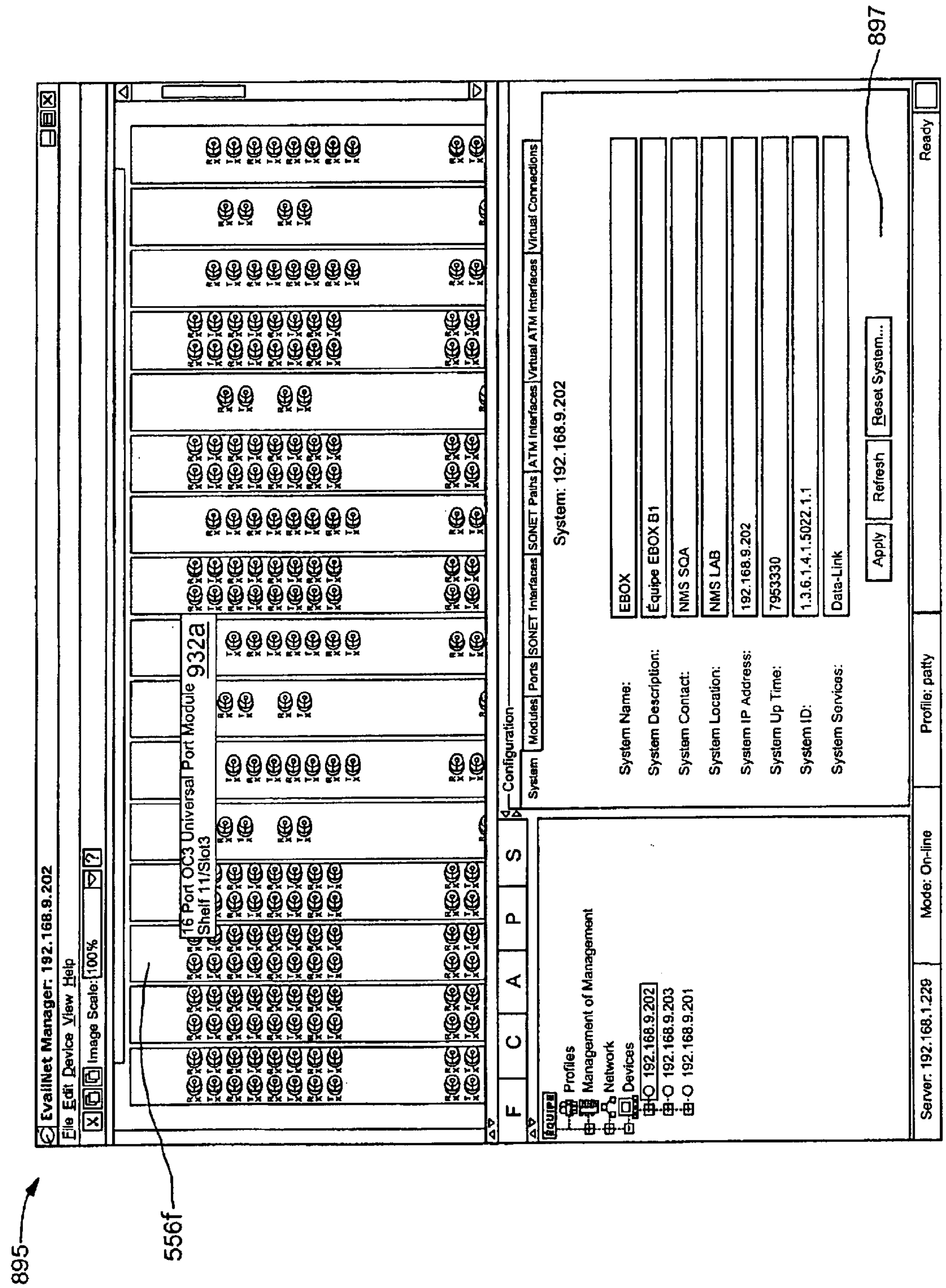
Figure 4P:
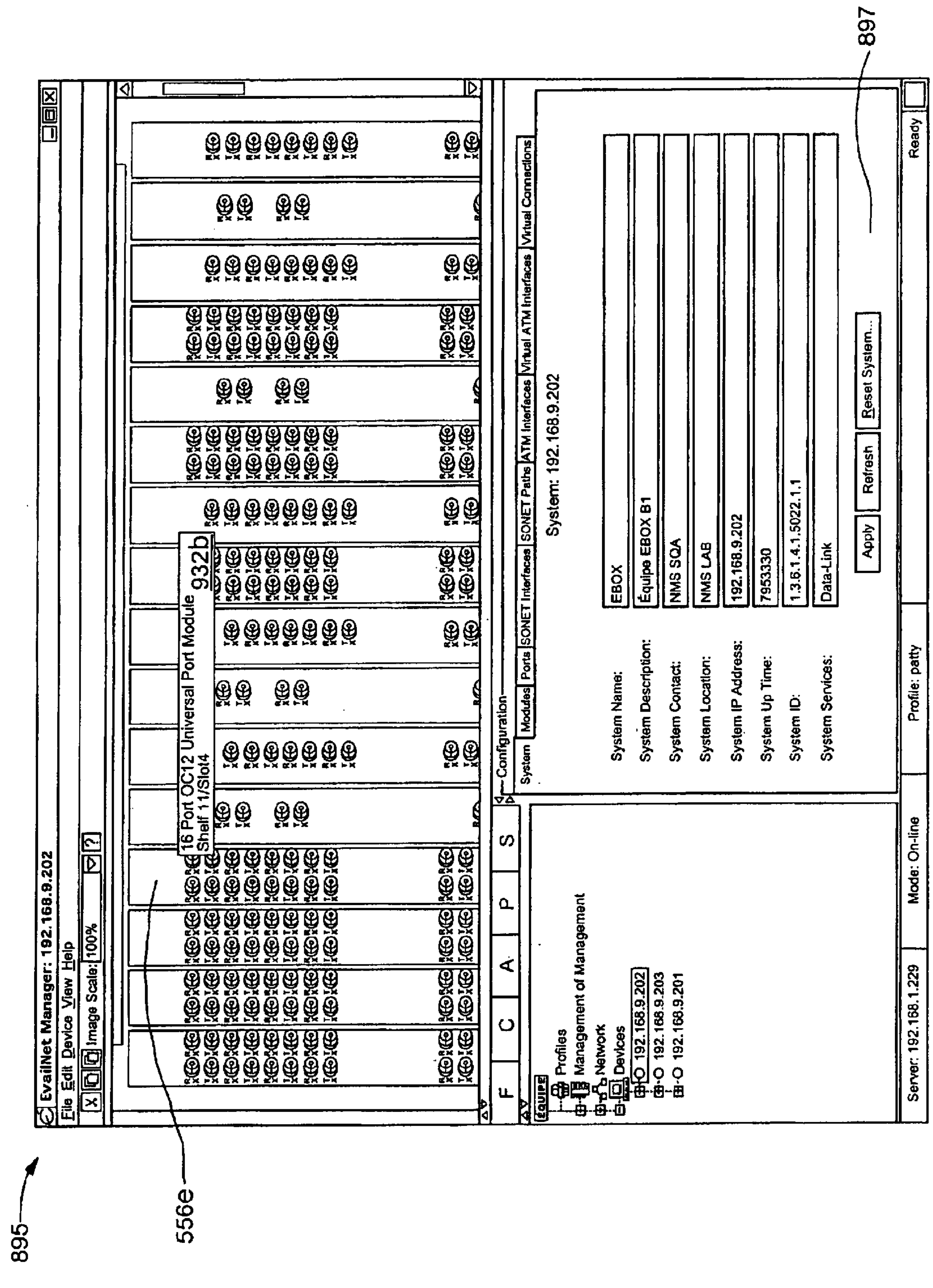
Figure 4Q:
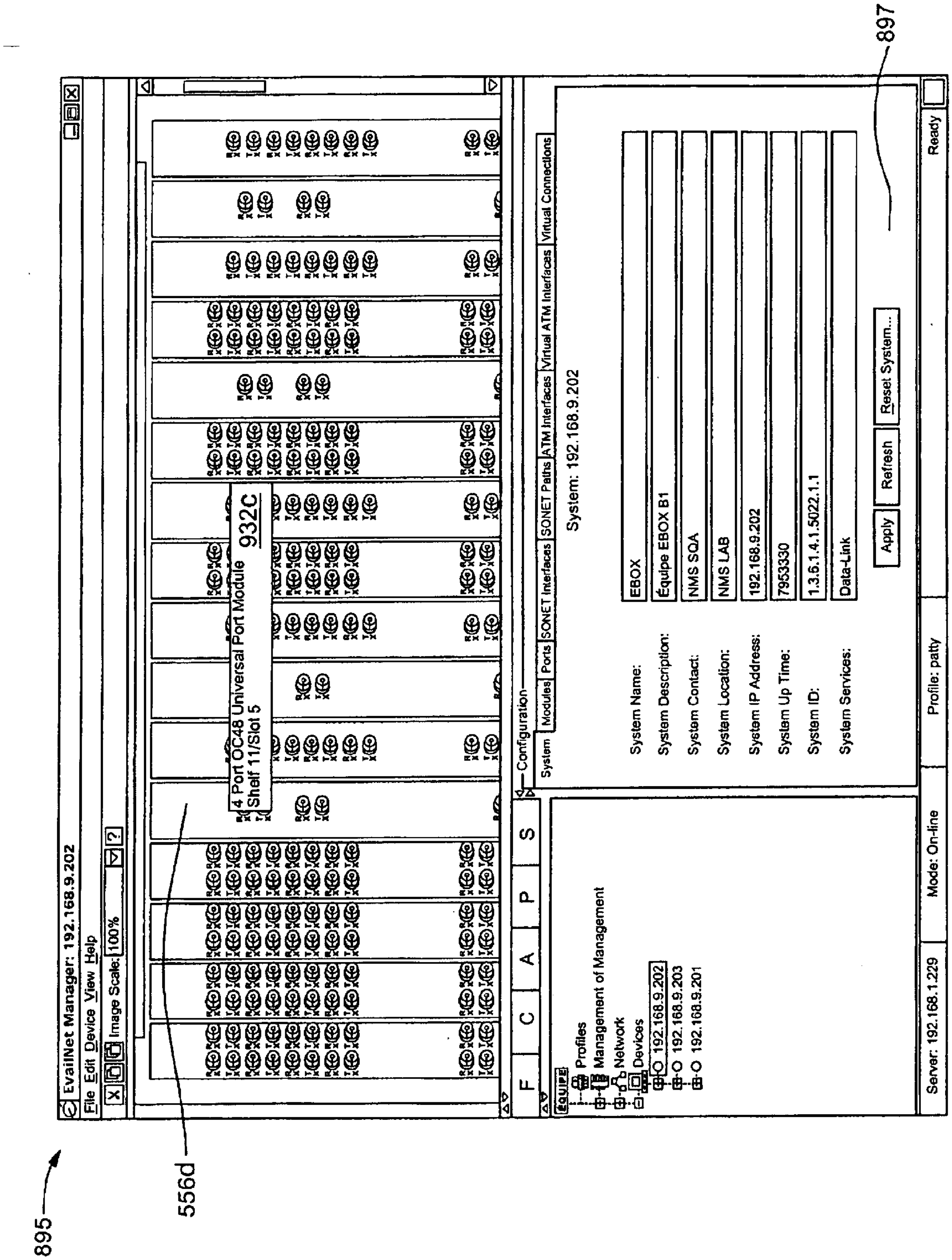
Figure 4R:
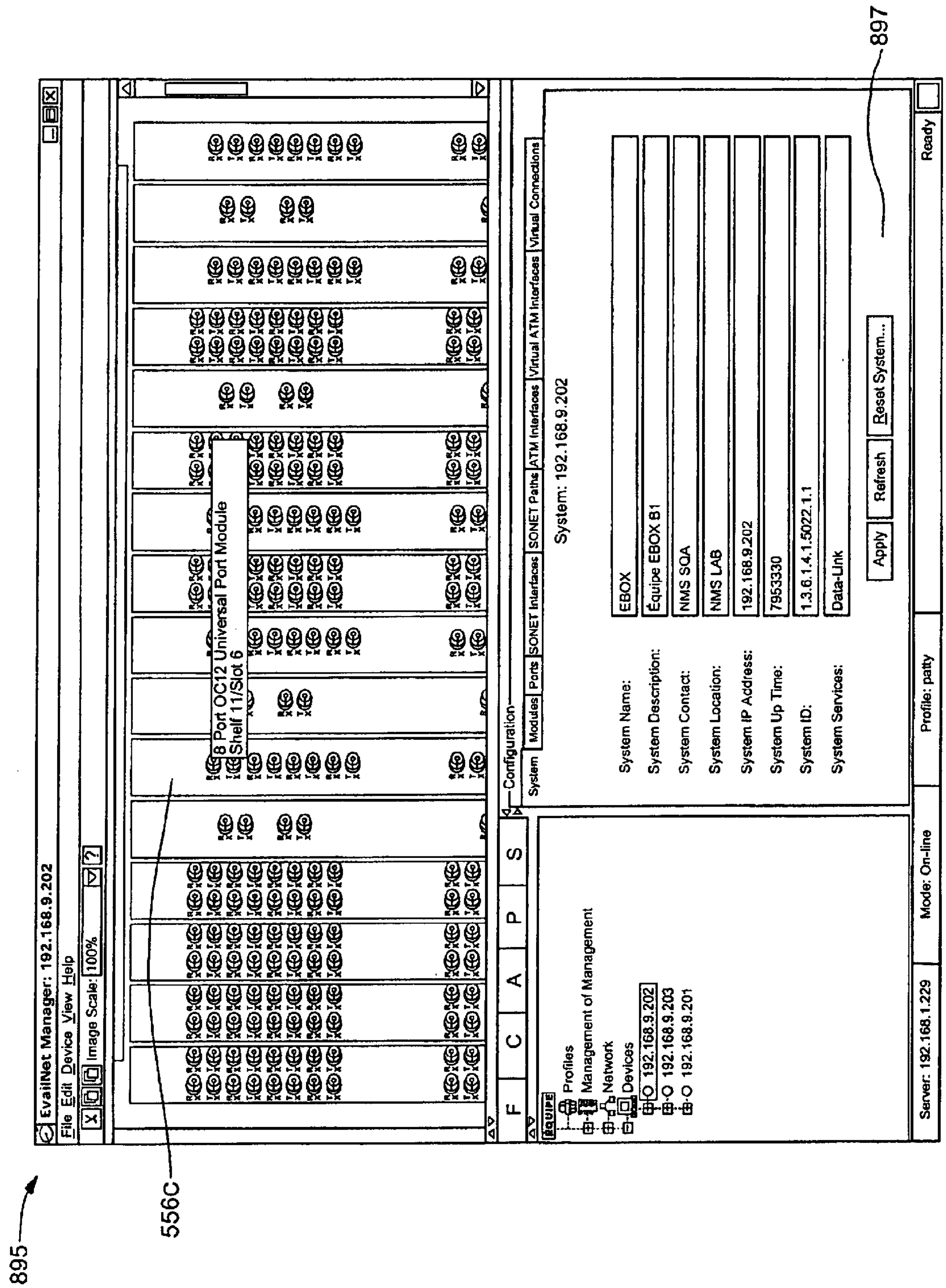
Figure 4S:
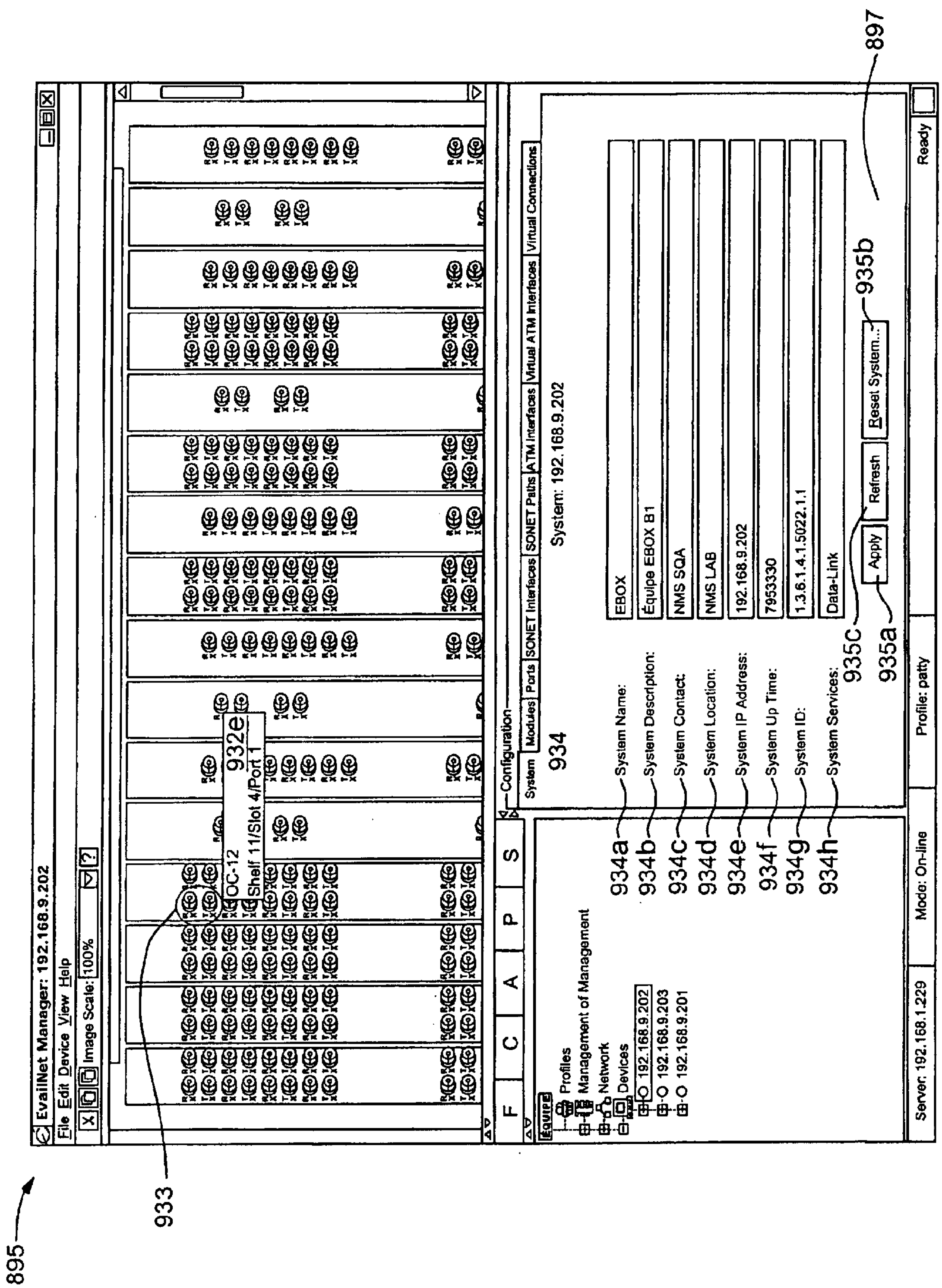

Device mimic 896a may also indicate the status of components. For example, ports and/or cards may be green for normal operation, red if there are errors and yellow if there are warnings. In one embodiment, a port may be colored, for example, light green or gray if it is available but not yet configured and colored dark green after being configured. Other colors or graphical textures may also be used show visible status. To further ease a network administrator's tasks, the GUI may present pop-up windows or tool tips containing information about each card and/or port when the administrator moves the cursor over the card or port. For example, when the administrator moves the cursor over universal port card 556f (FIG. 4o), pop-up window 932a may be displayed to tell the administrator that the card is a 16 Port OC3 Universal Port Module in Shelf 11/Slot 3. Similarly, if the administrator moves the cursor over universal port card 556e (FIG. 4p), pop-up window 932b appears indicating that the card is a 16 Port OC12 Universal Port Module in Shelf 11/Slot 4, and if the cursor is moved over universal port cards 556d (FIG. 4q) or 556c (FIG. 4r), then pop-up windows 932c and 932d appear indicating the cards are 4 Port OC48 Universal Port Module in Shelf 11/Slot 5 and 8 Port OC12 Universal Port Module in Shelf 11/Slot 6, respectively. If the administrator moves the cursor over a port, for example, port 933 (FIG. 4s), then pop-up window 932e appears indicating the port is an OC12 in Shelf 11/Slot 4/Port 1.

The views are used to provide management context. The GUI may also include a configuration/service status window 897 for displaying current configuration and service provisioning details. Again, these details are provided to the NMS client by the NMS server, which reads the data from the network device's configuration database. The status window may include many tabs/folders for displaying various data about the network device configuration. In one embodiment, the status window includes a System tab 934 (FIG. 4s), which is displayed when the server first accesses the network device. This tab provides system level data such as the system name 934a, System Description 934b, System Contact 934c, System Location 934d, System IP Address 934e (or DNS name), System Up Time 934f, System identification (ID) 934g and System Services 934h. Modifications to data displayed in 934a–934e may be made by the administrator and committed by selecting the Apply button 935. The NMS client then passes this information to the NMS server, which then writes a copy of the data in the network device's configuration database and broadcasts the changes to any other NMS clients managing the same network device. The administrator may also reset the network device by selecting the Reset System button 935b and then refresh the System tab data by selecting the Refresh button 935c.

Figure 4T:
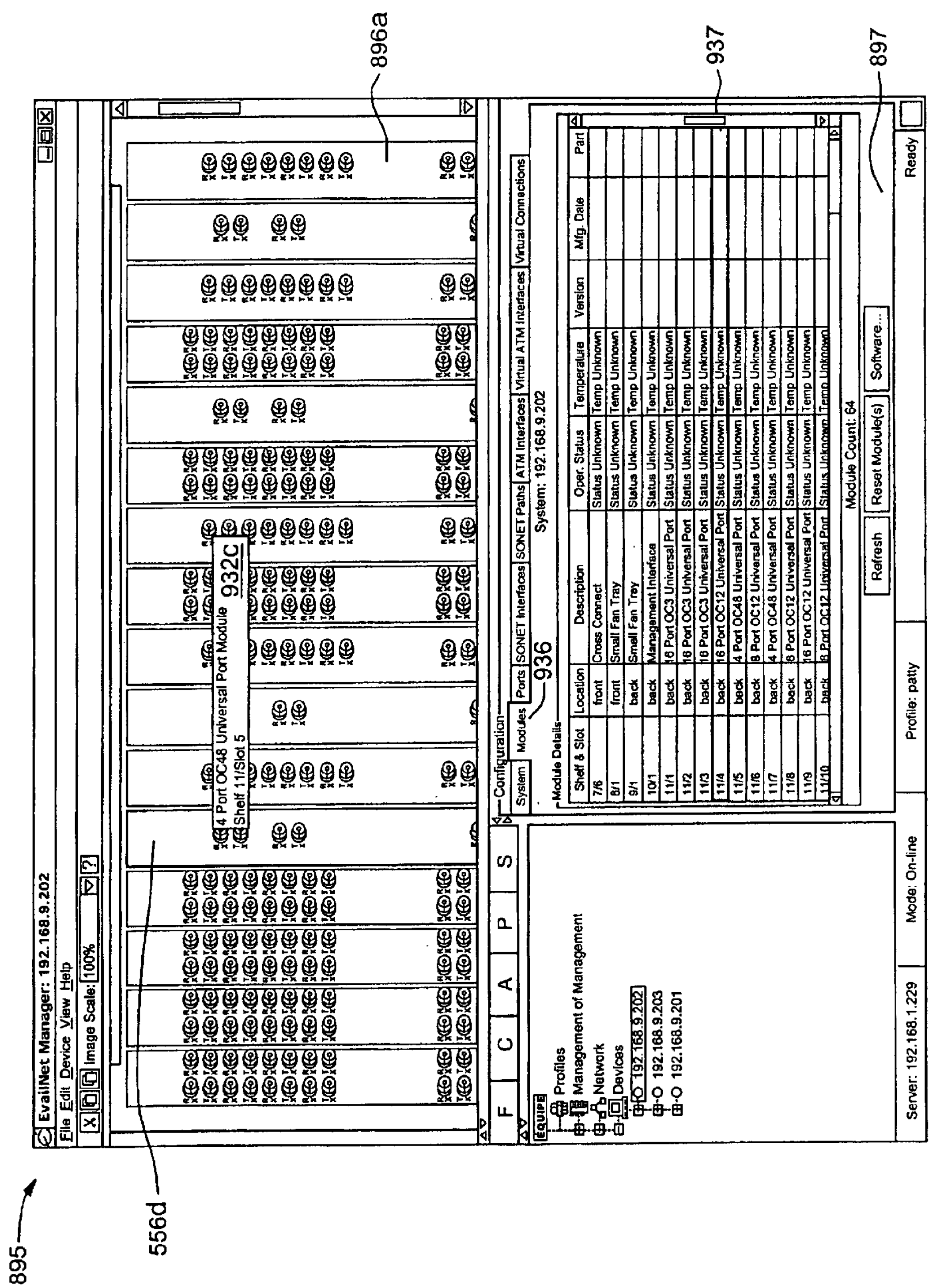

The status window may also include a Modules tab 936 (FIG. 4t), which includes an inventory of the available modules in the network device and various details about those modules such as where they are located (e.g., shelf and slot, back or front). The inventory may also include a description of the type of module, version number, manufacturing date, part number, etc. In addition, the inventory may include run time data such as the operational status and temperature. The NMS server may continuously supply the NMS client(s) with the run time data by reading the network device configuration database or NMS database. Device mimic 896a is linked with status window 897, such that selecting a module in device mimic 896a causes the Module tab to highlight a line in the inventory corresponding to that card. For example, if an administrator selects universal port card 556d, device mimic 896a highlights that module and the Module tab highlights a line 937 in the inventory corresponding to the card in Shelf 11/Slot 5. Similarly, if the administrator selects a line in the Module tab inventory, device mimic 896*a* highlights the corresponding module. Double clicking the left mouse button on a selected module may cause a dialog box to appear and the administrator may modify particular parameters such as an enable/disable parameter.

Figure 4U:
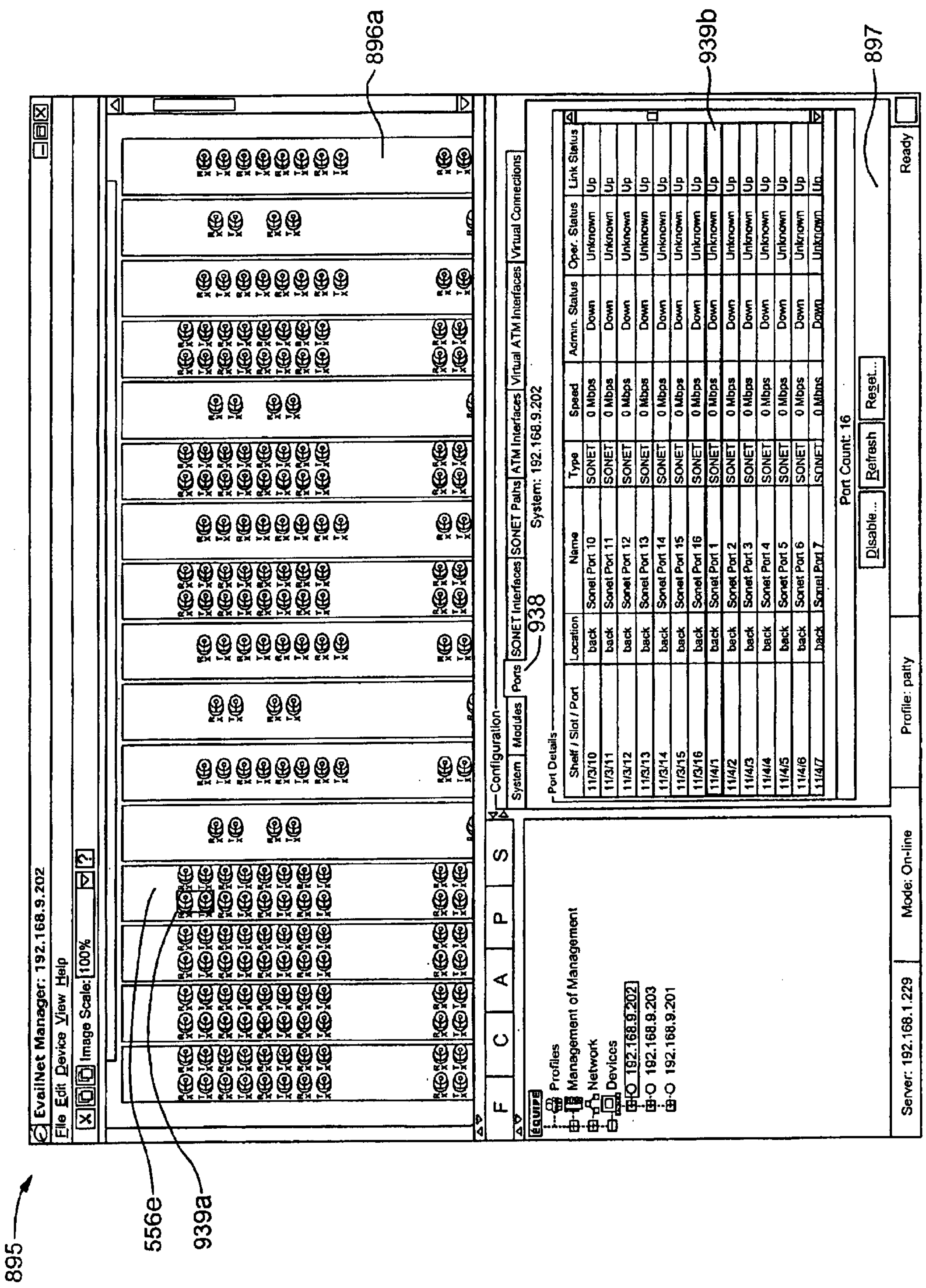

The status window may also include a Ports tab 938 (FIG. 4*u*), which displays an inventory of the available ports in the network device and various details about each port such as where they are located (shelf, slot and port; back or front). The inventory may also include a description of the port name, type and speed as well as run time data such as administrative status, operational status and link status. Again, device mimic 896*a* is linked with status window 897 such that selecting a port within device mimic 896*a* causes the Port tab to highlight a line in the inventory corresponding to that port. For example, if the administrator selects port 939*a* (port 1, slot 4) on card 556*e,* then the Port tab highlights a line 939*b* within the inventory corresponding to that port. Similarly, if the administrator selects a line from the inventory in the Port tab, device mimic 896*a* highlights the corresponding port. Again double clicking the left mouse button on a selected port may cause a dialog box to appear and the administrator may modify particular parameters such as an enable/disable parameter.

Another tab in the status window may be a SONET Interface tab 940 (FIG. 4*v*), which includes an inventory of SONET ports in the network device and various details about each port such as where they are located (shelf and slot; back or front). Medium type (e.g., SONET, Synchronous Digital Hierarchy (SDH)) may also be displayed as well as circuit ID, Line Type, Line Coding, Loopback, Laser Status, Path Count and other details. Again, device mimic 896*a* is lined with status window 897 such that selecting a port within device mimic 896*a* causes the SONET Interface tab to highlight a line in the inventory corresponding to that SONET port. For example, if the administrator selects port 941*a* (port 2, slot 5) on card 556*d,* then the SONET Interface tab highlights line 941*b* corresponding to that port. Similarly, if the administrator selects a line from the inventory in the SONET Interface tab, device mimic 896*a* highlights the corresponding port. Again, double clicking the left mouse button on a selected SONET interface may cause a dialog box to appear and the administrator may modify particular parameters such as an enable/disable parameter.

Figure 4V:
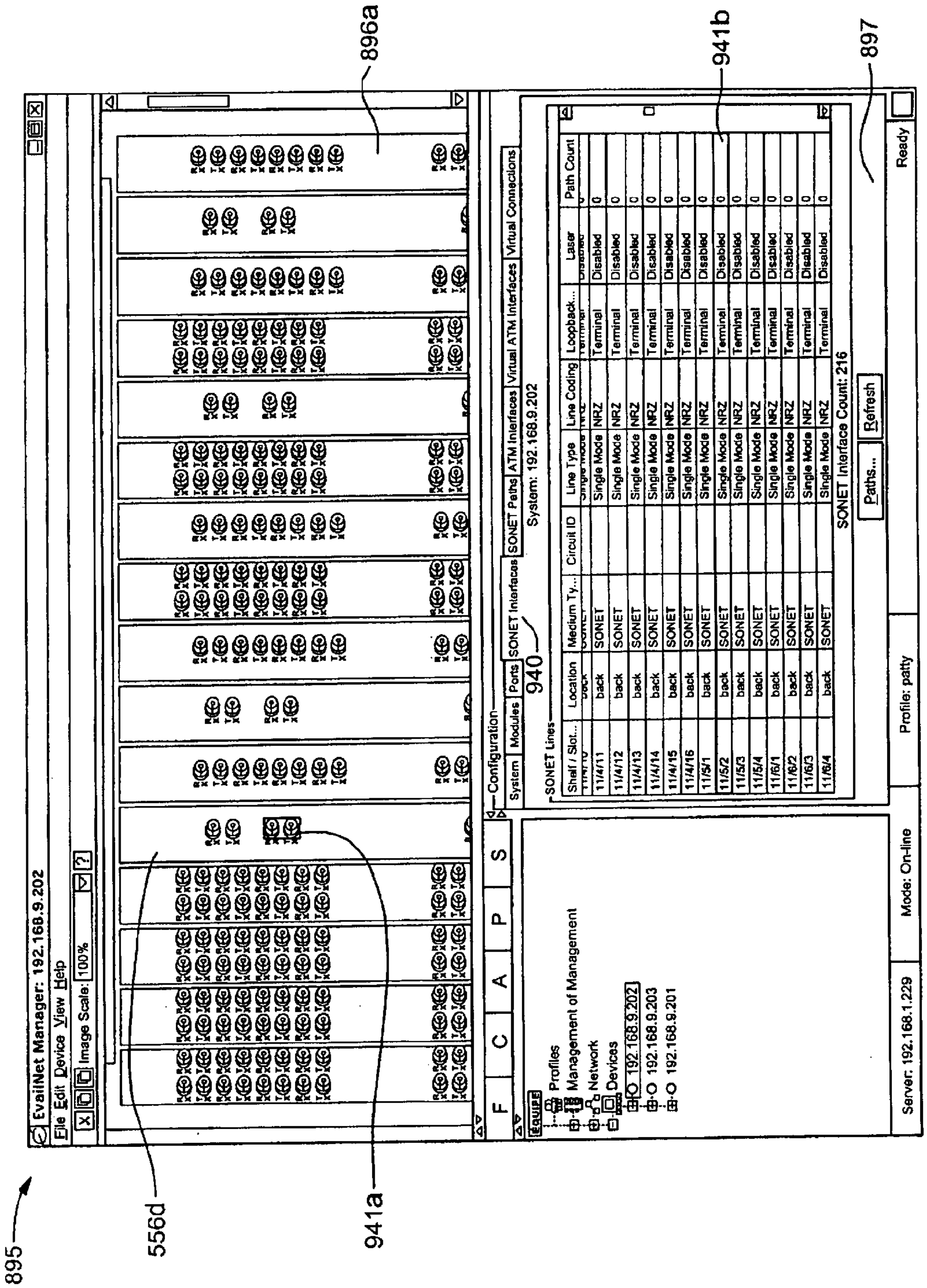
Figure 4W:
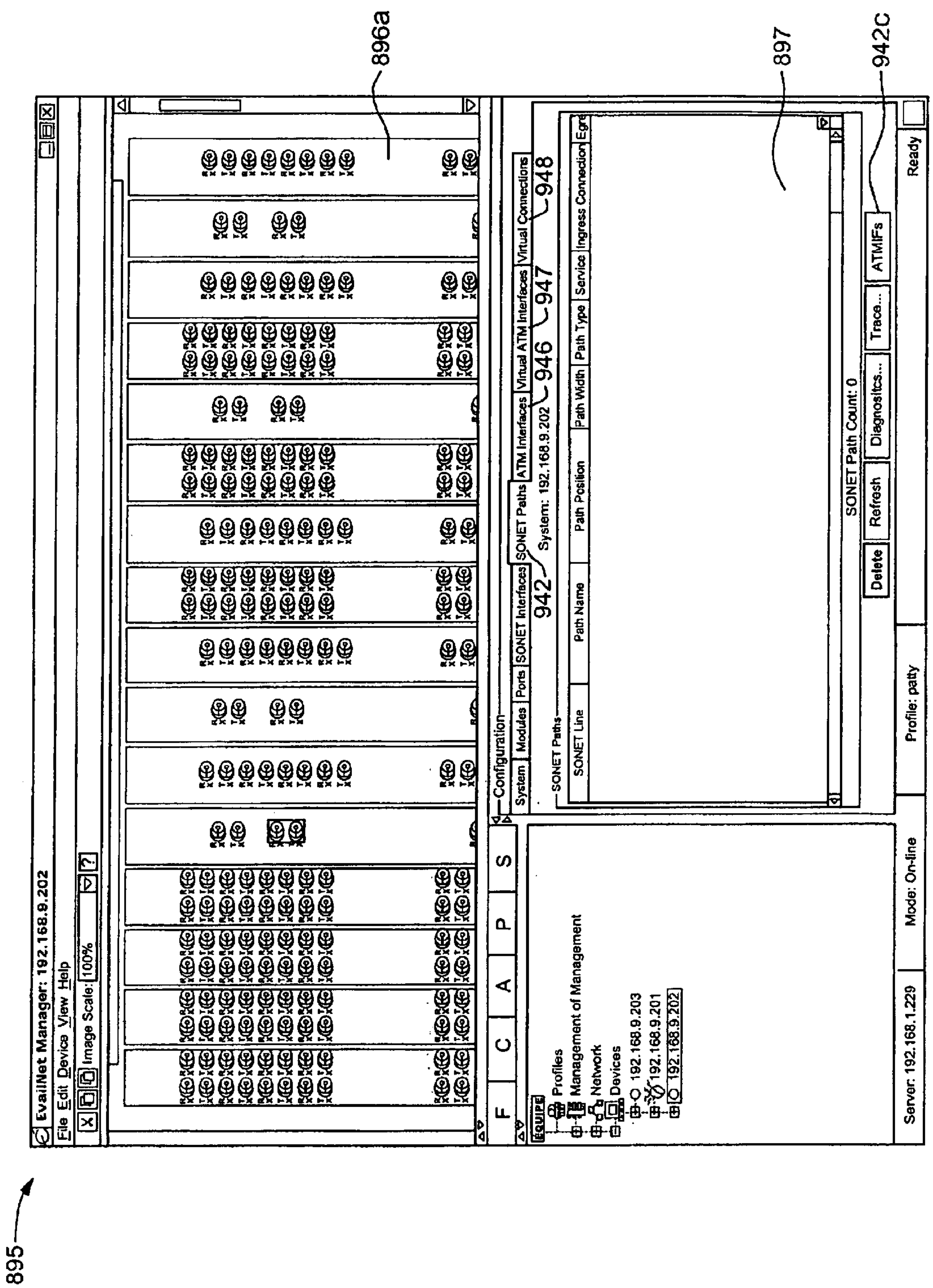
Figure 5A:
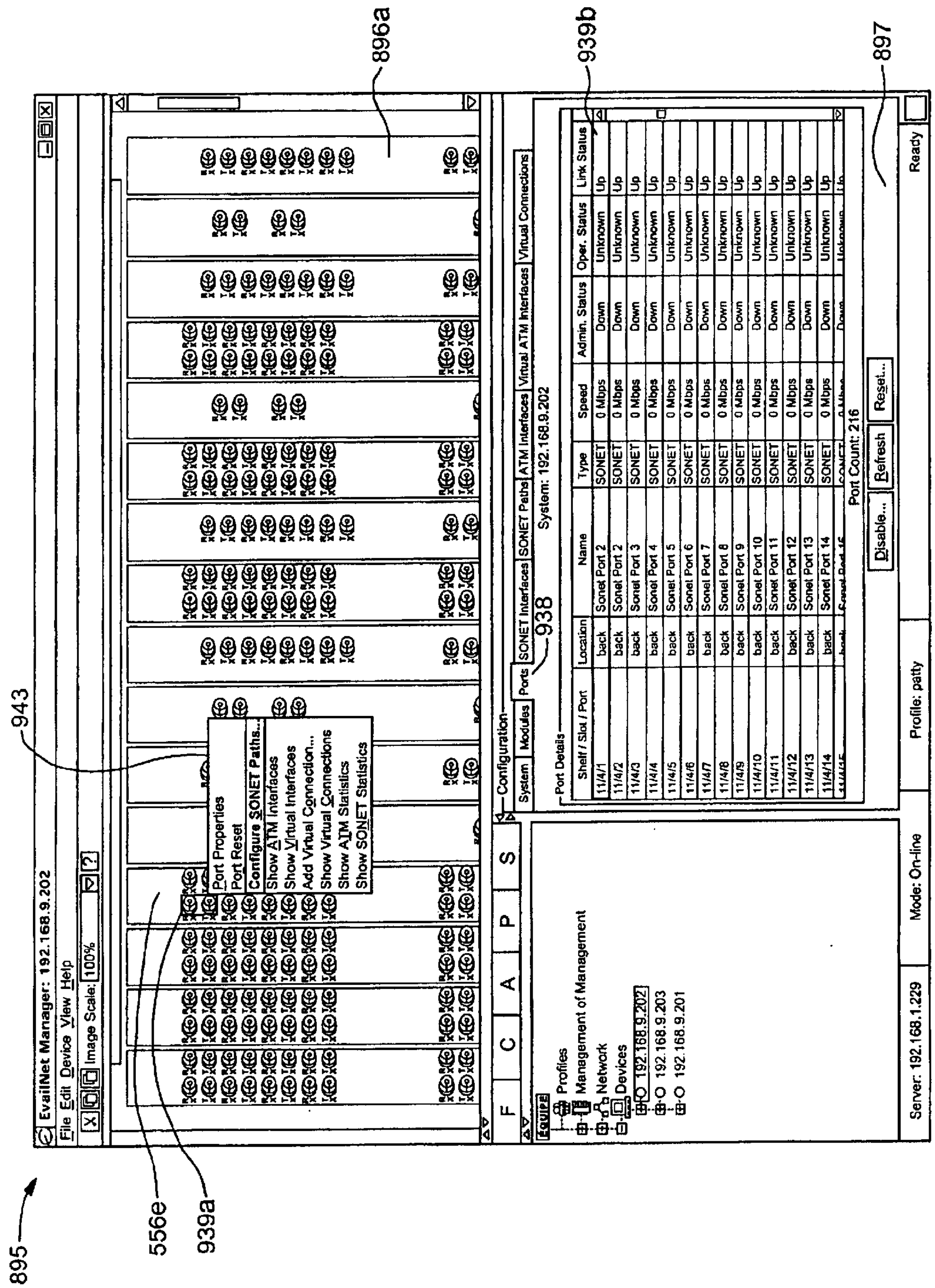
Figure 5B:
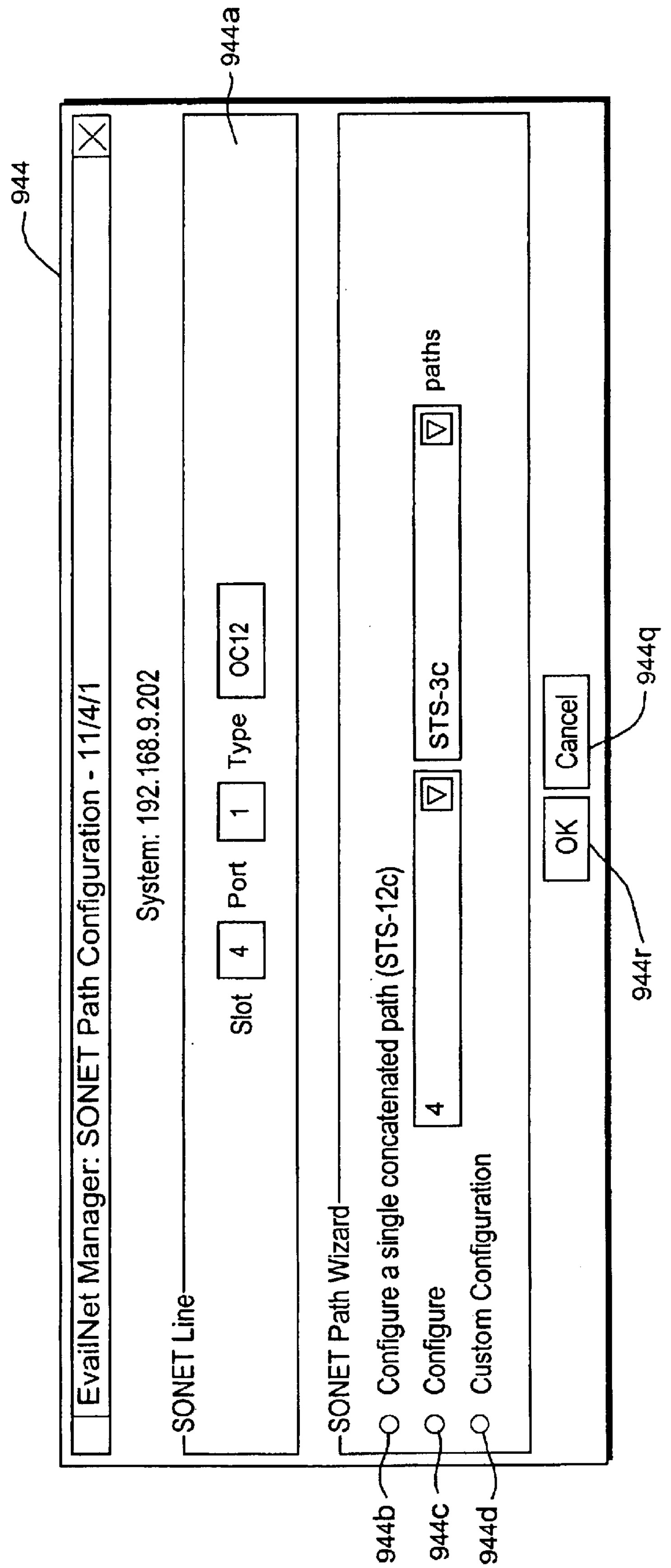

The System tab data as well as the Modules tab, Ports tab and SONET Interface tab data all represent physical aspects of the network device. The remaining tabs, including SONET Paths tab 942 (FIG. 4*w*), ATM Interfaces tab 946, Virtual ATM Interfaces tab 947 and Virtual Connections tab 948, display configuration details and, thus, display no data until the device is configured. In addition, these configuration tabs 942, 946–948 are dialog chained together with wizard-like properties to guide an administrator through configuration details. Through these tabs within the GUI (i.e., graphical context), therefore, the administrator then makes (step 879, FIG. 3*g*) configuration selections. For example, to configure a SONET path, the administrator may begin by selecting a port (e.g., 939*a* on card 556*e,* FIG. 5*a*) within device mimic 896*a* and clicking the right mouse button (i.e., context sensitive) to cause a pop-up menu 943 to be displayed listing available port configuration options. The administrator may then select the "Configure SONET Paths" option, which causes the GUI to display a SONET Path configuration wizard 944 (FIG. 5*b*).

The SONET Path configuration wizard guides the administrator through the task of setting up a SONET Path by presenting the administrator with valid configuration options and inserting default parameter values. As a result, the process of configuring SONET paths is simplified, and required administrator expertise is reduced since the administrator does not need to know or remember to provide each parameter value. In addition, the SONET Path wizard allows the administrator to configure multiple SONET Paths simultaneously, thereby eliminating the repetition of similar configuration process steps required by current network management systems and reducing the time required to configure many SONET Paths. Moreover, the wizard validates configuration requests from the administrator to minimize the potential for mis-configuration.

Figure 5C:
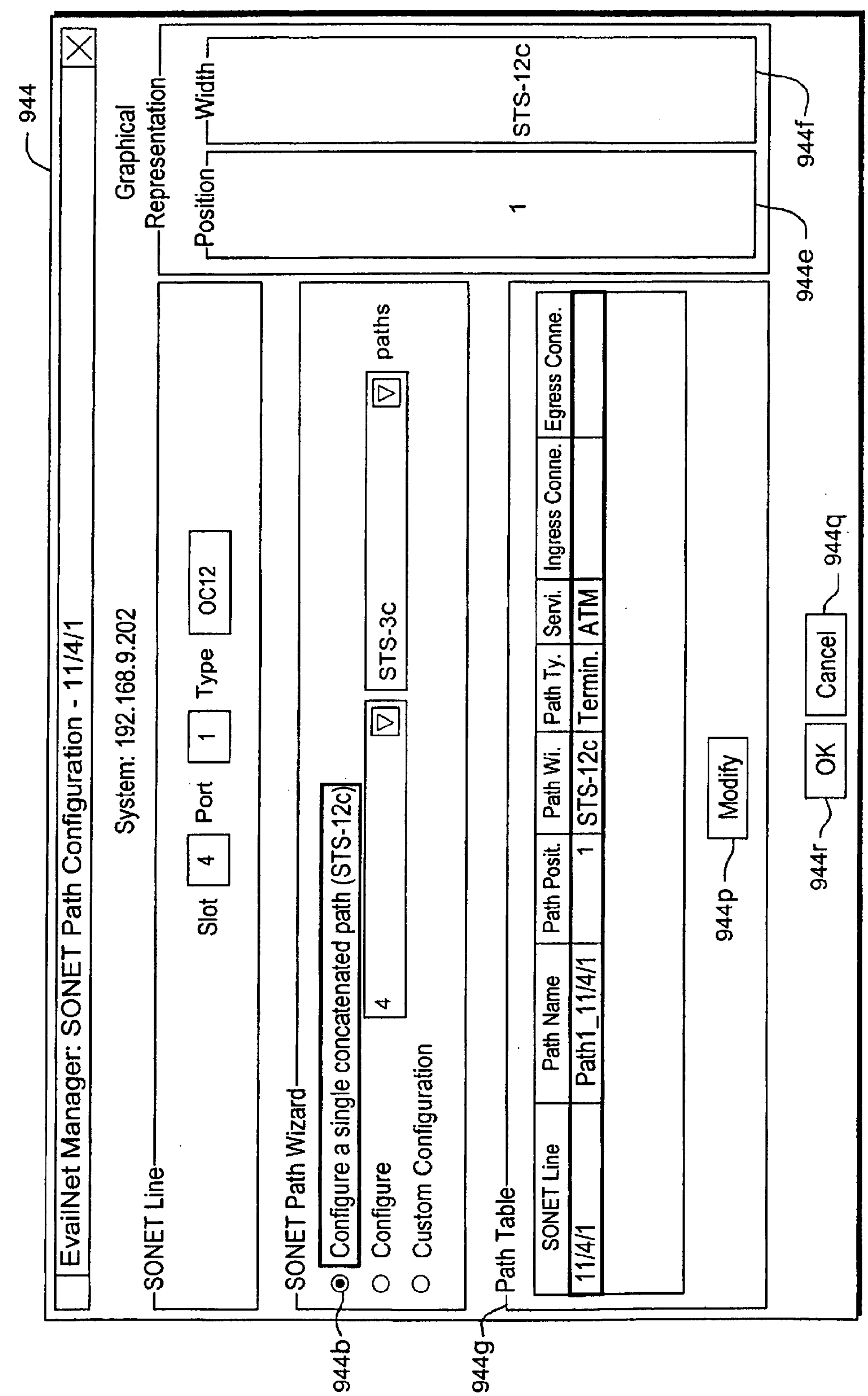

In one embodiment, the SONET Path wizard displays SONET line data 944*a* (e.g., slot 4, port 1, OC12) and three configuration choices 944*b,* 944*c* and 944*d.* The first two configuration choices provide "short cuts" to typical configurations. If the administrator selects the first configuration option 944*b* (FIG. 5*c*), the SONET Path wizard creates a single concatenated path. In the current example, the selected port is an OC12, and the single concatenated path is an STS-12c. The wizard assigns and graphically displays the position 944*e* and width 944*f* of the STS-12c path and also displays a SONET Path table 944*g* including an inventory having an entry for the SONET STS-12c path and each of the default parameters assigned to that SONET path. The position of each SONET path is chosen such that each path lines up on a valid boundary based on SONET protocol constraints.

Figure 5D:
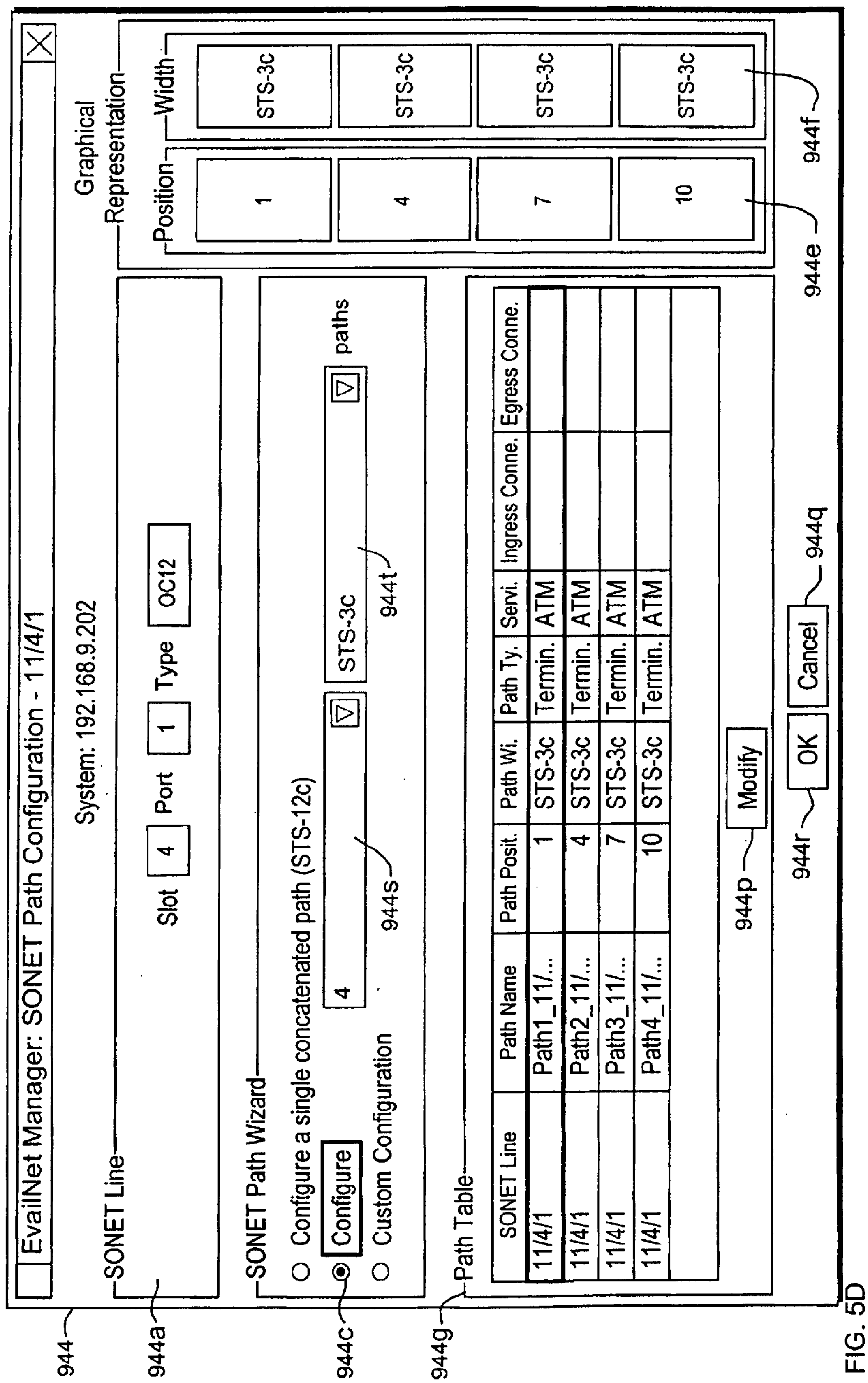
Figure 5E:
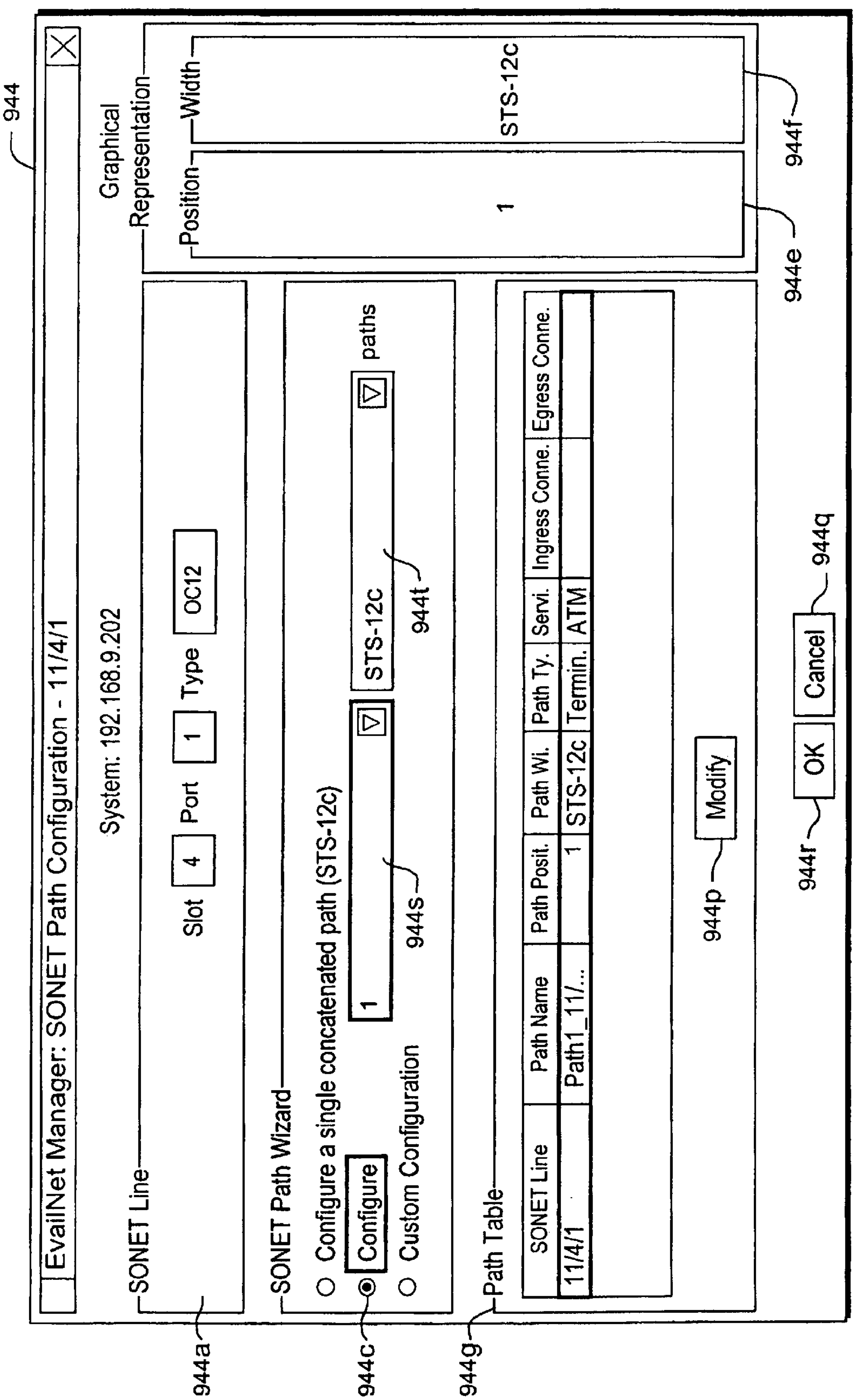

If the administrator selects the second configuration option 944*c* (FIGS. 5*d* and 5*e*), the SONET Path wizard creates one or more valid SONET paths that fully utilize the port capacity. In the current example, where the selected port is an OC12 port, in one embodiment, the second configuration option 944*c* allows the administrator to quickly create four STS-3c paths (FIG. 5*d*) or one concatenated STS-12c (FIG. 5*e*). The user may select the number of paths in window 944*s* or the type of path in window 944*t.* Windows 944*s* and 944*t* are linked and, thus, always present the user with consistent options. For example, if the administrator selects 4 paths in window 944*s,* window 944*t* displays STS-3c and if the administrator selects STS-12c in window 944*t,* window 944*s* displays 1 path. Again, the SONET path wizard graphically displays the position 944*d* and width 944*f* of the SONET paths created and also displays them in SONET Path table 944*g* along with the default parameters assigned to each SONET path.

The third configuration option allows the administrator to custom configure a port thereby providing the administrator with more flexibility. If the administrator selects the third configuration option 944*d* (FIG. 5*f*), the SONET Path wizard displays a function window 944*h.* The function window provides a list of available SONET Path types 944*i* and also displays an allocated SONET path window 944*j.* In this example, only the STS-3c path type is listed in the available SONET Path types window, and if the administrator wishes to configure a single STS-12c path, then they need to select the first or second configuration option 944*b* or 944*c.* To configure one or more SONET STS-3c paths, the administrator selects the STS-3c SONET path type and then selects ADD button 944*k.* The SONET Path wizard adds STS-3c path 944*l* to the allocated SONET paths window and then displays the position 944*e* and width 944*f* of the SONET path and updates Path table 944*g* with a listing of that SONET path including the assigned parameters. In this example, two STS-3c paths 944*l* and 944*m* are configured in this way on the selected port. The administrator may select an allocated path (e.g., 944*m* or 944*n*) in window 944*j* and then select the remove button 944*n* to delete a configured path, or the administrator may select the clear button 944*o* to delete each of the configured paths from window 944*j*. Moreover, the administrator may select an allocated path and use up arrow 944*u* and down arrow 944*v* to change the position 944*e*.

In any of the SONET Path windows (FIGS. 5*c*–5*f*), the administrator may select a path in the SONET path table and double click on the left mouse button or select a modify button 944*p* to cause the GUI to display a dialog box through which the administrator may modify the default parameters assigned to each path. The wizard validates each parameter change and prevents invalid values from being entered. The administrator may also select a cancel button 944*q* to exit the SONET path wizard without accepting any of the configured or modified paths. If, instead, the administrator wants to exit the SONET Path wizard and accept the configured SONET Paths, the administrator selects an OK button 944*r*.

Once the administrator selects the OK button, the NMS client validates the parameters as far as possible within the client's view of the device and passes (step 880, FIG. 3*g*) this run time/instance configuration data, including all configured SONET path parameters, to the NMS server. The NMS server validates (step 881) the data received based on its view of the world and if not correct, sends an error message to the NMS client, which notifies the administrator. Thus, the NMS server re-validates all data from the NMS clients to ensure that it is consistent with changes made by any other NMS client or by an administrator using the network device's CLI. After a successful NMS server validation, the Persistent layer software within the server uses this data to generate (step 882) SQL commands, which the server sends to the configuration database software executing on the network device. This is referred to as "persisting" the configuration change. Receipt of the SQL commands triggers a validation of the data within the network device as well. If the validation is not successful, then the network device sends an error message to the NMS server, and the NMS server sends an error message to the NMS client, which displays the error to the administrator. If the validation is successful, the configuration database software then executes (step 883) the SQL commands to fill in or change the appropriate configuration tables.

As just described, the configuration process provides a tiered approach to validation of configuration data. The NMS client validates configuration data received from an administrator according to its view of the network device. Since multiple clients may manage the same network device through the same NMS server, the NMS server re-validates received configuration data. Similarly, because the network device may be managed simultaneously by multiple NMS servers, the network device itself re-validates received configuration data. This tiered validation provides reliability and scalability to the NMS.

The configuration database software then sends (step 884) active query notices, described in more detail below, to appropriate applications executing within the network device to complete the administrator's configuration request (step 885). Active query notices may also be used to update the NMS database with the changes made to the configuration database. In addition, a Configuration Synchronization process running in the network device may also be notified through active queries when any configuration changes are made or, perhaps, only when certain configuration changes are made. As previously mentioned, the network device may be connected to multiple NMS Servers. To maintain synchronization, the Configuration Synchronization program broadcasts configuration changes to each attached NMS server. This may be accomplished by issuing reliable (i.e., over TCP) SNMP configuration change traps to each NMS server. Configuration change traps received by the NMS servers are then multicast/broadcast to all attached NMS clients. Thus, all NMS servers, NMS clients, and databases (both internal and external to the network device) remain synchronized.

Even a simple configuration request from a network administrator may require several changes to one or more configuration database tables. Under certain circumstances, all the changes may not be able to be completed. For example, the connection between the computer system executing the NMS and the network device may go down or the NMS or the network device may crash in the middle of configuring the network device. Current network management systems make configuration changes in a central data repository and pass these changes to network devices using SNMP "sets". Since changes made through SNMP are committed immediately (i.e., written to the data repository), an uncompleted configuration (series of related "sets") will leave the network device in a partially configured state (e.g., "dangling" partial configuration records) that is different from the configuration state in the central data repository being used by the NMS. This may cause errors or a network device and/or network failure. To avoid this situation, the configuration database executes groups of SQL commands representing one configuration change as a relational database transaction, such that none of the changes are committed to the configuration database until all commands are successfully executed. The configuration database then notifies the server as to the success or failure of the configuration change and the server notifies the client. If the server receives a communication failure notification, then the server re-sends the SQL commands to restart the configuration changes. Upon the receipt of any other type of failure, the client notifies the user.

Figure 5F:
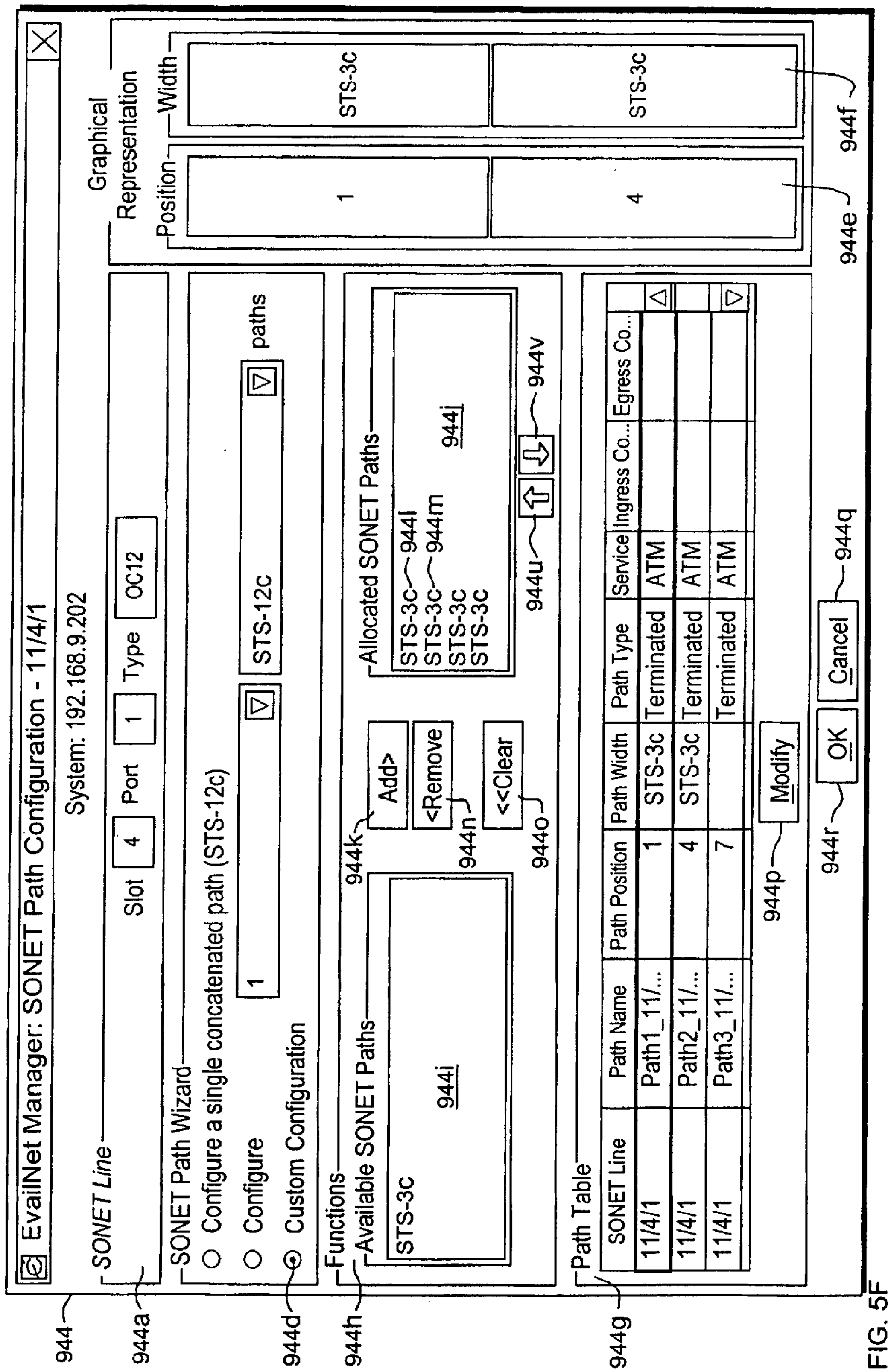
Figure 5G:
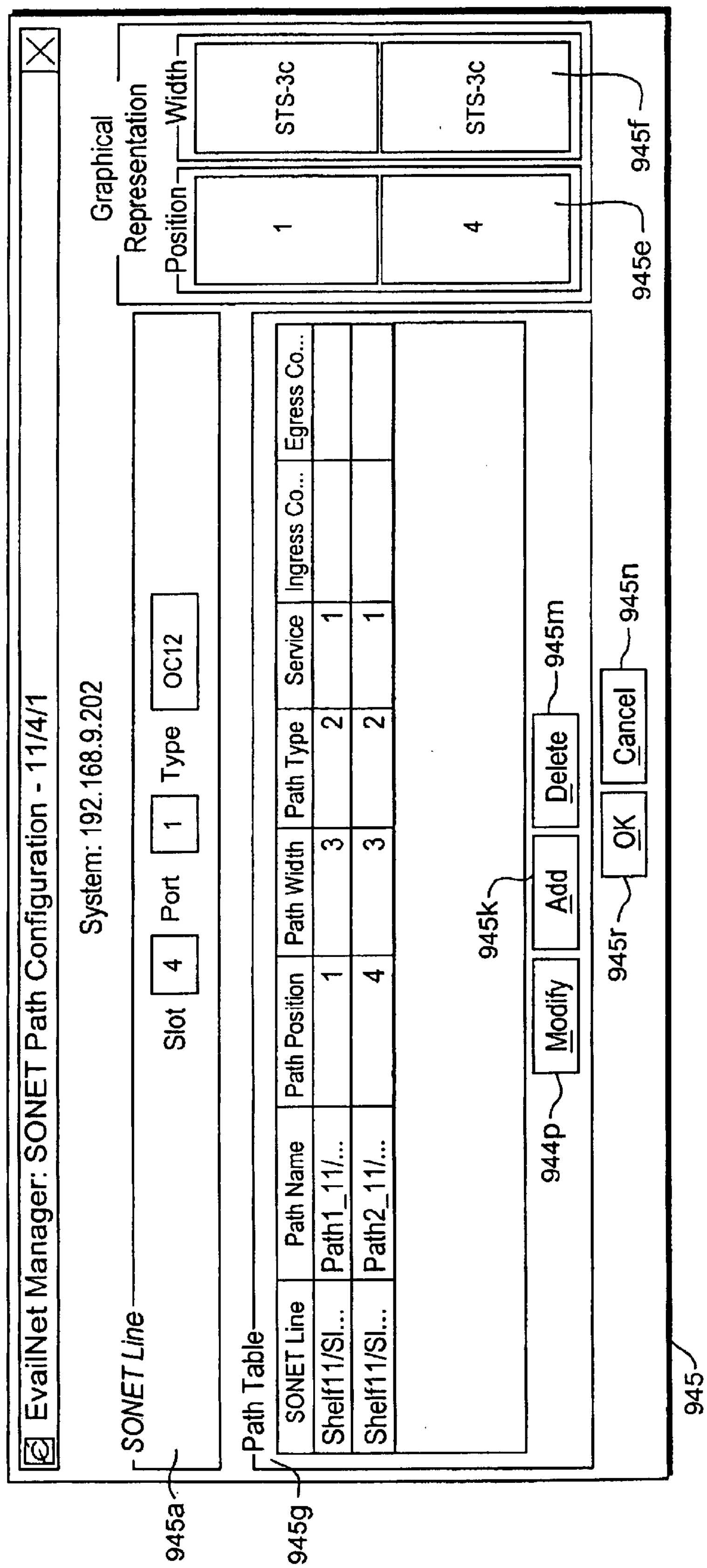

If the administrator now selects the same port 939*a* (FIG. 5*a*), clicks the right mouse button and selects the Configure SONET Paths option in pop-up menu 943, the SONET path wizard may be displayed as shown in FIG. 5*f*, or alternatively, a SONET Path Configuration dialog box 945 (FIG. 5*g*) may be displayed. The SONET Path dialog box is similar to the SONET Path wizard except that it does not include the three configuration options 944*b*–944*d*. Similar to the SONET Path wizard, dialog box 945 displays SONET line data 945*a* (e.g., slot 4, port 1, OC12), SONET Path table 945*g* and SONET path position 945*e* and width 945*f*. The administrator may modify parameters of a configured SONET path by selecting the path in the Path table and double clicking the right mouse button or selecting a Modify button 945*p*. The administrator may also add a SONET path by selecting an Add button 945*k*, which causes the SONET path dialog box to display another SONET path in the path table. Again, the administrator may modify the parameters by selecting the new SONET path and then the Modify button. The administrator may also delete a SONET path by selecting it within the SONET Path table and then selecting a Delete button 945*m*. The administrator may cancel any changes made by selecting a Cancel button 945*n*, or the administrator may commit any changes made by selecting an OK button 945*r*.

The SONET path wizard provides the administrator with available and valid configuration options. The options are consistent with constraints imposed by the SONET protocol and the network device itself. The options may be further limited by other constraints, for example, customer subscription limitations. That is, ports or modules may be associated with particular customers and the SONET Path wizard may present the administrator with configuration options that match services to which the customer is entitled and no more. For example, a particular customer may have only purchased service on two STS-3c SONET paths on an OC12 SONET port, and the SONET Path wizard may prevent the administrator from configuring more than these two STS-3c SONET paths for that customer.

By providing default values for SONET Path parameters and providing only configuration options that meet various protocol, network device and other constraints, the process of configuring SONET paths is made simpler and more efficient, the necessary expertise required to configure SONET paths is reduced and the potential for mis-configurations is reduced. In addition, as the administrator provides input to the SONET path configuration wizard, the wizard validates the input and presents the administrator with configuration options consistent with both the original constraints and the administrator's configuration choices. This further reduces the necessary expertise required to configure SONET paths and further minimizes the potential for mis-configurations. Moreover, short cuts presented to the administrator may increase the speed and efficiency of configuring SONET paths.

Figure 5H:
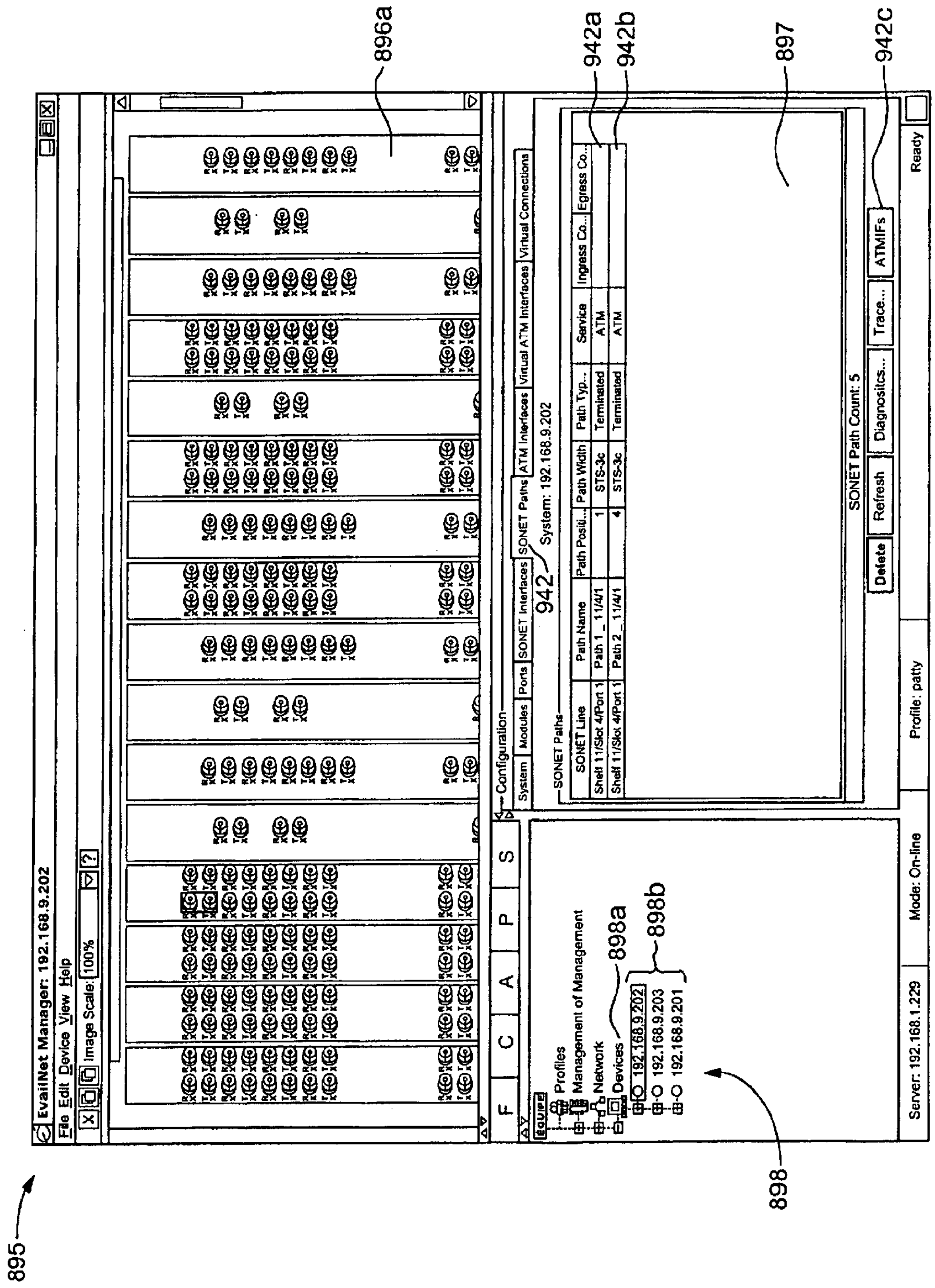

If the administrator now selects SONET path tab 942 (FIG. 5*h*), GUI 895 displays an inventory including the two STS-3c paths (942*a* and 942*b*) just configured. The SONET path tab includes information about each SONET path, such as SONET line information (e.g., shelf, slot and port), Path Position, Path Width, Ingress Connection and Egress Connection. It may also include Path Type and Service (e.g., Terminated ATM, Switched SONET), and a Path Name. The SONET Path configuration wizard may automatically assign the Path Name based on the shelf, slot and port. Parameters, such as Path Name, Path Width, Path Number and Path Type, may be changed by selecting a SONET path from the inventory and double clicking on that SONET path or selecting a Modify button (not shown) causing a dialog box to appear. The administrator may type in different parameter values or select from a pull-down list of available options within the dialog box.

Figure 5I:
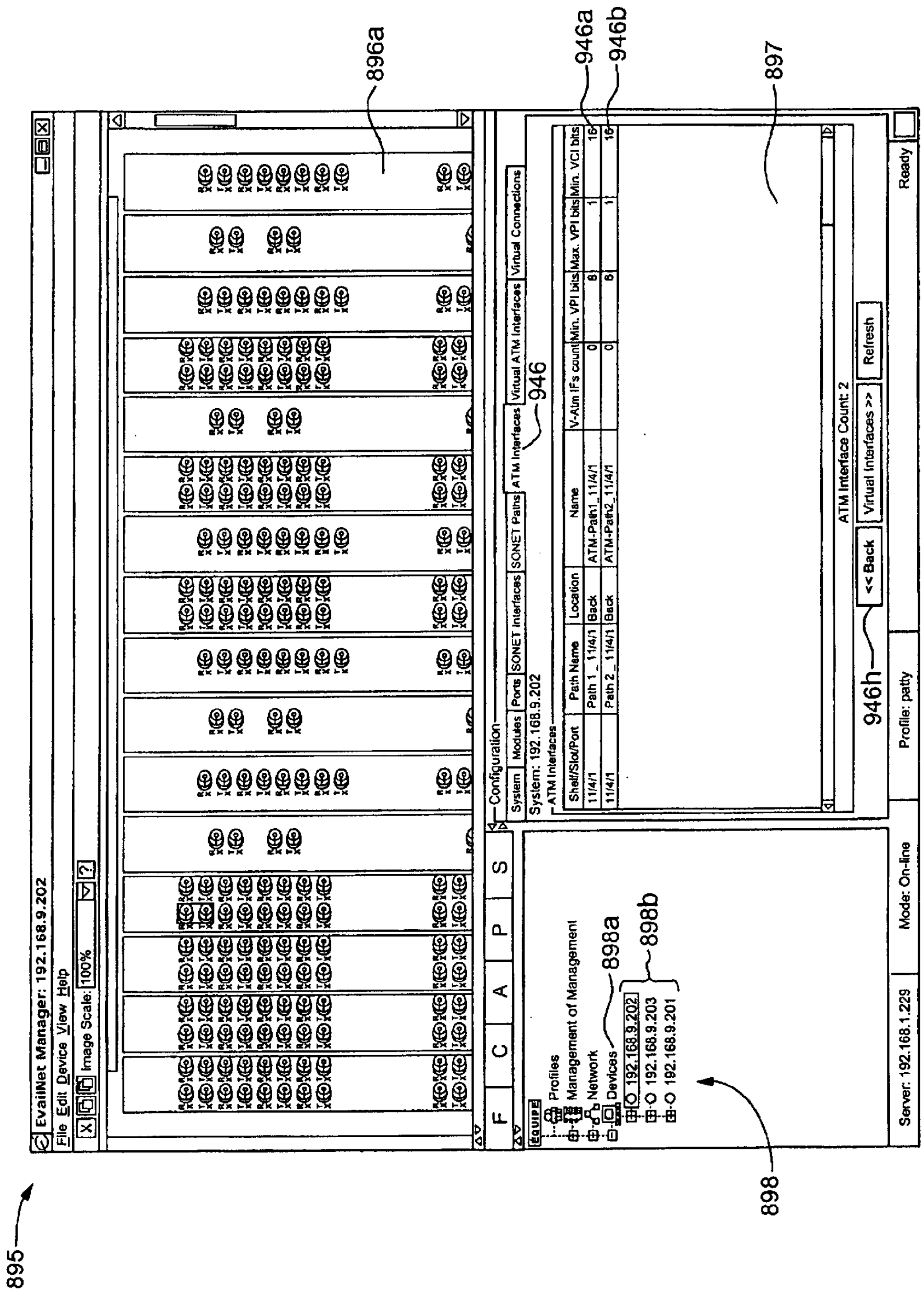

Similarly, if the administrator selects an ATM Interfaces button 942*c* or directly selects the ATM Interfaces tab 946 (FIG. 5*i*), GUI 895 displays an inventory including two ATM interfaces (946*a* and 946*b*) corresponding to the two STS-3c paths just configured. The SONET Path configuration wizard automatically assigns an ATM interface name based again on the shelf, slot and port. The SONET Path wizard also automatically assigns a minimum VPI bits and maximum VPI bits and a minimum and maximum VCI bits. Again, the ATM Interfaces tab lists information such as the shelf, port and slot as well as the Path name and location of the card. The ATM Interfaces tab also lists the Virtual ATM (V-ATM) interfaces (IF) count. Since no virtual ATM interfaces have yet been configured, this value is zero and Virtual ATM Interfaces tab 947 and Virtual Connections tab 948 do not yet list any information. The administrator may return to the SONET Paths tab to configure additional SONET paths by selecting a Back button 946*h* or by directly selecting the SONET Paths tab.

Figure 5J:
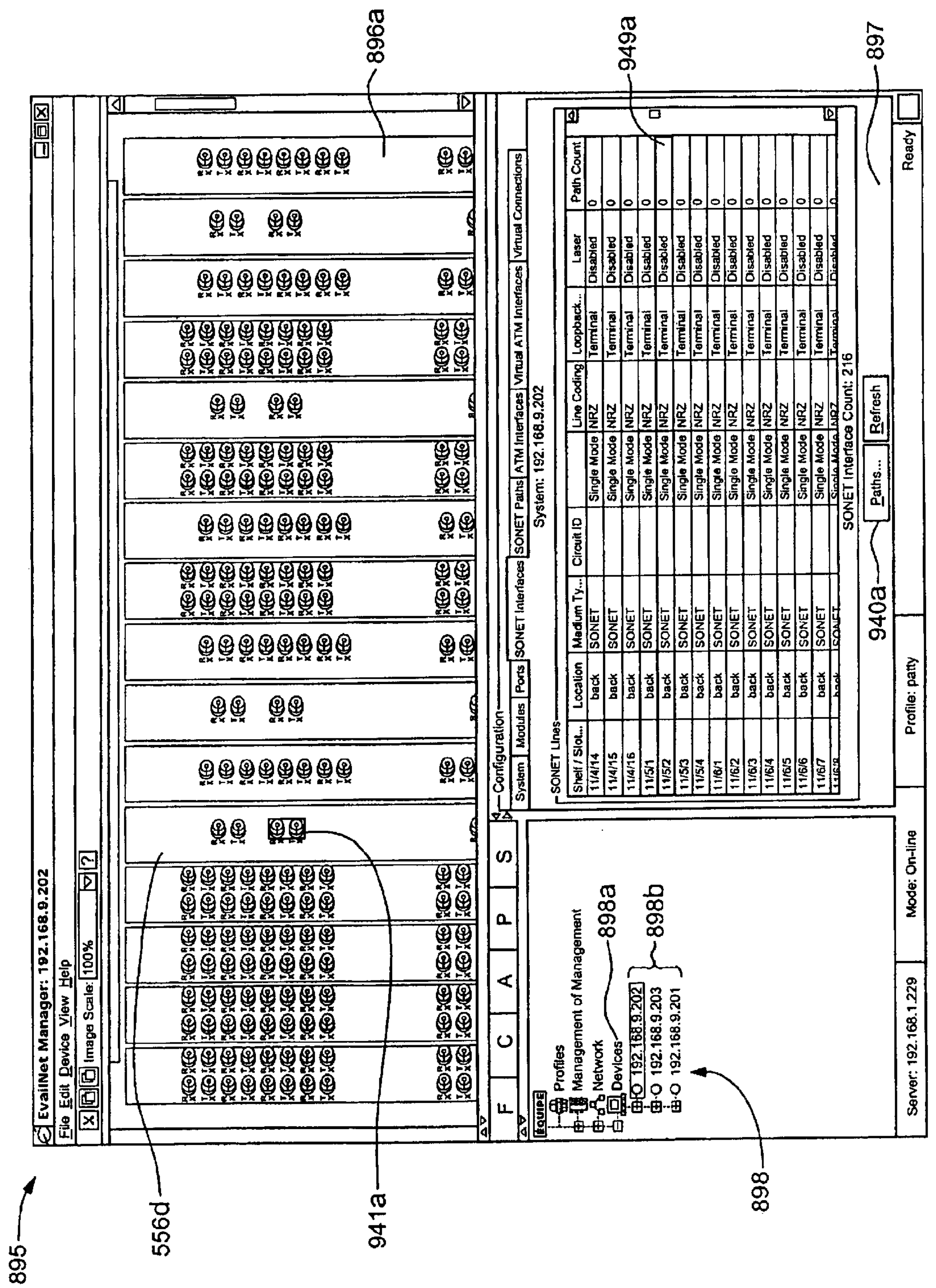
Figure 5K:
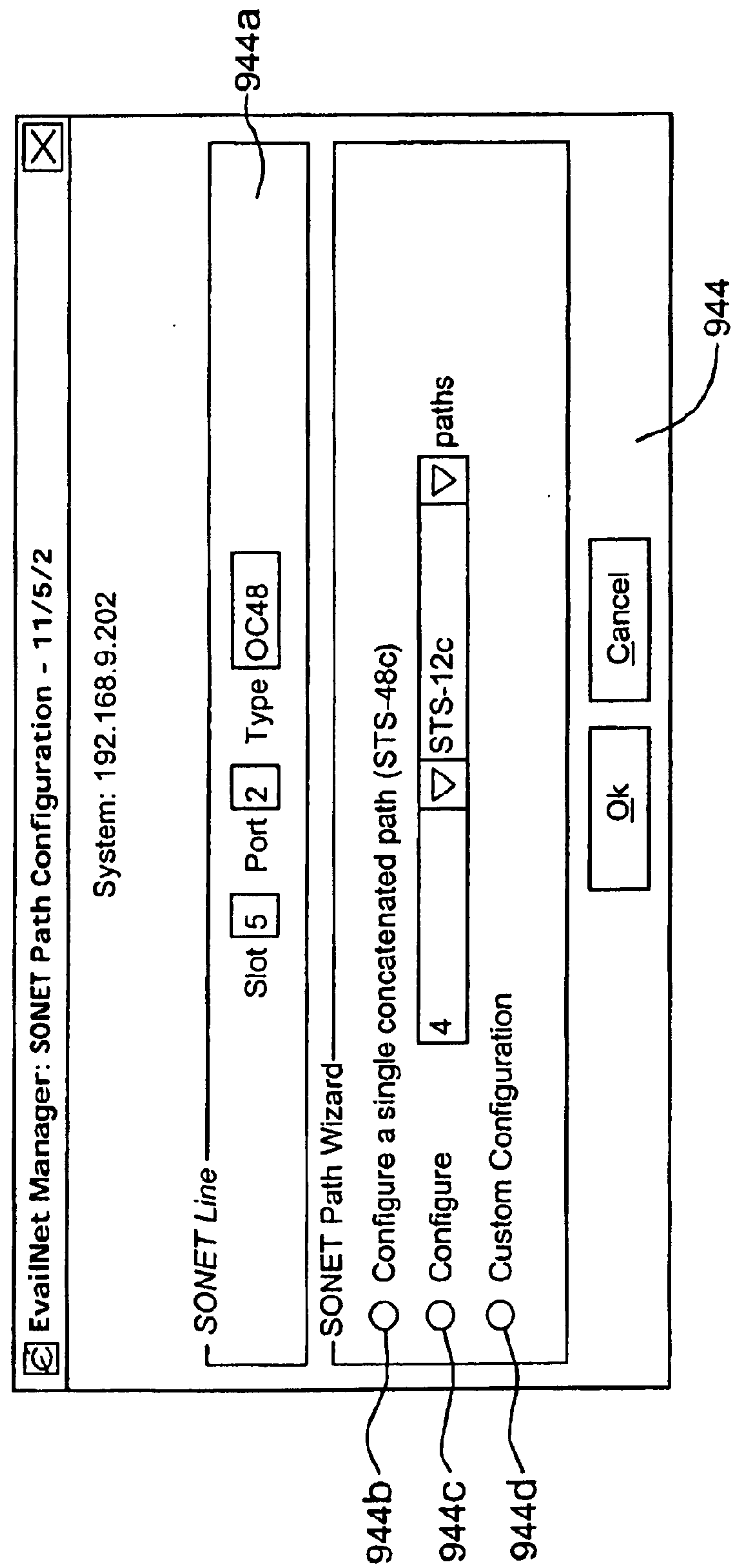

Referring to FIG. 5*j*, instead of selecting a port (e.g., 939*a*, FIG. 5*a*) and then selecting a Configure SONET Paths option from a pop-up menu, the administrator may instead select a path from the inventory of paths in SONET Interfaces tab 940 and then select a Paths button 940*a* to cause SONET Path wizard 944 (FIG. 5*k*) to be displayed. For example, the administrator may select line 949*a* corresponding to port 941*a* on card 556*d* and then select Paths button 940*a* to cause SONET Path wizard 944 to be displayed. As shown, SONET line data 944*a* indicates that this is port two in slot 5 and is an OC48 type port. Again, the administrator is presented with three configuration options 944*b*, 944*c* and 944*d*.

Figure 5L:
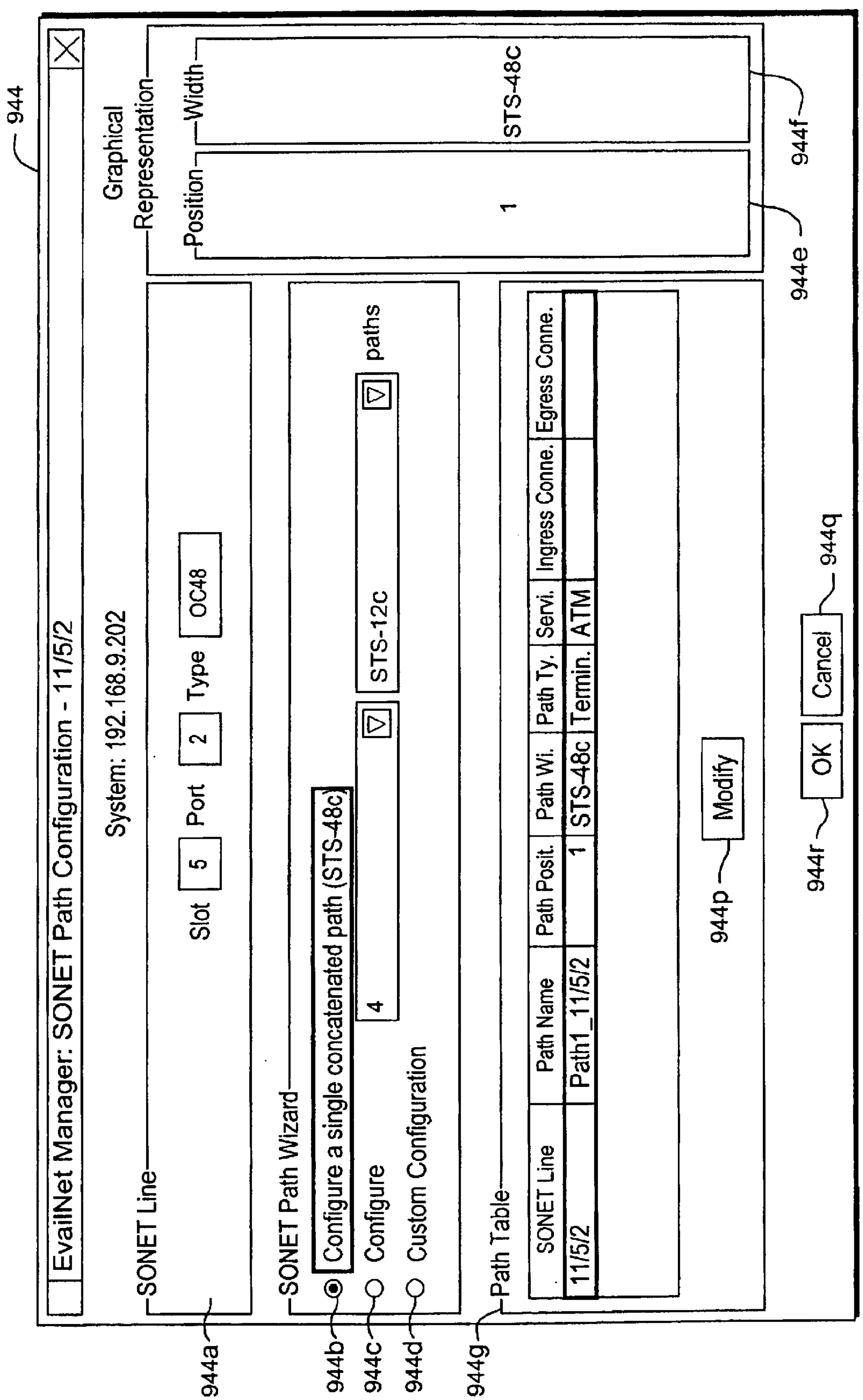
Figure 5M:
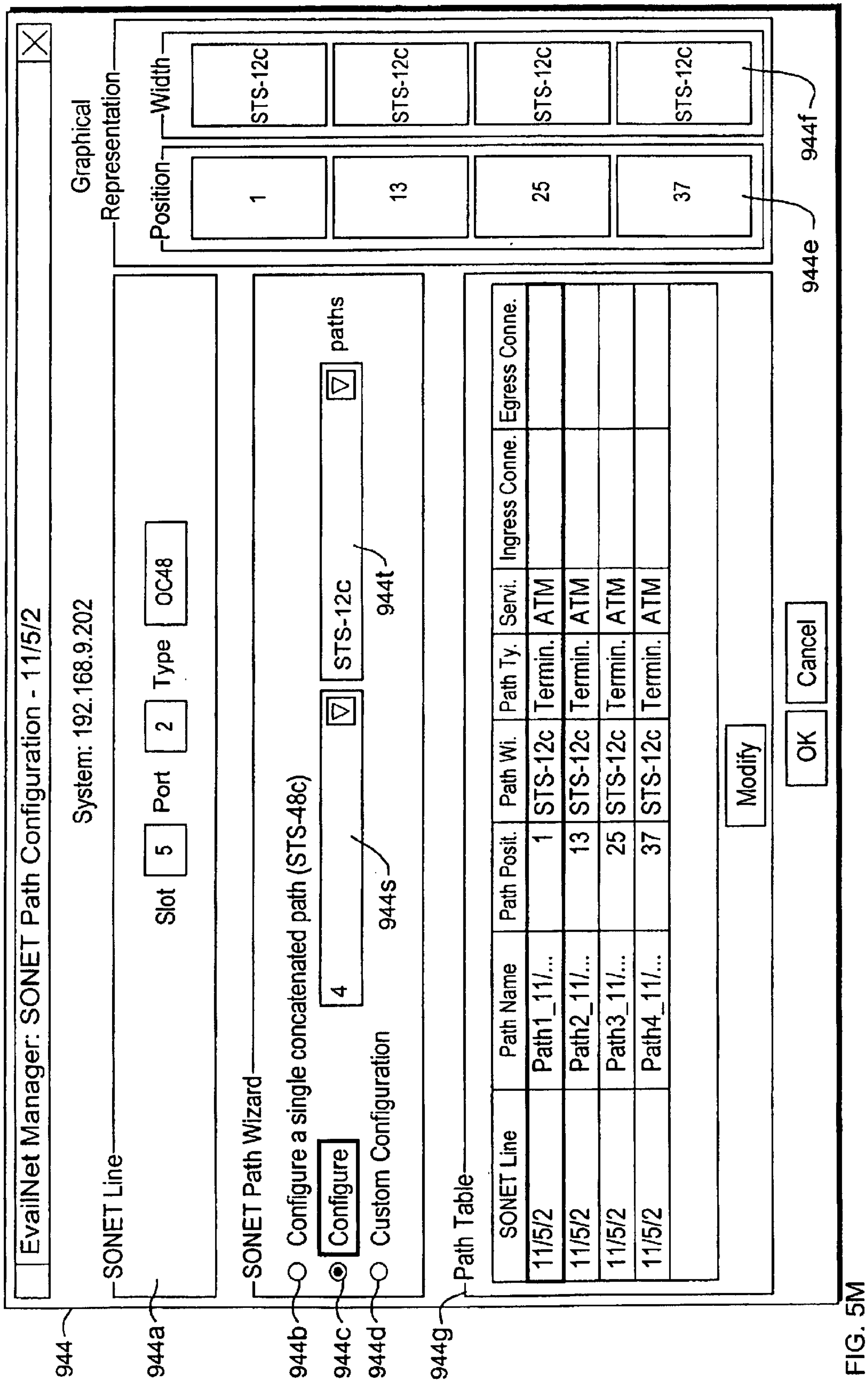
Figure 5N:
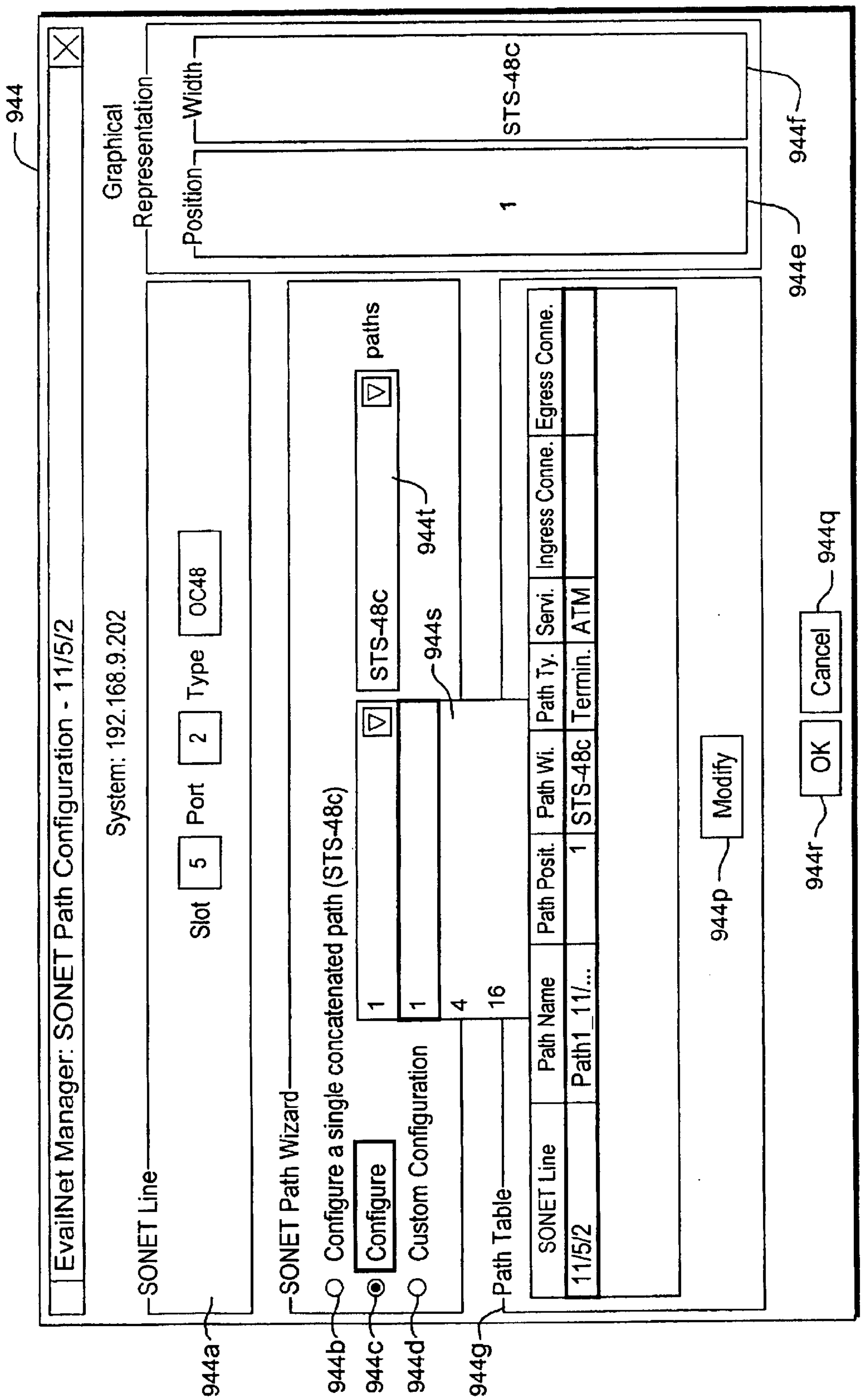
Figure 5O:
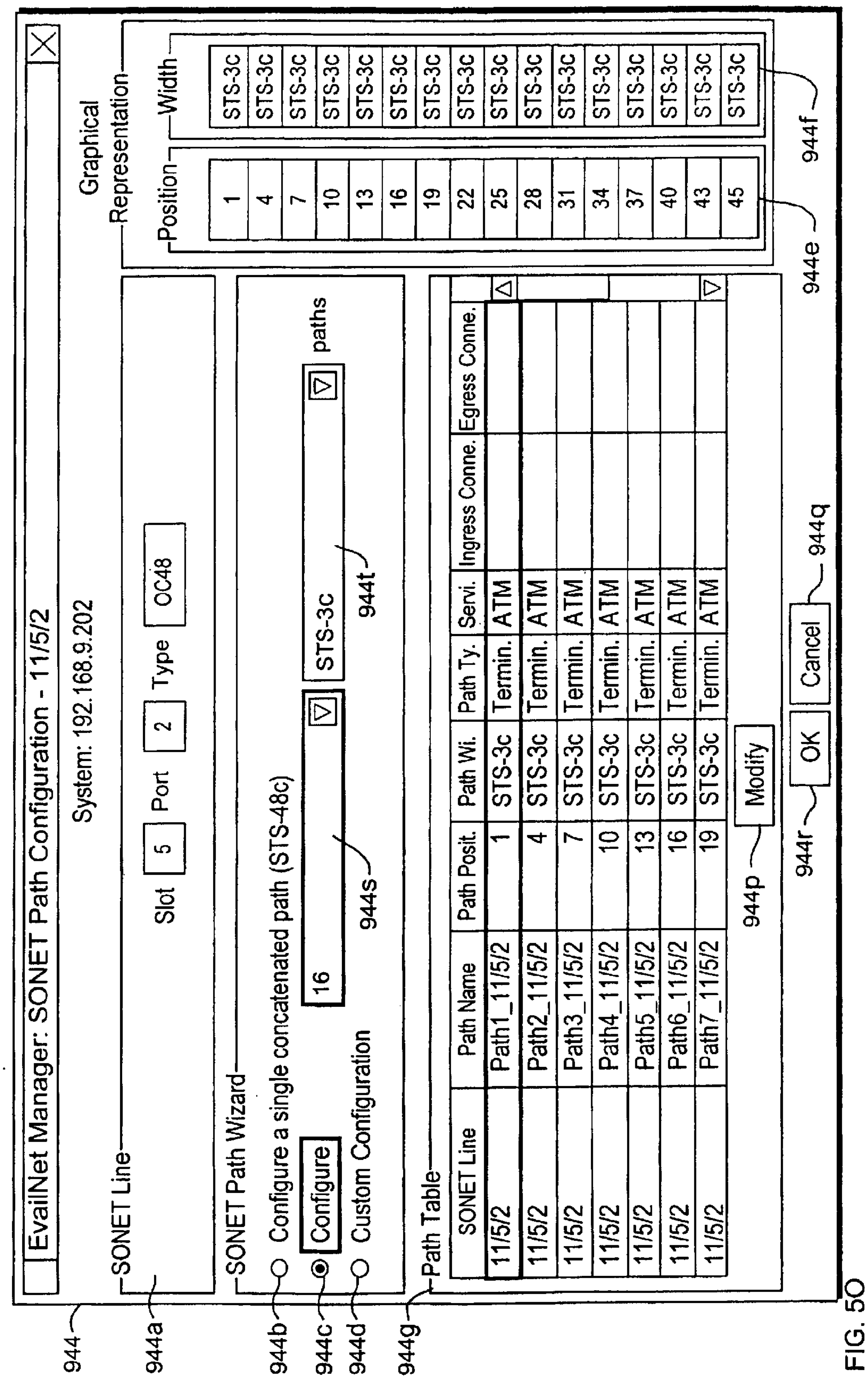
Figure 5P:
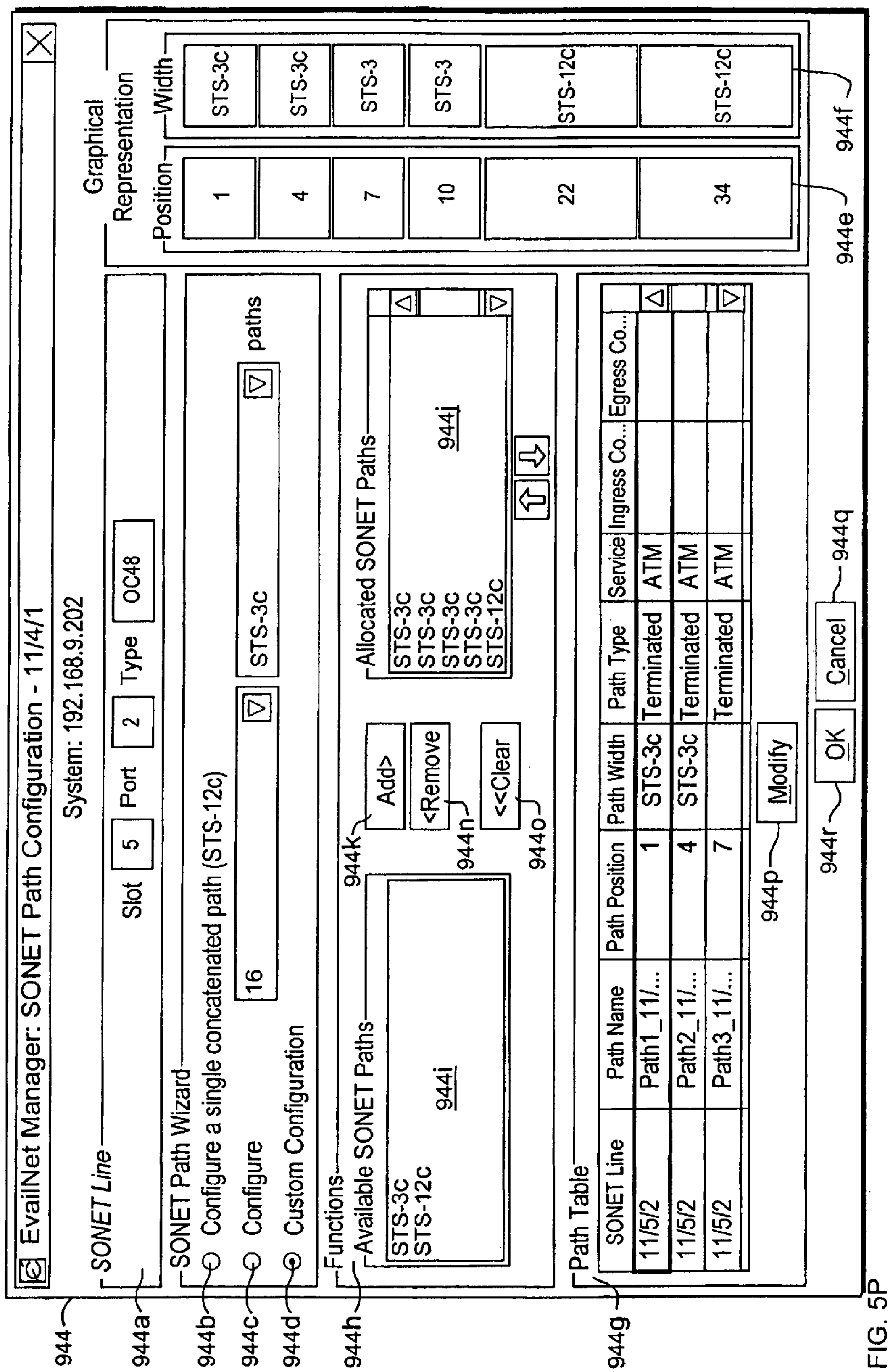

If the administrator selects option 944*b* (FIG. 5*l*), then the SONET Path Wizard creates a single STS-48c concatenated SONET Path and inventories the new path in Path table 944*g* and displays the path position 944*e* and path width 944*f*. If the administrator instead selects option 944*c* (FIGS. 5*m*–5*o*), the SONET Path wizard creates one or more valid SONET paths that fully utilize the port capacity. For example, as pull down window 944*s* (FIG. 5*n*) shows one single concatenated STS-48c path (FIG. 5*n*) may be created, four STS-12c paths (FIG. 5*m*), or sixteen STS-3c paths (FIG. 5*o*) may be created. Instead, the administrator may select option 944*d* (FIG. 5*p*) to custom configure the port. Again, function window 944*h* is displayed including a list of Available SONET Path types 944*i* and a list of Allocated SONET Paths 944*j*. In this instance where the port is an OC48, both an STS-3c and STS-12c are listed as available SONET Path types. The administrator may select one and then select Add button 944*k* to add a path to the Allocated SONET Paths list and cause the wizard to display the path in Path Table 944*g* and to display the path position 944*e* and width 944*f*. In this example, two STS-3c paths are added in positions 1 and 4 and two STS-12c paths are added in positions 22 and 34.

Now when the administrator selects SONET Paths tab 942 (FIG. 5*q*), the inventory of paths includes the four new paths (942*c*–942*f*). Similarly, when the administrator selects ATM Interfaces tab 946 (FIG. 5*r*), the inventory of ATM interfaces includes four new interfaces (946*c*–946*f*) corresponding to the newly created SONET paths. Instead of selecting a port in device mimic 896*a* and then the Configure SONET Paths option from a pop-up menu and instead of selecting a SONET interface in the SONET Interfaces tab and then selecting the Paths button, the SONET Path wizard may be accessed by the administrator from any view in the GUI by simply selecting a Wizard menu button 951 and then selecting a SONET Path option 951*a* (FIG. 5*q*) from a pull-down menu 951*b*. When the SONET path wizard appears, the SONET line data (i.e., slot, port and type) will be blank, and the administrator simply needs to provide this information to allow the SONET path wizard to select the appropriate port. If the administrator selects a port in the Ports tab prior to selecting the SONET path option from the wizard pull-down menu, then the SONET wizard will appear with this information displayed as the SONET line data but the administrator may modify this data to select a different port from the SONET wizard.

To create virtual connections between various ATM Interfaces/SONET Paths within the network device, the administrator first needs to create one or more virtual ATM interfaces for each ATM interface. At least two virtual ATM interfaces are required since two discrete virtual ATM interfaces are required for each virtual connection. In the case of a multipoint connection there will be one root ATM interface and many leafs. To do this, the administrator may select an ATM interface (e.g., 946*b*) from the inventory in the ATM Interfaces tab and then select a Virtual Interfaces button 946*g* to cause Virtual Interfaces tab 947 (FIG. 5*s*) to appear and display an inventory of all virtual interfaces associated with the selected ATM interface. In this example, no virtual ATM interfaces have yet been created, thus, none are displayed.

The Virtual ATM Interfaces tab also includes a device navigation tree 947*a*. The navigation tree is linked with the Virtual Interfaces button 946*g* (FIG. 5*r*) such that the device tree highlights the ATM interface (e.g., ATM-Path2_11/4, FIG. 5*s*) that was selected when the Virtual Interfaces button was selected. When the Virtual Interfaces button is selected, the NMS client automatically requests virtual interface data corresponding to the selected ATM interface from the NMS server and then the NMS client displays this data in the Virtual ATM Interfaces tab. This saves memory space within the NMS client since only a small amount of data relevant to the virtual ATM interfaces associated with the selected ATM interface must be stored. In addition, since the amount of data is small, the data transfer is quick and reduces network traffic.

Instead the administrator may directly select Virtual ATM Interfaces tab 947 and then use the device tree 947*a* to locate the ATM interface they wish to configure with one or more virtual ATM interfaces. In this instance, the NMS client may again automatically request virtual interface data from the NMS server, or instead, the NMS client may simply use data stored in cache.

To return to the ATM Interfaces tab, the administrator may select a Back button 947*d* or directly select the ATM Interfaces tab. Once the appropriate ATM interface has been selected (e.g., ATM-Path2_11/4/1) in the Virtual ATM Interfaces tab device tree 947*a,* then the administrator may select an ADD button 947*b* to cause a virtual ATM (V-ATM) Interfaces dialog box 950 (FIG. 5*t*) to appear.

GUI 895 automatically fills in dialog box 950 with default values for Connection type 950*a,* Version 950*b* and Administration Status 950*c*. The administrator may provide a Name or Alias 950*d* and may modify the other three parameters by selecting from the options provided in pull down menus. This and other dialog boxes may also have wizard-like properties. For example, only valid connection types, versions and administrative status choices are made available in corresponding pull-down menus. For instance, Version may be UNI Network 3.1, UNI Network 4.0, IISP User 3.0, IISP User 3.1, PNNI, IISP Network 3.0 or IISP Network 3.1, and Administration Status may be Up or Down. When Down is selected, the virtual ATM interface is created but not enabled. With regard to connection type, for the first virtual ATM interface created for a particular ATM interface, the connection type choices include Direct Link or Virtual Uni. However, for any additional virtual ATM interfaces for the same ATM interface the connection type choices include only Logical Link. Hence the dialog box provides valid options to further assist the administrator. When finished, the administrator selects an OK button 950*e* to accept the values in the dialog box and cause the virtual ATM interface (e.g., 947*c,* FIG. 5*u*) to be inventoried in Virtual ATM tab 947.

The administrator may then select ADD button 947*b* again to add another virtual ATM interface to the selected ATM interface (ATM-Path2_11/4/1). Instead, the administrator may use device tree 947*a* to select another ATM interface, for example, ATM path 946*c* (FIG. 5*r*) designated ATM-Path1_11/5/2 (FIG. 5*v*) in device tree 947*a*. The administrator may again select the ADD button or the administrator may select port 941*a* on card 556*d,* click the right mouse button and select the "Add Virtual Connection" option from pop-up menu 943. This will again cause dialog box 950 (FIG. 5*t*) to appear, and the administrator may again modify parameters and then select OK button 950*e* to configure the virtual ATM interface.

Figure 5Q:
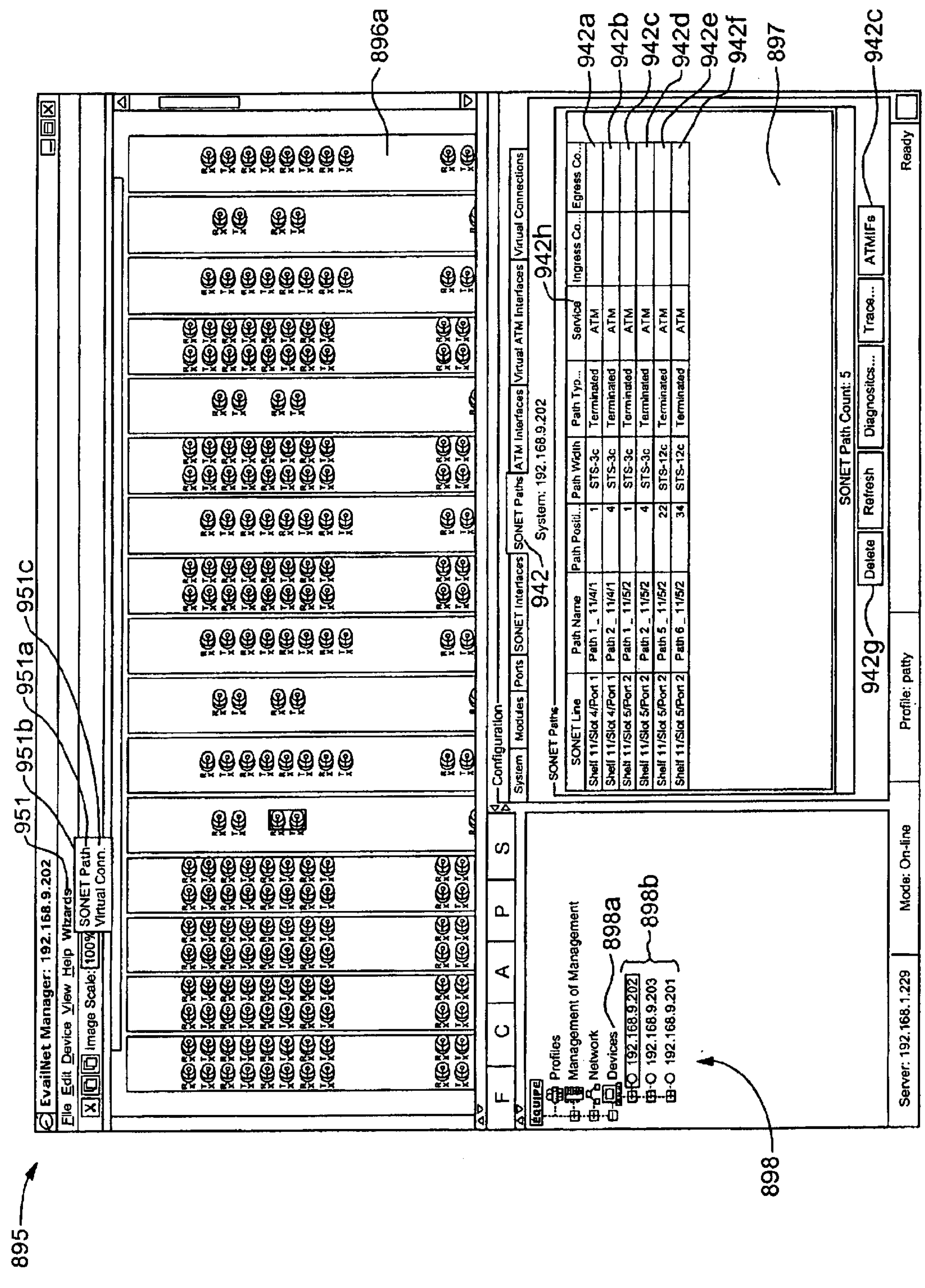
Figure 5R:
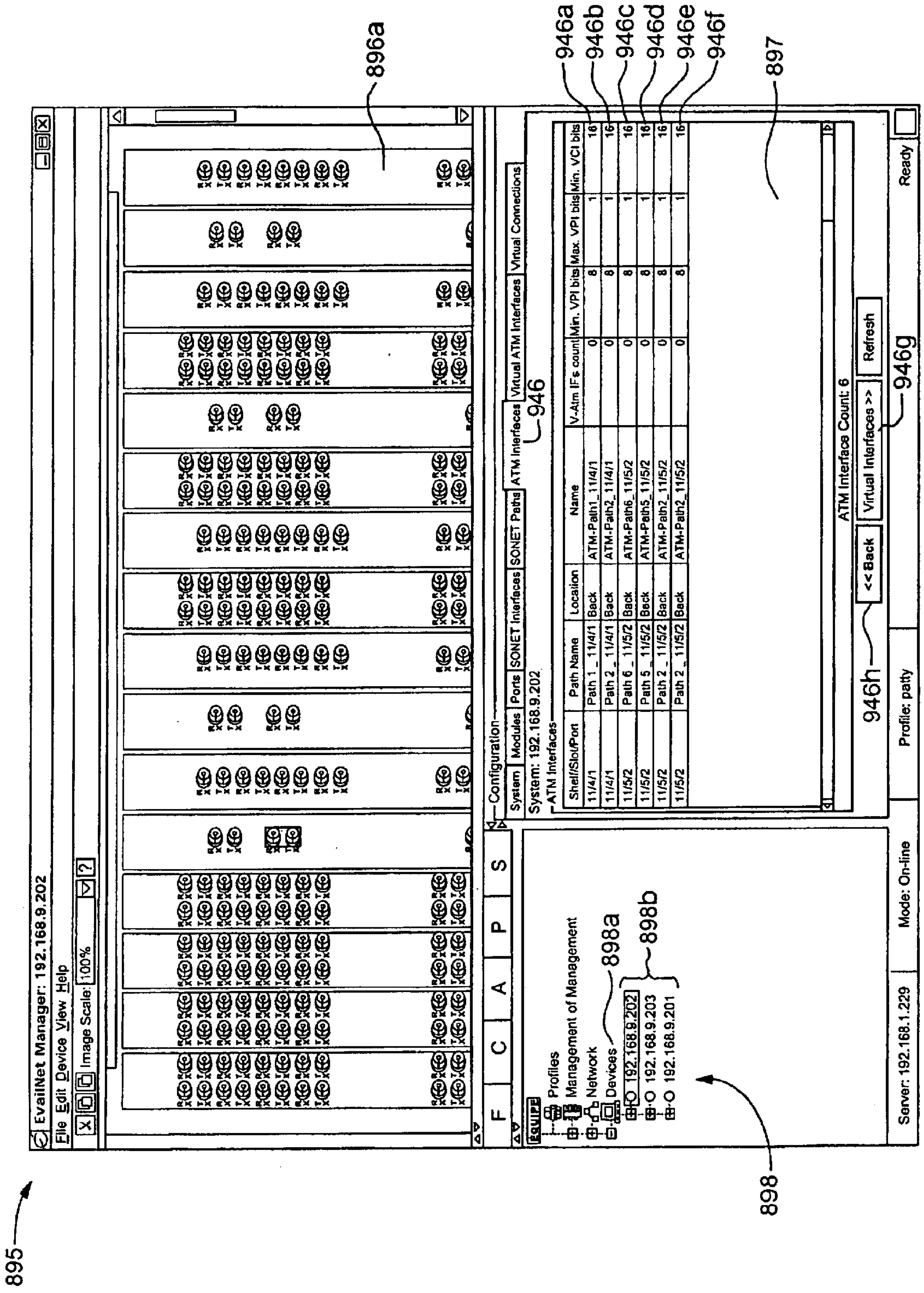
Figure 5S:
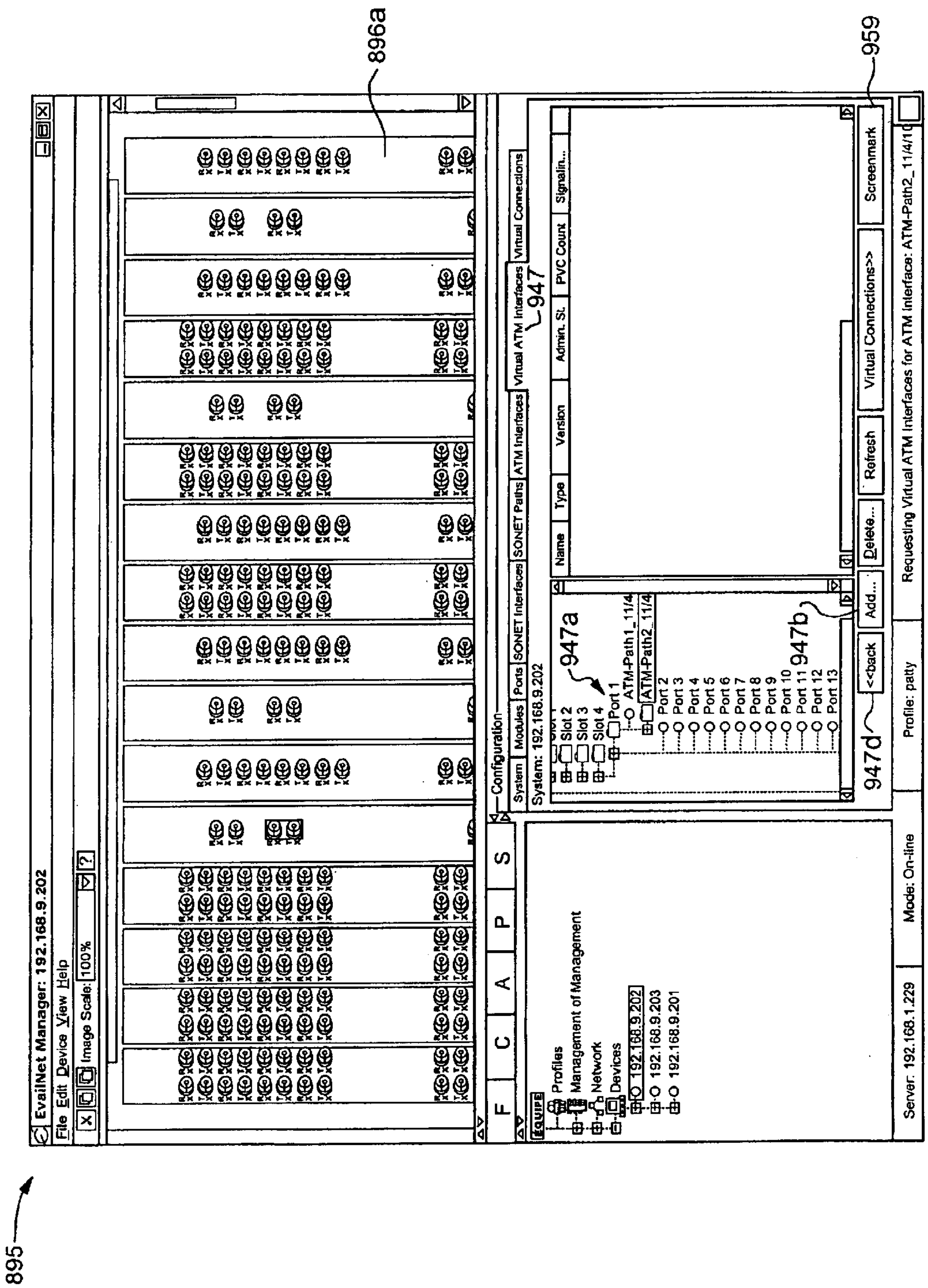
Figure 5T:
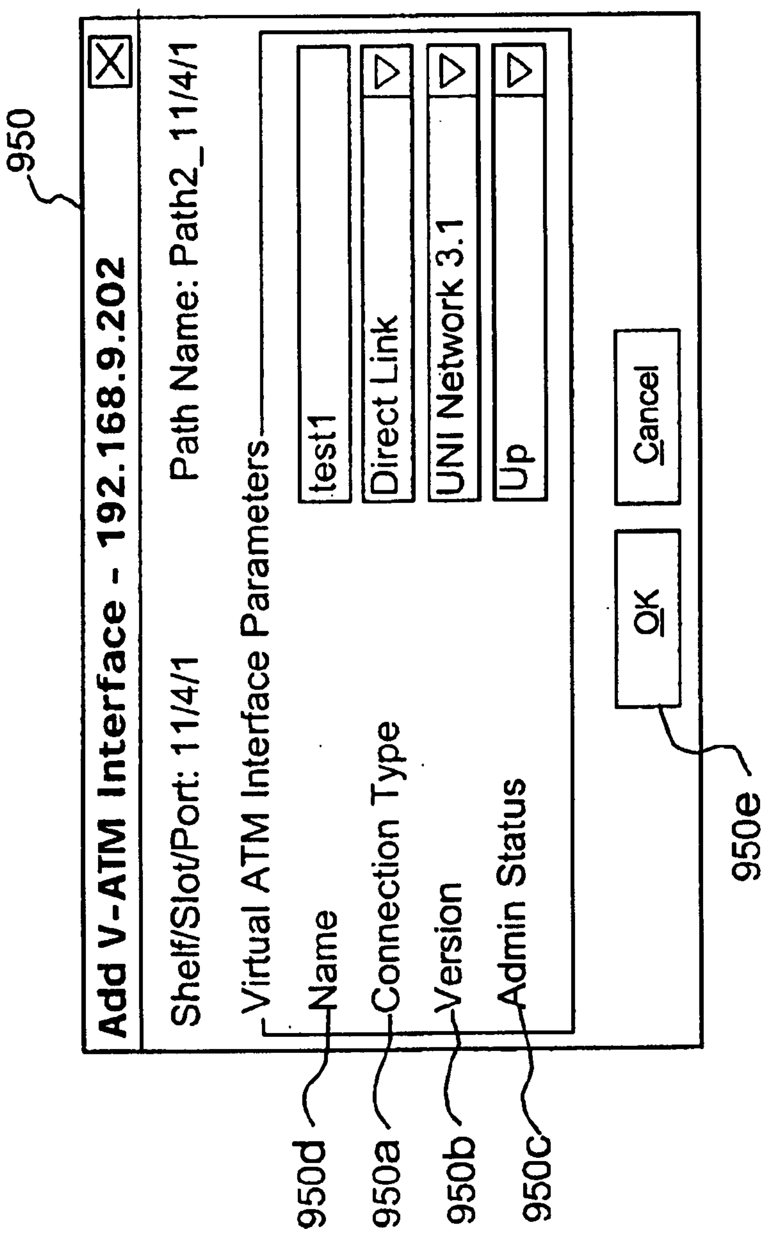
Figure 5U:
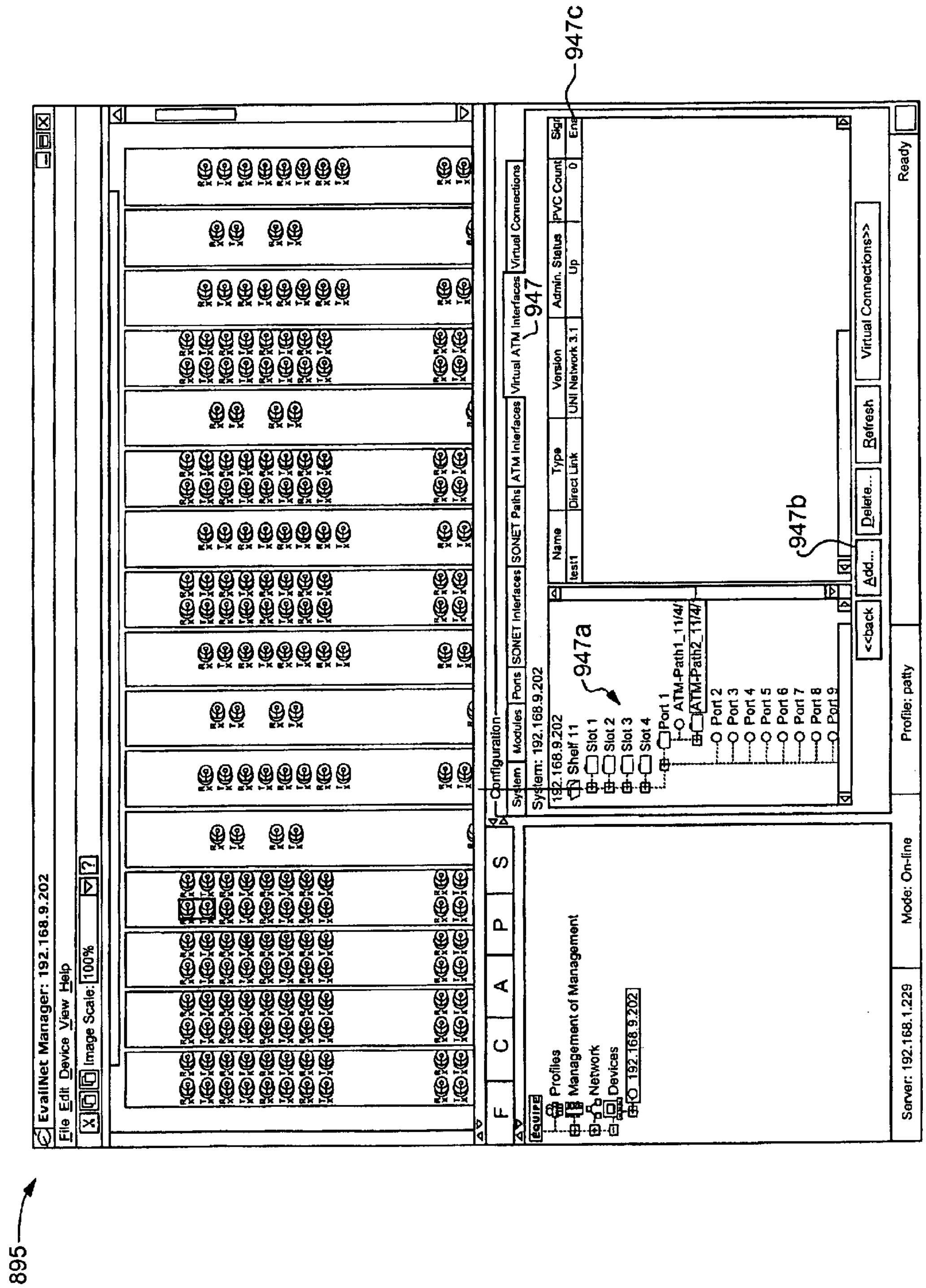
Figure 5V:
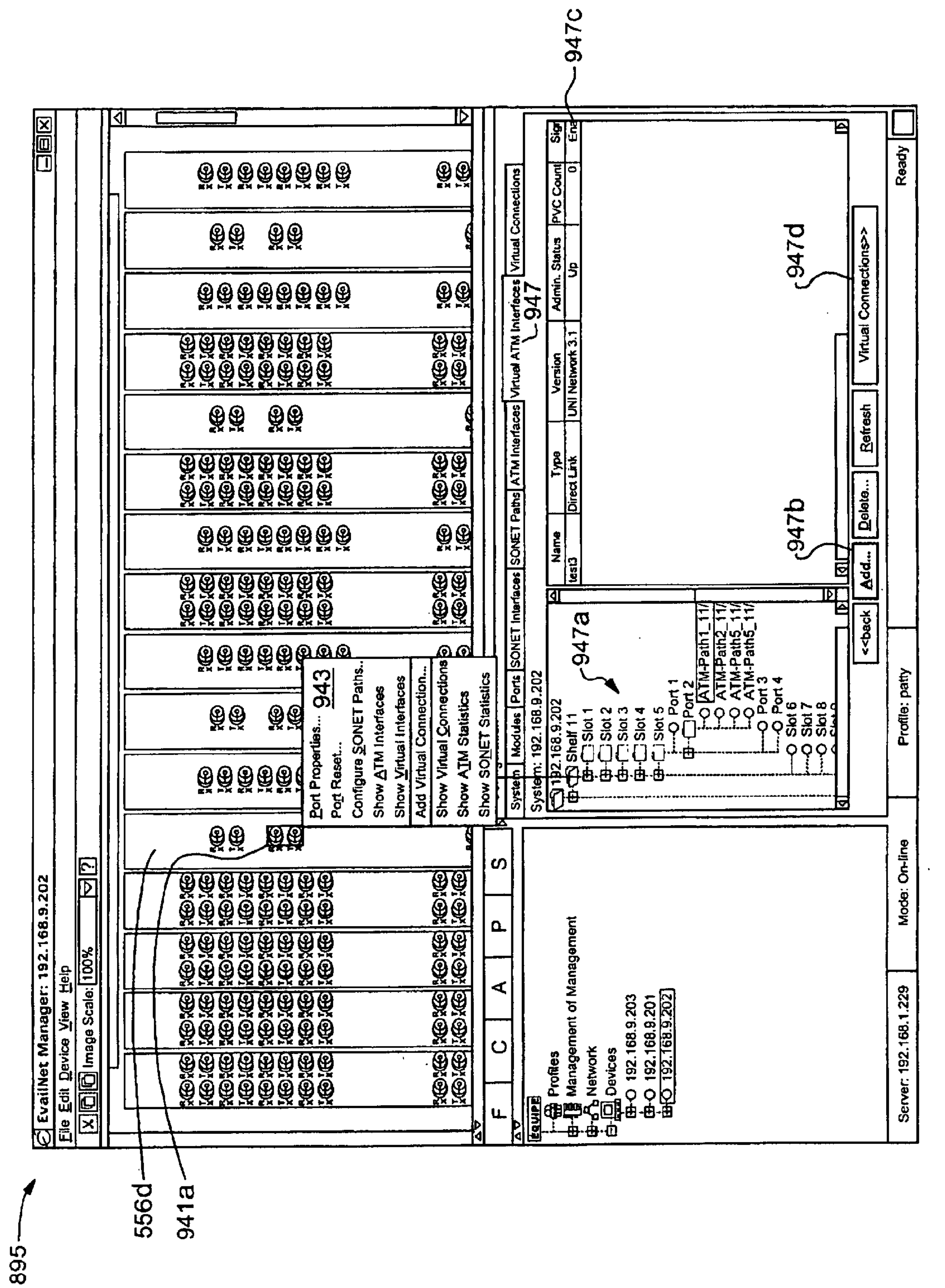
Figure 5W:
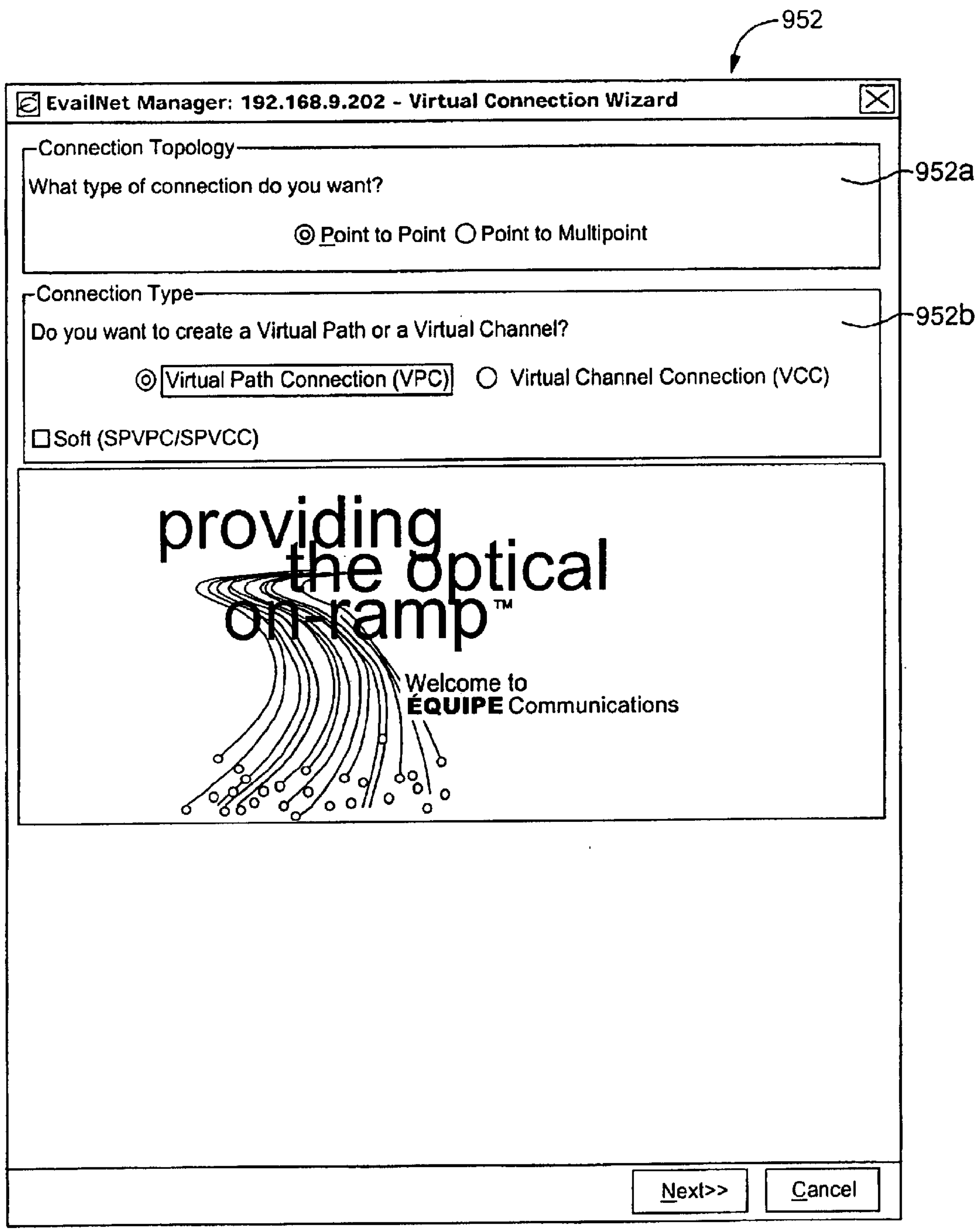

To create a virtual connection, the administrator selects a virtual ATM interface (e.g., 947*c,* FIG. 5*v*) and then selects a Virtual Connections button 947*d* or a Virtual Connection option 951*c* (FIG. 5*q*) from wizard pull-down menu 951*b*. This causes GUI 895 to start a Virtual Connection configuration wizard 952 (FIG. 5*w*). Just as the SONET Path configuration wizard guides the administrator through the task of setting up a SONET Path, the Virtual Connection configuration wizard guides the administrator through the task of setting up a virtual connection. Again, the administrator is presented with valid configuration options and default parameter values are provided as a configuration starting point. As a result, the process of configuring virtual connections is simplified, and required administrator expertise is reduced since the administrator does not need to know or remember to provide each parameter value. In addition, the wizard validates configuration requests from the administrator to minimize the potential for mis-configuration.

Figure 5X:
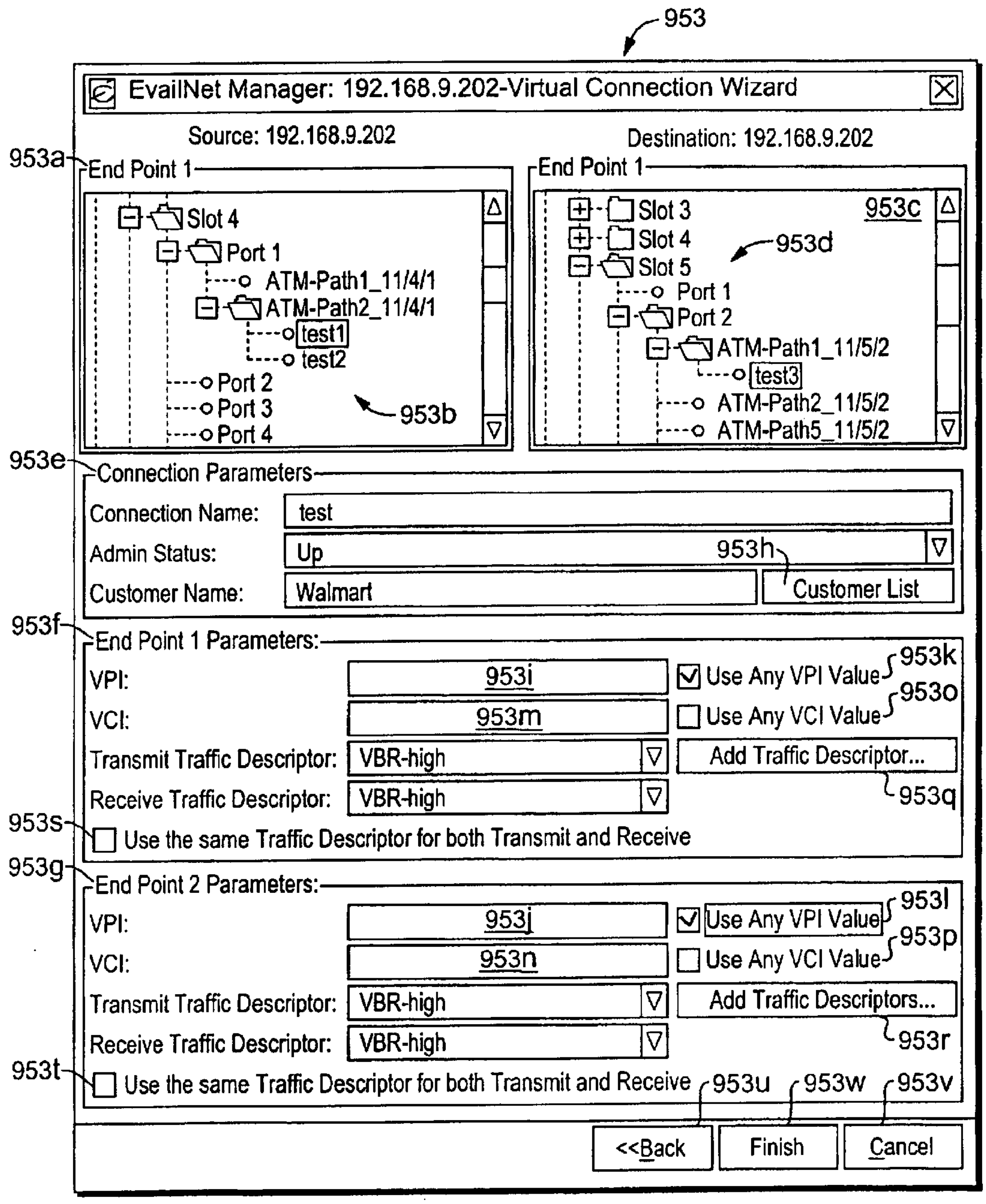

The Virtual Connection configuration wizard includes a Connection Topology panel 952*a* and a Connection Type panel 952*b*. Within the Connection Topology panel the administrator is asked whether they want a point-to-point or point-to-multipoint connection, and within the Connection Type panel, the administrator is asked whether they want a Virtual Path Connection (VPC) or a Virtual Channel Connection (VCC). In addition, the administrator may indicate that they want the VPC or VCC made soft (SPVPC/SPVCC). Where the administrator chooses a point-to-point, VPC connection, the Virtual Connection wizard presents dialog box 953 (FIG. 5*x*).

The source (e.g., test1 in End Point1window 953*a*) for the point-to-point connection is automatically set to the virtual ATM interface (e.g., 947*c,* FIG. 5*v*) selected in Virtual ATM Interface tab 947 when the virtual connection button 947*d* was selected. The administrator may change the source simply by selecting another virtual ATM interface in device tree 953*b,* for example, test2. Similarly, the administrator selects a destination (e.g., test3 in End Point 2 window 953*c*) for the point-to-point connection by selecting a virtual ATM interface in device tree 953*d,* for example, test3. If the administrator had selected point-to-multipoint in Connection Topology panel 952*a* (FIG. 5*w*), then the user would select multiple destination devices from device tree 953*d* or the wizard may present the administrator with multiple End Point 2 windows in which to select the multiple destination devices. In addition, if within Connection Topology panel 952*b* (FIG. 5*w*) the administrator had elected to make the VPC or VCC soft (SPVPC/SPVCC), then the user may select in End Point 2 window 953*c* (FIG. 5*x*) a virtual ATM interface in another network device.

The virtual Connection wizard also contains a Connections Parameters window 953*e,* an End Point 1 Parameters window 953*f* and an End Point 2 Parameters window 953*g*. Again for point-to-multipoint, there will be multiple End Point 2 Parameters windows. Within the Connections Parameters window, the administrator may provide a Connection name (e.g., test). The administrator also determines whether the connection will be configured in an Up or Down Administration Status, and may provide a Customer Name (e.g., Walmart) or select one from a customer list, which may be displayed by selecting Customer List button 953*h*.

Figure 5Y:
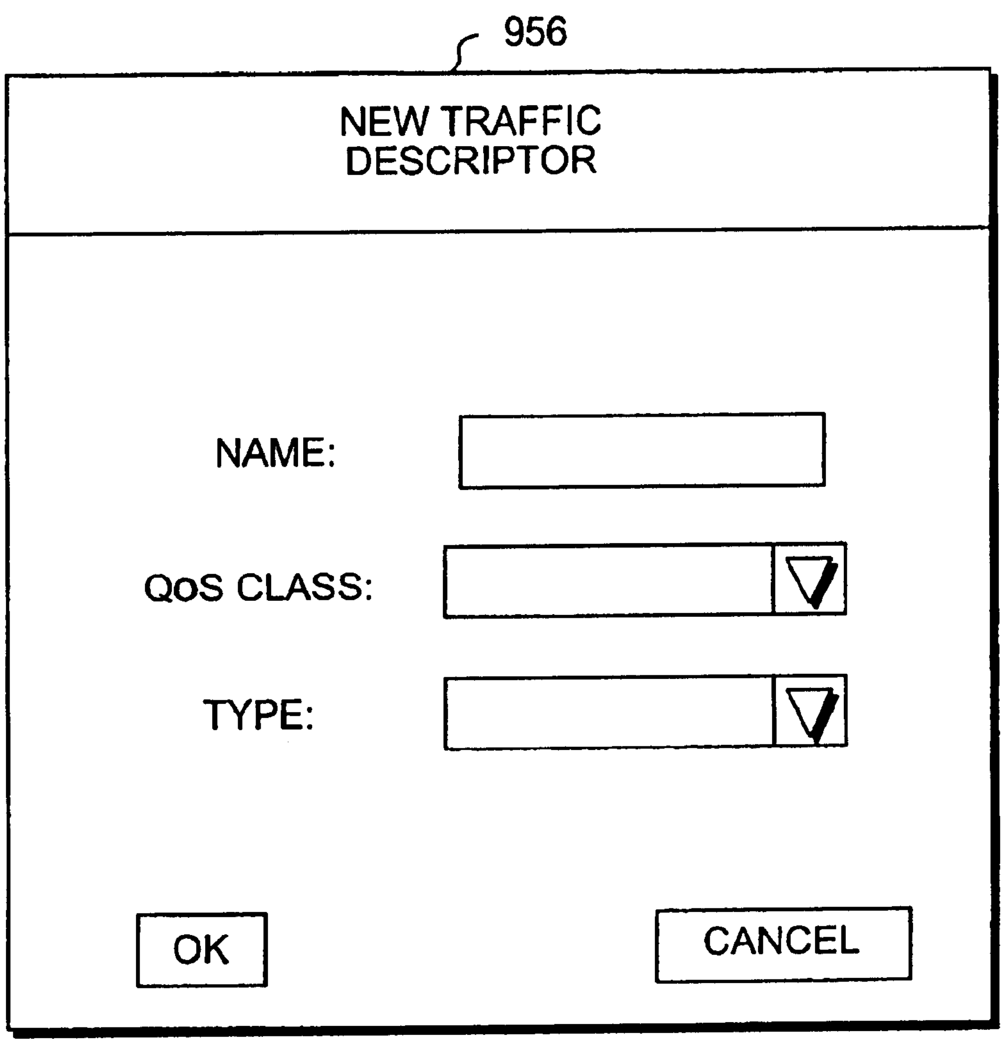

Within the End Point 1 and 2 Parameters windows, the administrator provides a Virtual Path Identifier (VPI) in window 953*i,* 953*j* or selects a Use Any VPI Value indicator 953*k,* 953*l*. If the administrator chooses a VCC connection in Connection Type window 952*b* (FIG. 5*w*), then the administrator must also provide a Virtual Channel Indicator (VCI) in window 953*m,* 953*n* or select a Use Any VCI Value indicator 953*o,* 953*p*. The administrator also selects a Transmit and a Receive Traffic Descriptor (e.g., Variable Bit Rate (VBR)-high, VBR-low, Constant Bit Rate (CBR)-high, CBR-low) from a pull down menu or selects an Add Traffic Descriptor button 953*q,* 953*r.* If the administrator selects one of the Add Traffic Descriptor buttons, then a traffic descriptor window 956 (FIG. 5*y*) is displayed and the administrator may add a new traffic descriptor by providing a name and selecting a quality of service (QoS) class and a traffic descriptor type from corresponding pull down menus. Depending upon the QoS class and type selected, the administrator may also be prompted to input peak cell rate (PCR), sustainable cell rate (SCR), maximum burst size (MBS) and minimum cell rate (MCR), and for each PCR, SCR, MBS and MCR, the administrator will be prompted for a cell loss priority (CLP) value where CLP=0 corresponds to high priority traffic and CLP=0+1 corresponds to combined/aggregated high and low priority traffic. The traffic descriptors indicate the priority of the traffic to be sent over the connection thereby allowing parameterization of quality of service. The administrator may select a Use the same Traffic Descriptor for both Transmit and Receive indicator 953*s,* 953*t* (FIG. 5*x*).

Within the Virtual Connection wizard, the administrator may select a Back button 953*u* (FIG. 5*x*) to return to screen 952 (FIG. 5*w*) or a Cancel button 953*v* to exit out of the wizard without creating a virtual connection. On the other hand, if the administrator has provided all parameters and wants to commit the virtual connection, then the administrator selects a Finish button 953*w.* The NMS client passes the parameters to the NMS server, which validates the data and then writes the data into the network device's configuration database. The data is validated again within the network device and then through active queries modular processes throughout the device are notified of the configuration change to cause these processes to implement the virtual connection. GUI 895 then displays the newly created virtual connection 948*a* (FIG. 5*z*) in a list within Virtual Connections tab 948. The administrator may then create multiple virtual connections between the various virtual ATM interfaces, each of which will be listed in the Virtual Connections tab 948. The administrator may also select a Back button 948*b* to return to the Virtual ATM Interfaces tab or select the Virtual ATM Interfaces tab directly.

The Virtual Connections tab also includes a device navigation tree 948*c*. The device tree is linked with Virtual Connections button 947*d* such that the device tree highlights the virtual ATM interface that was selected in Virtual ATM Interfaces tab 947 when the Virtual Connections button was selected. The Virtual Connections tab then only displays data relevant to the highlighted portion of the device tree.

As described above, the SONET Paths tab, ATM Interfaces tab, Virtual ATM Interfaces tab and Virtual Connections tabs are configuration tabs that are chained together providing wizard-like properties. Both the order of the tabs from right to left and the forward buttons (e.g., ATM Interfaces button 942*c*) and back buttons (e.g., Back button 946*h*) allow an administrator to easily and quickly sequence through the steps necessary to provision services. Although device navigation trees were shown in only the Virtual ATM Interface tab and the Virtual Connection tab, a device navigation tree may be included in each tab and only data relevant to the highlighted portion of the navigation tree may be displayed.

In addition to the SONET Interface and SONET Paths tabs, the status window may include tabs for other physical layer protocols, for example, Ethernet. Moreover, in addition to the ATM Interfaces and Virtual ATM Interfaces tabs, the status window may include tabs for other upper layer protocols, including MPLS, IP and Frame Relay. Importantly, other configuration wizards in addition to the SONET Path configuration wizard and Virtual Connection configuration wizard may also be used to simplify service provisioning.

Custom Navigator

In typical network management systems, the graphical user interface (GUI) provides static choices and is not flexible. That is, the screen flow provided by the GUI is predetermined and the administrator must walk through a predetermined set of screens each time a service is to be provisioned. To provide flexibility and further simplify the steps required to provision services within a network device, GUI 895, described in detail above, may also include a custom navigator tool that facilitates "dynamic menus". When the administrator selects the custom navigator menu button 958 (FIG. 4*x*), a pop-up menu 958*a* displays a list of available "screen marks". The list of screen marks may include default screen marks (e.g., Virtual ATM IF 958*b* and Virtual Connection 958*c*) and/or administrator created screen marks (e.g., test 958*d*).

When the administrator selects a particular screen mark, the custom navigator shortcuts the configuration process by jumping forward past various configuration screens to a particular configuration screen corresponding to the screen mark. For example, if the administrator selects a Virtual ATM IF screen mark 958*b,* the custom navigator presents the Virtual ATM Interface tab (FIG. 5*u*). The administrator may then select an ATM interface from device tree 947*a* and select Add button 947*b* to add a virtual ATM interface. Similarly, the administrator may select a Virtual Connection screen mark 958*c,* and the custom navigator automatically presents Virtual Connection wizard 952 (FIG. 5*w*).

Moreover, the custom navigator allows the administrator to create unique screen marks. For example, the administrator may provision SONET paths and ATM interfaces as described above, then select an ATM interface (e.g., 946*b,* FIG. 5*r*) in ATM interfaces tab 946 and select Virtual Interfaces button 946*g* to display Virtual ATM Interfaces tab 947 (FIG. 5*s*), and as described above, the devices tree 947*a* will highlight the selected ATM interface. If the administrator believes they may want to return to the Virtual Interfaces tab multiple times to provision multiple virtual ATM interfaces for the selected ATM interface or other ATM interfaces near the selected ATM interface in device tree 947*a,* then the administrator would select a screen mark button 959 to create a screen mark for this configuration position. A dialog box would appear in which the administrator enters the name of the new screen mark (e.g., test 958*d,* FIG. 4*x*) and this new screen mark name is added to the list of screen marks 958*a*. The custom navigator then takes a "snap shot" of the metadata necessary to recreate the screen and the current configuration position (i.e., highlight ATM-Path2__11/4/1). If the administrator now selects this screen mark while another tab is displayed, the custom navigator uses the metadata associated with the screen mark to present the screen shot displayed in FIG. 5*s* to the administrator updated with any other configuration changes made subsequent to the creation of the screen mark. As a result, the administrator is provided with configuration short cuts, both default short cuts and ones created by the administrator himself. Many other screen marks may be created through GUI 895, and in each case, the screen marks may simplify the configuration process and save the administrator configuration time.

Custom Wizard

To provide additional flexibility and efficiency, an administrator may use a custom wizard tool to create unique custom wizards to reflect common screen sequences used by the administrator. To create a custom wizard, the administrator begins by selecting a Custom Wizard menu button 960 (FIG. 4*y*) to cause a pull-down menu 960*a* to appear and then selecting a Create Wizard 960*b* option from the pull-down menu. The administrator then begins using the particular sequence of screens that they wish to turn into a custom wizard and the custom wizard tool records this sequence of screens. For example, the administrator may begin by selecting a port within device mimic 896*a,* clicking the right mouse button and selecting the Configure SONET Paths option to cause the SONET Path configuration wizard 944 (FIG. 5*b*) to appear. The custom wizard tool records the first screen to be included in the new custom wizard as the SONET Path configuration wizard screen 944. After filling in the appropriate data for the current port configuration, the administrator presses the OK button and the SONET Paths tab 942 (FIG. 5*h*) appears. The custom wizard records the SONET Paths tab screen as the next screen in the new custom wizard. The administrator may then select Virtual ATM interfaces tab 947 (FIG. 5*s*) to cause this tab to be displayed. Again, the custom navigator records this screen as the next screen in the new custom wizard.

The administrator may continue to select further screens to add to the new custom wizard (for example, by selecting an ATM interface from device tree 947*a* and then selecting the Add button 947*b* to cause the Add V-ATM Interface dialog box 950 (FIG. 5*t*) to appear) or, if the administrator is finished sequencing through all of the screens that the administrator wants added to the new custom wizard, the administrator again selects Custom Wizard menu button 960 (FIG. 4*y*) and then selects a Finish Wizard option 960*c*. This causes a dialog box 960*d* to appear, and the administrator enters a name (e.g., test) for the custom wizard just created.

Figure 4X:
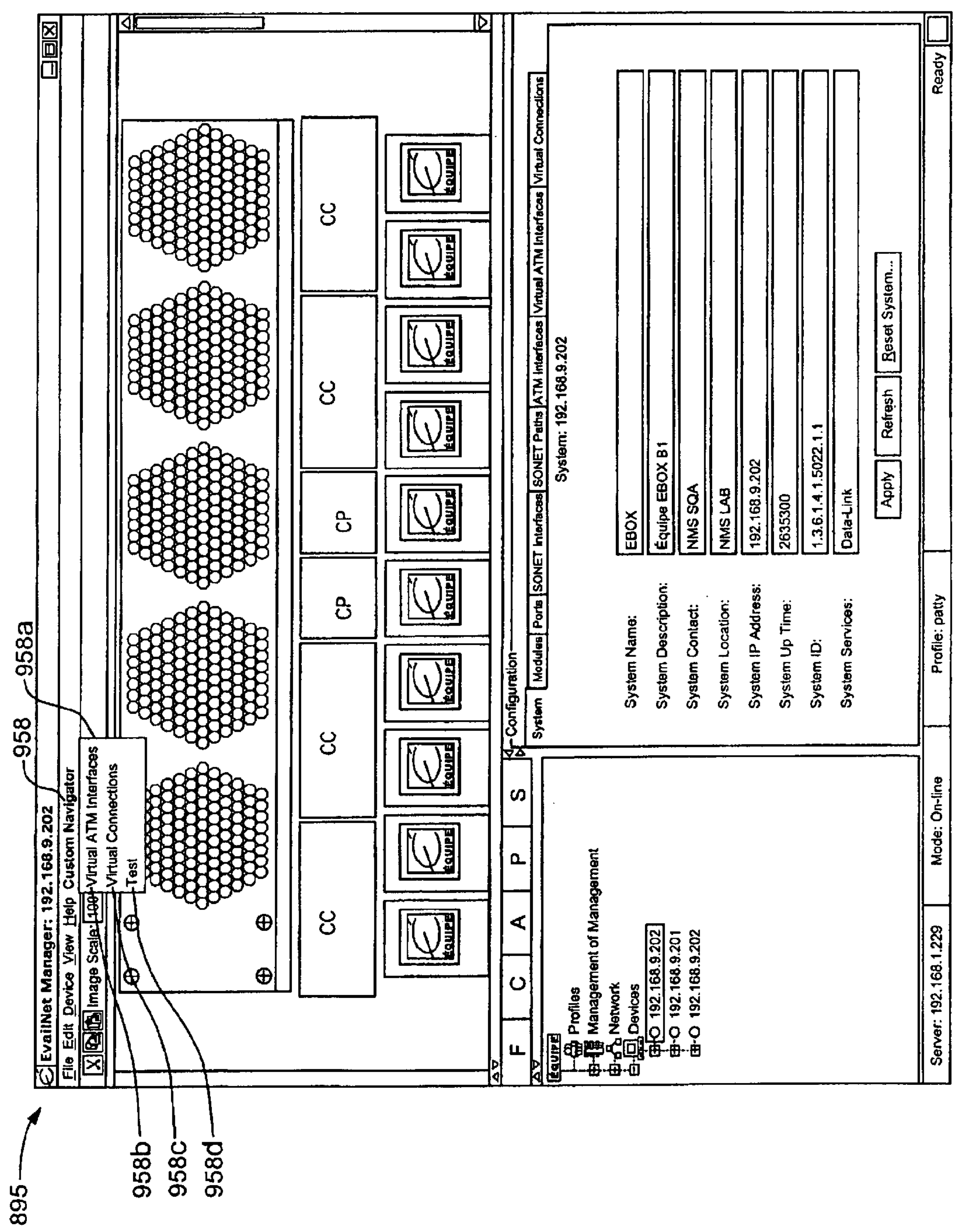
Figure 4Y:
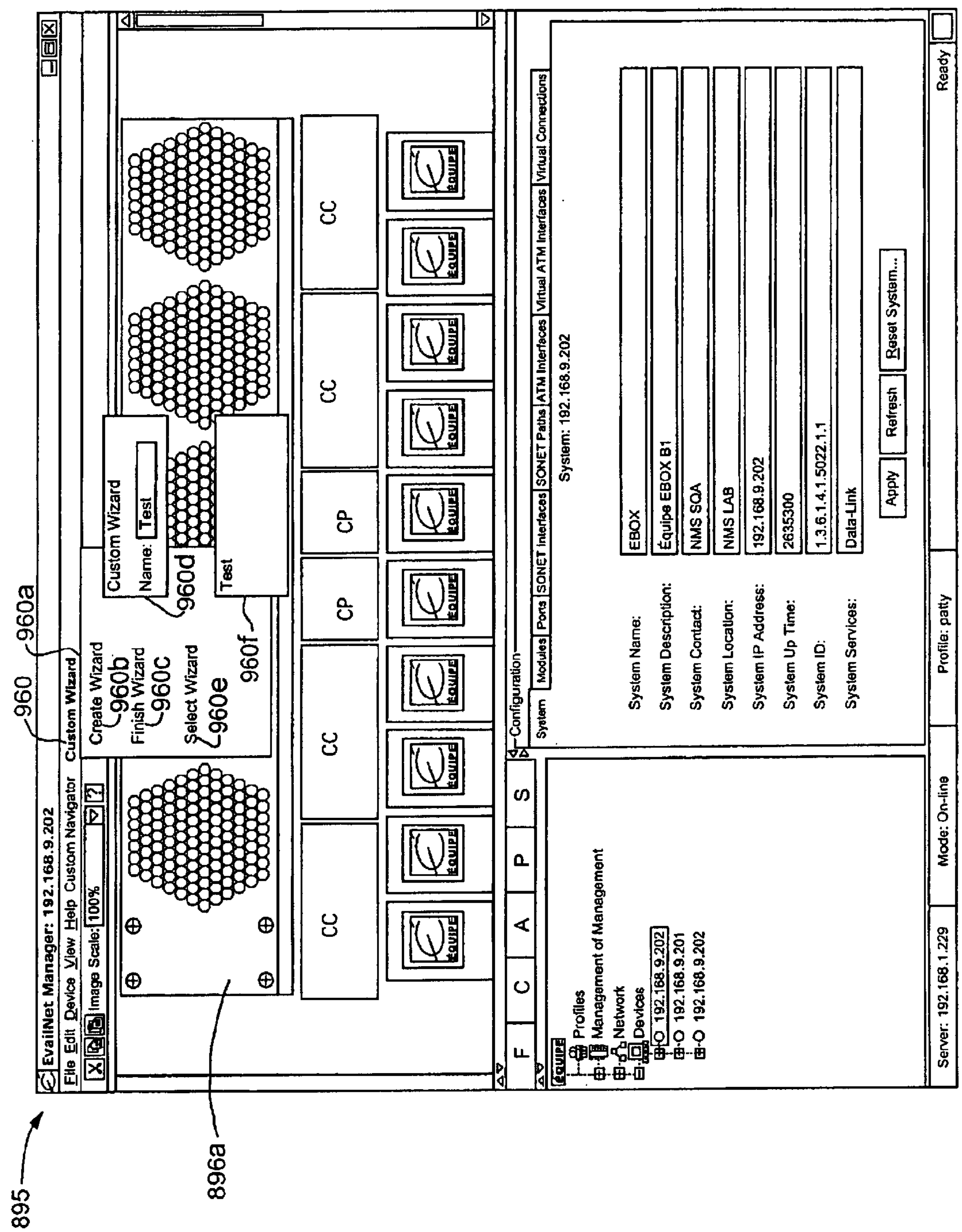
Figure 4Z:
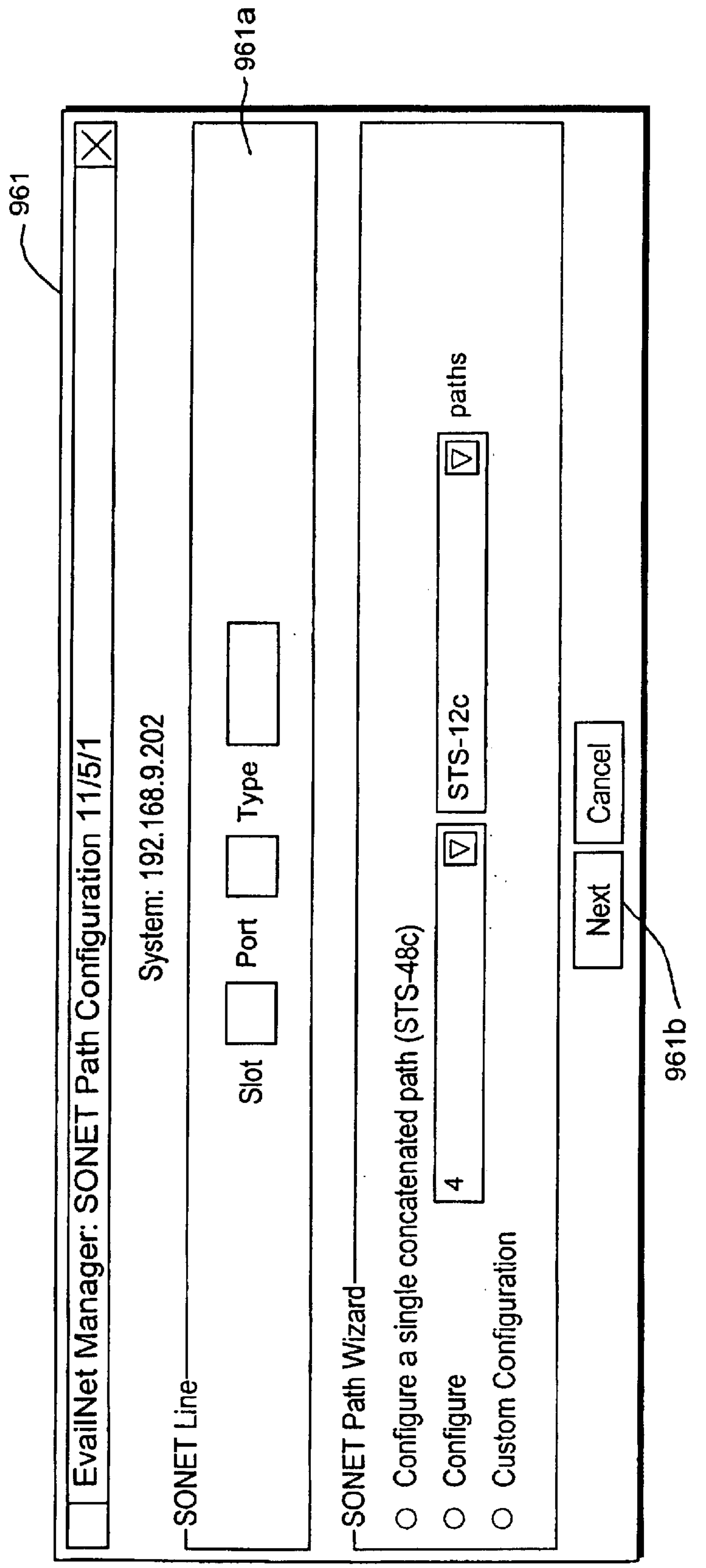

To access a custom wizard, the administrator again selects Custom Wizard 960 menu button and then selects a Select Wizard option 960*e* to cause an inventory 960*f* of custom wizards to be displayed. The administrator then selects a custom wizard (e.g., test), and the custom wizard automatically presents the administrator with the first screen of that wizard. In the continuing example, the custom navigator presents SONET Path configuration wizard screen 961 (FIG. 4*z*). Since the administrator may start a custom wizard from any screen within GUI 895, SONET Path wizard screen 961 is different from the screen 944 displayed in FIG. 5*b* because SONET line data 961*a* (i.e., slot, port, type) is not provided. That is, the administrator may not have selected a particular SONET Path to configure prior to selecting the custom wizard. Hence, the SONET line data is blank and the administrator must fill this in. After the administrator enters and/or modifies the SONET line data and any other data within the first screen, the administrator selects a Next button 961*b* (or an OK button) to move to the next screen in the sequence of screens defined by the custom wizard. In the next and subsequent screens, the administrator may also select a Back button to return to a previous screen within the custom wizard screen sequence. Thus, the custom wizard tool allows an administrator to make their provisioning tasks more efficient by defining preferred screen sequences for each task.

Off-Line Configuration

There may be times when a network manager/administrator wishes to jump-start initial configuration of a new network device before the network device is connected into the network. For example, a new network device may have been purchased and be in the process of being delivered to a particular site. Generally, a network manager will already know how they plan to use the network device to meet customer needs and, therefore, how they would like to configure the network device. Because configuring an entire network device may take considerable time once the device arrives and because the network manager may need to get the network device configured as soon as possible to meet network customer needs, many network managers would like the ability to perform preparatory configuration work prior to the network device being connected into the network.

In the current invention, network device configuration data is stored in a configuration database within the network device and all changes to the configuration database are copied in the same format to an external NMS database. Since the data in both databases (i.e., configuration and NMS) is in the same format, the present invention allows a network device to be completely configured "off-line" by entering all configuration data into an NMS database using GUI 895 in an off-line mode. When the network device is connected to the network, the data from the NMS database is reliably downloaded to the network device as a group of SQL commands using a relational database transaction. The network device then executes the SQL commands to enter the data into the internal configuration database, and through the active query process (described below), the network device may be completely and reliably configured.

Figure 6A:
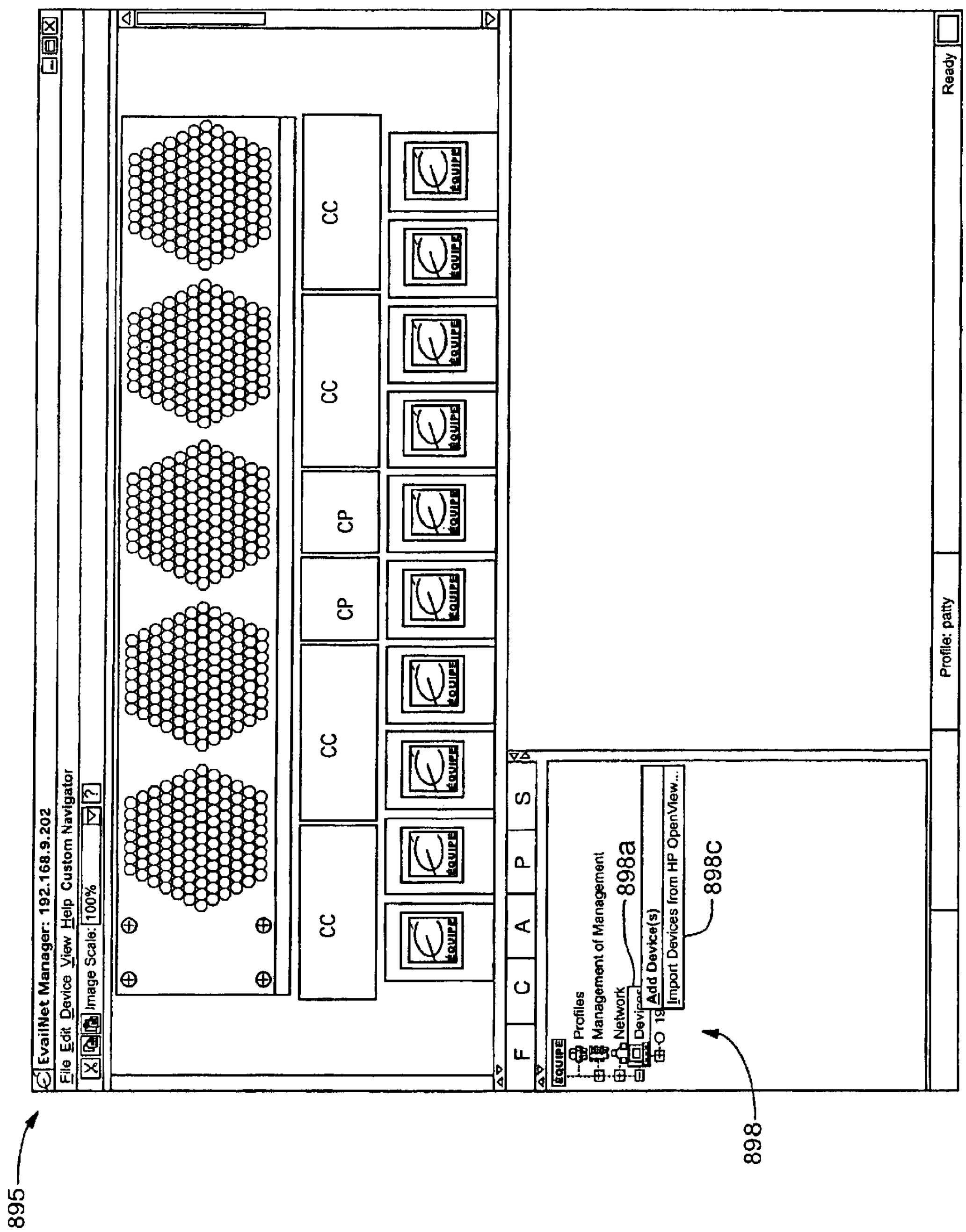
Figure 6B:
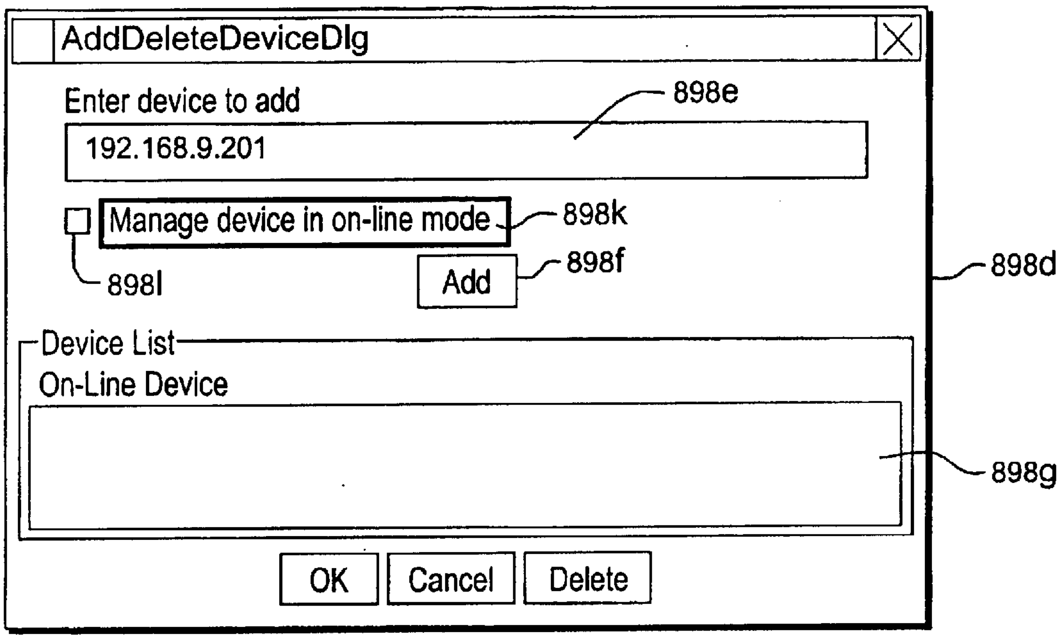
Figure 6C:
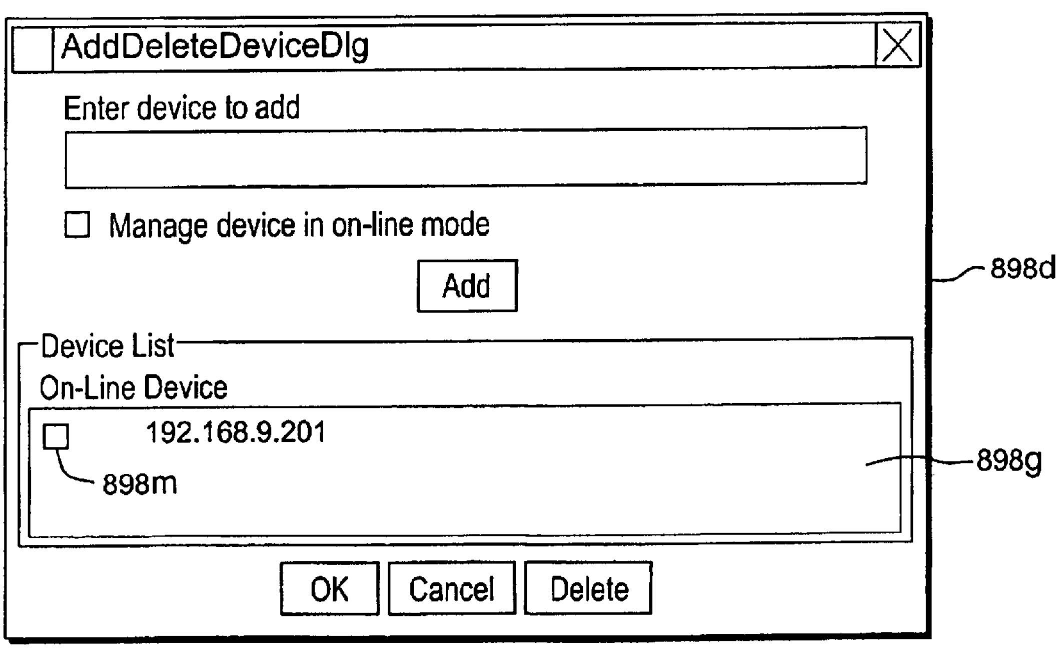

Referring to FIG. 6*a,* the network manager begins by selecting Devices branch 898*a* in navigation tree 898, clicking the right mouse button to cause pop-up menu 898*c* to appear and selecting the Add Devices option causing dialog box 898*d* (FIG. 6*b*) to be displayed. The network manager then enters the intended IP address or DNS name (e.g., 192.168.9.201) of the new network device into field 898*e* and de-selects a Manage device in on-line mode option 898*k*—that is, the network manager moves the cursor over box 898*l* and clicks the left mouse button to clears box 898*l*. De-selecting the Manage device in on-line mode option indicates that the network device will be configured in off-line mode. The network manager then selects Add button 898*f* to cause dialog box 898*d* to add the IP address to window 898*g* (FIG. 6*c*). However, in this example, box 898*m* is blank indicating the network device is to be configured off-line.

Figure 6D:
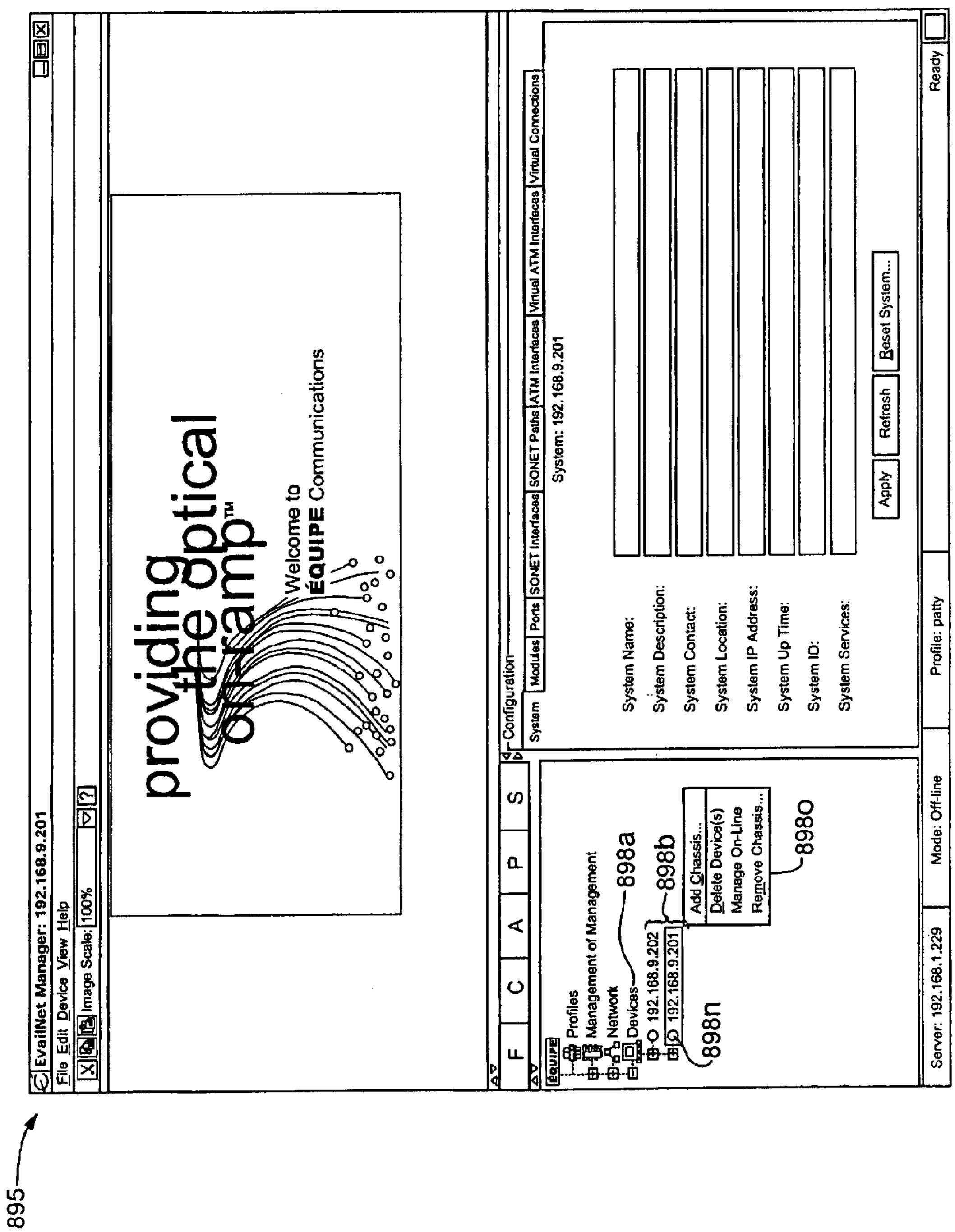
Figure 6E:
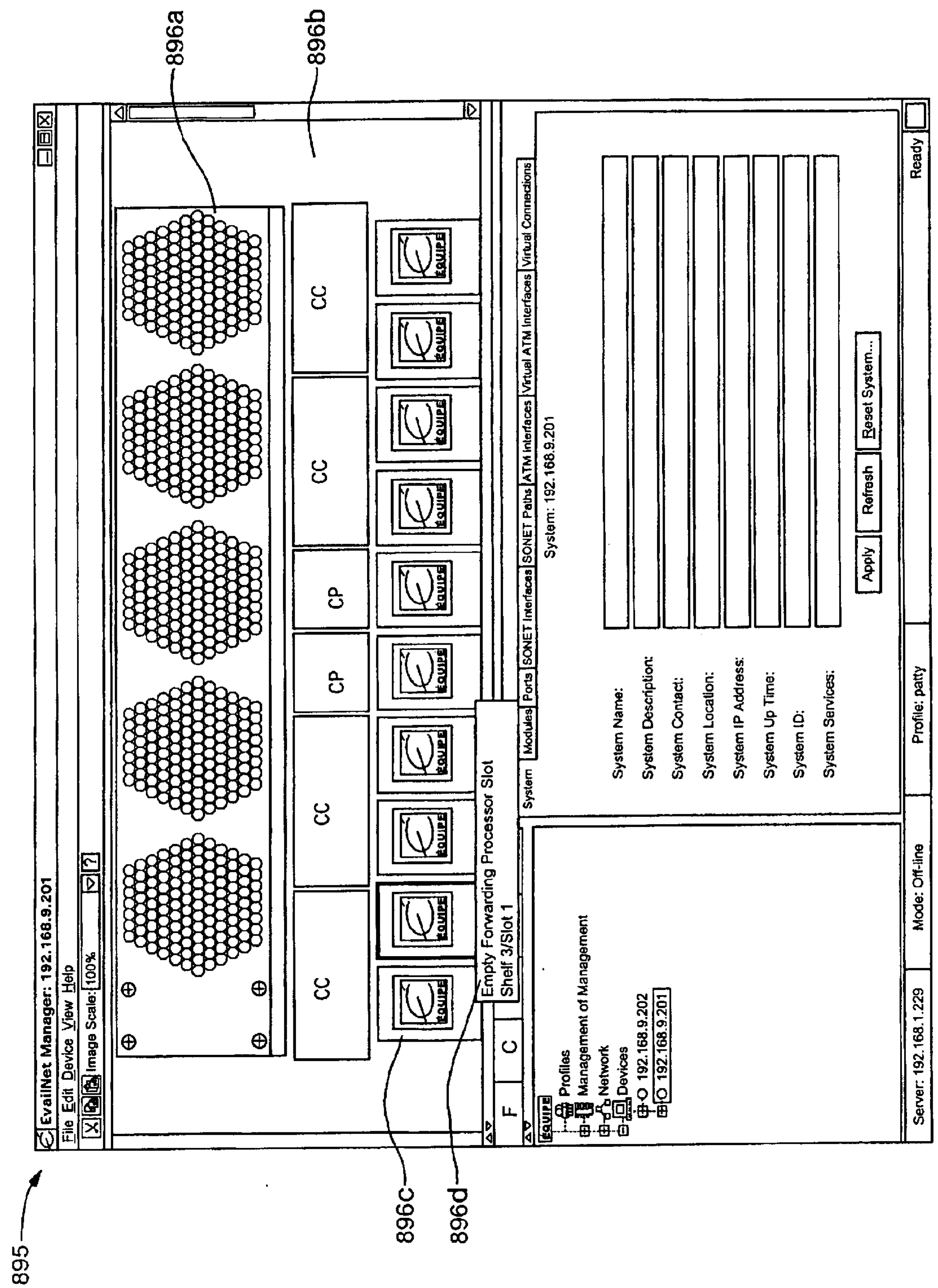
Figure 6F:
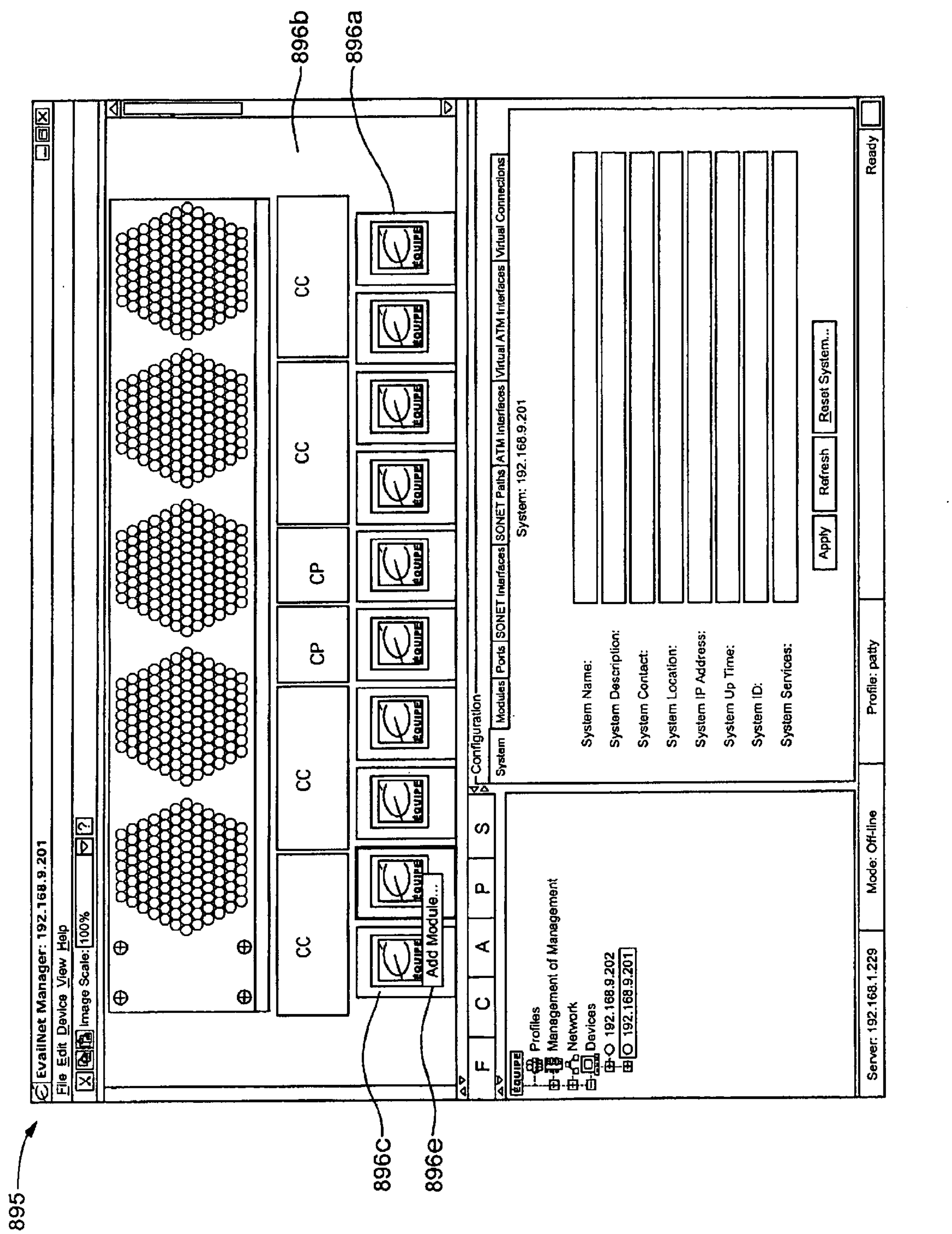
Figure 6G:
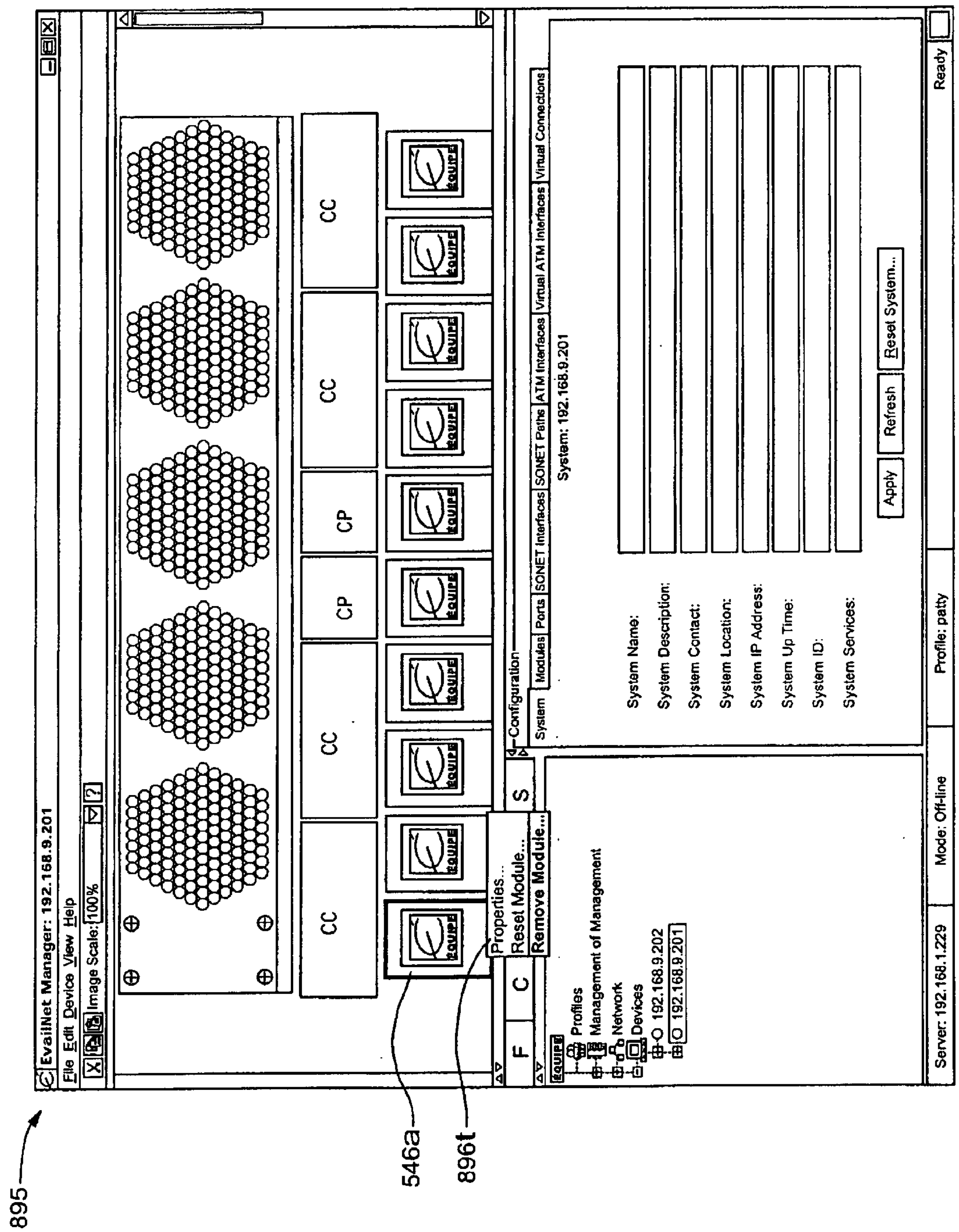

Referring to FIG. 6*d,* the new network device (e.g., 192.168.9.201) is now added to the list of devices 898*b* to be managed. However, the icon includes a visual indicator 898*n* (e.g., red "X") indicating the off-line status of the device. To begin off-line configuration, the network manager selects the new device. Since the NMS client and NMS server are not connected to the actual network device, no configuration data may be read from the network device's configuration database. The network manager must, therefore, populate a device mimic with modules representing the physical inventory that the network device will include. To do this, the network manager begins by clicking on the right mouse button to display pop-up menu 898*o,* and selects the Add Chassis option to cause a device mimic 896*a* (FIG. 6*e*) to be displayed in window 896*b* including only a chassis. All slots in the chassis may be empty and visually displayed, for example, in a gray or light color. Alternatively, particular modules that are required for proper network device operation may be automatically included in the chassis. If more than one chassis type is available, a dialog box would appear and allow the network manager to select a particular chassis. In the current example, only one chassis is available and is automatically displayed when the network manager selects the Add Chassis option. Again, the cursor provides context sensitive pop-up windows. For example, the network manager may move the cursor over a particular slot (e.g., 896*c,* FIG. 6*e*) to cause a pop-up window (e.g., 896*d*) to appear and describe the slot (e.g., Empty Forwarding Processor Slot Shelf 3/Slot 1). The network manager may then select an empty slot (e.g., 896*c,* FIG. 6*f*) to cause the device mimic to highlight that slot, click the right mouse button to cause a pop-up menu (e.g., 896*e*) to appear and select the Add Module option. In this example, only one type of forwarding card is available. Thus, it is automatically added (visually indicated in dark green, FIG. 6*g*) to the device mimic. This forwarding card corresponds to forwarding card 546*a* in FIG. 41*a.* The network manager may also remove a module by selecting the module (e.g., 546*a*), clicking the right mouse button to cause a pop-up menu 896*t* to appear and then selecting the Remove Module option.

Figure 6H:
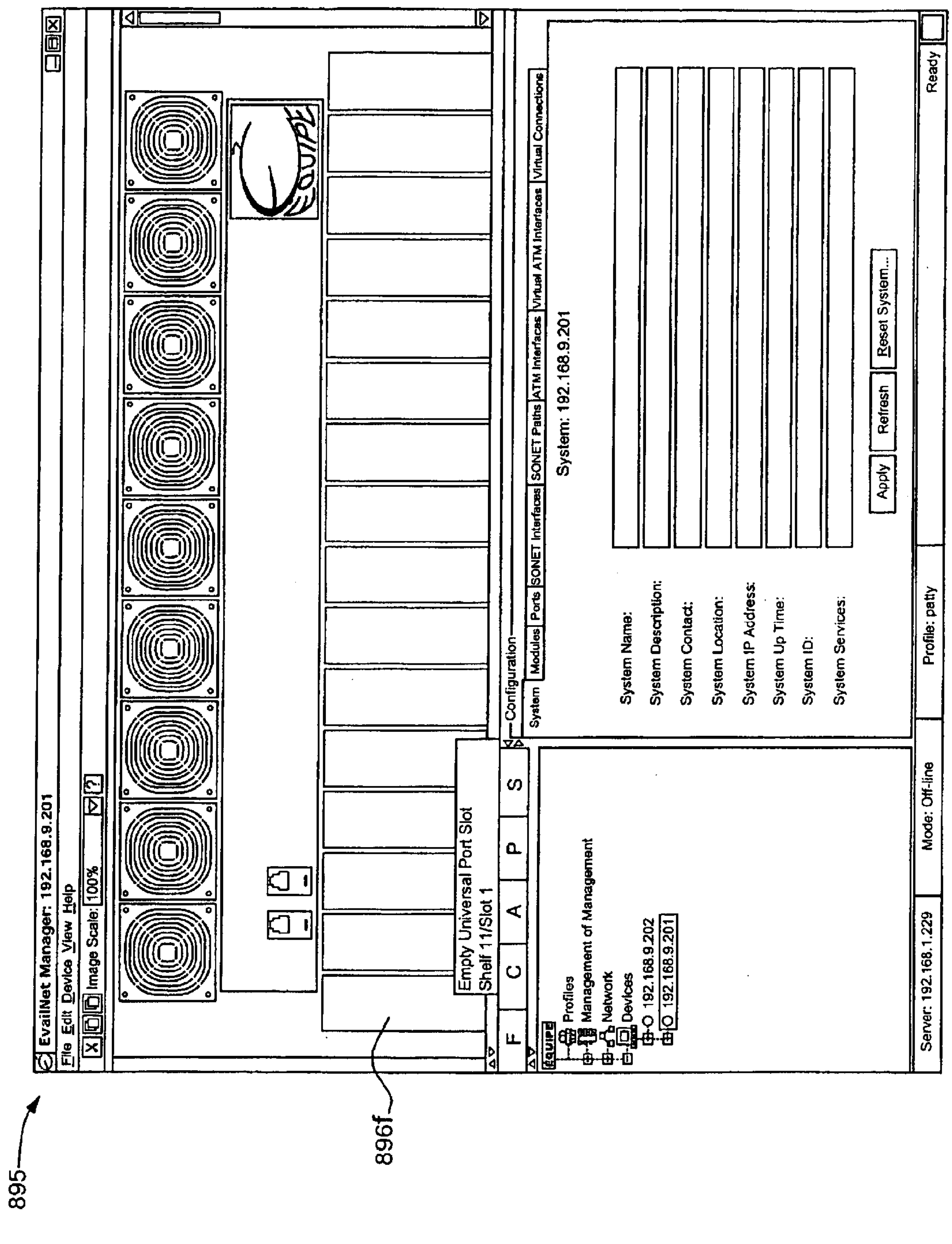
Figure 6I:
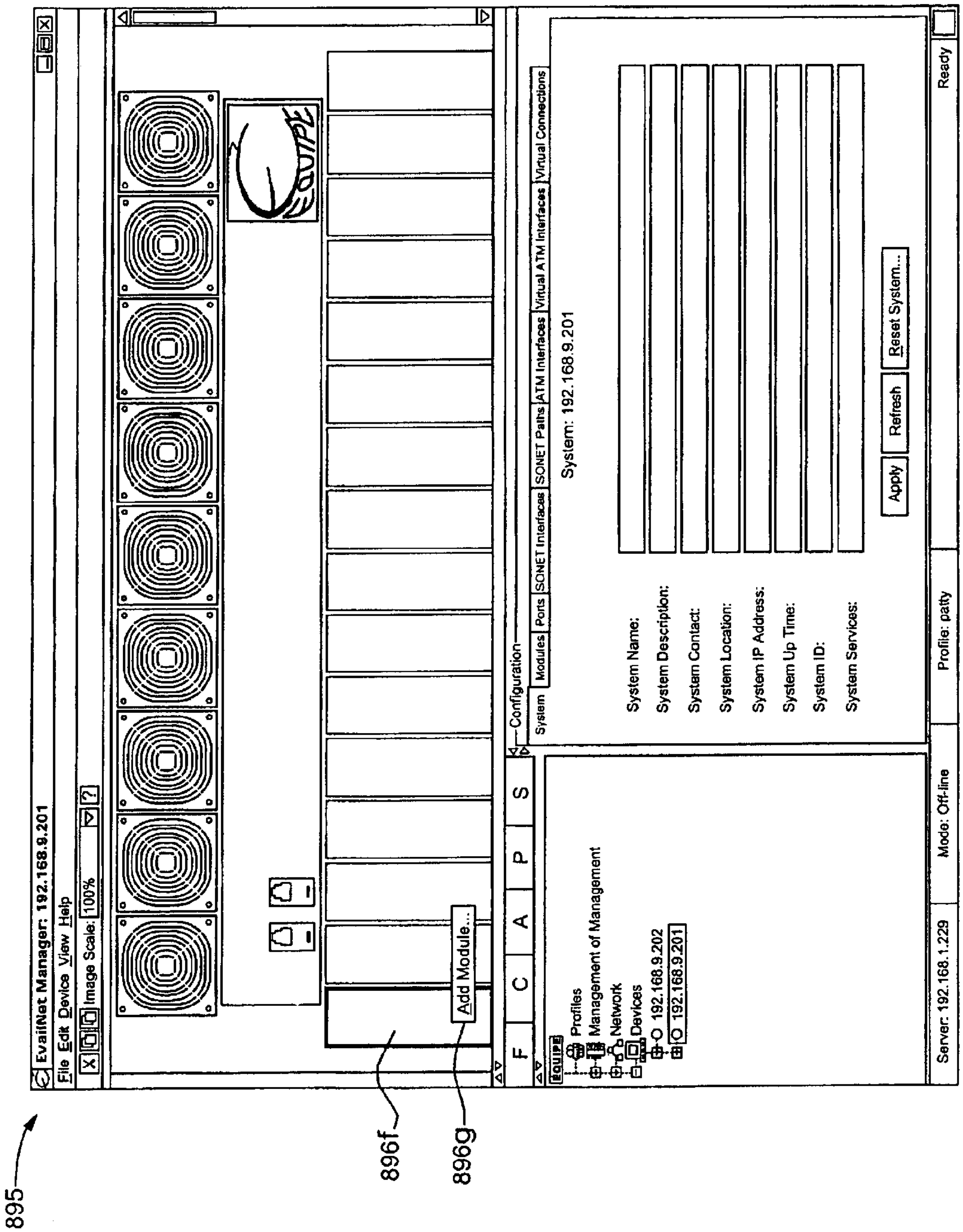
Figure 6J:
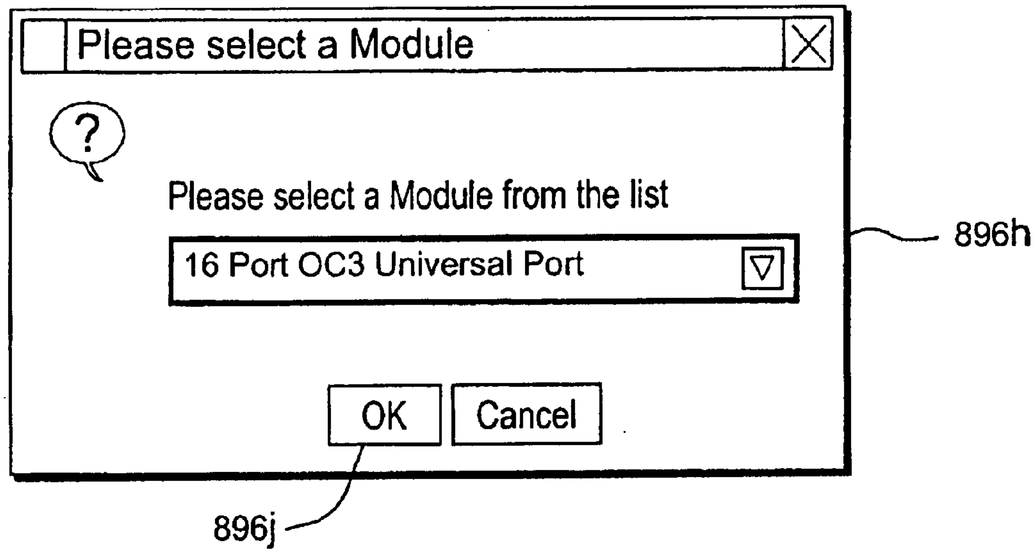
Figure 6K:
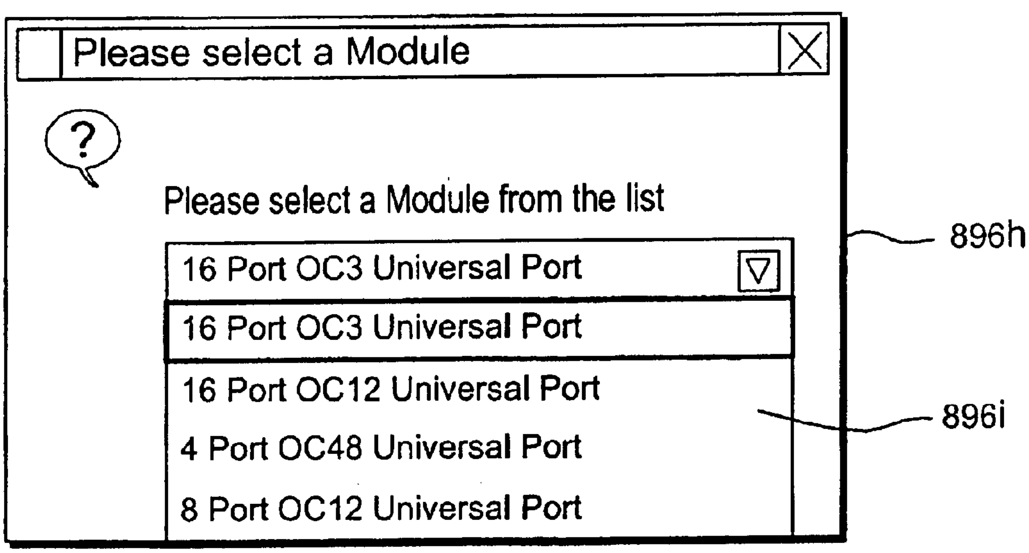
Figure 6L:
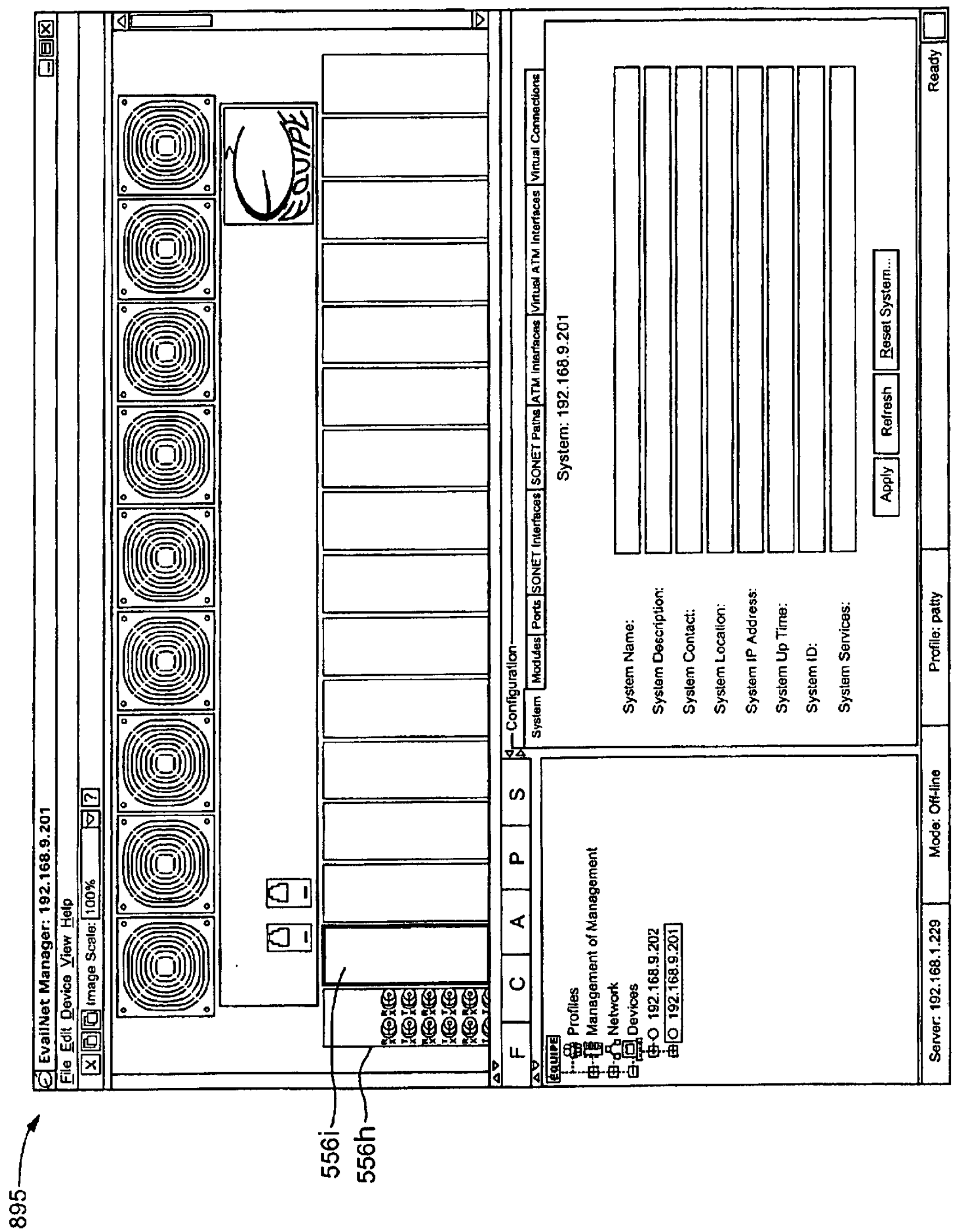

If there are multiple types of modules that may be inserted in a particular slot, then a dialog box will appear after the network manager selects the Add Module option and the network manager will select the particular module that the network device will include in this slot upon delivery. For example, while viewing the back of the chassis (FIG. 6*h*), the manager may select an empty universal port card slot (e.g., 896*f*), click the right mouse button causing pop-up menu 896*g* (FIG. 6*i*) to appear and select the Add Module option. Since multiple universal port cards are available, selecting the Add Module option causes a dialog box 896*h* (FIG. 6*j*) to appear. The network manager may then select the type of universal port card to be added into the empty slot from an inventory provided in pull-down menu 896*i* (FIG. 6*k*). Once the network manager selects the appropriate card and an OK button 896*j,* the device mimic adds a representation of this card (e.g., 556*h,* FIG. 6*l* and see also FIG. 41*b*).

Figure 6M:
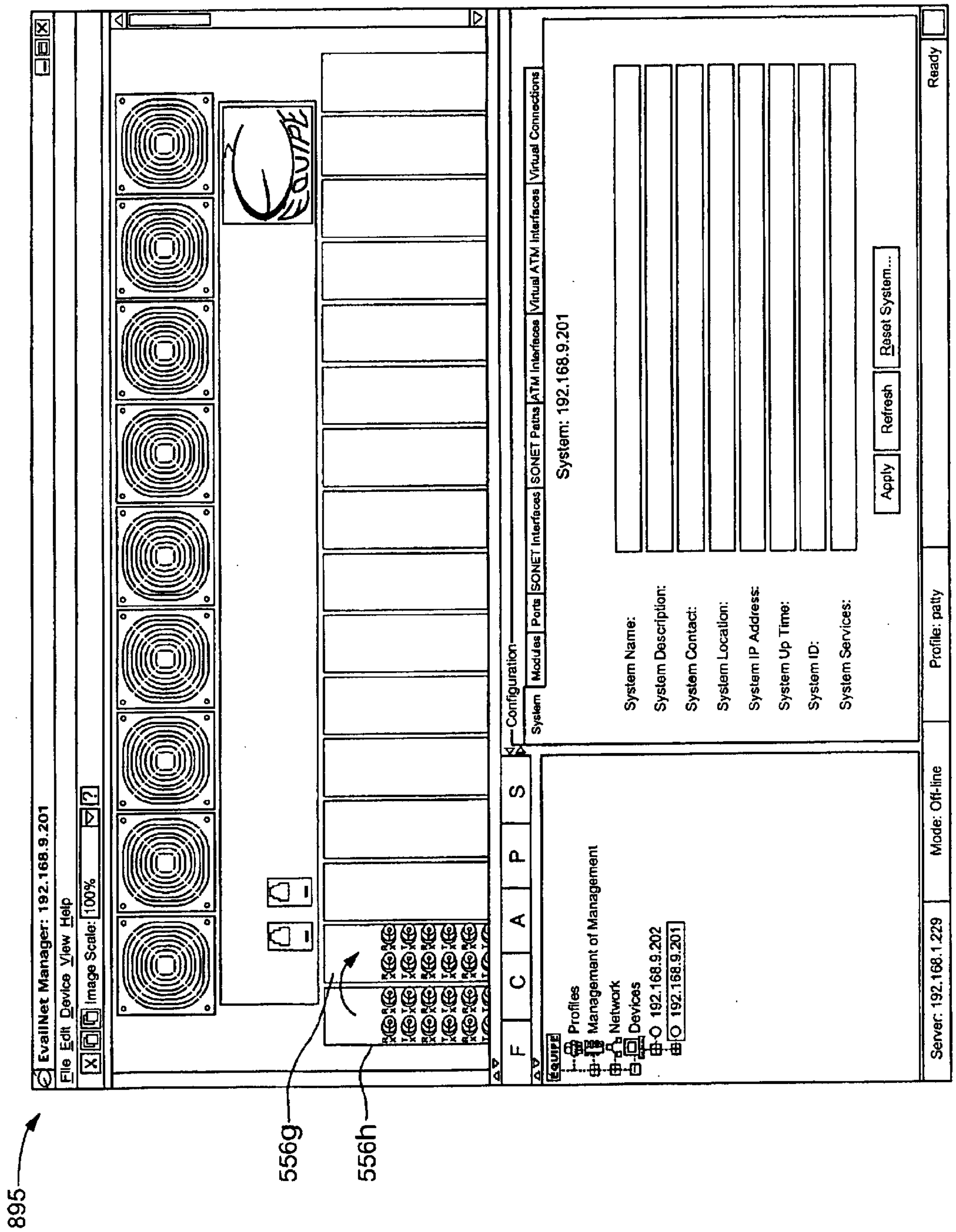

Typically, a network device may include many similar modules, for example, many 16 port OC3 universal port cards and many forwarding cards. Instead of having the network manager repeat each of the steps described above to add a universal port card or a forwarding card, the network manager may simply select an inserted module (e.g., 16 port OC3 universal port card 556*h,* FIG. 6L) by pressing down on the left mouse button, dragging an icon to an empty slot (e.g., 556*i*) also requiring a similar module and releasing the left mouse button to drop a similar module (e.g., 16 port OC3 universal port card 556*g,* FIG. 6*m*) into that empty slot. Similarly, the network manager may drag and drop a forwarding card module to an empty forwarding card slot and other inserted modules into other empty slots. The network manager may use the drag and drop method to quickly populate the entire network device with the appropriate number of similar modules. To add a different type of universal port card, the network manager will again select the empty slot, click on the right mouse button, select the Add Module button from the pop-up menu and then select the appropriate type of universal port card from the dialog box.

Figure 6N:
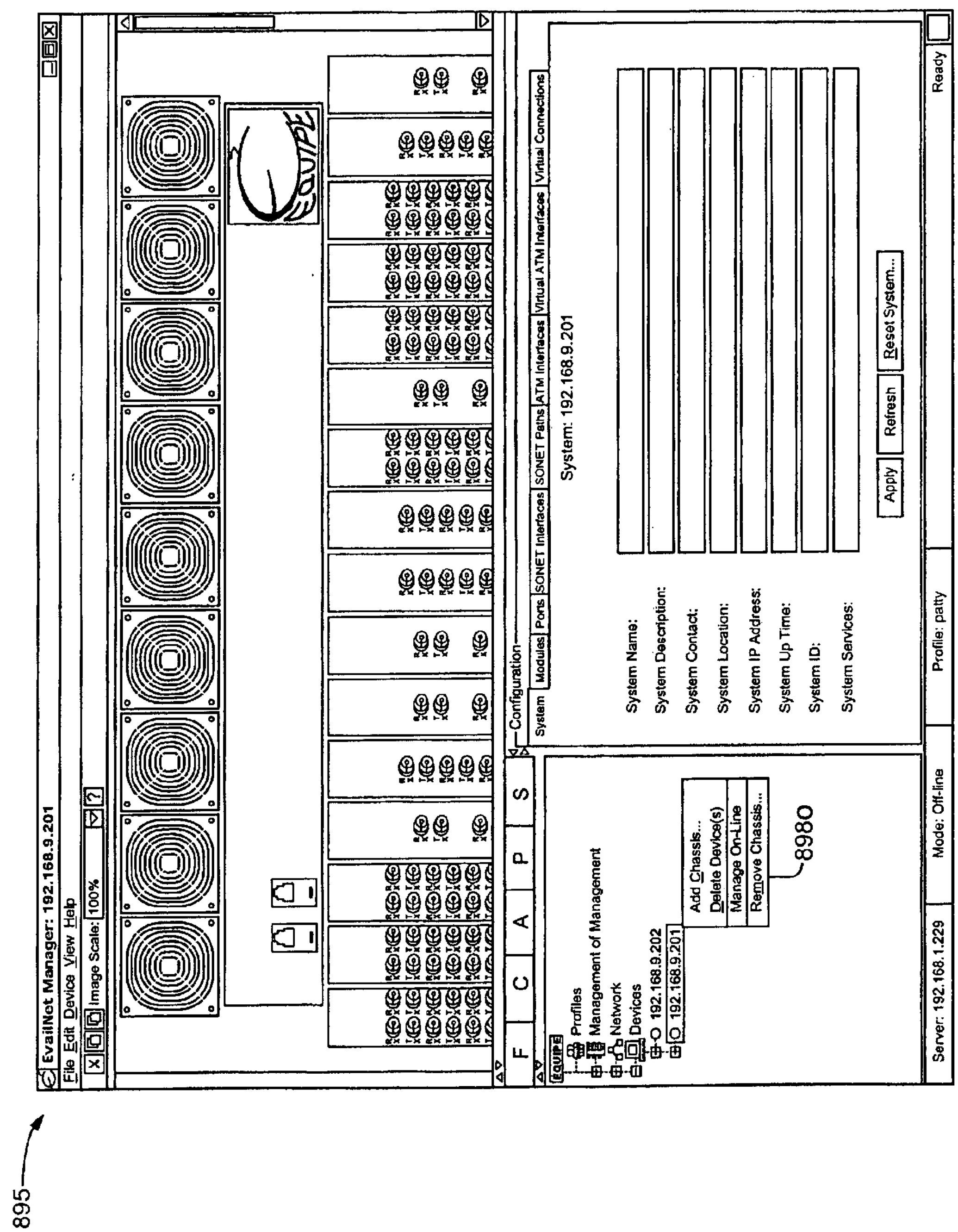

Once the network manager is finished adding appropriate modules into the empty slots such that the device mimic represents the physical hardware that will be present in the new network device, then the network manager may configure/provision services within the network device. Off-line configuration is the same as on-line configuration, however, instead of sending the configuration data to the configuration database within the network device, the NMS server stores the configuration data in an external NMS database. After the network device arrives and the network manager connects the network device's ports into the network, the network manager selects the device (e.g., 192.168.9.201, FIG. 6*n*), clicks the right mouse button to cause pop-up menu 868*o* to appear and selects the Manage On-line option.

The NMS client notifies the NMS server that the device is now to be managed on-line. The NMS server first reconciles the physical configuration created by the network manager and stored in the NMS database against the physical configuration of the actual network device and stored in the internal configuration database. If there are any mismatches, the NMS server notifies the NMS client, which then displays any discrepancies to the network manager. After the network manager fixes any discrepancies, the network manager may again select the Manage On-Line option in pop-up menu 898*o.* If there are no mis-matches between the physical device tables in the NMS database and the configuration database, then the NMS server reconciles all service provisioning data in the NMS database against the service provisioning data in the configuration database. In this example, the network device is new and thus, the configuration database has no service provisioning data. Thus, the reconciliation will be successful.

The NMS server then instructs the network device to stop replication between the primary configuration database within the network device and the backup configuration database within the network device. The NMS server then pushes the NMS database data into the backup configuration database, and then instructs the network device to switchover from the primary configuration database to the backup configuration database. If any errors occur after the switchover, the network device may automatically switch back to the original primary configuration database. If there are no errors, then the network device is quickly and completely configured to work properly within the network while maximizing network device availability.

Figure 6O:
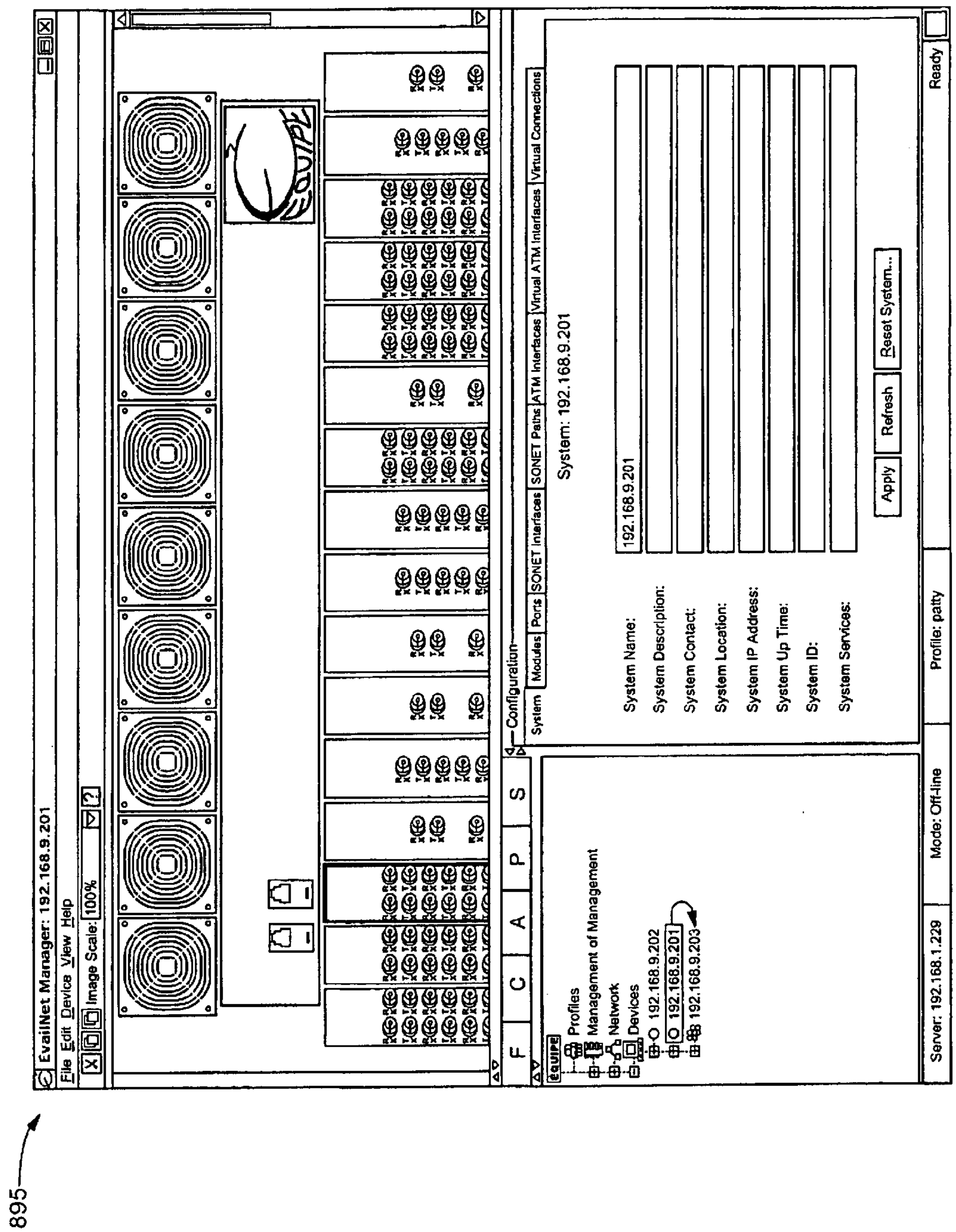

In the previous example, the network manager configured one new network device off-line. However, a network manager may configure many new network devices off-line. For example, a network manager may be expecting the receipt of five or more new network devices. Referring to FIG. 6*o,* to simplify the above process, a network manager may select an on-line device (e.g., 192.168.9.202) or off-line device (e.g., 192.168.9.201) by pressing and holding the left mouse button down, dragging an icon over to a newly added off-line device (e.g., 192.168.203) and dropping the icon over the newly added off-line device by releasing the left mouse button. The NMS client notifies the NMS server to copy the configuration data from the NMS database associated with the first network device (e.g., 192.168.9.202 or 192.168.9.201) to a new NMS database associated with the new network device and to change the data in the new NMS database to correspond to the new network device. The network manager may then select the new network device and modify any of the configuration data, as described above, to reflect the current network device requirements. As a result, off-line mode configuration is also made more efficient.

A network manager may also choose to re-configure an operational device in off-line mode without affecting the operation of the network device. For example, the network manager may want to add one or more new modules or provision services in a network device during a time when the network sees the least amount of activity, for example, midnight. Through the off-line mode, the network manager may prepare the configuration data ahead of time.

Figure 6P:
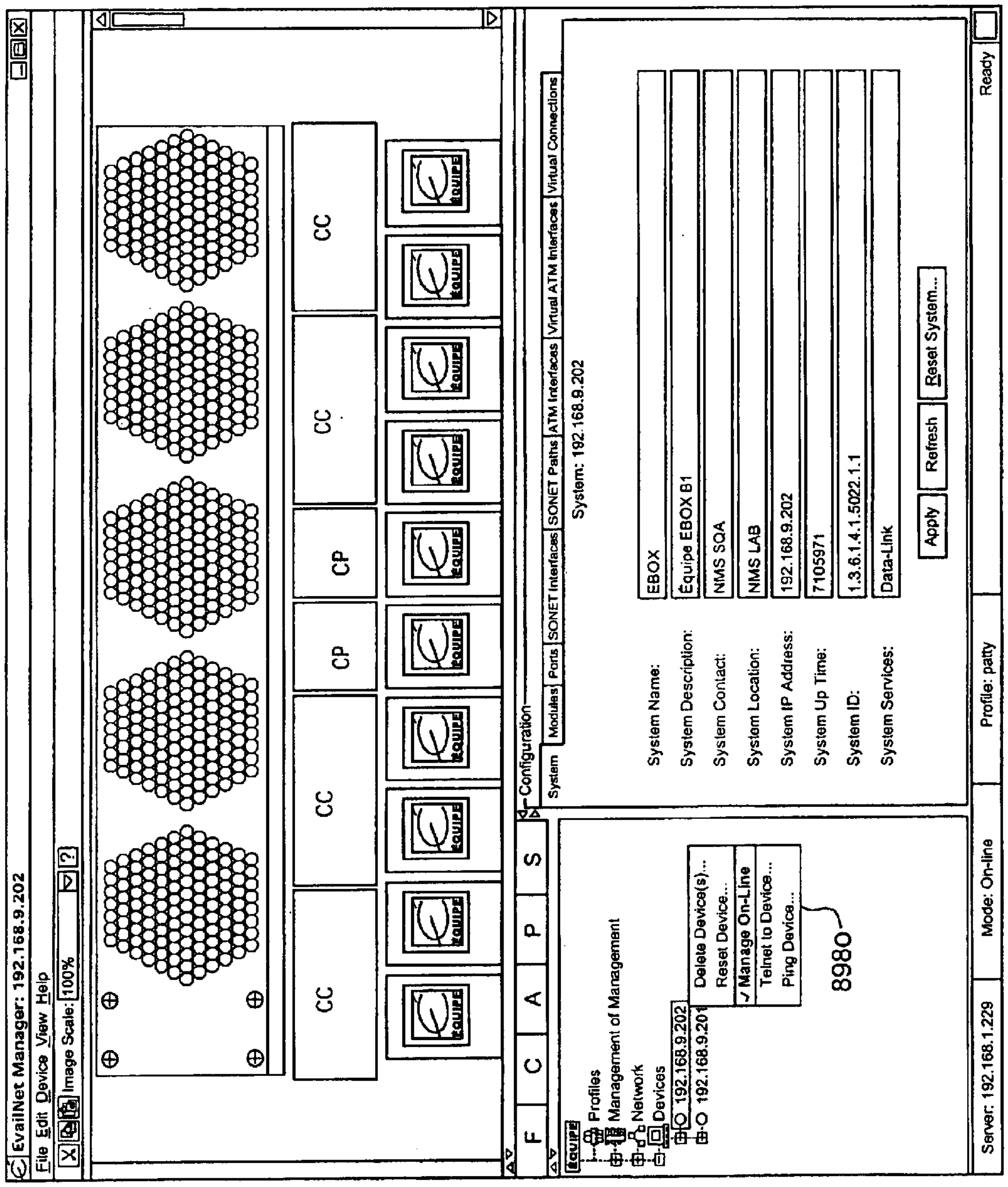

Referring to FIG. 6*p*, the network manager may select an operational network device (e.g., 192.168.9.202), click on the right mouse button to cause pop-up menu 898*o* to appear and select the Manage On-Line option, which de-selects the current on-line mode and causes the GUI to enter an off-line mode for this device. Although the GUI has entered the off-line mode, the network device is still operating normally. The network manager may then add one or more modules and/or provision services as described above just as if the GUI were still in on-line mode, however, all configuration changes are stored by the NMS server in the NMS database corresponding to the network device instead of the network device's configuration database. Alternatively, when the NMS server is notified that a network device is to be managed off-line, the NMS server may copy the NMS database data to a temporary NMS database and store all off-line configuration changes there. When the network manager is ready (i.e., at the appropriate time and/or after adding any new modules to the network device) to download the configuration changes to the operational network device, the network manager again selects the network device (e.g., 192.168.9.202), clicks on the right mouse button to cause pop-up menu 898*a* to appear and selects the Manage On-Line option.

The NMS client notifies the NMS server that the device is now to be managed on-line. The NMS server first reconciles the physical configuration stored in the NMS database (or the temporary NMS database) against the physical configuration of the actual network device stored in the internal configuration database. If there are any mismatches, the NMS server notifies the NMS client, which then displays any discrepancies to the network manager. After the network manager fixes any discrepancies, the network manager may again select the Manage On-Line option in pop-up menu 898*o*. If there are no mismatches between the physical device tables in the NMS database and the configuration database, then the NMS server reconciles all service provisioning data in the NMS database (or the temporary NMS database) against the service provisioning data in the configuration database. If any conflicts are discovered, the NMS server notifies the NMS client, which displays the discrepancies to the network manager. After fixing any discrepancies, the network manager may again select the Manage On-Line option in pop-up menu 898*o*.

If there are no conflicts, the NMS server instructs the network device to stop replication between the primary configuration database within the network device and the backup configuration database within the network device. The NMS server then pushes the NMS database data into the backup configuration database, and then instructs the network device to switchover from the primary configuration database to the backup configuration database. If any errors occur after the switchover, the network device may automatically switch back to the original primary configuration database. If there are no errors, then the network device is quickly re-configured to work properly within the network.

Off-line configuration, therefore, provides a powerful tool to allow network managers to prepare configuration data prior to actually implementing any configuration changes. Such preparation, allows a network manager to carefully configure a network device when they have time to consider all their options and requirements, and once the network manager is ready, the configuration changes are implemented quickly and efficiently.

FCAPS Management

Figure 7A:
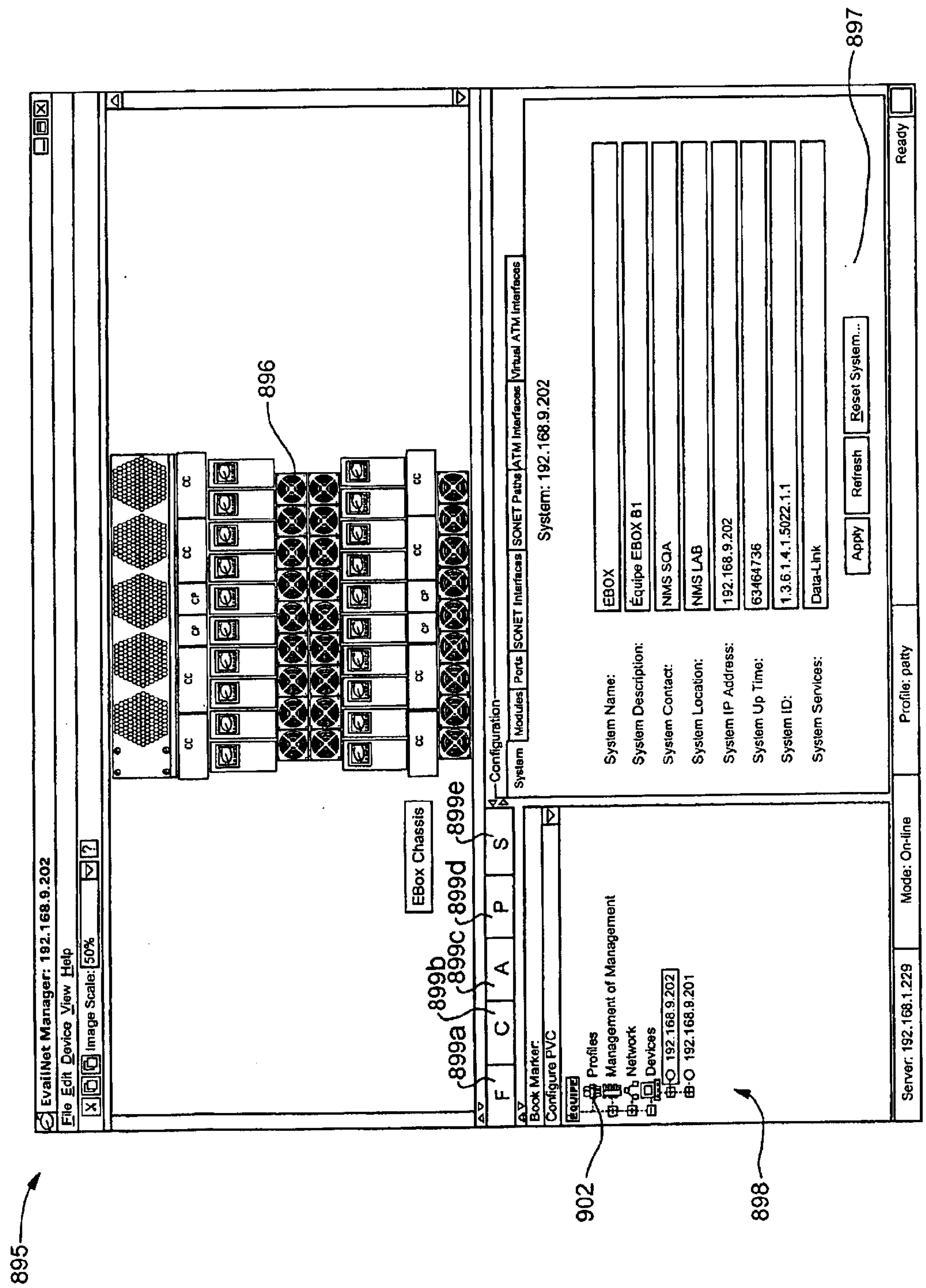
Figure 7B:
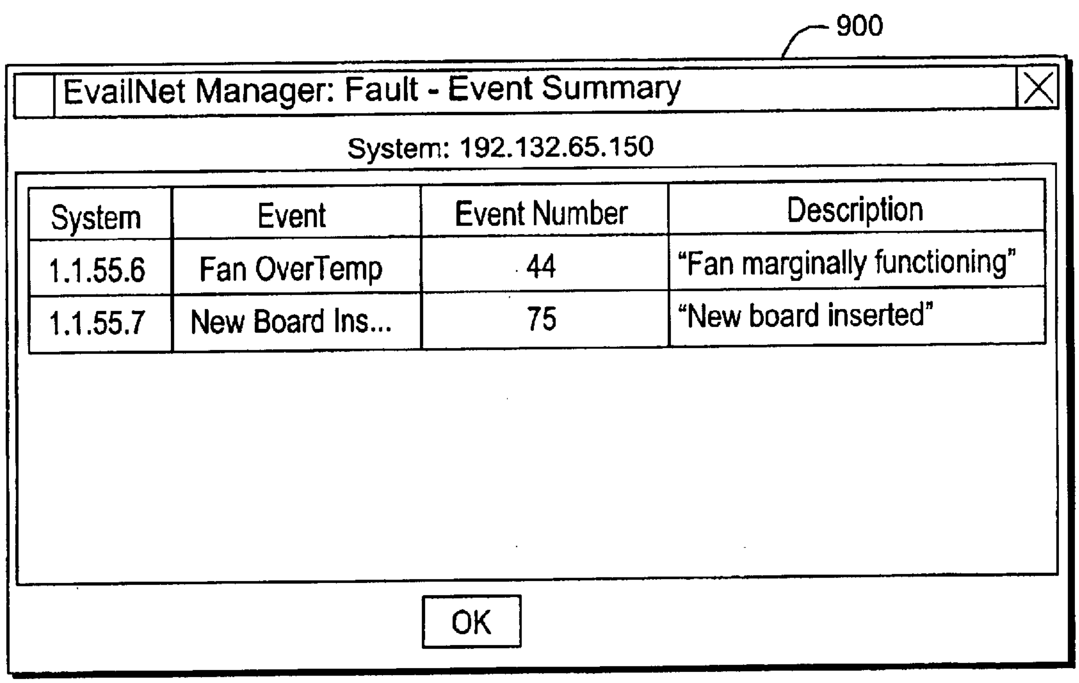

Fault, Configuration, Accounting, Performance and Security (FCAPS) management are the five functional areas of network management as defined by the International Organization for Standardization (ISO). Fault management is for detecting and resolving network faults, configuration management is for configuring and upgrading the network, accounting management is for accounting and billing for network usage, performance management is for overseeing and tuning network performance, and security management is for ensuring network security. Referring to FIG. 7*a,* GUI 895 provides a status button 899*a*–899*f* for each of the five FCAPS. By clicking on one of the status buttons, a status window appears and displays the status associated with the selected FCAPS button to the network administrator. For example, if the network administrator clicks on the F status button 899*a,* a fault event summary window 900 (FIG. 7*b*) appears and displays the status of any faults.

Each FCAP button may be colored according to a hierarchical color code where, for example, green means normal operation, red indicates a serious error and yellow indicates a warning status. Today there are many NMSs that indicate faults through color coded icons or other graphics. However, current NMSs do not categorize the errors or warnings into the ISO five functional areas of network management—that is, FCAPS. The color-coding and order of the FCAPS buttons provide a "status bar code" allowing a network administrator to quickly determine the category of error or warning and quickly take action to address the error or warning.

Figure 7C:
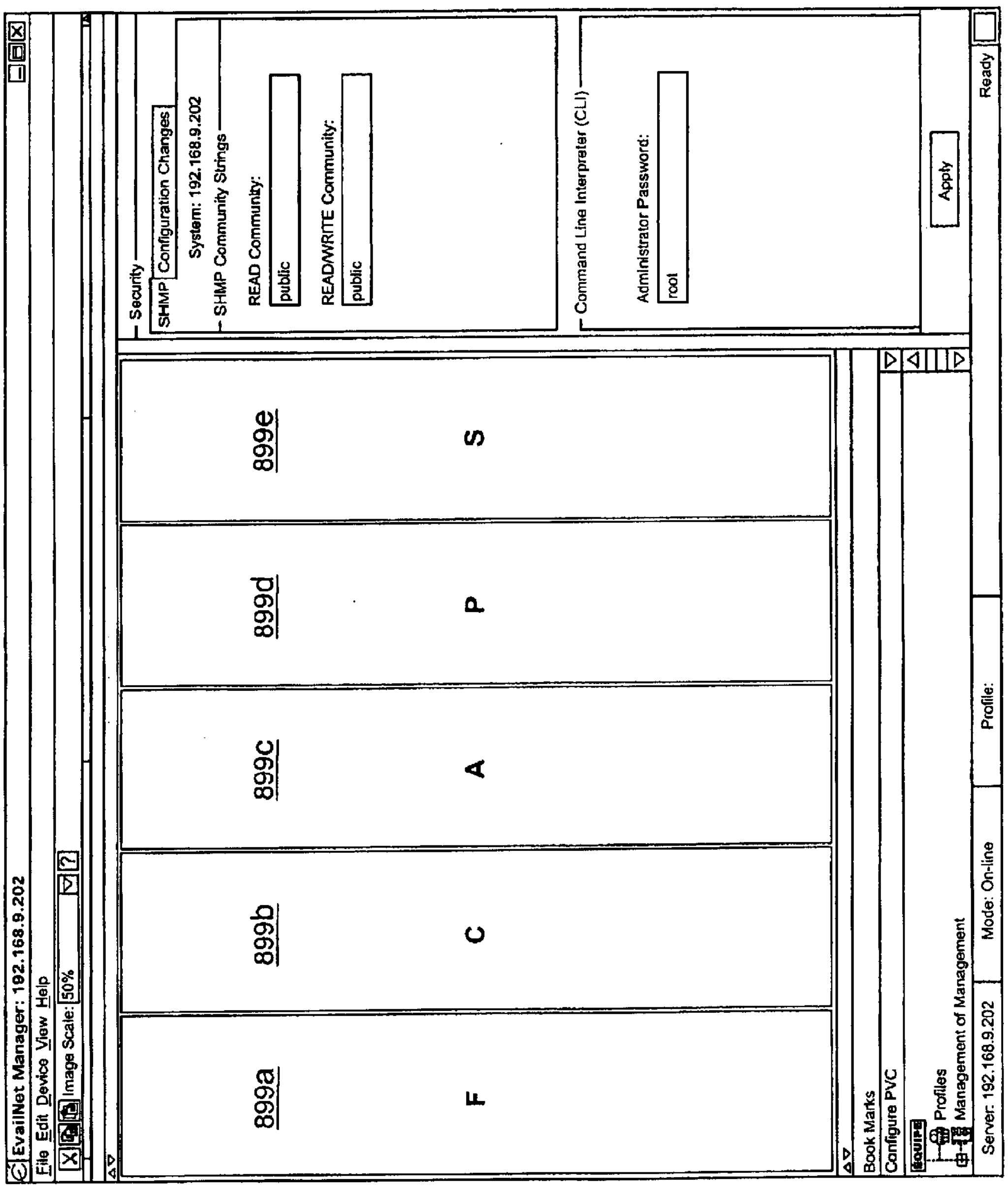

As with current NMSs, a network administrator may actively monitor the FCAPS buttons by sitting in front of the computer screen displaying the GUI. Unfortunately, network administrators do not have time to actively monitor the status of each network device—passive monitoring is required. To assist passive monitoring, the FCAPS buttons may be enlarged or "stretched" to fill a large portion of the screen, as shown in FIG. 7*c*. The FCAPS buttons may be stretched in a variety of ways, for example, a stretch option in a pull down menu may be selected or a mouse may be used to drag and drop the boarders of the FCAPS buttons. Stretching the FCAPS buttons allows a network administrator to view the status of each FCAP button from a distance of 40 feet or more. Once stretched, each of the five OSI management areas can be easily monitored at a distance by looking at the bar-encoded FCAPS strip. The "stretchy FCAPS" provide instant status recognition at a distance.

The network administrator may set the FCAPS buttons to represent a single network device or multiple network devices or all the network devices in a particular network. Alternatively, the network administrator may have the GUI display two or more FCAPS status bars each of which represents one or more network devices.

Although the FCAPS buttons have been described as a string of multiple stretched bars, many different types of graphics may be used to display FCAPS status. For example, different colors may be used to represent normal operation, warnings and errors, and additional colors may be added to represent particular warnings and/or errors. Instead of a bar, each letter (e.g., F) may be stretched and color-coded. Instead of a solid color, each FCAPS button may repeatedly flash or strobe a color. For example, green FCAPS buttons may remain solid (i.e., not flashing) while red errors and yellow warnings are displayed as a flashing FCAPS button to quickly catch a network administrator's attention. As another example, green/normal operation FCAPS buttons may be a different size relative to yellow/warnings and red/errors FCAPS buttons. For example, an FCAPS button may be automatically enlarged if status changes from good operation to a warning status or an error status. In addition, the FCAPS buttons may be different sizes to allow the network administrator to distinguish between each FCAPS button from a further distance. For example, the buttons may have a graduated scale where the F button is the largest and each button is smaller down to the S button, which is the smallest. Alternatively, the F button may be the smallest while the S button is the largest, or the A button in the middle is the largest, the C and P buttons are smaller and the F and S buttons are smallest. Many variations are possible for quickly alerting a network administrator of the status of each functional area.

Figure 7D:
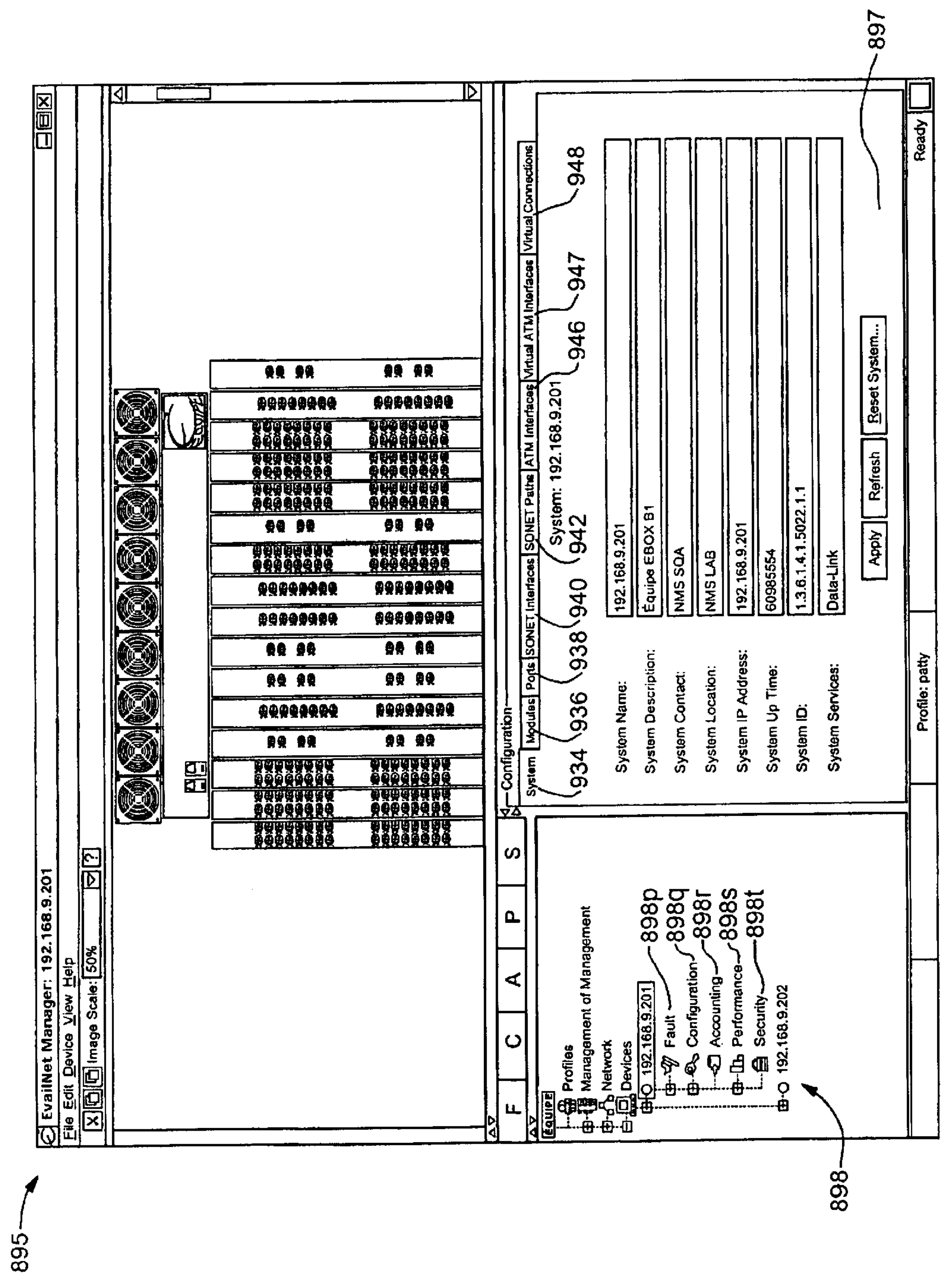
Figure 7E:
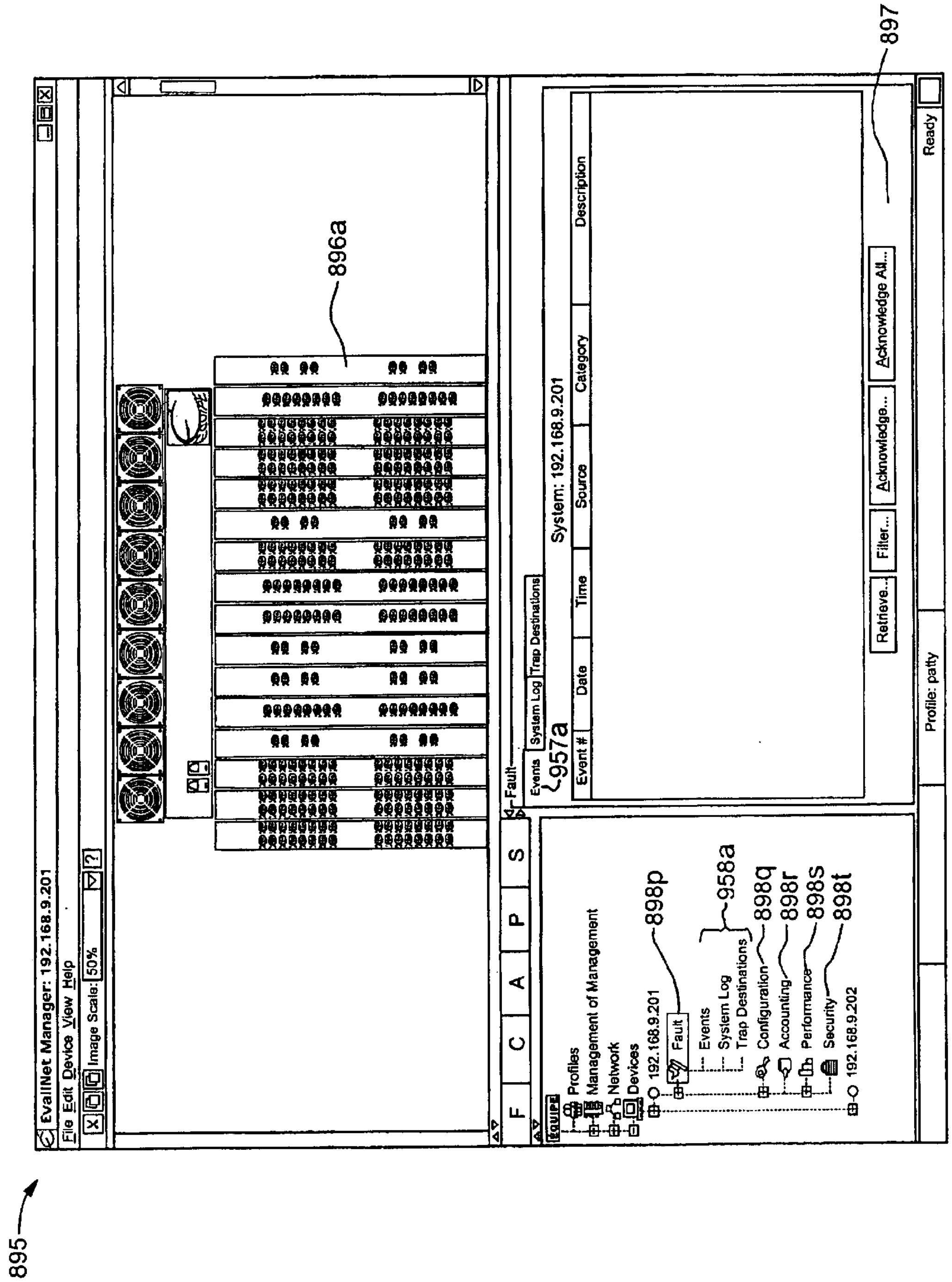
Figure 7F:
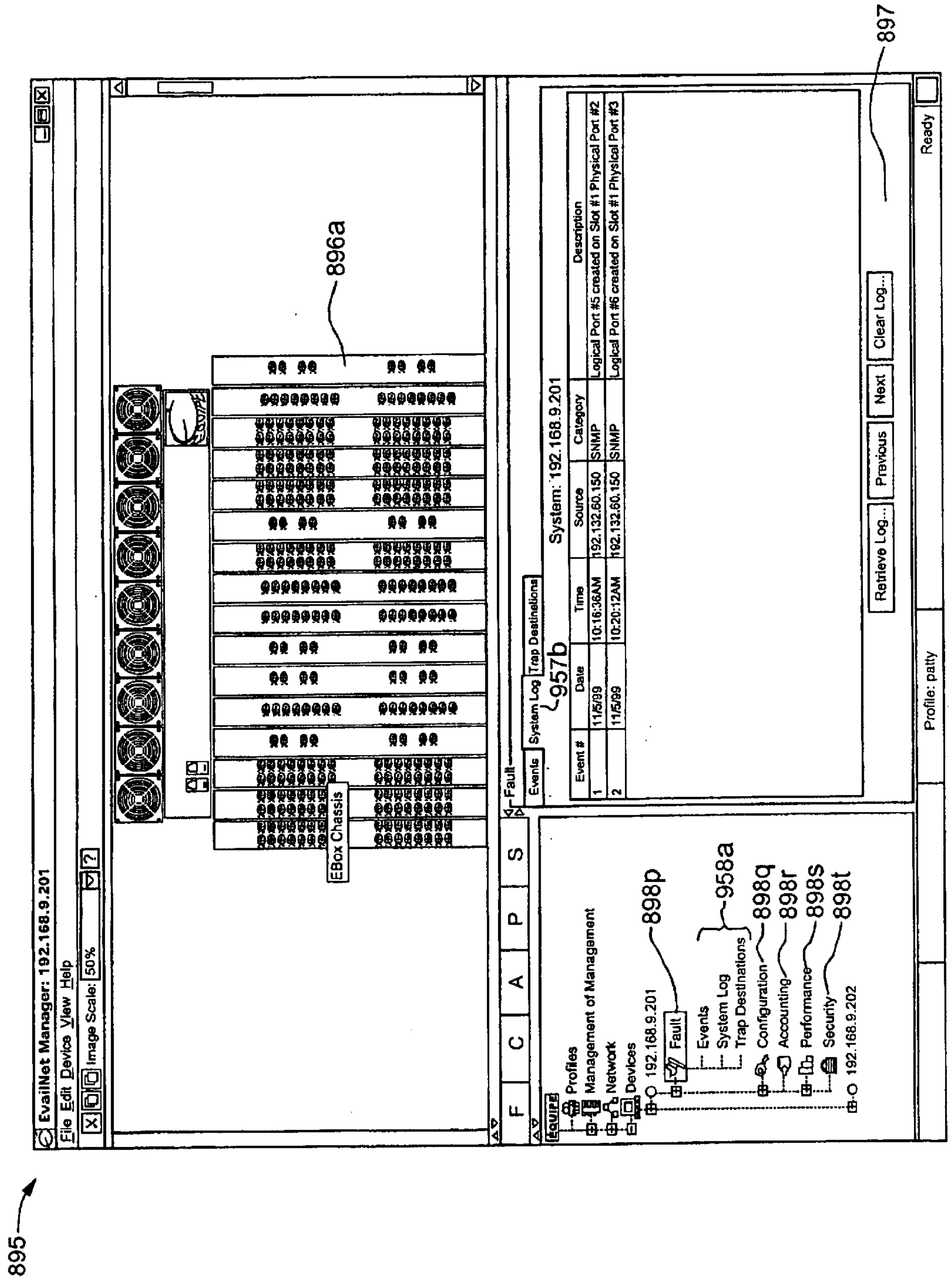
Figure 7G:
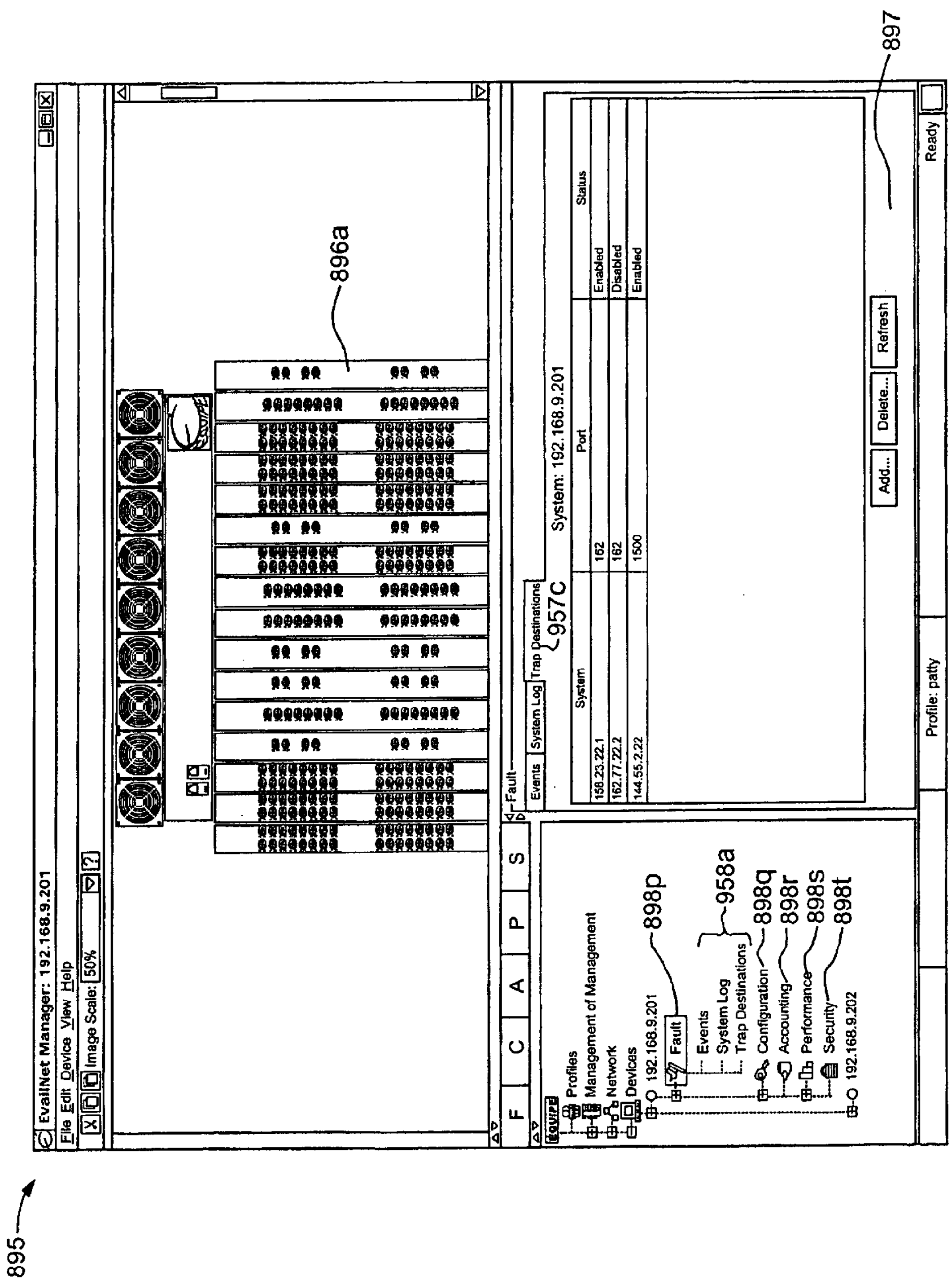

Referring to FIG. 7*d,* for more detailed FCAPS information, the network administrator may double click the left mouse button on a particular network device (e.g., 192.168.9.201) to cause device navigation tree 898 to expand and display FCAPS branches, for example, Fault branch 898*p,* Configuration branch 898*q,* Accounting branch 898*r;* Performance branch 898*s* and Security branch 898*t.* The administrator may then select one of these branches to cause status window 897 to display tabs/folders of data corresponding to the selected branch. For example, if Fault branch 898*p* is selected (FIG. 7*e*), an Events tab 957*a* is displayed in status window 897 as well as tab holders for other tabs (e.g., System Log tab 957*b* (FIG. 7*f*) and Trap Destinations 957*c* (FIG. 7*g*)). If the administrator double clicks the left mouse button on the Fault branch, then device tree 898 displays a list 958*a* of the available fault tabs. The administrator may then select a tab by selecting the tab holder from status window 897 or device tree 898.

Figure 7H:
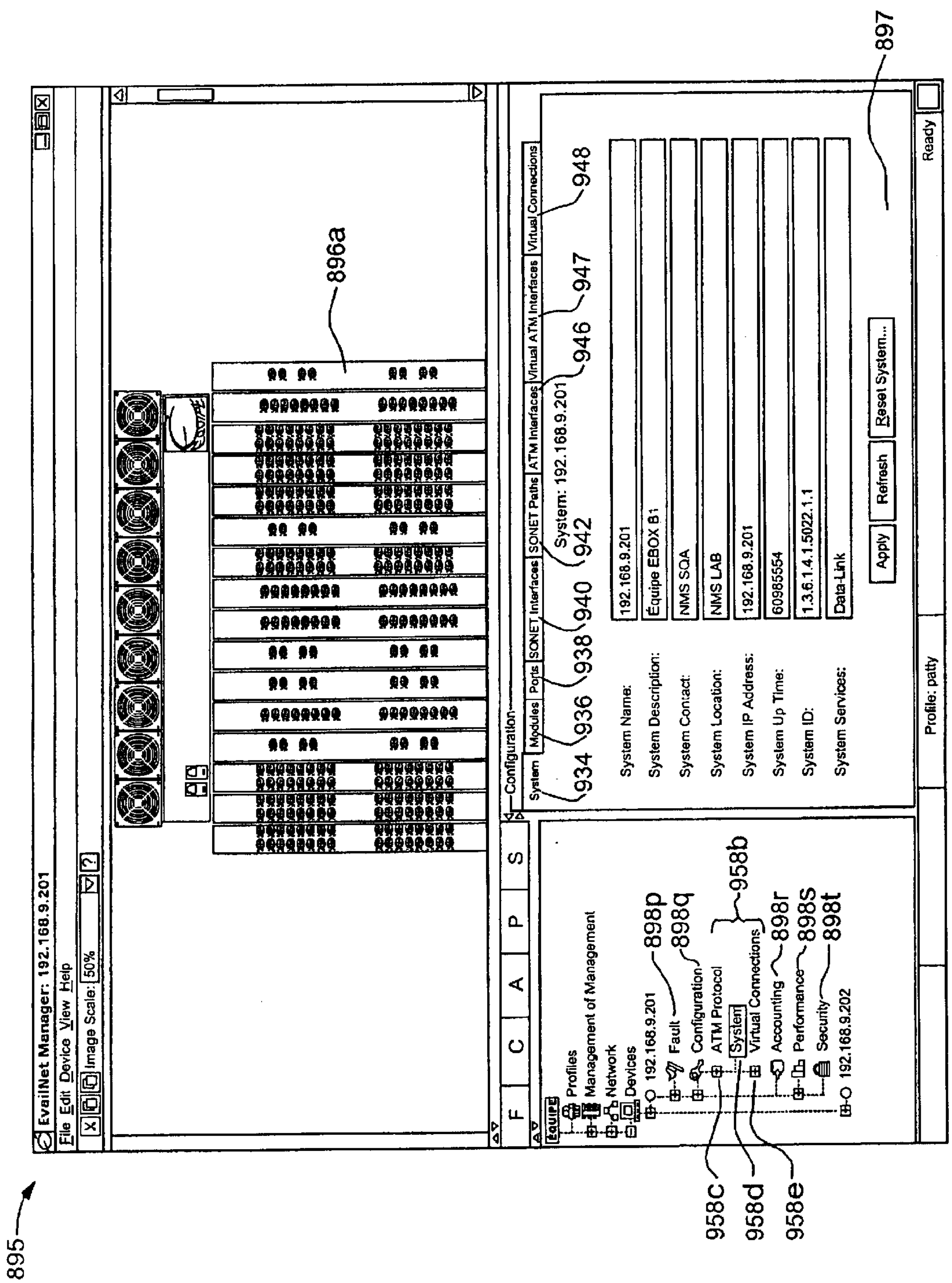

Events tab 957*a* (FIG. 7*e*) displays an event number, date, time, source, category and description of each fault associated with a module or port selected in device mimic 896*a.* System Log tab 957*b* (FIG. 7*f*) displays an event number, date, time, source, category and description of each fault associated with the entire network device (e.g., 192.168.9.201), and Trap Destination tab 957*c* (FIG. 7*g*) displays a system/network device IP address or DNS name, port and status corresponding to each detected trap destination. Various other tabs and formats for displaying fault information may also be provided. Referring to FIG. 7*h,* if the administrator double clicks the left mouse button on Configuration branch 898*q,* then device tree 898 expands to display a list 958*b* of available configuration sub-branches, for example, ATM protocol sub-branch 958*c,* System sub-branch 958*d* and Virtual Connections sub-branch 958*e.* When the device branch (e.g., 192.168.9.201), Configuration branch 898*q* or System branch 958*d* is selected, System tab 934, Module tab 936, Ports tab 938, SONET Interface tab 940, SONET Paths tab 942, ATM Interfaces tab 946, Virtual ATM Interfaces tab 947 and Virtual Connections tab 948 are displayed. These configuration tabs are described above in detail (see FIGS. 4*s*–4*z* and 5*a*–5*z*).

Figure 7I:
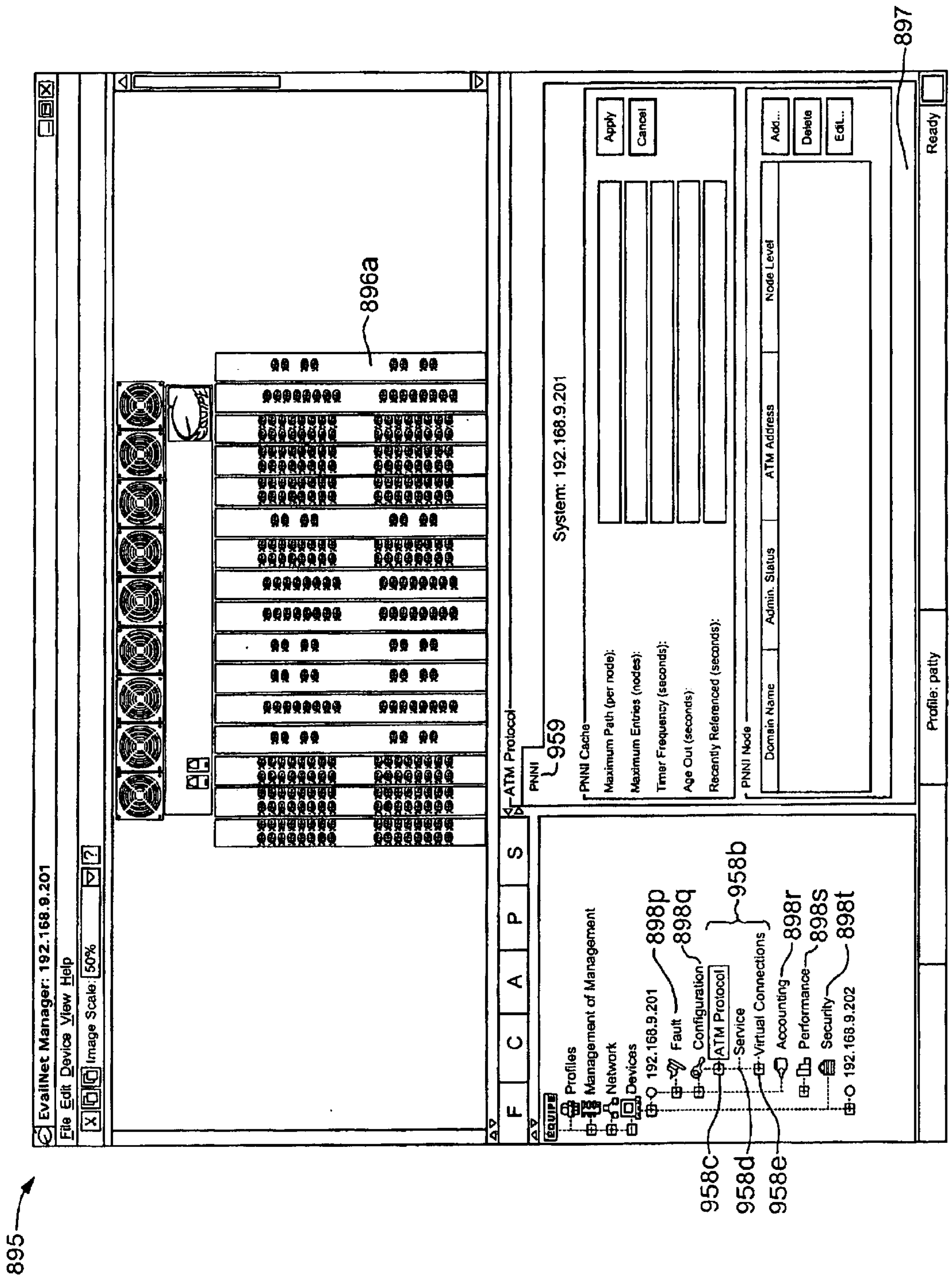

If ATM protocol branch 958*c* is selected, then tabs/folders holding ATM protocol information are displayed, for example, Private Network-to-Network Interface (PNNI) tab 959 (FIG. 7*i*). The PNNI tab may display PNNI cache information such as maximum path (per node), maximum entries (nodes), timer frequency (seconds), age out (seconds) and recently referenced (seconds) data. The PNNI tab may also display PNNI node information for each PNNI node such as domain name, administrative status, ATM address and node level. The PNNI cache and PNNI node information may be for a particular ATM interface, all ATM interfaces in the network device or ATM interfaces corresponding to a port or module selected by the administrator in device mimic 896*a.* Various other tabs displaying ATM information, for example, an Interim Link Management Interface (ILMI) tab, may also be provided. In addition, various other upper layer network protocol branches may be included in list 958*b,* for example, MuliProtocol Label Switching (MPLS) protocol, Frame Relay protocol or Internet Protocol (IP) branches, depending upon the capabilities of the selected network device. Moreover, various physical layer network protocol branches (and corresponding tabs) may also be included, for example, Synchronous Optical NETwork (SONET) protocol and/or Ethernet protocol branches, depending upon the capabilities of the selected network device.

Figure 7J:
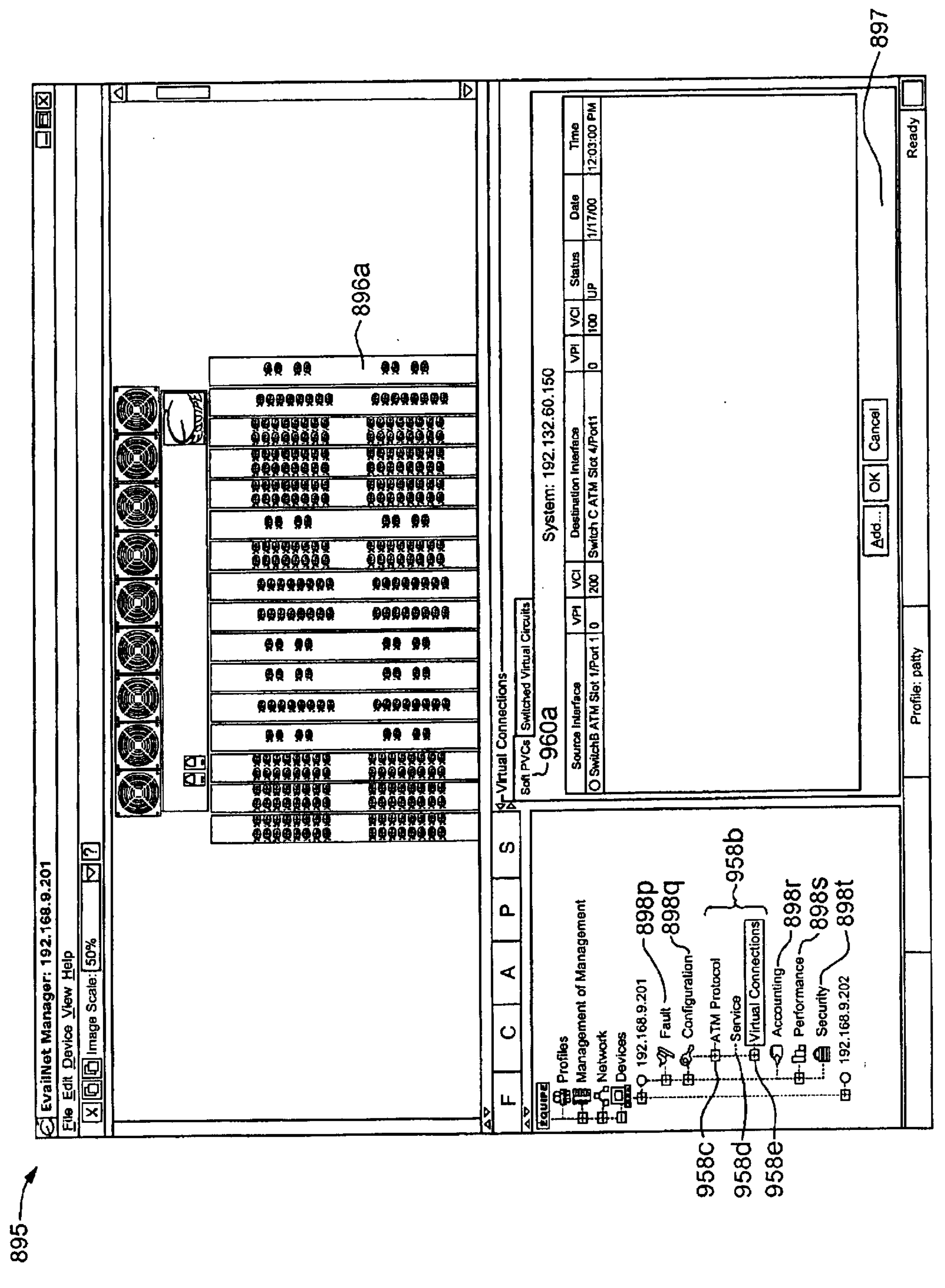
Figure 7K:
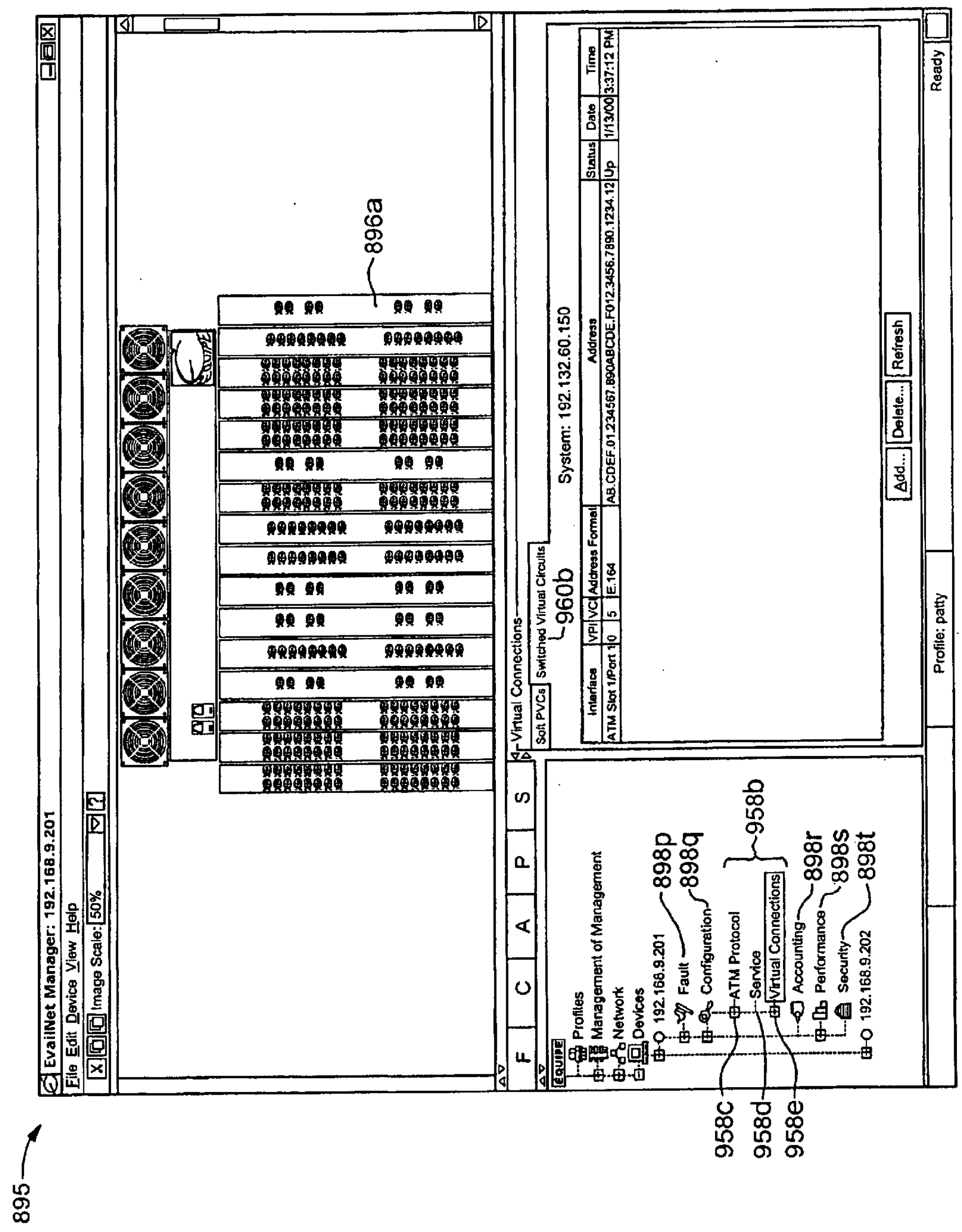

If Virtual Connections branch 958*e* is selected, then tabs/folders holding virtual connection information are displayed, for example, Soft Permanent Virtual Circuit (PVC) tab 960*a* (FIG. 7*j*) and Switched Virtual Circuits tab 960*b* (FIG. 7*k*). Soft PVC tab 960*a* may display information relating to source interface, Virtual Path Identifier (VPI), Virtual Channel Identifier (VCI), status, date and time. Switched Virtual Circuits tab 960*b* may display information relating to interface, VPI, VCI, address format, address, status, date and time. The information in either tab may be for a particular virtual connection, all virtual connections in the network device or only those virtual connections corresponding to a port or module selected by the administrator in device mimic 896*a.* Various other tabs displaying virtual connection information, for example, virtual connections established through various different upper layer network protocols, may also be provided, depending upon the capabilities of the selected network device.

Figure 7L:
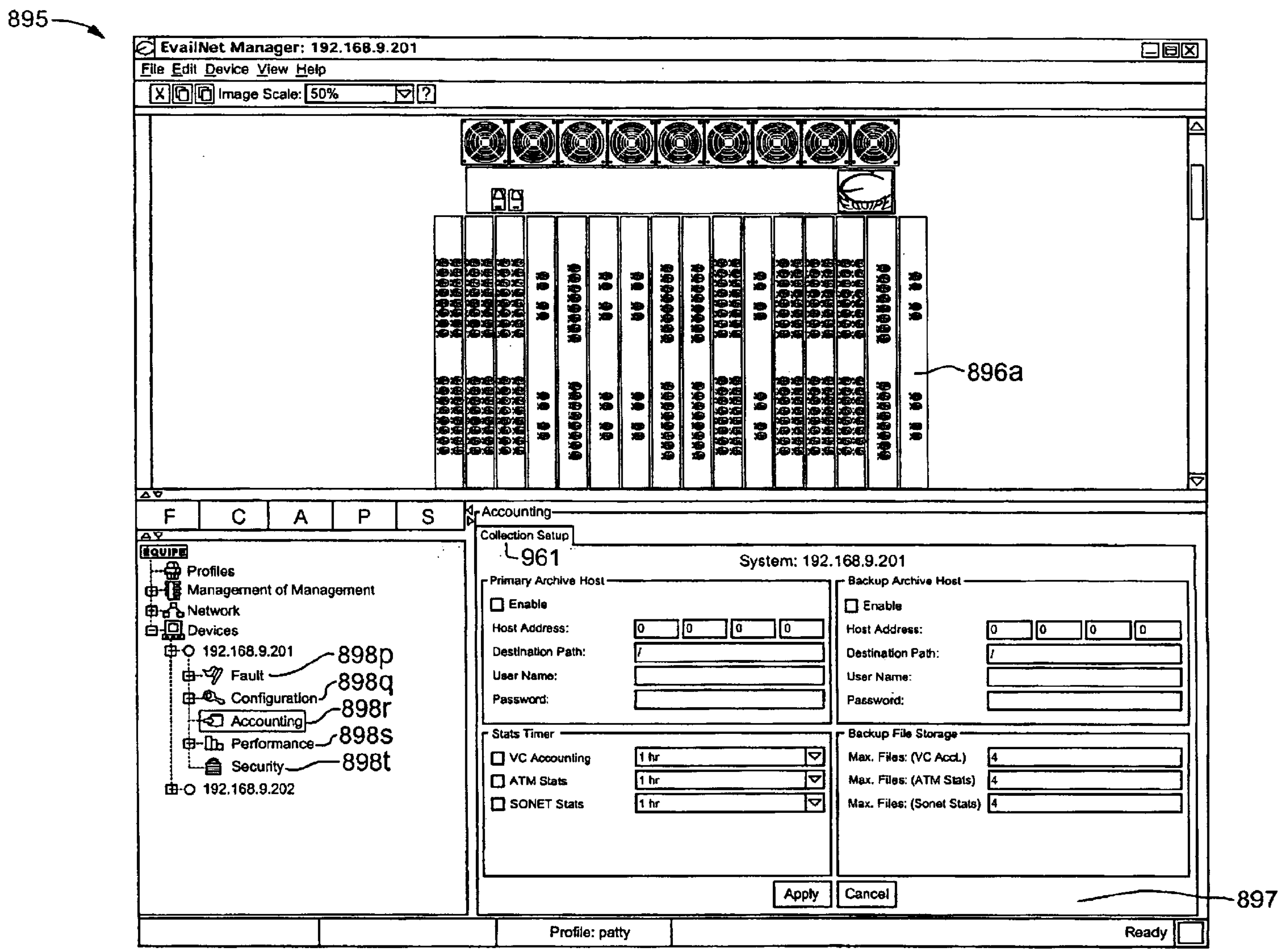

For detailed accounting information, the administrator may select Accounting branch 898*r* (FIG. 7*l*). This will cause one or more tabs/folders to be displayed which contain accounting data. For example, a Collection Setup tab 961 may be displayed that provides details on a primary and a backup archive host—that is, the system executing the Data Collection Server (described above). The Collection Setup tab may also provide statistics timer data and backup file storage data. Various other tabs displaying accounting information may also be provided. For example, a tab may be created for each particular customer to track the details of each account.

Figure 7M:
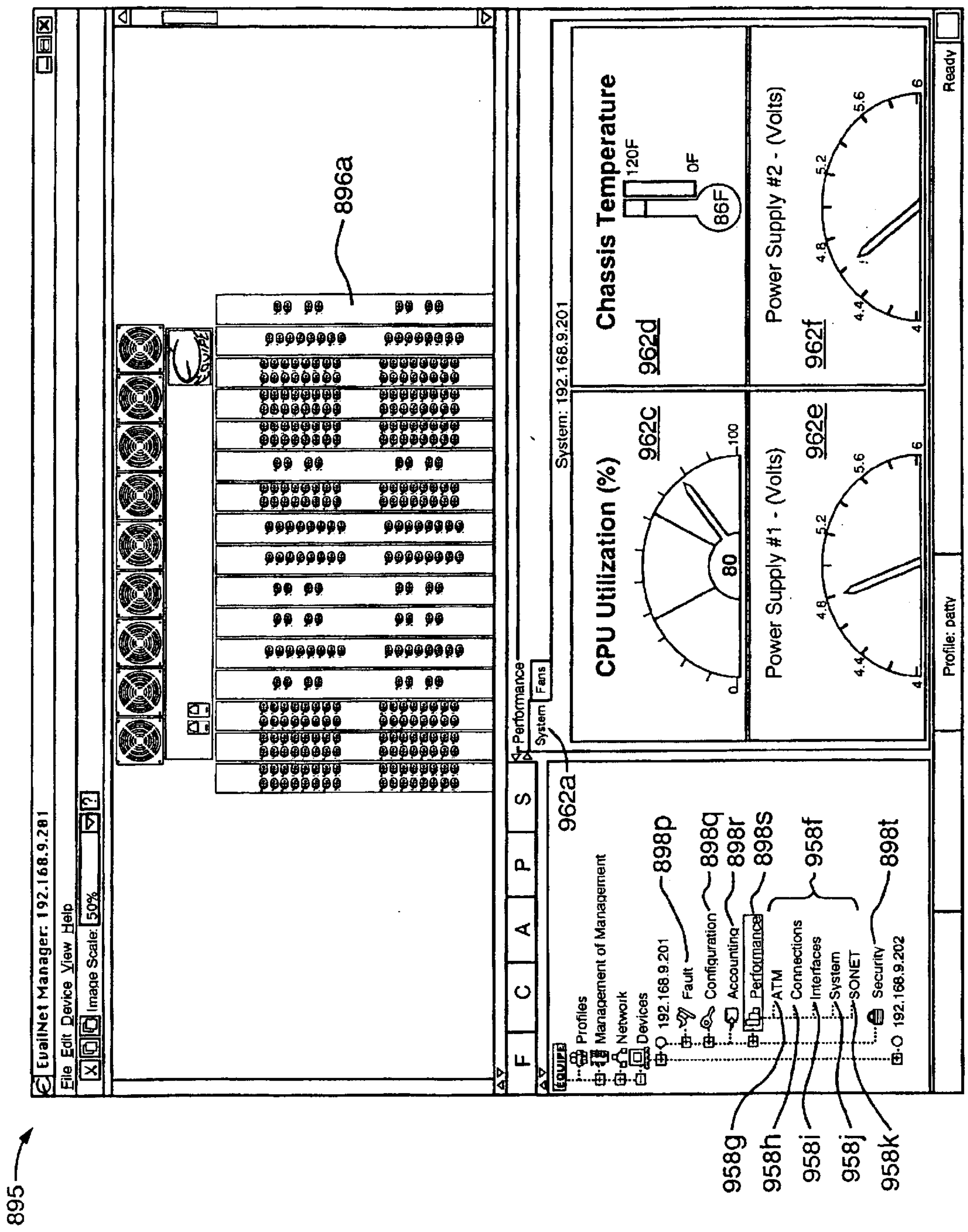
Figure 7N:
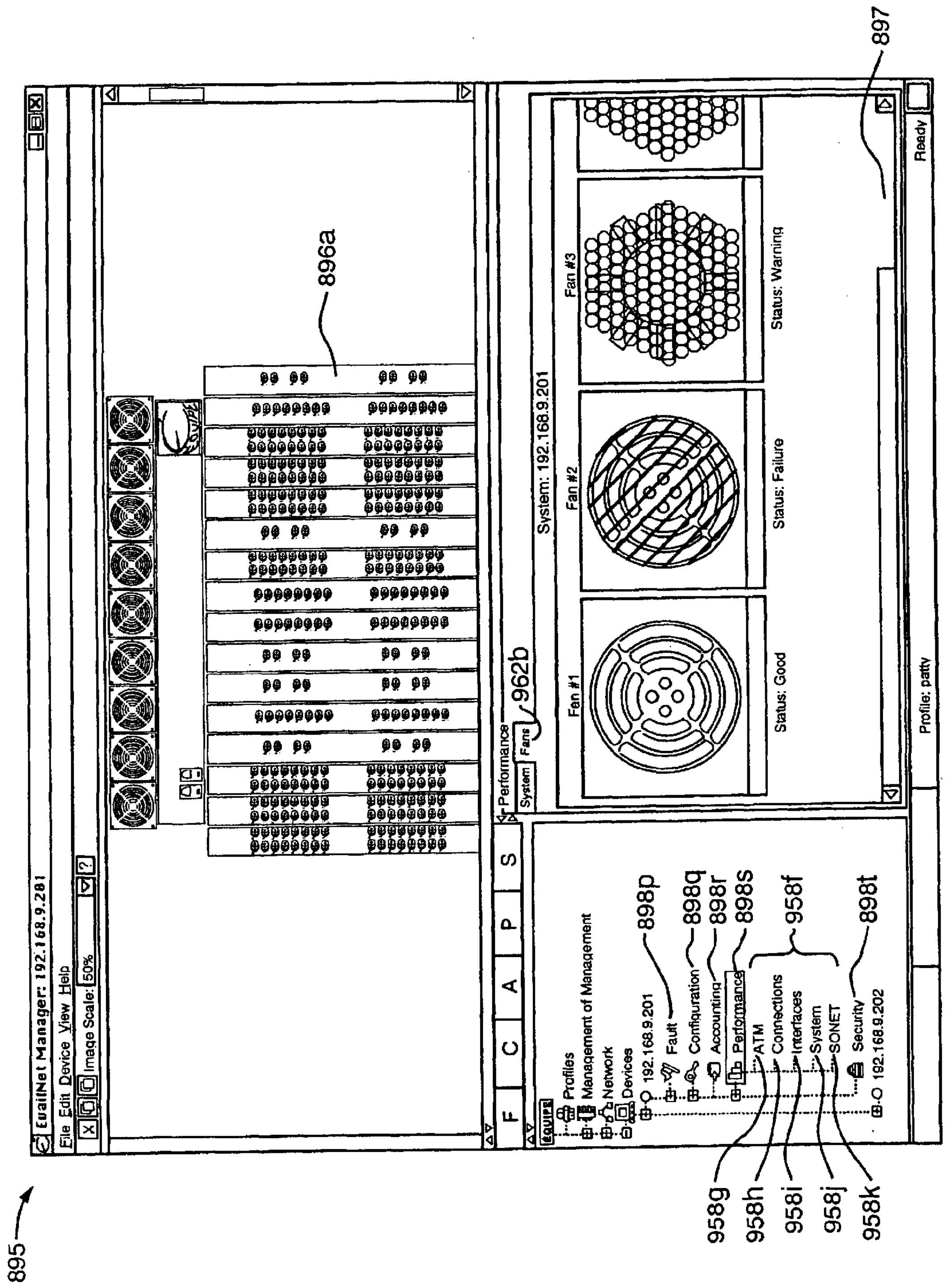

For detailed performance information, the administrator may select Performance branch 898*s* (FIG. 7*m*) and double click the left mouse button to review a list 958*f* of available sub-branches, for example, ATM sub-branch 958*g,* Connections sub-branch 958*h,* Interfaces sub-branch 958*i,* System sub-branch 958*j,* and SONET sub-branch 958*k.* Selecting Performance branch 898*s* or System sub-branch 958*j* provides general performance tabs in stats window 897, for example, System tab 962*a* and Fans tab 962*b* (FIG. 7*n*). System tab 962*a* may provide graphical representations of various system performance parameters, for example, an odometer style graphic may be used to display CPU Utilization 962*c* and power supply voltage level 962*e* and 962*f* and a temperature gauge may be used to show Chassis Temperature 962*d.* Fans tab 962*b* may provide graphical representations of the status of the network device's fans. For example, fans may be colored green and shown spinning for normal operation, yellow and spinning for a warning status and red and not spinning for a failure status. Various other graphical representations may be used, for example, bar graphs or pie charts, and instead of graphical representations, the data may be provided in a table or other type of format. Moreover, the data in the other tabs displayed in status window 897 may also be displayed in various formats including graphical representations.

Figure 7O:
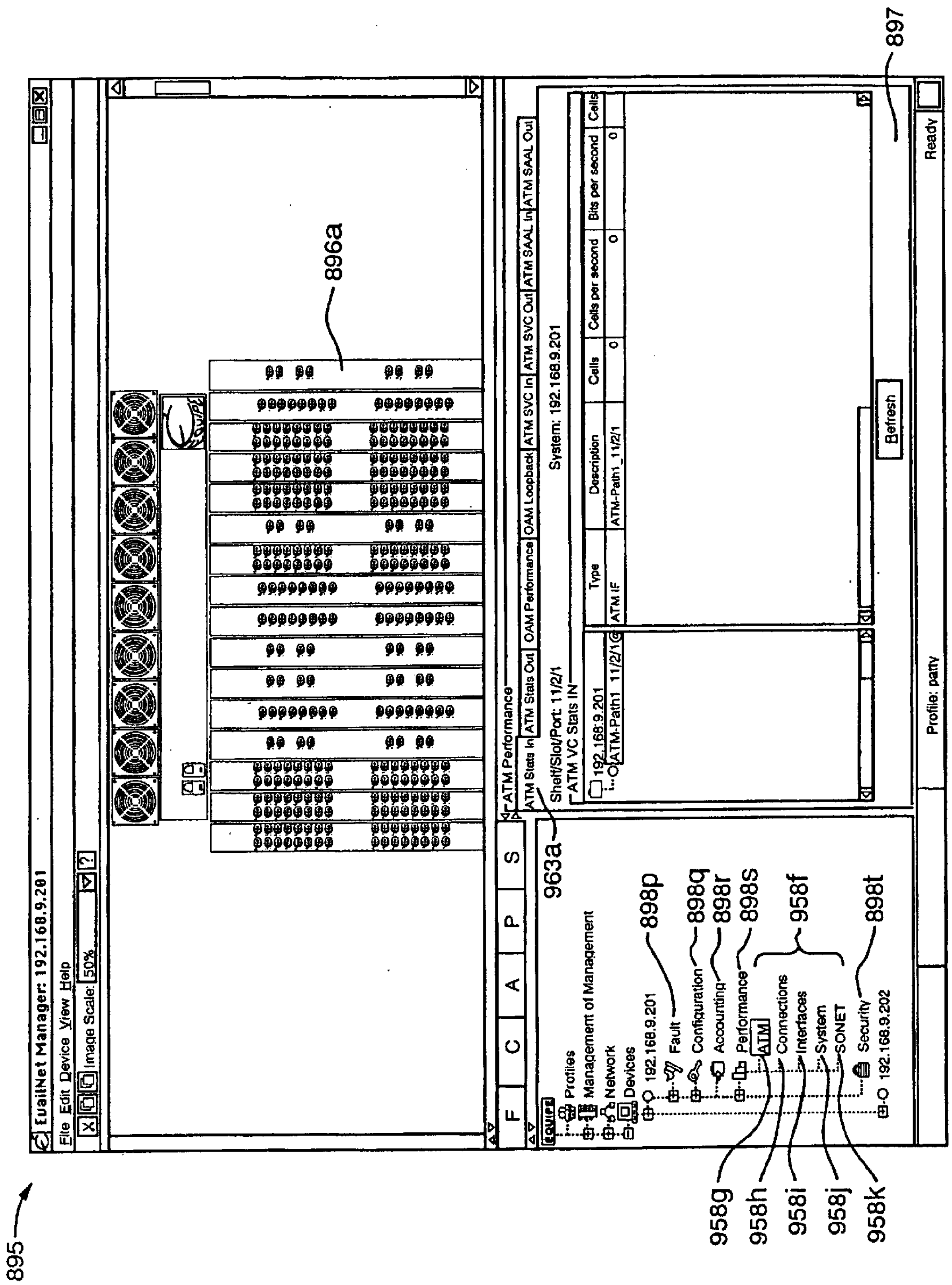
Figure 7P:
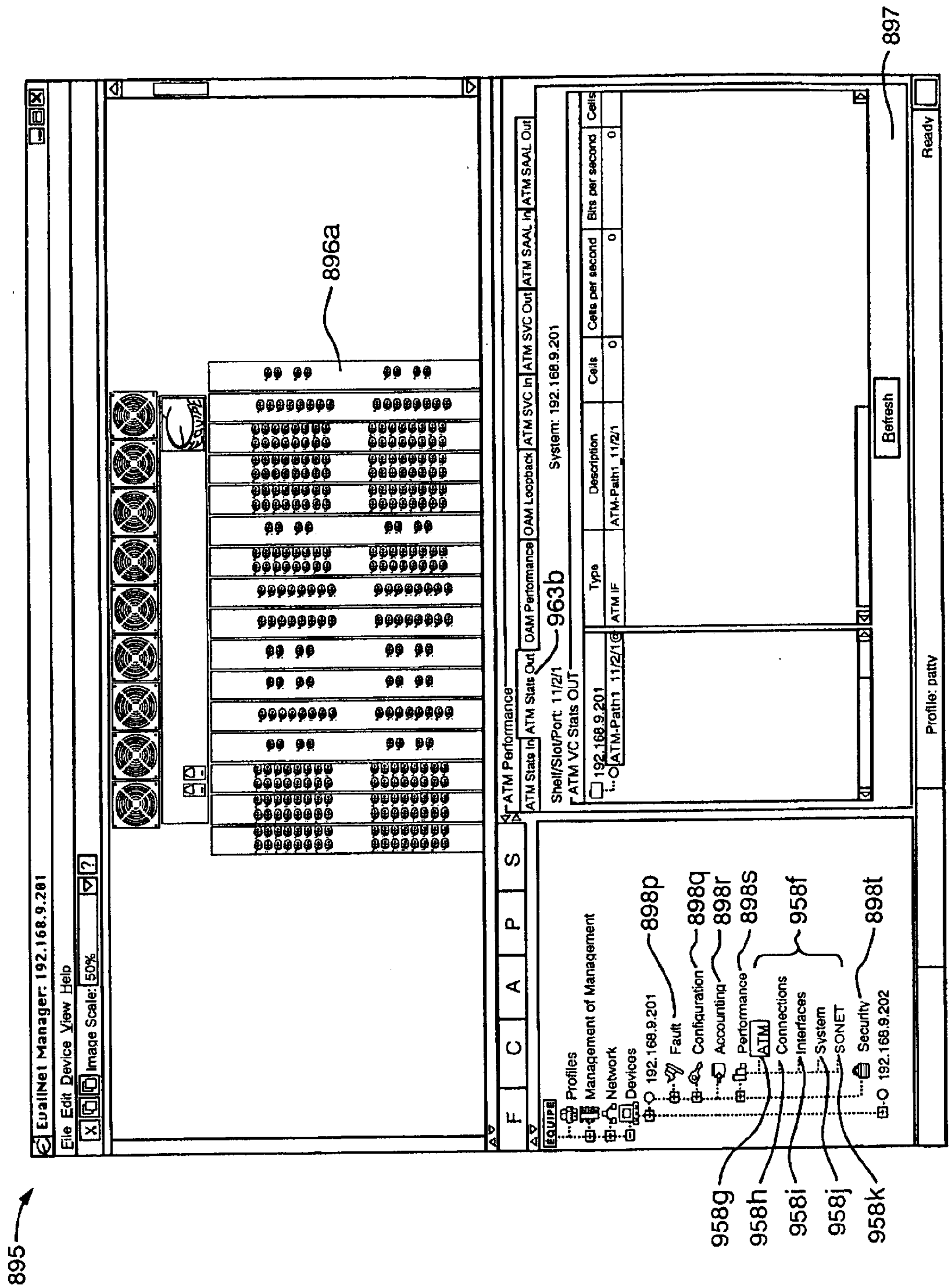
Figure 7Q:
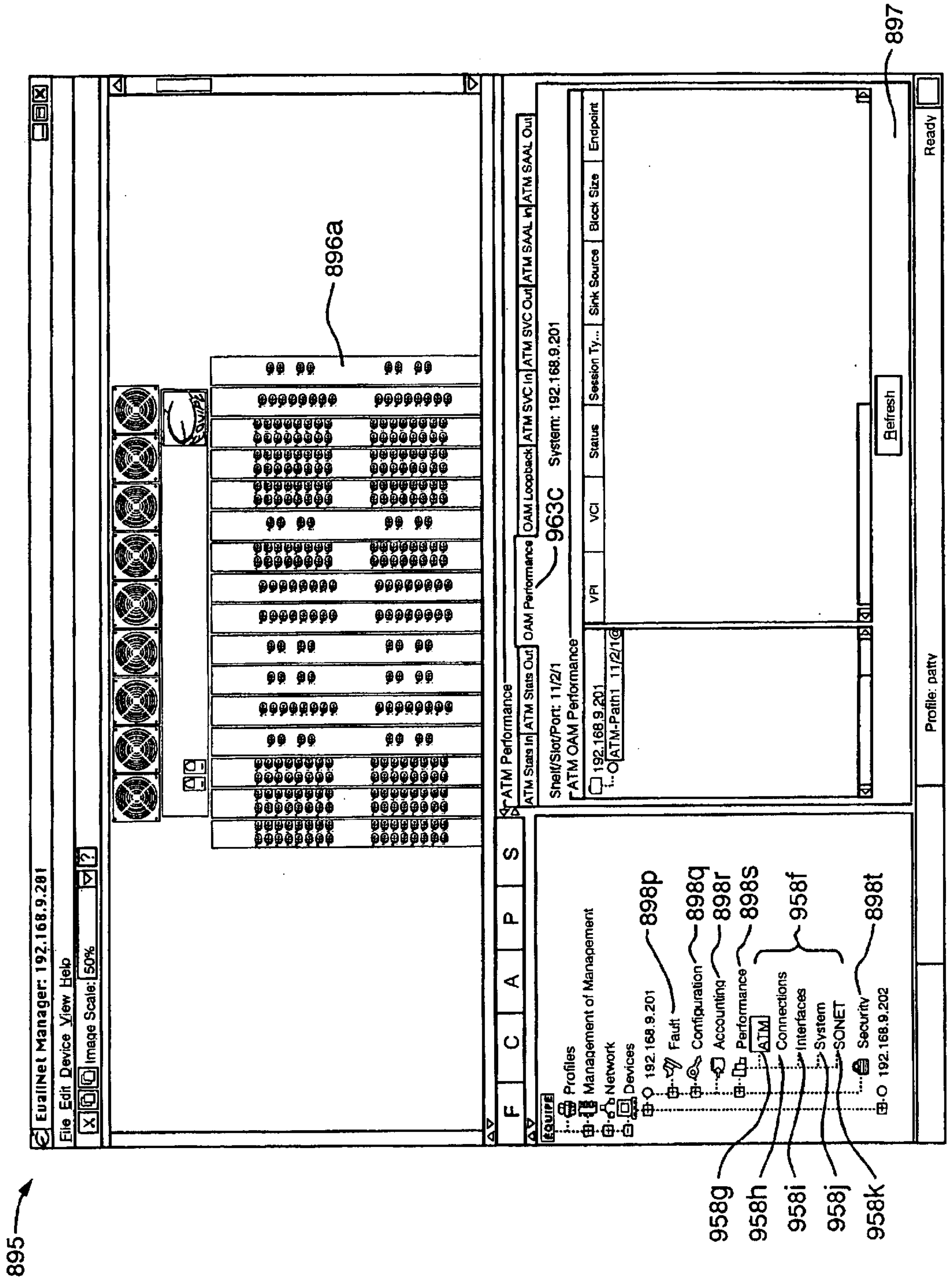
Figure 7R:
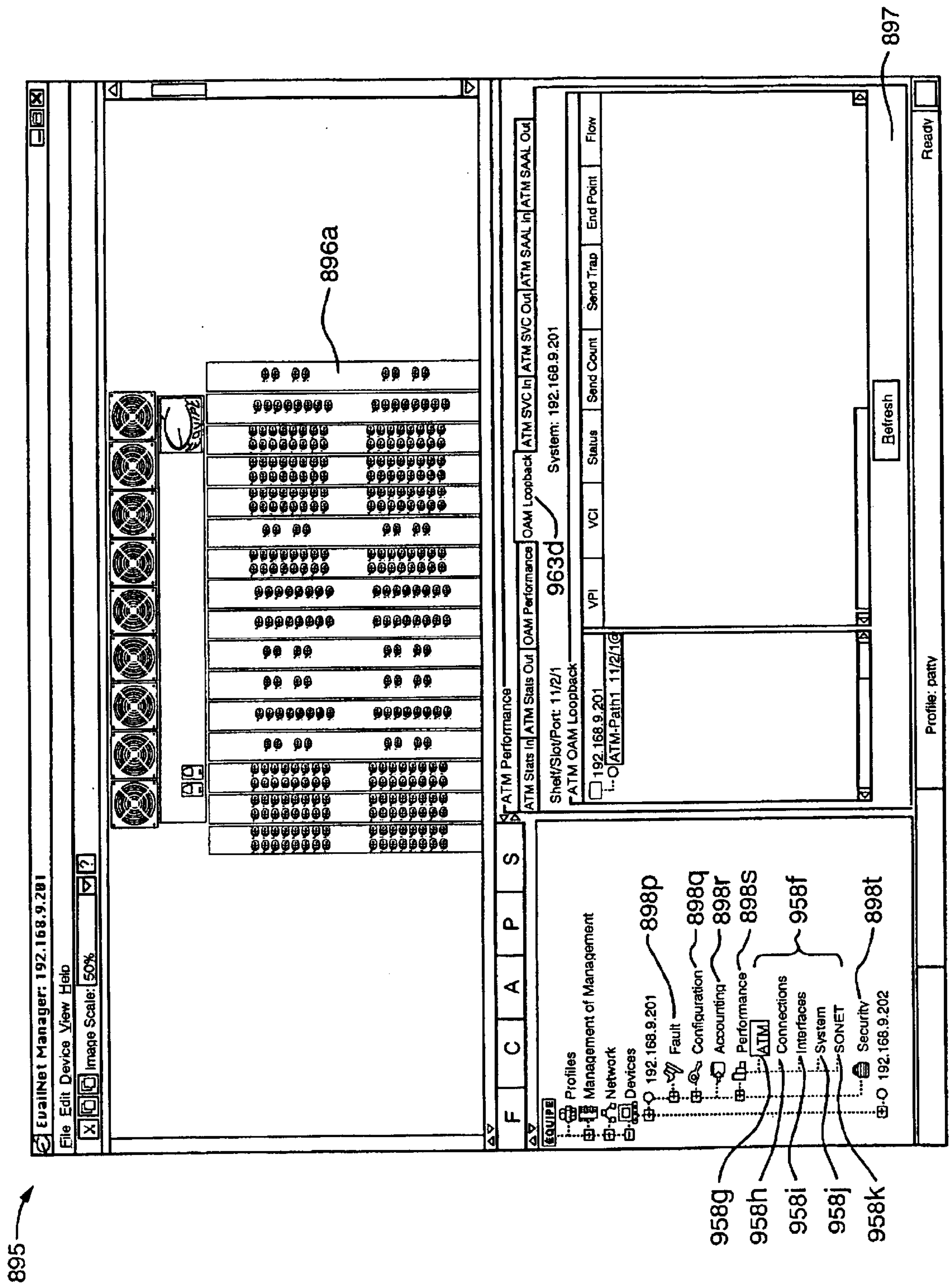
Figure 7S:
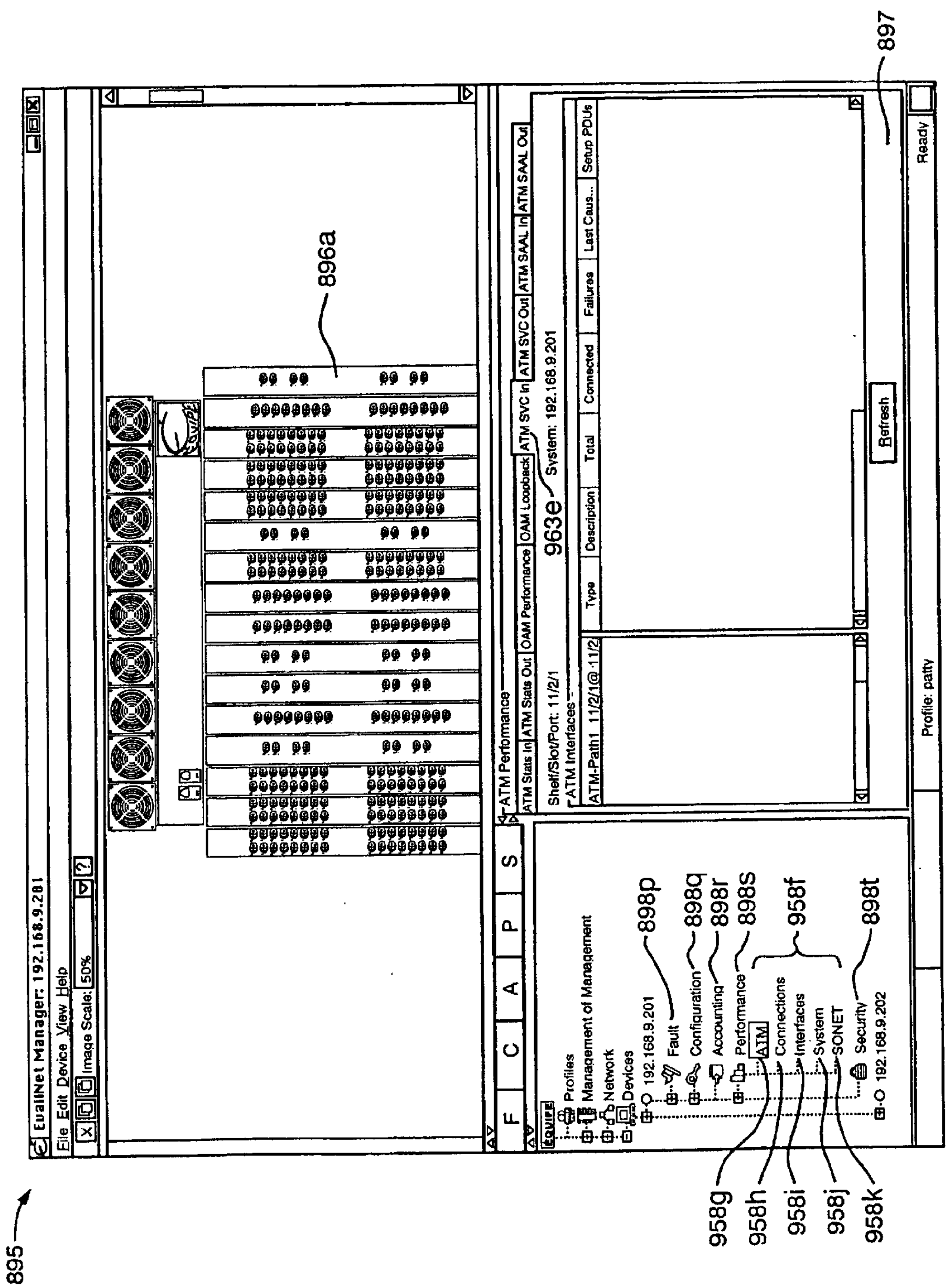
Figure 7T:
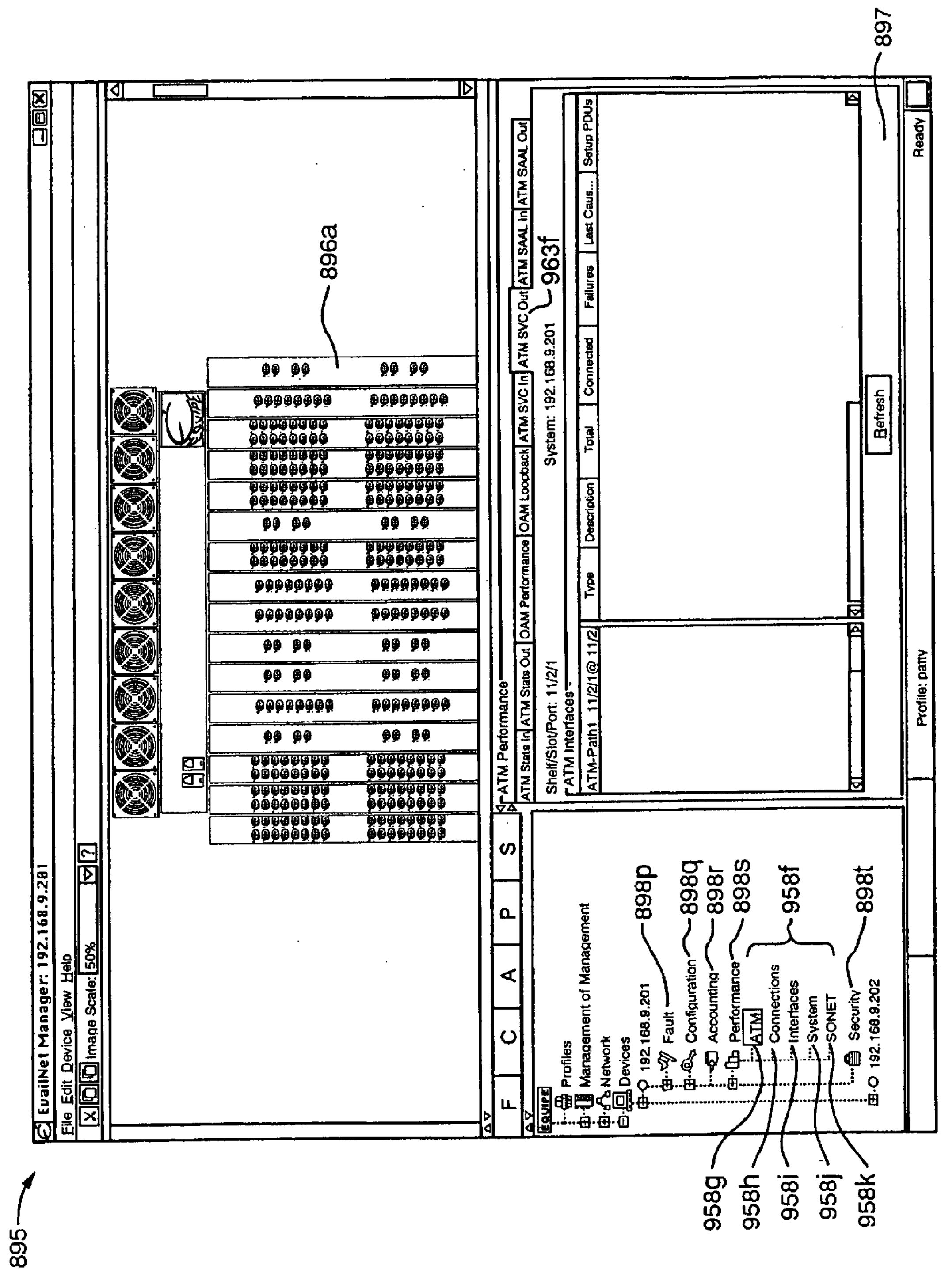
Figure 7U:
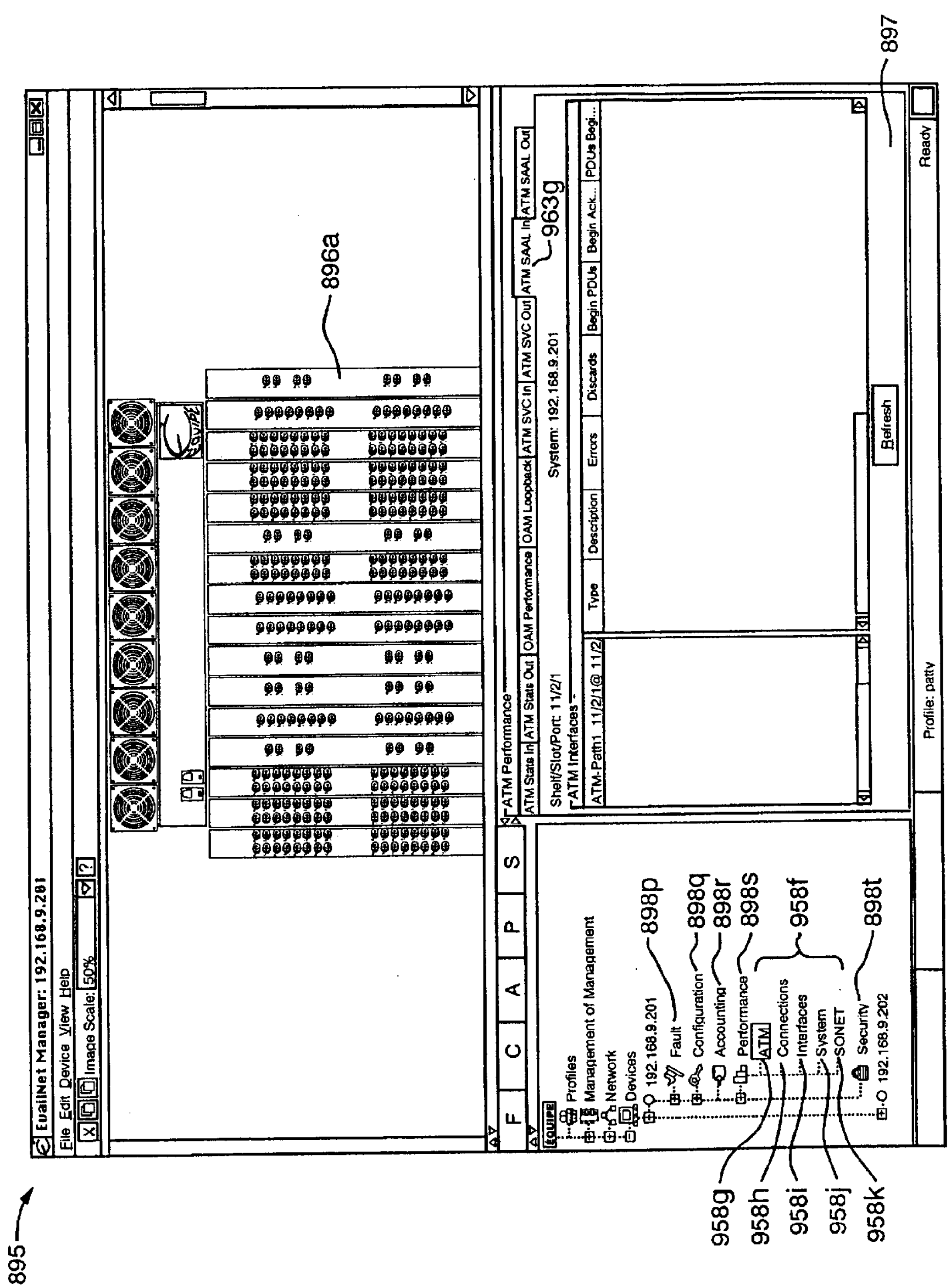
Figure 7V:
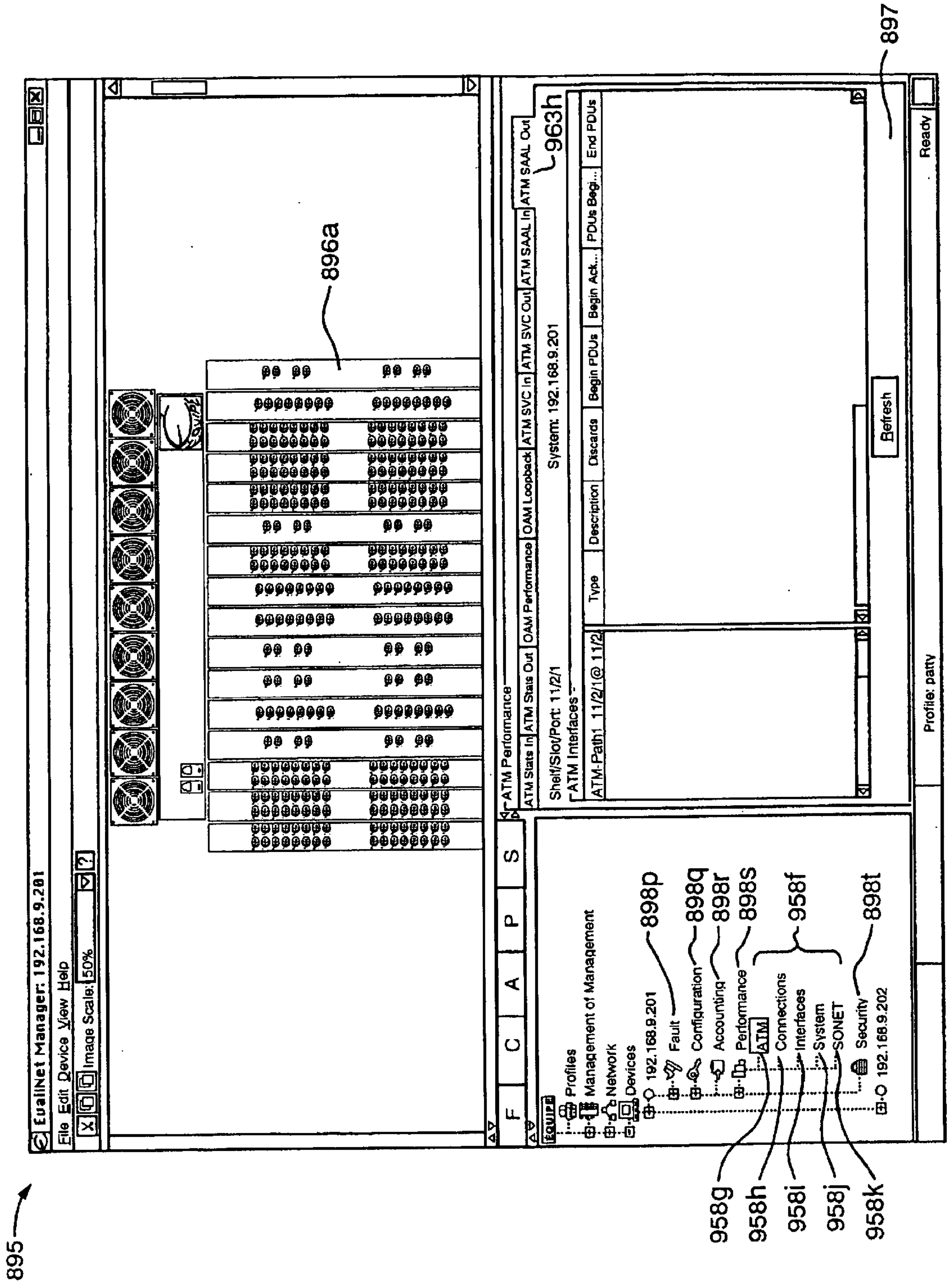

If the administrator selects ATM sub-branch 958*g* (FIG. 7*o*), various tabs are displayed containing ATM related performance information, for example, ATM Stats In tab 963*a,* ATM Stats out tab 963*b* (FIG. 7*p*), Operations Administration Maintenance (OAM) Performance tab 963*c* (FIG. 7*q*), OAM Loopback tab 963*d* (FIG. 7*r*), ATM Switched Virtual Circuit (SVC) In tab 963*e* (FIG. 7*s*), ATM SVC Out tab 963*f* (FIG. 7*t*), ATM Signaling ATM Adaptation Layer (SAAL) In tab 963*g* (FIG. 7*u*) and ATM SAAL Out tab 963*h* (FIG. 7*v*). The data displayed in each of these tabs may correspond to a particular ATM path (e.g., ATM-Path1_11/2/1), to all ATM paths corresponding to a particular port or module selected by the administrator in device mimic 896*a* or to all the ATM paths in the network device. ATM Stats In tab 963*a* (FIG. 7*o*) and ATM Stats Out tab 963*b* (FIG. 7*p*) may display, for example, the type, description, cells, cells per second and bits per second for each ATM path. OAM Performance tab 963*c* (FIG. 7*q*) may display, for example, VPI, VCI, status, session type, sink source, block size and end point statistics for each ATM path, while OAM Loopback tab 963*d* (FIG. 7*r*) may display, for example, VPI, VCI, status, send count, send trap, endpoint and flow statistics for each ATM path. ATM SVC In tab 963*e* (FIG. 7*s*) and ATM SVC Out tab 963*f* (FIG. 7*t*) may display, for example, type, description, total, connected, failures, last cause and setup Protocol Data Unit (PDU) data for each path, and ATM SAAL In tab 963*g* (FIG. 7*u*) and ATM SAAL Out tab 963*h* (FIG. 7*v*) may display, for example, type, description, errors, discards, begin PDUs, begin acknowledge, PDU begin and End PDUs for each ATM path. Various other upper layer network protocol sub-branches may also be displayed in list 958*f,* including a sub-branch for MPLS, Frame Relay and/or IP, depending upon the capabilities of the selected network device.

Figure 7W:
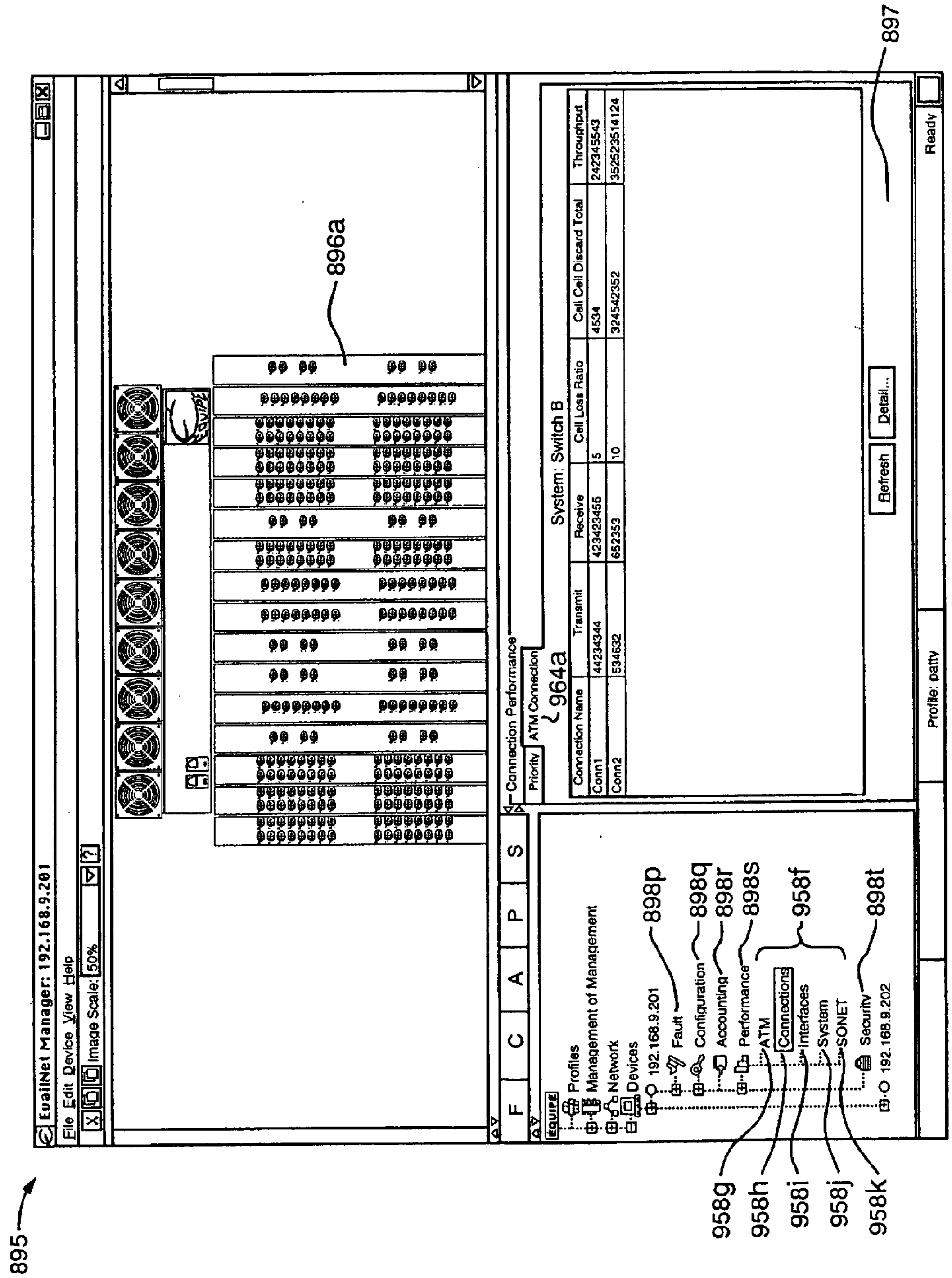
Figure 7X:
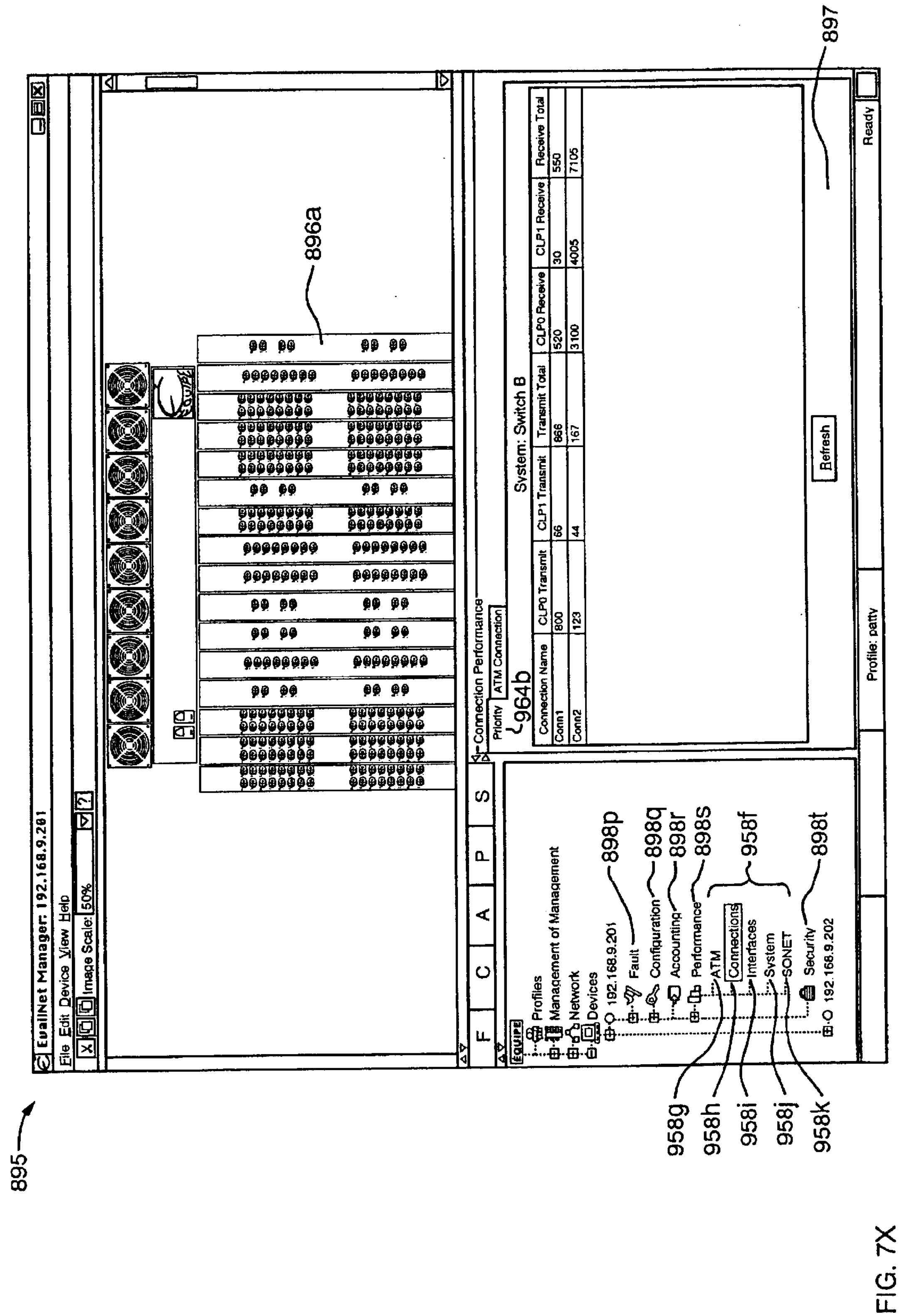

If the administrator selects Connections sub-branch 958*h* (FIG. 7*w*), various tabs are displayed containing connection related performance information, for example, ATM Connection tab 964*a* and Priority tab 964*b* (FIG. 7*x*). ATM Connection tab 964*a* may include, for example, connection name, transmit, receive cell loss ratio, cell discard total and throughput data for particular ATM connections. Priority tab 964*b* may include, for example, connection name, Cell Loss Priority (CLP) 0 transmit, CLP1 receive, transmit total, CLP0 receive, CLP1 receive and receive total data for particular ATM connections. The data in either tab may be for a particular selected ATM connection, each ATM connection in the network device or only those ATM connections corresponding to a particular port or module selected by the administrator in device mimic 896*a.*

Figure 7Y:
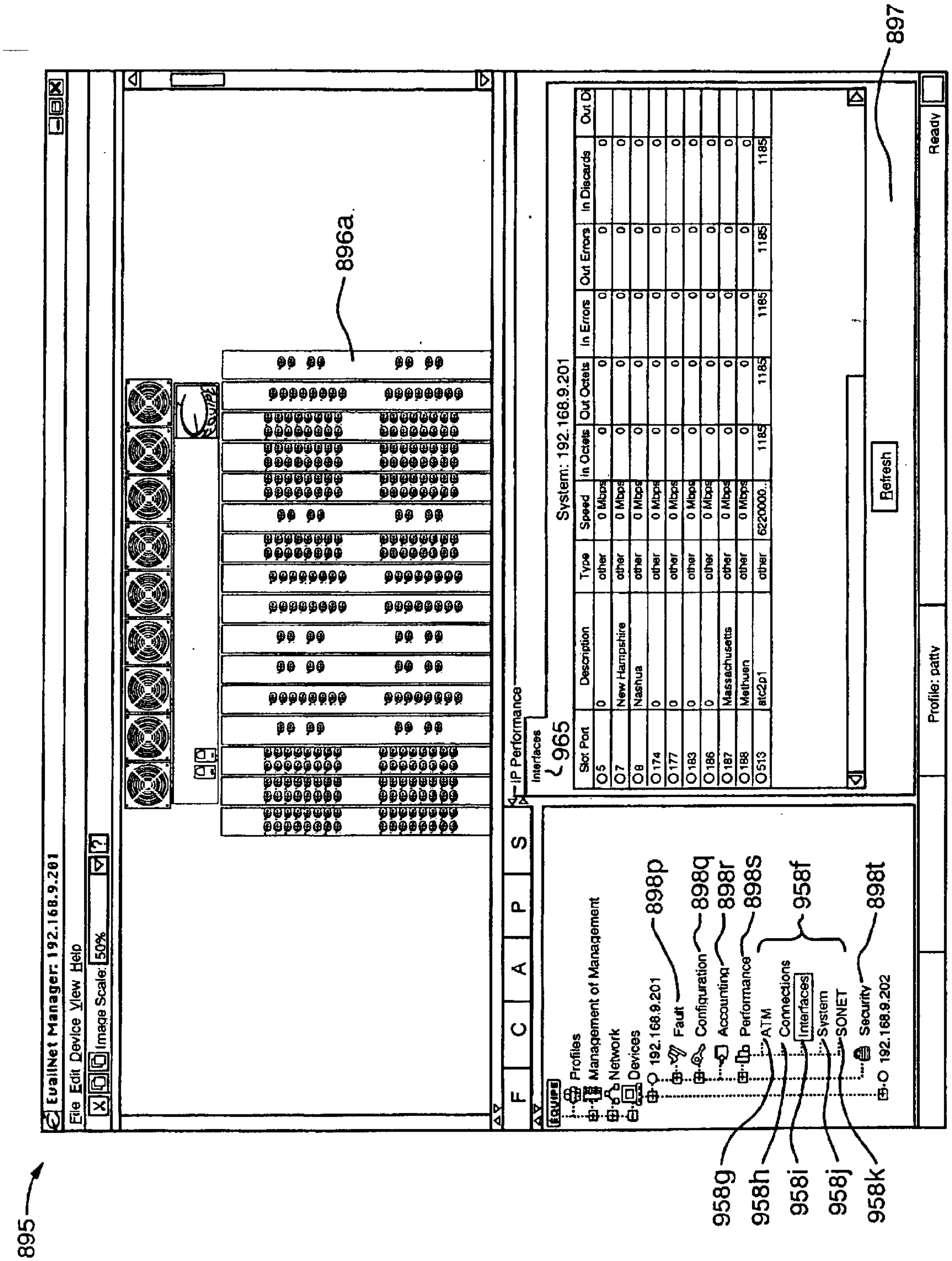

If the administrator selects Interfaces sub-branch 958*i* (FIG. 7*y*), various tabs are displayed containing interface related performance information, for example, Interfaces tab 965. Interfaces tab 965 may include, for example, slot and port location, description, type, speed, in octets, out octets, in errors, out errors, in discards and out discards data for particular ATM interfaces. The data in the tab may be for a particular selected ATM interface, each ATM interface in the network device or only those ATM interfaces corresponding to a particular port or module selected by the administrator in device mimic 896*a.*

Figure 8A:
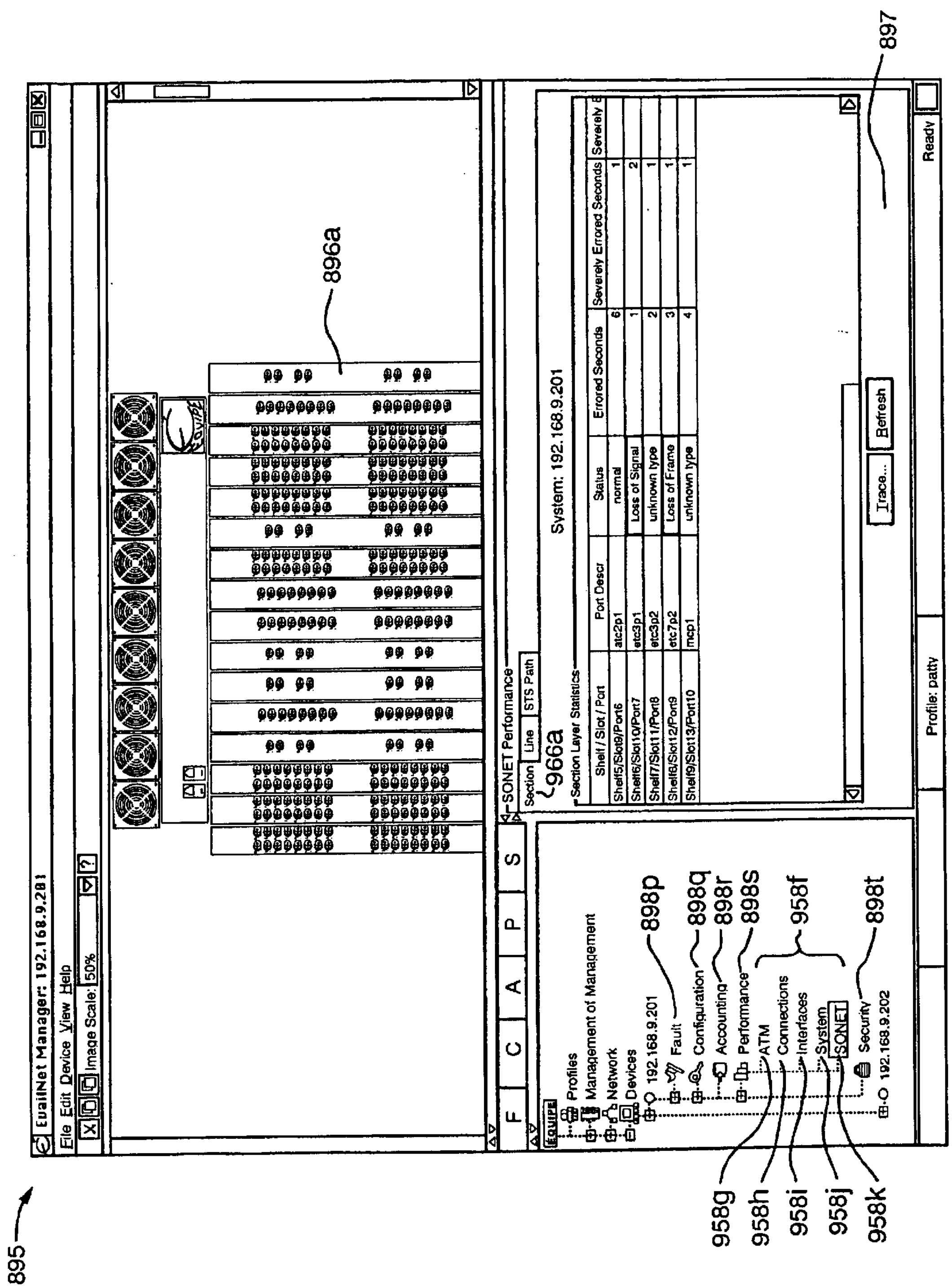
Figure 8B:
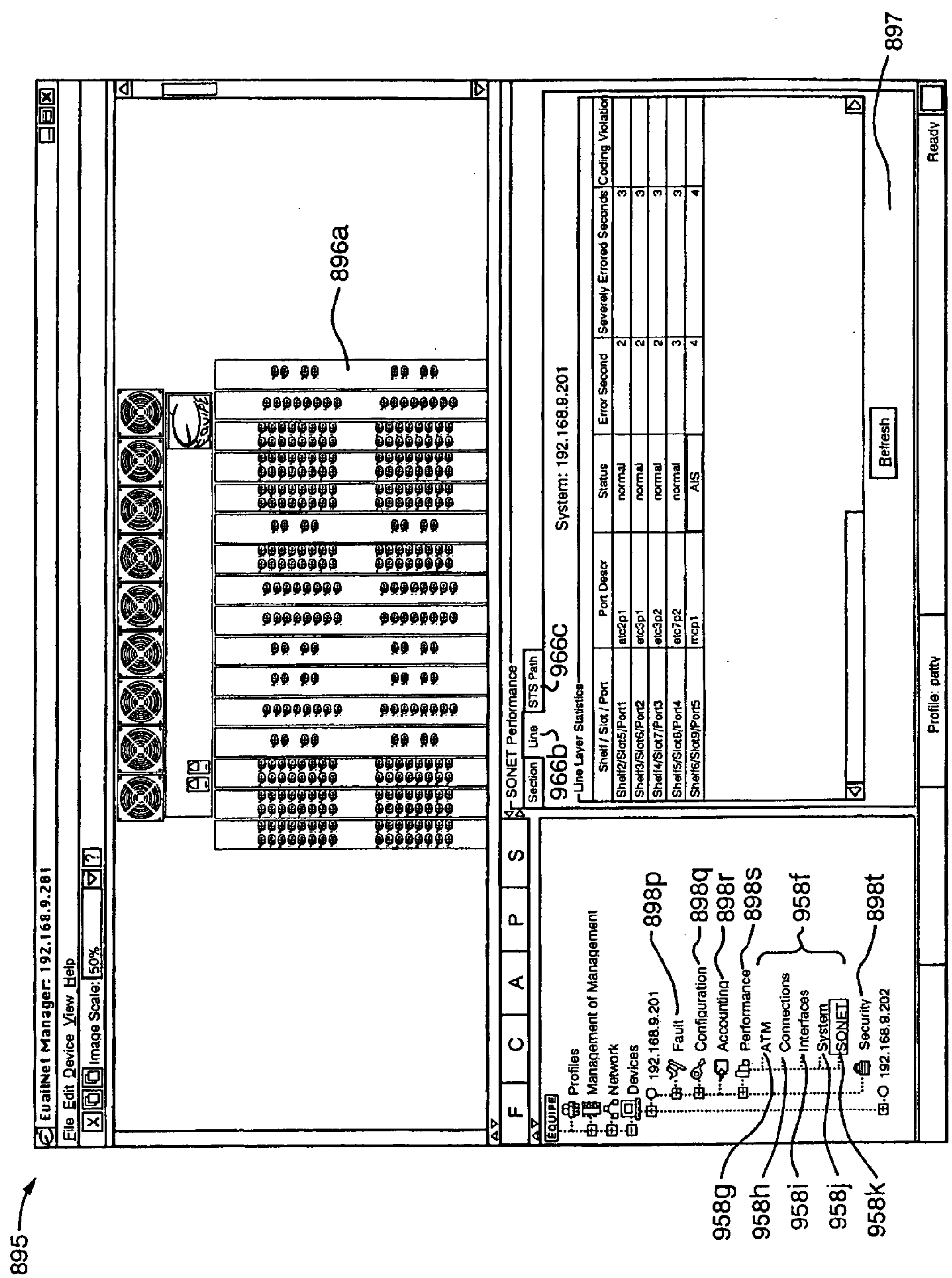
Figure 8C:
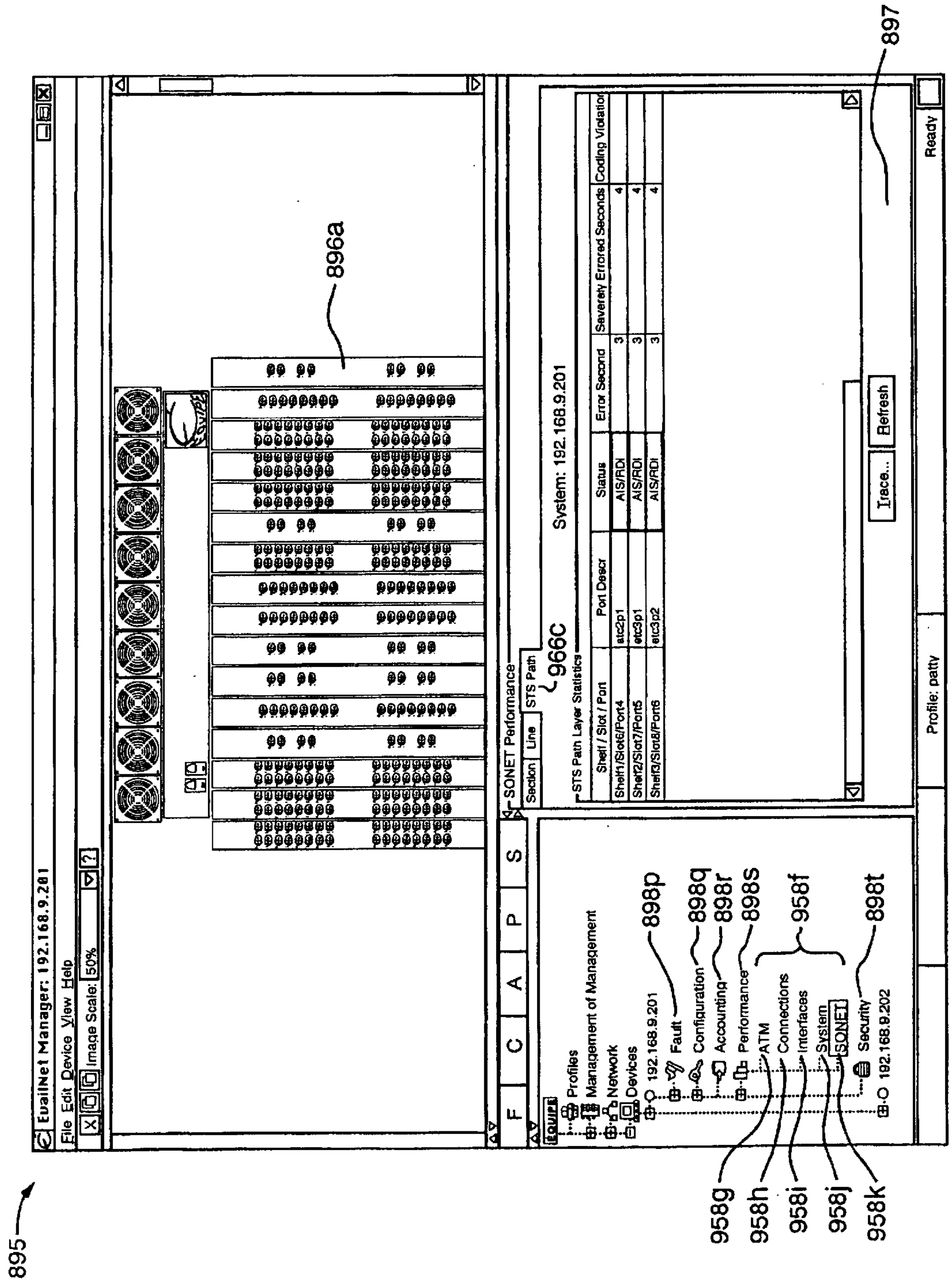

Referring to FIG. 8*a,* if the administrator selects SONET sub-branch 958*k,* various tabs are displayed containing SONET related performance information, for example, Section tab 966*a,* Line tab 966*b* (FIG. 8*b*) and Synchronous Transport Signal (STS) Path tab 966*c* (FIG. 8*c*). Each of the three tabs displays a shelf/slot/port location, port descriptor, status, errored seconds, severely errored seconds and coding violation data for each port. The data may correspond to a particular port selected by the administrator, all ports in a selected module or all ports in the entire network device. Various other physical layer network protocol sub-branches may also be displayed in list 958*f,* including a sub-branch for Ethernet, depending upon the capabilities of the selected network device.

Figure 8D:
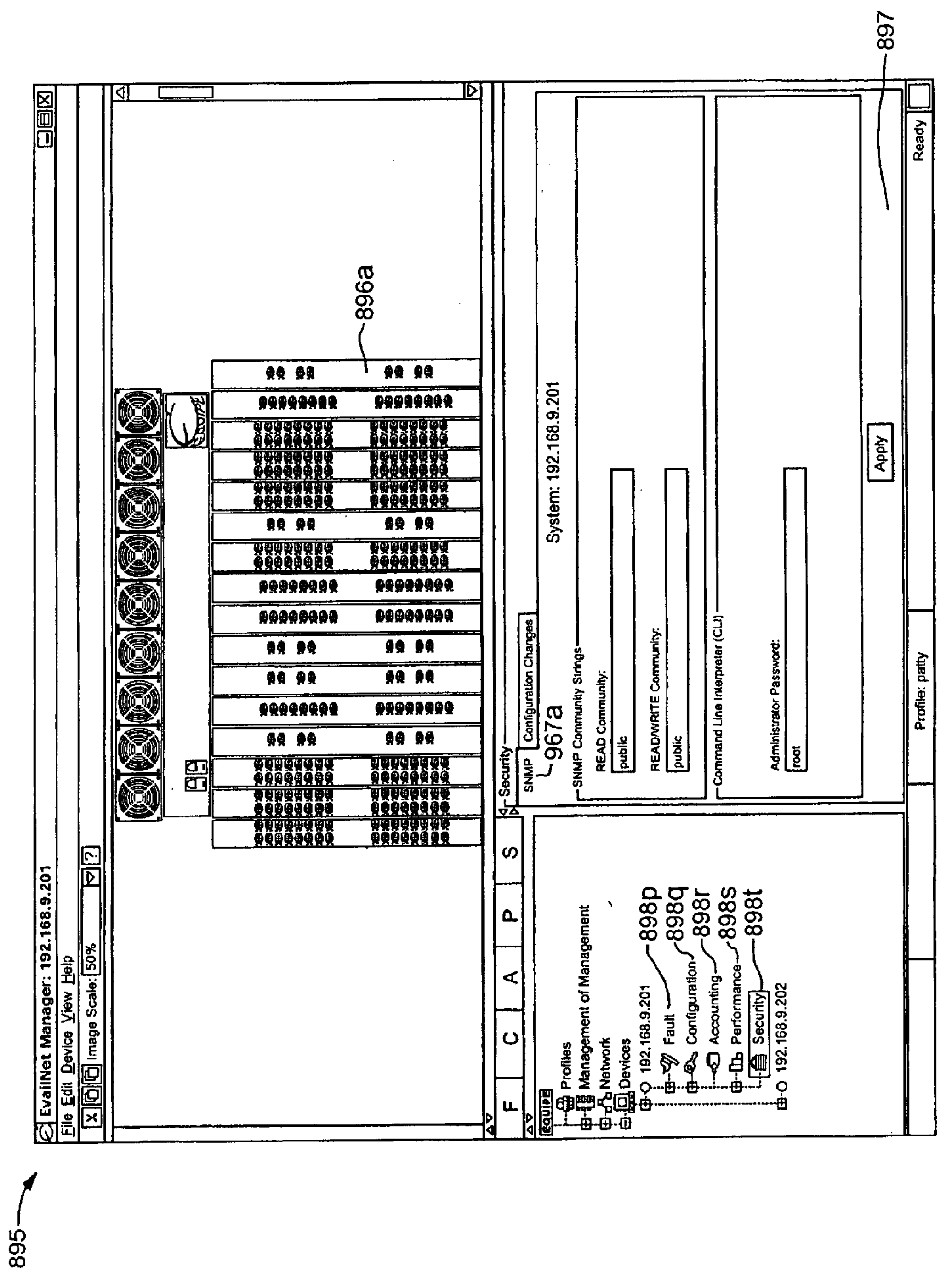
Figure 8E:
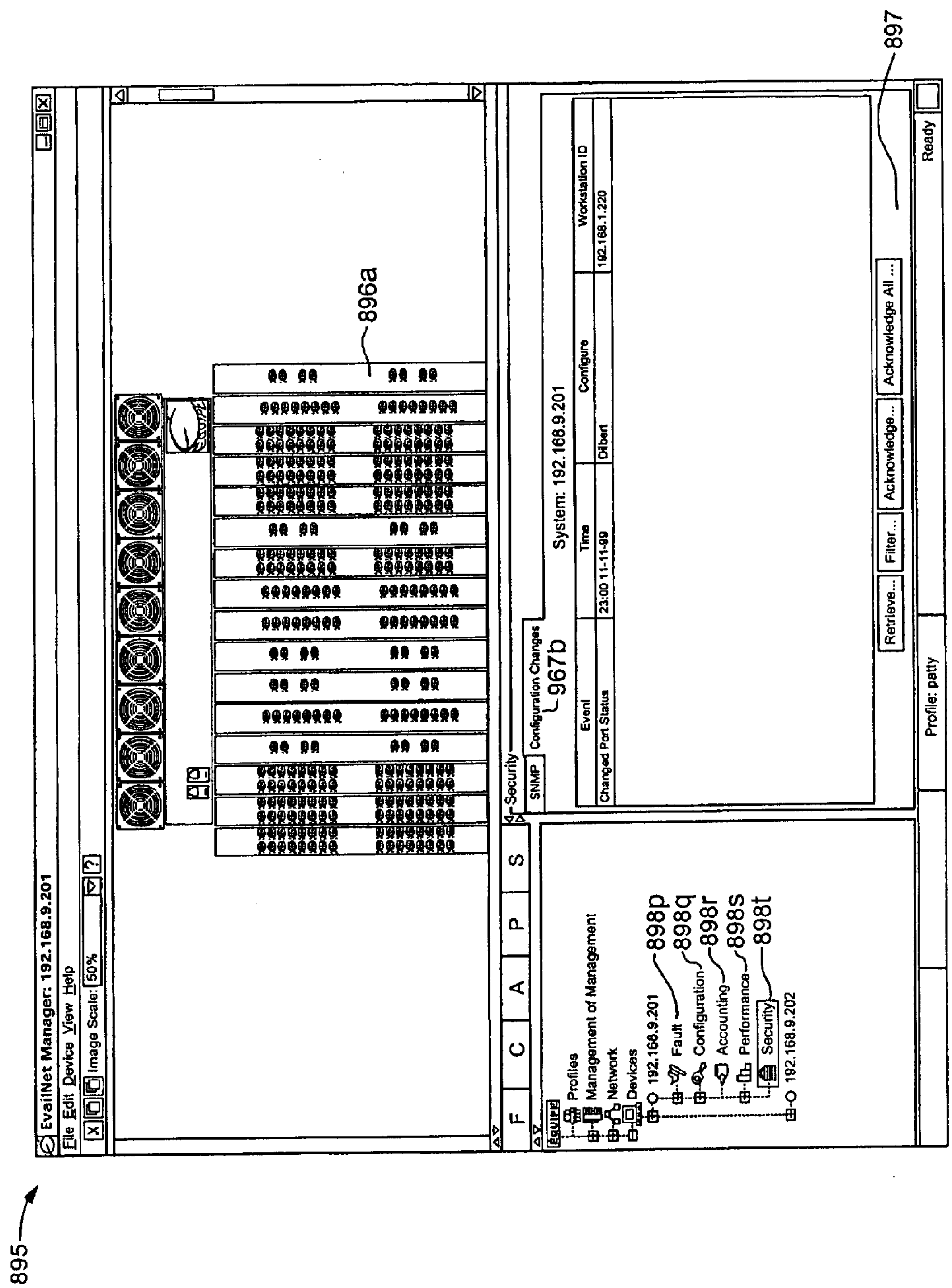

Referring to FIG. 8*d,* if the administrator selects Security branch 898*t,* various tabs are displayed containing security related information, for example, Simple Network Management Protocol (SNMP) tab 967*a* and Configuration Changes tab 967*b* (FIG. 8*e*). SNMP tab 967*a* may display, for example, read and read/write community strings and a command line interpreter (CLI) administrator password for the network device. Configuration Changes tab 967*b* may display configuration changes made to the network device including event, time, configurer and workstation identification from where the change was made. Various other security tabs may also be provided.

Dynamic Bulletin Boards

Graphical User Interface (GUTI) 895 described in detail above provides a great deal of information to a network administrator to assist the administrator in managing each network device in a telecommunications network. As shown, however, this information is contained in a large number of GUI screens/tabs. There may be many instances when a network administrator may want to simultaneously view multiple screens/tabs. To provide network managers with more control and flexibility personal application bulletin boards (PABBs, i.e., dynamic bulletin boards) are provided that allow the network administrator to customize the information they view by dragging and dropping various GUI screens/tabs (e.g., windows, table entries, dialog boxes, panels, device mimics, etc.) from GUI 895 onto one or more dynamic bulletin boards. This allows the administrator to consolidate several GUI screens and/or dialog boxes into a single view. The information in the dynamic bulletin board remains linked to the GUI such that both the GUI and the bulletin boards are dynamically updated if the screens in either the GUI or in the bulletin boards are changed. As a result, the administrator may manage and/or configure network devices through the GUI screens or the dynamic bulletin board. Within the dynamic bulletin boards, the administrator may change the format of the data and, perhaps, view the same data in multiple formats simultaneously. Moreover, the administrator may add information to one dynamic bulletin board from multiple different network devices to allow the administrator to simultaneously manage and/or configure the multiple network devices. The dynamic bulletin boards provide an alternative viewing environment, and administrators can, therefore, choose what they want to view, when they want to view it and how they want to view it.

Figure 9A:
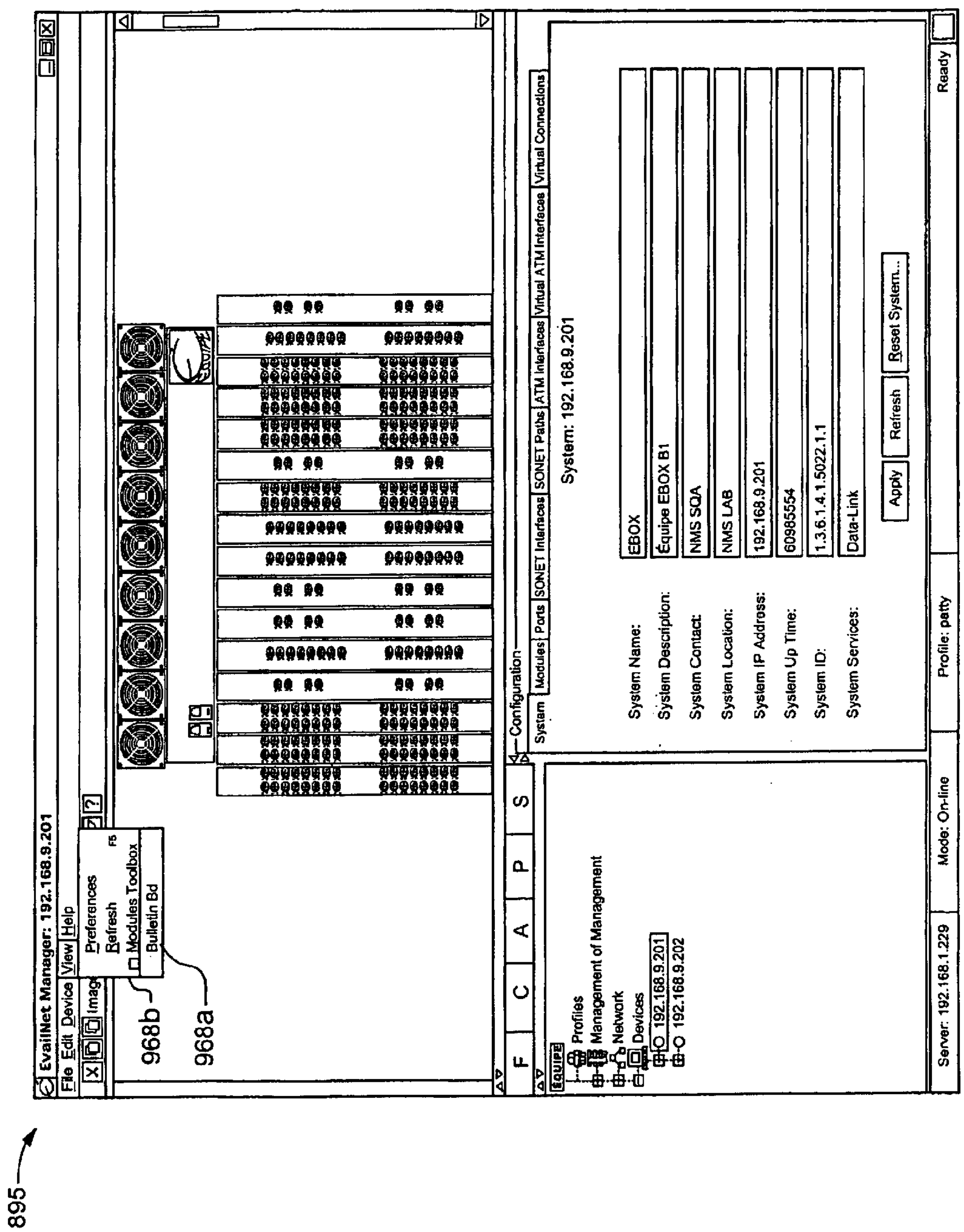

Referring to FIG. 9*a,* to open a dynamic bulletin board, a network administrator selects a Bulletin Bd option 968*a* from a view pull-down menu 968*b.* A bulletin board 970*a* (FIG. 9*b*) is then displayed for the administrator. Instead, a bulletin board may automatically be opened whenever an administrator logs into an NMS client to access GUI 895. Once the bulletin board is opened, the administrator may use a mouse to move a cursor over a desired GUI screen, press and hold down a left mouse button and drag the selected item onto the bulletin board (i.e., "drag and drop"). If an item within a GUI screen is capable of being dragged and dropped (i.e., posted) to the bulletin board—that is, the bulletin board supports/recognizes the GUI object—, a drag and drop icon appears as the administrator drags the cursor over to the bulletin board. If no icon appears, then the selected item is not supported by the bulletin board. Thus, the administrator is provided with visual feedback as to whether or not an item is supported by the PABB.

Figure 9B:
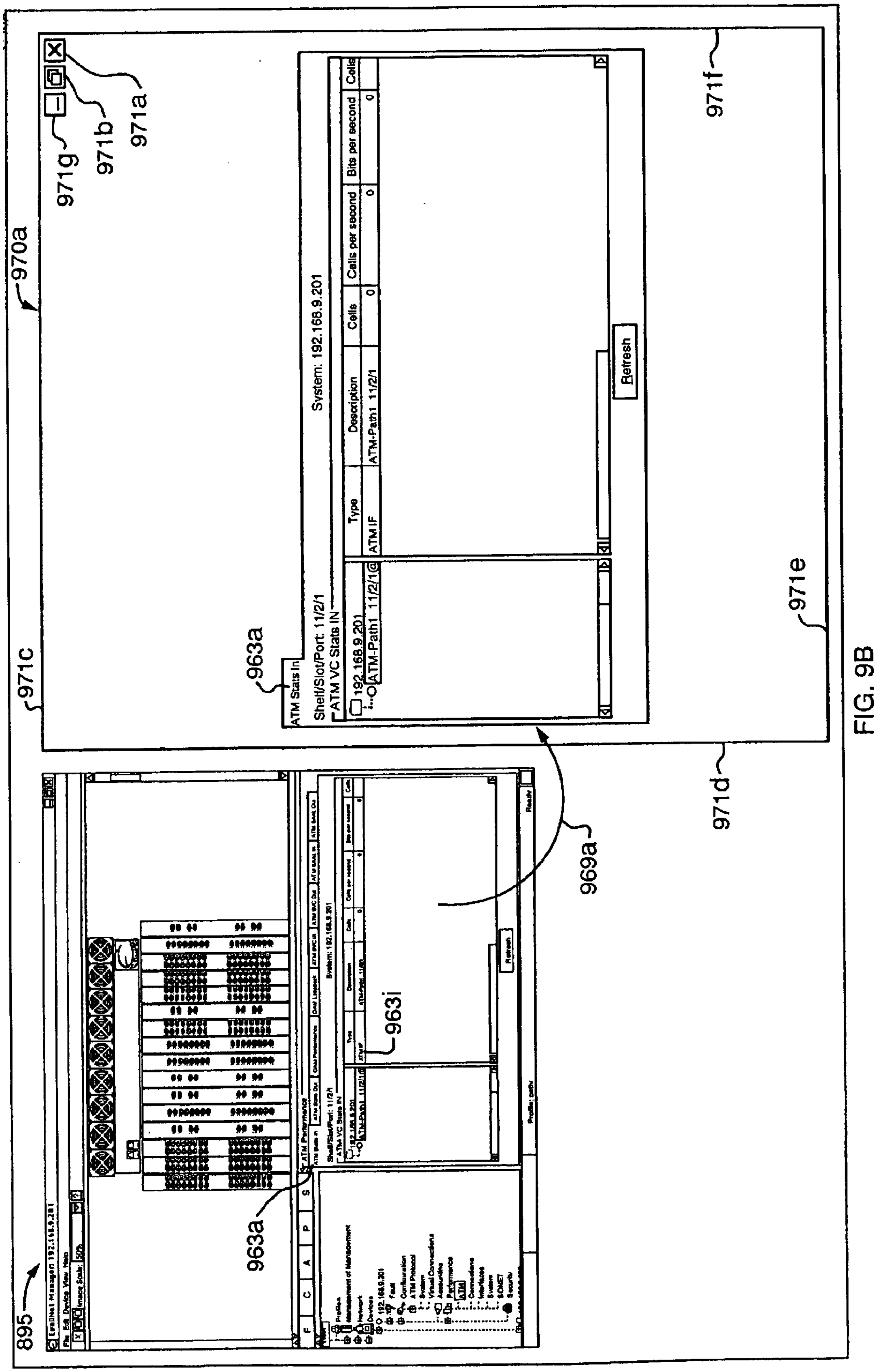

Referring to FIG. 9*b,* as one example, an administrator may select ATM Stats In tab 963*a* corresponding to a particular network device (e.g., system 192.168.9.201) and drag and drop (indicated by arrow 969*a*) that tab onto bulletin board 970*a.* Since this is the first item dropped into the bulletin board, the ATM Stats In tab is sized and positioned to use the entire space (or a large portion of the space) dedicated to the bulletin board. Instead of selecting the entire ATM Stats In tab, the administrator may drag and drop only one or only a few entries from the tab, for example, entry 963*i,* and only those entries would then be displayed in the bulletin board. An item in bulletin board 970*a* may be removed by clicking on delete button 971*a.* The size of the bulletin board may be increased or decreased by clicking on expand button 971*b* or by selecting, dragging and dropping a bulletin board boarder (e.g., 971*c*–971*f*), and the bulletin board may be minimized by clicking on minimize button 971*g.*

Figure 9C:
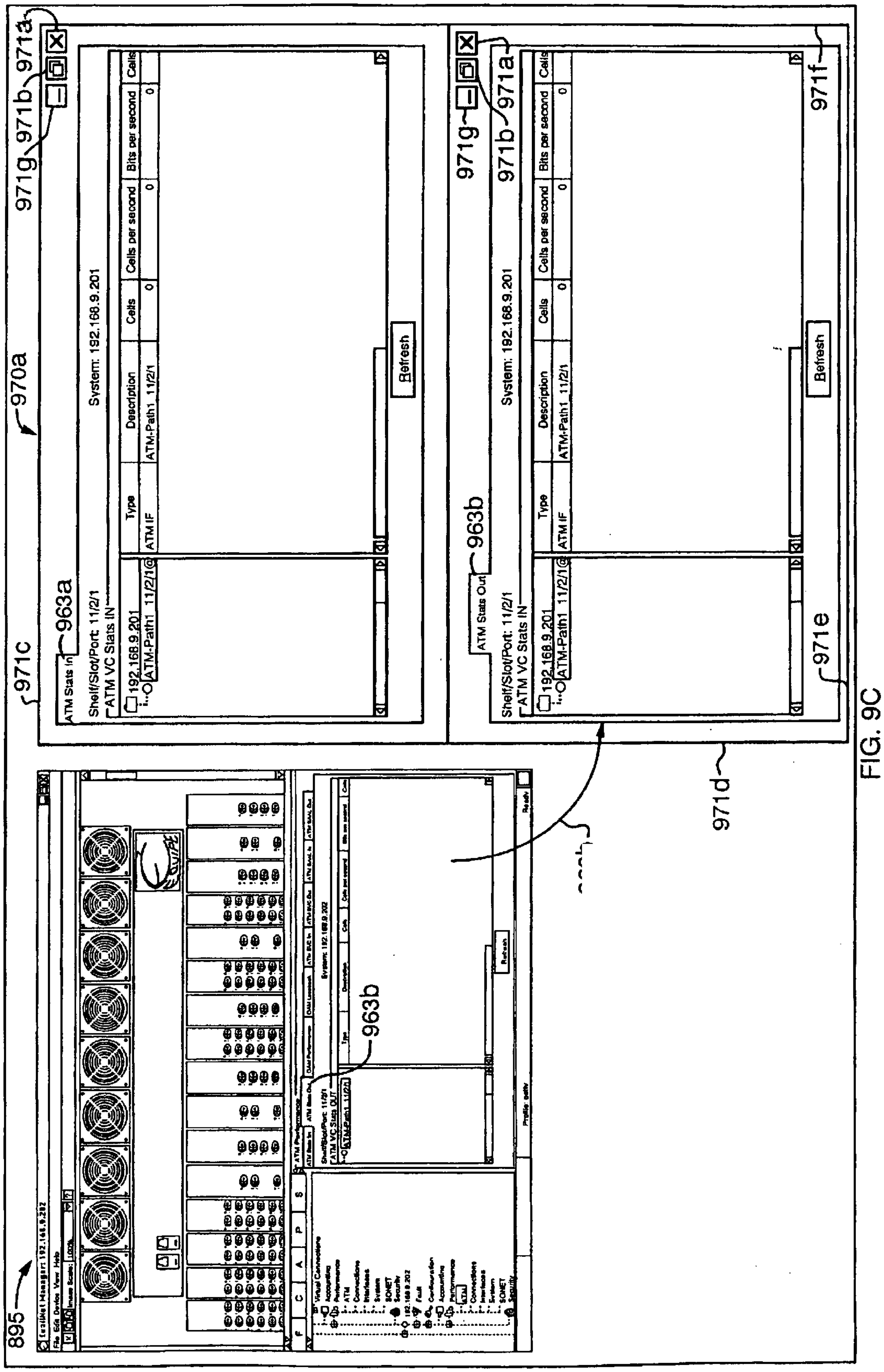

The administrator may then select other GUI data to drag and drop onto bulletin board 970*a.* Referring to FIG. 9*c,* for example, the administrator may select ATM Stats Out tab 963*b* also corresponding to the same network device and drag and drop (indicated by arrow 969*b*) that tab onto bulletin board 970*a.* The bulletin board automatically splits the screen to include both the ATM Stats In tab 963*a* and the ATM Stats Out tab 963*b.* Now the administrator may view both of these screens simultaneously, and since the bulletin board and the screens it displays are linked to GUI 895, the ATM Stats In and Out tabs are automatically updated with information as the GUI itself is updated with information. Thus, if the administrator changes any data in the items dragged to the bulletin board, the GUI is automatically updated and if any data in the GUI is changed, then any corresponding screens in the bulletin board are also updated. Again, instead of selecting the entire tab, the administrator may select one or more entries in a tab and drag and drop those entries onto the bulletin board. Also, the administrator may delete any bulletin board entry by clicking on the corresponding delete button 971*a*, and change the size of any bulletin board entry using expand button 971*b* or minimize button 971*g.*

Figure 9D:
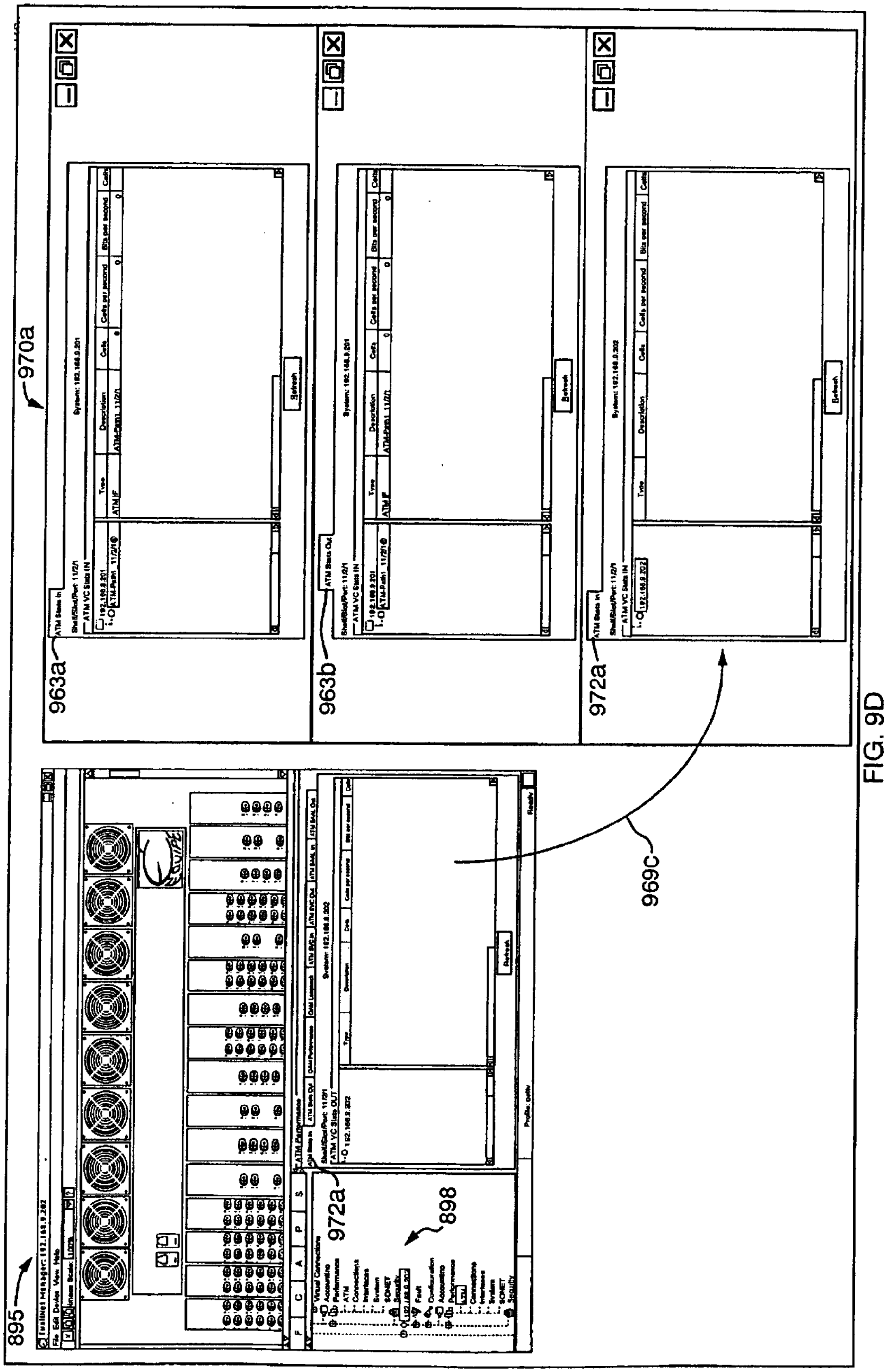
Figure 9E:
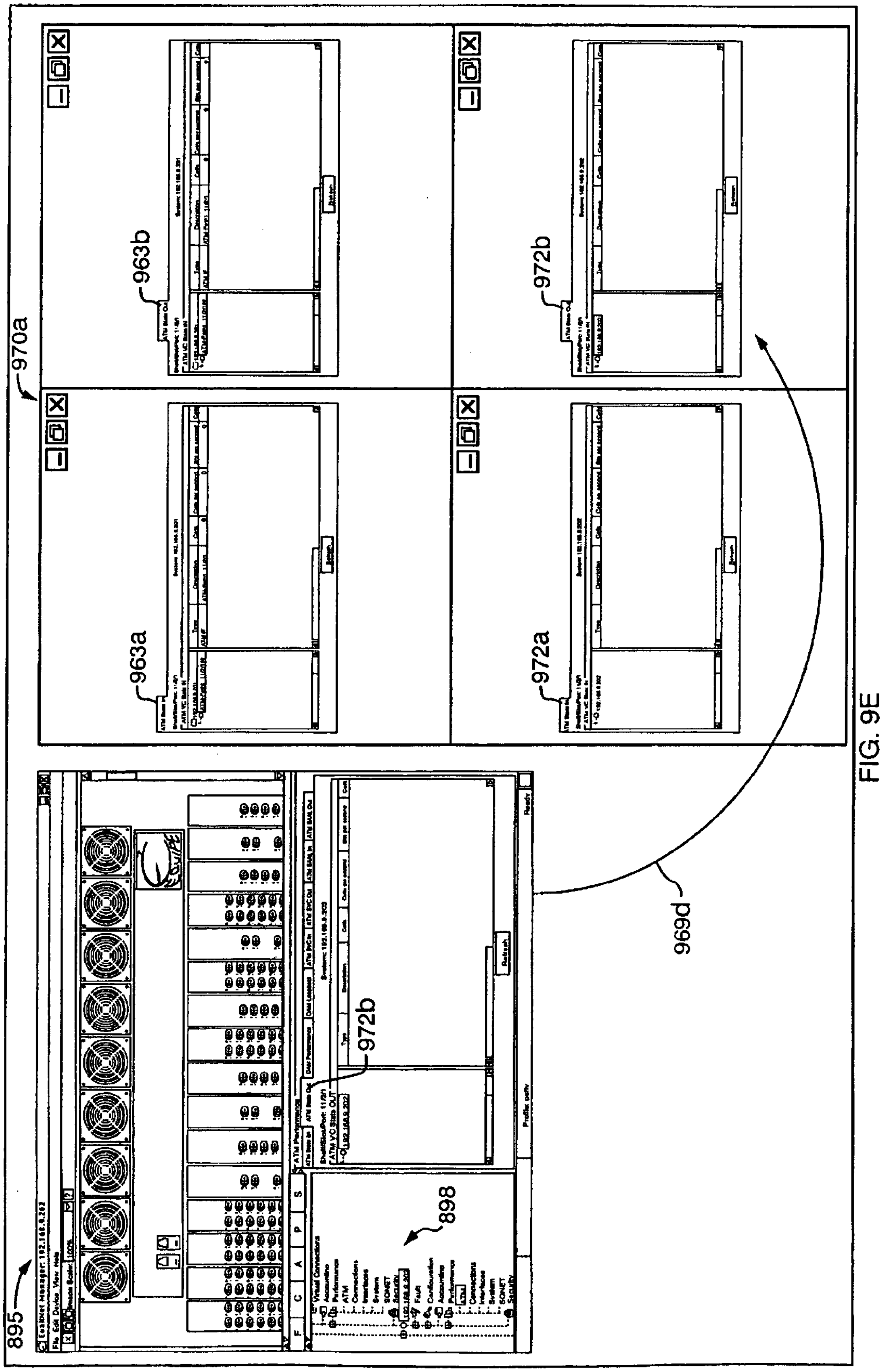

The administrator may then select other GUI data from the same network device (e.g., system 192.168.9.201) to drag and drop to the bulletin board or the administrator may select a different network device (e.g., system 192.168.9.202, FIG. 9*d*) in navigation tree 898 and drag and drop various GUI screens corresponding to that network device to bulletin board 970*a.* For example, the administrator may select ATM Stats In tab 972*a* and drag and drop (indicated by arrow 969*c*) that tab to bulletin board 970*a,* and the administrator may then select ATM Stats Out tab 972*b* (FIG. 9*e*) corresponding to system 192.168.9.202 and drag and drop (indicated by arrow 969*d*) that tab onto bulletin board 970*a.* Consequently, the administrator is able to simultaneously view multiple screens corresponding to different network devices. The administrator may also choose to drag and drop related screens. For example, ATM Stats In and Out tabs 963*a,* 972*a* and 963*b,* 972*b,* respectively, may represent two ends of an ATM connection between the two network devices, and viewing these screens simultaneously may assist the administrator in managing both network devices.

Figure 9F:
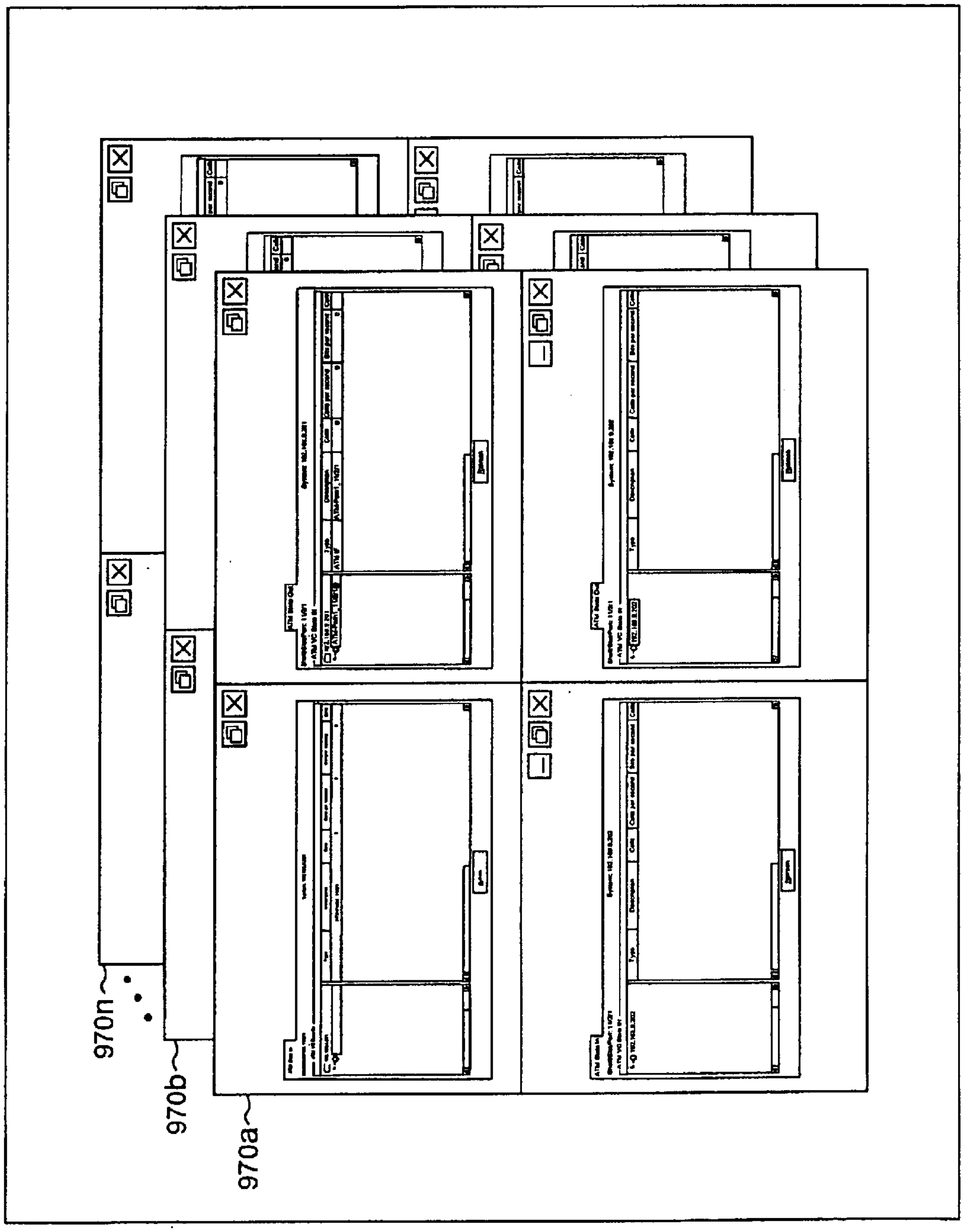

As shown in FIGS. 9*b*–9*e,* when new items are dropped onto the bulletin board, the bulletin board continues to divide the available space to fit the new items and may shrink the items to fit in the available space. Many more items may be added to a bulletin board, for example eight to ten items. However, instead of continuing to add items to the same bulletin board, the administrator may choose to open multiple bulletin boards (e.g., 970*a*–970*n,* FIG. 9*f*).

Figure 9G:
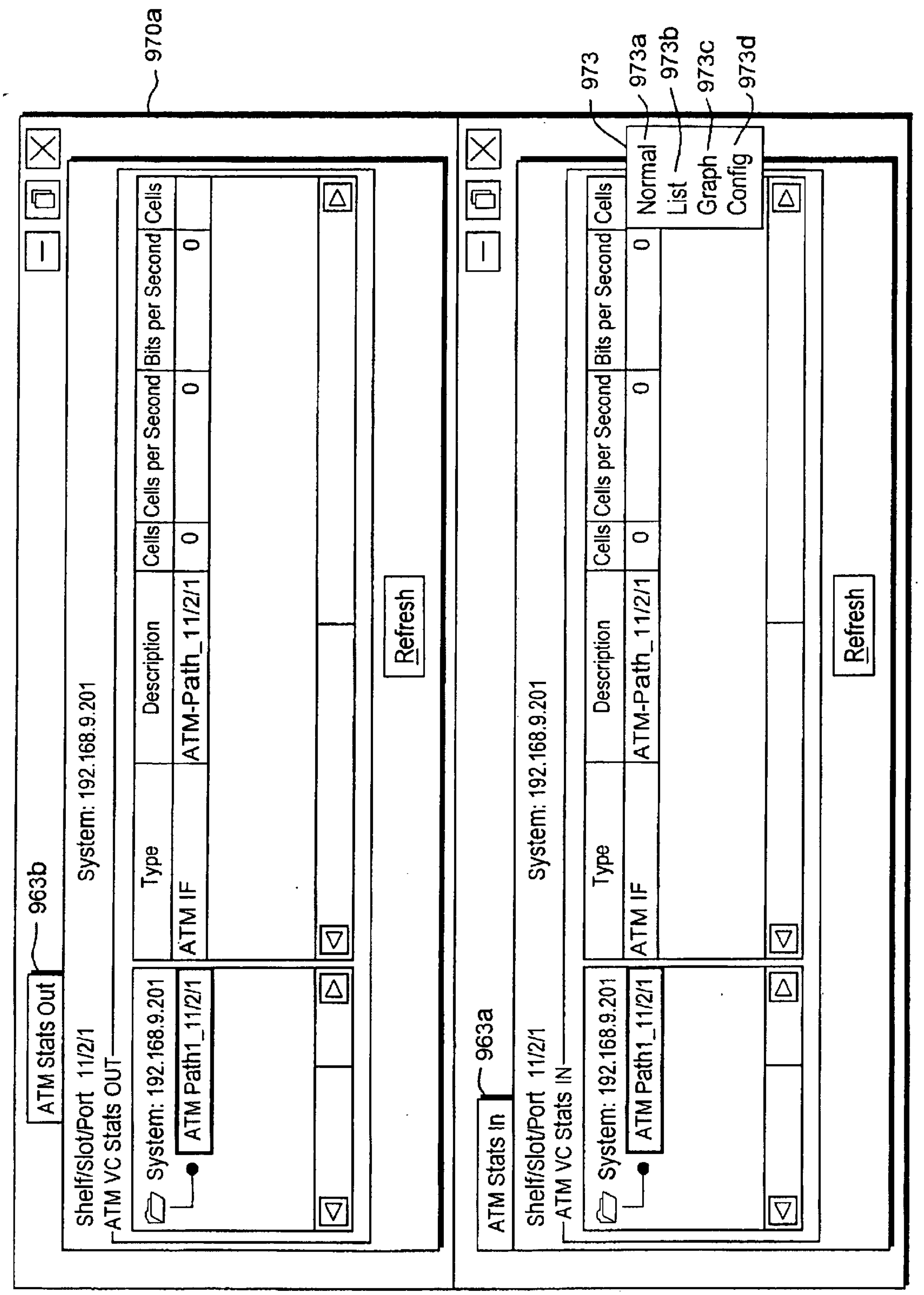
Figure 9H:
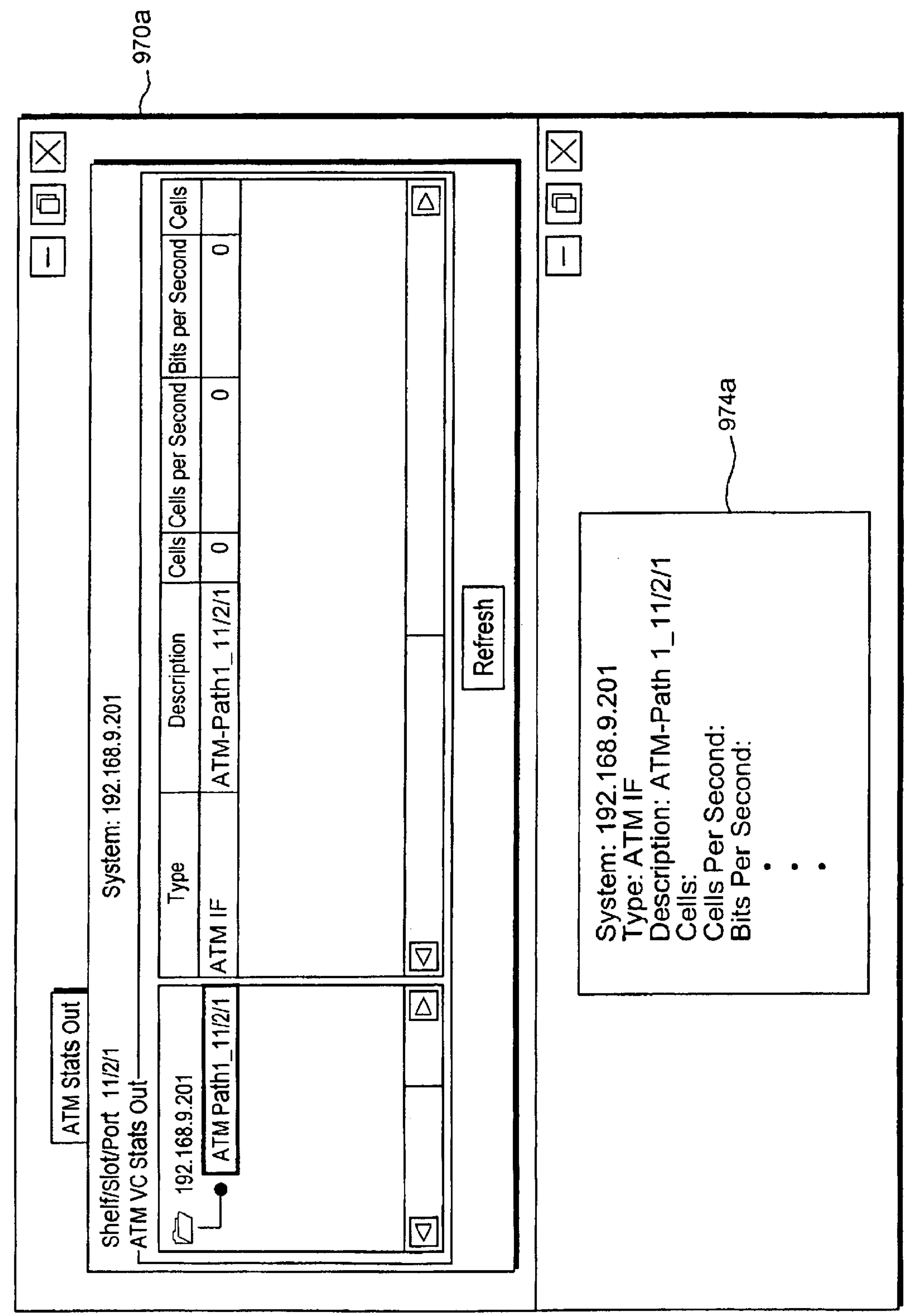
Figure 9I:
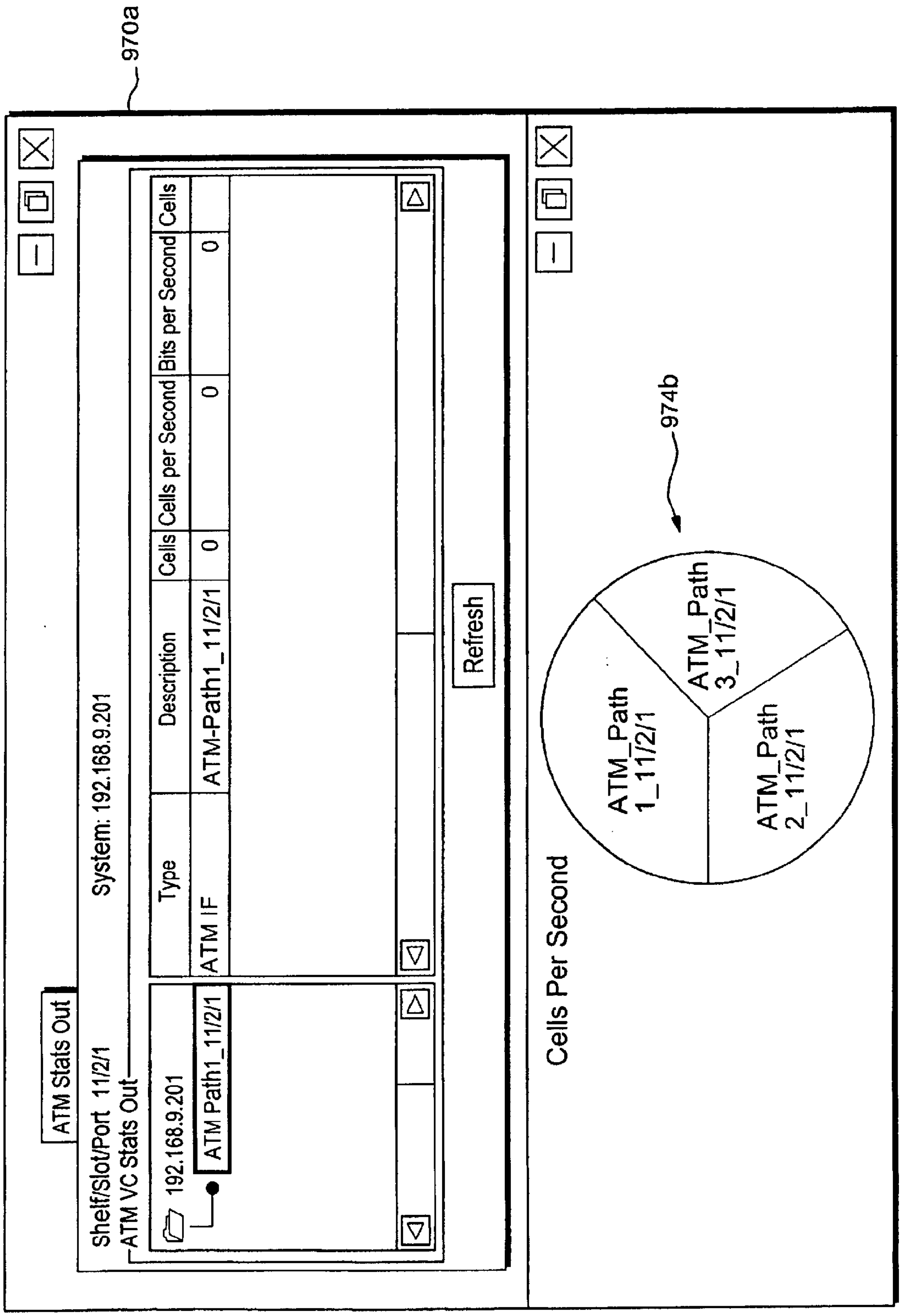
Figure 9J:
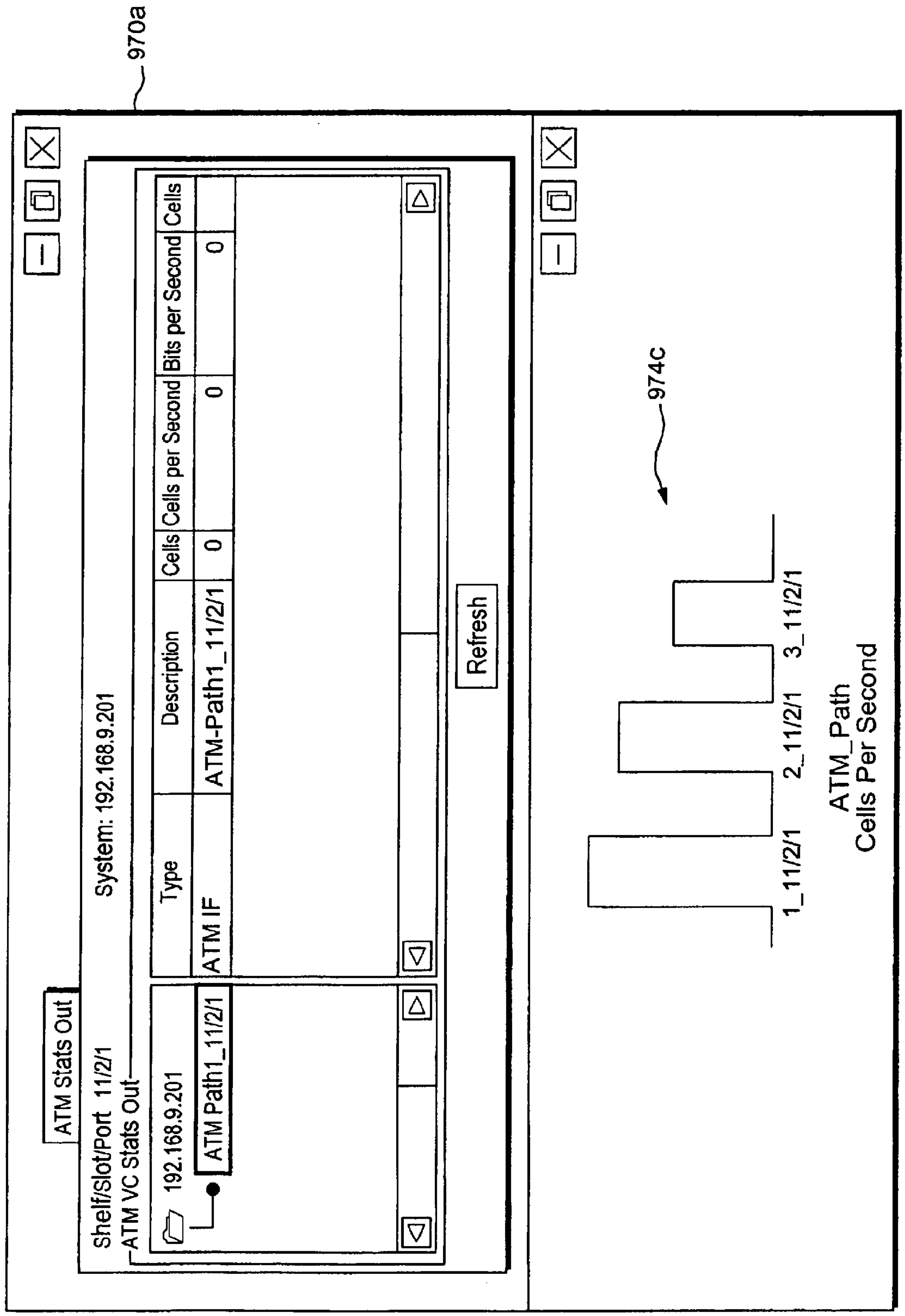
Figure 9K:
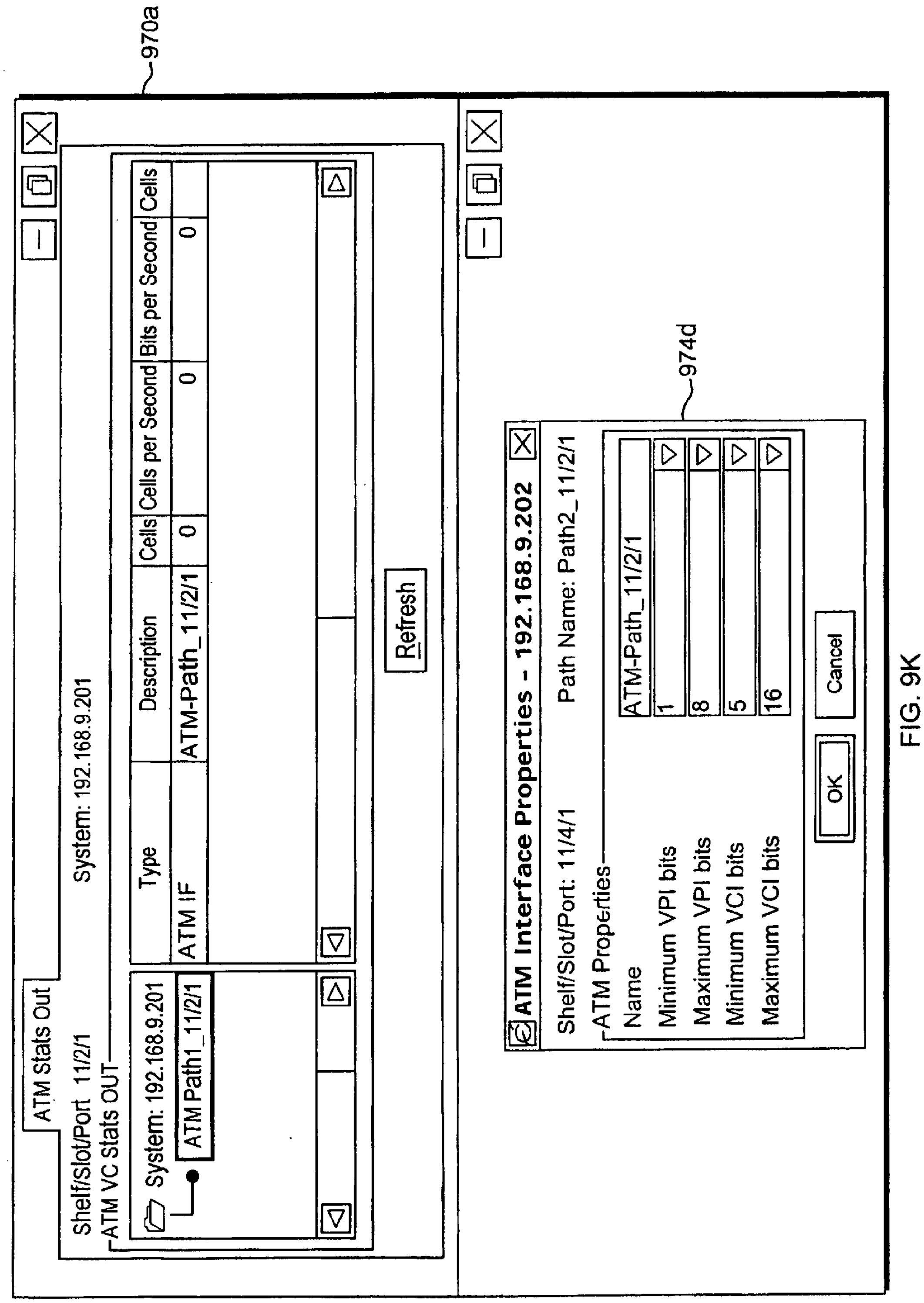

An administrator may wish to view an item dragged to a bulletin board in a different format than that displayed in the GUI. The different format may, for example, have more meaning to them or provide more clarity to the task at hand. For instance, after dragging and dropping ATM Stats In tab 963*a* to bulletin board 970*a* (FIG. 9*g*), the administrator may then move the cursor over the ATM Stats In tab and double click the right mouse button to cause a pull-down menu 973 displaying various format options to appear. A normal format option 973*a* may cause the item to appear as it did in the GUI—that is, ATM Stats In tab 963*a* will appear as shown in FIG. 9*g.* A list format option 973*b* may cause the data in ATM Stats In tab 963*a* to be displayed as an ordered list 974*a* as shown in FIG. 9*h.* A graph option 973*c* may cause the data in ATM Stats In tab 963*a* to be displayed as a pie chart 974*b* (FIG. 9*i*), a bar graph 974*c* (FIG. 9*j*) or any other type of graph or graphical representation. A config option 973*d* may cause the data in the ATM Stats In tab 963*a* to be displayed as a dialog box 974*d* (FIG. 9*k*) displaying configuration data corresponding to a selected one of the ATM paths within the ATM Stats In tab. The data in a bulletin board entry may be displayed in a variety of different ways to make the administrator's tasks simpler and more efficient.

Figure 9L:
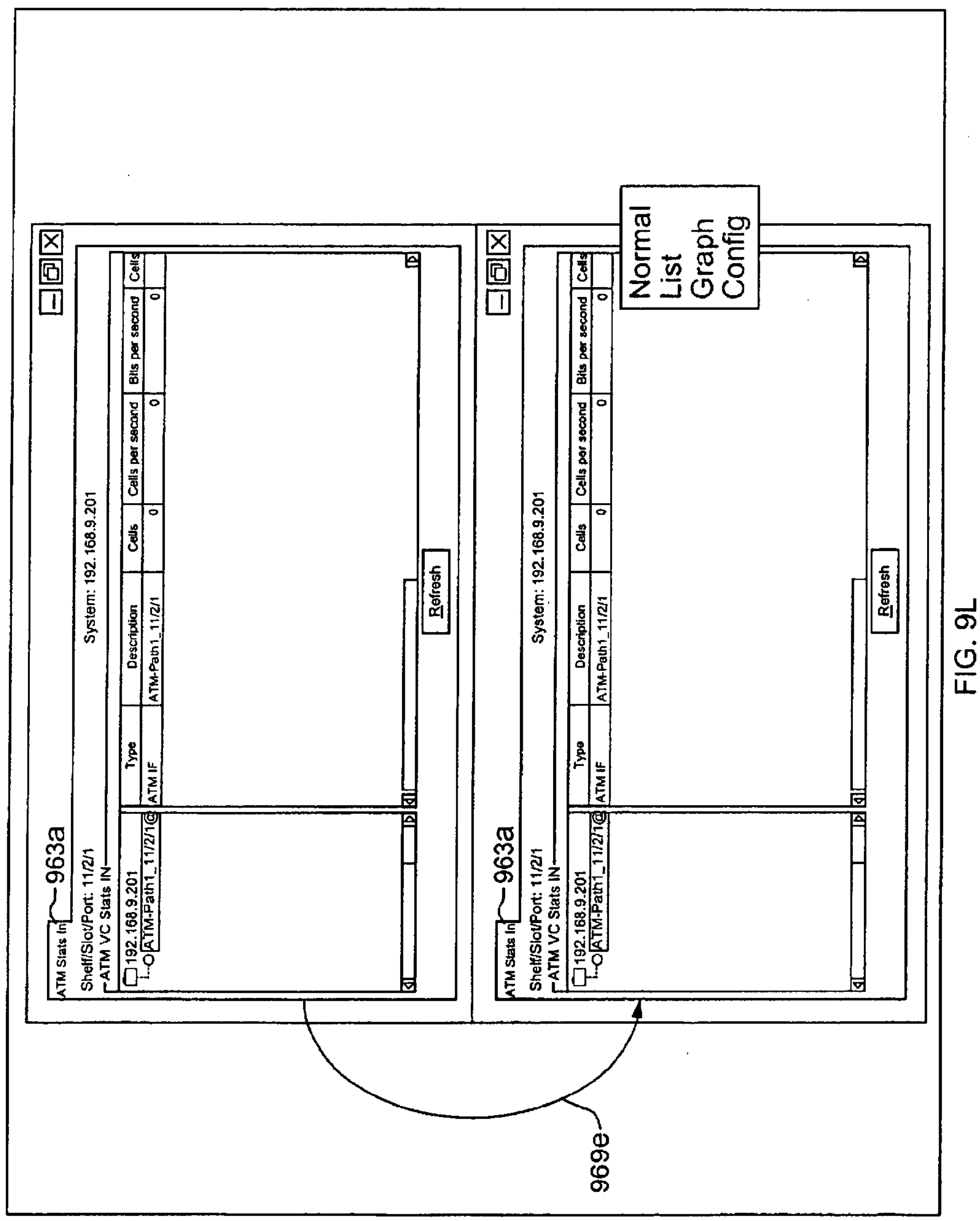

Referring to FIG. 9*l,* an administrator may wish to view an item dragged to a bulletin board in multiple different formats simultaneously. For example, the administrator may move the cursor over ATM Stats In tab 963*a* in the bulletin board, press down and hold the left mouse button and drag the cursor (indicated by arrow 969*e*) over a blank area of the bulletin board (i.e., drag and drop) to add a second copy of ATM Stats In tab 963*a* to the bulletin board. The administrator may then move the cursor over the copied ATM Stats In tab, double click the right mouse button to cause pull-down menu 973 to appear and select a different format in which to display the copied ATM Stats In tab. As a result, the administrator is able to simultaneously view the normal format while also viewing another format, for example, a pie chart.

Although the above examples used the ATM Stats In and Out tabs, it is to be understood that any of the tabs or entries within tabs in status window 897 may be capable of being dragged and dropped into one or more dynamic bulletin boards. In addition, an administrator may drag and drop one or more of the FCAPS buttons 899*a*–899*e* (FIG. 7*a*) to a bulletin board.

Figure 9M:
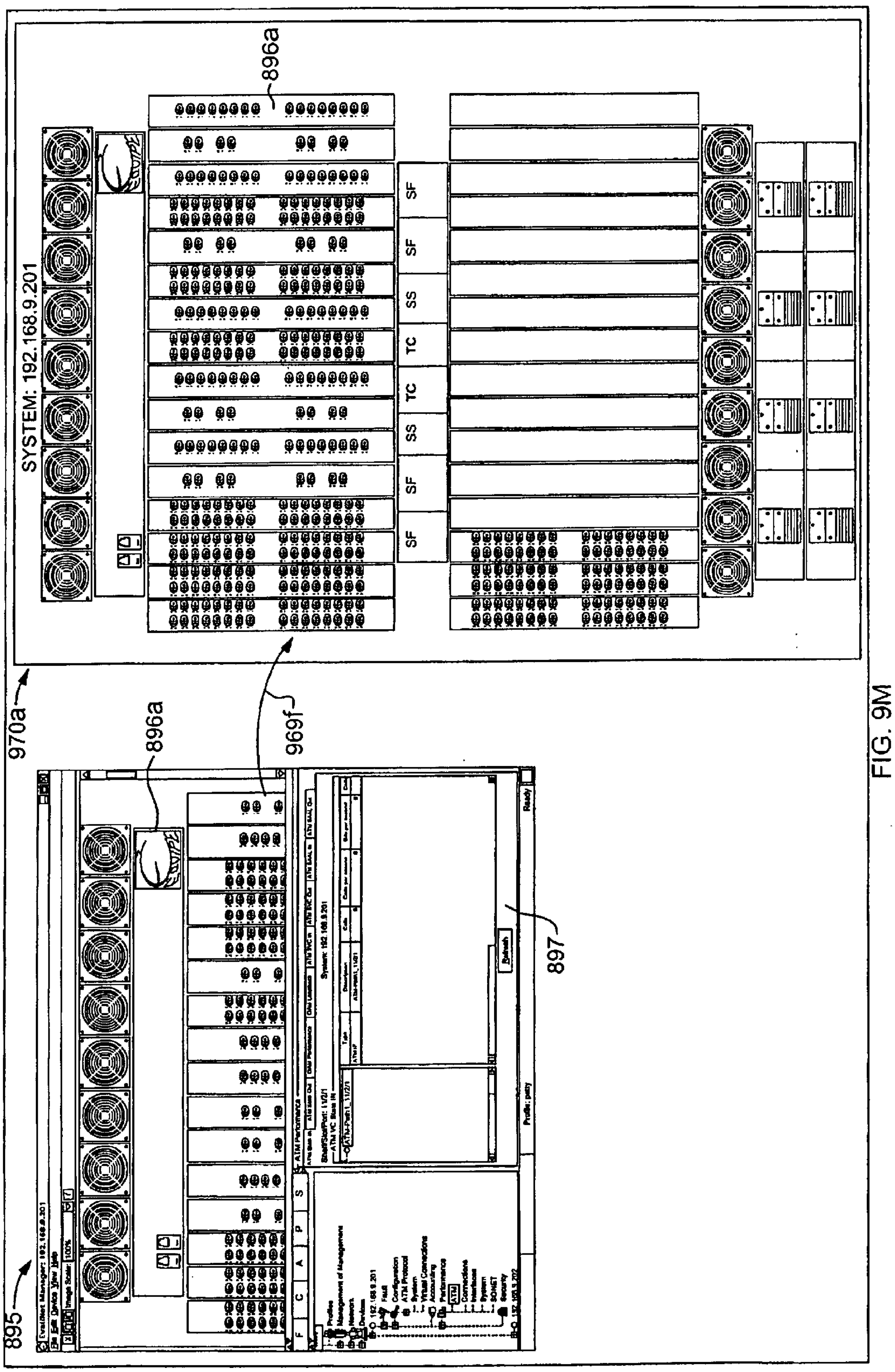

Referring to FIG. 9*m,* in addition to dragging and dropping items from status window 897 or the FCAPS buttons, an administrator may drag and drop (indicated by arrow 969*f*) device mimic 896*a* onto bulletin board 970*a.* In this example, the administrator has dragged and dropped the device mimic corresponding to network device 192.168.9.201. As previously mentioned, the device mimic may display ports and modules in different colors to indicate status for those components, for example, green for normal operation, yellow for warning status and red for failure status. The administrator may then monitor the device mimic in the bulletin board while continuing to use GUI 895 for other configuration and management operations. Instead, the administrator may only select, drag and drop portions of the device mimic, for example, only one or more universal port cards or one or more forwarding cards.

Figure 9N:
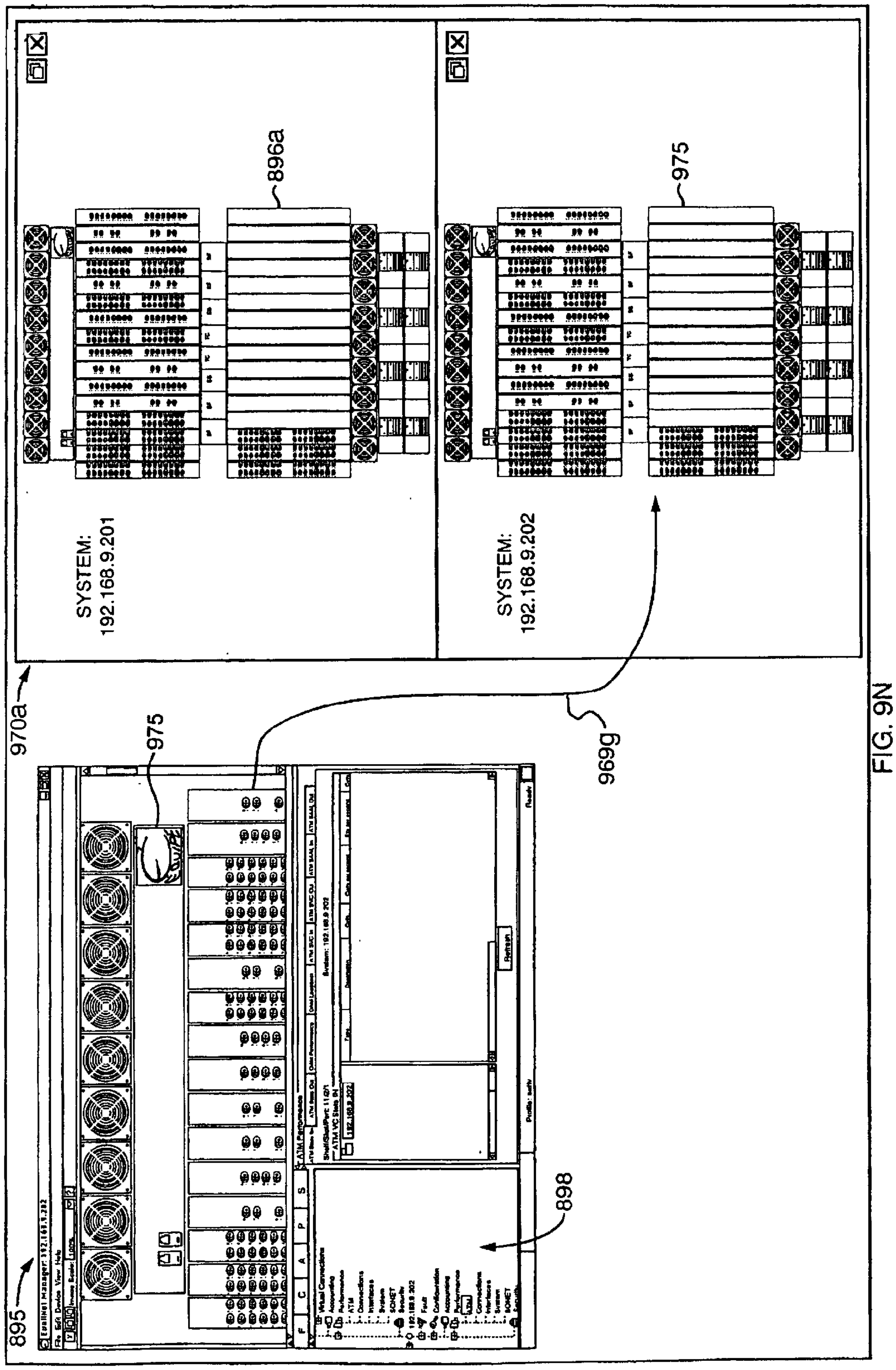

Referring to FIG. 9*n,* the administrator may also select a different network device in navigation tree 898 and then drag and drop (indicated by arrow 969*g*) a device mimic 975 corresponding to that device onto bulletin board 970*a*. As a result, the administrator may simultaneously view the device mimics of both network devices (or more than two network devices). In addition, the administrator may drag and drop both a front and a back view of a device mimic such that all of a network device's modules may be visible. Instead, the administrator may drag and drop a front and back view 955*a*, 955*b* (FIG. 4*n*) from a separate pull away window 955.

A network administrator may save one or more dynamic bulletin boards before exiting out of the NMS client, and the NMS client may persist this data in the administrator's profile (described below). When the administrator logs in to the same or a different NMS client and selects Bulletin Bd option 968*a* (FIG. 9*a*), their profile may automatically open up any saved dynamic bulletin boards or present the administrator with a list of saved dynamic bulletin boards that the administrator may select to have opened. When saved dynamic bulletin boards are re-opened, the NMS client updates any items posted in those bulletin boards such that the posted items are synchronized with the GUI. Instead, the NMS client may automatically open any saved dynamic bulletin boards as soon as the administrator logs on—that is, without requiring the administrator to select Bulletin Bd option 968.

Through saved bulletin boards, a senior administrator may guide and instruct junior administrators through various tasks. For example, a senior administrator may drag and drop a sequence of GUI screens onto one or more bulletin boards where the sequence of GUI screens represent a series of steps that the senior administrator wants the junior administrator to take to complete a particular task (e.g., provisioning a SONET path). In addition to providing the series of steps, the senior administrator may fill in various parameters (e.g., traffic descriptors) to indicate to junior administrators the default parameters the senior administrator wants them to use. The saved bulletin board may then be added to the junior administrator's profile or put in a master profile accessible by multiple users. The junior administrator may then use a saved bulletin board to interactively complete provisioning tasks similar to the task shown in the saved bulletin board. For example, the junior administrator may use the saved SONET path bulletin board to provision one or more different SONET paths. In effect, then saved bulletin boards behave as custom wizards.

As described above, the dynamic bulletin boards allow a network administrator to actively monitor—simultaneously—specific information about one or more operational network devices. This provides a powerful customization tool for the administrator of large, complex network devices in large, complex telecommunications networks. By customizing views of one or more devices, the administrator may view only the data they need to see and in a format that best meets their needs.

Custom Object Collections

As described above with respect to FCAPS management, a network device (e.g., 10, FIG. 1 and 540, FIG. 35) may include a large number (e.g., millions) of configurable/manageable objects such as modules, ports, paths, connections, etc. To provide flexibility and scalability, the network management system (NMS) allows users to create custom object collections. Thus, even though a network device or multiple network devices in a telecommunication network may include millions of objects, a network manager may create a collection and add only objects of interest to that collection. The objects may be of a similar or different type and may correspond to the same or different network devices. The network manager may also add and remove objects from existing collections, create additional new collections and remove existing collections. The network manager may then view the various objects in each collection. In addition, the collections are linked to the NMS graphical user interface (GUI), such that changes to objects in either are updated in the other. Custom object collections provide scalability and flexibility. In addition, custom object collections may be tied to user profiles to limit access. For example, a customer may be limited to viewing only the collections of objects related to their account. Similarly, a network manager may be limited to viewing only those collections of objects for which they have authority.

Figure 10A:
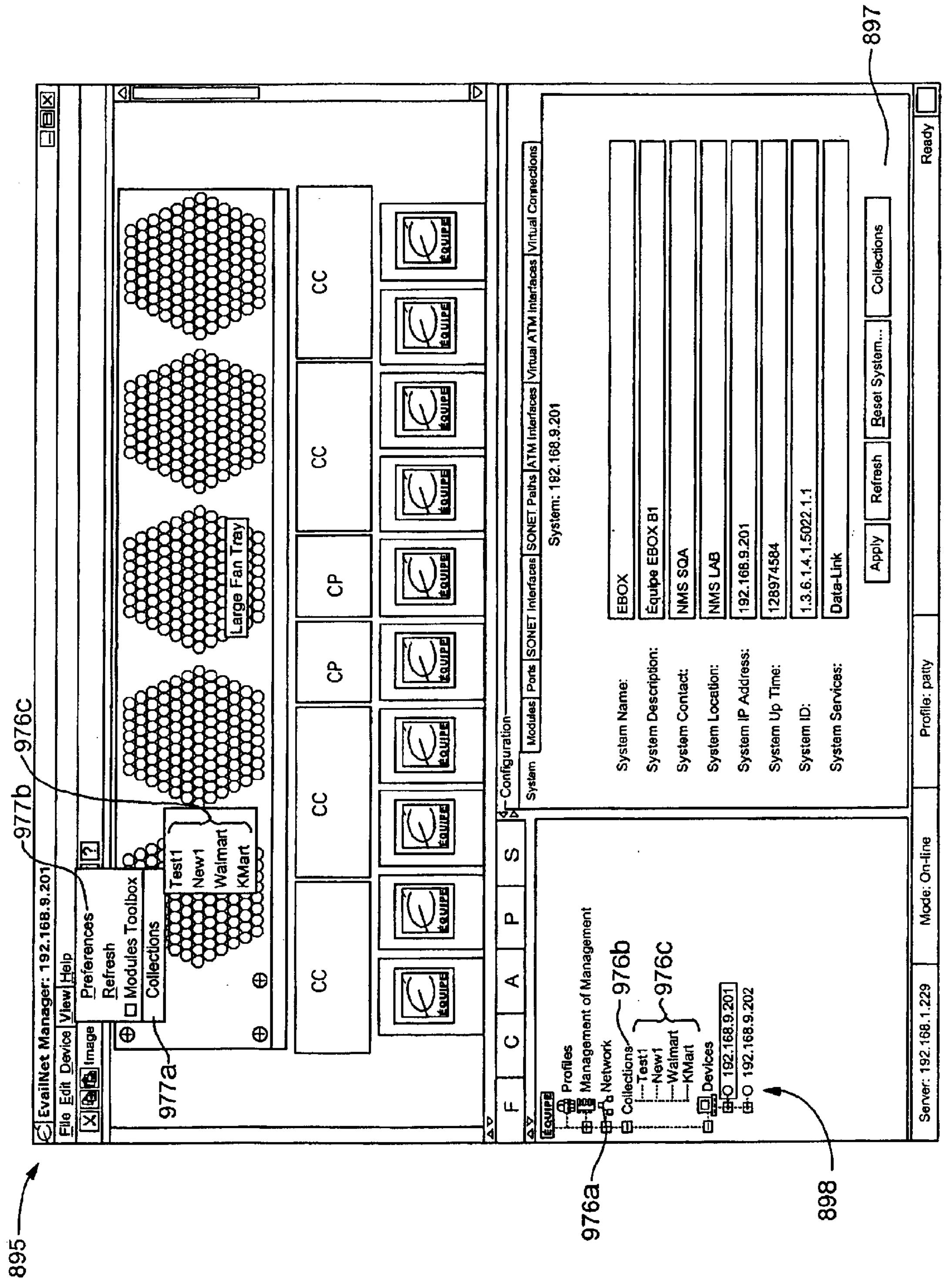

Referring to FIG. 10*a*, when a user first logs into an NMS client by supplying a username and password, a list of network devices (e.g., 192.168.9.201 and 192.168.9.202) is displayed in accordance with the user's profile. Profiles are described in more detail below. In addition, a list of collections that correspond with the user's profile may also be provided. For example, navigation tree 898 may include a network branch 976*a*, and if the user double clicks the left mouse button on the network branch a Collections branch 976*b* is displayed. Similarly, if the user double clicks the left mouse button on the Collections branch, a list 976*c* is provided of available collections (e.g., Test1, New1, Walmart, Kmart). Alternatively or in addition, the user may select a Collections option 977*a* from a view pull-down menu 977*b* to display list 976*c* of available collections. List 976*c* may include collections pre-defined by other users (e.g., senior network administrator) and/or custom collections previously created by the user.

Figure 10B:
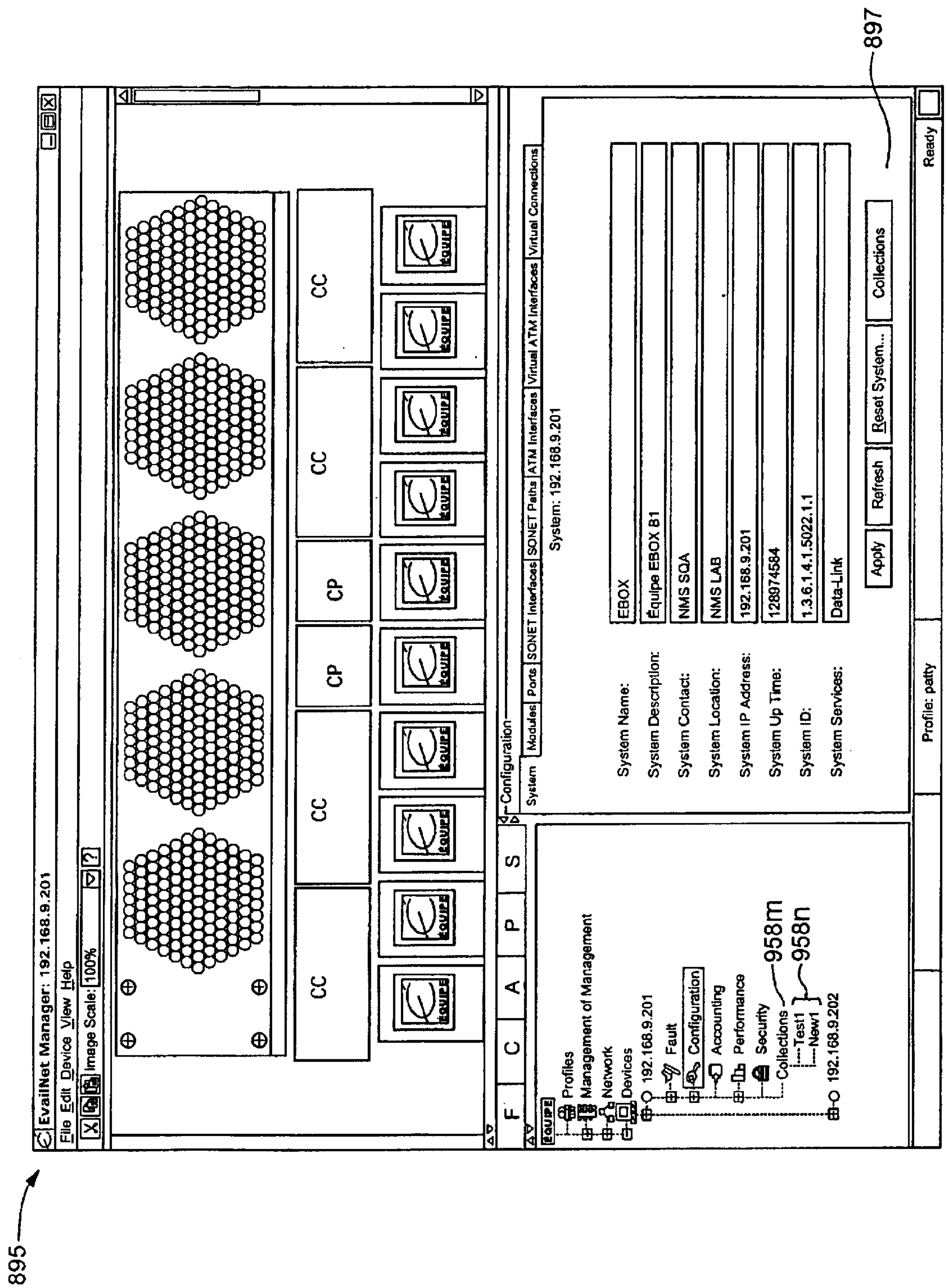
Figure 10C:
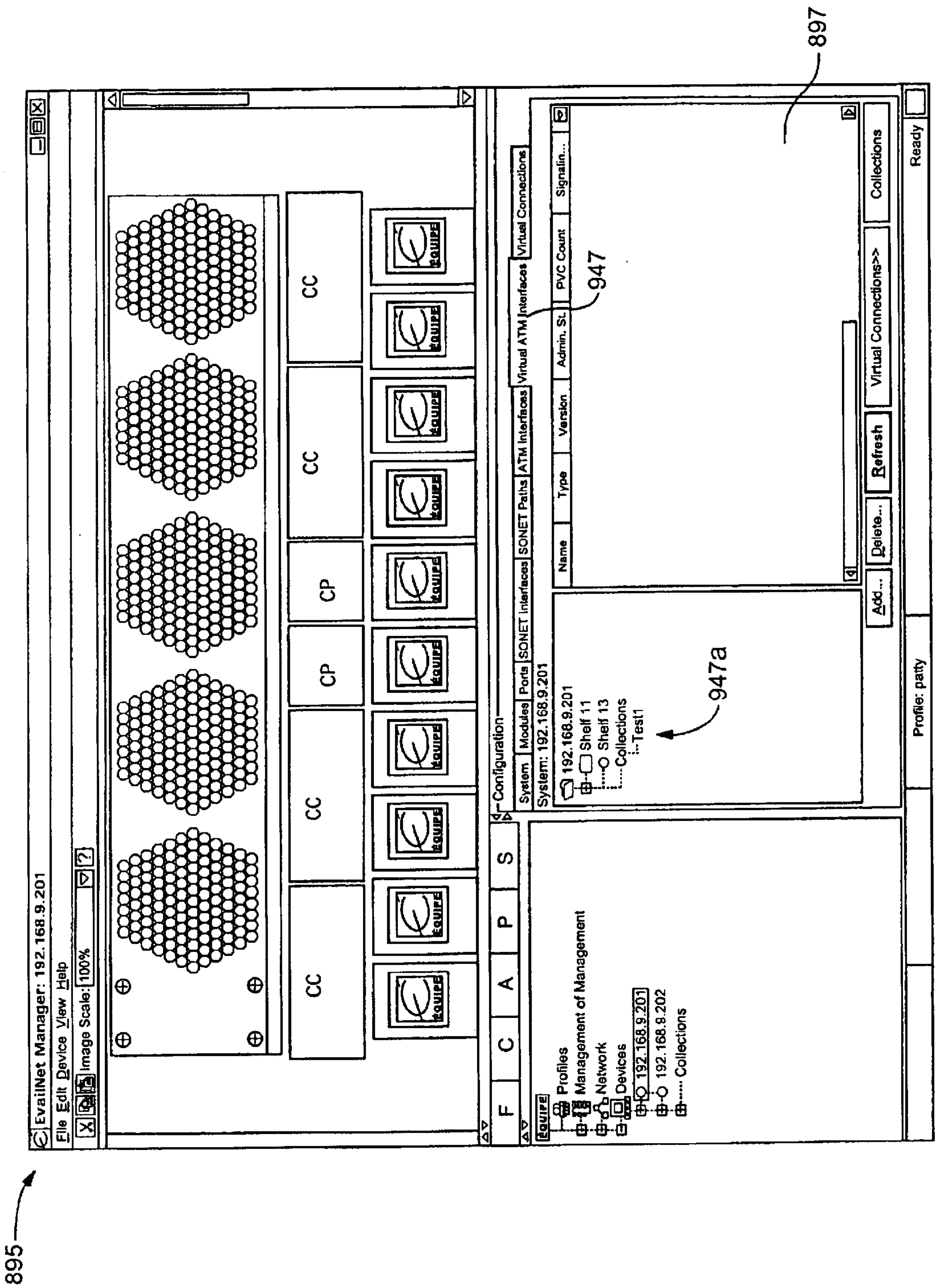

Referring to FIG. 10*b*, to view collections that include objects corresponding to only one network device, the user may select a network device (e.g., 192.168.9.201) and select a Collections option 958*m*. If the user double clicks the left mouse button on Collections option 958*m*, a list 958*n* (e.g., Test1 and New1) of available collections corresponding to the selected network device is displayed. In addition, as the user selects various FCAPS tabs, collections containing objects from the selected tab may be displayed. For example, collection Test1 (FIG. 10*c*) in navigation tree 947*a* may include objects selected from Virtual ATM Interfaces tab 947 and is therefore displayed when the Virtual ATM Interfaces tab is selected.

Figure 10E:
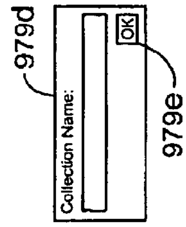
Figure 10F:
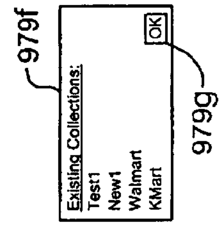
Figure 10D:
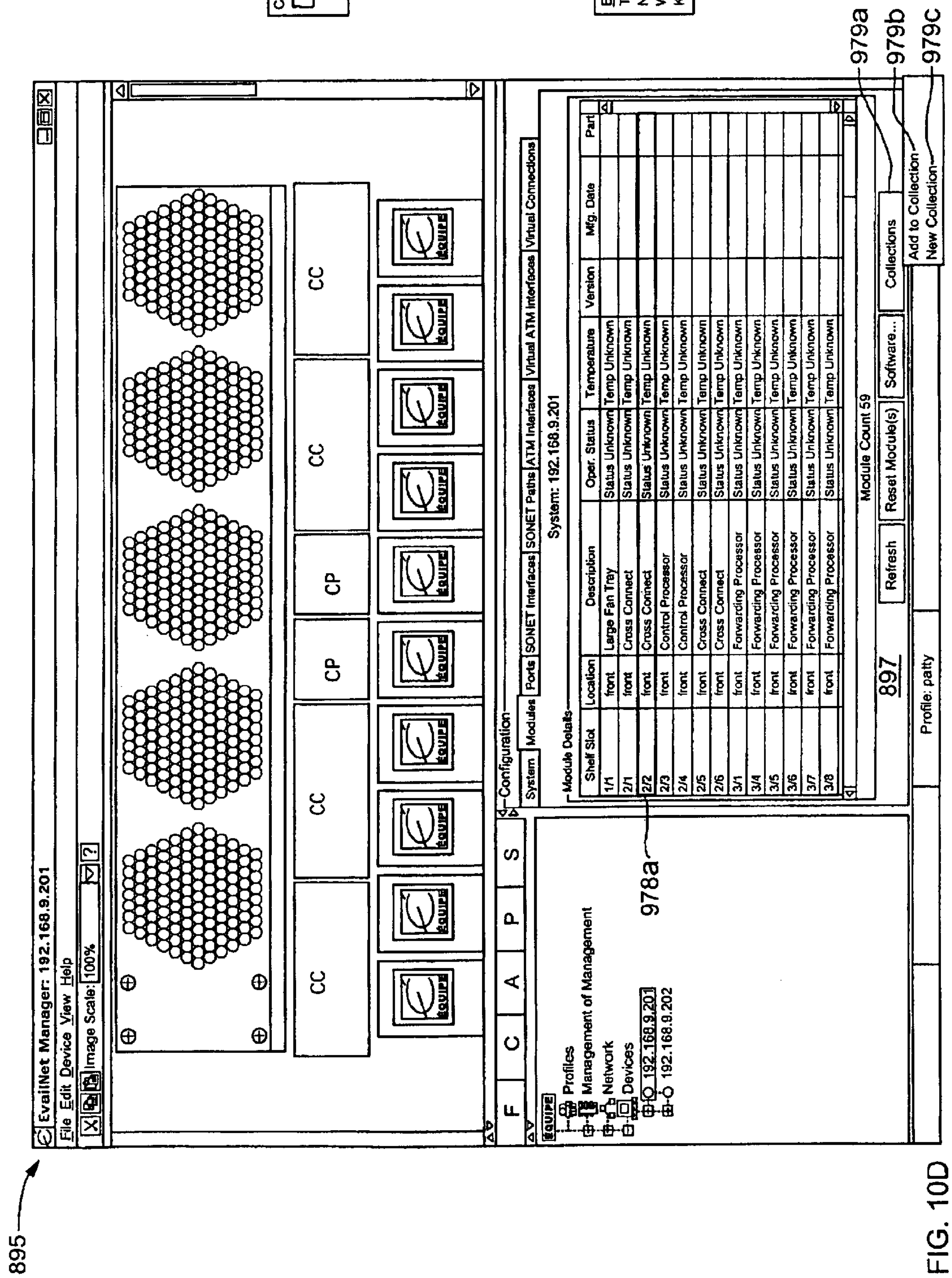

Referring to FIG. 10*d*, to add an object to an existing or new collection, a network manager first selects the object (e.g., Module object 978*a*) and then selects a Collection button 979*a* to cause an Add to Collection option 979*b* and a New Collection option 979*c* to appear. If the network manager selects New Collection option 979*c*, then a dialog box 979*d* (FIG. 10*e*) appears and the network manager inputs the name of the new collection. After inputting the name of the new collection, the network manager selects OK button 979*e* and the object is automatically added to the collection and dialog box 979*d* is closed. If the network manager selects Add to Collection option 979*b*, a dialog box 979*f* (FIG. 10*f*) appears listing the available collections. The user may then select one of the listed collections and then select OK button 979*g* to add the object to the collection and close dialog box 979*f*.

Figure 10G:
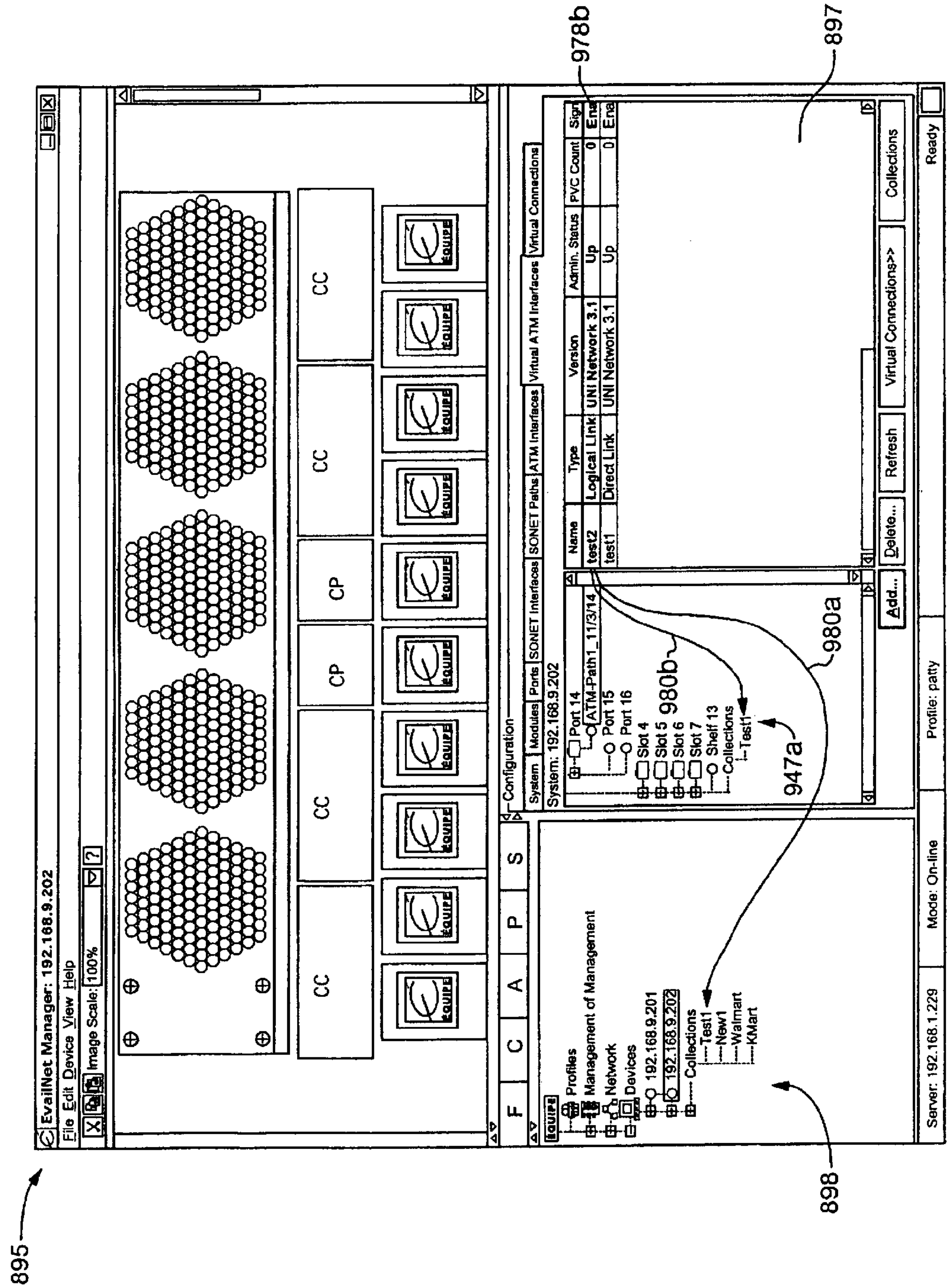

Alternatively, the network manager may add an object to a collection by dragging and dropping an object from an FCAPs tab onto a collection branch in a navigation tree. Referring to FIG. 10*g*, for example, a network manager may select an object 978*b* by pressing down on the left mouse button, dragging (indicated by arrows 980*a* and 980*b*) the object to a collection and dropping the object on the collection (i.e., drag and drop). For instance, object 978*b* may be dragged and dropped on collection Test1 in either navigation tree 947*a* or 898. An object may also be dragged and dropped into a named collection in a pull down menu or dialog box.

When a collection is selected by a network manager, customer or other user, for example, by double clicking on the collection name in a navigation tree or pull down menu, the tabs in service status window 897 are changed to include only objects in the selected collection. For instance, if the collection includes only SONET path objects, then only the SONET Paths tab will include objects once the collection is selected and all other tabs will not include any objects. Alternatively, the other tabs in service status window 897 may include objects corresponding to or related to the objects in the selected collection.

Figure 10H:
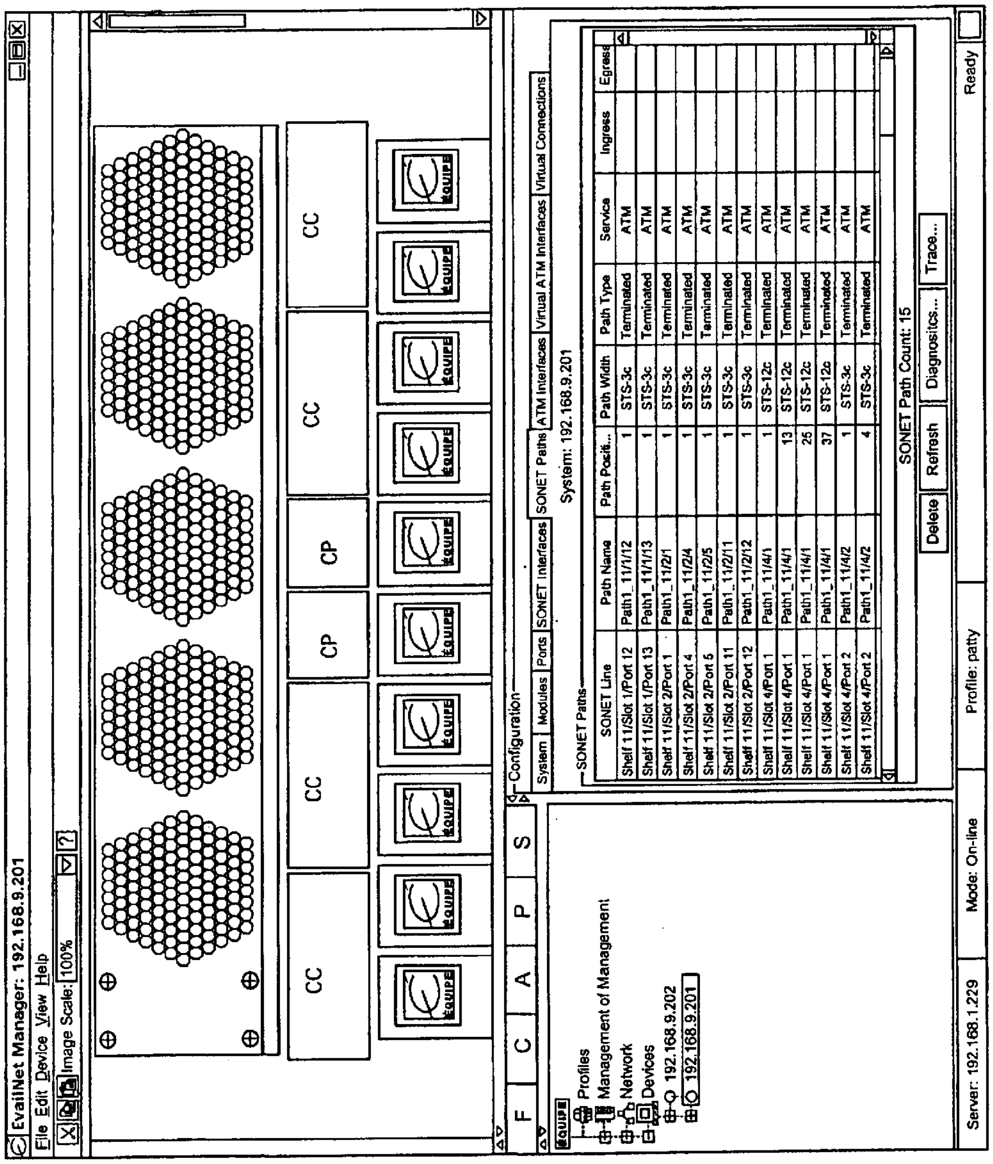
Figure 10I:
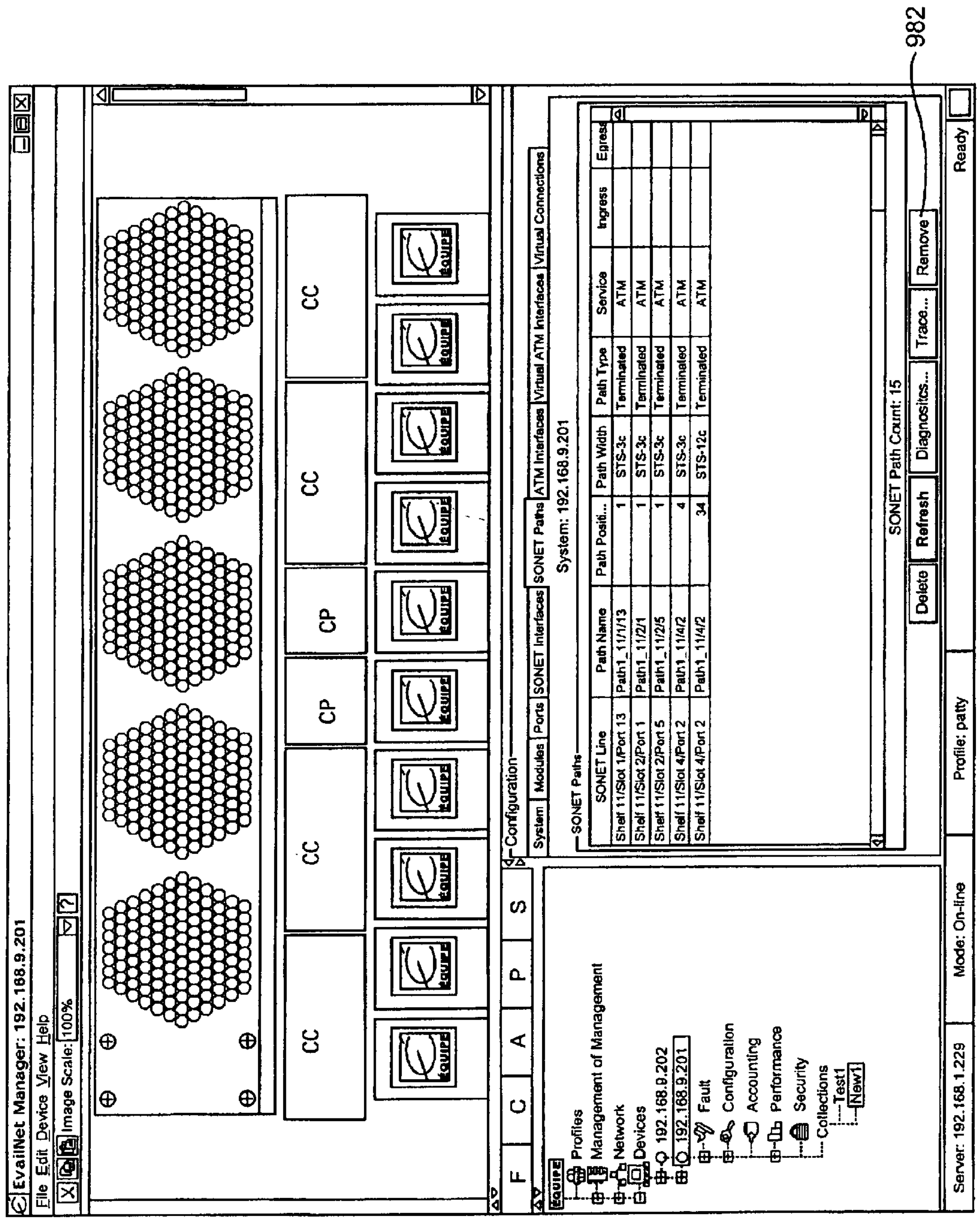

Referring to FIG. 10*h,* when device 192.168.9.201 is selected and the SONET Paths tab is selected, a large number of SONET paths may be displayed. Referring to FIG. 10*i,* when collection New1 is selected, the SONET Paths Tab is changed to display only those SONET path objects within the New1 collection. As a result, the user need only view the objects in which they are interested.

To remove an object from a collection, the network manager selects an object and then selects a Remove button 982. The network manager may also select an object and double click the left mouse button to cause a dialog box to appear. The network manager may edit certain parameters and then exit from the dialog box. Any changes made to an object in a collection are automatically updated in GUI 895. Similarly, any changes made to an object in GUI 895 are automatically updated in any and all collections including that object.

Custom object collections allow a user to view only those objects that are of interest. These may be a few objects from an otherwise very large object list in the same FCAPS tab (that is, the collection acts as a filter), and these may be a few objects from different FCAPS tabs (that is, the collection acts as an aggregator). Consequently, both flexibility and scalability are provided through custom object collections.

Custom object collections may also be used to restrict access to network objects. For example, a senior network administrator may establish a collection of objects and provide access to that collection to a junior network manager through the junior network manager's profile. In one embodiment, the junior network manager may not be provided with the full navigation tree 898 (FIG. 10*a*) after logging in. Instead, only a list of available collections may be provided. Thus, the junior network manager's access to the network is limited to the objects contained in the available collections and the FCAPS tabs will similarly only include those same objects.

Similarly, collections may be created that include objects corresponding to a particular customer, for example, Walmart or Kmart. A customer profile may be established for each customer and one or more collections containing only objects relevant to each customer may be assigned to the relevant customer profile. Consequently, each customer is limited to viewing only those objects corresponding to their own accounts and not the accounts of any other customers. This permits Customer Network Management (CNM) without breaching the security provided to each customer account.

Profiles

Profiles may be used by the NMS client to provide individual users (e.g., network managers and customers) with customized graphical user interfaces (GUIs) or views of their network and with defined management capabilities. For example, some network managers are only responsible for a certain set of devices in the network. Displaying all network devices makes their management tasks more difficult and may inadvertently provide them with management capabilities over network devices for which they are not responsible or authorized to perform. With respect to customers, profiles limit access to only those network device resources in a particular customer's network—that is, only those network device resources for which the customer has subscribed/paid. This is crucial to protecting the proprietary nature of each customer's network. Profiles also allow each network manager and customer to customize the GUI into a presentation format that is most efficient or easy for them to use. For example, even two users with access to the same network devices and having the same management capabilities may have different GUI customizations through their profiles. In addition, profiles may be used to provide other important information, for example, SNMP community strings to allow an NMS server to communicate with a network device over SNMP, SNMP retry and timeout values, and which NMS servers to use, for example, primary and secondary servers may be identified.

Figure 11A:
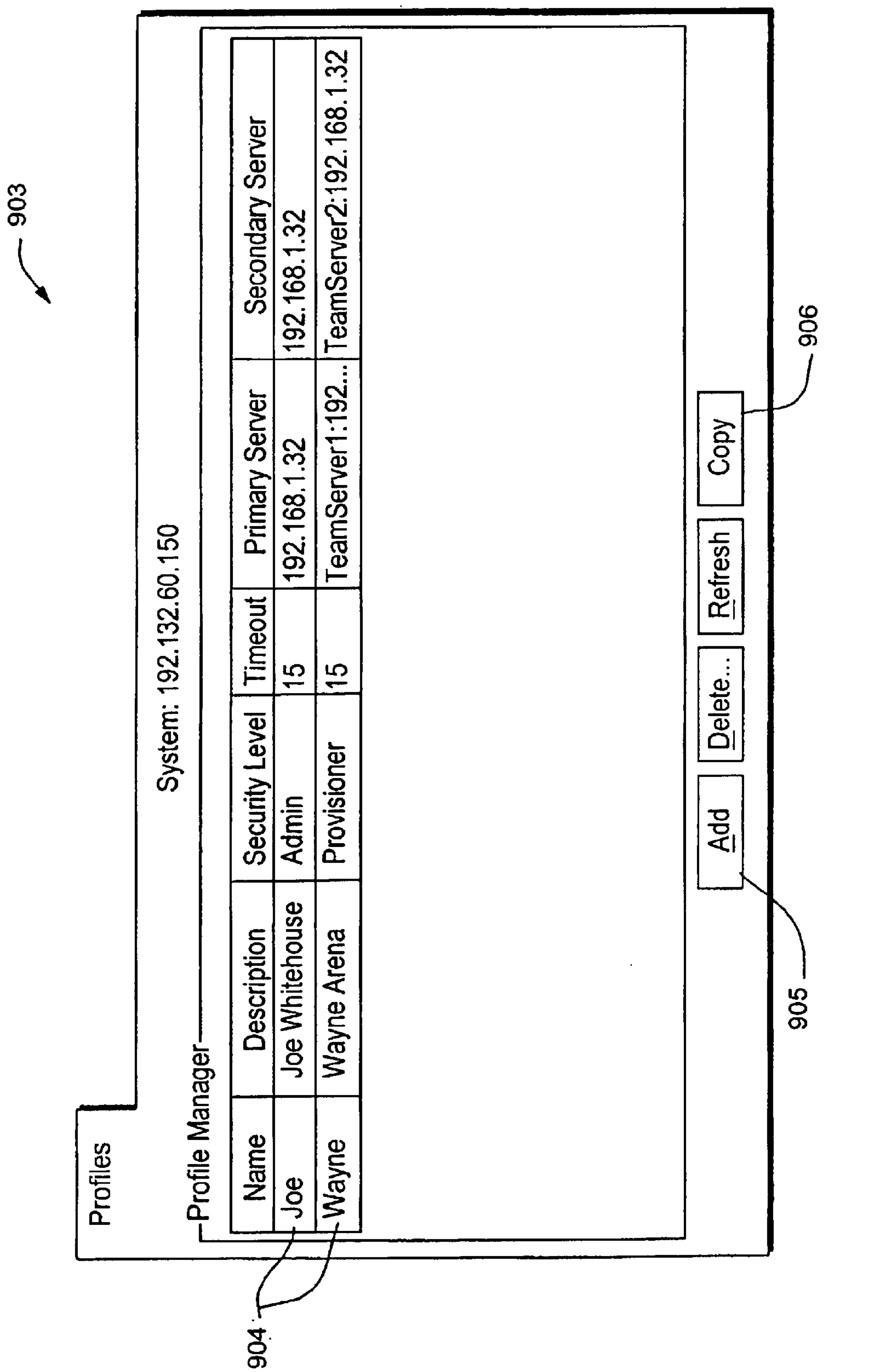

A network administrator is typically someone who powers up a network device for the first time, installs necessary software on the new network device as well as installs any NMS software on an NMS computer system, and adds any additional hardware and/or software to a network device. The network administrator is also the person that attaches physical network cables to network device ports. The first time GUI 895 is displayed to a network administrator, an NMS client application uses a default profile including a set of default values. Referring again to FIG. 7*a,* the administrator may change the default values in his profile by selecting (e.g., clicking on) a profile selection 902 in a navigation tree/menu 898. This causes the NMS client to display a profiles tab 903 (FIG. 11*a*) on the screen. The profile tab displays any existing profiles 904. The first time the profile tab appears only the network administrator's profile is displayed as no other profiles yet exist.

To save a network manager's time, the profiles tab may also include a copy button 906. By selecting a profile 904 and clicking on the copy button, an existing profile is copied. The network manager may then change the parameters within the copied profile. This is helpful where two user profiles are to include the same or similar parameters.

Figure 11B:
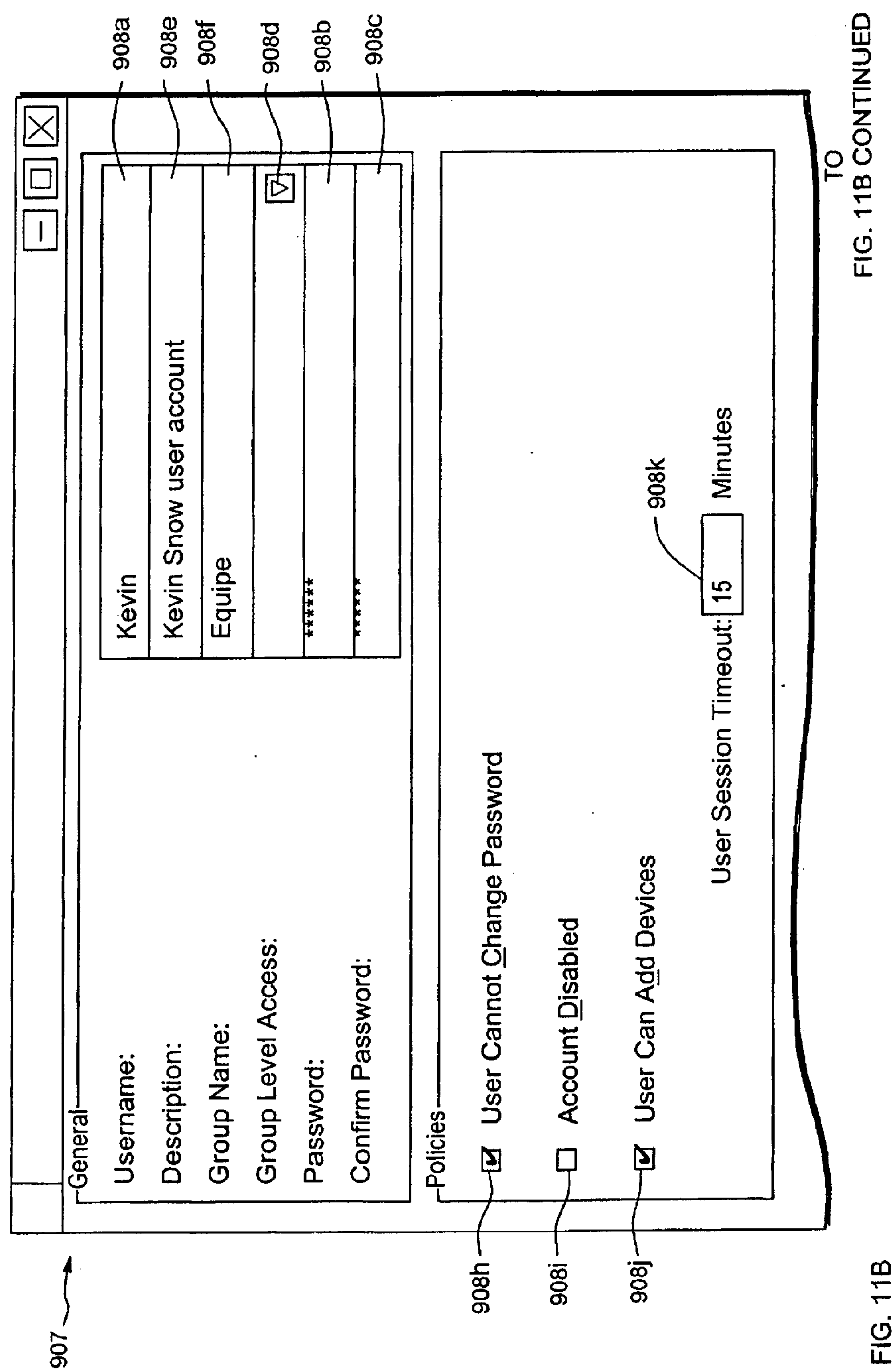
Figure 11B:
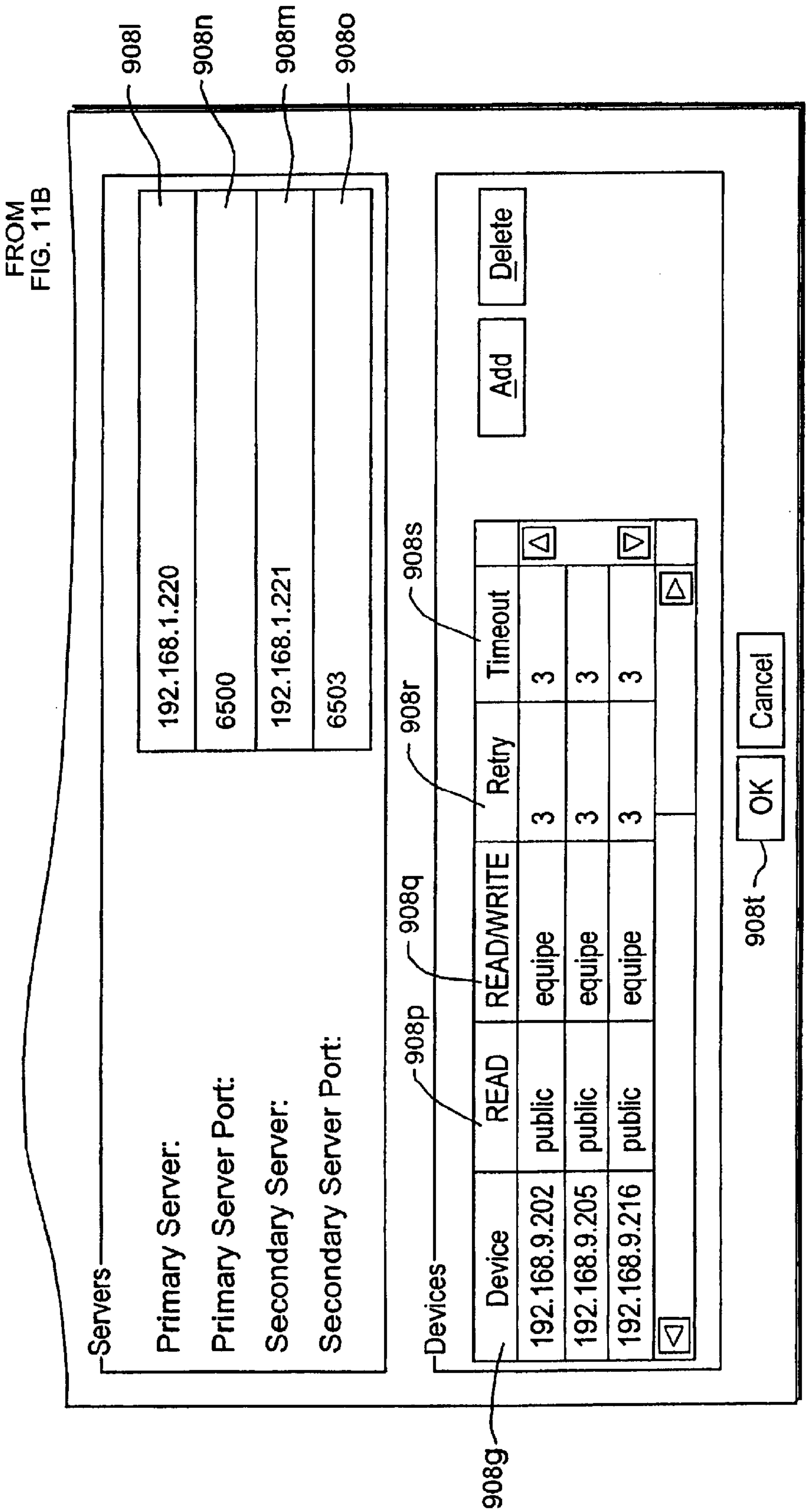
Figure 11C:
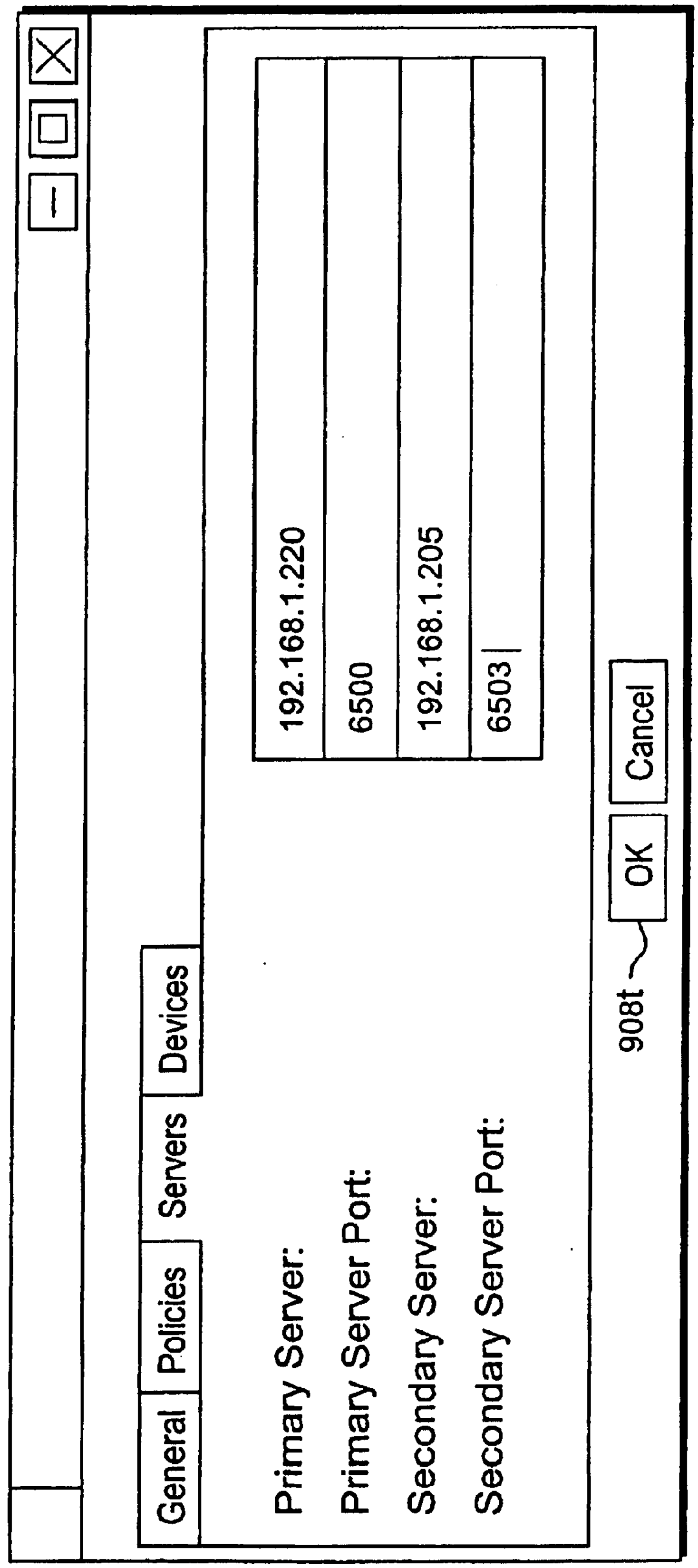
Figure 11D:
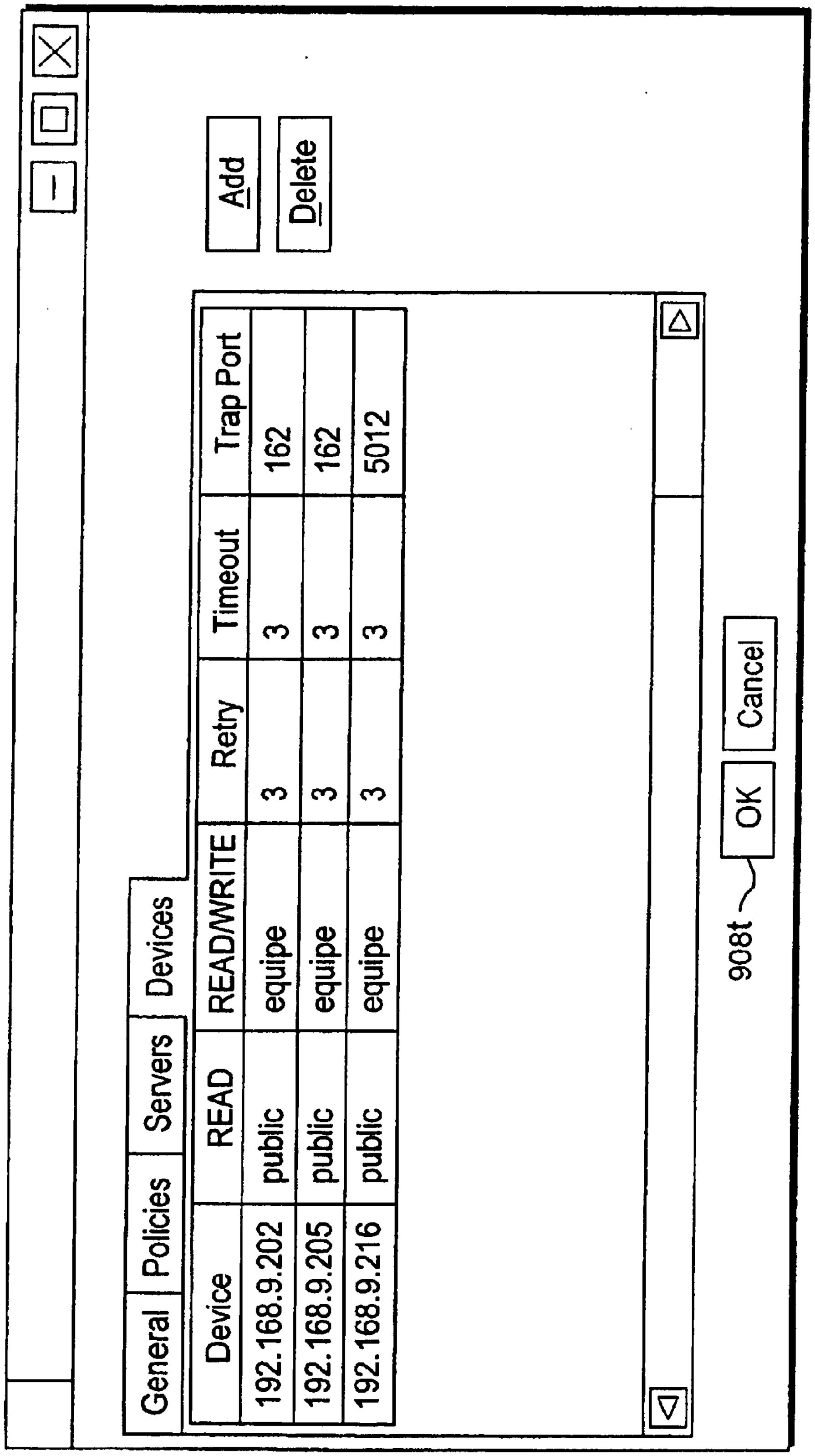
Figure 11E:
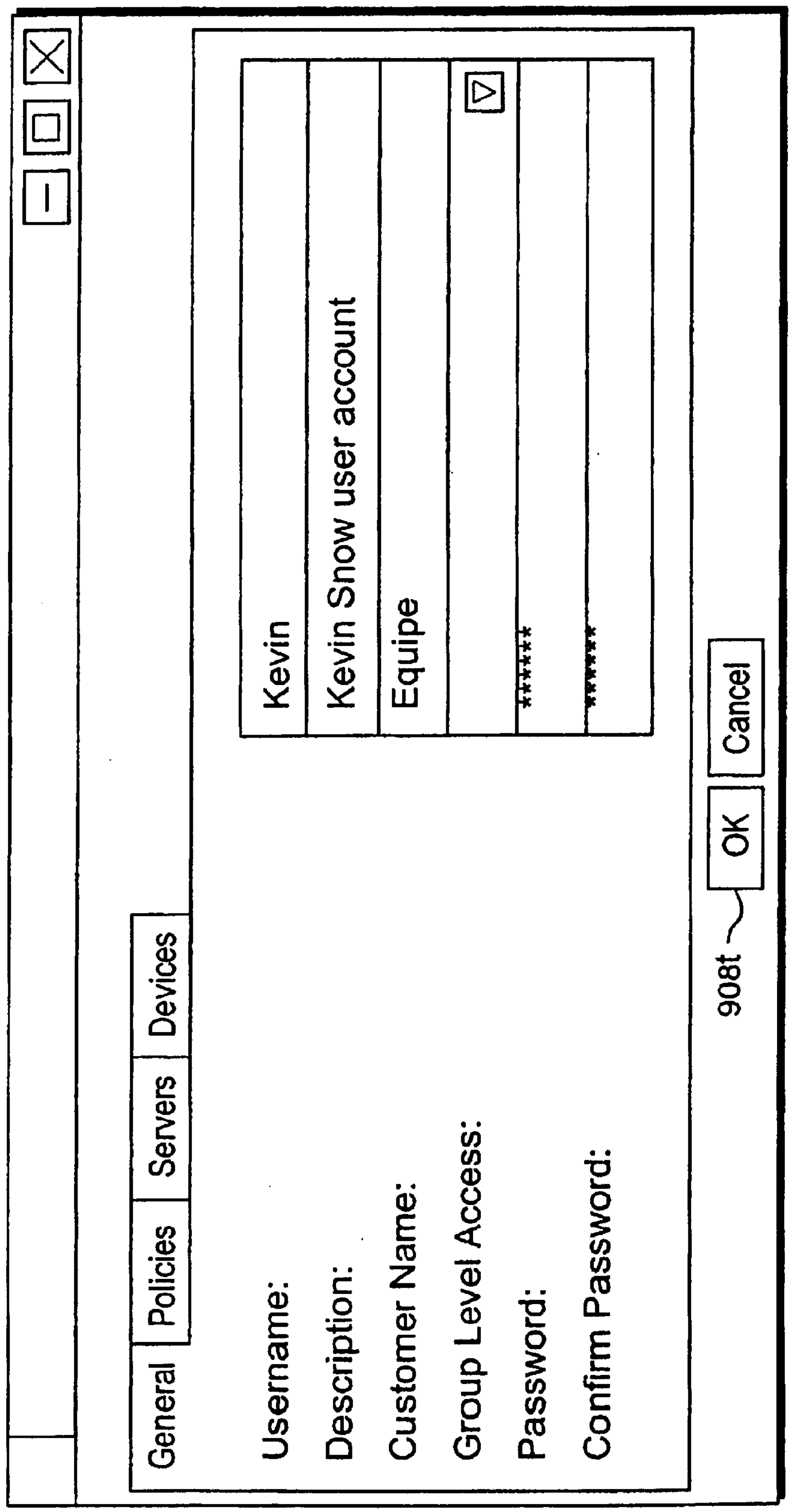
Figure 11F:
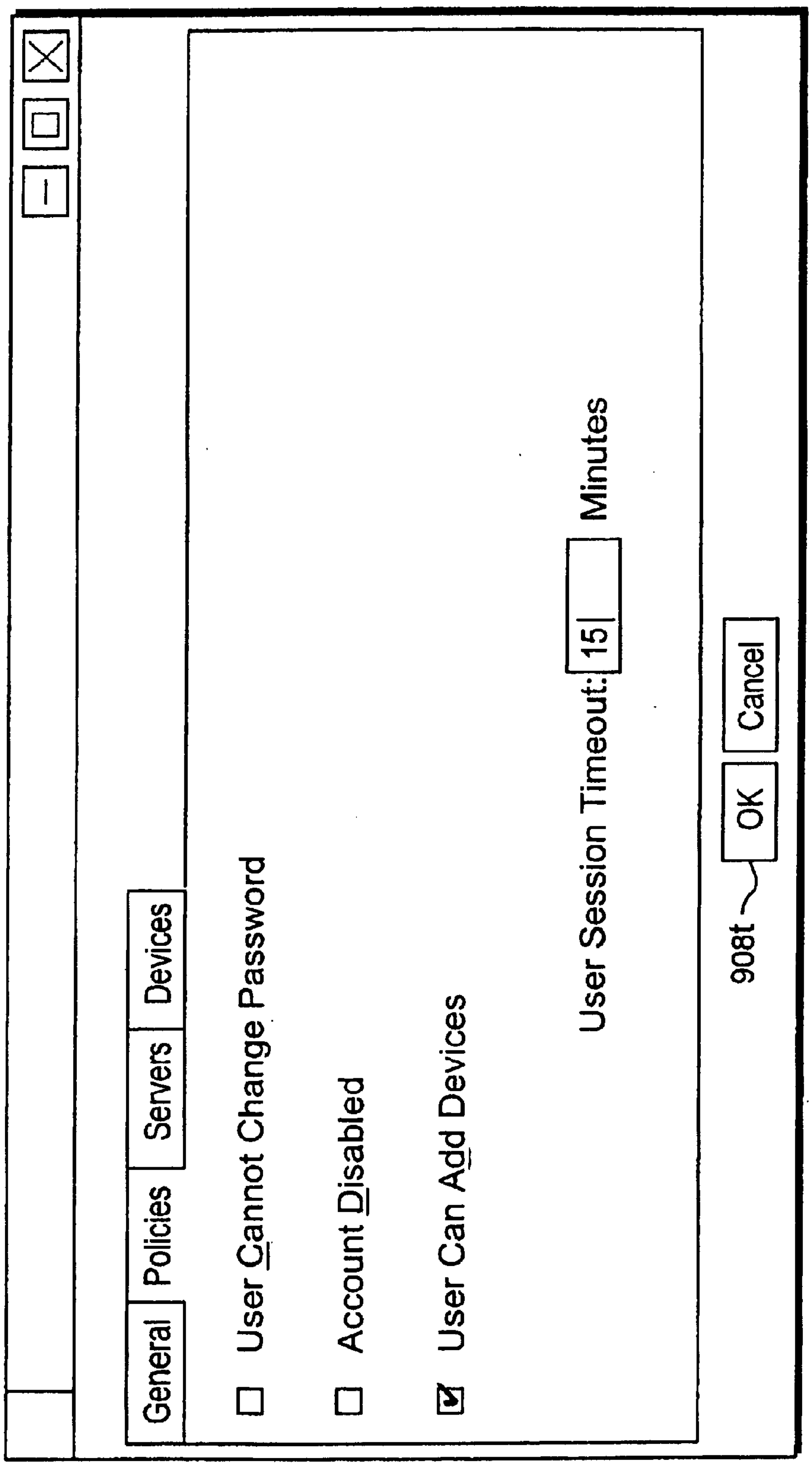

To change the parameters in the network administrator's profile or any other existing profile, including a copied profile, the user double clicks on one of the profiles 904. To add a new profile, the user clicks on an Add button 905. In either case, the NMS client displays a profile dialog box 907 (FIG. 11*b*) on the screen. Through the profile dialog box, a user's user name 908*a,* password 908*b* and confirmed password 908*c* may be added or changed. The confirm password field is used to assure that the password was entered properly in the password field. The password and confirmed password may be encrypted strings used for user authentication. These fields will be displayed as asterisks on the screen. Once added, a user simply logs on to an NMS client with this user name and password and the NMS client displays the GUI in accordance with the other parameters of this profile.

A group level access field 908*d* enables/disables various management capabilities (i.e., functionality available through the NMS client). Clicking on the group level access field may provide a list of available access levels. In one embodiment, access levels may include administrator, provisioner and viewer (e.g., customer), with administrator having the highest level of management capabilities and viewer having the lowest level of management capabilities (described in more detail below). In one embodiment, users can create profiles for other users at or below their own group access level. For example, a user at the provisioner access level can create user profiles for users at either the provisioner or viewer level but cannot create an administrator user profile.

A description may be added in a description field 908*e,* including, for example, a description of the user, phone number, fax number and/or e-mail address. A group name may be added to group field 908*f,* and a list of network device IP addresses may be provided in a device list field 908*g*. Alternatively, a domain name server (DNS) name may be provided and a host look up may be used to access the IP address of the corresponding device. Where a group name is provided, the list of network devices is associated with the group such that if the same group name is assigned to multiple user profiles, the users will be presented with the same view—that is, the same list of network devices in device list field 908*g*. For example, users from the same customer may share a group name corresponding to that customer. A wildcard feature is available for the group field. For example, perhaps an * or ALL may be used as a wildcard to indicate that a particular user is authorized to see all network devices. In most instances, the wildcard feature will only be used for a high-level network administrator. The list of devices indicates which network devices the user may manage or view, for example, configuration status and statistics data may be viewed.

Within a profile certain policy flags (i.e., attributes) may also be set. For example, a flag 908*h* may be set to indicate that the user is not allowed to change his/her password, and an account disable flag 908*i* may be set to disable a particular profile/account. In addition, a flag 908*j* may be set to allow the user to add network device IP addresses to device list field 908*g,* and a number may be added to a timeout field 908*k* to specify a number of minutes after which a user will be automatically logged out due to inactivity. A zero in this field or no value in this field may be used to indicate unlimited activity, that is, the user will never be automatically logged out.

The profile may also be used to indicate with which NMS servers the NMS client should communicate. An IP address or DNS name may be added to a primary server field 908*l* and a secondary server field 908*m.* If the primary server fails, the client will access the secondary server. A port number may be added to primary server port field 908*n* and to secondary server port field 908*o* to indicate the particular ports that should be used for RMI connectivity to the primary and secondary NMS servers.

As described below, the information provided in a user profile is stored in tables within the NMS database, and when a user logs onto the network through an NMS client, the NMS client connects to an NMS server that retrieves the user's profile information and sends the information to the NMS client. The NMS client automatically saves the NMS server primary and secondary IP addresses and port numbers from the user's profile to a team session file associated with the user's username and password in a memory 986 (FIG. 11*w*) local to the NMS client. If the user logs into an NMS client through a web browser, then the NMS client may save the NMS server primary and secondary IP addresses and port numbers to a cookie that is then stored in the user's local hard drive. The next time the user logs in to the NMS client, the NMS client uses the IP addresses and port numbers stored in the team session file or cookie to connect to the appropriate NMS server. The first time a user accesses an NMS client, however, no team session file or cookie will be available. Consequently, during the initial access of the NMS client, the NMS client may use a default IP address to connect with an NMS server or a pop-up menu 1034 (FIG. 11*x*) may be displayed in which the user may type in the IP address in a field 1034*a* of the NMS server they want the NMS client to use or select an IP address from a pop-up menu that appears when a dropdown button 1034*b* is selected.

User profiles and team session files/cookies allow a network administrator or provisioner to push down new NMS server IP addresses, port numbers and other information to users simply by changing those values in the user profiles. For example, an NMS server may be over loaded and a network administrator may wish to move some users from this NMS server to another less utilized NMS server. The administrator need only change the NMS server IP addresses and port numbers in the users' profiles to affect the switch. The NMS server sends the new IP addresses and port numbers to the one or more NMS clients through which the users are logged in, and the NMS clients save the new IP addresses and port numbers in each user's team session file or cookie. The next time the users log in, the NMS client(s) use the new IP addresses and port numbers in the team session files or cookies to access the appropriate NMS server. Thus, the users selected by the administrator are automatically moved to a different NMS server without the need to notify those users or take additional steps. In addition to saving IP addresses and perhaps port numbers in team session files/cookies, other information from the user profile may also be saved in team session files/cookies and changes to that information may be pushed down by the administrator simply by changing a user profile.

Referring again to FIG. 11*b,* additional fields may be added to device list 908*g* to provide more information. For example, a read field 908*p* may be used to indicate the SNMP community string to be used to allow the NMS server to communicate with the network device over SNMP. The SNMP connection may be used to retrieve statistical data and device status from the network device. In addition, a read/write field 908*q* may be used to indicate an SNMP community string to allow the NMS server to configure the network device and/or provision services. The profile may also include a retry field 908*r* and a timeout field 908*s* to provide SNMP retry and timeout values. Many different fields may be provided in a profile.

Instead of providing all the parameters and fields in a single profile dialog box, they may be separated into a variety of a tabbed dialog boxes (FIGS. 11*c*–11*f*). The tabbed dialog boxes may provide better scalability and flexibility for future needs.

In one embodiment, an administrator level user has both read and write access to the physical and logical objects of the NMS client. Thus, all screens and functionality are available to an administrator level user, and an administrator after physically attaching an external network attachment to a particular network device port may then enable that port and provision SONET paths on that port. All screens are available to a provisioner level user, however, they do not have access to all functionality as they are limited to read-only access of physical objects. For example, a provisioner can see SONET ports available on a device and can provision SONET paths on a port, but the provisioner cannot enable/disable a SONET port. In other words, a provisioner's power begins at the start of logical objects (not physical objects), for example, SONET paths, ATM interfaces, virtual ATM interfaces, and PVCs, and continues through all the configuration aspects of any object or entity that can be stacked on top of either a SONET path or ATM interface. A viewer (e.g., customer) level user has read-only access to logical entities and only those logical entities corresponding to their group name or listed in the device list field. A viewer may or may not have access to Fault, Configuration, Accounting, and Security categories of FCAPS relative to their devices.

A customer may install an NMS client at a customer site or, preferably, the customer will use a web browser to access the NMS client. To use the web browser, a service provider gives the customer an IP address corresponding to the service provider's site. The customer supplies the IP address to their web browser and while at the service provider site, the customer logs in with their username and password. The NMS client then displays the customer level GUI corresponding to that username and password.

Figure 11G:
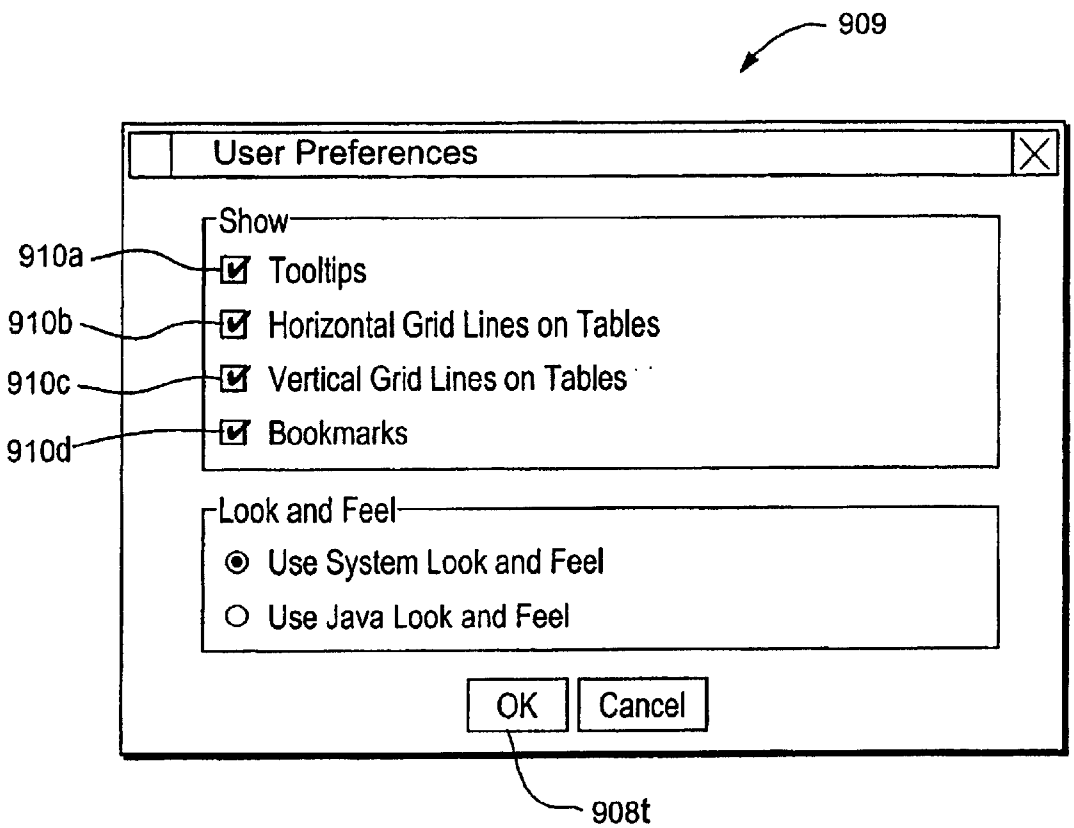

Referring to FIG. 11*g,* a user preference dialog box 909 may be used to customize the GUI into a presentation format that is most efficient or easy for a user to work with. For example, show flags (i.e., attributes) may be used to add tool tips (flag 910*a*), add horizontal grid lines on tables (flag 910*b*), add vertical grid lines on tables (flag 910*c*) and add bookmarks/short cuts (e.g., create a short cut to a PVC dialog box). Look and feel flags may also be used to make the GUI appear as a JAVA GUI would appear (flag 911*a*) or as a native application, for example, Windows, Windows/NT or Motif, GUI would appear (flag 911*b*).

Figure 11H:
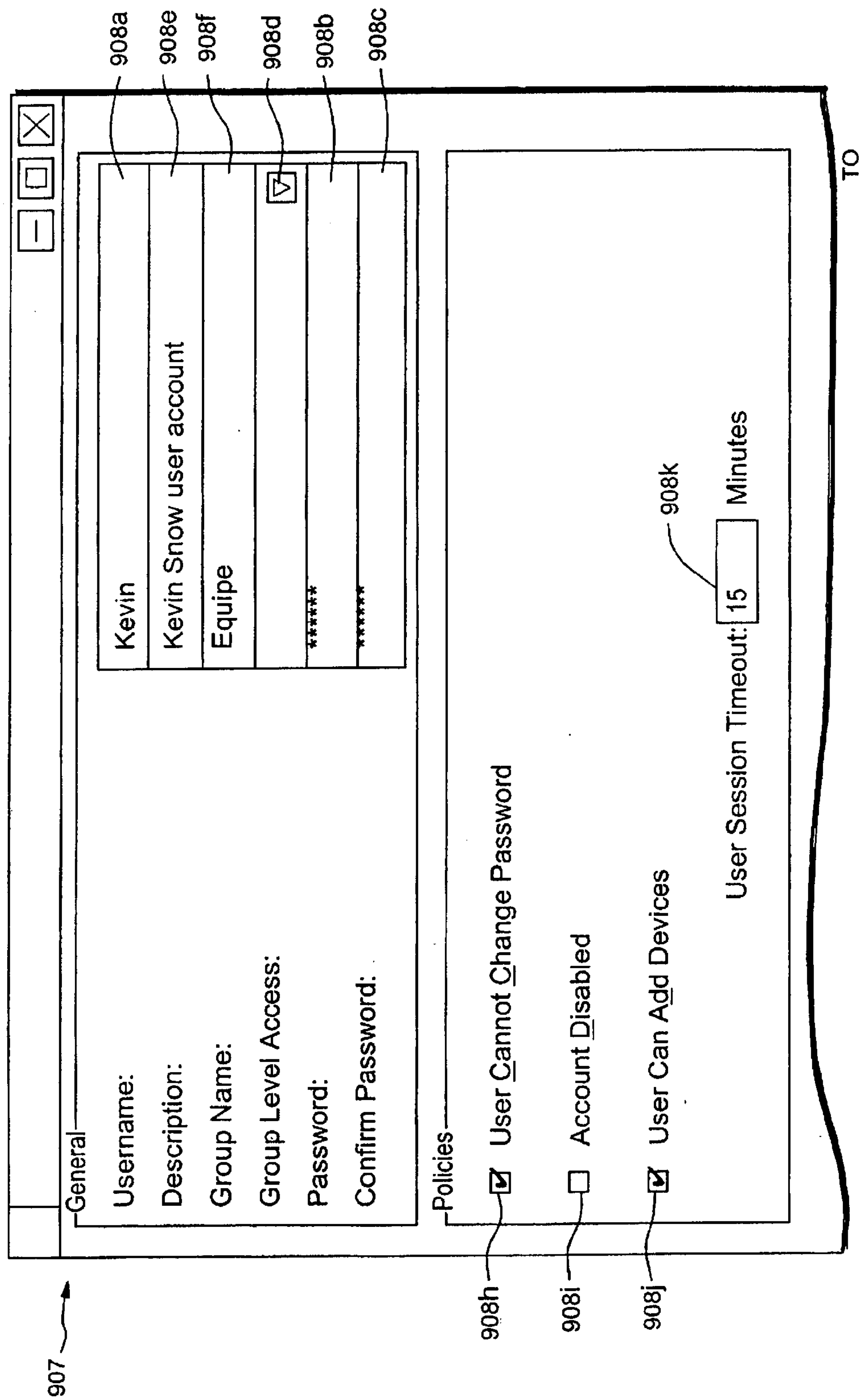
Figure 11H:
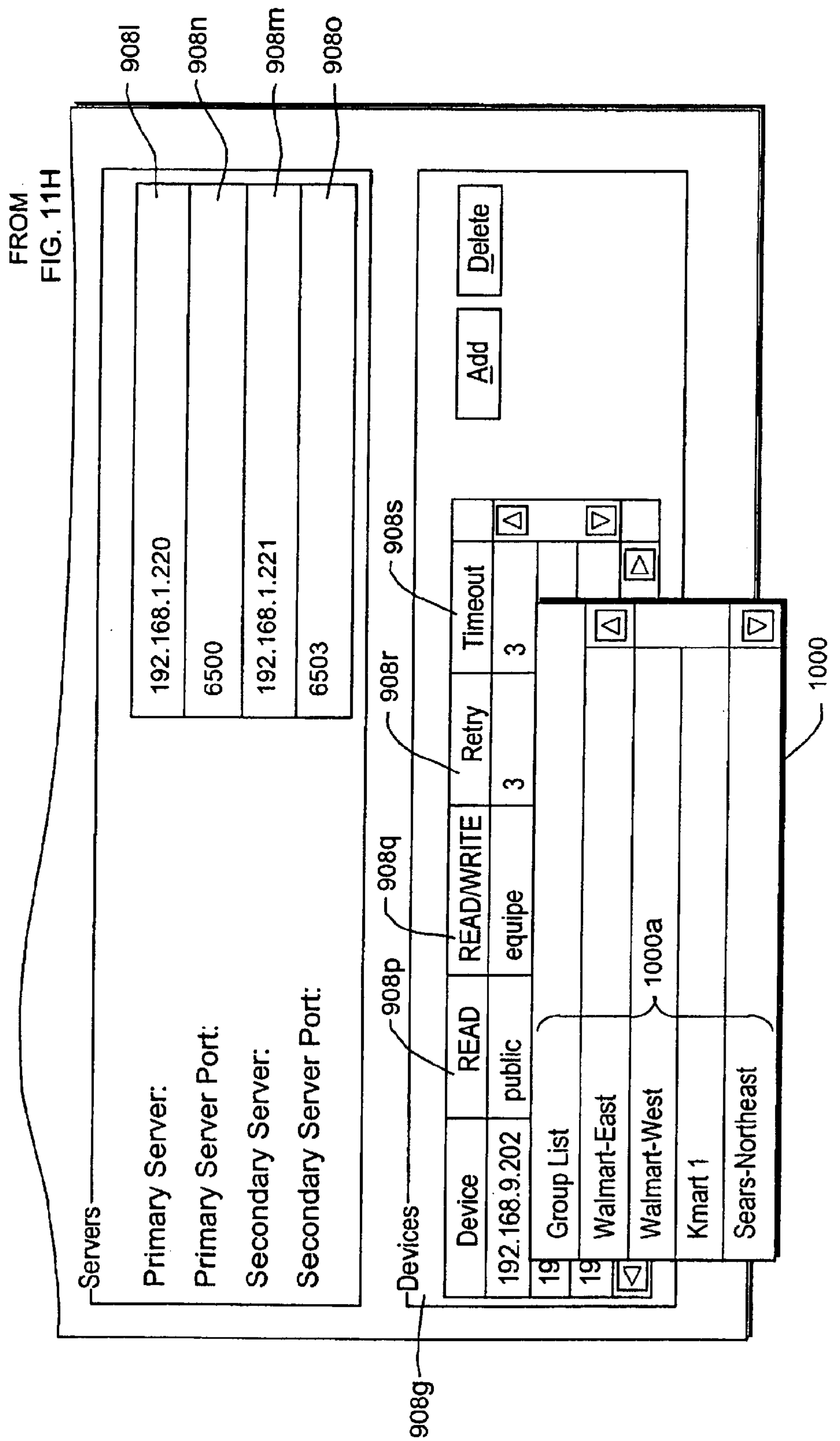

As an alternative to providing a Group Name 908*f* (FIG. 11*b*) or a Customer Name (FIG. 11*c*), when a profile is created or changed the administrator or provisioner may double click the left mouse button on a network device (e.g., 192.168.9.202, FIGS. 11*b* or 11*f*) in the device list to cause a pop-up menu 1000 (FIG. 11*h*) to be displayed. The pop-up menu provides a list 1000*a* of available groups corresponding to the selected network device, and the administrator or provisioner may select one or more groups (e.g., Walmart-East, Walmart-West) from the list for which the user corresponding to profile will be authorized to access.

Each group may include one or more configured resources (e.g., SONET paths, VATM interfaces, ATM PVCs) within the network device, and the resources in each group may be related in some way. For instance, a group may include resources configured by a particular provisioner. As another example, a group may include configured resources purchased by a particular customer. For instance, Walmart Corporation may be a customer of a network service provider and each network device resource paid for/subscribed to by Walmart may be included in a Walmart group. In addition, if Walmart subscribes to a larger number of configured resources, the network service provider may create several groups within the same network device for Walmart, for example, Walmart-East may include network device resources associated with Walmart activities in the eastern half of the United States and Walmart-West may include network device resources associated with Walmart activities in the western half of the United States. In addition, the network service provider may create a Walmart-Total group including all configured resources within the network device paid for by Walmart. Various users may be given access to one or more groups. For example, a Walmart employee responsible for network service in the eastern half of the United States may be given access to only the Walmart-East group while another higher level Walmart employee is given access to both the Walmart-East and Walmart-West groups. In addition, the same group name may be used in multiple network devices to simplify tracking. Through profiles multiple users may be given access to the same or different groups of configured resources within each network device, and users may be given access to multiple groups of configured resources in different network devices.

Figure 11I:
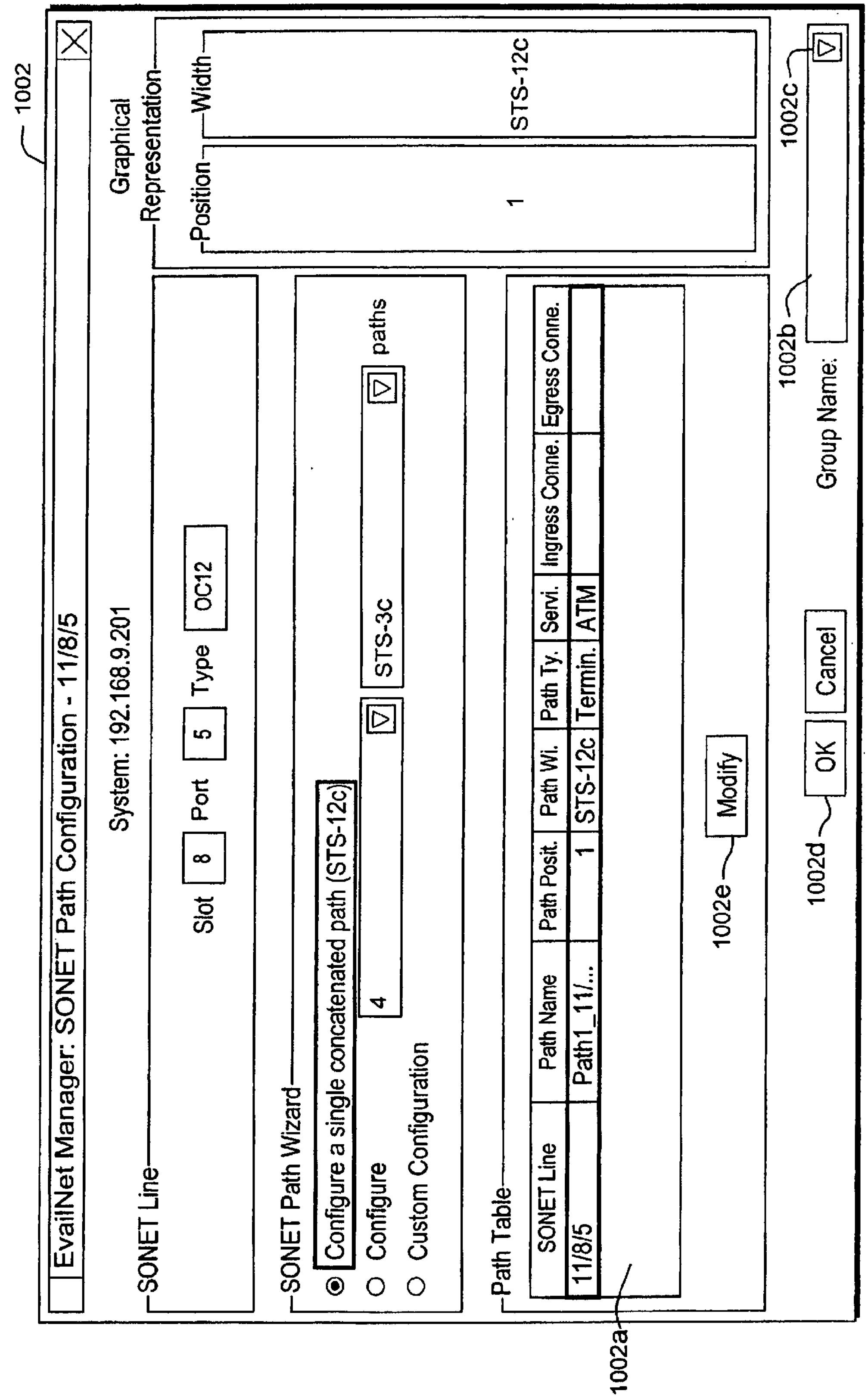
Figure 11J:
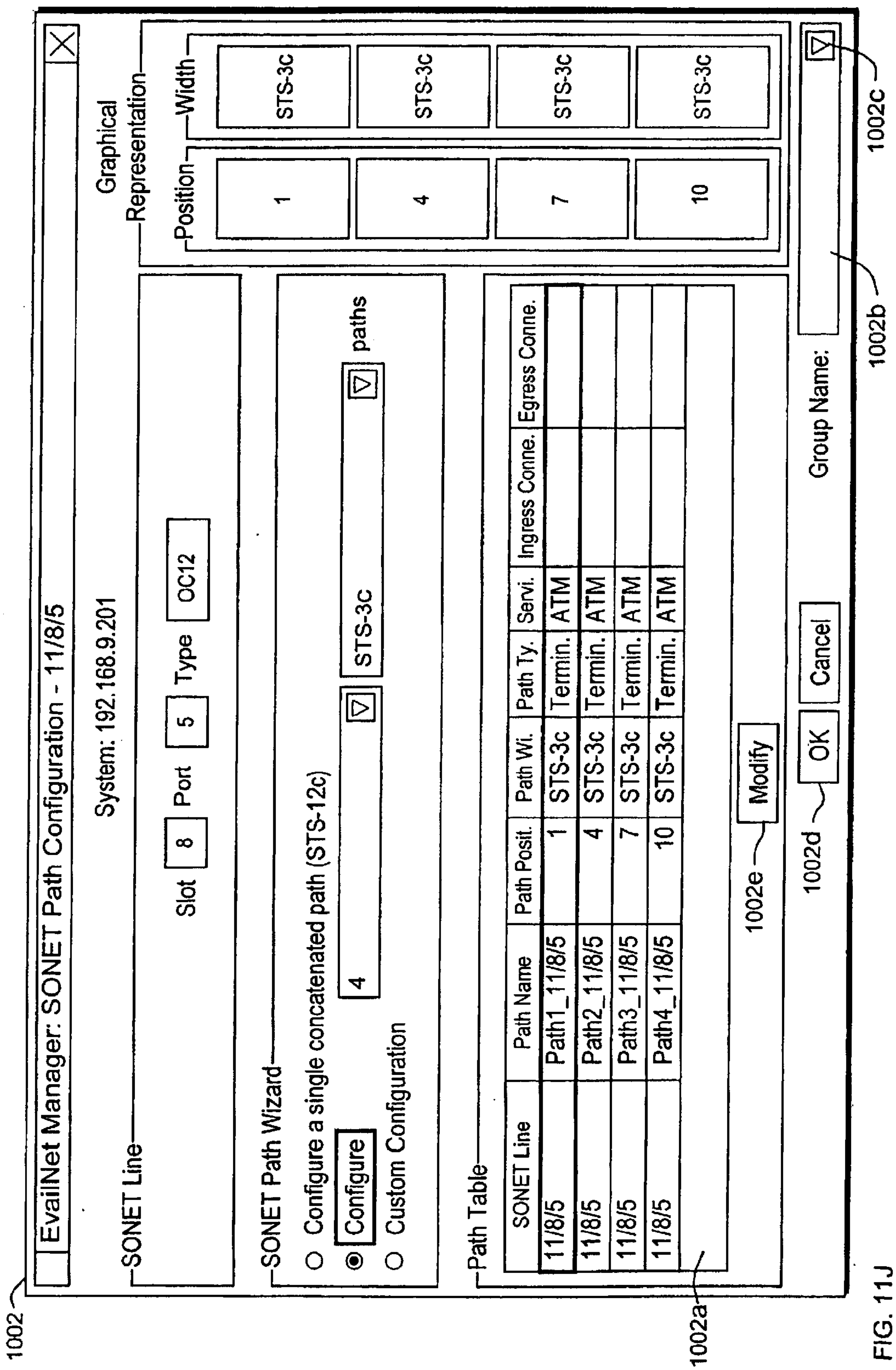
Figure 11K:
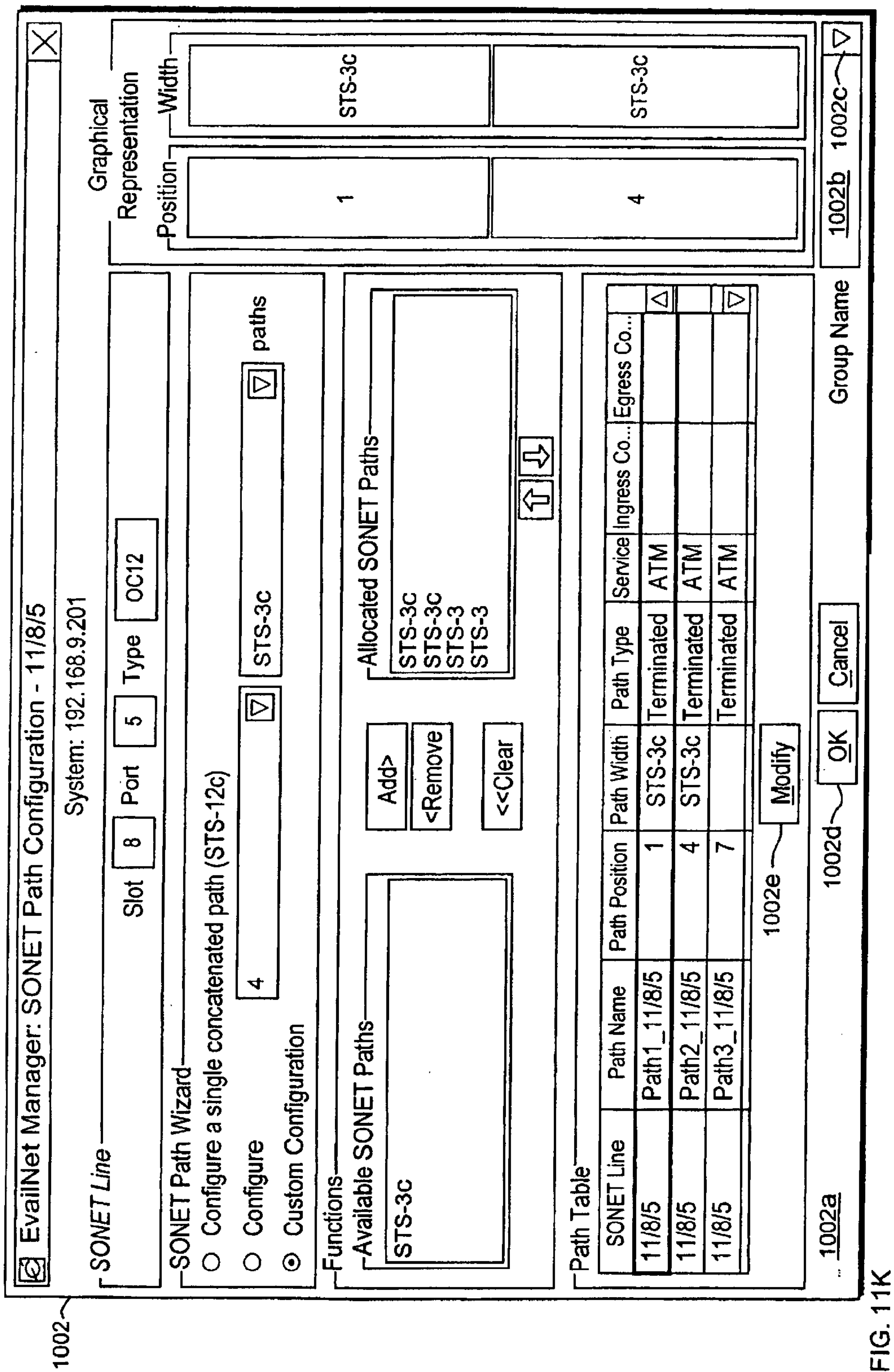

When an administrator or a provisioner configures a network device resource, they may assign that resource to a particular group. For example, when an administrator or provisioner configures one or more SONET paths, they may assign each SONET path to a particular group. Referring to FIGS. 11*i*–11*k,* within a SONET Path configuration wizard 1002, an administrator or provisioner may select a SONET Path within the SONET path table 1002*a* and type in a group name in field 1002*b* or select a group name from a pop-up menu displayed when dropdown button 1002*c* is selected. When the administrator/provisioner selects OK button 1002*d* or Modify button 1002*e,* the NMS client sends the SONET path data to the NMS server. The NMS server uses this data to fill in a SONET path table (e.g., 600', FIGS. 11*w* and 60*g*) in configuration database 42. A new row is added to the SONET path table for each newly configured SONET path, and data in existing rows are modified for modified SONET paths.

In addition, the NMS server searches a Managed Resource Group table 1008 (FIGS. 11L and 11*w*) within the configuration database for a match with each assigned group name. If no match is found for a group name, indicating the group name represents a new group, then the NMS server adds a row to the Managed Resource Group table, and the NMS server assigns the group an LID (e.g., 1145) and inserts the LID into an LID column 1008*a*. The NMS server also inserts the Managed Device PID (e.g., 1) from column 983*b* in Managed Device table 983 (FIGS. 11*w* and 60*a*) in the configuration database into a column 1008*b* and inserts the group name in column 1008*c*.

The NMS server also uses the SONET path data from the NMS client to add a row in a Managed Resource Table 1007 (FIGS. 11*m* and 11*w*) in configuration database 42 for each newly configured SONET path or to modify data in existing rows for modified SONET paths. The NMS server assigns an LID (e.g., 4443) to each row and inserts the assigned LID into a column 1007*a*. The NMS server then inserts the assigned SONET path LID (e.g., 901) from Path LID column 600*a* (FIG. 60*g*) in the SONET path table into a Resource LID column 1007*b*. The NMS server also inserts the assigned group LID (e.g., 1145) from column 1008*a* in Managed Resource Group table 1008 (FIG. 11L) into a managed resource group LID column 1007*c*.

Figure 11N:
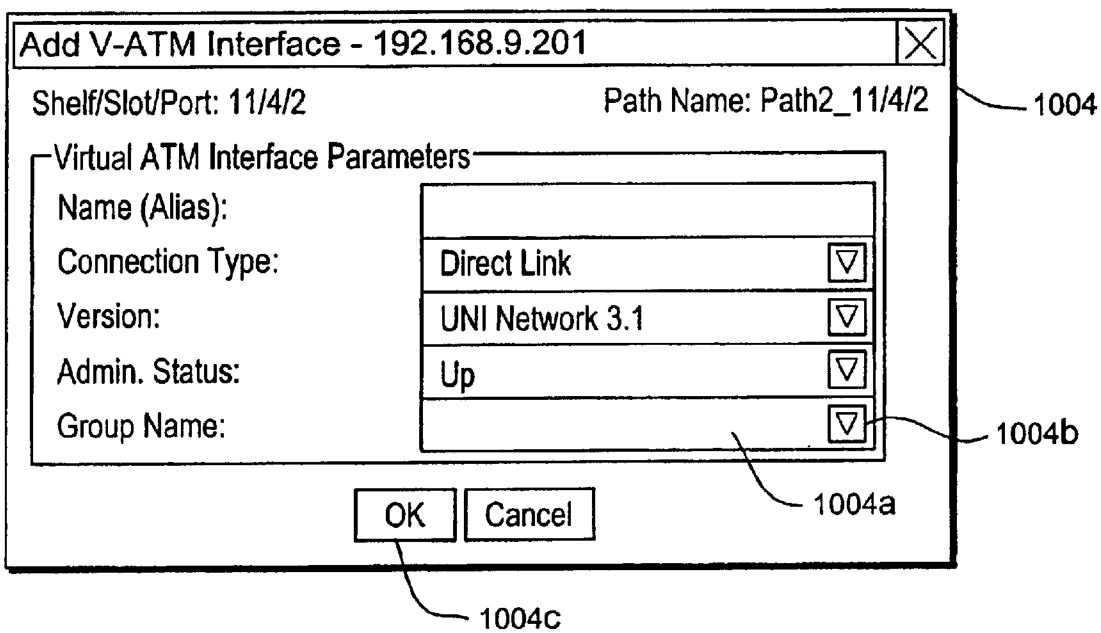
Figure 11O:
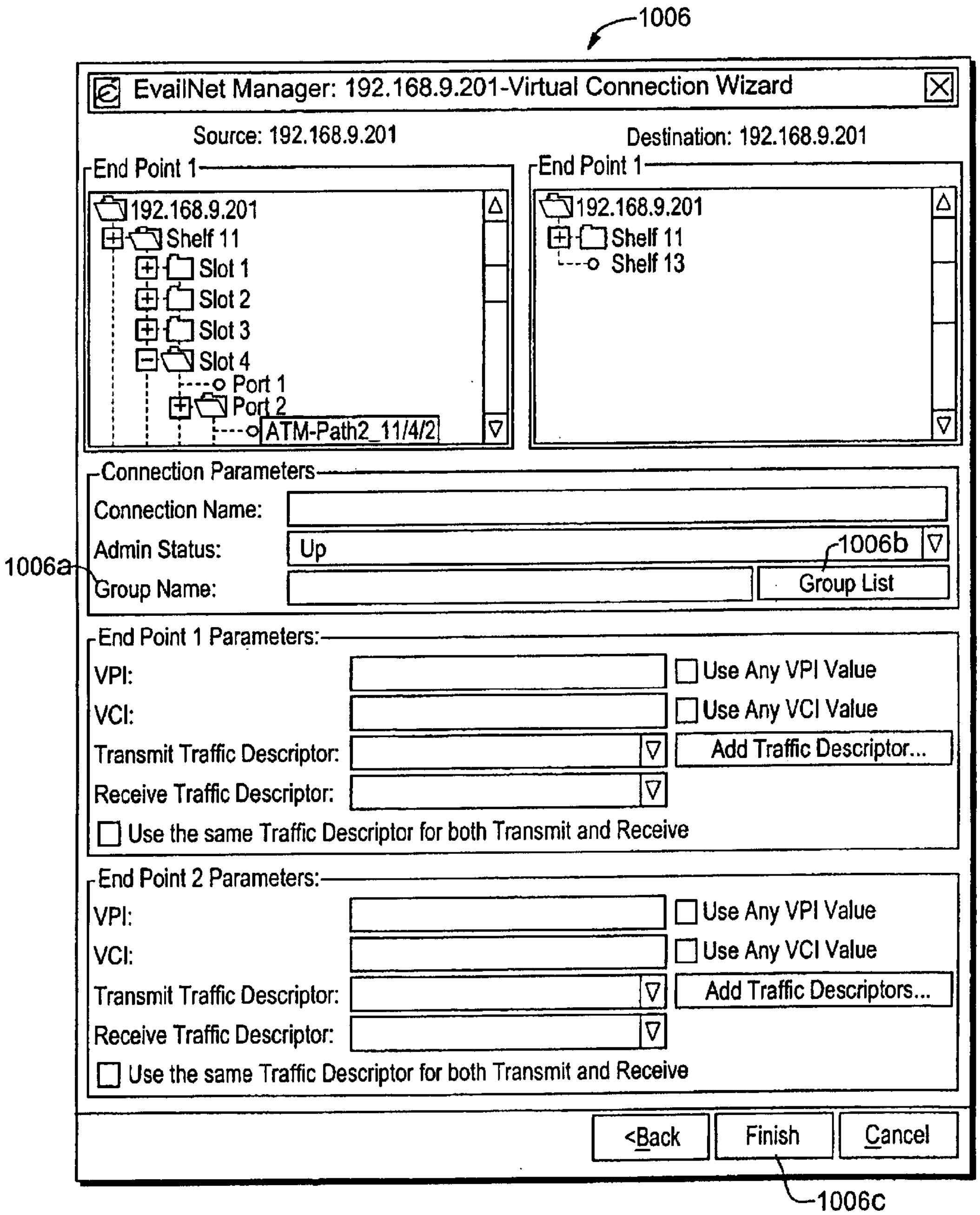
Figure 11S:
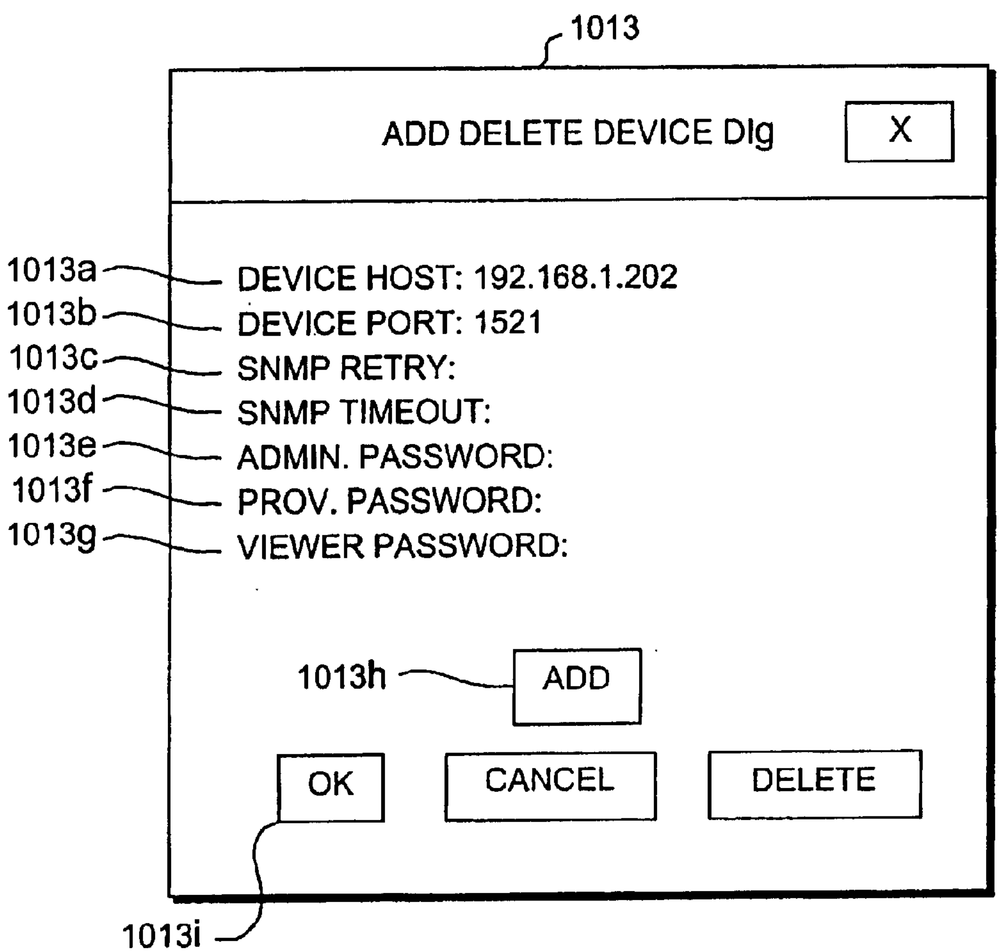

Just as each SONET path may be assigned to a group, each other type of configured resource/manageable entity within the network device may be assigned to a group. For example, when an administrator or provisioner configures a virtual ATM (VATM) interface, they may also assign the VATM interface to a group. Referring to FIG. 11*n,* within an Add V-ATM Interface dialog box 1004, an administrator or provisioner may type in a group name in a field 1004*a* or select a group name from a pop-up menu displayed when expansion button 1004*b* is selected. As another example, when an administrator or provisioner configures an ATM PVC, they may assign the ATM PVC to a particular group. Referring to FIG. 11*o,* in a virtual connection wizard 1006, the administrator or provisioner may assign an ATM PVC to a group by typing in a group name in a field 1006*a* or by selecting a group name from a pop-up menu displayed when expansion button (e.g., Group List) 1006*b* is selected. Again, when the administrator or provisioner selects OK button

1004c (FIG. 11n) or Finish button 1006c (FIG. 11o), the NMS client sends the relevant data to the NMS server. The NMS server updates Virtual ATM Interface table 993 (FIG. 60j), a Virtual Connection table 994 (FIG. 60k), Virtual Link table 995 (FIG. 60L) and Cross-Connect table 996 (FIG. 60m), as described below, and similar to the actions taken for the configured SONET paths, the NMS server adds a row to Managed Resource Group table 1008 (FIG. 11L) for each new group and a row to Managed Resource table 1007 (FIG. 11m) for each new managed resource—that is, for each new VATM interface and for each new ATM PVC. This same process may be used to add any manageable entity to a group.

Instead of using a Managed Resource Group table and a Managed Resource table, the configured network device resource tables (e.g., SONET path table, Virtual ATM IF table, etc.) could include a group name field. However, the Managed Resource Group adds a layer of abstraction, which may allow each configured resource to belong to multiple groups. Moreover, the Managed Resource table provides scalability and modularity by not being tied to a particular resource type. That is, the Managed Resource table will include a row for each different type of configured resource and if the network device is upgraded to include new types of configurable resources, they too may be added to the Managed Resource table without having to upgrade other processes. If each configurable resource is limited to belonging to only one group, then the Managed Resource Table 1007 (FIG. 11m) may include only Resource LID 1007b and not LID 1007a.

Referring again to FIGS. 11b–11g, after adding or changing a user profile, the administrator or provisioner selects OK button 908t. Selection of the OK button causes the NMS client (e.g., NMS client 850a, FIG. 11w) to send the information provided in the dialog box (or boxes) to an NMS server (e.g., NMS server 851a), and the NMS server uses the received information to update various tables in NMS database 61. In one embodiment, for a newly added user, the NMS server assigns a unique logical identification number (LID) to the user and adds a new row in a User table 1010 (FIGS. 11p and 11w) in the NMS database including the assigned LID 1010a and the username 1010b, password 1010c and group access level 1010d provided by the NMS client. For example, the NMS server may add a new row 1010e including an assigned user LID of 2012, a username of Dave, a password of Marble and a group access level of provisioner.

The NMS server also adds a row to a User Managed Device table 1012 (FIGS. 11q and 11w) for each network device listed in the user profile. For each row, the NMS server assigns a user managed device LID (e.g., 7892) and inserts it in an LID column 1012a. The NMS server also inserts a user LID 1012b, a host LID 1012c, a retry value 1012d and a timeout value 1012e. The inserted retry and timeout values are from the user profile information sent from the NMS client. The user LID 1012b includes the previously assigned user LID (e.g., 2012) from column 1010a of User Table 1010. The host LID is retrieved from an Administration Managed Device table 1014 (FIGS. 11r and 11w).

The Administration Managed Device table includes a row for each network device (i.e., managed device) in the telecommunications network. To add a network device to the network, an administrator selects an Add Device option in a pop-up menu 898c (FIG. 6a) in GUI 895 to cause dialog box 1013 (FIG. 11s) to be displayed. The administrator enters the intended IP address or DNS name (e.g., 192.168.9.202) of the new network device into a device host field 1013a and may also enter a device port (e.g., 1521) into a device port field 1013b. The administrator also adds SNMP retry 1013c and timeout 1013d values, which may be overridden later by values supplied within each user profile. In addition, the administrator adds a password for each user access level. In one embodiment, the administrator adds an administrator password 1013e, a provisioner password 1013f and a viewer password 1013g for the managed device.

The Administration Managed Device table, therefore, provides a centralized set of device records shared by all NMS servers, and since the records are centralized, the Administration Managed Device table facilitates centralized changes to the devices in the network. For example, a network device may be added to the network by adding a record and removed from the network by deleting a record. As another example, a network device's parameters (e.g., IP address) may be changed by modifying data in a record. Because the changes are made to centralized records accessed by all NMS servers, no change notifications need to be sent and the NMS servers may automatically receive the changed data during the next access of the table. Alternatively, the NMS server that makes a change to the central database may send notices out to each connected NMS client and other NMS servers in the network.

For newly added devices, after the information is input in the dialog box, the administrator selects an Add button 1013h causing the NMS client to send the data from the dialog box to the NMS server. Similarly, for changes to device data, after the information is changed in the dialog box, the administrator selects an OK button 1013i to cause the NMS client to send the data from the dialog box to the NMS server. For new devices, the NMS server uses the received information to add a row to Administration Managed Device table 1014 in NMS database 61, and for existing devices, the NMS server uses the received information to update a previously entered row in the Administration Managed Device table. For each managed device/row, the NMS server assigns a host LID (e.g., 9046) and inserts it in LID column 1014a.

When the NMS server adds a new row to the User Managed Device table 1012 (FIG. 11q), corresponding to a managed device in a user profile, the NMS server searches column 1014b in the Administration Managed Device table 1014 for a host address matching the IP address (e.g., 192.168.9.202) provided in the user profile information sent from the NMS client. When a match is found, the NMS server retrieves the host LID (e.g., 9046) from column 1014a and inserts it in host LID column 1012c in the User Managed Device table.

After receiving user profile information from an NMS client, the NMS server also updates a User Resource Group Map table 1016 (FIGS. 11t and 11w) in NMS database 61. For each group identified in the user profile information—one or more groups may be selected in each Group List dialog box 1000 associated with each network device in the user profile—the NMS server adds a row to the User Resource Group Map table. The NMS server assigns an LID (e.g., 8086) for each row and inserts the LID in a column 1016a. The NMS server then inserts the User LID (e.g., 2012) into User LID column 1016b from User table 1010 column 1010a corresponding to the user profile. In addition, the NMS server inserts a User Resource Group LID into column 1016c.

For each group name received by the NMS server, the NMS server searches a User Resource Group table 1018 (FIGS. 11u and 11w), group name column 1018c, for a match. If a match is not found, then the group is a new group, and the NMS server adds a row to the User Resource Group table. The NMS server assigns an LID (e.g., 1024) to each row and inserts the assigned LID into an LID column 1018*a*. This User Resource Group LID is also added to column 1016*c* in the User Resource Group Map table 1016 (FIG. 11*t*). Within the User Resource Group table 1018 (FIG. 11*u*), the NMS server also inserts the network device's host LID in a column 1018*b* from Administration Managed Device table 1014 (FIG. 11*r*), column 1014*a*, and the NMS server inserts the group name (e.g., Walmart-East) in column 1018*c*. Through the group name, the User Resource Group table in the NMS database provides for dynamic binding with the Managed Resource Group table 1008 (FIG. 11L) in the configuration database, as described below.

After a user's profile is created, the user may log in through an NMS client (e.g., 850*a*, FIG. 11*w*) by typing in their username and password. The NMS client then sends the username and password to an NMS server (e.g., 851*a*), and in response, the NMS server sends a query to NMS database 61 to search User table 1010 (FIG. 11*p*) column 1010*b* for a username matching the username provided by the NMS client. If the username is not found, then the user is denied access. If the username is found, then, for additional security, the NMS server may compare the password provided by the NMS client to the password stored in column 1010*c* of the User table. If the passwords do not match, then the user is denied access. If the passwords match, then the NMS server creates a user profile logical managed object (LMO).

In one embodiment, the user profile LMO is a JAVA object and a JAVA persistence layer within the NMS server creates the user profile LMO. For each persistent JAVA class/object, metadata is stored in a class table 1020 (FIG. 11*w*) within the NMS database. Thus, the JAVA persistence layer within the NMS server begins by retrieving metadata from the class table in the NMS database corresponding to the user profile LMO. The metadata may include simple attributes and association attributes.

Figure 11V:
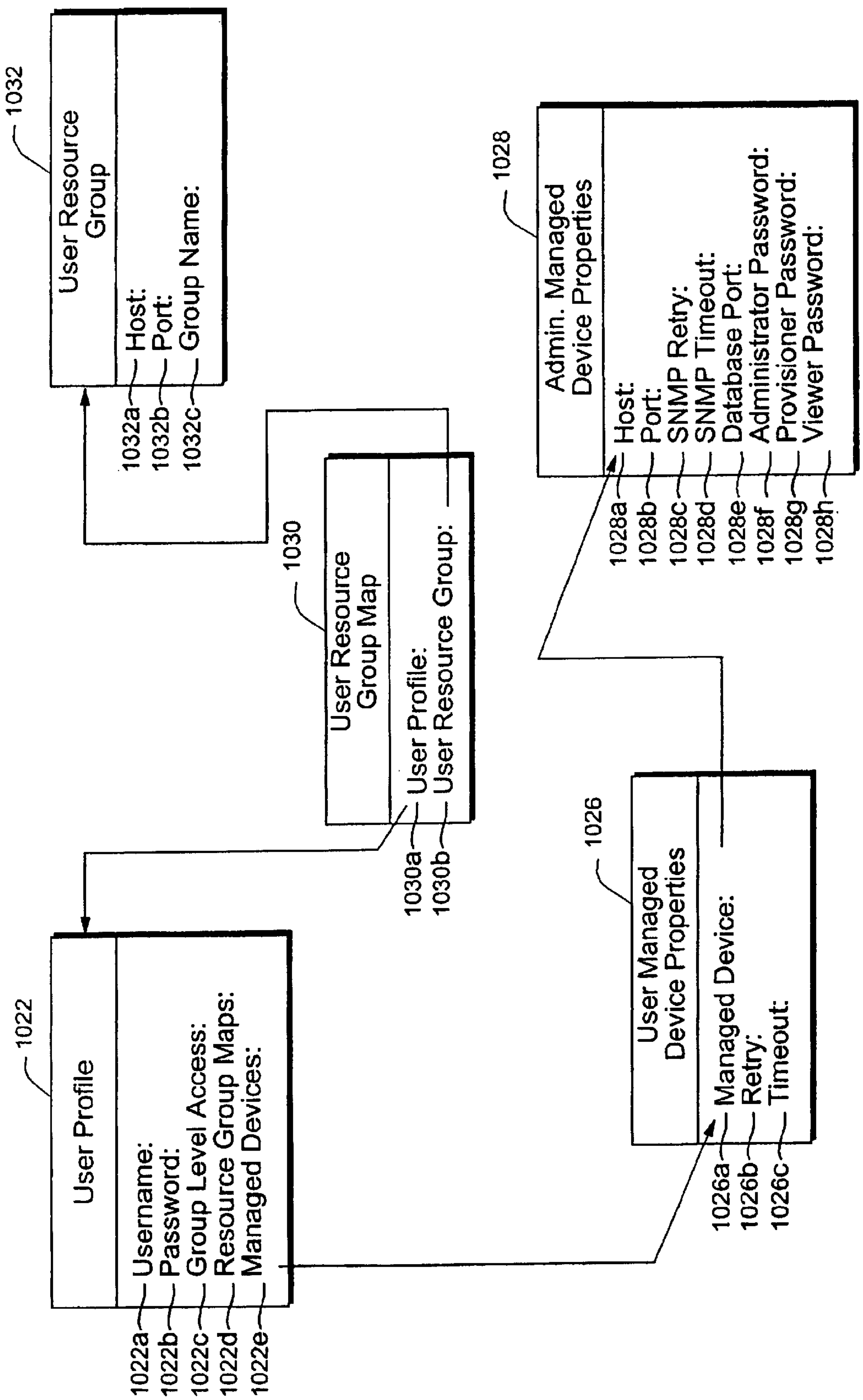
FIG. 11*v* is a block and flow diagram representing the creation of a user profile logical managed object including one or more groups.
Figure 11W:
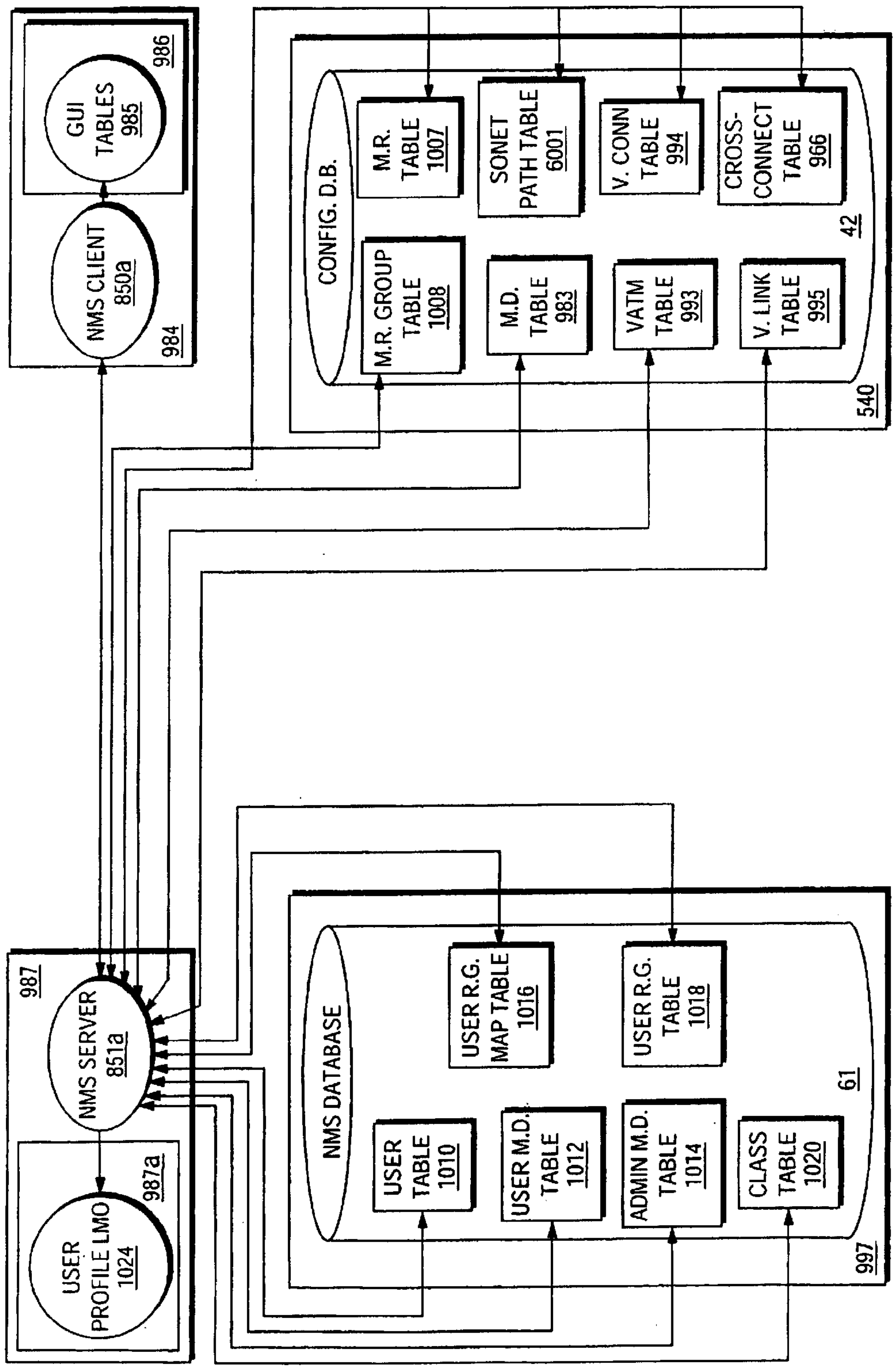
FIG. 11*w* is a block and flow diagram of a network management system implementing user profiles and groups across multiple databases.
Figure 11X:
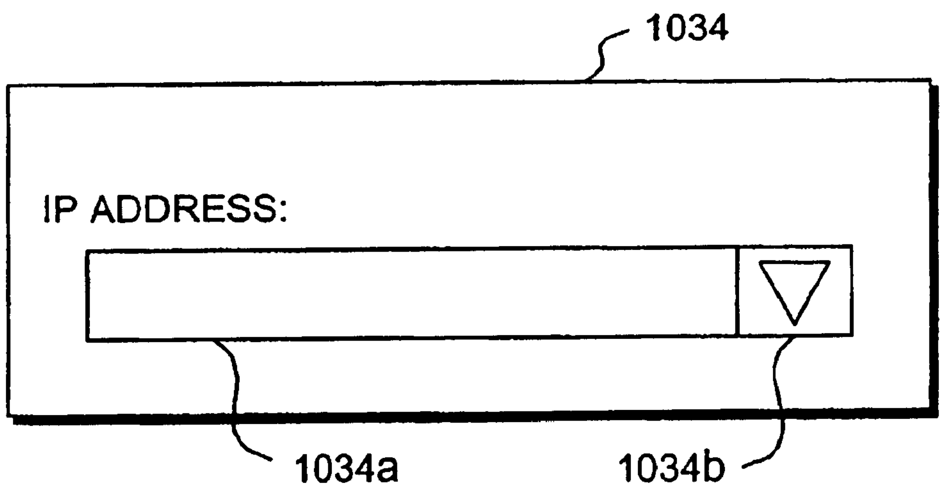

Referring to FIG. 11*v*, the metadata for a user profile LMO 1022 includes three simple attributes—username 1022*a*, password 1022*b* and group access level 1022*c* —and two association attributes—resource group maps 1022*d* and managed devices 1022*e*. The NMS server inserts the username (e.g., Dave), password (e.g., Marble) and group access level (e.g., provisioner) retrieved from the User table 1010 into the user profile LMO 1024 (FIG. 11*w*) being created. The managed devices association attribute 1022*e* causes the NMS server to create a user managed device properties LMO 1026 for each network device in the user's profile.

The NMS server first retrieves metadata from class table 1020 associated with the user managed device properties LMO 1026. The metadata includes two simple attributes (retry 1026*b* and timeout 1026*c*) and one association attribute (managed device 1026*a*). The metadata causes the NMS server to search User Managed Device table 1012 (FIG. 11*q*) column 1012*b* for a user LID (e.g., 2012) corresponding to the user LID in column 1010*a* (FIG. 11*p*) of User table 1010 in a row 1010*e* associated with the username and password received from the NMS client. For each row in the User Managed Device table having the matching user LID (e.g., 2012), the NMS server creates a user managed device properties LMO 1026 and inserts the retry value from column 1012*d* as the retry simple attribute 1026*b* and the timeout value from column 1012*e* as the timeout simple attribute 1026*c*.

In response to the managed device associated attribute, the NMS server retrieves metadata from class table 1020 associated with administration managed device properties LMO 1028. The metadata includes a list of simple attributes including host address 1028*a*, port address 1028*b*, SNMP retry value 1028*c*, SNMP timeout value 1028*d* and a database port address 1028*e* for connecting to the configuration database within the network device. The metadata also includes simple attributes corresponding to passwords for each of the possible group access levels, for example, an administrator password 1028*f*, a provisioner password 1028*g* and a viewer password 1028*h*.

The NMS server uses the host LID (e.g., 9046) from column 1012*c* in the User Managed Device table (FIG. 11*q*) as a primary key to locate the row (e.g., 1014*c*, FIG. 11*r*) in the Administration Managed Device table 1014 corresponding to the network device. The NMS server uses the data in this table row to insert values for the simple attributes in the Administration Managed Device LMO 1028. For example, a host address of 192.168.9.202 and a port address of 1521 may be inserted. The NMS server also selects a password corresponding to the user's group access level. For instance, if the user's group access level is provisioner, then the NMS server inserts the provisioner password of, for example, team2, from column 1014*d* into the Administration Managed Device LMO.

The NMS server then inserts the newly created Administration Managed Device LMO 1028 into the corresponding User Managed Device Properties LMO 1026, and the NMS server also inserts each newly created User Managed Devices Properties LMO 1026 into User Profile LMO 1022. Thus, the information necessary for connecting to each network device listed in the user profile is made available within user LMO 1022.

The resource group maps association attribute 1022*d* (FIG. 11*v*) within user LMO 1022 causes the NMS server to create a user resource group map LMO 1030 for each group in the user's profile. The user resource group map LMO 1030 includes one simple attribute—user profile 1030*a* —and one association attribute—user resource group 1030*b*. The NMS server inserts the user LID (e.g., 2012) corresponding to the user LID in column 1010*a* (FIG. 11*p*) in User table 1010 associated with the username, password and group access level received from the NMS client.

In response to user resource group associated attribute 1030*b*, the NMS server creates a User Resource Group LMO 1032. The NMS server begins by retrieving metadata from class table 1020 corresponding to the User Resource Group LMO. The metadata includes three simple attributes: host address 1032*a*, port address 1032*b* and group name 1032*c*. The NMS server searches User Resource Group Map table 1016 (FIG. 11*t*) for the user LID (e.g., 2012) corresponding to the username and password received from the NMS client. The NMS server then uses the corresponding user resource group LID (e.g., 1024) from column 1016*c* as a primary key to locate a row (e.g., 1018*d*, FIG. 11*u*) in User Resource Group table 1018. The NMS server inserts the group name (e.g., Walmart-East) from the located row in User Resource Group table 1018 as simple attribute 1032*c* in user resource group LMO 1032. The NMS server then uses the host LID (e.g., 9046) from the located row to search column 1014*a* in the Administration Managed Device table 1014 (FIG. 11*r*) for a match. Once a match is found, the NMS server uses data in the located row (e.g., 1014*c*) to insert the host address (e.g., 192.168.9.202) from column 1014*b* as simple attribute 1032*a* and the port address (e.g., 1521) from column 1014*e* as simple attribute 1032*b* in user resource group LMO 1032. The NMS server then inserts the user resource group LMO 1032 into the user resource group map LMO 1030, and the NMS server inserts each of the user resource group map LMOs 1030 into the user profile LMO 1022. Thus, the data (e.g., host and port address and group name) required to locate each group included in the user profile is inserted within user profile LMO 1022. The NMS server sends data from the user profile LMO to the NMS client to allow the NMS client to present the user with a graphical user interface such as GUI 895 shown in FIG. 4*a*. If the user selects one of the network devices listed in navigation tree 898, the NMS server retrieves the group level access (e.g., provisioner) and the password (e.g., team2) corresponding to that group level access from the user profile LMO and then connects to the selected network device. The NMS server then retrieves the network device's physical data as described below under the heading "NMS Server Scalability."

Alternatively, a more robust set of data may be sent from the NMS server to the NMS client such that for each transaction issued by the NMS client, the data provided with the transaction eliminates the need for the NMS server to access the user profile LMO in its local memory. This reduces the workload of the NMS server, which will likely be sent transactions from many NMS clients. In one embodiment, the NMS server may send the NMS client the entire user profile LMO. Instead, the server may create a separate client user profile LMO that may present the data in a format expected by the NMS client and perhaps include only some of the data from the user profile LMO stored locally to the NMS server. In the preferred embodiment, the client user profile LMO includes at least data corresponding to each device in the user profile and each group selected within the user profile for each device. If the user selects one of the network devices listed in navigation tree 898, the NMS client includes the selected network device's IP address, the password corresponding to the user's group access level and the database port number in the "Get Network Device" transaction sent to the NMS server. The NMS server uses this information to connect to the network device and return the network device's physical data to the NMS client.

If the user selects a tab in configuration status window 897 that includes logical data corresponding to configured network device resources (e.g., SONET Paths tab 942 (FIG. 5*q*), ATM Interfaces tab 946 (FIG. 5*r*), Virtual ATM Interfaces tab 947 (FIG. 5*s*), Virtual Connections tab 948 (FIG. 5*z*)), then the NMS server searches the user profile LMO for group names corresponding to the selected network device or the NMS client provides the group names in the transaction. The NMS server then retrieves data from the selected network device for configured resources corresponding to each group name and the selected tab. If no group names are listed, the NMS server may retrieve data for all configured resources corresponding to the selected tab.

For example, if a user selects SONET Paths tab 942 (FIG. 5*q*), then the NMS server searches the user profile LMO for all group names corresponding to the selected network device (e.g., Walmart-East) or the NMS client provides all group names (e.g., Walmart-East) corresponding to the selected network device to the NMS server as part of the "Get SONET paths" transaction. The NMS server then dynamically issues a where clause such as "where SONET path is in group Walmart-East". This causes group name column 1008*c* in the Managed Resource Group table 1008 (FIG. 11L) in the network device's configuration database 42 to be searched for a match with the group name of Walmart-East. Additional where clauses may be dynamically issued corresponding to other group names found in the user profile LMO. If no match is found for a group name in column 1008*c*, then the NMS server simply returns an empty set to the NMS client. If a match is found for a group name (e.g., Walmart-East), then the NMS server retrieves the managed resource group LID (e.g., 1145) from column 1008*a* in the same row (e.g., row 1008*d*) as the matching group name.

The NMS server then searches column 1007*c* in the Managed Resource table 1007 (FIG. 11*m*) for one or more matches with the retrieved managed resource group LID (e.g., 1145). As described above, the Managed Resource Table includes one row for each configured network device resource in a particular group. For each match found for the retrieved managed resource group LID (e.g., 1145), the NMS server uses the resource LID (e.g., 901) from column 1007*b* as a primary key to a row in a table including the data corresponding to the configured resource. In this example, a resource LID of 901 corresponds to a row in SONET Path Table 600' (FIG. 60*g*). Since the user selected the SONET Paths tab, the NMS server retrieves the data in the corresponding row and sends it to the NMS client. The NMS client uses the data to update graphical user interface (GUI) tables 985 in local memory 986, which causes GUI 895 to display the SONET path to the user. Other SONET paths may also be included in the group Walmart-East, and those would be similarly located and retrieved by the NMS server and sent to the NMS client for display to the user.

Figure 5Z:
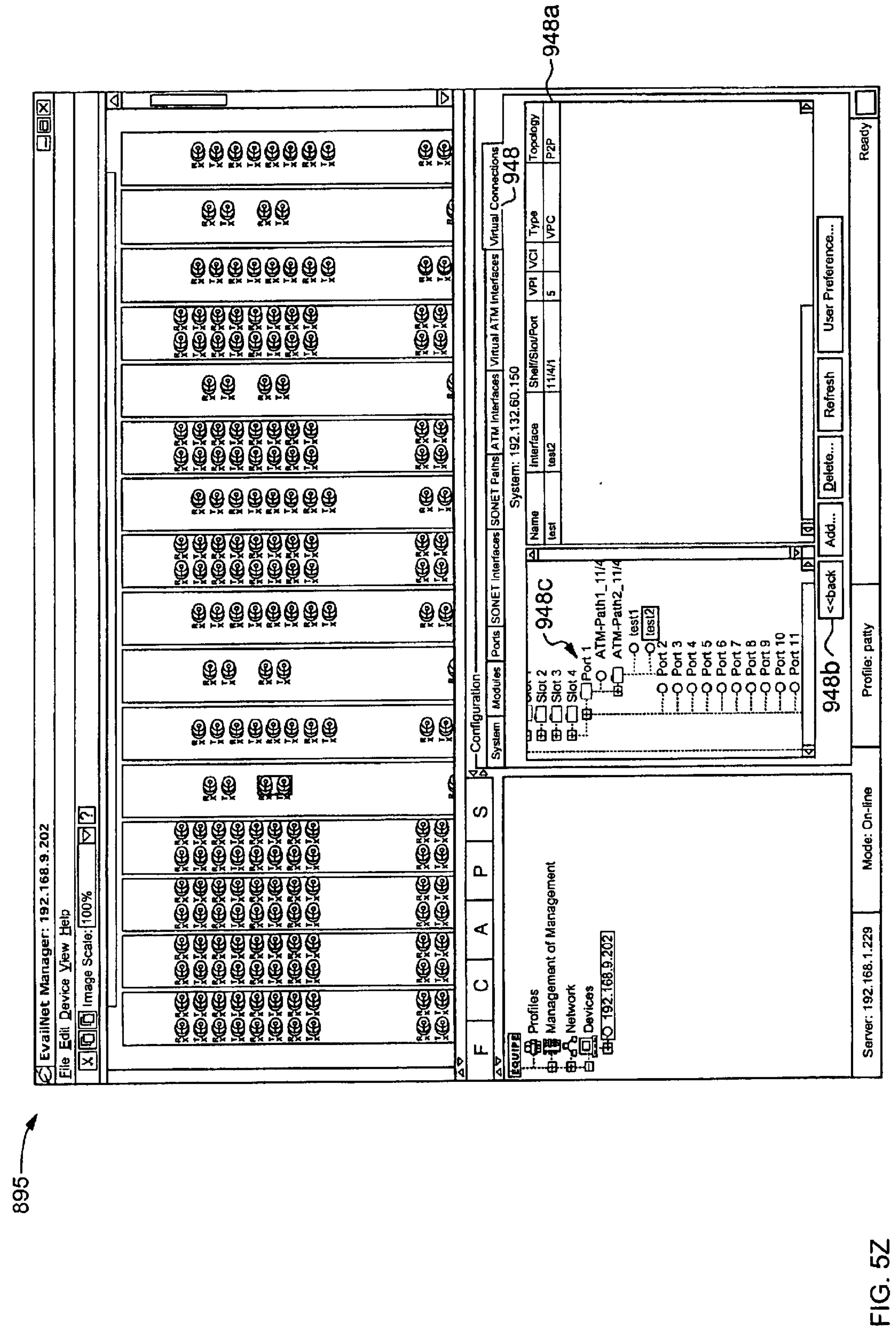

Since each group may include different types of configured resources, the NMS server may locate configured resources other than SONET paths, for example, VATMs or ATM PVCs, in Managed Resource table 1007. If configured resources are found that do not correspond to the tab selected by the user, the NMS server does not retrieve the associated data or send it to the NMS client. The NMS server follows a similar process if the user selects another tab including logical data, for example, ATM Interfaces tab 946 (FIG. 5*r*), Virtual ATM Interfaces tab 947 (FIG. 5*s*) or Virtual Connections tab 948 (FIG. 5*z*). Although the above discussion has used SONET paths, VATM interfaces and ATM PVCs as examples of configurable resources that may be included in a group, other configurable resources may also be included, for example, configurable resources corresponding to different layer one or upper layer network protocols (e.g., Ethernet, MPLS, Frame Relay, IP).

When data is stored in tables within the same database, references from one table to another may provide a direct binding and referential integrity may be maintained by only deleting the upper most record—that is, not leaving any dangling records. Referential integrity prevents references from being orphaned, which may lead to data loss or other more severe problems, such as a system crash. In the current embodiment, tables are stored across multiple databases. Certain tables are stored in NMS database 61 and certain other tables are stored in the configuration database within each network device in the network. Direct binding between tables cannot be maintained since a database may be removed or a record deleted without maintaining referential integrity. To address this issue, group names are used to provide a "dynamic binding" between the User Resource Group table 1018 (FIG. 11*u*) in the NMS database and the Managed Resource Group table 1008 (FIG. 11L) in each configuration database. Since there is no direct binding, if a group name is not found in the Managed Resource Group table, the NMS server simply returns an empty set and no data is lost or other more serious problems caused. If the group name is later added to the Managed Resource Group table, then through dynamic binding, it will be found.

Through a user profile, a user may log-on to the network with a single, secure username and password through any NMS client, access any network device in their user profile and access configured resources corresponding to groups in their user profile. Since the tables including the data necessary for the creation of user profile LMOs are stored in the NMS database, any NMS server capable of connecting to the NMS database—that is, any NMS server in the network—may access the tables and generate a user LMO. As a result, users may log-on with a single, secure username and password through any NMS client that may be connected to an NMS server capable of connecting to the NMS database. Essentially, users may log on through any computer system/workstation (e.g., 984, FIG. 11*w*) on which an NMS client is loaded or remotely through internet web access to an NMS client within the network and gain access to the network devices listed in their user profile. Thus, each user need only remember a single username and password to configure/manage any of the network devices listed in their user profile or any of the resources included within groups listed in their user profile through any NMS client in the network.

In addition, user profiles provide a level of indirection to better protect the passwords used to access each network device. For example, access to the passwords may be limited to only those users capable of adding network devices to the network, for example, users with the administrator group access level. Other users would not see the passwords since they are automatically added to their user profile LMO, which is not accessible by users. The level of indirection provided by user profiles also allows network device passwords to be easily changed across the entire network. Periodically the passwords for access to the network devices in a network may be changed for security. The network device passwords may be quickly changed in the Administration Managed Device table 1014 (FIG. 11*r*), and due to the use of profiles, each user does not need to be notified of the password changes. The new passwords will be utilized automatically each time users log in. This provides for increased scalability since thousands of users will not need to be notified of the new passwords. Moreover, if a rogue user is identified, they can be quickly prevented from further access to the network through any NMS client by simply changing the user's username and/or password in the user's profile or by deleting the user's profile. Changing the username and/or password in the user profile would cause the NMS server to change the data in user table 1010 (FIG. 11*p*), and deleting a user profile would cause the NMS server to remove the corresponding row in the User table. In either case, the user would no longer be able to log in.

User profiles and group names also simplify network management tasks. For example, if an administrator adds a newly configured resource to a group, all users having access to that group will automatically be able to access the newly configured resource. The administrator need not send out a notice or take other steps to update each user.

Group names in a user profile define what the user can view. For instance, one customer may not view the configured resources subscribed for by another customer if their resources are assigned to different groups. Thus, groups allow for a granular way to "slice" up each network device according to its resources.

The user access level in a user profile determines how the NMS server behaves and affects what the user can do. For example, the viewer user access level provides the user with read-only capability and, thus, prevents the NMS server from modifying data in tables. In addition, the user access level may be used to restrict access—even read access—to certain tables or columns in certain tables.

Network Device Power-Up

Referring again to FIG. 1, on power-up, reset or reboot, the processor on each board (central processor and each line card) downloads and executes boot-strap code (i.e., minimal instances of the kernel software) and power-up diagnostic test code from its local memory subsystem. After passing the power-up tests, processor 24 on central processor 12 then downloads kernel software 20 from persistent storage 21 into non-persistent memory in memory subsystem 28. Kernel software 20 includes operating system (OS), system services (SS) and modular system services (MSS).

In one embodiment, the operating system software and system services software are the OSE operating system and system services from Enea OSE Systems, Inc. in Dallas, Tex. The OSE operating system is a pre-emptive multitasking operating system that provides a set of services that together support the development of distributed applications (i.e., dynamic loading). The OSE approach uses a layered architecture that builds a high level set of services around kernel primitives. The operating system, system services, and modular system services provide support for the creation and management of processes; inter-process communication (IPC) through a process-to-process messaging model; standard semaphore creation and manipulation services; the ability to locate and communicate with a process regardless of its location in the system; the ability to determine when another process has terminated; and the ability to locate the provider of a service by name.

These services support the construction of a distributed system wherein applications can be located by name and processes can use a single form of communication regardless of their location. By using these services, distributed applications may be designed to allow services to transparently move from one location to another such as during a fail over.

The OSE operating system and system services provide a single inter-process communications mechanism that allows processes to communicate regardless of their location in the system. OSE IPC differs from the traditional LPC model in that there are no explicit IPC queues to be managed by the application. Instead each process is assigned a unique process identification that all IPC messages use. Because OSE IPC supports inter-board communication the process identification includes a path component. Processes locate each other by performing an OSE Hunt call on the process identification. The Hunt call will return the Process ID of the process that maps to the specified path/name. Inter-board communication is carried over some number of communication links. Each link interface is assigned to an OSE Link Handler. The path component of a process path/name is the concatenation of the Link Handler names that one must transverse in order to reach the process.

In addition, the OSE operating system includes memory management that supports a "protected memory model". The protected memory model dedicates a memory block (i.e., defined memory space) to each process and erects "walls" around each memory block to prevent access by processes outside the "wall". This prevents one process from corrupting the memory space used by another process. For example, a corrupt software memory pointer in a first process may incorrectly point to the memory space of a second processor and cause the first process to corrupt the second processor's memory space. The protected memory model prevents the first process with the corrupted memory pointer from corrupting the memory space or block assigned to the second process. As a result, if a process fails, only the memory block assigned to that process is assumed corrupted while the remaining memory space is considered uncorrupted.

The modular software architecture takes advantage of the isolation provided to each process (e.g., device driver or application) by the protected memory model. Because each process is assigned a unique or separate protected memory block, processes may be started, upgraded or restarted independently of other processes.

Figure 12A:
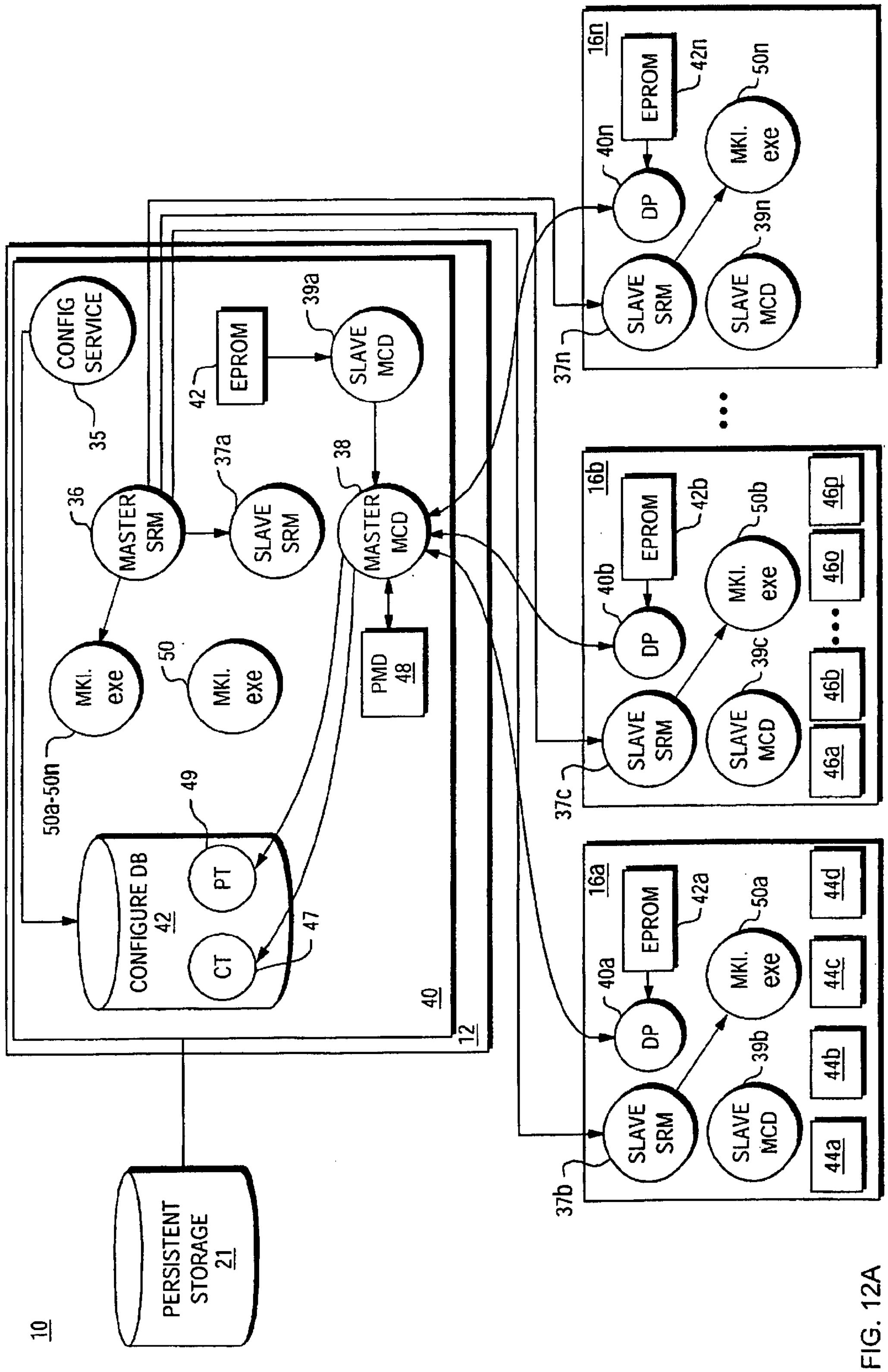
FIGS. 12*a* and 13*a* are block and flow diagrams of a computer system incorporating a modular system architecture and illustrating a method for accomplishing hardware inventory and setup.

Referring to FIG. 12*a,* the main modular system service that controls the operation of computer system 10 is a System Resiliency Manager (SRM). Also within modular system services is a Master Control Driver (MCD) that learns the physical characteristics of the particular computer system on which it is running, in this instance, computer system 10. The MCD and the SRM are distributed applications. A master SRM 36 and a master MCD 38 are executed by central processor 12 while slave SRMs 37*a*–37*n* and slave MCDs 39*a*–39*n* are executed on each board (central processor 12 and each line card 16*a*–16*n*). The SRM and MCD work together and use their assigned view ids and APIs to load the appropriate software drivers on each board and to configure computer system 10.

Also within the modular system services is a configuration service program 35 that downloads a configuration database program 42 and its corresponding DDL file from persistent storage into non-persistent memory 40 on central processor 12. In one embodiment, configuration database 42 is a Polyhedra database from Polyhedra, Inc. in the United Kingdom.

Hardware Inventory and Set-Up

Master MCD 38 begins by taking a physical inventory of computer system 10 (over the $I^2C$ bus) and assigning a unique physical identification number (PID) to each item. Despite the name, the PID is a logical number unrelated to any physical aspect of the component being numbered. In one embodiment, pull-down/pull-up resistors on the chassis mid-plane provide the number space of Slot Identifiers. The master MCD may read a register for each slot that allows it to get the bit pattern produced by these resistors. MCD 38 assigns a unique PID to the chassis, each shelf in the chassis, each slot in each shelf, each line card 16*a*–16*n* inserted in each slot, and each port on each line card. (Other items or components may also be inventoried.)

Typically, the number of line cards and ports on each line card in a computer system is variable but the number of chassis, shelves and slots is fixed. Consequently, a PID could be permanently assigned to the chassis, shelves and slots and stored in a file. To add flexibility, however, MCD 38 assigns a PID even to the chassis, shelves and slots to allow the modular software architecture to be ported to another computer system with a different physical construction (i.e., multiple chassis and/or a different number of shelves and slots) without having to change the PID numbering scheme.

Referring to FIGS. 12*a*–12*c,* for each line card 16*a*–16*n* in computer system 10, MCD 38 communicates with a diagnostic program (DP) 40*a*–40*n* being executed by the line card's processor to learn each card's type and version. The diagnostic program reads a line card type and version number out of persistent storage, for example, EPROM 42*a*–42*n,* and passes this information to the MCD. For example, line cards 16*a* and 16*b* could be cards that implement Asynchronous Transfer Mode (ATM) protocol over Synchronous Optical Network (SONET) protocol as indicated by a particular card type, e.g., 0XF002, and line card 16*e* could be a card that implements Internet Protocol (IP) over SONET as indicated by a different card type, e.g., 0XE002. In addition, line card 16*a* could be a version three ATM over SONET card meaning that it includes four SONET ports 44*a*–44*d* each of which may be connected to an external SONET optical fiber that carries an OC-48 stream, as indicated by a particular port type 00620, while line card 16*b* may be a version four ATM over SONET card meaning that it includes sixteen SONET ports 46*a*–46*f* each of which carries an OC-3 stream as indicated by a particular port type, e.g., 00820. Other information is also passed to the MCD by the DP, for example, diagnostic test pass/fail status. With this information, MCD 38 creates card table (CT) 47 and port table (PT) 49 in configuration database 42. As described below, the configuration database copies all changes to an NMS database. If the MCD cannot communicate with the diagnostic program to learn the card type and version number, then the MCD assumes the slot is empty.

Even after initial power-up, master MCD 38 will continue to take physical inventories to determine if hardware has been added or removed from computer system 10. For example, line cards may be added to empty slots or removed from slots. When changes are detected, master MCD 38 will update CT 47 and PT 49 accordingly.

For each line card 16*a*–16*n,* master MCD 38 searches a physical module description (PMD) file 48 in memory 40 for a record that matches the card type and version number retrieved from that line card. The PMD file may include multiple files. The PMD file includes a table that corresponds card type and version number with name of the mission kernel image executable file (MKI.exe) that needs to be loaded on that line card. Once determined, master MCD 38 passes the name of each MKI executable file to master SRM 36. Master SRM 36 requests a bootserver (not shown) to download the MKI executable files 50*a*–50*n* from persistent storage 21 into memory 40 (i.e., dynamic loading) and passes each MKI executable file 50*a*–50*n* to a bootloader (not shown) running on each board (central processor and each line card). The bootloaders execute the received MKI executable file.

Once all the line cards are executing the appropriate MKI, slave MCDs 39*a*–39*n* and slave SRMs 37*a*–37*n* on each line card need to download device driver software corresponding to the particular devices on each card. Referring to FIG. 13*a,* slave MCDs 39*a*–39*n* search PMD file 48 in memory 40 on central processor 12 for a match with their line card type and version number. Just as the master MCD 36 found the name of the MKI executable file for each line card in the PMD file, each slave MCD 39*a*–39*n* reads the PMD file to learn the names of all the device driver executable files associated with each line card type and version. The slave MCDs provide these names to the slave SRMs on their boards. Slave SRMs 37*a*–37*n* then download and execute the device driver executable files (DD.exe) 56*a*–56*n* from memory 40. As one example, one port device driver 43*a*–43*d* may be started for each port 44*a*–44*d* on line card 16*a*. The port driver and port are linked together through the assigned port PID number.

In order to understand the significance of the PMD file (i.e., metadata), note that the MCD software does not have knowledge of board types built into it. Instead, the MCD parameterizes its operations on a particular board by looking up the card type and version number in the PMD file and acting accordingly. Consequently, the MCD software does not need to be modified, rebuilt, tested and distributed with new hardware. The changes required in the software system infrastructure to support new hardware are simpler, modify logical model 280 (FIG. 3*a*) to include: a new entry in the PMD file (or a new PMD file) and, where necessary, new device drivers and applications. Because the MCD software, which resides in the kernel, will not need to be modified, the new applications and device drivers and the new DDL files (reflecting the new PMD file) for the configuration database and NMS database are downloaded and upgraded (as described below) without re-booting the computer system (hot upgrade).

Network Management System (NMS)

Referring to FIG. 13*b*, as described above, a user/network administrator of computer system 10 works with network management system (NMS) software 60 to configure computer system 10. In the embodiment described below, NMS 60 runs on a personal computer or workstation 62 and communicates with central processor 12 over Ethernet network 41 (out-of-band). Instead, the NMS may communicate with central processor 12 over data path 34 (FIG. 1, in-band). Alternatively (or in addition as a back-up communication port), a user may communicate with computer system 10 through a console interface/terminal (840, FIG. 2*a*) connected to a serial line 66 connecting to the data or control path using a command line interface (CLI) protocol. Instead, NMS 60 could run directly on computer system 10 provided computer system 10 has an input mechanism for the user.

During installation, an NMS database 61 is established on, for example, work-station 62 using a DDL executable file corresponding to the NMS database. The DDL file may be downloaded from persistent storage 21 in computer system 10 or supplied separately with other NMS programs as part of an NMS installation kit. The NMS database mirrors the configuration database through an active query feature (described below). In one embodiment, the NMS database is an Oracle database from Oracle Corporation in Boston, Mass.

The NMS and central processor 12 pass control and data over Ethernet 41 using, for example, the Java Database Connectivity (JDBC) protocol. Use of the JDBC protocol allows the NMS to communicate with the configuration database in the same manner that it communicates with its own internal storage mechanisms, including the NMS database. Changes made to the configuration database are passed to the NMS database to ensure that both databases store the same data. This synchronization process is much more efficient, less error-prone and timely than older methods that require the NMS to periodically poll the network device to determine whether configuration changes have been made. In these systems, NMS polling is unnecessary and wasteful if the configuration has not been changed. Additionally, if a configuration change is made through some other means, for example, a command line interface, and not through the NMS, the NMS will not be updated until the next poll, and if the network device crashes prior to the NMS poll, then the configuration change will be lost. In computer system 10, however, command line interface changes made to configuration database 42 are passed immediately to the NMS database through the active query feature ensuring that the NMS, through both the configuration database and NMS database, is immediately aware of any configuration changes.

Asynchronously Providing Network Device Management Data

Typically, work-station 62 (FIG. 13*b*) is coupled to many network computer systems, and NMS 60 is used to configure and manage each of these systems. In addition to configuring each system, the NMS also interprets management data gathered by each system relevant to each system's network accounting data, statistics, security and fault logging (or some portion thereof) and presents this to the user. In current systems, two distributed carefully synchronized processes are used to move data from a network system/device to the NMS. The processes are synchronized with each other by having one or both processes maintain the state of the other process. To avoid the problems associated with using two synchronized processes, in the present invention, internal network device management subsystem processes are made asynchronous with external management processes. That is, neither the internal nor external processes maintain each other's state and all processes operate independently of the other processes. This also minimizes or prevents data loss (i.e., lossless system), which is especially important for revenue generating accounting systems.

In addition, instead of having the NMS interpret each network device's management data in the same fashion, flexibility is added by having each system send the NMS (e.g., data collector server 857, FIG. 2*a*) class files 410 including compiled source code indicating how its management data should be interpreted. Thus, the NMS effectively "learns" how to process (and perhaps display) management data from the network device via the class file. Through the reliable File Transfer Protocol (FTP), management subsystem processes 412 (FIG. 13*b*) running on central processor 12 push data summary files 414 and binary data files 416 to the NMS. Each data summary file indicates the name of the class file the NMS should use to interpret a corresponding binary data file. If the computer system has not already done so, it pushes the class file to the NMS. In one embodiment, the management subsystem processes, class files and NMS processes are JAVA programs, and JAVA Reflection is used to dynamically load the data-specific application class file and process the data in the binary data file. As a result, a new class file can be added or updated on a network device without having to reboot or upgrade the network device or the NMS. The computer system simply pushes the new class file to the NMS. In addition, the NMS can use different class files for each network device such that the data gathered on each device can be particularized to each device.

Figure 13C:
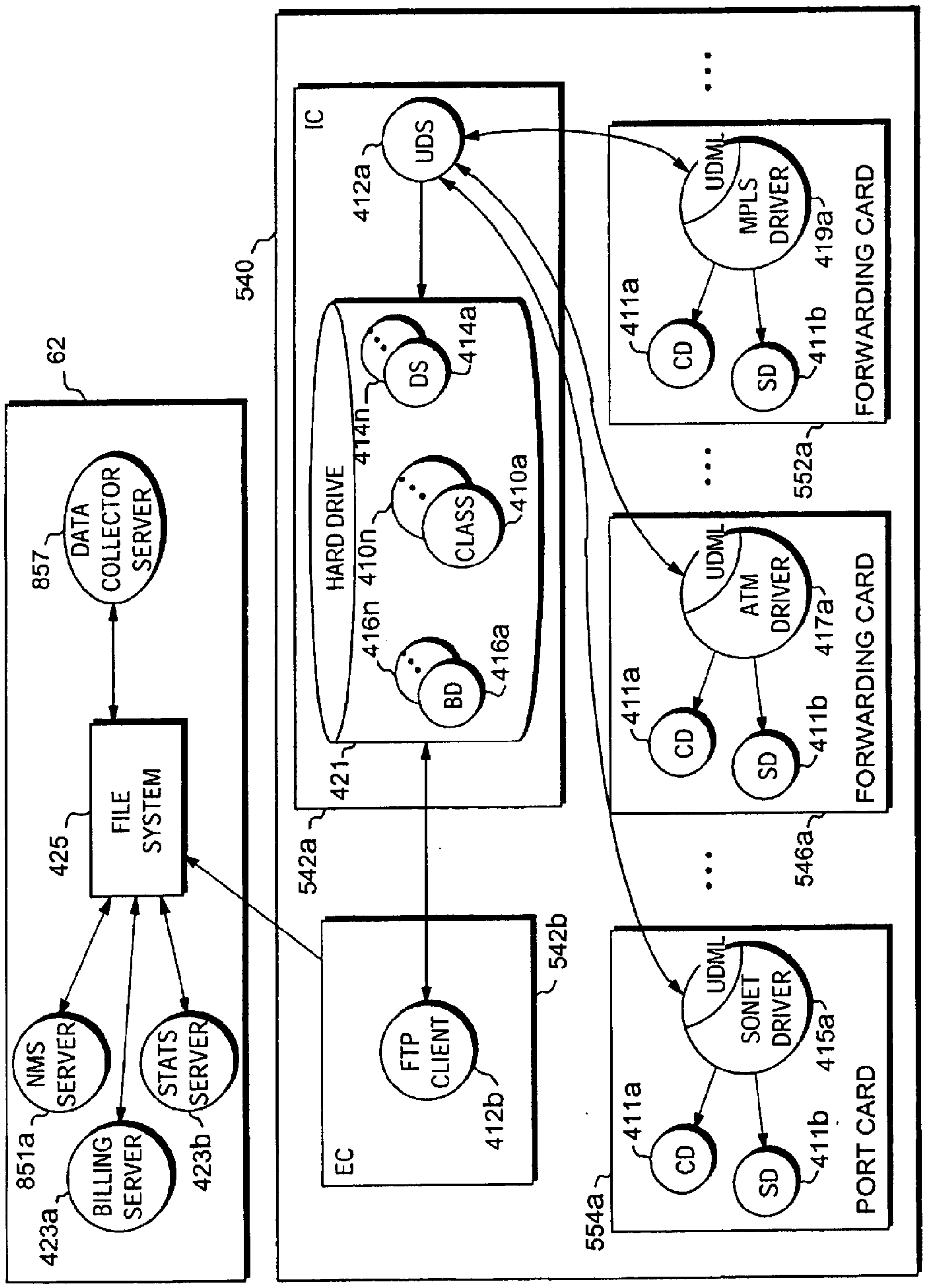
FIGS. 13*c* and 13*d* are block and flow diagrams of an accounting subsystem for pushing network device statistics to network management system software.

Referring to FIG. 13*c*, in one embodiment, the management subsystem 412 (FIG. 13*b*) is broken into two pieces: a usage data server (UDS) 412*a* and a file transfer protocol (FTP) client 412*b*. The UDS is executed on internal processor control card 542*a* (see also FIGS. 41*b* and 42) while the FTP client is executed on external processor control card 542*b* (see also FIGS. 41*a* and 42). Alternatively, in a network device with one processor control card or a central processor control card, both the UDS and FTP client may be executed on that one card. When each device driver, for example, SONET driver 415*a*–415*n* and ATM driver 417*a*–417*n* (only SONET driver 415*a* and ATM driver 417*a* are shown for convenience and it is to be understood that multiple drivers may be present on each card), within network device 540 is built, it links in a usage data monitoring library (UDML).

When device drivers are first started, upgraded or re-booted, the device driver makes a call into the UDML to notify the UDML as to which statistical data the device driver is able to gather. For example, an ATM device driver may be able to gather virtual circuit (VC) accounting statistics and Virtual ATM (VATM) interface statistics while a SONET device driver may be able to gather SONET statistics. The device driver then makes a call into the UDML to notify the UDML as to each interface (including virtual circuits) for which the device driver will be gathering data and the types of data the device driver will provide for each interface.

The UDML sends a registration packet to the UDS providing one or more string names corresponding to the types of data that the UDML will send to the UDS. For example, for ATM drivers the UDML may register "Acct_PVC" to track permanent virtual circuit statistics, "Acct_SVC" to track soft permanent virtual circuit statistics, "Vir_Intf" to track quality of service (QoS) statistics corresponding to virtual interfaces, and "Bw_Util" to track bandwidth utilization. As another example, for SONET drivers the UDML may register "Section" to track section statistics, "Line" to track line statistics and "Path" to track path statistics. The UDML need only register each string name with the UDS once, for example, for the first interface registered, and not for each interface since the UDML will package up the data from multiple interfaces corresponding to the same string name before sending the data with the appropriate string name to the UDS.

The UDML includes a polling timer to cause each driver to periodically poll its hardware for "current" statistical/accounting data samples 411_a_. The current data samples are typically gathered on a frequent interval of, for example, 15 minutes, as specified by the polling timer. The UDML also causes each driver to put the binary data in a particular format, time stamp the data and store the current data sample locally. When a current data sample for each interface managed by the device driver and corresponding to a particular string name is stored locally, the UDML packages all of the current data samples corresponding to the same string name into one or more packets containing binary data and sends the packets to the UDS with the registered string name. In addition, the UDML adds each gathered current data sample 411_a_ to a local data summary 411_b_. The UDML clears the data summary periodically, for example, every twenty-four hours, and then adds newly gathered current data samples to the cleared data summary. Thus, the data summary represents an accumulation of current data samples gathered over the period (e.g., 24 hours).

The UDS maintains a list of UDMLs expected to send current data samples and data summaries corresponding to each string name. For each poll, the UDS combines the data sent from each UDML with the same string name into a common binary data file (e.g., binary data files 416_a_–416_n_) associated with that string name in non-volatile memory, for example, a hard drive 421 located on internal control processor 542_a_. When all UDMLs in the list corresponding to a particular string name have reported their current data samples or data summaries, the UDS closes the common data file, thus ending the data collecting period. Preferably, the data is maintained in binary form to keep the data files smaller than translating it into other forms such as ASCII. Smaller binary files require less space to store and less bandwidth to transfer.

If after a predetermined period of time has passed, for example, 5 minutes, one or more of the UDMLs in a list has not sent binary data with the corresponding string name, the UDS closes the common data file, ending the data collecting period. The UDS then sends a notice to the non-responsive UDML(s). The UDS will repeat this sequence a predetermined number of times, for example, three, and if no binary data with the corresponding string name is received, the UDS will delete the UDML(s) from the list and send a trap to the NMS indicating which specific UDML is not responsive. As a result, maintaining the list of UDMLs that will be sending data corresponding to each string name allows the UDS to know when to close each common data file and also allows the UDS to notify the NMS when a UDML becomes non-responsive. This provides for increased availability including fault tolerance—that is, a fault on one card or in one application cannot interrupt the statistics gathering from each of the other cards or other applications on one card—and also including hot swapping where a card and its local UDMLs may no longer be inserted within the network device.

Since a large number of UDMLs may be sending data to the UDS, the potential exists for the data transfer rate to the UDS to be larger than the amount of data that the UDS can process and larger than local buffering can support. Such a situation may result in lost data or worse, for example, a network device crash. A need exists, therefore, to be able to "throttle" the amount of data being sent from the UDMLs to the UDS depending upon the current backlog of data at the UDS.

In one embodiment, the UDML is allowed to send up to a maximum number of packets to the UDS before the UDML must wait for an acknowledge (ACK) packet from the UDS. For example, the UDML may be allowed to send three packets of data to the UDS and in the third packet the UDML must include an acknowledge request. Alternatively, the UDML may follow the third packet with a separate packet including an acknowledge request. Once the third packet is sent, the UDML must delay sending any additional packets to the UDS until an acknowledge packet is received from the UDS. The UDML may negotiate the maximum number of packets that can be sent in its initial registration with the UDS. Otherwise, a default value may be used.

Many packets may be required to completely transfer a binary current data sample or data summary to the UDS. Once the acknowledge packet is received, the UDML may again send up to the maximum number (e.g., 3) of packets to the UDS again including an acknowledge request in the last packet. Requiring the UDML to wait for an acknowledge packet from the UDS, allows the UDS to throttle back the data received from UDMLs when the UDS has a large backlog of data to process.

A simple mechanism to accomplish this throttling is to have the UDS send an acknowledge packet each time it processes a packet containing an acknowledge request. Since the UDS is processing the packet that is a good indication that it is steadily processing packets. If the number of packets received by the UDS is large, it will take longer to process the packets and, thus, longer to process packets containing acknowledge requests. Thus, the UDMLs must wait longer to send more packets. On the other hand, if the number of packets is small, the UDS will quickly process each packet received and more quickly send back the acknowledge request and the UDMLs will not have to wait as long to send more packets.

Instead of immediately returning an acknowledge packet when the UDS processes a packet containing an acknowledge request, the UDS may first compare the number of packets waiting to be processed against a predetermined threshold. If the number of packets waiting to be processed is less than the predetermined threshold, then the UDS immediately sends the acknowledge packet to the UDML. If the number of packets waiting to be processed is more than the predetermined threshold, then the UDS may delay sending the acknowledge packet until enough packets have been processed that the number of packets waiting to be processed is reduced to less than the predetermined threshold. Instead, the UDS may estimate the amount of time that it will need to process enough packets to reduce the number of packets waiting to be processed to less than the threshold and send an acknowledge packet to the UDML including a future time at which the UDML may again send packets. In other words, the UDS does not wait until the backlog is diminished to notify the UDMLs but instead notifies the UDMLs prior to reducing the backlog and based on an estimate of when the backlog will be diminished.

Another embodiment for a throttling mechanism requires polls for different statistical data to be scheduled at different times to load balance the amount of statistical traffic across the control plane. For example, the UDML for each ATM driver polls and sends data to the UDS corresponding to PVC accounting statistics (i.e., Acct_PVC) at a first time, the UDML for each ATM driver polls and sends data to the UDS corresponding to SPVC accounting statistics (i.e., Acct_SPVC) at a second time, and the UDML for each ATM driver and each SONET driver polls and sends data to the UDS corresponding to other statistics at other times. This may be accomplished by having multiple polling timers within the UDML corresponding to the type of data being gathered. Load balancing and staggered reporting provides distributed data throttling which may smooth out control plane bandwidth utilization (i.e., prevent large data bursts) and reduce data buffering and data loss.

Figure 13D:
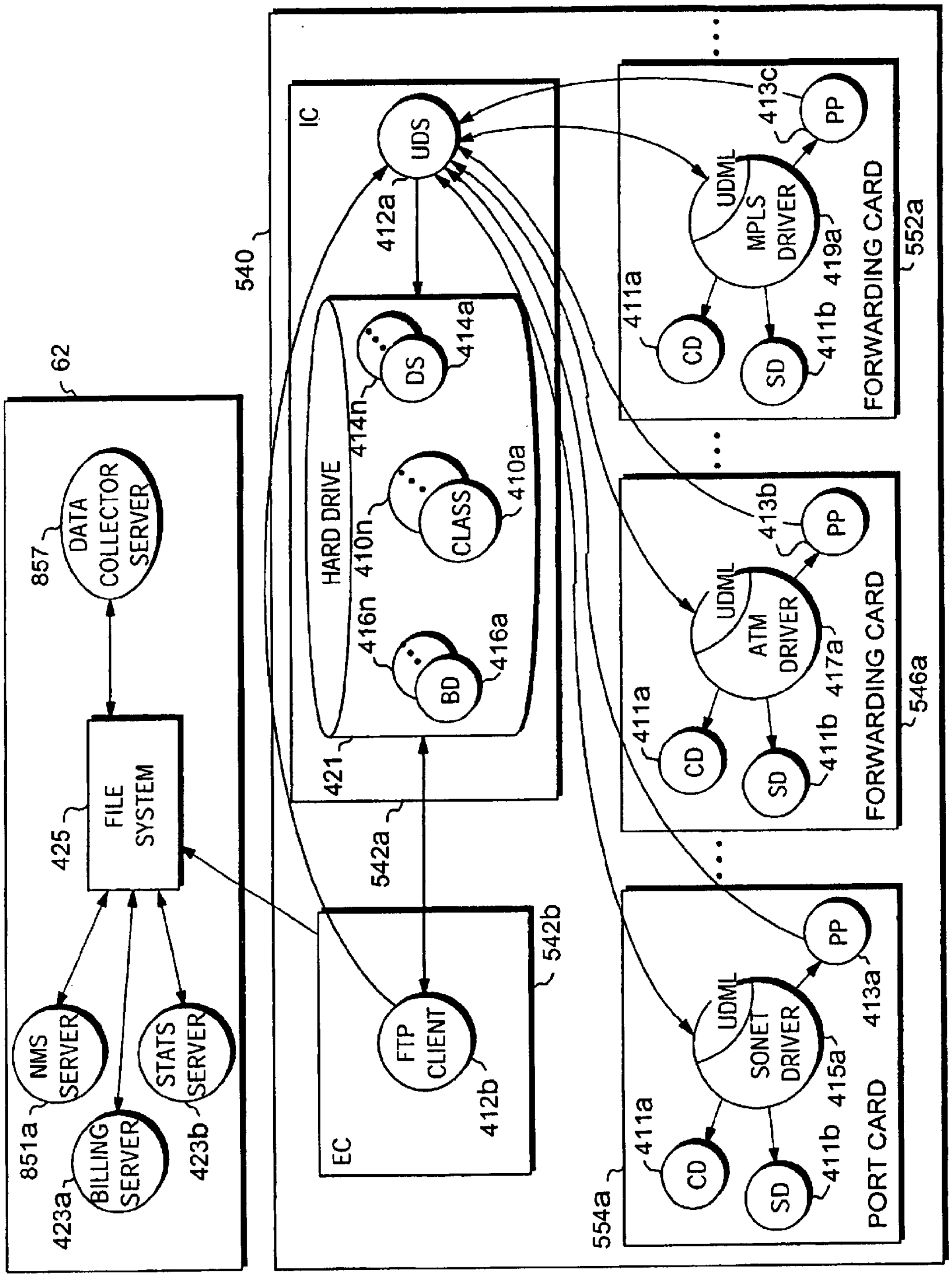

Referring to FIG. 13*d*, instead of having each device driver on a card package the binary data and send it to the UDS, a separate, low priority packaging program (PP) 413*a*–413*n* may be resident on each card and responsible for packaging the binary statistical management data from each device driver and sending it to the UDS. Running the PP as a lower priority program ensures that processor cycles are not taken away from time-critical processes. Load balancing and staggered reporting may still be accomplished by having each PP send acknowledge requests in the last of a predetermined number of packets and wait for the UDS to send an acknowledge packet as described above.

As mentioned, the UDML causes the device driver to periodically gather the current statistical management data samples for each interface and corresponding to each string name. The period may be relatively frequent, for example, every 15 minutes. In addition, the UDML causes the device driver or separate packaging program to add the current data sample to a data summary corresponding to the same string name each time a current data sample is gathered. The UDML clears the data summary periodically, for example, every twenty-four hours. To reduce bandwidth utilization, the data summary and corresponding string name is sent to the UDS periodically but with an infrequent time period of, for example, every 6 to 12 hours. The data summary provides resiliency such that if any of the current data samples are lost in any of the various transfers, the data summary is still available. Local resiliency may be provided by storing a backlog of both current data sample files and summary data files in hard drive 421. For example, the four most recent current data sample files and the two most recent summary data files corresponding to each string name may be stored.

If FTP client 412*b* cannot send data from hard drive 421 to file system 425 for a predetermined period of time, for example, 15 minutes, the FTP client may notify the UDS and the UDS may notify each UDML. Each UDML then continues to cause the device driver to gather current statistical management data samples and add them to the data summaries at the same periodic interval (i.e., current data interval, e.g., 15 minutes), however, the UDML stops sending the current data samples to the UDS. Instead, the UDML sends only the data summaries to the UDS but at the more frequent current data interval (e.g., 15 minutes) instead of the longer time period (e.g., 6 to 12 hours). The UDS may then update the data summaries stored in hard drive 421 and cease collecting and storing current data samples. This will save space in the hard drive and minimize any data loss.

To reduce the amount of statistical management data being transferred to the UDS, a network manager may selectively configure only certain of the applications (e.g., device drivers) and certain of the interfaces to provide this data. As each UDML registers with the UDS, the UDS may then inform each UDML with respect to each interface as to whether or not statistical management data should be gathered and sent to the UDS. There may be many circumstances in which gathering this data is unnecessary. For example, each ATM device driver may manage multiple virtual interfaces (VATMs) and within each VATM there may be several virtual circuits. A network manager may choose not to receive statistics for virtual circuits on which a customer has ordered only Variable Bit Rate (VBR) real time (VBR-rt) and VBR non-real time (VBR-nrt) service. For VBR-rt and VBR-nrt, the network service provider may provide the customer only with available/extra bandwidth and charge a simple flat fee per month. However, a network manager may need to receive statistics for virtual circuits on which a customer has ordered a high quality of service such as Constant Bit Rate (CBR) to ensure that the customer is getting the appropriate level of service and to appropriately charge the customer. In addition, a network manager may want to receive statistics for virtual circuits on which a customer has ordered Unspecified Bit Rate (UBR) service to police the customer's usage and ensure they are not receiving more network bandwidth than what they are paying for. Allowing a network manager to indicate that certain applications or certain interfaces managed by an application (e.g., a VATM) need not provide statistical management data or some portion of that data to the UDS reduces the amount of data transferred to the UDS—that is, reduces internal bandwidth utilization—, reduces the amount of storage space required in the hard drive, and reduces the processing power required to transfer the statistical management data from remote cards to external file system 425.

For each binary data file, the UDS creates a data summary file (e.g., data summary files 414*a*–414*n*) and stores it in, for example, hard drive 421. The data summary file defines the binary file format, including the type based on the string name, the length, the number of records and the version number. The UDS does not need to understand the binary data sent to it by each of the device drivers. The UDS need only combine data corresponding to similar string names into the same file and create a summary file based on the string name and the amount of data in the binary data file. The version number is passed to the UDS by the device driver, and the UDS includes the version number in the data summary file.

Periodically, FTP client 412*b* asynchronously reads each binary data file and corresponding data summary file from hard drive 421. Preferably, the FTP client reads these files from the hard drive through an out-of-band Ethernet connection, for example, Ethernet 32 (FIG. 1). Alternatively, the FTP client may read these files through an in-band data path 34 (FIG. 1). The FTP client then uses an FTP push to send the binary data file to a file system 425 accessible by the data collector server and, preferably local to the data collector server. The FTP client then uses another FTP push to send the data summary file to the local file system. Since binary data files may be very long and an FTP push of a binary data file may take some time, the data collector server may periodically search the local file system for data summary files. The data collector server may then attempt to open a discovered data summary file. If the data collector server is able to open the file, then that indicates that the FTP push of the data summary file is complete, and since the data summary file is pushed after the binary data file, the data collector server's ability to open the data summary file may be used as an indication that a new binary data file has been completely received. Since data summary files are much smaller than binary data files, having the data collector server look for and attempt to open data summary files instead of binary data files minimizes the thread wait within the data collector server.

In one embodiment, the data collector server is a JAVA program, and each different type of binary data file has a corresponding JAVA class file (e.g., class file 410*a*) that defines how the data collector server should process the binary data file. When a device driver is loaded into the network device, a corresponding JAVA class file is also loaded and stored in hard drive 421. The FTP client periodically polls the hard drive for new JAVA class files and uses an FTP push to send them to file system 425. The data collector server uses the binary file type in the data summary file to determine which JAVA class file it should use to interpret the binary data file. The data collector server then converts the binary data into ASCII or AMA/BAF format and stores the ASCII or AMA/BAF files in the file system. The data collector server may use a set of worker threads for concurrency.

As described, the data collector server is completely independent of and asynchronous with the FTP client, which is also independent and asynchronous of the UDS. The separation of the data collector server and FTP client avoids data loss due to process synchronization problems, since there is no synchronization, and reduces the burden on the network device by not requiring the network device to maintain synchronization between the processes. In addition, if the data collector server goes down or is busy for some time, the FTP client and UDS continue working and continue sending binary data files and data summary files to the file system. When the data collector server is again available, it simply accesses the data summary files and processes the binary files as described above. Thus, there is no data loss and the limited storage capacity within the network device is not strained by storing data until the data collector server is available. In addition, if the FTP client or UDS goes down, the data collector server may continue working.

An NMS server (e.g., NMS server 851*a*), which may or may not be executing on the same computer system 62 as the data collector server, may periodically retrieve the ASCII or AMA/BAF files from the file system. The files may represent accounting, statistics, security, logging and/or other types of data gathered from hardware within the network device. The NMS server may also access the corresponding class files from the file system to learn how the data should be presented to a user, for example, how a graphical user interface (GUI) should be displayed, what data and format to display, or perhaps which one of many GUIs should be used. The NMS server may use the data to, for example, monitor network device performance, including quality of service guarantees and service level agreements, as well as bill customers for network usage. Alternatively, a separate billing server 423*a* or statistics server 423*b*, which may or may not be executing on the same computer system 62 as the data collector server and/or the NMS server, may periodically retrieve the ASCII or AMA/BAF files from the file system in order to monitor network device performance, including quality of service guarantees and service level agreements, and/or bill customers for network usage. One or more of the data collector server, the NMS server, the billing server and the statistics server may be combined into one server. Moreover, management files created by the data collector server may be combined with data from the configuration or NMS databases to generate billing records for each of the network provider's customers.

The data collector server may convert the ASCII or AMA/BAF files into other data formats, for example, Excel spread sheets, for use by the NMS server, billing server and/or statistics server. In addition, the application class file for each data type may be modified to go beyond conversion, including direct integration into a database or an OSS system. For example, many OSS systems use a Portal billing system available from Portal Software, Inc. in Cupertino, Calif. The JAVA class file associated with a particular binary data file and data summary file may cause the data collector server to convert the binary data file into ASCII data and then issue a Portal API call to give the ASCII data directly to the Portal billing system. As a result, accounting, statistics, logging and/or security data may be directly integrated into any other process, including third party processes, through JAVA class files.

Through JAVA class files, new device drivers may be added to a network device without having to change UDS 412*a* or FTP client 412*b* and without having to re-boot the network device and without having to upgrade/modify external processes. For example, a new forwarding card (e.g., forwarding card 552*a*) may be added to an operating network device and this new forwarding card may support MPLS. An MPLS device driver 419, linked within the UDML, is downloaded to the network device as well as a corresponding class file (e.g., class file 410*e*). When the FTP client discovers the new class file in hard drive 421, it uses an FTP push to send it to file system 425. The FTP client does not need to understand the data within the class file it simply needs to push it to the file system. Just as with other device drivers, the UDML causes the MPLS driver to register appropriate string names with the UDS and poll and send data to the UDS with a registered string name. The UDS stores binary data files (e.g., binary data file 416*e*) and corresponding data summary files (e.g., data summary file 414*e*) in the hard drive without having to understand the data within the binary data file. The FTP client then pushes these files to the file system again without having to understand the data. When the data summary file is discovered by the data collector server, the data collector server uses the binary file type in the data summary file to locate the new MPLS class file 410*e* in the file system and then uses the class file to convert the binary data in the corresponding binary data file into ASCII format and perhaps other data formats. Thus, a new device driver is added and statistical information may be gathered without having to change any of the other software and without having to re-boot the network device.

As described, having the data collector server be completely independent of and asynchronous with the FTP client avoids the typical problems encountered when internal and external management programs are synchronized. Moreover, modularity of device drivers and internal management programs is maintained by providing metadata through class files that instruct the external management programs as to how the management data should be processed. Consequently, device drivers may be modified, upgraded and added to an operating network device without disrupting the operation of any of the other device drivers or the management programs.

Configuration

As described above, unlike a monolithic software architecture which is directly linked to the hardware of the computer system on which it runs, a modular software architecture includes independent applications that are significantly decoupled from the hardware through the use of a logical model of the computer system. Using the logical model and a code generation system, a view id and API are generated for each application to define each application's access to particular data in a configuration database and programming interfaces between the different applications. The configuration database is established using a data definition language (DDL) file also generated by the code generation system from the logical model. As a result, there is only a limited connection between the computer system's software and hardware, which allows for multiple versions of the same application to run on the computer system simultaneously and different types of applications to run simultaneously on the computer system. In addition, while the computer system is running, application upgrades and downgrades may be executed without affecting other applications and new hardware and software may be added to the system also without affecting other applications.

Referring again to FIG. 13*b,* initially, NMS 60 reads card table 47 and port table 49 to determine what hardware is available in computer system 10. The NMS assigns a logical identification number (LID) 98 (FIGS. 14*b* and 14*c*) to each card and port and inserts these numbers in an LID to PID Card table (LPCT) 100 and an LID to PID Port table (LPPT) 101 in configuration database 42. Alternatively, the NMS could use the PID previously assigned to each board by the MCD. However, to allow for hardware redundancy, the NMS assigns an LID and may associate the LID with at least two PIDs, a primary PID 102 and a backup PID 104. (LPCT 100 may include multiple backup PID fields to allow more than one backup PID to be assigned to each primary PID.)

The user chooses the desired redundancy structure and instructs the NMS as to which boards are primary boards and which boards are backup boards. For example, the NMS may assign LID 30 to line card 16*a*—previously assigned PID 500 by the MCD—as a user defined primary card, and the NMS may assign LID 30 to line card 16*n*—previously assigned PID 513 by the MCD—as a user defined back-up card (see row 106, FIG. 14*b*). The NMS may also assign LID 40 to port 44*a*—previously assigned PID 1500 by the MCD—as a primary port, and the NMS may assign LID 40 to port 68*a*—previously assigned PID 1600 by the MCD—as a back-up port (see row 107, FIG. 14*c*).

In a 1:1 redundant system, each backup line card backs-up only one other line card and the NMS assigns a unique primary PID and a unique backup PID to each LID (no LIDs share the same PIDs). In a 1:N redundant system, each backup line card backs-up at least two other line cards and the NMS assigns a different primary PID to each LID and the same backup PID to at least two LIDs. For example, if computer system 10 is a 1:N redundant system, then one line card, for example, line card 16*n,* serves as the hardware backup card for at least two other line cards, for example, line cards 16*a* and 16*b*. If the NMS assigns an LID of 31 to line card 16*b,* then in logical to physical card table 100 (see row 109, FIG. 14*b*), the NMS associates LID 31 with primary PID 501 (line card 16*b*) and backup PID 513 (line card 16*n*). As a result, backup PID 513 (line card 16*n*) is associated with both LID 30 and 31.

The logical to physical card table provides the user with maximum flexibility in choosing a redundancy structure. In the same computer system, the user may provide full redundancy (1:1), partial redundancy (1:N), no redundancy or a combination of these redundancy structures. For example, a network manager (user) may have certain customers that are willing to pay more to ensure their network availability, and the user may provide a backup line card for each of that customer's primary line cards (1:1). Other customers may be willing to pay for some redundancy but not full redundancy, and the user may provide one backup line card for all of that customer's primary line cards (1:N). Still other customers may not need any redundancy, and the user will not provide any backup line cards for that customer's primary line cards. For no redundancy, the NMS would leave the backup PID field in the logical to physical table blank. Each of these customers may be serviced by separate computer systems or the same computer system. Redundancy is discussed in more detail below.

The NMS and MCD use the same numbering space for LIDs, PIDs and other assigned numbers to ensure that the numbers are different (no collisions).

The configuration database, for example, a Polyhedra relational database, supports an "active query" feature. Through the active query feature, other software applications can be notified of changes to configuration database records in which they are interested. The NMS database establishes an active query for all configuration database records to insure it is updated with all changes. The master SRM establishes an active query with configuration database 42 for LPCT 100 and LPPT 101. Consequently, when the NMS adds to or changes these tables, configuration database 42 sends a notification to the master SRM and includes the change. In this example, configuration database 42 notifies master SRM 36 that LID 30 has been assigned to PID 500 and 513 and LID 31 has been assigned to PID 501 and 513. The master SRM then uses card table 47 to determine the physical location of boards associated with new or changed LIDs and then tells the corresponding slave SRM of its assigned LID(s). In the continuing example, master SRM reads CT 47 to learn that PID 500 is line card 16*a,* PID 501 is line card 16*b* and PID 513 is line card 16*n.* The master SRM then notifies slave SRM 37*b* on line card 16*a* that it has been assigned LID 30 and is a primary line card, SRM 37*c* on line card 16*b* that it has been assigned LID 31 and is a primary line card and SRM 37*o* on line card 16*n* that it has been assigned LIDs 30 and 31 and is a backup line card. All three slave SRMs 37*b,* 37*c* and 37*o* then set up active queries with configuration database 42 to insure that they are notified of any software load records (SLRs) created for their LIDs. A similar process is followed for the LIDs assigned to each port.

The NMS informs the user of the hardware available in computer system 10. This information may be provided as a text list, as a logical picture in a graphical user interface (GUI), or in a variety of other formats. The user then uses the GUT to tell the NMS (e.g., NMS client 850*a,* FIG. 2*a*) how they want the system configured.

The user will select which ports (e.g., 44*a*–44*d,* 46*a*–46*f,* 68*a*–68*n*) the NMS should enable. There may be instances where some ports are not currently needed and, therefore, not enabled. The user also needs to provide the NMS with information about the type of network connection (e.g., connection 70*a*–70*d,* 72*a*–72*f,* 74*a*–74*n*). For example, the user may want all ports 44*a*–44*d* on line card 16*a* enabled to run ATM over SONET. The NMS may start one ATM application to control all four ports, or, for resiliency, the NMS may start one ATM application for each port. Alternatively, each port may be enabled to run a different protocol (e.g., MPLS, IP, Frame Relay).

In the example given above, the user must also indicate the type of SONET fiber they have connected to each port and what paths to expect. For example, the user may indicate that each port 44*a*–44*d* is connected to a SONET optical fiber carrying an OC-48 stream. A channelized OC-48 stream is capable of carrying forty-eight STS-1 paths, sixteen STS-3c paths, four STS-12c paths or a combination of STS-1, STS-3c and STS-12c paths. A clear channel OC-48c stream carries one concatenated STS-48 path. In the example, the user may indicate that the network connection to port 44*a* is a clear channel OC-48 SONET stream having one STS-48 path, the network connection to port 44*b* is a channelized OC-48 SONET stream having three STS-12c paths (i.e., the SONET fiber is not at full capacity—more paths may be added later), the network connection to port 44*c* is a channelized OC-48 SONET stream having two STS-3c paths (not at full capacity) and the network connection to port 44*d* is a channelized OC-48 SONET stream having three STS-12c paths (not at full capacity). In the current example, all paths within each stream carry data transmitted according to the ATM protocol. Alternatively, each path within a stream may carry data transmitted according to a different protocol.

The NMS (e.g., NMS server 851*a*–851*n*) uses the information received from the user (through the GUI/NMS client) to create records in several tables in the configuration database, which are then copied to the NMS database. These tables are accessed by other applications to configure computer system 10. One table, the service endpoint table (SET) 76 (see also FIG. 14*a*), is created when the NMS assigns a unique service endpoint number (SE) to each path on each enabled port and corresponds each service endpoint number with the physical identification number (PID) previously assigned to each port by the MCD. Through the use of the logical to physical port table (LPPT), the service endpoint number also corresponds to the logical identification number (LID) of the port. For example, since the user indicated that port 44*a* (PID 1500) has a single STS-48 path, the NMS assigns one service endpoint number (e.g. SE 1, see row 78, FIG. 14*a*). Similarly, the NMS assigns three service endpoint numbers (e.g., SE 2, 3, 4, see rows 80–84) to port 44*b* (PID 1501), two service endpoint numbers (e.g., SE 5, 6, see rows 86, 88) to port 44*c* (PID 1502) and three service endpoint numbers (e.g., SE 7, 8, 9, see rows 90, 92, 94) to port 44*d*.

Service endpoint managers (SEMs) within the modular system services of the kernel software running on each line card use the service endpoint numbers assigned by the NMS to enable ports and to link instances of applications, for example, ATM, running on the line cards with the correct port. The kernel may start one SEM to handle all ports on one line card, or, for resiliency, the kernel may start one SEM for each particular port. For example, SEMs 96*a*–96*d* are spawned to independently control ports 44*a*–44*d*.

The service endpoint managers (SEMs) running on each board establish active queries with the configuration database for SET 76. Thus, when the NMS changes or adds to the service endpoint table (SET), the configuration database sends the service endpoint manager associated with the port PID in the SET a change notification including information on the change that was made. In the continuing example, configuration database 42 notifies SEM 96*a* that SET 76 has been changed and that SE 1 was assigned to port 44*a* (PID 1500). Configuration database 42 notifies SEM 96*b* that SE 2, 3, and 4 were assigned to port 44*b* (PID 1501), SEM 96*c* that SE 5 and 6 were assigned to port 44*c* (PID 1502) and SEM 96*d* that SE 7, 8, and 9 were assigned to port 44*d* (PID 1503). When a service endpoint is assigned to a port, the SEM associated with that port passes the assigned SE number to the port driver for that port using the port PID number associated with the SE number.

To load instances of software applications on the correct boards, the NMS creates software load records (SLR) 128*a*–128*n* in configuration database 42. The SLR includes the name 130 (FIG. 14*f*) of a control shim executable file and an LID 132 for cards on which the application must be spawned. In the continuing example, NMS 60 creates SLR 128*a* including the executable name atm_cntrl.exe and card LID 30 (row 134). The configuration database detects LID 30 in SLR 128*a* and sends slave SRMs 37*b* (line card 16*a*) and 37*o* (line card 16*n*) a change notification including the name of the executable file (e.g., atm_cntrl.exe) to be loaded. The primary slave SRMs then download and execute a copy of atm_cntrl.exe 135 from memory 40 to spawn the ATM controllers (e.g., ATM controller 136 on line card 16*a*). Since slave SRM 37*o* is on backup line card 16*n*, it may or may not spawn an ATM controller in backup mode. Software backup is described in more detail below. Instead of downloading a copy of atm_cntrl.exe 135 from memory 40, a slave SRM may download it from another line card that already downloaded a copy from memory 40. There may be instances when downloading from a line card is quicker than downloading from central processor 12. Through software load records and the tables in configuration database 42, applications are downloaded and executed without the need for the system services, including the SRM, or any other software in the kernel to have information as to how the applications should be configured. The control shims (e.g., atm_cntrl.exe 135) interpret the next layer of the application (e.g., ATM) configuration.

For each application that needs to be spawned, for example, an ATM application and a SONET application, the NMS creates an application group table. Referring to FIG. 14*d*, ATM group table 108 indicates that four instances of ATM (i.e., group number 1, 2, 3, 4)—corresponding to four enabled ports 44*a*–44*n*—are to be started on line card 16*a* (LID 30). If other instances of ATM are started on other line cards, they would also be listed in ATM group table 108 but associated with the appropriate line card LID. ATM group table 108 may also include additional information needed to execute ATM applications on each particular line card. (See description of software backup below.)

In the above example, one instance of ATM was started for each port on the line card. This provides resiliency and fault isolation should one instance of ATM fail or should one port suffer a failure. An even more resilient scheme would include multiple instances of ATM for each port. For example, one instance of ATM may be started for each path received by a port.

The application controllers on each board now need to know how many instances of the corresponding application they need to spawn. This information is in the application group table in the configuration database. Through the active query feature, the configuration database notifies the application controller of records associated with the board's LID from corresponding application group tables. In the continuing example, configuration database 42 sends ATM controller 136 records from ATM group table 108 that correspond to LID 30 (line card 16*a*). With these records, ATM controller 136 learns that there are four ATM groups associated with LID 30 meaning ATM must be instantiated four times on line card 16*a*. ATM controller 136 asks slave SRM 37*b* to download and execute four instances (ATM 110–113, FIG. 15) of atm.exe 138.

Once spawned, each instantiation of ATM 110–113 sends an active database query to search ATM interface table 114 for its corresponding group number and to retrieve associated records. The data in the records indicates how many ATM interfaces each instantiation of ATM needs to spawn. Alternatively, a master ATM application (not shown) running on central processor 12 may perform active queries of the configuration database and pass information to each slave ATM application running on the various line cards regarding the number of ATM interfaces each slave ATM application needs to spawn.

Figure 15:
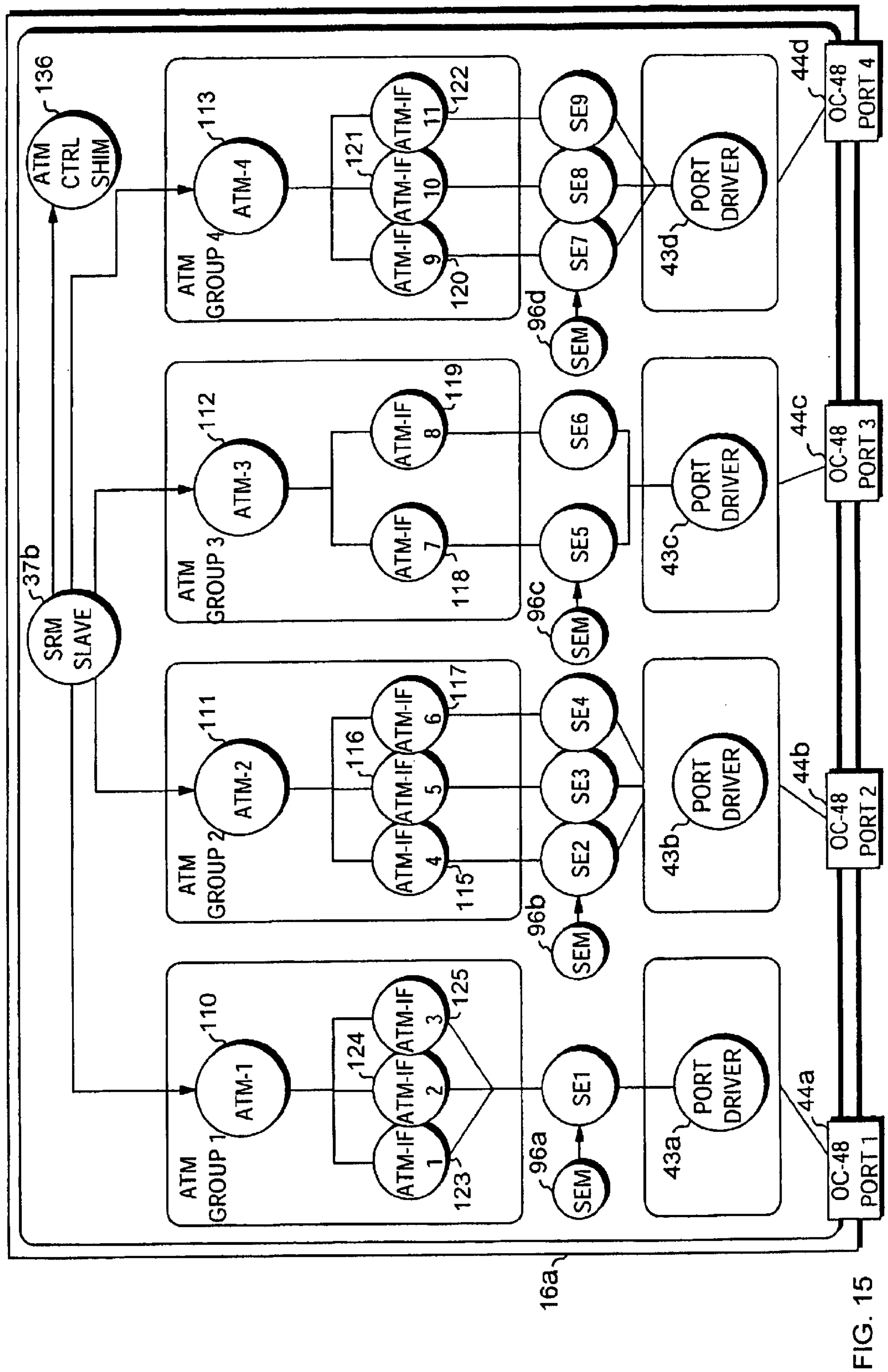
FIG. 15 is a block and flow diagram of a line card and a method for executing multiple instances of processes.

Referring to FIGS. 14*e* and 15, for each instance of ATM 110–113 there may be one or more ATM interfaces. To configure these ATM interfaces, the NMS creates an ATM interface table 114. There may be one ATM interface 115–122 per path/service endpoint or multiple virtual ATM interfaces 123–125 per path. This flexibility is left up to the user and NMS, and the ATM interface table allows the NMS to communicate this configuration information to each instance of each application running on the different line cards. For example, ATM interface table 114 indicates that for ATM group 1, service endpoint 1, there are three virtual ATM interfaces (ATM-IF 1–3) and for ATM group 2, there is one ATM interface for each service endpoint: ATM-IF 4 and SE 2; ATM-IF 5 and SE 3; and ATM-IF 6 and SE 4.

Computer system 10 is now ready to operate as a network switch using line card 16*a* and ports 44*a*–44*d*. The user will likely provide the NMS with further instructions to configure more of computer system 10. For example, instances of other software applications, such as an IP application, and additional instances of ATM may be spawned (as described above) on line cards 16*a* or other boards in computer system 10.

As shown above, all application dependent data resides in memory 40 and not in kernel software. Consequently, changes may be made to applications and configuration data in memory 40 to allow hot (while computer system 10 is running) upgrades of software and hardware and configuration changes. Although the above described power-up and configuration of computer system 10 is complex, it provides massive flexibility as described in more detail below.

Template Driven Service Provisioning:

Instead of using the GUI to interactively provision services on one network device in real time, a user may provision services on one or more network devices in one or more networks controlled by one or more network management systems (NMSs) interactively and non-interactively using an Operations Support Services (OSS) client and templates. At the heart of any carrier's network is the OSS, which provides the overall network management infrastructure and the main user interface for network managers/administrators. The OSS is responsible for consolidating a diverse set of element/network management systems and third-party applications into a single system that is used, for example, to detect and resolve network faults (Fault Management), configure and upgrade the network (Configuration Management), account and bill for network usage (Accounting Management), oversee and tune network performance (Performance Management), and ensure iron-clad network security (Security Management). FCAPS are the five functional areas of network management as defined by the International Organization for Standardization (ISO). Through templates one or more NMSs may be integrated with a telecommunication network carrier's OSS.

Templates are metadata and include scripts of instructions and parameters. In one embodiment, instructions within templates are written in ASCII text to be human readable. There are three general categories of templates, provisioning templates, control templates and batch templates. A user may interactively connect the OSS client with a particular NMS server and then cause the NMS server to connect to a particular device. Instead, the user may create a control template that non-interactively establishes these connections. Once the connections are established, whether interactively or noninteractively, provisioning templates may be used to complete particular provisioning tasks. The instructions within a provisioning template cause the OSS client to issue appropriate calls to the NMS server which cause the NMS server to complete the provisioning task, for example, by writing/modifying data within the network device's configuration database. Batch templates may be used to concatenate a series of templates and template modifications (i.e., one or more control and provisioning templates) to provision one or more network devices. Through the client/server based architecture, multiple OSS clients may work with one or more NMS servers. Database view ids and APIs for the OSS client may be generated using the logical model and code generation system (FIG. 3*b*) to synchronize the integration interfaces between the OSS clients and the NMS servers.

Interactively, a network manager may have an OSS client execute many provisioning templates to complete many provisioning tasks. Instead, the network manager may order and sequence the execution of many provisioning templates within a batch template to non-interactively complete the many provisioning tasks and build custom services. In addition, execution commands followed by control template names may be included within batch templates to non-interactively cause an OSS client to establish connections with particular NMS servers and network devices. For example, a first control template may designate a network device to which the current OSS client and NMS server are not connected. Including an execution command followed by the first control template name in a batch template will cause the OSS client to issue calls to the NMS server to cause the NMS server to access the different network device. As another example, a second control template may designate an NMS server and a network device to which the OSS client is not currently connected. Including an execution command followed by the second control template name will cause the OSS client to set up connections to both the different NMS server and the different network device. Moreover, batch templates may include execution commands followed by provisioning template names after each execution command and control template to provision services within the network devices designated by the control templates. Through batch templates, therefore, multiple control templates and provisioning templates may be ordered and sequenced to provision services within multiple network devices in multiple networks controlled by multiple NMSs.

Calls issued by the OSS client to the NMS server may cause the NMS server to immediately provision services or delay provisioning services until a predetermined time, for example, a time when the network device is less likely to be busy. Templates may be written to apply to different types of network devices.

A "command line" interactive interpreter within the OSS client may be used by a network manager to select and modify existing templates or to create new templates. Templates may be generated for many various provisioning tasks, for example, setting up a permanent virtual circuit (PVC), a switched virtual circuit (SVC), a SONET path (SPATH), a traffic descriptor (TD) or a virtual ATM interface (VAIF). Once a template is created, a network manager change default parameters within the template to complete particular provisioning tasks. A network manager may also copy a template and modify it to create a new template.

Figure 3H:
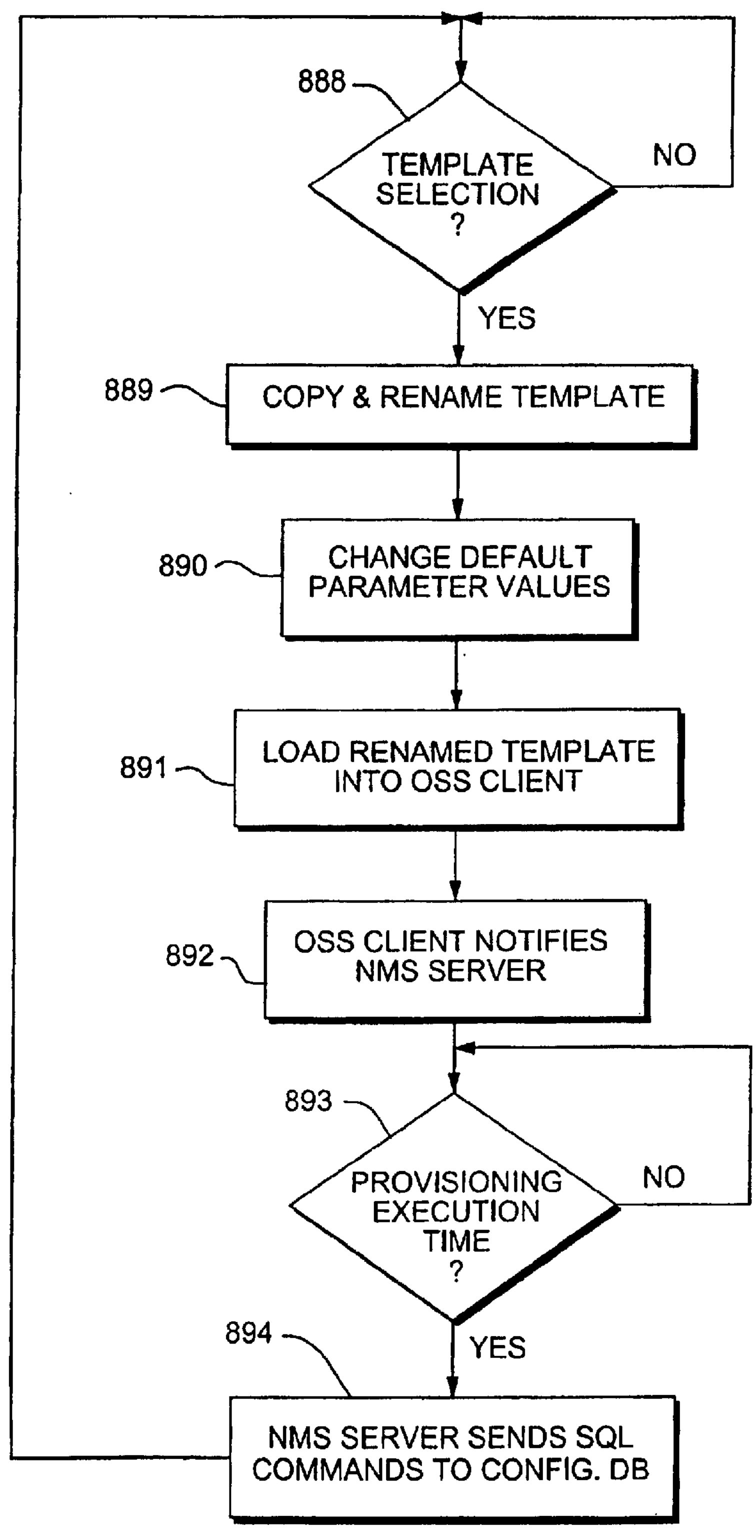

Referring to FIG. 3*h*, using the interactive interpreter, a network administrator may provision services by selecting (step 888) a template and using the default parameters within that template or copying and renaming (step 889) a particular provisioning template corresponding to a particular provisioning task and either accepting default parameter values provided by the template or changing (step 890) those default values to meet the administrator's needs. The network administrator may also change parameters and instructions within a copy of a template to create a new template. The modified provisioning templates are sent to or loaded into (step 891) the OS client, which executes the instructions within the template and issues the appropriate calls (step 892) to the NMS server to satisfy the provisioning need. The OSS client may be written in JAVA and employ script technology. In response to calls received from the OSS client, the NMS server may execute (step 894) the provisioning requests defined by a template immediately or in a "batch-mode" (step 893), perhaps with other calls received from the OSS client or other clients, at a time when network transactions are typically low (e.g., late at night).

Figure 3I:
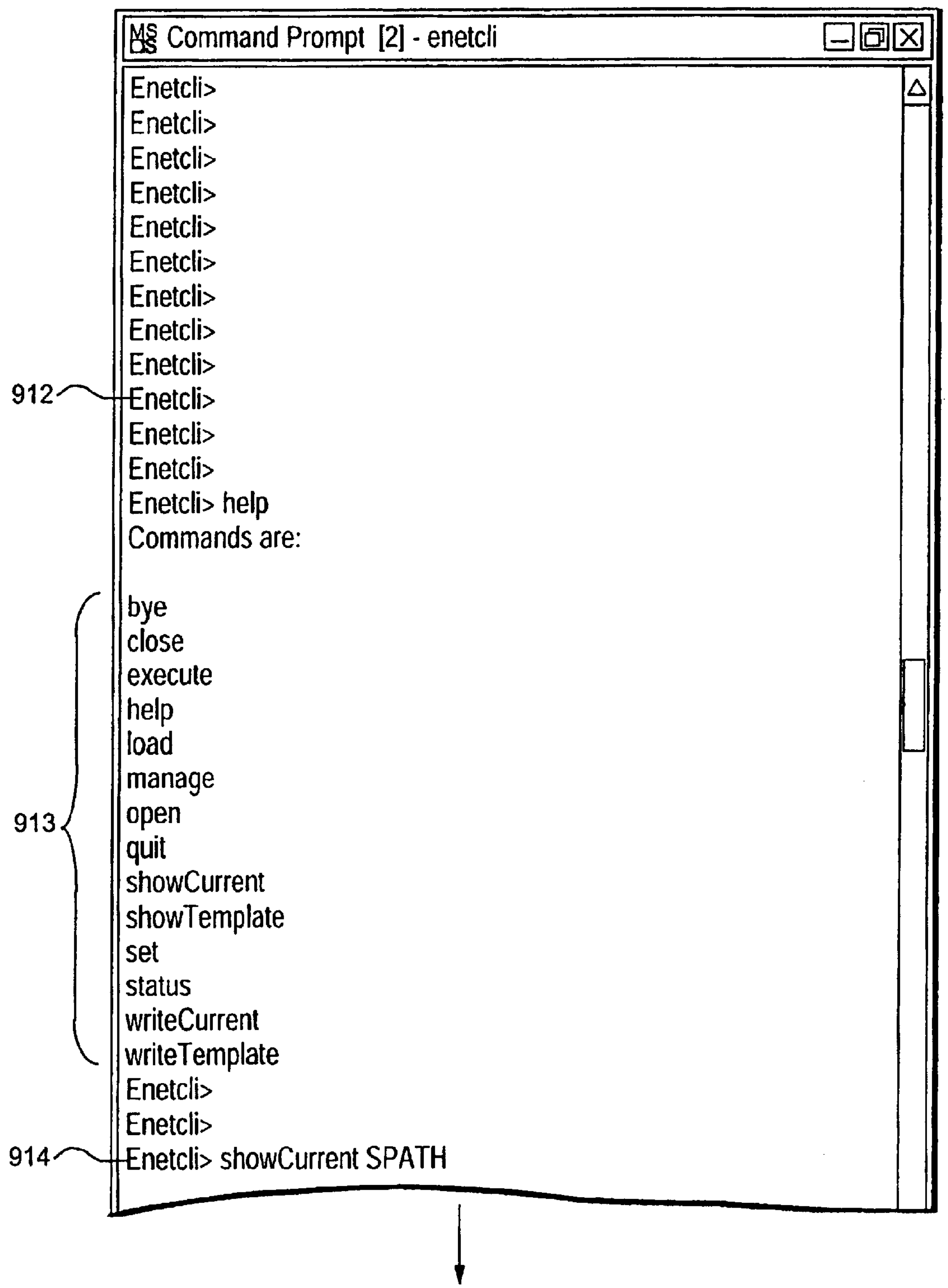

Referring to FIG. 3*i,* at the interactive interpreter prompt 912 (e.g., Enetcli>) a network manager may type in "help" and be provided with a list (e.g., list 913) of commands that are available. In one embodiment, available commands may include bye, close, execute, help, load, manage, open, quit, showCurrent, showTemplate, set, status, writeCurrent, and writeTemplate. Many different commands are possible. The bye command allows the network manager to exit the interactive interpreter, the close command allows the network manager to close a connection between the OSS client and that NMS server, and the execute command followed by a template type causes the OSS client to execute the instructions within the loaded template corresponding to that template type.

As shown, the help command alone causes the interactive interpreter to display the list of commands. The help command followed by another command provides help information about that command. The load command followed by a template type and a named template loads the named template into the OSS client such that any commands followed by the template type will use the named/loaded template. The manage command followed by an IP address of a network device causes the OSS client to issue a call to an NMS server to establish a connection between the NMS server and that network device. Alternatively, a username and password may also need to be supplied. The open command followed by an NMS server IP address causes the OSS client to open a connection with that NMS server, and again, the network manager may also need to supply a username and password. Instead of an IP address, a domain name server (DNS) name may be provided and a host look up may be used to determine the IP address and access the corresponding device.

The showCurrent command followed by a template type will cause the interactive interpreter to display current parameter values for the loaded template corresponding to that template type. For example, showCurrent SPATH 914 displays a list 915 of parameters and current parameter values for the loaded template corresponding to the SPATH template type. The showTemplate command followed by a template type will cause the OSS client to display available parameters and acceptable parameter values for each parameter within the loaded template. For example, showTemplate SPATH 916 causes the interactive interpreter to display the available parameters 917 within the loaded template corresponding to the SPATH template type. The set command followed by a template type, a parameter name and a value will change the named parameter to the designated value within the loaded template, and a subsequent showCurrent command followed by that template type will show the new parameter value within the loaded.

The status command 918 will cause the interactive interpreter to display a status of the current interactive interpreter session. For example, the interactive interpreter may display the name 919 of an NMS server to which the OSS client is currently connected (as shown in FIG. 3*i,* the OSS client is currently not connected to an NMS server) and the interactive interpreter may display the names 920 of available template types. The writeCurrent command followed by a template type and a new template name will cause the interactive interpreter to make a copy of the loaded template, including current parameter values, with the new template name. The writeTemplate command followed by a template type and a new template name, will cause the interactive interpreter to make a copy of the template with the new template name with placeholders values (i.e., <String>) that indicate the network manager needs to fill in the template with the required datatypes as parameter values. The network manager may then use the load command followed by the new template name to load the new template into the OSS client.

Figure 3J:
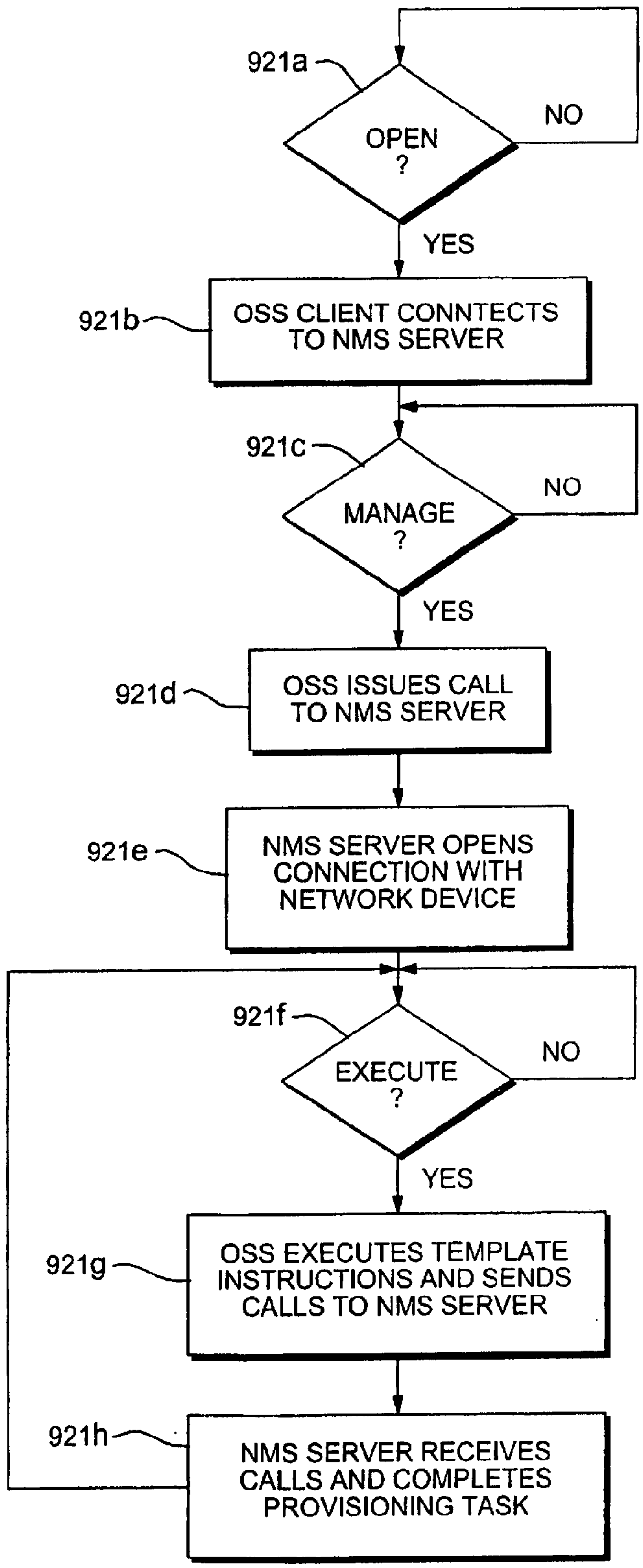

Referring to FIG. 3*j,* from the interactive interpreter prompt (e.g., Enetcli>), a network manager may interactively provision services on a network device. The network manager begins by typing an open command 921*a* followed by the IP address of an NMS server to cause the OSS client to open a connection 921*b* with that NMS server. The network manager may then issue a manage command 921*c* followed by the IP address of a particular network device to cause the OSS client to issue a call 921*d* to the NMS server to cause the NMS server to open a connection 921*e* with that network device.

The network manager may now provision services within that network device by typing in an execute command 921*f* followed by a template type. For example, the network manager may type "execute SPATH" at the Enetcli> prompt to cause the OSS client to execute the instructions 921*g* within the loaded SPATH template using the parameter values within the loaded SPATH template. Executing the instructions causes the OSS client to issue calls to the NMS server, and these calls cause the NMS server to complete the provisioning task 921*h.* For example, following an execute SPATH command, the NMS server will set up a SONET path in the network device using the parameter values passed to the NMS server by the OSS client from the template.

At any time from the Enetcli> prompt, a network manager may change the parameter values within a template. Again, the network manager may use showCurrent followed by a template type to see the current parameter values within the loaded template or showTemplate to see the available parameters within the loaded template. The network manager may then use the set command followed by the template type, parameter name and new parameter value to change a parameter value within the loaded template. For example, after the network manager sets up a SONET path within the network device, the network manager may change one or more parameter values within the loaded SPATH template and re-execute the SPATH template to set up a different SONET path within the same network device.

Once a connection to a network device is open, the network manager may interactively execute any template any number of times to provision services within that network device. The network manager may also create new templates and execute those. The network manager may simply write a new template or use the writeCurrent or writeTemplate commands to copy an existing template into a new template name and then edit the instructions within the new template.

After provisioning services within a first network device, the network manager may open a connection with a second network device to provision services within that second network device. If the NMS server currently connected to the OSS client is capable of establishing a connection with the second network device, then the network manager may simply open a connection to the second network device. If the NMS server currently connected to the OSS client is not capable of establishing a connection with the second network device, then the network manager closes the connections with the NMS server and then opens connections with a second NMS server and the second network device. Thus, a network manager may easily manage/provision services within multiple network devices within multiple networks even if they are managed by different NMS servers. In addition, other network managers may provision services on the same network devices through the same NMS servers using other OSS clients that are perhaps running on other computer systems. That is, multiple OSS clients may be connected to multiple NMS servers.

Figure 3K:
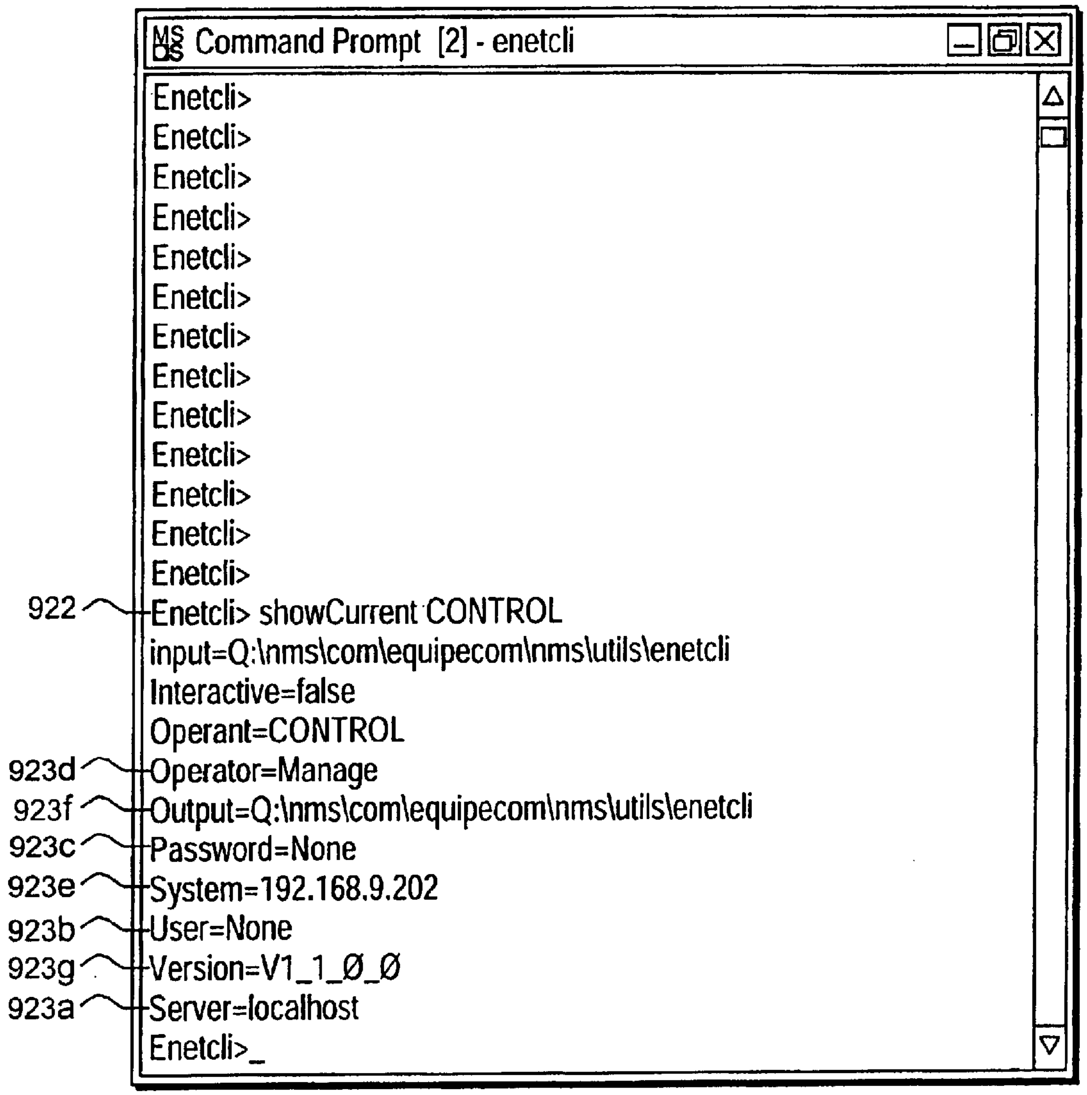

Instead of interactively establishing connections with NMS servers and network devices, control templates may be used to non-interactively establish these connections. Referring to FIG. 3*k*, using a showCurrent command 922 followed by CONTROL causes the interactive interpreter to display parameters available in the loaded CONTROL template. In one embodiment, an execute control command will automatically cause the OSS client to execute instructions within the loaded CONTROL template and open a connection to an NMS server designated within the CONTROL template. Since the OSS client automatically opens a connection with the designated NMS server, the open command may but need not be included within the CONTROL template. In this example, the CONTROL template includes "localhost" 923*a* as the DNS name of the NMS server with which the OSS client should open a connection. In one embodiment, "localhost" refers to the same system as the OSS client. A username 923*b* and password 923*c* may also need to be used to open the connection with the localhost NMS server. The CONTROL template also includes the manage command 923*d* and a network device IP address 923*e* of 192.168.9.202. With this information (and perhaps the username and password or another username and password), the OSS client issues calls to the localhost NMS server to cause the server to set up a connection with that network device.

The template may also include an output file name 923*f* where any output/status information generated in response to the execution of the CONTROL template will be sent. The template may also include a version number 923*g*. Version numbers allow a new template to be created with the same name as an old template but with a new version number, and the new template may include additional/different parameters and/or instructions. Using version numbers, both old (e.g., not upgraded) and new OSS clients may use the templates but only access those templates having particular version numbers that correspond to the functionality of each OSS client.

Once connections with an NMS server and network device are established (either interactively or non-interactively through a control template), services within the network device may be provisioned. As described above, a network manager may interactively provision services by issuing execute commands followed by provisioning template types. Alternatively, a network manager may provision services non-interactively through batch templates, which include an ordered list of tasks, including execute commands followed by provisioning template types.

Referring to FIG. 3L, a batch template type named BATCH 924 includes an ordered list of tasks, including execute commands followed by provisioning template types. When a network manager issues an execute command followed by the BATCH template type at the Enetcli> prompt, the OSS client will carry out each of the tasks within the loaded BATCH template. In this example, task1 924*a* includes "execute SPATH" which causes the OSS client to establish a SONET path within the network device to which a connection is open, task2 924*b* includes "execute PVC" to cause the OSS client to set up a permanent virtual circuit within the network device, and task3 924*c* includes "execute SPVC" to cause the OSS client to set up a soft permanent virtual circuit within the network device.

If multiple similar provisioning tasks are needed, then the network manager may use writeCurrent or writeTemplate to create multiple similar templates (i.e., same template type with different template names), change or add parameter values within these multiple similar templates using the set command, and sequentially load and execute each of the different named templates. For example, SPVC is the template type and task3 causes the OSS to execute instructions within the previously loaded named template. Spvc1 and spvc2 are two different named templates (or template instantiations) corresponding to the SPVC template type for setting up soft permanent virtual circuits having different parameters from each other and the loaded template to set up different SPVCs. In this example, the BATCH template then includes task4 924*d* including "load SPVC spvc1" to load the spvc1 template and then task5 924*e* "execute SPVC" to cause the OSS client to execute the loaded spvc1 template and set up a different SPVC. Similarly, task6 924*f* includes "load SPVC spvc2" and task7 924*e* includes "execute SPVC" to cause the OSS client to execute the loaded spvc2 template and set up yet another different SPVC.

Alternatively, the batch template may include commands for altering an existing template such that multiple similar templates are not necessary. For example, the loaded BATCH template may include task50 924*g* "set SPATH PortID 3" to cause the OSS client to change the PortID parameter within the SPATH template to 3. The BATCH template then includes task51 924*h* "execute SPATH" 924*g* to cause the OSS client to execute the SPATH template including the new parameter value which sets up a different SONET path. A BATCH template may include many set commands to change parameter values followed by execute commands to provision multiple similar services within the same network device. For example, the BATCH template may further include task52 924*i* "set SPATH SlotID 2" followed by task53 924*j* "execute SPATH" to set up yet another different SONET path. Using this combination of set and execute commands eliminates the need to write, store and keep track of multiple similar templates.

Batch templates may also be used to non-interactively provision services within multiple different network devices by ordering and sequencing tasks including execute commands followed by control template types and then execute commands followed by provisioning template types. Referring to FIG. 3M, instead of non-interactively establishing connections with an NMS server and a network device using a control template, a batch template may be used. For example, the first task in a loaded BATCH template 925 may be task1 925a "execute CONTROL". This will cause the OSS client to execute the loaded CONTROL template to establish connections with the NMS server and the network device designated within the loaded CONTROL template (e.g., localhost and 192.168.9.202). The BATCH template then includes provisioning tasks, for example, task2 925_b_ includes "execute SPATH" to set up a SONET path, and task3 925_c_ includes "set SPATH PortID 3" and task4 925_d_ includes "execute SPATH" to set up a different SONET path. Many additional provisioning tasks for this network device may be completed in this way.

The BATCH template may then have a task including a set command to modify one or more parameters within a control template to cause the OSS client to set up a connection with a different network device and perhaps a different NMS server. Where the network manager wishes to provision a network device capable of being connected to through the currently connected NMS server, for example, localhost, then the BATCH template need only have task61 925_e_ including "set CONTROL System" followed by the IP address of the different network device, for example, 192.168.9.201. The BATCH template then has a task62 925_f_ including "execute CONTROL", which causes the OSS client to issue calls to the localhost NMS server to establish a connection with the different network device. The BATCH template may then have tasks including execute commands followed by provisioning templates, for example, task63 925_g_ including "execute SPATH", to provision services within the different network device.

If the network manager wishes to provision a network device coupled with another NMS server, then the BATCH template includes, for example, task108 925_h_ including "close" to drop the connection between the OSS client and localhost NMS server. The BATCH template may then have, for example, task109 925_i_ including "set CONTROL Server Server1" to change the server parameter within the loaded CONTROL template to Server1 and task110 925_j_ including "set CONTROL System 192.168.8.200" to change the network device parameter within the loaded CONTROL template to the IP address of the new network device. The BATCH template may then have task111 925_k_ including "execute CONTROL" to cause the OSS client to set up connections to the Server1 NMS server and to network device 192.168.8.200. The BATCH template may then include tasks with execute commands followed by provisioning template types to provision services within the network device, for example, task112 925L includes "execute SPATH".

The templates and interactive interpreter/OSS client may be loaded and executed on a central OSS computer system (s) and used to provision services in one or more network devices in one or more network domains. A network administrator may install an OSS client at various locations and/or for "manage anywhere" purposes, web technology may be used to allow a network manager to download an OSS client program from a web accessible server onto a computer at any location. The network manager may then use the OSS client in the same manner as when it is loaded onto a central OSS computer system. Thus, the network manager may provision services from any computer at any location.

Provisioning templates may be written to apply to different types of network devices. The network administrator does not need to know details of the network device being provisioned as the parameters required and available for modification are listed in the various templates. Consequently, the templates allow for multifaceted integration of different network management systems (NMS) into existing OSS infrastructures.

Instead of using template executable files and an OSS client, network managers may prefer to use their standard OSS interface to provision services in various network devices. In one embodiment, therefore, a single OSS client application programming interface (API) and a library of compiled code may be linked directly into the OSS software. The library of compiled code is a subset of the compiled code used to create the OSS client, with built-in templates including provisioning, control, batch and other types of templates. The OSS software then uses the supported templates as documentation of the necessary parameters needed for each provisioning task and presents template streams (null terminated arrays of arguments that serialize the totality of arguments required to construct a supported template) via the single API for potential alteration through the OSS standard interface. Since the network managers are comfortable working with the OSS interface, provisioning services may be made more efficient and simple by directly linking the OSS client API and templates into the OSS software.

Typically, OSS software is written in C or C++ programming language. In one embodiment, the OSS client and templates are written in JAVA, and JAVA Native Interface (JNI) is used by the OSS software to access the JAVA OSS client API and templates.

Inter-Process Communication

As described above, the operating system assigns a unique process identification number (proc_id) to each spawned process. Each process has a name, and each process knows the names of other processes with which it needs to communicate. The operating system keeps a list of process names and the assigned process identification numbers. Processes send messages to other processes using the assigned process identification numbers without regard to what board is executing each process (i.e., process location). Application Programming Interfaces (APIs) define the format and type of information included in the messages.

The modular software architecture configuration model requires a single software process to support multiple configurable objects. For example, as described above, an ATM application may support configurations requiring multiple ATM interfaces and thousands of permanent virtual connections per ATM interface. The number of processes and configurable objects in a modular software architecture can quickly grow especially in a distributed processing system. If the operating system assigns a new process for each configurable object, the operating system's capabilities may be quickly exceeded. For example, the operating system may be unable to assign a process for each ATM interface, each service endpoint, each permanent virtual circuit, etc. In some instances, the process identification numbering scheme itself may not be large enough. Where protected memory is supported, the system may have insufficient memory to assign each process and configurable object a separate memory block. In addition, supporting a large number of independent processes may reduce the operating system's efficiency and slow the operation of the entire computer system.

One alternative is to assign a unique process identification number to only certain high level processes. Referring to FIG. 16_a_, for example, process identification numbers may only be assigned to each ATM process (e.g., ATMs 240, 241) and not to each ATM interface (e.g., ATM IFs 242–247) and process identification numbers may only be assigned to each port device driver (e.g., device drivers 248, 250, 252) and not to each service endpoint (e.g., SE 253–261). A disadvantage to this approach is that objects within one high level process will likely need to communicate with objects within other high level processes. For example, ATM interface 242 within ATM 240 may need to communicate with SE 253 within device driver 248. ATM IF 242 needs to know if SE 253 is active and perhaps certain other information about SE 253. Since SE 253 was not assigned a process identification number, however, neither ATM 240 nor ATM IF 242 knows if it exists. Similarly, ATM IF 242 knows it needs to communicate with SE 253 but does not know that device driver 248 controls SE 253.

One possible solution is to hard code the name of device driver 248 into ATM 240. ATM 240 then knows it must communicate with device driver 248 to learn about the existence of any service endpoints within device driver 248 that may be needed by ATM IF 242, 243 or 244. Unfortunately, this can lead to scalability issues. For instance, each instantiation of ATM (e.g., ATM 240, 241) needs to know the name of all device drivers (e.g., device drivers 248, 250, 252) and must query each device driver to locate each needed service endpoint. An ATM query to a device driver that does not include a necessary service endpoint is a waste of time and resources. In addition, each high level process must periodically poll other high level processes to determine whether objects within them are still active (i.e., not terminated) and whether new objects have been started. If the object status has not changed between polls, then the poll wasted resources. If the status did change, then communications have been stalled for the length of time between polls. In addition, if a new device driver is added (e.g., device driver 262), then ATM 240 and 241 cannot communicate with it or any of the service endpoints within it until they have been upgraded to include the new device driver's name.

Preferably, computer system 10 implements a name server process and a flexible naming procedure. The name server process allows high level processes to register information about the objects within them and to subscribe for information about the objects with which they need to communicate. The flexible naming procedure is used instead of hard coding names in processes. Each process, for example, applications and device drivers, use tables in the configuration database to derive the names of other configurable objects with which they need to communicate. For example, both an ATM application and a device driver process may use an assigned service endpoint number from the service endpoint table (SET) to derive the name of the service endpoint that is registered by the device driver and subscribed for by the ATM application. Since the service endpoint numbers are assigned by the NMS during configuration, stored in SET 76 and passed to local SEMs, they will not be changed if device drivers or applications are upgraded or restarted.

Figure 16A:
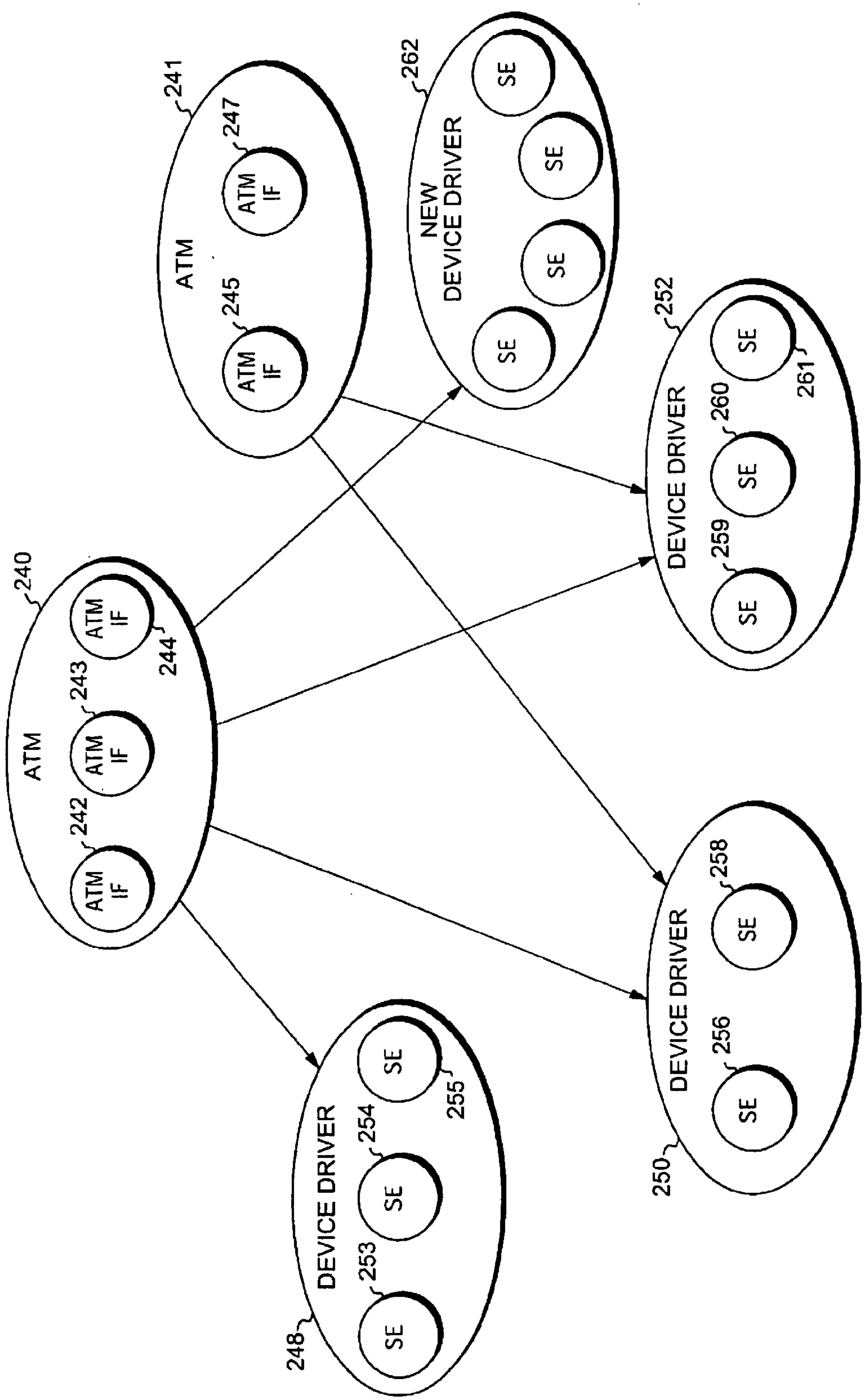
FIGS. 16*a*–16*b* are flow diagrams illustrating a method for assigning logical names for inter-process communications.
Figure 16B:
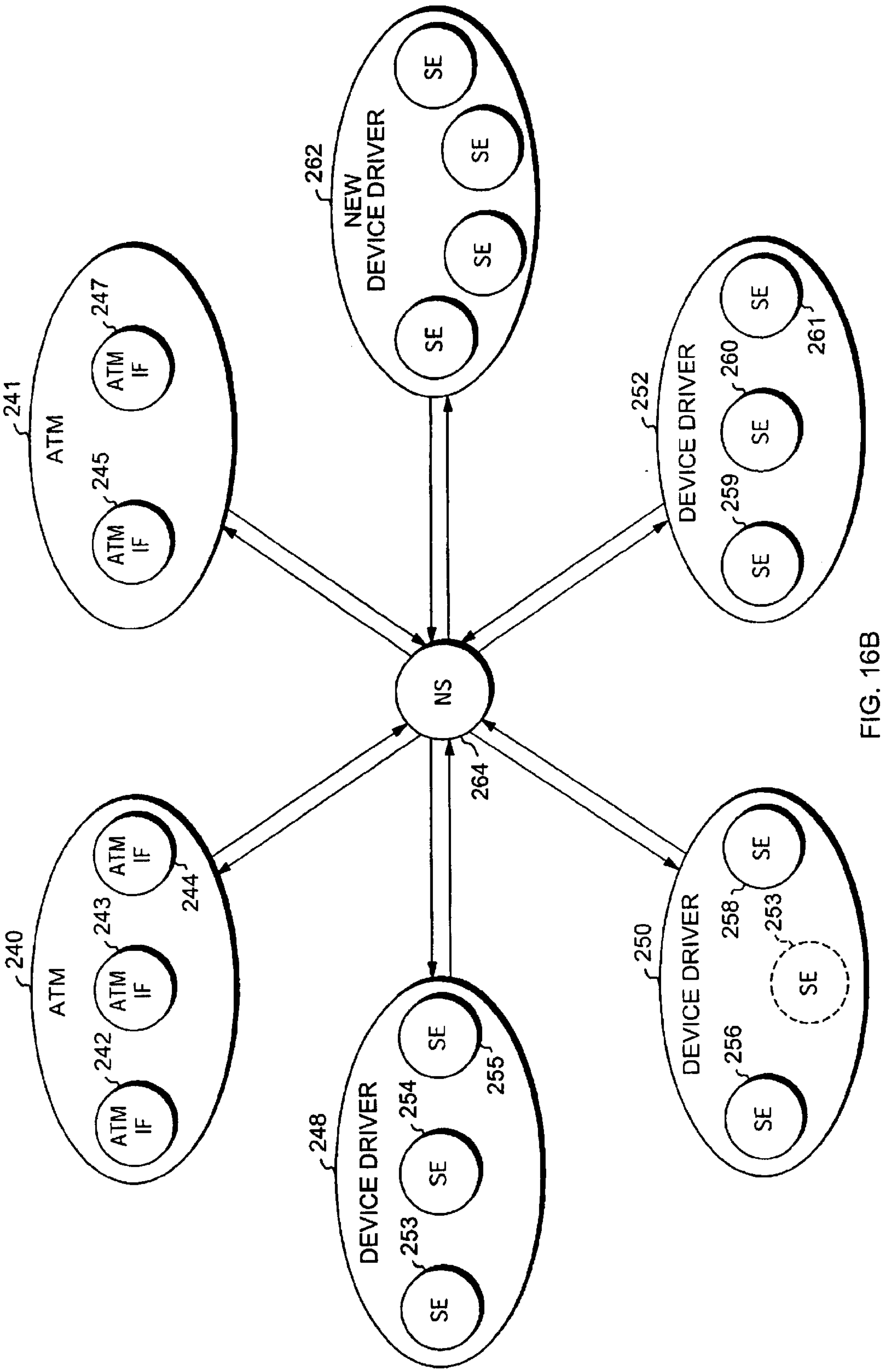

Referring to FIG. 16*b*, for example, when device drivers 248, 250 and 252 are started they each register with name server (NS) 264. Each device driver provides a name, a process identification number and the name of each of its service endpoints. Each device driver also updates the name server as service endpoints are started, terminated or restarted. Similarly, each instantiation of ATM 240, 241 subscribes with name server 264 and provides its name, process identification number and the name of each of the service endpoints in which it is interested. The name server then notifies ATM 240 and 241 as to the process identification of the device driver with which they should communicate to reach a desired service endpoint. The name server updates ATM 240 and 241 in accordance with updates from the device drivers. As a result, updates are provided only when necessary (i.e., no wasted resources), and the computer system is highly scalable. For example, if a new device driver 262 is started, it simply registers with name server 264, and name server 264 notifies either ATM 240 or 241 if a service endpoint in which they are interested is within the new device driver. The same is true if a new instantiation of ATM—perhaps an upgraded version—is started or if either an ATM application or a device driver fails and is restarted.

Figure 16C:
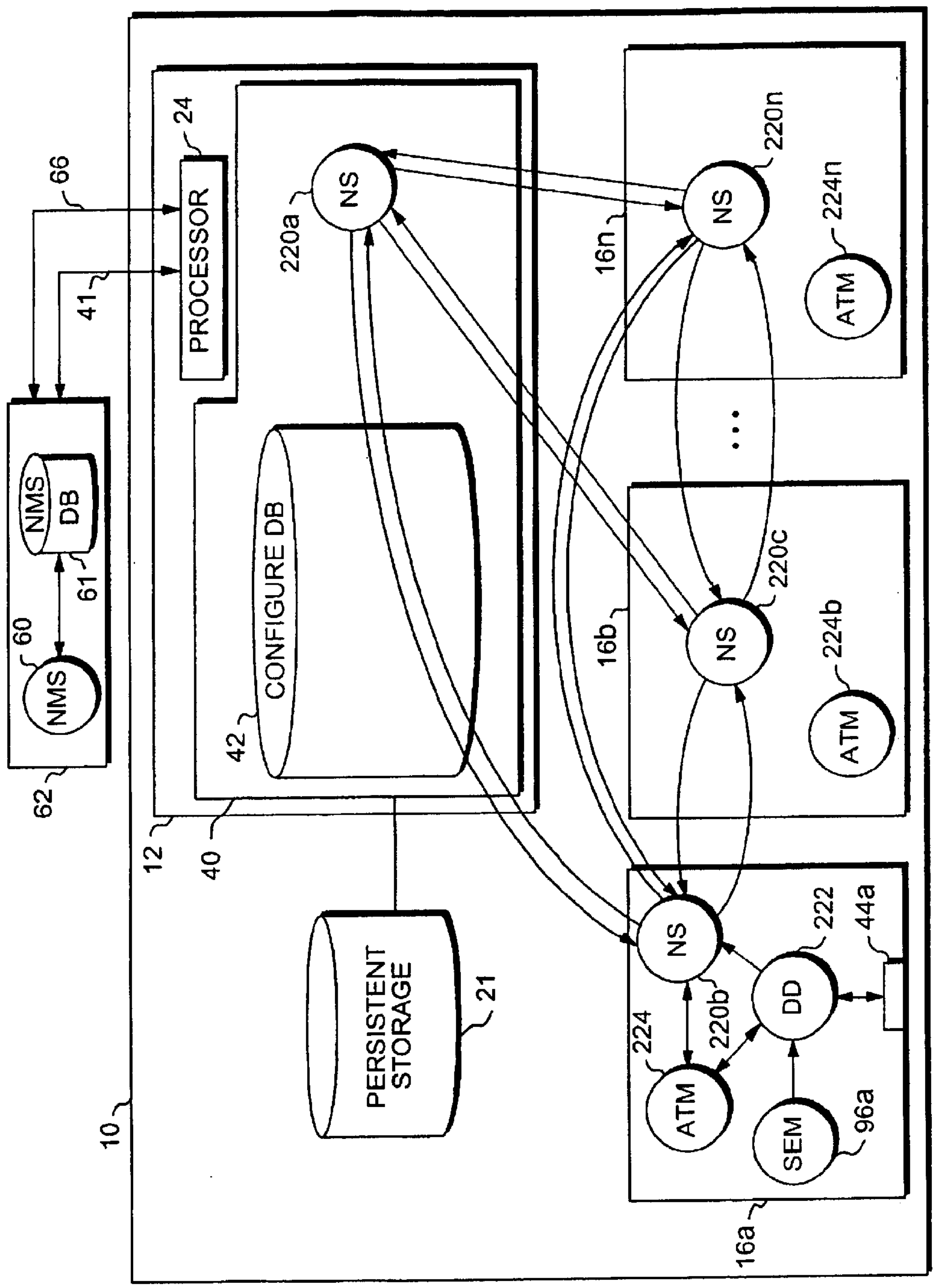
FIG. 16*c* is a block and flow diagram of a computer system incorporating a modular system architecture and illustrating a method for using logical names for inter-process communications.

Referring to FIG. 16*c*, when the SEM, for example, SEM 96*a*, notifies a device driver, for example, device driver (DD) 222, of its assigned SE number, DD 222 uses the SE number to generate a device driver name. In the continuing example from above, where the ATM over SONET protocol is to be delivered to port 44*a* and DD 222, the device driver name may be for example, atm.se1. DD 222 publishes this name to NS 220*b* along with the process identification assigned by the operating system and the name of its service endpoints.

Applications, for example, ATM 224, also use SE numbers to generate the names of device drivers with which they need to communicate and subscribe to NS 220*b* for those device driver names, for example, atm.se1. If the device driver has published its name and process identification with NS 220*b*, then NS 220*b* notifies ATM 224 of the process identification number associated with atm.se1 and the name of its service endpoints. ATM 224 can then use the process identification to communicate with DD 222 and, hence, any objects within DD 222. If device driver 222 is restarted or upgraded, SEM 96*a* will again notify DD 222 that its associated service endpoint is SE 1 which will cause DD 222 to generate the same name of atm.se1. DD 222 will then re-publish with NS 220*b* and include the newly assigned process identification number. NS 220*b* will provide the new process identification number to ATM 224 to allow the processes to continue to communicate. Similarly, if ATM 224 is restarted or upgraded, it will use the service endpoint numbers from ATM interface table 114 and, as a result, derive the same name of atm.se1 for DD 222. ATM 224 will then re-subscribe with NS 220*b*.

Computer system 10 includes a distributed name server (NS) application including a name server process 220*a*–220*n* on each board (central processor and line card). Each name server process handles the registration and subscription for the processes on its corresponding board. For distributed applications, after each application (e.g., ATM 224*a*–224*n*) registers with its local name server (e.g., 220*b*–220*n*), the name server registers the application with each of the other name servers. In this way, only distributed applications are registered/subscribed system wide which avoids wasting system resources by registering local processes system wide.

The operating system, through the use of assigned process identification numbers, allows for inter-process communication (IPC) regardless of the location of the processes within the computer system. The flexible naming process allows applications to use data in the configuration database to determine the names of other applications and configurable objects, thus, alleviating the need for hard coded process names. The name server notifies individual processes of the existence of the processes and objects with which they need to communicate and the process identification numbers needed for that communication. The termination, re-start or upgrade of an object or process is, therefore, transparent to other processes, with the exception of being notified of new process identification numbers. For example, due to a configuration change initiated by the user of the computer system, service endpoint 253 (FIG. 16*b*), may be terminated within device driver 248 and started instead within device driver 250. This movement of the location of object 253 is transparent to both ATM 240 and 241. Name server 264 simply notifies whichever processes have subscribed for SE 253 of the newly assigned process identification number corresponding to device driver 250.

The name server or a separate binding object manager (BOM) process may allow processes and configurable objects to pass additional information adding further flexibility to inter-process communications. For example, flexibility may be added to the application programming interfaces (APIs) used between processes. As discussed above, once a process is given a process identification number by the name server corresponding to an object with which it needs to communicate, the process can then send messages to the other process in accordance with a predefined application programming interface (API). Instead of having a predefined API, the API could have variables defined by data passed through the name server or BOM, and instead of having a single API, multiple APIs may be available and the selection of the API may be dependent upon information passed by the name server or BOM to the subscribed application.

Figure 16D:
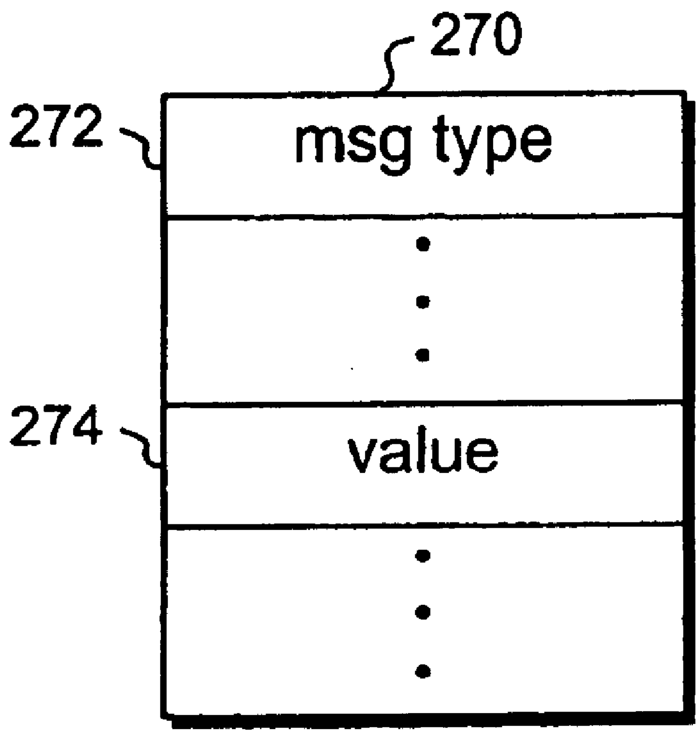
FIG. 16*d* is a chart representing a message format.

Referring to FIG. 16*d,* a typical API will have a predefined message format 270 including, for example, a message type 272 and a value 274 of a fixed number of bits (e.g., 32). Processes that use this API must use the predefined message format. If a process is upgraded, it will be forced to use the same message format or change the API/message format which would require that all processes that use this API also be similarly upgraded to use the new API. Instead, the message format can be made more flexible by passing information through the name server or BOM. For example, instead of having the value field 274 be a fixed number of bits, when an application registers a name and process identification number it may also register the number of bits it plans on using for the value field (or any other field). Perhaps a zero indicates a value field of 32 bits and a one indicates a value filed of 64 bits. Thus, both processes know the message format but some flexibility has been added.

In addition to adding flexibility to the size of fields in a message format, flexibility may be added to the overall message format including the type of fields included in the message. When a process registers its name and process identification number, it may also register a version number indicating which API version should be used by other processes wishing to communicate with it. For example, device driver 250 (FIG. 16*b*) may register SE 258 with NS 264 and provide the name of SE 258, device driver 250's process identification number and a version number one, and device driver 252 may register SE 261 with NS 264 and provide the name of SE 261, device driver 252's process identification number and a version number (e.g., version number two). If ATM 240 has subscribed for either SE 258 or SE 261, then NS 264 notifies ATM 240 that SE 258 and SE 261 exist and provides the process identification numbers and version numbers. The version number tells ATM 240 what message format and information SE 258 and SE 261 expect. The different message formats for each version may be hard coded into ATM 240 or ATM 240 may access system memory or the configuration database for the message formats corresponding to service endpoint version one and version two. As a result, the same application may communicate with different versions of the same configurable object using a different API.

This also allows an application, for example, ATM, to be upgraded to support new configurable objects, for example, new ATM interfaces, while still being backward compatible by supporting older configurable objects, for example, old ATM interfaces. Backward compatibility has been provided in the past through revision numbers, however, initial communication between processes involved polling to determine version numbers and where multiple applications need to communicate, each would need to poll the other. The name server/BOM eliminates the need for polling.

As described above, the name server notifies subscriber applications each time a subscribed for process is terminated. Instead, the name server/BOM may not send such a notification unless the System Resiliency Manager (SRM) tells the name server/BOM to send such a notification. For example, depending upon the fault policy/resiliency of the system, a particular software fault may simply require that a process be restarted. In such a situation, the name server/BOM may not notify subscriber applications of the termination of the failed process and instead simply notify the subscriber applications of the newly assigned process identification number after the failed process has been restarted. Data that is sent by the subscriber processes after the termination of the failed process and prior to the notification of the new process identification number may be lost but the recovery of this data (if any) may be less problematic than notifying the subscriber processes of the failure and having them hold all transmissions. For other faults, or after a particular software fault occurs a predetermined number of times, the SRM may then require the name server/BOM to notify all subscriber processes of the termination of the failed process. Alternatively, if a terminated process does not re-register within a predetermined amount of time, the name server/BOM may then notify all subscriber processes of the termination of the failed process.

Configuration Change

Over time the user will likely make hardware changes to the computer system that require configuration changes. For example, the user may plug a fiber or cable (i.e., network connection) into an as yet unused port, in which case, the port must be enabled and, if not already enabled, then the port's line card must also be enabled. As other examples, the user may add another path to an already enabled port that was not fully utilized, and the user may add another line card to the computer system. Many types of configuration changes are possible, and the modular software architecture allows them to be made while the computer system is running (hot changes). Configuration changes may be automatically copied to persistent storage as they are made so that if the computer system is shut down and rebooted, the memory and configuration database will reflect the last known state of the hardware.

To make a configuration change, the user informs the NMS (e.g., NMS client 850*a,* FIG. 2*a*) of the particular change, and similar to the process for initial configuration, the NMS (e.g., NMS server 851*a,* FIG. 2*a*) changes the appropriate tables in the configuration database (copied to the NMS database) to implement the change.

Figure 17:
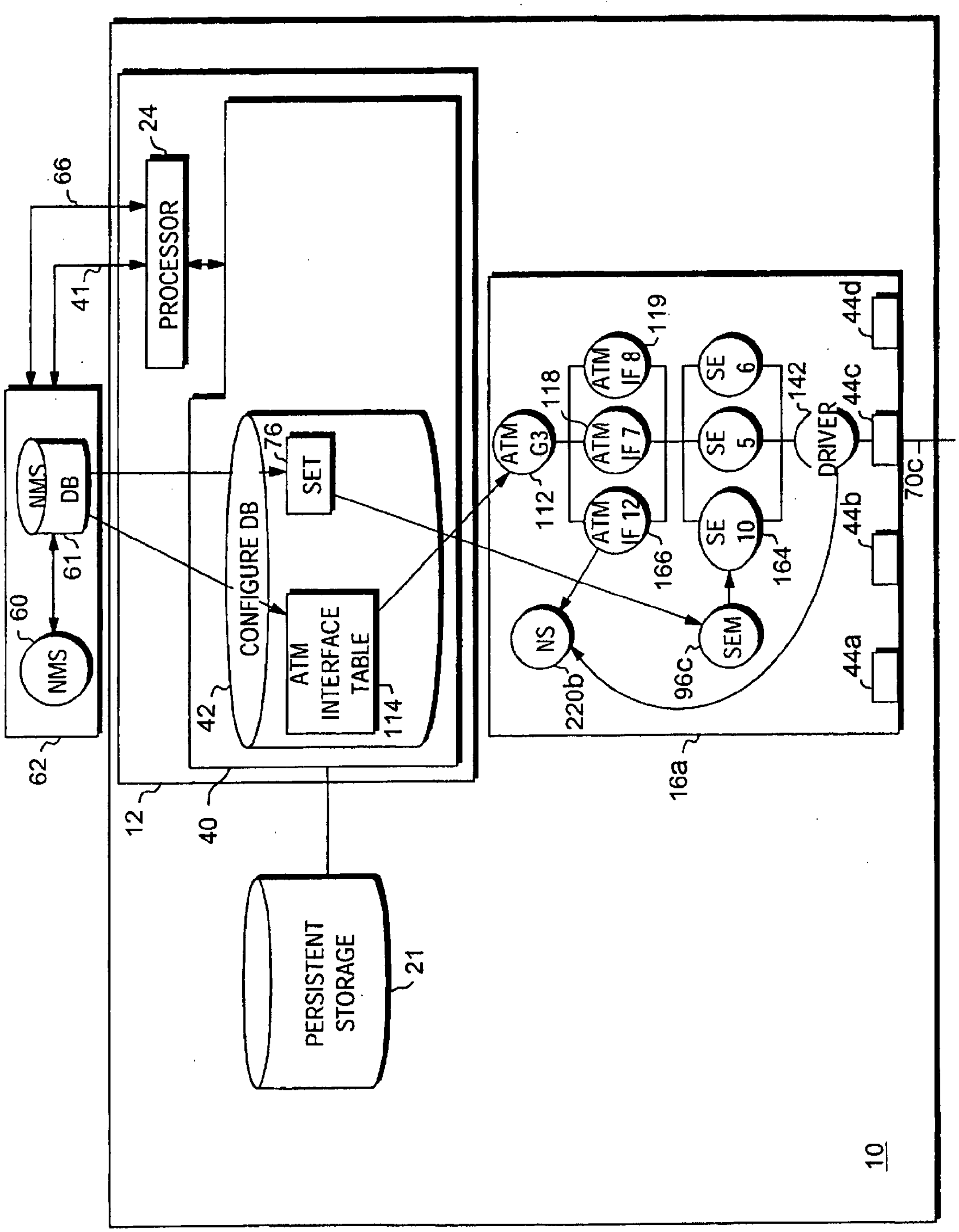
FIGS. 17–19 are block and flow diagrams of a computer system incorporating a modular system architecture and illustrating methods for making configuration changes.

Referring to FIG. 17, in one example of a configuration change, the user notifies the NMS that an additional path will be carried by SONET fiber 70*c* connected to port 44*c*. A new service endpoint (SE) 164 and a new ATM interface 166 are needed to handle the new path. The NMS adds a new record (row 168, FIG. 14*a*) to service endpoint table (SET) 76 to include service endpoint 10 corresponding to port physical identification number (PID) 1502 (port 44*c*). The NMS also adds a new record (row 170, FIG. 14*e*) to ATM instance table 114 to include ATM interface (IF) 12 corresponding to ATM group 3 and SE 10. Configuration database 42 may automatically copy the changes made to SET 76 and ATM instance table 114 to persistent storage 21 such that if the computer system is shut down and rebooted, the changes to the configuration database will be maintained.

Configuration database 42 also notifies (through the active query process) SEM 96c that a new service endpoint (SE 10) was added to the SET corresponding to its port (PID 1502), and configuration database 42 also notifies ATM instantiation 112 that a new ATM interface (ATM-IF 166) was added to the ATM interface table corresponding to ATM group 3. ATM 112 establishes ATM interface 166 and SEM 96c notifies port driver 142 that it has been assigned SE10. A communication link is established through NS 220b. Device driver 142 generates a service endpoint name using the assigned SE number and publishes this name and its process identification number with NS 220b. ATM interface 166 generates the same service endpoint name and subscribes to NS 220b for that service endpoint name. NS 220b provides ATM interface 166 with the process identification assigned to DD 142 allowing ATM interface 166 to communicate with device driver 142.

Certain board changes to computer system 10 are also configuration changes. After power-up and configuration, a user may plug another board into an empty computer system slot or remove an enabled board and replace it with a different board. In the case where applications and drivers for a line card added to computer system 10 are already loaded, the configuration change is similar to initial configuration. The additional line card may be identical to an already enabled line card, for example, line card 16a or if the additional line card requires different drivers (for different components) or different applications (e.g., IP), the different drivers and applications are already loaded because computer system 10 expects such cards to be inserted.

Figure 18:
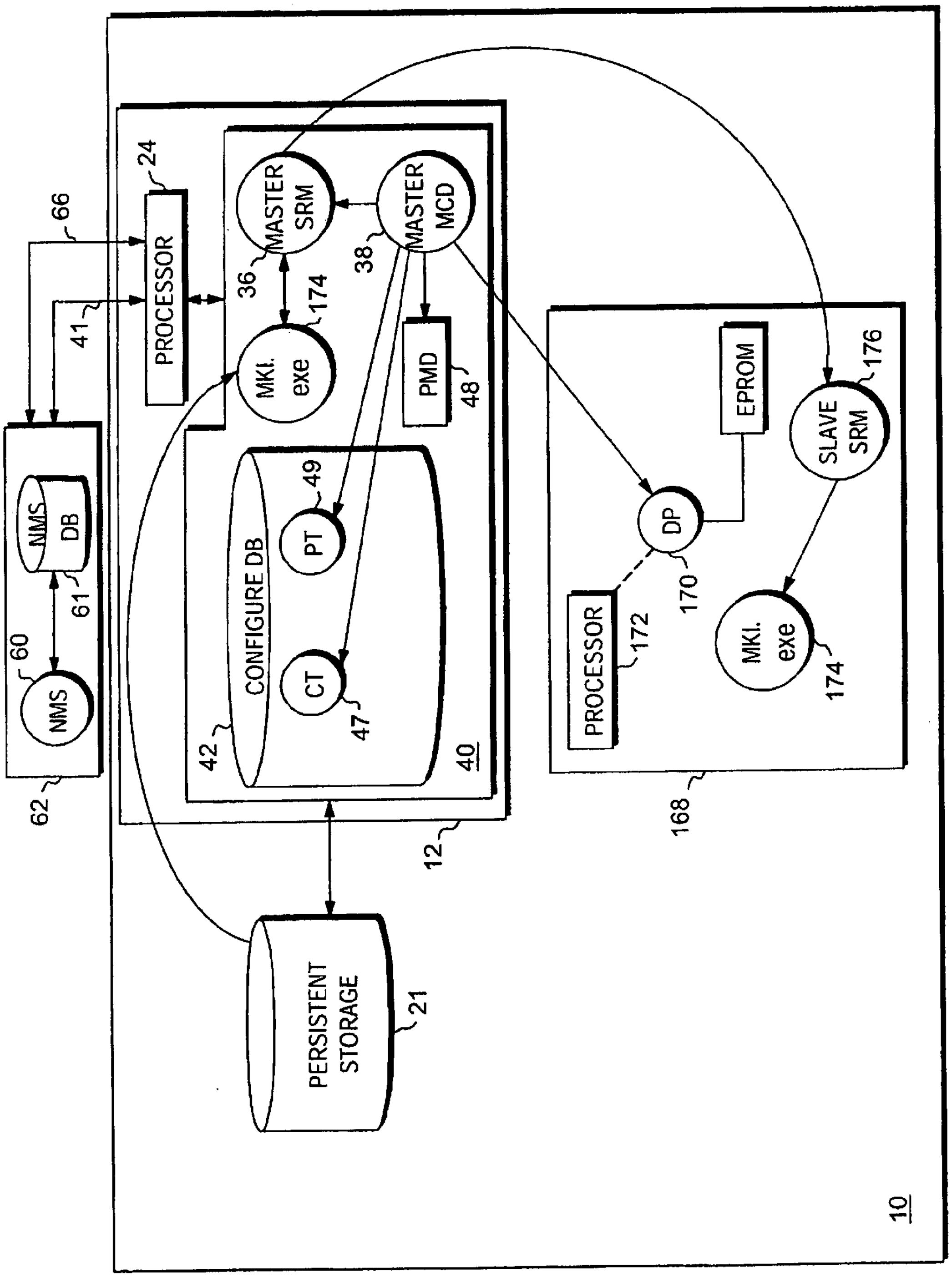

Referring to FIG. 18, while computer system 10 is running, when another line card 168 is inserted, master MCD 38 detects the insertion and communicates with a diagnostic program 170 being executed by the line card's processor 172 to learn the card's type and version number. MCD 38 uses the information it retrieves to update card table 47 and port table 49. MCD 38 then searches physical module description (PMD) file 48 in memory 40 for a record that matches the retrieved card type and version number and retrieves the name of the mission kernel image executable file (MKI.exe) that needs to be loaded on line card 168. Once determined, master MCD 38 passes the name of the MKI executable file to master SRM 36. SRM 36 downloads MKI executable file 174 from persistent storage 21 and passes it to a slave SRM 176 running on line card 168. The slave SRM executes the received MKI executable file.

Figure 19:
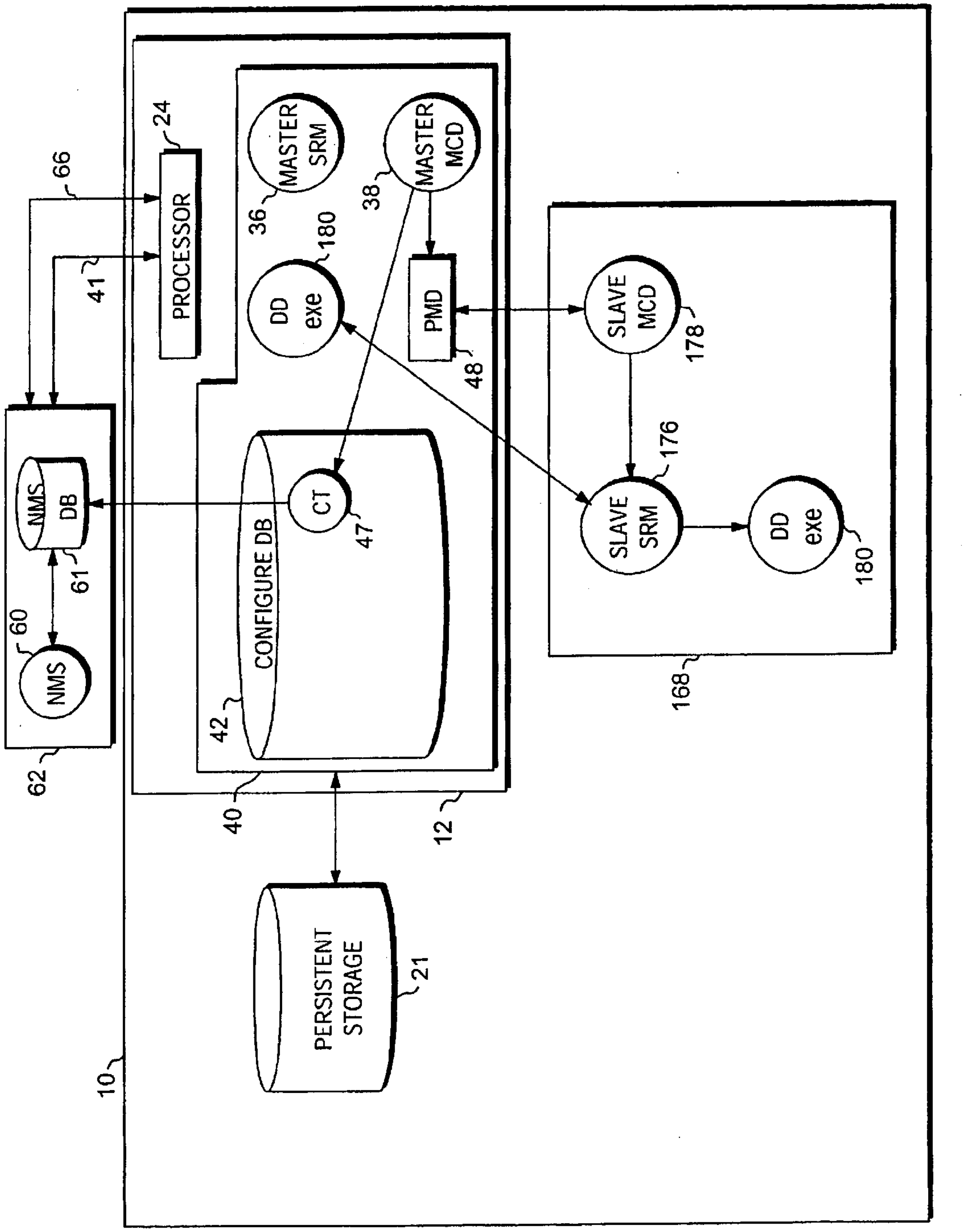

Referring to FIG. 19, slave MCD 178 then searches PMD file 48 in memory 40 on central processor 12 for a match with its line card's type and version number to find the names of all the device driver executable files needed by its line card. Slave MCD 178 provides these names to slave SRM 176 which then downloads and executes the device driver executable files (DD.exe) 180 from memory 40.

When master MCD 38 updates card table 47, configuration database 42 updated NMS database 61 which sends NMS 60 (e.g., NMS Server 851a, FIG. 2a) a notification of the change including card type and version number, the slot number into which the card was inserted and the physical identification (PID) assigned to the card by the master MCD. The NMS is updated, assigns an LID and updates the logical to physical table and notifies the user of the new hardware. The user then tells the NMS how to configure the new hardware, and the NMS implements the configuration change as described above for initial configuration.

Logical Model Change

Where software components, including applications, device drivers, modular system services, new mission kernel images (MKIs) and diagnostic software, for a new hardware module (e.g., a line card) are not already loaded and/or if changes or upgrades (hereinafter "upgrades") to already loaded software components are needed, logical model 280 (FIGS. 3a–3b) must be changed and new view ids and APIs, NMS JAVA interface files, persistent layer metadata files and new DDL files may need to be re-generated. Software model 286 is changed to include models of the new or upgraded software, and hardware model 284 is changed to include models of any new hardware. New logical model 280' is then used by code generation system 336 to re-generate view ids and APIs for any changed software components, including any new applications, for example, ATM version two 360, or device drivers, for example, device driver 362, and, where necessary, to re-generate DDL files 344' and 348' including new SQL commands and data relevant to the new hardware and/or software. The new logical model is also used to generate, where necessary, new NMS JAVA interface files 347' and new persistent layer metadata files 349'.

Each executable software component is then built. As described above with reference to FIG. 3d, the build process involves compiling one or more source code files for the software component and then linking the resulting object code with the object code of associated libraries, a view id, an API, etc. to form an executable file. Each of the executable files and data files, for example, persistent layer metadata files and DDL files, are then provided to Kit Builder (861, FIG. 3e), which combines the components into a Network Device Installation Kit. As previously mentioned, the Kit Builder may compress each of the software components to save space. Each Installation Kit is assigned a Global release version number to distinguish between different Installation Kits.

Figure 20A:
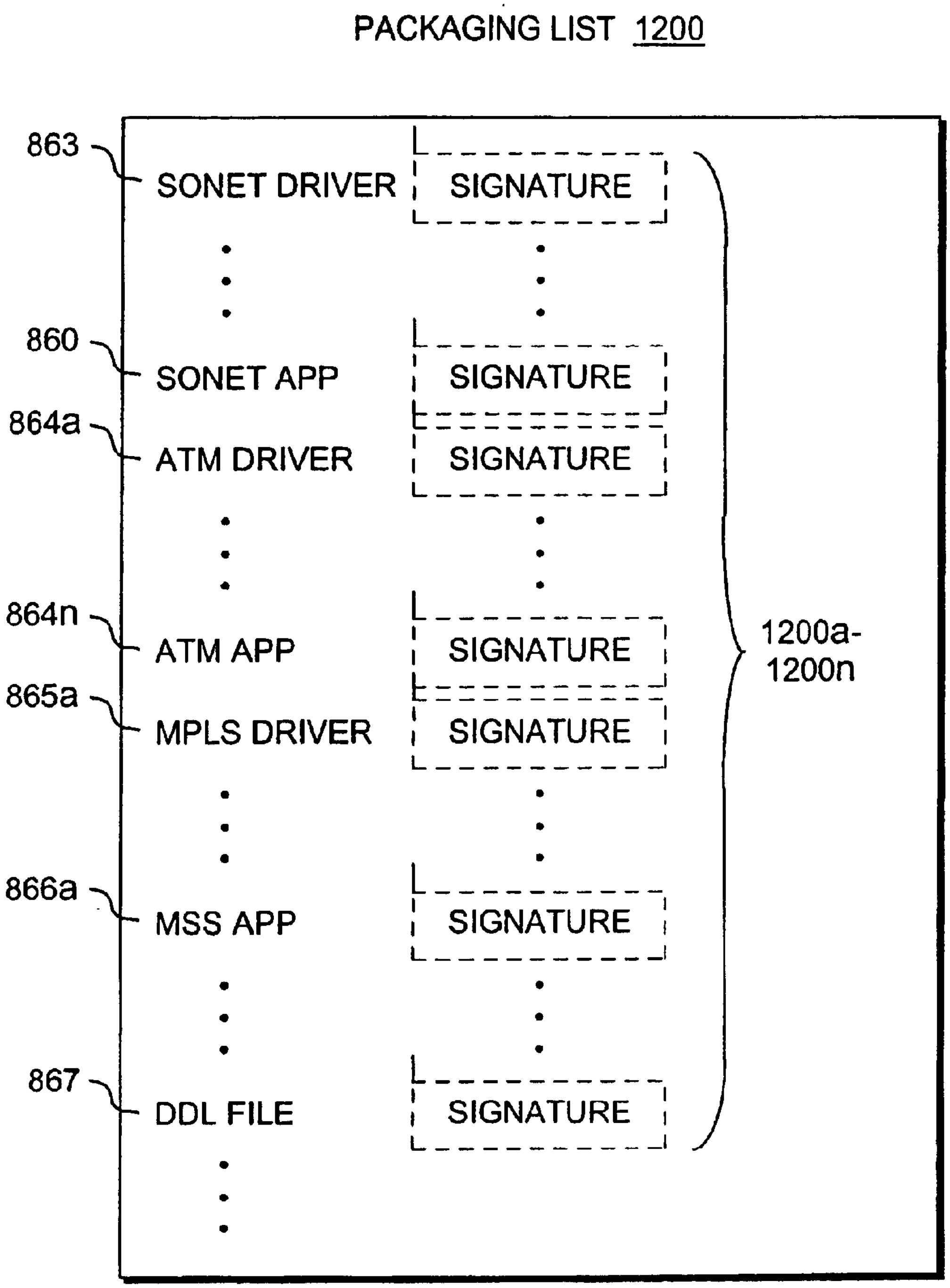
FIG. 20*a* is a block diagram of a packaging list.

The Kit Builder also creates a packaging list 1200 (FIG. 20a) and includes this in the Installation Kit. The packaging list includes a list of the software components in the Installation Kit and a list of "signatures" 1200a–1200n associated with the software components.

Software Component Signatures

To facilitate upgrades of software components while the network device (e.g., 10, FIG. 1; 540, FIG. 35) is running (hot upgrades), a "signature" is generated for each software component. After installation (described below) within the network device of a new Installation Kit, only those software components whose signatures do not match the signatures of corresponding and currently executing software components will be upgraded. For example, different signatures associated with two ATM components represent different versions of those two ATM components.

Currently, software programmers assign a different version number to a software component when they change a software component. Since, the versioning process is controlled by or requires human intervention, this process is error prone. For example, if a changed software component is not assigned a new version number, then it may not be upgraded with other changed applications. If one or more of the upgraded applications work with the application that was not upgraded, errors and potentially a network device crash may occur. To avoid versioning errors, instead of assigning a version number, a signature is "machine generated" based on the content of the software component.

A simple program such as a checksum or cyclic redundancy checking (CRC) program may be used to generate the signature. The concern with such a simple program is that it may generate the same signature for a current software component and an upgrade of that component if the upgrade changes are not significant. Instead, a more robust program, such as a strong cryptographic program, may be used to generate the signatures for each software component. In one embodiment, the signatures are generated using the "Sha-1" cryptography utility (often called the "sha1sum"). Information regarding Sha-1, which is herein incorporated by reference, and a copy of Sha-1 may be located by citizens or permanent residents of the United States and Canada from the North American Cryptography Archives at www.cryptography.org. This web site also points to various other web sites for access to cryptographic programs available outside the United States and Canada.

The Sha-1 utility is a secure hash algorithm that uses the contents of a software component to generate a signature that is 20 bytes in length. The Sha-1 utility is robust enough to detect even small changes to a software component and, thus, generate a different signature. Due to the sensitivity of the Sha-1 utility, the signature may also be referred to as a "finger print" or a "digest". Using the Sha-1 utility or another signature generating program, eliminates the errors often caused when humans generate version numbers.

Other signature generating programs may also be used. For example, hash functions such as MD2, MD4, MD5 or Ripemd128 or Ripemd160 may be used or a keyed hash function, such as HMAC, may be used with any of these hash functions. MD5 will produce a 128-bit "fingerprint" or "message digest" for each software component. Information regarding MD5, which is herein incorporated by reference, may be gotten from the following web site: http://userpages.umbc.edu/~mabzug1/cs/md5/md5.html. Ripemd128 produces a 16 byte digest and Ripemd169 produces a 20 byte digest. Information regarding Ripemd128 or Ripemd160, which is herein incorporated by reference, may be found at the following web site: http://www.esat.kuleuven.ac.be/~bosselae/ripemd160.html#What.

Figure 20B:
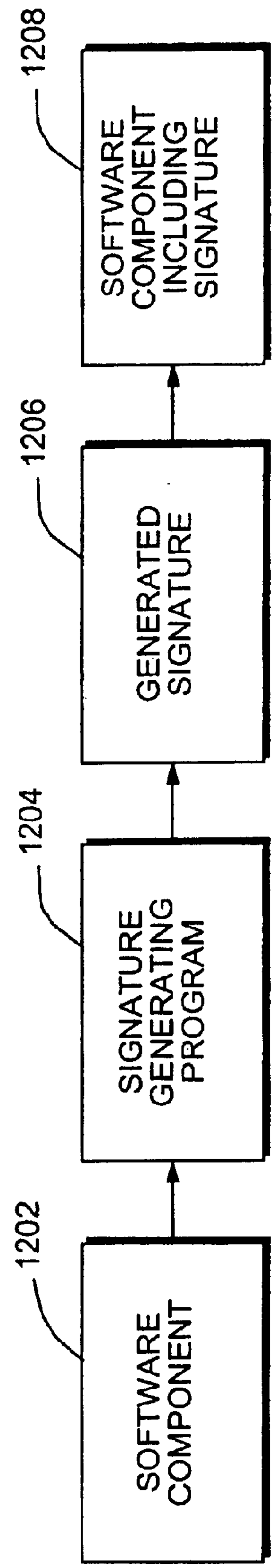
FIG. 20*b* is a flow diagram of a software component signature generating process.

Referring to FIG. 20*b,* once a software component 1202 is built, it is passed to the signature generating program 1204, for example, the Sha-1 utility. The number generated by the signature generating program is the signature 1206 for that software component and it is appended to the built software component 1208. These steps are repeated for each software component added to the packaging list, and as Kit Builder 861 (FIG. 3*e*) adds each software component to the packaging list, it retrieves the signature appended to each software component and inserts it in the packaging list corresponding to the appropriate software component.

Often build programs, including the compiler and the linker, insert a date and time or other extraneous data in a built software component. In addition, other "profile" type data may also be appended to each software component such as the name of the user who executed the build, the Global version number for the new release, the configuration specification used for the build and various other data. Such extraneous data may cause the signature generating program to generate different signatures for a software component built at one time and then re-built at another time even if the software component itself has not been changed. To avoid this, the signature generating program may be given the built software component with the extraneous data stripped out or with the extraneous data blocked out such that the signature generating program will not consider it when generating the signature.

Certain software components are not built, such as meta data files, for example, PMD file 48 (FIG. 12*a*). These software components are also passed to the signature generating program, and the generated signature is appended to the file. Similar to the built software components, the Kit Builder adds these software components to the packaging list, retrieves the signature appended to each software component and inserts it in the packaging list corresponding to the appropriate software component.

The signatures within the packaging list are used after installation of the new Installation Kit within the network device to determine which software components need to be upgraded. Since each new Installation Kit may include all software components required by the network device, including unchanged and changed software components, a hot upgrade is only practical if the changed software components may be easily and accurately identified. For example, an Installation Kit may include a large number of software components, such as 50–60 load modules, 2–3 kernels and 10–15 meta data files. If changed software components cannot be identified, then the network device will need to be rebooted in order to implement all the software components in the new Installation Kit. Signatures allow for a quick and accurate determination as to which components changed and, thus, need to be upgraded.

Installation

Figure 20C:
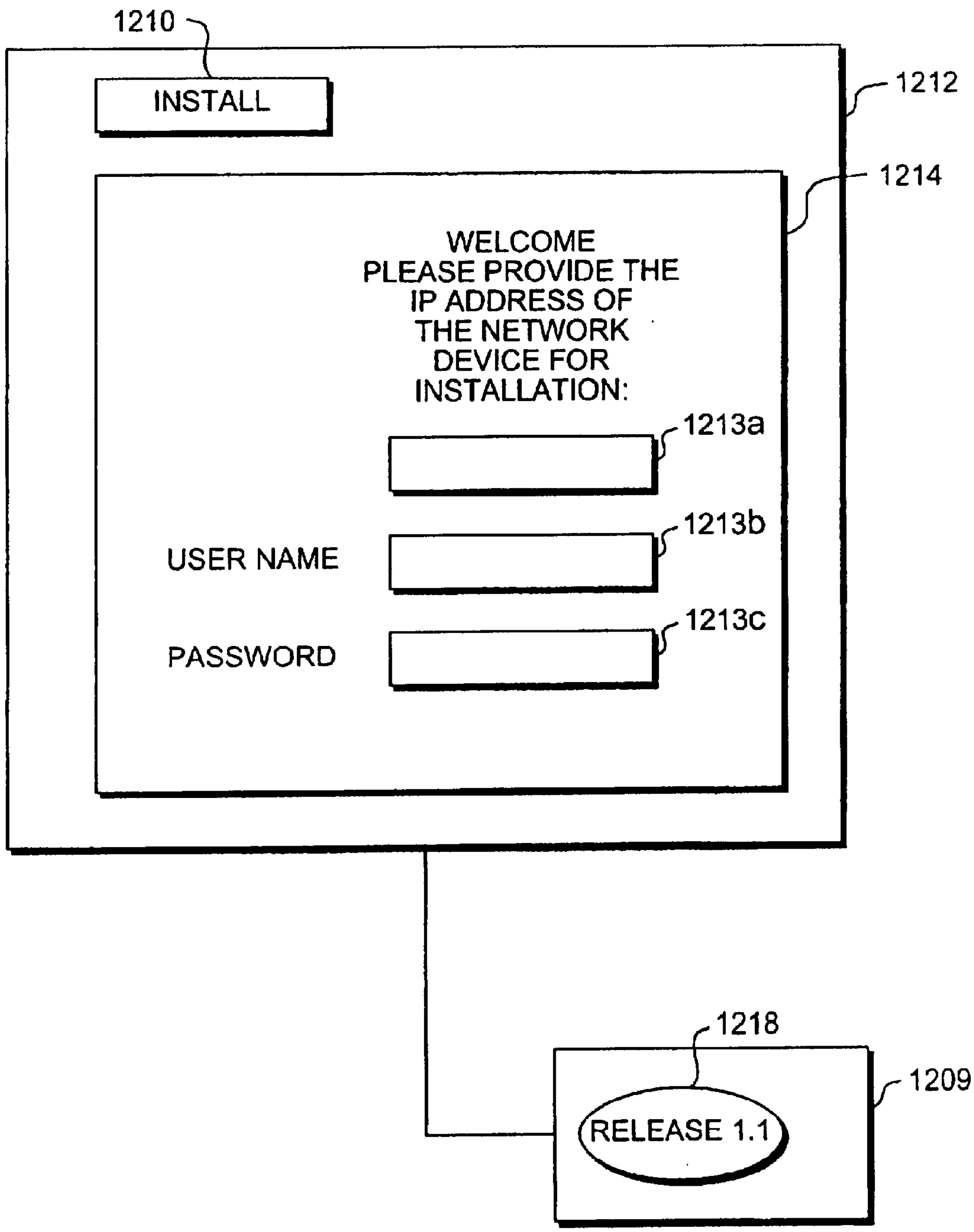
FIGS. 20*c* and 20*e* are screen displays of graphical user interfaces.
Figure 20D:
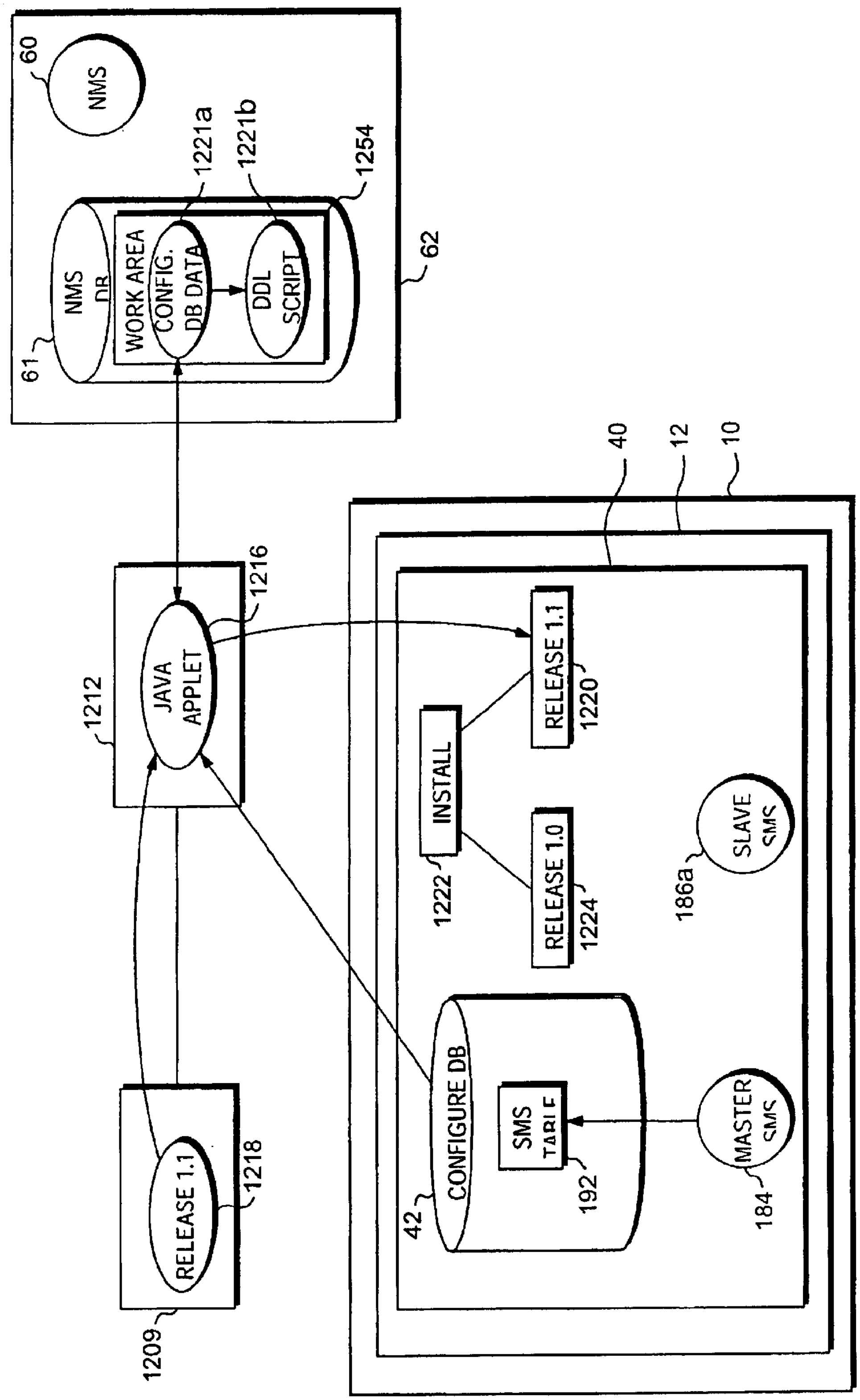
FIG. 20*d* is a block and flow diagram of a network device incorporating a modular system architecture and illustrating a method for installing a new software release.

A customer/user may receive a new Installation Kit on a CD, or the customer/user may be given access to a web site where the new Installation Kit may be accessed. Whether a CD is loaded into a CD player 1209 (FIG. 20*c*) or a web site is accessed, an Install icon 1210 will be displayed on the screen of the user's computer 1212. Computer 1212 may be the same computer (e.g., 62) that is running the NMS or a different computer. To initiate installation, the user double clicks their mouse on the Install icon to cause, for example, a JAVA application 1216 (FIG. 20*d*), to perform the installation.

Initially, the JAVA application causes a dialog box 1214 to appear to welcome the user and ask for an internet (IP) address 1213*a* of the network device into which the new Installation Kit is to be installed. For security, the dialog box may also request a username 1213*b* and a password 1213*c*. After verifying the username and password with the network device, the JAVA application uses the supplied IP address to download the new Installation Kit, for example, release 1.1 1218, including the packaging list, to a new sub-directory 1220 within an installation directory 1222 in configuration database 42. Any previously loaded Installation Kits, which have not been deleted, may be found in different sub-directories, for example, release 1.0 may be loaded in sub-directory1224.

Figure 20E:
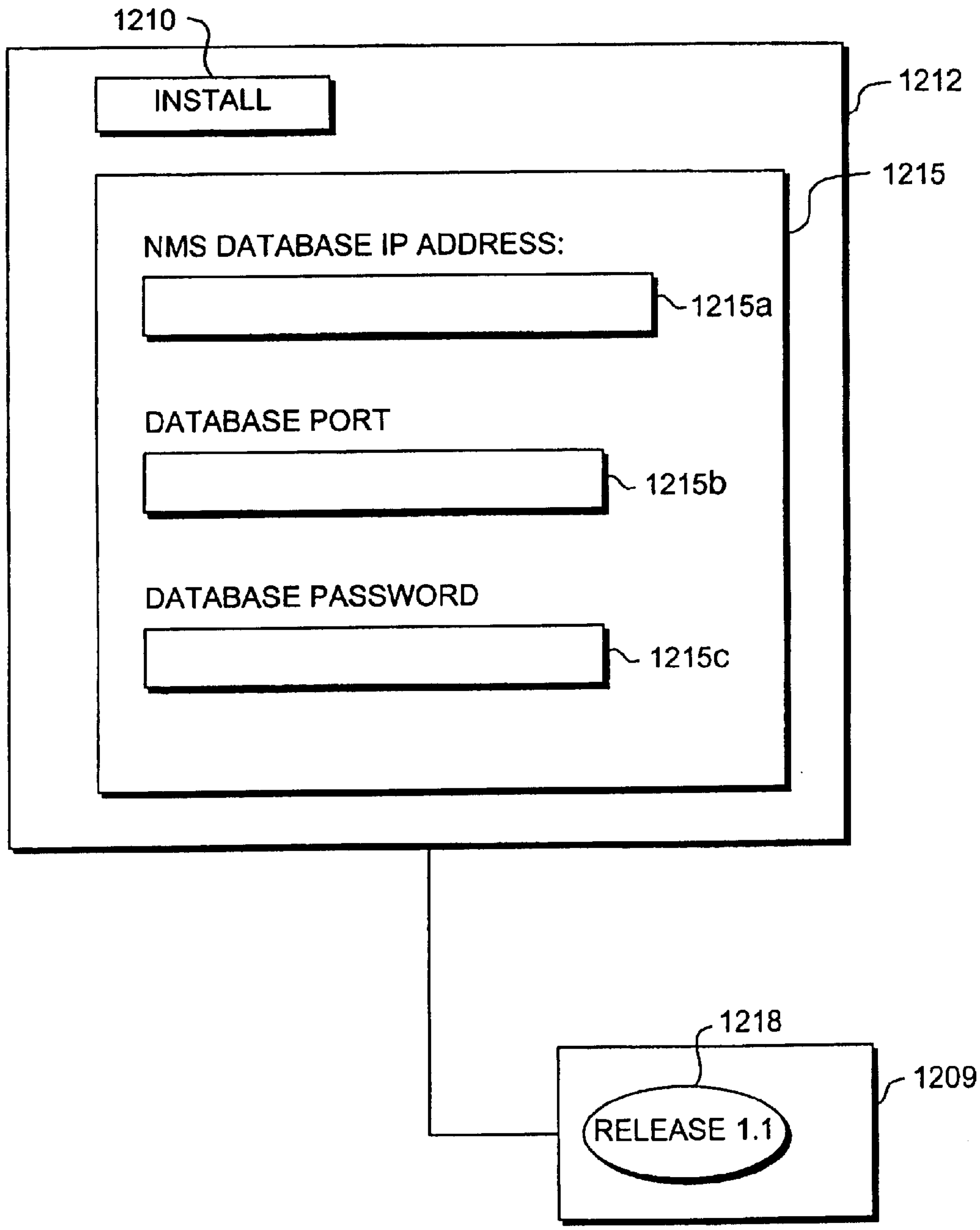

In addition, if the configuration database schema (i.e., meta data/data structure) needs to be changed, the JAVA application also causes a dialog box 1215 (FIG. 20*e*) to appear. Dialog box 1215 prompts the user for an NMS database system ID 1215*a,* a database port address 1215*b* and a database password 1215*c*. The JAVA application then uploads the existing meta data (used by the NMS) and user data 1221*a* from the network device's configuration database into a work area 1254 within the NMS database 61. The JAVA application then performs the conversion in accordance with the new meta data provided in the new release and then downloads a DDL script 1221*b* into new sub-directory 1220 within the network device.

The network device may then be rebooted (cold upgrade), in which case, once rebooted the network device will use all the software components, including the DDL script for the converted configuration database, of release 1.1 in sub-directory 1220. Instead, the DDL script for the converted configuration database may reside in sub-directory 1220 until the user elects to make the upgrade, as described below.

Upgrade

Figure 21A:
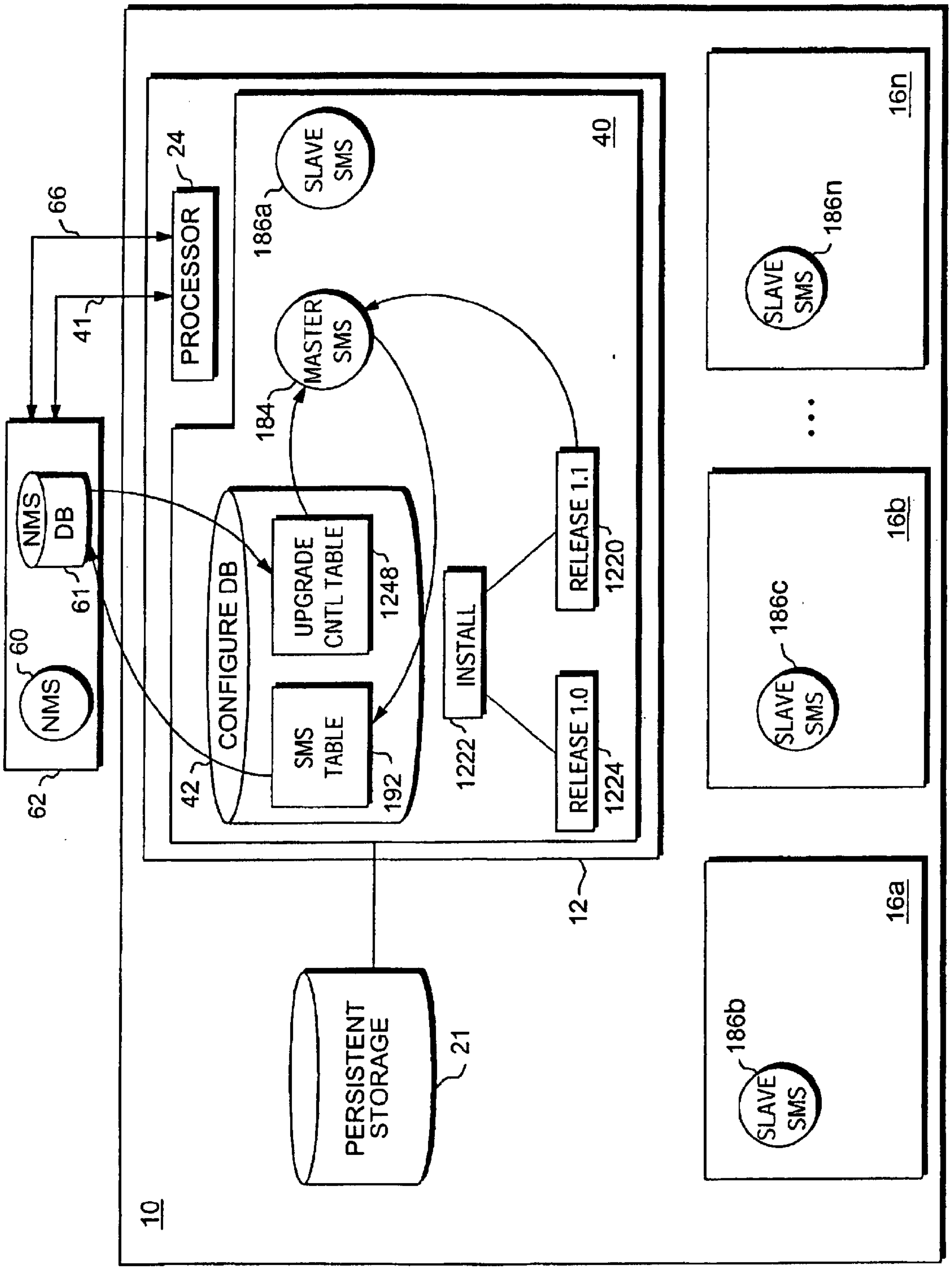
FIG. 21*a* is a block and flow diagram of a network device incorporating a modular system architecture and illustrating a method for upgrading software components.

Upgrades are managed by a software management system (SMS) service. Upgrades may be implemented while the network device is running (hot upgrades), or upgrades may be implemented by re-booting the network device (cold upgrades). Hot upgrades are preferred to limit any disruption in service provided by the network device. In addition, certain upgrades may only affect certain services, and a hot upgrade may be implemented such that the unaffected services experience no disruption while the affected services experience only minimal disruption. The SMS is one of the modular system services, and like the MCD and the SRM, the SMS is a distributed application. Referring to FIG. 21*a,* a master SMS 184 is executed by central processor 12 while slave SMSs 186*a*–186*n* are executed on each board (e.g., 12 and 16*a*–16*n*).

Master SMS 184 periodically polls installation directory 1222 for new sub-directories including new releases, for example, release 1.1 1218 in sub-directory 1220. When the master SMS detects a new release, it opens (and decompresses, if necessary) the packaging list in the new sub-directory and verifies that each software component listed in the packaging list is also stored in the new sub-directory. The master SMS then performs a checksum on each software component and compares the generated checksum to the checksum appended to the software component.

Once all software components are verified, the master SMS opens (and decompresses, if necessary) an upgrade instruction file also included as one of the software components loaded into sub-directory 1220 from the Installation Kit. The upgrade instruction file indicates the scope of the upgrade (i.e., upgrade mode). For instance, the upgrade instruction file may indicate that the upgrade may be hot or cold or must only be cold. The upgrade instruction file may also indicate that the upgrade may be done only across the entire chassis—that is, all applications to be upgraded must be upgraded simultaneously across the entire chassis—or that the upgrade may be done on a board-by-board basis or a path-by-path basis or some other partial chassis upgrade. A board-by-board upgrade may allow a network device administrator to chose certain boards on which to upgrade applications and allow older versions of the same applications to continue running on other boards. Similarly, path-by-path or other service related upgrades may allow the network administrator to chose to upgrade only the applications controlling particular services for particular customers, for example, a single path, while allowing older versions of the applications to continue to control the other services. Various upgrade modes are possible.

The upgrade instructions file may also include more detailed instructions such as the order in which each software component should be upgraded. That is, if several applications are to be upgraded, certain ones may need to be upgraded before certain other ones. Similarly, certain software components may need to be upgraded simultaneously. Moreover, certain boards may need to be upgraded prior to other boards. For example, control processor card 12 may need to be upgraded prior to upgrading any line cards.

The master SMS then creates a record 1227 (FIG. 21*b*) in an SMS table 192, which may also be termed an "image control table." The record includes at least a logical identification number (LID) field 1226, a verification status field and an upgrade mode field. Similar to other LIDs described above, LID field 1226 is filled in with a unique LID (e.g., 9623) corresponding to the new release. If the SMS verification of the new release's software components completed successfully, then the verification status field indicates that verification passed, otherwise an error code is input into the verification status field. The SMS then enters a code in the upgrade mode field from the upgrade instructions file indicating the scope of the upgrade. Alternatively, the SMS table may include a field for each possible type of upgrade mode and the master SMS would input an indication in the field or fields corresponding to possible types of upgrades for the new release.

Figure 21C:
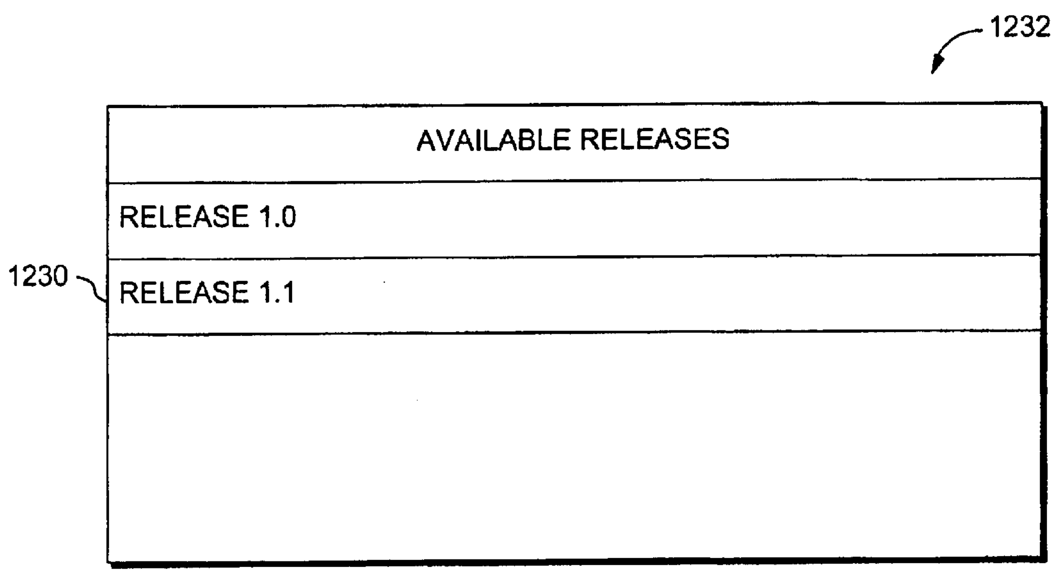
FIGS. 21*c*–21*f* are screen displays of graphical user interfaces.
Figure 21D:
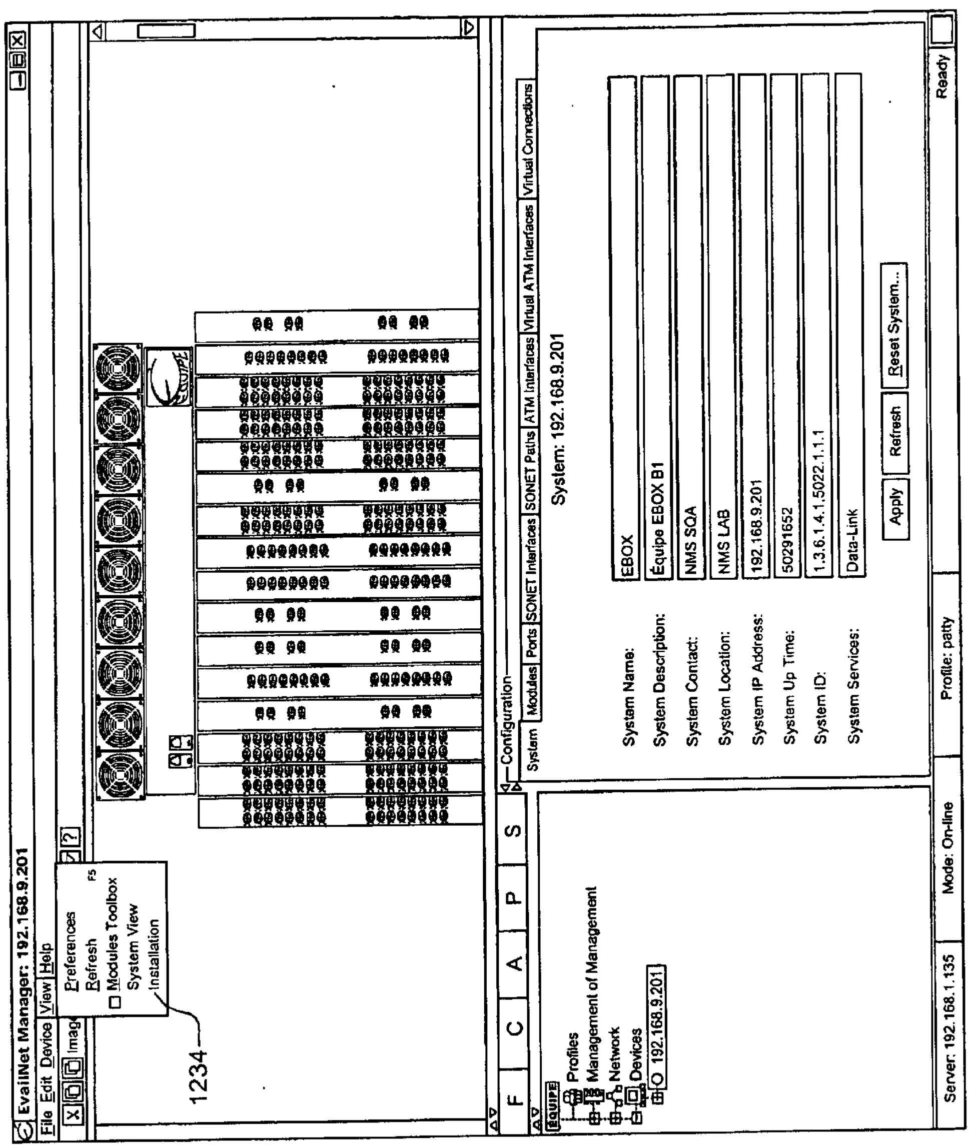
Figure 21E:
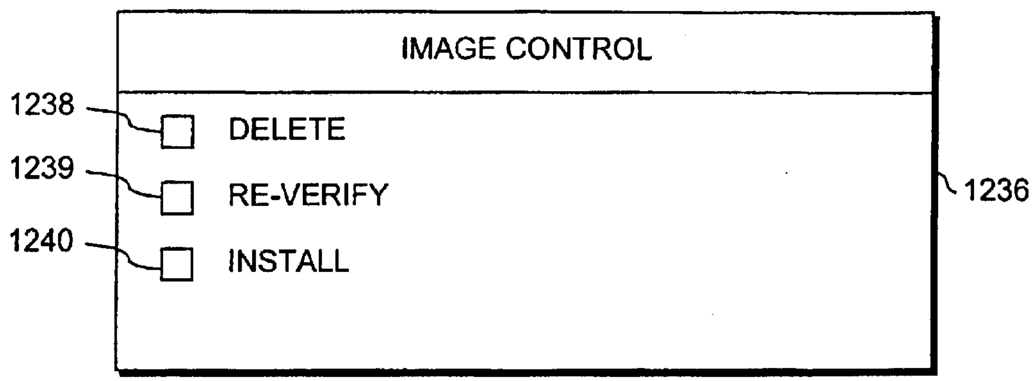

The master SMS may then send a trap to the NMS or the NMS may periodically poll the SMS table to detect new records. In either case, the NMS creates a new record 1230 (FIG. 21*c*) in an Available Release window 1232. For security, only certain users, such as administrators, will have access to the Available Release window. Referring to FIG. 21*d,* to view this window, an administrator accesses a pull down menu, for example, the view pull down menu, and selects an Installation option 1234. The administrator may select any entry in the Available Release window to cause an Image Control dialog box 1236 (FIG. 21*e*) to appear. If the user selects a release (old or new) that is not currently running, the user may select a Delete option 1238, a Re-Verify option 1239 or an Install option 1240 in the Image Control dialog box. Other options may also be available.

Figure 21F:
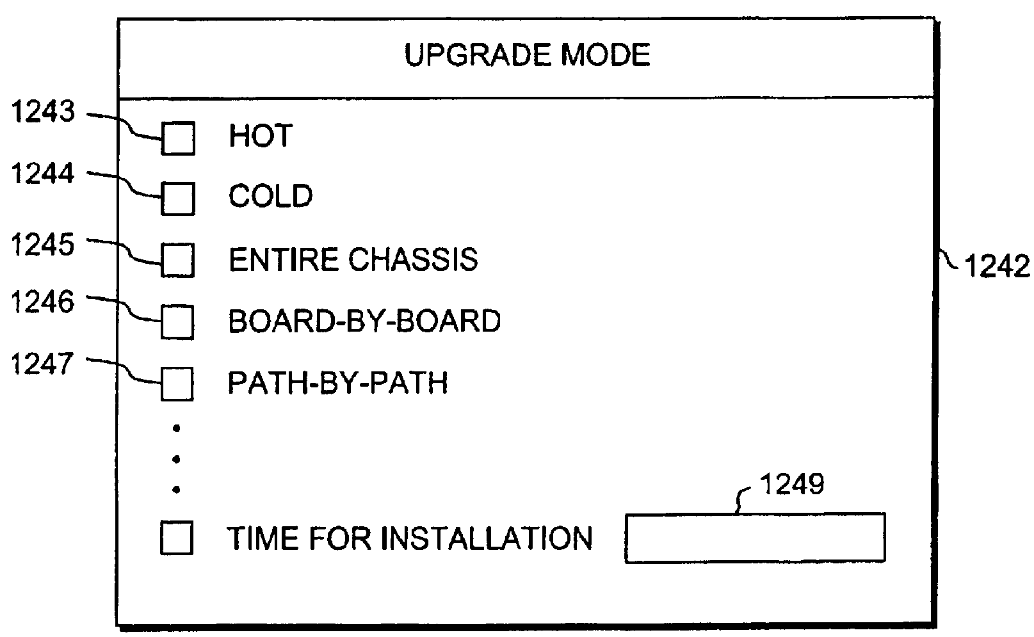

If the user selects the Install option and multiple upgrade modes are possible for the selected release, then an Upgrade Mode dialog box 1242 (FIG. 21*f*) will be displayed. The Upgrade Mode dialog box may present only those options available for the chosen release, or the Upgrade Mode dialog box may present all upgrade options but only allow the user to chose the options available for the chosen release. For example, the dialog box may present a Hot option 1243 and a Cold option 1244. If the upgrade for the chosen release can only be completed as a cold upgrade, then the dialog box may not allow the user to select the Hot option.

The Upgrade Mode dialog box may also present other options such as entire chassis 1245, board-by-board 1246, path-by-path 1247 or various other upgrade options. If the user selects the board-by-board option or the path-by-path option, other dialog boxes will appear to accept the administrator's input of which board(s) or path(s) to upgrade. The user may also select a Time for Installation option 1249 and input a particular time for the installation. If the Time for Installation option is not selected, then the default may be to initiate the installation immediately.

Once the administrator has provided any required information in the Upgrade Control dialog box and, in the case of an upgrade, the Upgrade Mode dialog box, the NMS creates a new record 1251 in an Upgrade Control table 1248 (FIG. 21*g*). The NMS inputs the Image LID (e.g., 9623) in Image LID field 1250 of the record in the SMS table corresponding to the release selected by the administrator (e.g., release 1.1) in the Available Release window. The NMS then inputs a code (e.g., x2344) in a Command field 1252 corresponding to the action requested by the administrator. For example, the code may represent a Delete command indicating that the release selected by the administrator should be deleted from both the Install sub-directory and the corresponding record removed from the SMS table. Instead the code may represent a re-verify command indicating that the software components in the Install sub-directory corresponding to the release should be re-verified. Similarly, the code may represent an upgrade command and, specifically, a particular type of upgrade according to the upgrade mode chosen by the user. Alternatively, instead of having codes, the Upgrade Control table could include fields for each command and each upgrade mode and the NMS would fill in the appropriate field(s). The NMS also fills in a Time for Installation field 1253 with a future time or indicates that the installation should proceed immediately.

When the NMS adds new record 1251 to the Upgrade Control table, an active query is sent to the master SMS. If an upgrade command is detected in Command field 1252, the master SMS sends notices to all SMS clients that access software components from the current release sub-directory indicating that software components should now be accessed from the new release sub-directory. SMS clients include, for example, the Master Control Driver (MCD) and the program supervisor module (PSM) within the mission kernel image (MKI) on each board, which the slave SRM on each board may ask to load upgraded software components. Having the SMS clients point to the new sub-directory for the new release eliminates the need for the SRM to have any release specific details. For example, during an ATM upgrade, the slave SRMs will simply ask the local PSM to load ATM software components regardless of the release number, however, since the PSM is pointed to the new release directory, upgraded ATM software components will be loaded.

The master SMS then opens up the packing list from the sub-directory (e.g., 1224) of the currently running release (e.g., release 1.0) and the sub-directory (e.g., 1220) of the new release (e.g., release 1.1) and compares the signatures of each software component to determine which software components have changed and, thus, need to be upgraded, and to determine if there are any new software components to be installed. Thus, signatures promote hot upgrades by allowing the SMS to quickly locate only those software components that need to be upgraded.

Since signatures are automatically generated for each software component as part of putting together a new release and since a robust signature generating program is used, a quick comparison of two signatures provides an accurate assurance that either the software component has changed or has not. Instead of comparing signatures, a full compare of each running software component against each corresponding software component in the new release may be run, however, since many software components may be quite long (e.g., 50–60 megabytes) this will likely take a considerable amount of time and processor power. Instead, the signatures provide a quick, easy way to accurately determine the upgrade status of each software component.

If the new release requires a converted configuration database and this was not implemented through a cold upgrade, then the master SMS will find a script for converted configuration database file 42' in the new release subdirectory. The master SMS may terminate the currently executing configuration database 42 and instantiate converted configuration database 42'.

Figure 22:
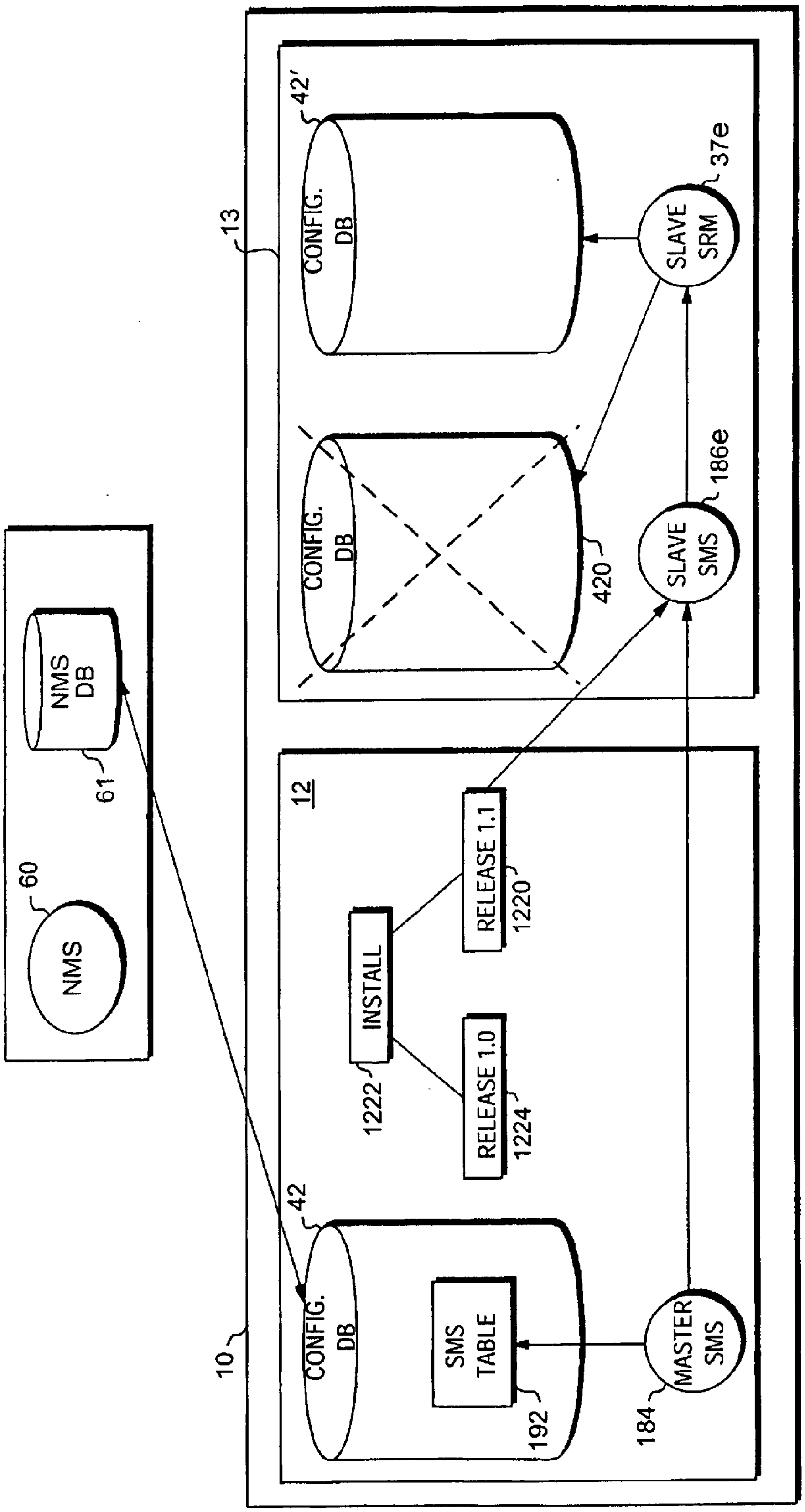
FIG. 22 is a block and flow diagram of a network device incorporating a modular system architecture and illustrating a method for upgrading a configuration database within the network device.

Referring to FIG. 22, instead of directly upgrading configuration database 42 on central processor 12, a backup configuration database 420 on a backup central processor 13 may be upgraded first. As described above, computer system 10 includes central processor 12. Computer system 10 may also include a redundant or backup central processor 13 that mirrors or replicates the active state of central processor 12. Backup central processor 13 is generally in stand-by mode unless central processor 12 fails at which point a fail-over to backup central processor 13 is initiated to allow the backup central processor to be substituted for central processor 12. In addition to failures, backup central processor 13 may be used for software and hardware upgrades that require changes to the configuration database. Through backup central processor 13, upgrades can be made to backup configuration database 420 instead of to configuration database 42.

Master SMS 184 tells slave SMS **186*e* to cause backup processor 13 to change from backup mode to upgrade mode. Slave SMS 186*e* then works with slave SRM 37*e* to cause backup processor 13 to change from backup mode to upgrade mode. In upgrade mode, backup processor 13 stops replicating the active state of central processor 12. Slave SMS 186*e* then copies over the script for new configuration database file 42' from sub-directory 1220, executes the script to generate new configuration database 42', directs slave SRM 37*e* to terminate backup configuration database 420 and execute the new configuration database 42'**.

Once configuration database 42' is upgraded, a fail-over or switch-over from central processor 12 to backup central processor 13 is initiated. Central processor 13 then begins acting as the primary central processor and applications running on central processor 13 and other boards throughout computer system 10 begin using upgraded configuration database 42'. Central processor 12 may not become the backup central processor right away. Instead, central processor 12 with its older copy of configuration database 42 may stay dormant in case an automatic downgrade is necessary (described below). If the upgrade goes smoothly and is committed (described below), then central processor 12 will begin operating in backup mode and replace old configuration database 42 with new configuration database 42'.

Existing processes using their view ids and APIs to access new configuration database 42' in the same manner as they accessed old configuration database 42. However, when new processes (e.g., ATM version two 360 and device driver 362, FIG. **3*b*) access new configuration database 42', their view ids and APIs allow them to access new tables and data within new configuration database 42'**.

Once the configuration database is converted or if no conversion of the configuration database is necessary, the master SMS determines whether any meta data files, such as the PMD file, have been upgraded—that is the signature of a meta data file in the currently running release does not match the signature of the same meta data file in the new release. If yes, then the master SMS overwrites the current meta data files with any changed, new meta data files. New meta data files may also be loaded from the new release sub-directory.

Figure 23:
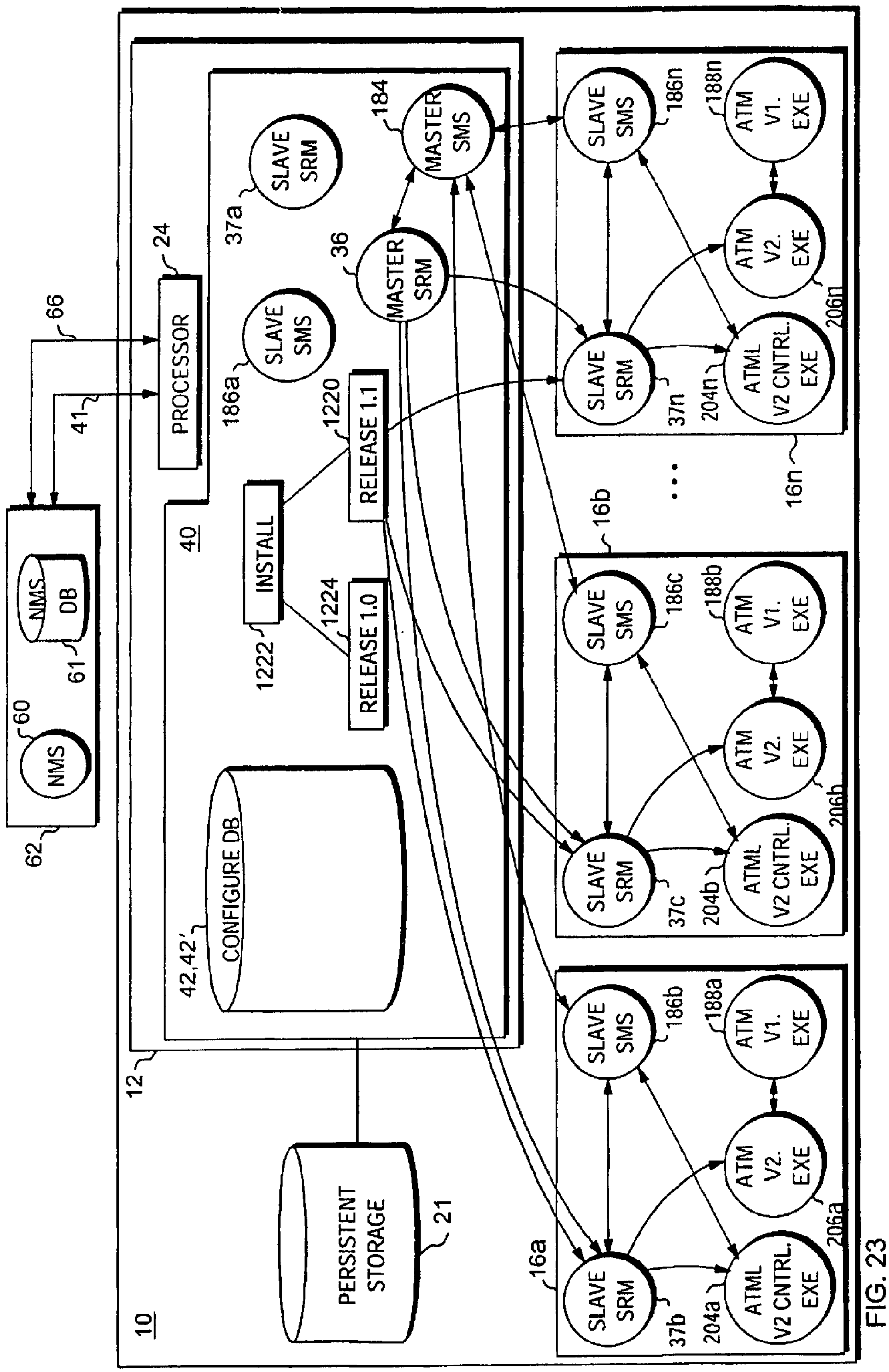
FIG. 23 is a block and flow diagram of a network device incorporating a modular system architecture and illustrating a method for upgrading software components.

Referring to FIG. 23, if any other software components have changed, then master SMS 184 first needs to determine where the software components corresponding to the changed software components are currently executing. Since each slave SRM maintains information about which software components are loaded on their local board, the master SMS may call master SRM 36, which will ask each of the slave SRMs **37*a*–37*n*, or the master SMS may ask each of the slave SMSs 186*a*–186*n*, which will ask their local slave SRMs 37*a*–37*n***. The master SMS upgrades the software components in accordance with the upgrade instructions. Thus, if the upgrade instructions indicate that all instantiations of ATM across the entire chassis should be simultaneously upgraded, then the master SMS initiates and controls a lock step upgrade. In most instances, all instantiations of a distributed application will be upgraded simultaneously to avoid conflicts between the different versions. However, if an upgraded software component is compatible with its corresponding, currently running software component, then the upgrade need not be chassis wide.

After determining where software components, that need to be upgraded, are currently being executed, master SMS 184 tells the appropriate slave SMSs, which tell their local slave SRMs (which tell their local PSM within their local MKI, not shown in FIG. 23 for clarity), to load the changed software components and the control shims for each of the changed software components from new release sub-directory 1220 onto the appropriate boards. For example, if an ATM software component has changed, the master SMS tells slave SMSs 186b–186n, which tell slave SRMs 37b–37n, to load ATM control shim (e.g., ATM_V2_Cntrl.exe 204a–204n) and, for example, an ATM version 2 file (e.g., ATM_V2.exe 206a–206b) from the new release 1.1. If any control shim has been upgraded, then it must be loaded from the new release, otherwise, it could be loaded from the new release or control shim from the currently executing release could be used. Typically, whether the control shim has changed or not, it is loaded from the new release since the changed software components are also loaded from the new release. If necessary, the slave SRM de-compresses each of the software components.

Once loaded, each control shim sends a message to the slave SMS on its board including a list of upgrade instructions. Using the ATM example, ATM control shim 204a loaded on line card 16a sends a message to slave SMS 186b with a list of upgrade instructions. For distributed applications such as ATM, a lock step upgrade is initiated. That is, when each slave SMS receives the upgrade instructions message from the local control shim, it sends a notice to the master SMS. When the master SMS receives notifications from each of the appropriate slave SMSs, the master SMS sends each slave SMS a command to execute the first instruction. Each slave SMS then sends its local control shim the first upgrade instruction from the upgrade instructions message. After executing the first step, each control shim notifies its local slave SMS, which sends a notice to the master SMS that the first step is complete. When all appropriate slave SMSs have indicated that the first step is done, the master SMS sends each slave SMS a command to execute the next step. Again, each slave SMS sends its local control shim the next upgrade instruction from the upgrade instructions message, and again, when each control shim has executed the next step it notifies its local slave SMS, which sends a message to the master SMS indicating the step is complete. This process is repeated until all steps in the upgrade instructions message have been executed.

When the last upgrade instruction is completed, the control shim notifies the slave SMSs, which sends a message to the master SMS indicating that the upgrade of that software component is complete. If other software components need to be upgraded, the master SMS then begins a similar upgrade process for those additional software components. Once all the software components are upgraded, the master SMS writes a complete indication in status field 1255 (FIG. 21g) of Upgrade Control table 1248. The master SMS may then send a trap to the NMS to indicate that the upgrade is complete or the NMS may poll the status field of the Upgrade Control table waiting for a complete status.

The first step in the upgrade instructions may be to stall the currently executing software component. In the above example, each line card is shown implementing one instance of ATM, but as explained below, multiple instances of ATM may be executed on each line card. Another upgrade instruction may cause the upgraded versions of ATM 204a–204n to retrieve active state from the current versions of ATM 188a–188n. The retrieval of active state can be accomplished in the same manner that a redundant or backup instantiation of ATM retrieves active state from the primary instantiation of ATM. When the upgraded instances of ATM are executing and updated with active state, the next upgrade instruction may be to switchover to the upgraded version and terminate the version that was executing. A "lock step upgrade" indicates that each line card executing a particular software component, such as ATM, is switched over to the software component simultaneously.

There may be upgrades that require changes to multiple applications and to the APIs for those applications. For example, a new feature may be added to ATM that also requires additional functionality to be added to the Multi-Protocol Label Switching (MPLS) application. The additional functionality may change the peer-to-peer API for ATM, the peer-to-peer API for MPLS and the API between ATM and MPLS. In this scenario, the upgrade operation must avoid allowing the "new" version of ATM to communicate with "old" version of ATM or the "old" version of MPLS and vice versa. The master SMS will use the upgrade instructions file to determine the requirements for the individual upgrade. Again, the SMS would implement the upgrade in a lock step fashion. All instances of ATM and MPLS would be upgraded together. The simultaneous switchover to new versions of both MPLS and ATM eliminate any API compatibility errors.

The upgrade of an ATM software component described above is by way of example, and it should be understood that the upgrade of other software components, such as device drivers, would be accomplished in the same manner.

Instead of storing all software components from a new release in the new release sub-directory, only the changed software components may be stored. That is, the master SMS could open the packaging list in the currently executing release and compare the signatures of the components in that packaging list to the signatures of the software components in the packaging list for the new release and remove any software components that had not changed. If all the software components of a new release are not saved in the new sub-directory and if an old release is deleted, however, those software components that had not been upgraded would need to be copied from the old release sub-directory into the new release sub-directory prior to the deletion.

Instead of using the full signatures generated by the signature generating program, the full signatures may be converted into simple easy to read version numbers. To accomplish this, however, a conversion database would need to be maintained which would associate each signature with a version number. This could be an automatic process, such that each time a software component signature is generated, the signature could be compared with all those in the conversion database. If it is already listed, then the software component did not change and the version number associated with the signature in the conversion database would be appended to the software component instead of the full signature. If the signature is not listed, a new version number would be automatically generated, added to the conversion database along with the new signature and then appended to the new software component. Since software components may be changed quite often, the conversion database may become quite large. In addition, a conversion database may need to be kept for each software component to insure that in the unlikely event that two signatures from different software components matched, the same version number isn't assigned to two different software components.

Once all software components have been upgraded, any new hardware received by the user of computer system 10 may be inserted. The MCD would find information related to the new hardware in the new PMD file and the newly available MKI and any necessary device drivers and applications would be loaded.

Automatic Downgrade

Often, implementation of an upgrade, can cause unexpected errors in the upgraded software, in other applications or in hardware. As described above, a new configuration database 42' (FIG. 20) is generated and changes to the new configuration database are made in new tables (e.g., ATM interface table 114' and ATM group table 108', FIG. 20) and new executable files (e.g., ATMv2.exe 189, ATMv2_cntrl.exe 190 and ATMv2_cnfg_cntrl.exe 191) are downloaded to memory 40. Importantly, the old configuration database records and the original application files are not deleted or altered. In the embodiment where changes are made directly to configuration database 42 on central processor 12, they are made only in non-persistent memory until committed (described below). In the embodiment where changes are made to backup configuration database 420 on backup central processor 13, original configuration database 42 remains unchanged.

Because the operating system provides a protected memory model that assigns different process blocks to different processes, including upgraded applications, the original applications will not share memory space with the upgraded applications and, therefore, cannot corrupt or change the memory used by the original application. Similarly, memory 40 is capable of simultaneously maintaining the original and upgraded versions of the configuration database records and executable files as well as the original and upgraded versions of the applications (e.g., ATM 188*a*–188*n*). As a result, the SMS is capable of an automatic downgrade on the detection of an error. To allow for automatic downgrade, the SRMs pass error information to the SMS. The SMS may cause the system to revert to the old configuration and application (i.e., automatic downgrade) on any error or only for particular errors.

As mentioned, often upgrades to one application may cause unexpected faults or errors in other software. If the problem causes a system shut down and the configuration upgrade was stored in persistent storage, then the system, when powered back up, will experience the error again and shut down again. Since, the upgrade changes to the configuration database are not copied to persistent storage 21 until the upgrade is committed, if the computer system is shut down, when it is powered back up, it will use the original version of the configuration database and the original executable files, that is, the computer system will experience an automatic downgrade.

Additionally, a fault induced by an upgrade may cause the system to hang, that is, the computer system will not shut down but will also become inaccessible by the NMS and inoperable. To address this concern, in one embodiment, the NMS and the master SMS periodically send messages to each other indicating they are executing appropriately. If the SMS does not receive one of these messages in a predetermined period of time, then the SMS knows the system has hung. The master SMS may then tell the slave SMSs to revert to the old configuration (i.e., previously executing copies of ATM 188*a*–188*n*) and if that does not work, the master SMS may re-start/re-boot computer system 10. Again, because the configuration changes were not saved in persistent storage, when the computer system powers back up, the old configuration will be the one implemented.

Evaluation Mode

Instead of implementing a change to a distributed application across the entire computer system, an evaluation mode allows the SMS to implement the change in only a portion of the computer system. If the evaluation mode is successful, then the SMS may fully implement the change system wide. If the evaluation mode is unsuccessful, then service interruption is limited to only that portion of the computer system on which the upgrade was deployed. In the above example, instead of executing the upgraded ATMv2 189 on each of the line cards, the ATMv2 configuration convert file 191 will create an ATMv2 group table 108' indicating an upgrade only to one line card, for example, line card 16*a*. Moreover, if multiple instantiations of ATM are running on line card 16*a* (e.g., one instantiation per port), the ATMv2 configuration convert file may indicate through ATMv2 interface table 114' that the upgrade is for only one instantiation (e.g., one port) on line card 16*a*. Consequently, a failure is likely to only disrupt service on that one port, and again, the SMS can further minimize the disruption by automatically downgrading the configuration of that port on the detection of an error. If no error is detected during the evaluation mode, then the upgrade can be implemented over the entire computer system.

Upgrade Commitment

Upgrades are made permanent by saving the new application software and new configuration database and DDL file in persistent storage and removing the old configuration data from memory 40 as well as persistent storage. As mentioned above, changes may be automatically saved in persistent storage as they are made in non-persistent memory (no automatic downgrade), or the user may choose to automatically commit an upgrade after a successful time interval lapses (evaluation mode). The time interval from upgrade to commitment may be significant. During this time, configuration changes may be made to the system. Since these changes are typically made in non-persistent memory, they will be lost if the system is rebooted prior to upgrade commitment. Instead, to maintain the changes, the user may request that certain configuration changes made prior to upgrade commitment be copied into the old configuration database in persistent memory. Alternatively, the user may choose to manually commit the upgrade at his or her leisure. In the manual mode, the user would ask the NMS to commit the upgrade and the NMS would inform the master SMS, for example, through a record in the SMS table.

Independent Process Failure and Restart

Depending upon the fault policy managed by the slave SRMs on each board, the failure of an application or device driver may not immediately cause an automatic downgrade during an upgrade process. Similarly, the failure of an application or device driver during normal operation may not immediately cause the fail over to a backup or redundant board. Instead, the slave SRM running on the board may simply restart the failing process. After multiple failures by the same process, the fault policy may cause the SRM to take more aggressive measures such as automatic downgrade or fail-over.

Figure 24:
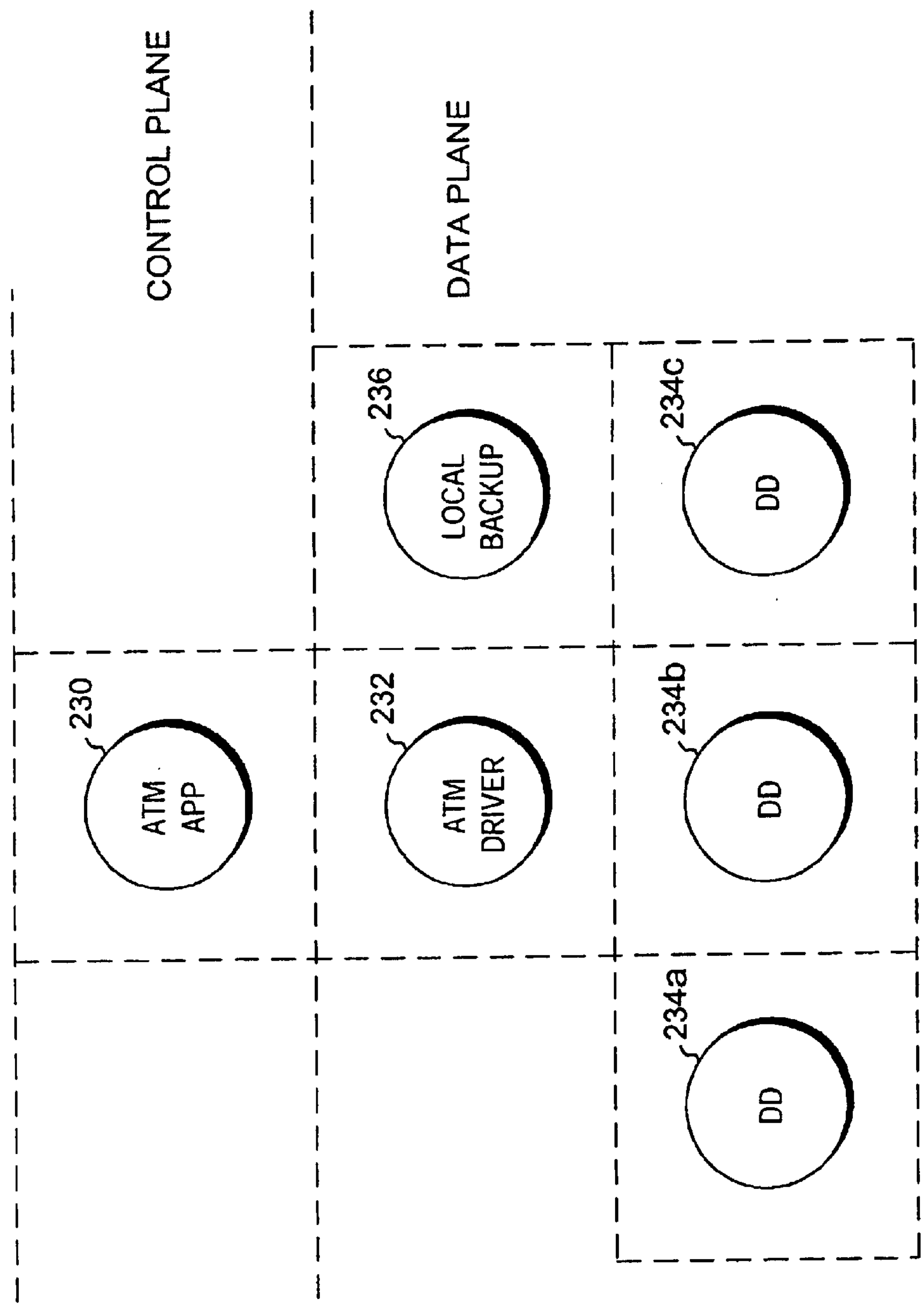
FIG. 24 is a block diagram representing processes within separate protected memory blocks.

Referring to FIG. 24, if an application, for example, ATM application 230 fails, the slave SRM on the same board as ATM 230 may simply restart it without having to reboot the entire system. As described above, under the protected memory model, a failing process cannot corrupt the memory blocks used by other processes. Typically, an application and its corresponding device drivers would be part of the same memory block or even part of the same software program, such that if the application failed, both the application and device drivers would need to be restarted. Under the modular software architecture, however, applications, for example ATM application 230, are independent of the device drivers, for example, ATM driver 232 and Device Drivers (DD) 234*a*–234*c*. This separation of the data plane (device drivers) and control plane (applications) results in the device drivers being peers of the applications. Hence, while the ATM application is terminated and restarted, the device drivers continue to function.

For network devices, this separation of the control plane and data plane means that the connections previously established by the ATM application are not lost when ATM fails and hardware controlled by the device drivers continue to pass data through connections previously established by the ATM application. Until the ATM application is restarted and re-synchronized (e.g., through an audit process, described below) with the active state of the device drivers, no new network connections may be established but the device drivers continue to pass data through the previously established connections to allow the network device to minimize disruption and maintain high availability.

Local Backup

If a device driver, for example, device driver 234, fails instead of an application, for example, ATM 230, then data cannot be passed. For a network device, it is critical to continue to pass data and not lose network connections. Hence, the failed device driver must be brought back up (i.e., recovered) as soon as possible. In addition, the failing device driver may have corrupted the hardware it controls, therefore, that hardware must be reset and reinitialized. The hardware may be reset as soon as the device driver terminates or the hardware may be reset later when the device driver is restarted. Resetting the hardware stops data flow. In some instances, therefore, resetting the hardware will be delayed until the device driver is restarted to minimize the time period during which data is not flowing. Alternatively, the failing device driver may have corrupted the hardware, thus, resetting the hardware as soon as the device driver is terminated may be important to prevent data corruption. In either case, the device driver re-initializes the hardware during its recovery.

Again, because applications and device drivers are assigned independent memory blocks, a failed device driver can be restarted without having to restart associated applications and device drivers. Independent recovery may save significant time as described above for applications. In addition, restoring the data plane (i.e., device drivers) can be simpler and faster than restoring the control plane (i.e., applications). While it may be just as challenging in terms of raw data size, device driver recovery may simply require that critical state data be copied into place in a few large blocks, as opposed to application recovery which requires the successive application of individual configuration elements and considerable parsing, checking and analyzing. In addition, the application may require data stored in the configuration database on the central processor or data stored in the memory of other boards. The configuration database may be slow to access especially since many other applications also access this database. The application may also need time to access a management information base (MIB) interface.

To increase the speed with which a device driver is brought back up, the restarted device driver program accesses local backup 236. In one example, local backup is a simple storage/retrieval process that maintains the data in simple lists in physical memory (e.g., random access memory, RAM) for quick access. Alternatively, local backup may be a database process, for example, a Polyhedra database, similar to the configuration database.

Local backup 236 stores the last snap shot of critical state information used by the original device driver before it failed. The data in local backup 236 is in the format required by the device driver. In the case of a network device, local back up data may include path information, for example, service endpoint, path width and path location. Local back up data may also include virtual interface information, for example, which virtual interfaces were configured on which paths and virtual circuit (VC) information, for example, whether each VC is switched or passed through segmentation and reassembly (SAR), whether each VC is a virtual channel or virtual path and whether each VC is multicast or merge. The data may also include traffic parameters for each VC, for example, service class, bandwidth and/or delay requirements.

Using the data in the local backup allows the device driver to quickly recover. An Audit process resynchronizes the restarted device driver with associated applications and other device drivers such that the data plane can again transfer network data. Having the backup be local reduces recovery time. Alternatively, the backup could be stored remotely on another board but the recovery time would be increased by the amount of time required to download the information from the remote location.

Audit Process

It is virtually impossible to ensure that a failed process is synchronized with other processes when it restarts, even when backup data is available. For example, an ATM application may have set up or torn down a connection with a device driver but the device driver failed before it updated corresponding backup data. When the device driver is restarted, it will have a different list of established connections than the corresponding ATM application (i.e., out of synchronization). The audit process allows processes like device drivers and ATM applications to compare information, for example, connection tables, and resolve differences. For instance, connections included in the driver's connection table and not in the ATM connection table were likely torn down by ATM prior to the device driver crash and are, therefore, deleted from the device driver connection table. Connections that exist in the ATM connection table and not in the device driver connection table were likely set up prior to the device driver failure and may be copied into the device driver connection table or deleted from the ATM connection table and re-set up later. If an ATM application fails and is restarted, it must execute an audit procedure with its corresponding device driver or drivers as well as with other ATM applications since this is a distributed application.

Vertical Fault Isolation

Typically, a single instance of an application executes on a single card or in a system. Fault isolation, therefore, occurs at the card level or the system level, and if a fault occurs, an entire card—and all the ports on that card—or the entire system—and all the ports in the system—is affected. In a large communications platform, thousands of customers may experience service outages due to a single process failure.

For resiliency and fault isolation one or more instances of an application and/or device driver may be started per port on each line card. Multiple instances of applications and device drivers are more difficult to manage and require more processor cycles than a single instance of each but if an application or device driver fails, only the port those processes are associated with is affected. Other applications and associated ports—as well as the customers serviced by those ports—will not experience service outages. Similarly, a hardware failure associated with only one port will only affect the processes associated with that port. This is referred to as vertical fault isolation.

Figure 25:
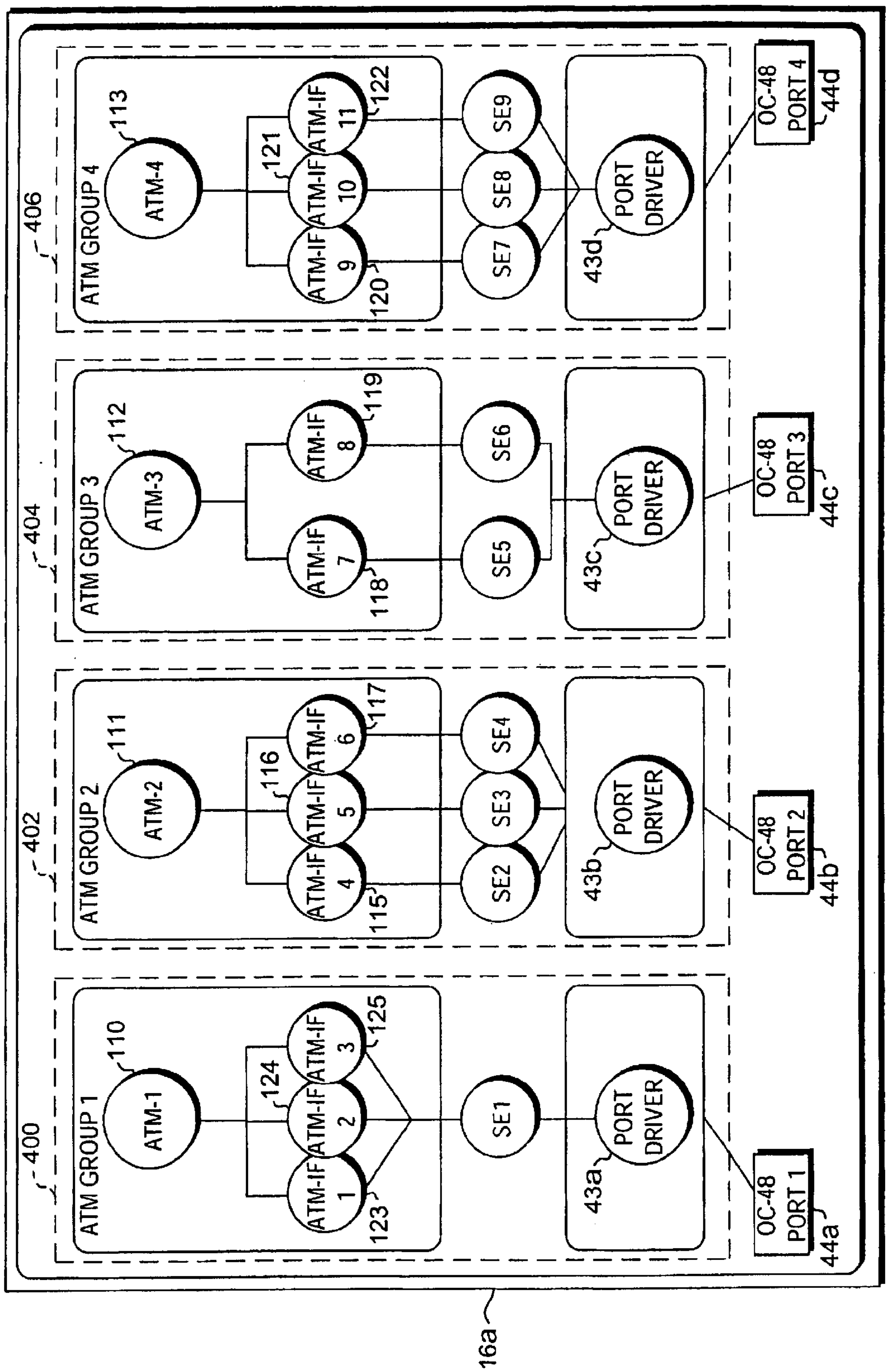
FIG. 25 is a block and flow diagram of a line card and a method for accomplishing vertical fault isolation.

Referring to FIG. 25, as one example, line card 16*a* is shown to include four vertical stacks 400, 402, 404, and 406. Vertical stack 400 includes one instance of ATM 110 and one device driver 43*a* and is associated with port 44*a*. Similarly, vertical stacks 402, 404 and 406 include one instance of ATM 111, 112, 113 and one device driver 43b, 43c, 43d, respectively and each vertical stack is associated with a separate port 44b, 44c, 44d, respectively. If ATM 112 fails, then only vertical stack 404 and its associated port 44c are affected. Service is not disrupted on the other ports (ports 44a, 44b, 44d) since vertical stacks 400, 402, and 406 are unaffected and the applications and drivers within those stacks continue to execute and transmit data. Similarly, if device driver 43b fails, then only vertical stack 402 and its associated port 44b are affected.

Vertical fault isolation allows processes to be deployed in a fashion supportive of the underlying hardware architecture and allows processes associated with particular hardware (e.g., a port) to be isolated from processes associated with other hardware (e.g., other ports) on the same or a different line card. Any single hardware or software failure will affect only those customers serviced by the same vertical stack. Vertical fault isolation provides a fine grain of fault isolation and containment. In addition, recovery time is reduced to only the time required to re-start a particular application or driver instead of the time required to re-start all the processes associated with a line card or the entire system.

Fault/Event Detection

Traditionally, fault detection and monitoring does not receive a great deal of attention from network equipment designers. Hardware components are subjected to a suite of diagnostic tests when the system powers up. After that, the only way to detect a hardware failure is to watch for a red light on a board or wait for a software component to fail when it attempts to use the faulty hardware. Software monitoring is also reactive. When a program fails, the operating system usually detects the failure and records minimal debug information.

Current methods provide only sporadic coverage for a narrow set of hard faults. Many subtler failures and events often go undetected. For example, hardware components sometimes suffer a minor deterioration in functionality, and changing network conditions stress the software in ways that were never expected by the designers. At times, the software may be equipped with the appropriate instrumentation to detect these problems before they become hard failures, but even then, network operators are responsible for manually detecting and repairing the conditions.

Systems with high availability goals must adopt a more proactive approach to fault and event monitoring. In order to provide comprehensive fault and event detection, different hierarchical levels of fault/event management software are provided that intelligently monitor hardware and software and proactively take action in accordance with a defined fault policy. A fault policy based on hierarchical scopes ensures that for each particular type of failure the most appropriate action is taken. This is important because over-reacting to a failure, for example, re-booting an entire computer system or re-starting an entire line card, may severely and unnecessarily impact service to customers not affected by the failure, and under-reacting to failures, for example, restarting only one process, may not completely resolve the fault and lead to additional, larger failures. Monitoring and proactively responding to events may also allow the computer system and network operators to address issues before they become failures. For example, additional memory may be assigned to programs or added to the computer system before a lack of memory causes a failure.

Hierarchical Scopes and Escalation

Figure 26:
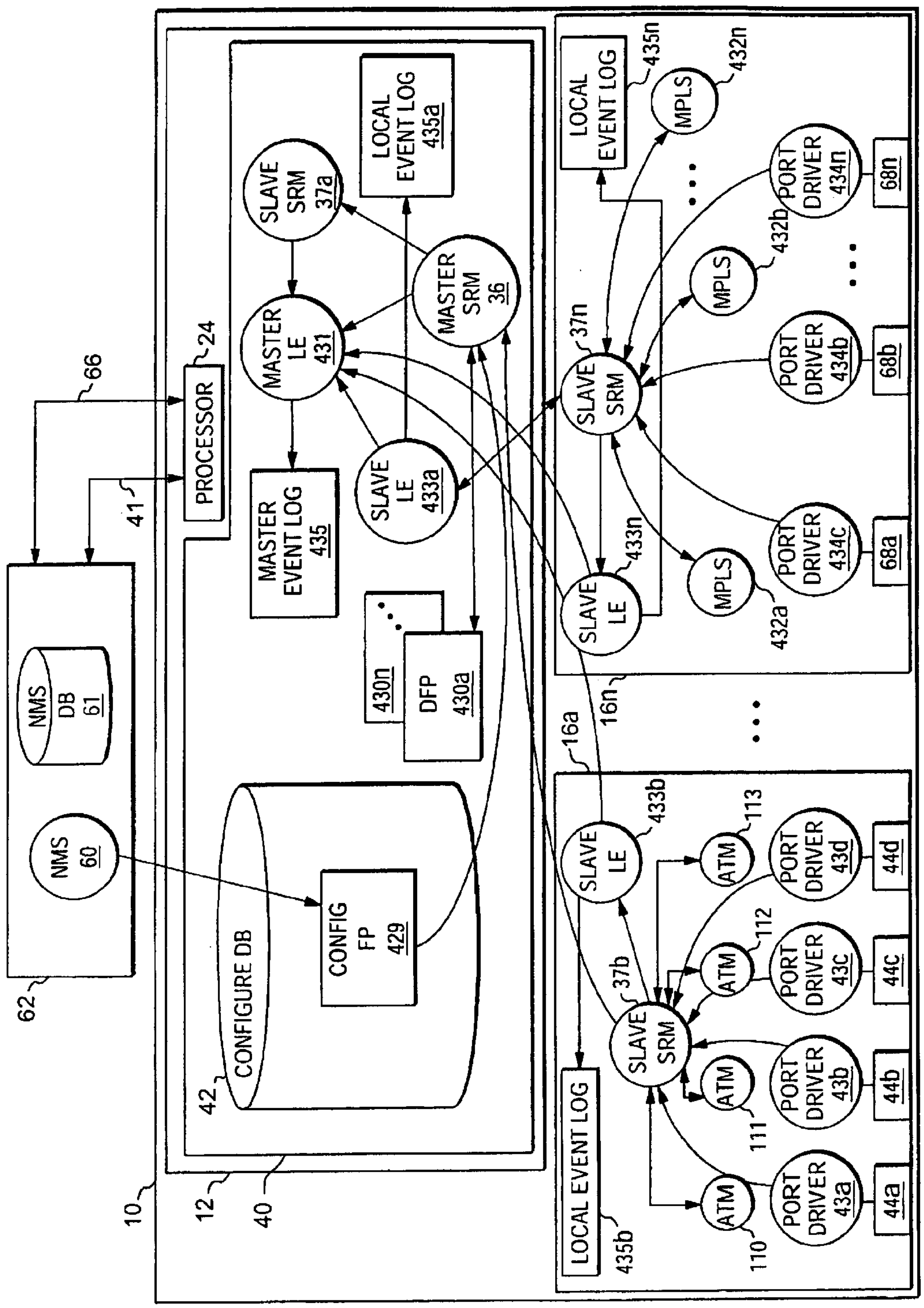
FIG. 26 is a block and flow diagram of a computer system incorporating a hierarchical and configurable fault management system and illustrating a method for accomplishing fault escalation.

Referring to FIG. 26, in one embodiment, master SRM 36 serves as the top hierarchical level fault/event manager, each slave SRM 37a–37n serves as the next hierarchical level fault/event manager, and software applications resident on each board, for example, ATM 110–113 and device drivers 43a–43d on line card 16a include sub-processes that serve as the lowest hierarchical level fault/event managers (i.e., local resiliency managers, LRM). Master SRM 36 downloads default fault policy (DFP) files (metadata) 430a–430n from persistent storage to memory 40. Master SRM 36 reads a master default fault policy file (e.g., DFP 430a) to understand its fault policy, and each slave SRM 37a–37n downloads a default fault policy file (e.g., DFP 430b–430n) corresponding to the board on which the slave SRM is running. Each slave SRM then passes to each LRM a fault policy specific to each local process.

A master logging entity 431 also runs on central processor 12 and slave logging entities 433a–433n run on each board. Notifications of failures and other events are sent by the master SRM, slave SRMs and LRMs to their local logging entity which then notifies the master logging entity. The master logging entity enters the event in a master event log file 435. Each local logging entity may also log local events in a local event log file 435a–435n.

In addition, a fault policy table 429 may be created in configuration database 42 by the NMS when the user wishes to over-ride some or all of the default fault policy (see configurable fault policy below), and the master and slave SRMs are notified of the fault policies through the active query process.

Figure 27:
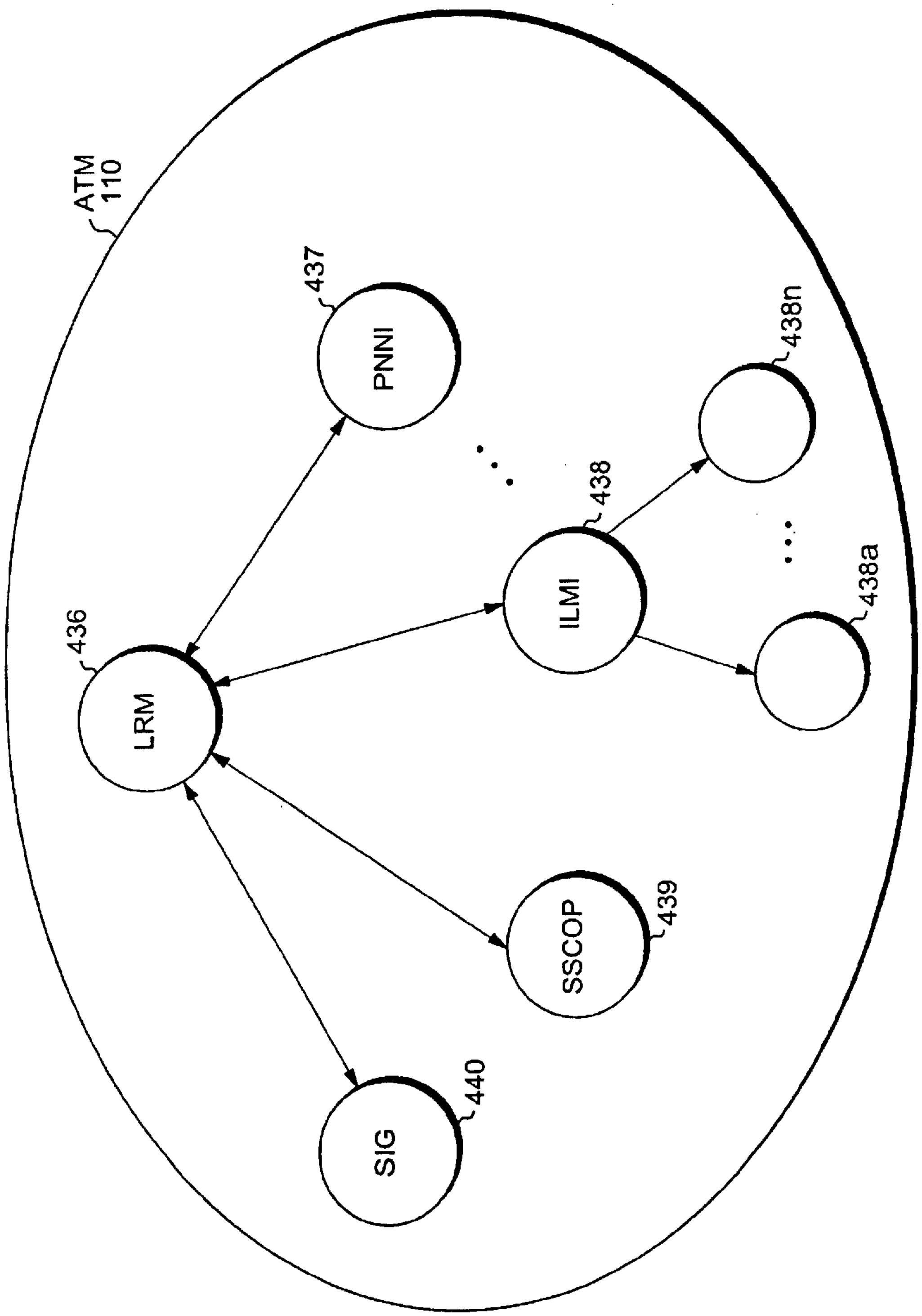
FIG. 27 is a block diagram of an application having multiple sub-processes.

Referring to FIG. 27, as one example, ATM application 110 includes many sub-processes including, for example, an LRM program 436, a Private Network-to-Network Interface (PNNI) program 437, an Interim Link Management Interface (ILMI) program 438, a Service Specific Connection Oriented Protocol (SSCOP) program 439, and an ATM signaling (SIG) program 440. ATM application 110 may include many other sub-programs only a few have been shown for convenience. Each sub-process may also include sub-processes, for example, ILMI sub-processes 438a–438n. In general, the upper level application (e.g., ATM 110) is assigned a process memory block that is shared by all its sub-processes.

If, for example, SSCOP 439 detects a fault, it notifies LRM 436. LRM 436 passes the fault to local slave SRM 37b, which catalogs the fault in the ATM application's fault history and sends a notice to local slave logging entity 433b. The slave logging entity sends a notice to master logging entity 431, which may log the event in master log event file 435. The local logging entity may also log the failure in local event log 435a. LRM 436 also determines, based on the type of failure, whether it can fully resolve the error and do so without affecting other processes outside its scope, for example, ATM 111–113, device drivers 43a–43d and their sub-processes and processes running on other boards. If yes, then the LRM takes corrective action in accordance with its fault policy. Corrective action may include restarting SSCOP 439 or resetting it to a known state.

Since all sub-processes within an application, including the LRM sub-process, share the same memory space, it may be insufficient to restart or reset a failing sub-process (e.g., SSCOP 439). Hence, for most failures, the fault policy will cause the LRM to escalate the failure to the local slave SRM. In addition, many failures will not be presented to the LRM but will, instead, be presented directly to the local slave SRM. These failures are likely to have been detected by either processor exceptions, OS errors or low-level system service errors. Instead of failures, however, the sub-processes may notify the LRM of events that may require action. For example, the LRM may be notified that the PNNI message queue is growing quickly. The LRM's fault policy may direct it to request more memory from the operating system. The LRM will also pass the event to the local slave SRM as a non-fatal fault. The local slave SRM will catalog the event and log it with the local logging entity, which may also log it with the master logging entity. The local slave SRM may take more severe action to recover from an excessive number of these non-fatal faults that result in memory requests.

If the event or fault (or the actions required to handle either) will affect processes outside the LRM's scope, then the LRM notifies slave SRM 37b of the event or failure. In addition, if the LRM detects and logs the same failure or event multiple times and in excess of a predetermined threshold set within the fault policy, the LRM may escalate the failure or event to the next hierarchical scope by notifying slave SRM 37b. Alternatively or in addition, the slave SRM may use the fault history for the application instance to determine when a threshold is exceeded and automatically execute its fault policy.

When slave SRM 37b detects or is notified of a failure or event, it notifies slave logging entity 435b. The slave logging entity notifies master logging entity 431, which may log the failure or event in master event log 435, and the slave logging entity may also log the failure or event in local event log 435b. Slave SRM 37b also determines, based on the type of failure or event, whether it can handle the error without affecting other processes outside its scope, for example, processes running on other boards. If yes, then slave SRM 37b takes corrective action in accordance with its fault policy and logs the fault. Corrective action may include re-starting one or more applications on line card 16a.

If the fault or recovery actions will affect processes outside the slave SRM's scope, then the slave SRM notifies master SRM 36. In addition, if the slave SRM has detected and logged the same failure multiple times and in excess of a predetermined threshold, then the slave SRM may escalate the failure to the next hierarchical scope by notifying master SRM 36 of the failure. Alternatively, the master SRM may use its fault history for a particular line card to determine when a threshold is exceeded and automatically execute its fault policy.

When master SRM 36 detects or receives notice of a failure or event, it notifies slave logging entity 433a, which notifies master logging entity 431. The master logging entity 431 may log the failure or event in master log file 435 and the slave logging entity may log the failure or event in local event log 435a. Master SRM 36 also determines the appropriate corrective action based on the type of failure or event and its fault policy. Corrective action may require failing-over one or more line cards 16a–16n or other boards, including central processor 12, to redundant backup boards or, where backup boards are not available, simply shutting particular boards down. Some failures may require the master SRM to re-boot the entire computer system.

An example of a common error is a memory access error. As described above, when the slave SRM starts a new instance of an application, it requests a protected memory block from the local operating system. The local operating systems assign each instance of an application one block of local memory and then program the local memory management unit (MMU) hardware with which processes have access (read and/or write) to each block of memory. An MMU detects a memory access error when a process attempts to access a memory block not assigned to that process. This type of error may result when the process generates an invalid memory pointer. The MMU prevents the failing process from corrupting memory blocks used by other processes (i.e., protected memory model) and sends a hardware exception to the local processor. A local operating system fault handler detects the hardware exception and determines which process attempted the invalid memory access. The fault handler then notifies the local slave SRM of the hardware exception and the process that caused it. The slave SRM determines the application instance within which the fault occurred and then goes through the process described above to determine whether to take corrective action, such as restarting the application, or escalate the fault to the master SRM.

As another example, a device driver, for example, device driver 43a may determine that the hardware associated with its port, for example, port 44a, is in a bad state. Since the failure may require the hardware to be swapped out or failed-over to redundant hardware or the device driver itself to be re-started, the device driver notifies slave SRM 37b. The slave SRM then goes through the process described above to determine whether to take corrective action or escalate the fault to the master SRM.

As a third example, if a particular application instance repeatedly experiences the same software error but other similar application instances running on different ports do not experience the same error, the slave SRM may determine that it is likely a hardware error. The slave SRM would then notify the master SRM which may initiate a fail-over to a backup board or, if no backup board exists, simply shut down that board or only the failing port on that board. Similarly, if the master SRM receives failure reports from multiple boards indicating Ethernet failures, the master SRM may determine that the Ethernet hardware is the problem and initiate a fail-over to backup Ethernet hardware.

Consequently, the failure type and the failure policy determine at what scope recovery action will be taken. The higher the scope of the recovery action, the larger the temporary loss of services. Speed of recovery is one of the primary considerations when establishing a fault policy. Restarting a single software process is much faster than switching over an entire board to a redundant board or re-booting the entire computer system. When a single process is restarted, only a fraction of a card's services are affected. Allowing failures to be handled at appropriate hierarchical levels avoids unnecessary recovery actions while ensuring that sufficient recovery actions are taken, both of which minimize service disruption to customers.

Hierarchical Descriptors

Hierarchical descriptors may be used to provide information specific to each failure or event. The hierarchical descriptors provide granularity with which to report faults, take action based on fault history and apply fault recovery policies. The descriptors can be stored in master event log file 435 or local event log files 435a–435n through which faults and events may be tracked and displayed to the user and allow for fault detection at a fine granular level and proactive response to events. In addition, the descriptors can be matched with descriptors in the fault policy to determine the recovery action to be taken.

Figure 28:
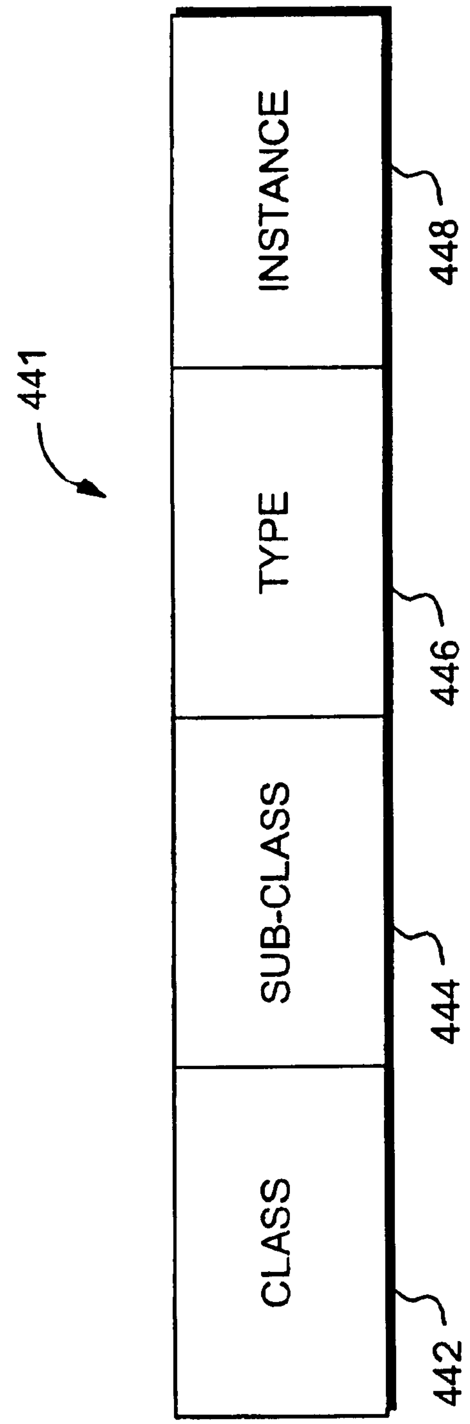
FIG. 28 is a block diagram of a hierarchical fault descriptor.

Referring to FIG. 28, in one embodiment, a descriptor 441 includes a top hierarchical class field 442, a next hierarchical level sub-class field 444, a lower hierarchical level type field 446 and a lowest level instance field 448. The class field indicates whether the failure or event is related (or suspected to relate) to hardware or software. The subclass field categorizes events and failures into particular hardware or software groups. For example, under the hardware class, subclass indications may include whether the fault or event is related to memory, Ethernet, switch fabric or network data transfer hardware. Under the software class, subclass indications may include whether the fault or event is a system fault, an exception or related to a specific application, for example, ATM.

The type field more specifically defines the subclass failure or event. For example, if a hardware class, Ethernet subclass failure has occurred, the type field may indicate a more specific type of Ethernet failure, for instance, a cyclic redundancy check (CRC) error or a runt packet error. Similarly, if a software class, ATM failure or event has occurred, the type field may indicate a more specific type of ATM failure or event, for instance, a private network-to-network interface (PNNI) error or a growing message queue event. The instance field identifies the actual hardware or software that failed or generated the event. For example, with regard to a hardware class, Ethernet subclass, CRC type failure, the instance indicates the actual Ethernet port that experienced the failure. Similarly, with regard to a software class, ATM subclass, PNNI type, the instance indicates the actual PNNI sub-program that experienced the failure or generated the event.

When a fault or event occurs, the hierarchical scope that first detects the failure or event creates a descriptor by filling in the fields described above. In some cases, however, the Instance field is not applicable. The descriptor is sent to the local logging entity, which may log it in the local event log file before notifying the master logging entity, which may log it in the master event log file 435. The descriptor may also be sent to the local slave SRM, which tracks fault history based on the descriptor contents per application instance. If the fault or event is escalated, then the descriptor is passed to the next higher hierarchical scope.

When slave SRM 37*b* receives the fault/event notification and the descriptor, it compares it to descriptors in the fault policy for the particular scope in which the fault occurred looking for a match or a best case match which will indicate the recovery procedure to follow. Fault descriptors within the fault policy can either be complete descriptors or have wildcards in one or more fields. Since the descriptors are hierarchical from left to right, wildcards in descriptor fields only make sense from right to left. The fewer the fields with wildcards, the more specific the descriptor. For example, a particular fault policy may apply to all software faults and would, therefore, include a fault descriptor having the class field set to "software" and the remaining fields—subclass, type, and instance—set to wildcard or "match all." The slave SRM searches the fault policy for the best match (i.e., the most fields matched) with the descriptor to determine the recovery action to be taken.

Configurable Fault Policy

In actual use, a computer system is likely to encounter scenarios that differ from those in which the system was designed and tested. Consequently, it is nearly impossible to determine all the ways in which a computer system might fail, and in the face of an unexpected error, the default fault policy that was shipped with the computer system may cause the hierarchical scope (master SRM, slave SRM or LRM) to under-react or over-react. Even for expected errors, after a computer system ships, certain recovery actions in the default fault policy may be determined to be over aggressive or too lenient. Similar issues may arise as new software and hardware is released and/or upgraded.

A configurable fault policy allows the default fault policy to be modified to address behavior specific to a particular upgrade or release or to address behavior that was learned after the implementation was released. In addition, a configurable fault policy allows users to perform manual overrides to suit their specific requirements and to tailor their policies based on the individual failure scenarios that they are experiencing. The modification may cause the hierarchical scope to react more or less aggressively to particular known faults or events, and the modification may add recovery actions to handle newly learned faults or events. The modification may also provide a temporary patch while a software or hardware upgrade is developed to fix a particular error.

If an application runs out of memory space, it notifies the operating system and asks for more memory. For certain applications, this is standard operating procedure. As an example, an ATM application may have set up a large number of virtual circuits and to continue setting up more, additional memory is needed. For other applications, a request for more memory indicates a memory leak error. The fault policy may require that the application be re-started causing some service disruption. It may be that re-starting the application eventually leads to the same error due to a bug in the software. In this instance, while a software upgrade to fix the bug is developed, a temporary patch to the fault policy may be necessary to allow the memory leak to continue and prevent repeated application re-starts that may escalate to line card re-start or fail-over and eventually to a re-boot of the entire computer system. A temporary patch to the default fault policy may simply allow the hierarchical scope, for example, the local resiliency manager or the slave SRM, to assign additional memory to the application. Of course, an eventual restart of the application is likely to be required if the application's leak consumes too much memory.

A temporary patch may also be needed while a hardware upgrade or fix is developed for a particular hardware fault. For instance, under the default fault policy, when a particular hardware fault occurs, the recovery policy may be to fail-over to a backup board. If the backup board includes the same hardware with the same hardware bug, for example, a particular semiconductor chip, then the same error will occur on the backup board. To prevent a repetitive fail-over while a hardware fix is developed, the temporary patch to the default fault policy may be to restart the device driver associated with the particular hardware instead of failing-over to the backup board.

In addition to the above needs, a configurable fault policy also allows purchasers of computer system 10 (e.g., network service providers) to define their own policies. For example, a network service provider may have a high priority customer on a particular port and may want all errors and events (even minor ones) to be reported to the NMS and displayed to the network manager. Watching all errors and events might give the network manager early notice of growing resource consumption and the need to plan to dedicate additional resources to this customer.

As another example, a user of computer system 10 may want to be notified when any process requests more memory. This may give the user early notice of the need to add more memory to their system or to move some customers to different line cards.

Referring again to FIG. 26, to change the default fault policy as defined by default fault policy (DFP) files 430*a*–430*n*, a configuration fault policy file 429 is created by the NMS in the configuration database. An active query notification is sent by the configuration database to the master SRM indicating the changes to the default fault policy. The master SRM notifies any slave SRMs of any changes to the default fault policies specific to the boards on which they are executing, and the slave SRMs notify any LRMs of any changes to the default fault policies specific to their process. Going forward, the default fault policies—as modified by the configuration fault policy—are used to detect, track and respond to events or failures.

Alternatively, active queries may be established with the configuration database for configuration fault policies specific to each board type such that the slave SRMs are notified directly of changes to their default fault policies.

A fault policy (whether default or configured) is specific to a particular scope and descriptor and indicates a particular recovery action to take. As one example, a temporary patch may be required to handle hardware faults specific to a known bug in an integrated circuit chip. The configured fault policy, therefore, may indicate a scope of all line cards, if the component is on all line cards, or only a specific type of line card that includes that component. The configured fault policy may also indicate that it is to be applied to all hardware faults with that scope, for example, the class will indicate hardware (HW) and all other fields will include wildcards (e.g., HW.*.*.*). Instead, the configured fault policy may only indicate a particular type of hardware failure, for example, CRC errors on transmitted Ethernet packets (e.g., HW.Ethernet.TxCRC.*).

Redundancy

As previously mentioned, a major concern for service providers is network downtime. In pursuit of "five 9's availability" or 99.999% network up time, service providers must minimize network outages due to equipment (i.e., hardware) and all too common software failures. Developers of computer systems often use redundancy measures to minimize downtime and enhance system resiliency. Redundant designs rely on alternate or backup resources to overcome hardware and/or software faults. Ideally, the redundancy architecture allows the computer system to continue operating in the face of a fault with minimal service disruption, for example, in a manner transparent to the service provider's customer.

Generally, redundancy designs come in two forms: 1:1 and 1:N. In a so-called "1:1 redundancy" design, a backup element exists for every active or primary element (i.e., hardware backup). In the event that a fault affects a primary element, a corresponding backup element is substituted for the primary element. If the backup element has not been in a "hot" state (i.e., software backup), then the backup element must be booted, configured to operate as a substitute for the failing element, and also provided with the "active state" of the failing element to allow the backup element to take over where the failed primary element left off. The time required to bring the software on the backup element to an "active state" is referred to as synchronization time. A long synchronization time can significantly disrupt system service, and in the case of a computer network device, if synchronization is not done quickly enough, then hundreds or thousands of network connections may be lost which directly impacts the service provider's availability statistics and angers network customers.

To minimize synchronization time, many 1:1 redundancy schemes support hot backup of software, which means that the software on the backup elements mirror the software on the primary elements at some level. The "hotter" the backup element—that is, the closer the backup mirrors the primary—the faster a failed primary can be switched over or failed over to the backup. The "hottest" backup element is one that runs hardware and software simultaneously with a primary element conducting all operations in parallel with the primary element. This is referred to as a "1+1 redundancy" design and provides the fastest synchronization.

Significant costs are associated with 1:1 and 1+1 redundancy. For example, additional hardware costs may include duplicate memory components and printed circuit boards including all the components on those boards. The additional hardware may also require a larger supporting chassis. Space is often limited, especially in the case of network service providers who may maintain hundreds of network devices. Although 1:1 redundancy improves system reliability, it decreases service density and decreases the mean time between failures. Service density refers to the proportionality between the net output of a particular device and its gross hardware capability. Net output, in the case of a network device (e.g., switch or router), might include, for example, the number of calls handled per second. Redundancy adds to gross hardware capability but not to the net output and, thus, decreases service density. Adding hardware increases the likelihood of a failure and, thus, decreases the mean time between failures. Likewise, hot backup comes at the expense of system power. Each active element consumes some amount of the limited power available to the system. In general, the 1+1 or 1:1 redundancy designs provide the highest reliability but at a relatively high cost. Due to the importance of network availability, most network service providers prefer the 1+1 redundancy design to minimize network downtime.

In a 1:N redundancy design, instead of having one backup element per primary element, a single backup element or spare is used to backup multiple (N) primary elements. As a result, the 1:N design is generally less expensive to manufacture, offers greater service density and better mean time between failures than the 1:1 design and requires a smaller chassis/less space than a 1:1 design. One disadvantage of such a system, however, is that once a primary element fails over to the backup element, the system is no longer redundant (i.e., no available backup element for any primary element). Another disadvantage relates to hot state backup. Because one backup element must support multiple primary elements, the typical 1:N design provides no hot state on the backup element leading to long synchronization times and, for network devices, the likelihood that connections will be dropped and availability reduced.

Even where the backup element provides some level of hot state backup it generally lacks the processing power and memory to provide a full hot state backup (i.e., 1+N) for all primary elements. To enable some level of hot state backup for each primary element, the backup element is generally a "mega spare" equipped with a more powerful processor and additional memory. This requires customers to stock more hardware than in a design with identical backup and primary elements. For instance, users typically maintain extra hardware in the case of a failure. If a primary fails over to the backup, the failed primary may be replaced with a new primary. If the primary and backup elements are identical, then users need only stock that one type of board, that is, a failed backup is also replaced with the same hardware used to replace the failed primary. If they are different, then the user must stock each type of board, thereby increasing the user's cost.

Distributed Redundancy

A distributed redundancy architecture spreads software backup (hot state) across multiple elements. Each element may provide software backup for one or more other elements. For software backup alone, therefore, the distributed redundancy architecture eliminates the need for hardware backup elements (i.e., spare hardware). Where hardware backup is also provided, spreading resource demands across multiple elements makes it possible to have significant (perhaps full) hot state backup without the need for a mega spare. Identical backup (spare) and primary hardware provides manufacturing advantages and customer inventory advantages. A distributed redundancy design is less expensive than many 1:1 designs and a distributed redundancy architecture also permits the location of the hardware backup element to float, that is, if a primary element fails over to the backup element, when the failed primary element is replaced, that new hardware may serve as the hardware backup.

Software Redundancy

Figure 29:
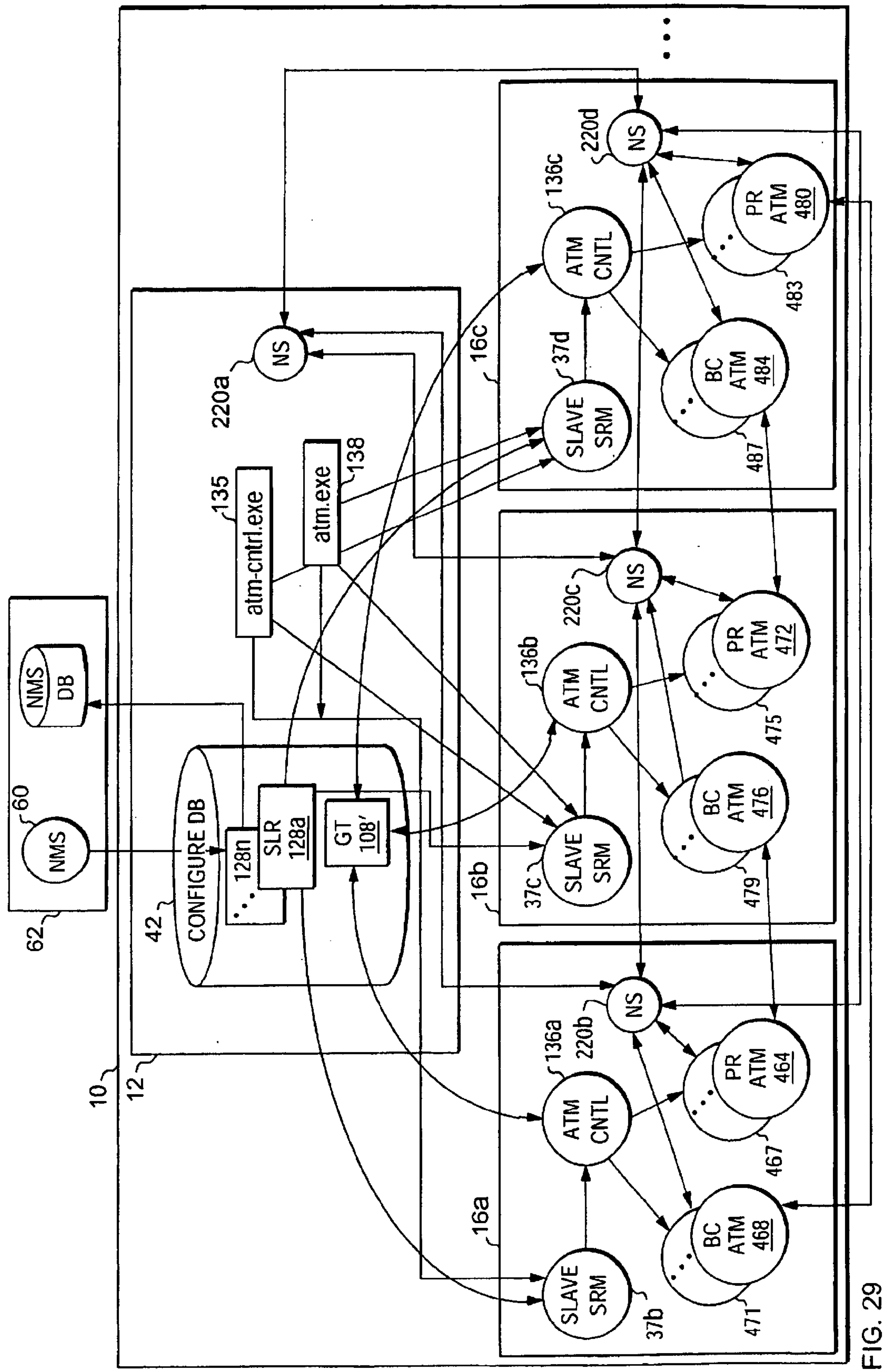
FIG. 29 is a block and flow diagram of a computer system incorporating a distributed redundancy architecture and illustrating a method for accomplishing distributed software redundancy.

In its simplest form, a distributed redundancy system provides software redundancy (i.e., backup) with or without redundant (i.e., backup) hardware, for example, with or without using backup line card 16*n* as discussed earlier with reference to the logical to physical card table (FIG. 14*b*). Referring to FIG. 29, computer system 10 includes primary line cards 16*a,* 16*b* and 16*c*. Computer system 10 will likely include additional primary line cards; only three are discussed herein (and shown in FIG. 29) for convenience. As described above, to load instances of software applications, the NMS creates software load records (SLR) 128*a*–128*n* in configuration database 42. The SLR includes the name of a control shim executable file and a logical identification (LID) associated with a primary line card on which the application is to be spawned. In the current example, there either are no hardware backup line cards or, if there are, the slave SRM executing on that line card does not download and execute backup applications.

As one example, NMS 60 creates SLR 128*a* including the executable name atm_cntrl.exe and card LID 30 (line card 16*a*), SLR 128*b* including atm_cntrl.exe and LID 31 (line card 16*b*) and SLR 128*c* including atm_cntrl.exe and LID 32 (line card 16*c*). The configuration database detects LID 30, 31 and 32 in SLRs 128*a,* 128*b* and 128*c,* respectively, and sends slave SRMs 37*b,* 37*c* and 37*d* (line cards 16*a,* 16*b,* and 16*c*) notifications including the name of the executable file (e.g., atm_cntrl.exe) to be loaded. The slave SRMs then download and execute a copy of atm_cntrl.exe 135 from memory 40 to spawn ATM controllers 136*a,* 136*b* and 136*c*.

Through the active query feature, the ATM controllers are sent records from group table (GT) 108' (FIG. 30) indicating how many instances of ATM each must start on their associated line cards. Group table 108' includes a primary line card LTD field 447 and a backup line card LID field 449 such that, in addition to starting primary instances of ATM, each primary line card also executes backup instances of ATM. For example, ATM controller 136*a* receives records 450–453 and 458–461 from group table 108' including LID 30 (line card 16*a*). Records 450–453 indicate that ATM controller 136*a* is to start four primary instantiations of ATM 464–467 (FIG. 29), and records 458–461 indicate that ATM controller 136*a* is to start four backup instantiations of ATM 468–471 as backup for four primary instantiations on LID 32 (line card 16*c*). Similarly, ATM controller 136*b* receives records 450–457 from group table 108' including LID 31 (line card 16*b*). Records 454–457 indicate that ATM controller 136*b* is to start four primary instantiations of ATM 472–475, and records 450–453 indicate that ATM controller 136*b* is to start four backup instantiations of ATM 476–479 as backup for four primary instantiations on LID 30 (line card 16*a*). ATM controller 136*c* receives records 454–461 from group table 108' including LID 32 (line card 16*c*). Records 458–461 indicate that ATM controller 136*c* is to start four primary instantiations of ATM 480–483, and records 454–457 indicate that ATM controller 136*c* is to start four backup instantiations of ATM 484–487 as backup for four primary instantiations on LID 31 (line card 16*b*). ATM controllers 136*a,* 136*b* and 136*c* then download atm.exe 138 and generate the appropriate number of ATM instantiations and also indicate to each instantiation whether it is a primary or backup instantiation. Alternatively, the ATM controllers may download atm.exe and generate the appropriate number of primary ATM instantiations and download a separate backup_atm.exe and generate the appropriate number of backup ATM instantiations.

Each primary instantiation registers with its local name server 220*b*–220*d,* as described above, and each backup instantiation subscribes to its local name server 220*b*–220*d* for information about its corresponding primary instantiation. The name server passes each backup instantiation at least the process identification number assigned to its corresponding primary instantiation, and with this, the backup instantiation sends a message to the primary instantiation to set up a dynamic state check-pointing procedure. Periodically or asynchronously as state changes, the primary instantiation passes dynamic state information to the backup instantiation (i.e., check-pointing). In one embodiment, a Redundancy Manager Service available from Harris and Jefferies of Dedham, Mass. may be used to allow backup and primary instantiations to pass dynamic state information. If the primary instantiation fails, it can be re-started, retrieve its last known dynamic state from the backup instantiation and then initiate an audit procedure (as described above) to resynchronize with other processes. The retrieval and audit process will normally be completed very quickly, resulting in no discemable service disruption.

Although each line card in the example above is instructed by the group table to start four instantiations of ATM, this is by way of example only. The user could instruct the NMS to set up the group table to have each line card start one or more instantiations and to have each line card start a different number of instantiations.

Figure 31A:
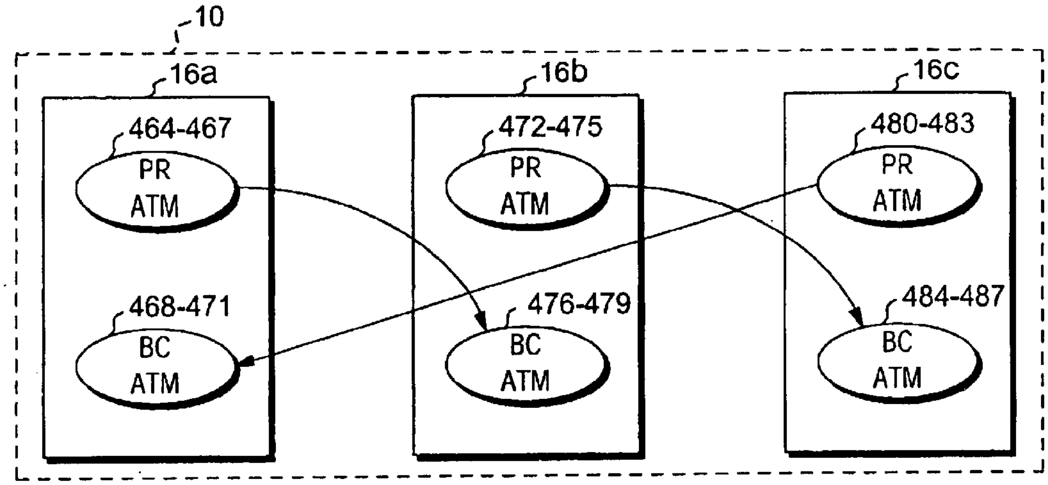
FIGS. 31*a*–31*c*, 32*a*–32*c*, 33*a*–33*d* and 34*a*–34*b* are block and flow diagrams of a computer system incorporating a distributed redundancy architecture and illustrating methods for accomplishing distributed redundancy and recovery after a failure.
Figure 31B:
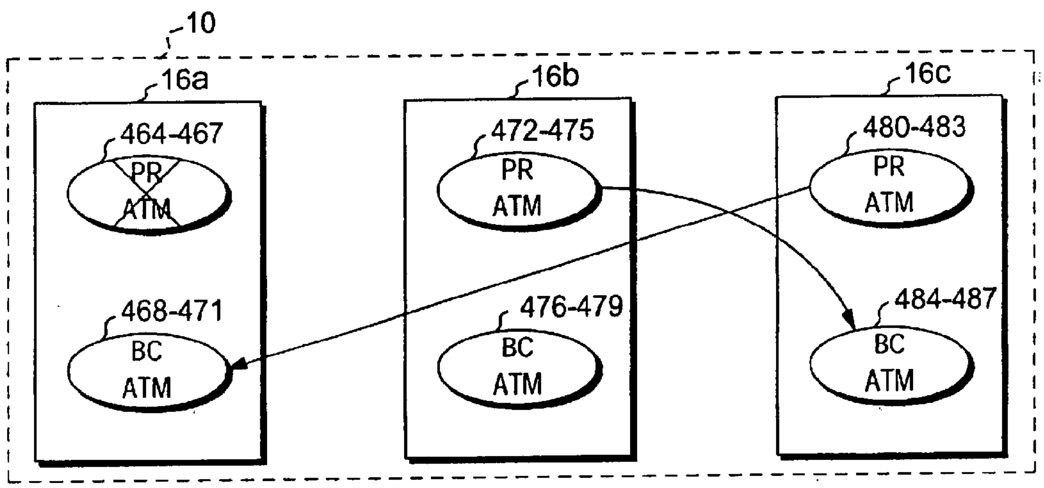
Figure 31C:
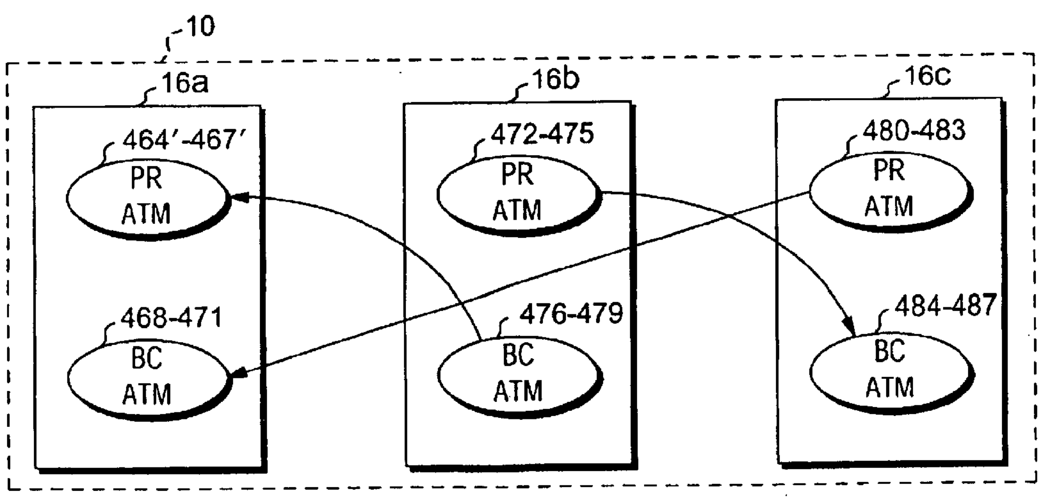

Referring to FIG. 31*a*-31*c,* if one or more of the primary processes on element 16*a* (ATM 464–467) experiences a software fault (FIG. 31*b*), the processor on line card 16*a* may terminate and restart the failing process or processes. Once the process or processes are restarted (ATM 464'–467', FIG. 31*c*), they retrieve a copy of the last known dynamic state (i.e., backup state) from corresponding backup processes (ATM 476–479) executing on line card 16*b* and initiate an audit process to synchronize retrieved state with the dynamic state of associated other processes. The backup state represents the last known active or dynamic state of the process or processes prior to termination, and retrieving this state from line card 16*b* allows the restarted processes on line card 16*a* to quickly resynchronize and continue operating. The retrieval and audit process will normally be completed very quickly, and in the case of a network device, quick resynchronization may avoid losing network connections, resulting in no discernable service disruption.

Figure 32A:
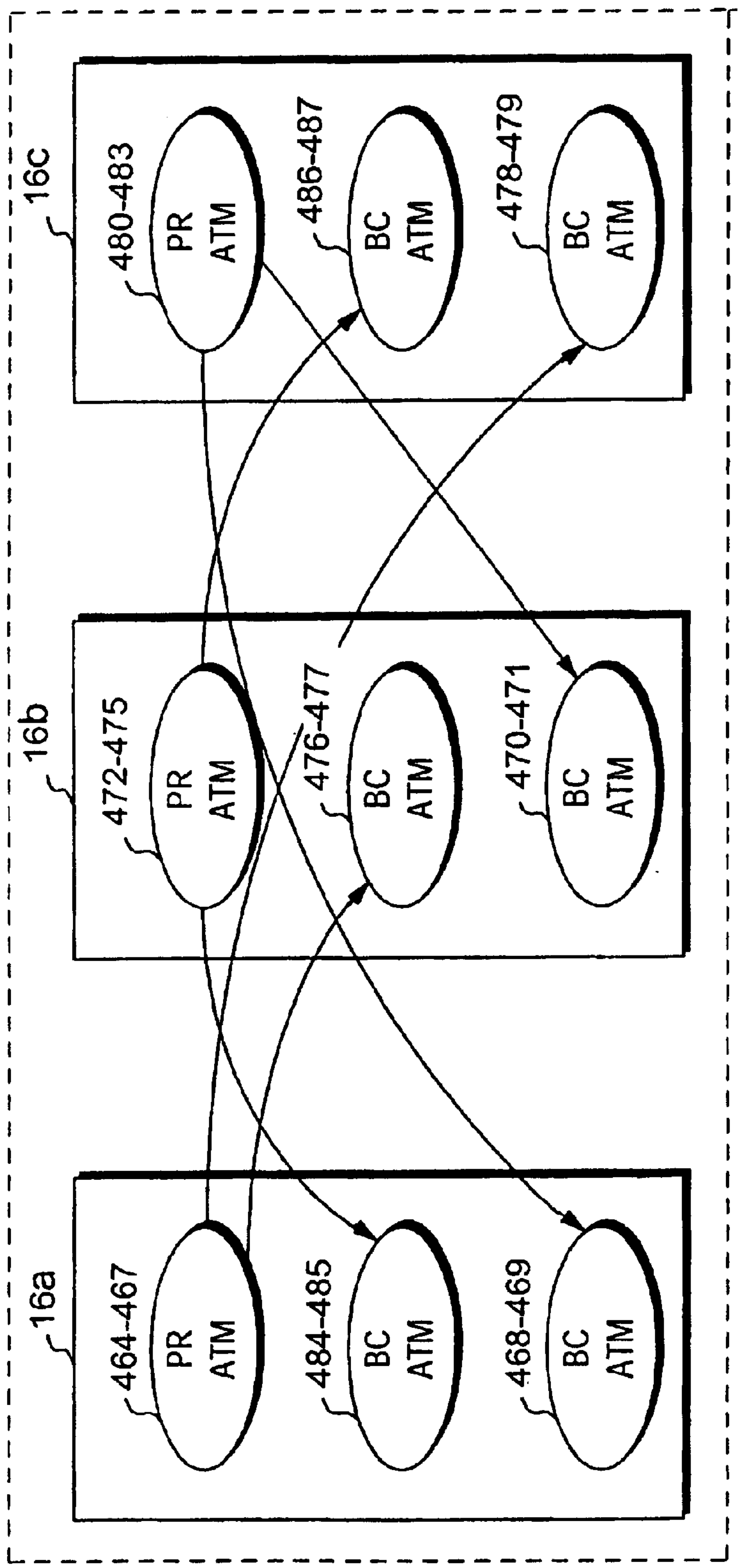
Figure 32B:
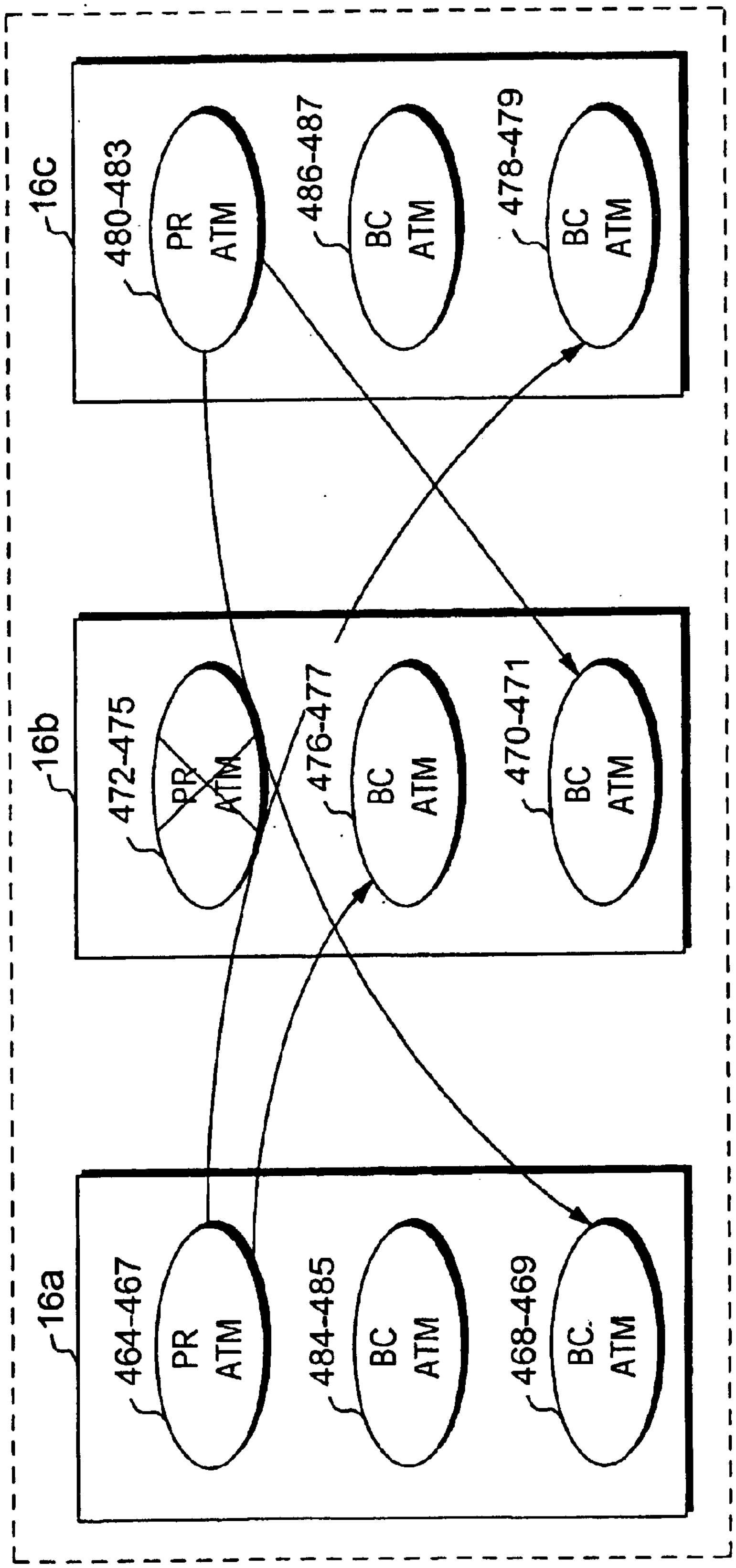
Figure 32C:
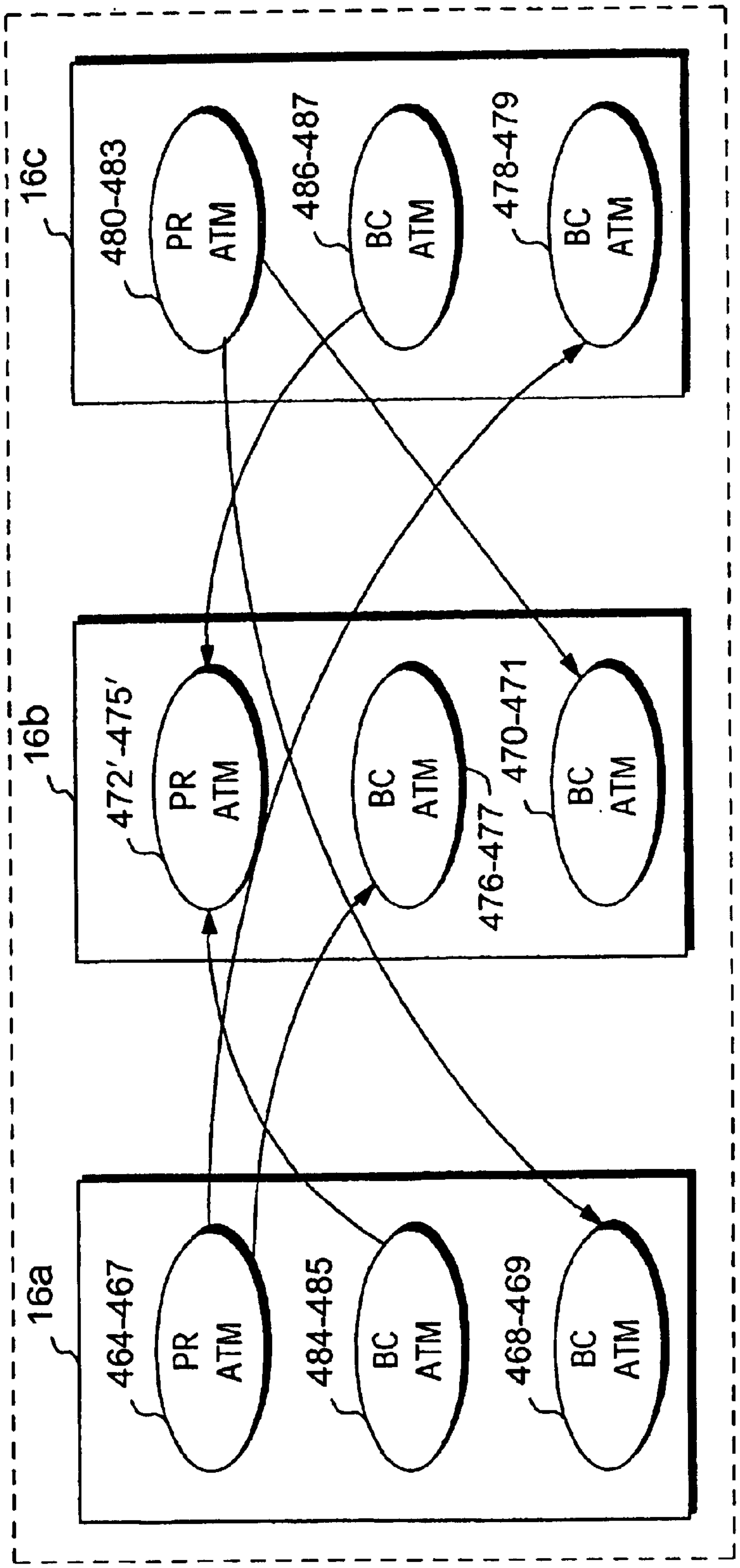

If, instead of restarting a particular application, the software fault experienced by line card 16*a* requires the entire element to be shut down and rebooted, then all of the processes executing on line card 16*a* will be terminated including backup processes ATM 468–471. When the primary processes are restarted, backup state information is retrieved from backup processes executing on line card 16*b* as explained above. Simultaneously, the restarted backup processes on line card 16*a* again initiate the check-pointing procedure with primary ATM processes 480–483 executing on line card 16*c* to again serve as backup processes for these primary processes. Referring to FIGS. 32*a*–32*c,* the primary processes executing on one line card may be backed-up by backup processes running on one or more other line cards. In addition, each primary process may be backed-up by one or more backup processes executing on one or more of the other line cards.

Since the operating system assigns each process its own memory block, each primary process may be backed-up by a backup process running on the same line card. This would minimize the time required to retrieve backup state and resynchronize if a primary process fails and is restarted. In a computer system that includes a spare or backup line card (described below), the backup state is best saved on another line card such that in the event of a hardware fault, the backup state is not lost and can be copied from the other line card. If memory and processor limitations permit, backup processes may run simultaneously on the same line card as the primary process and on another line card such that software faults are recovered from using local backup state and hardware faults are recovered from using remote backup state.

Where limitations on processing power or memory make full hot state backup impossible or impractical, only certain hot state data will be stored as backup. The level of hot state backup is inversely proportional to the resynchronization time, that is, as the level of hot state backup increases, resynchronization time decreases. For a network device, backup state may include critical information that allows the primary process to quickly re-synchronize.

Critical information for a network device may include connection data relevant to established network connections (e.g., call set up information and virtual circuit information). For example, after primary ATM applications 464–467, executing on line card 16*a,* establish network connections, those applications send critical state information relevant to those connections to backup ATM applications 479–476 executing on line card 16*b.* Retrieving connection data allows the hardware (i.e., line card 16*a*) to send and receive network data over the previously established network connections preventing these connections from being terminated/dropped.

Although ATM applications were used in the examples above, this is by way of example only. Any application (e.g., IP or MPLS), process (e.g., MCD or NS) or device driver (e.g., port driver) may have a backup process started on another line card to store backup state through a check-pointing procedure.

Hardware and Software Backup

By adding one or more hardware backup elements (e.g., line card 16*n*) to the computer system, the distributed redundancy architecture provides both hardware and software backup. Software backup may be spread across all of the line cards or only some of the line cards. For example, software backup may be spread only across the primary line cards, only on one or more backup line cards or on a combination of both primary and backup line cards.

Figure 33A:
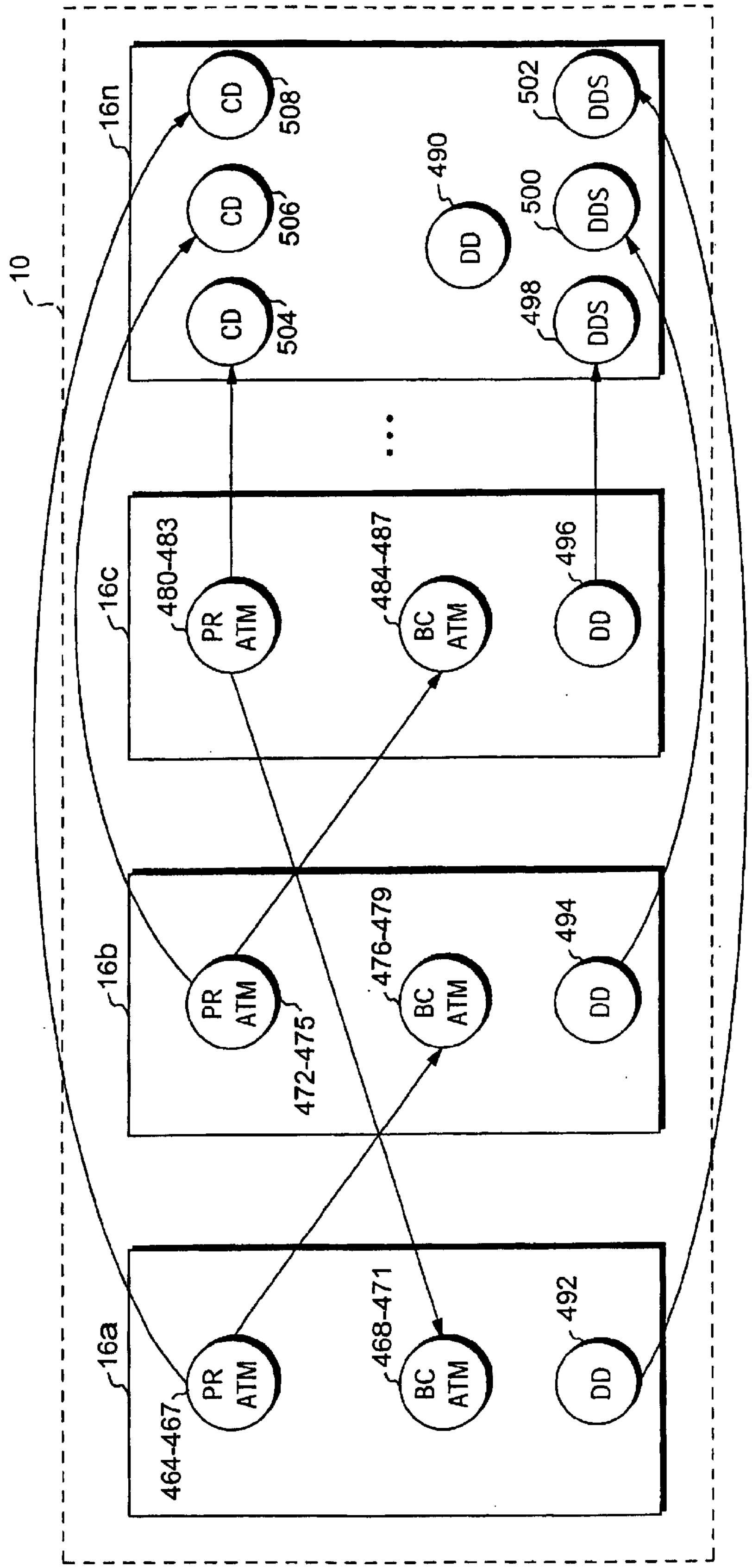

Referring to FIG. 33*a,* in the continuing example, line cards 16*a,* 16*b* and 16*c* are primary hardware elements and line card 16*n* is a spare or backup hardware element. In this example, software backup is spread across only the primary line cards. Alternatively, backup line card 16*n* may also execute backup processes to provide software backup. Backup line card 16*n* may execute all backup processes such that the primary elements need not execute any backup processes or line card 16*n* may execute only some of the backup processes. Regardless of whether backup line card 16*n* executes any backup processes, it is preferred that line card 16*n* be at least partially operational and ready to use the backup processes to quickly begin performing as if it was a failed primary line card.

There are many levels at which a backup line card may be partially operational. For example, the backup line card's hardware may be configured and device driver processes 490 loaded and ready to execute. In addition, the active state of the device drivers 492, 494, and 496 on each of the primary line cards may be stored as backup device driver state (DDS) 498, 500, 502 on backup line card 16*n* such that after a primary line card fails, the backup device driver state corresponding to that primary element is used by device driver processes 490 to quickly synchronize the hardware on backup line card 16*n.* In addition, data reflecting the network connections established by each primary process may be stored within each of the backup processes or independently on backup line card 16*n,* for example, connection data (CD) 504, 506, 508. Having a copy of the connection data on the backup line card allows the hardware to quickly begin transmitting network data over previously established connections to avoid the loss of these connections and minimize service disruption. The more operational (i.e., hotter) backup line card 16*n* is the faster it will be able to transfer data over network connections previously established by the failed primary line card and resynchronize with the rest of the system.

Figure 33B:
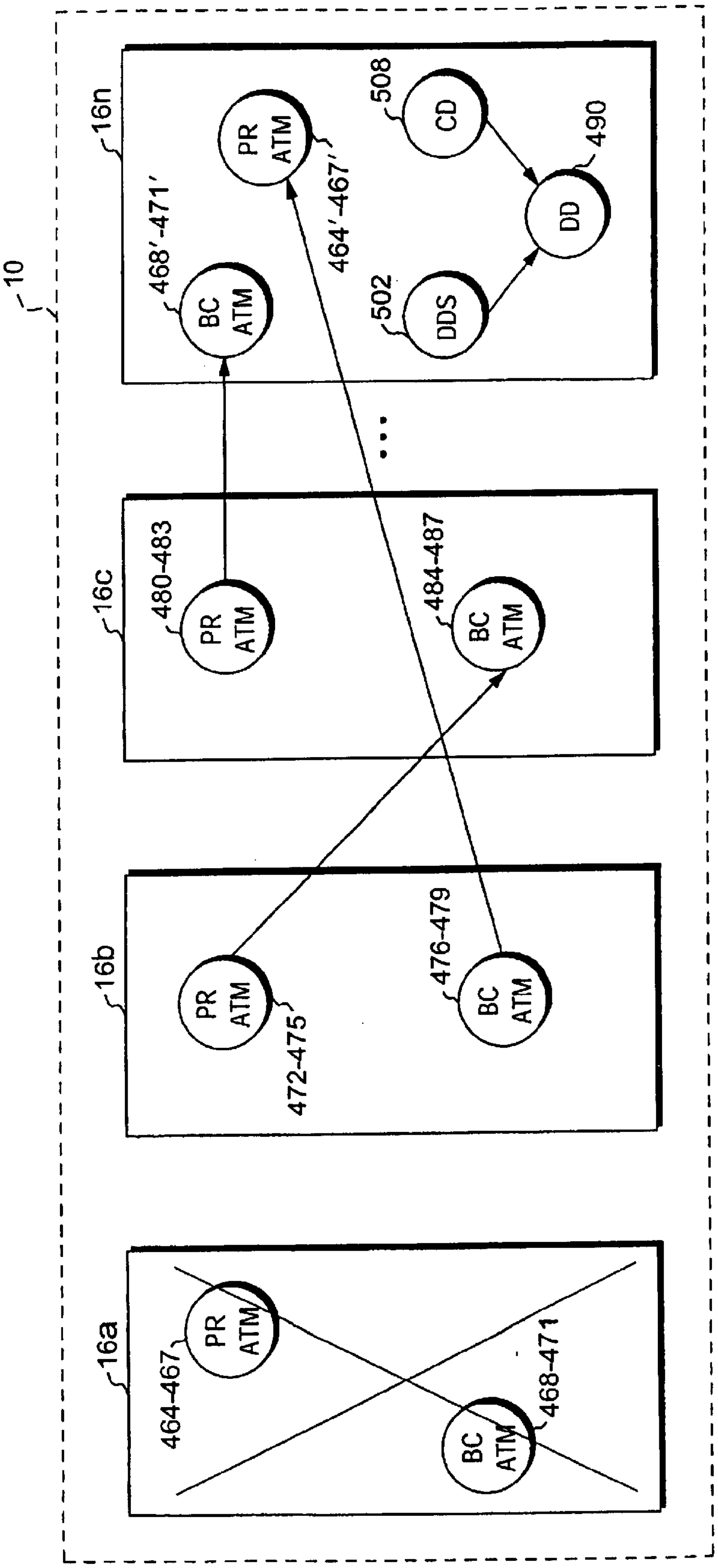

In the case of a primary line card hardware fault, the backup or spare line card takes the place of the failed primary line card. The backup line card starts new primary processes that register with the name server on the backup line card and begin retrieving active state from backup processes associated with the original primary processes. As described above, the same may also be true for software faults. Referring to FIG. 33*b,* if, for example, line card 16*a* in computer system 10 is affected by a fault, the slave SRM executing on backup line card 16*n* may start new primary processes 464'–467' corresponding to the original primary processes 464–467. The new primary processes register with the name server process executing on line card 16*n* and begin retrieving active state from backup processes 476–479 on line card 16*b.* This is referred to as a "fail-over" from failed primary line card 16*a* to backup line card 16*n.*

As discussed above, preferably, backup line card 16*n* is partially operational. While active state is being retrieved from backup processes on line card 16*b,* device driver processes 490 use device driver state 502 and connection data 508 corresponding to failed primary line card 16*a* to quickly continue passing network data over previously established connections. Once the active state is retrieved then the ATM applications resynchronize and may begin establishing new connections and tearing down old connections.

Floating Backup Element

Figure 33C:
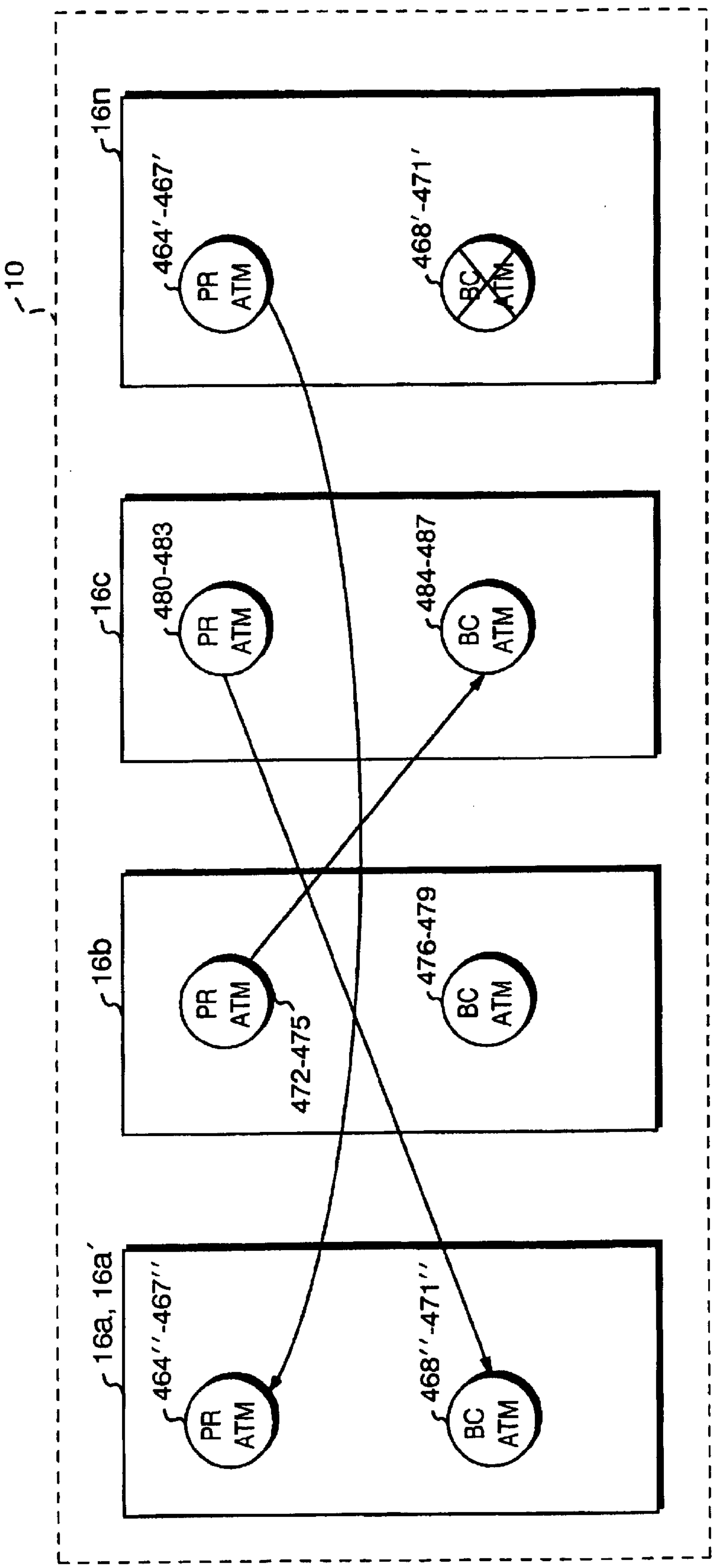

Referring to FIG. 33*c,* when the fault is detected on line card 16*a,* diagnostic tests may be run to determine if the error was caused by software or hardware. If the fault is a software error, then line card 16*a* may again be used as a primary line card. If the fault is a hardware error, then line card 16*a* is replaced with a new line card 16*a*' that is booted and configured and again ready to be used as a primary element. In one embodiment, once line card 16*a* or 16*a*' is ready to serve as a primary element, a fail-over is initiated from line card 16*n* to line card 16*a* or 16*a*' as described above, including starting new primary processes 464"–467" and retrieving active state from primary processes 464'–467' on line card 16*n* (or backup processes 476–479 on line card 16*b*). Backup processes 468"–471" are also started, and those backup processes initiate a check-pointing procedure with primary processes 480–483 on line card 16*c*. This fail-over may cause the same level of service interruption as an actual failure.

Figure 33D:
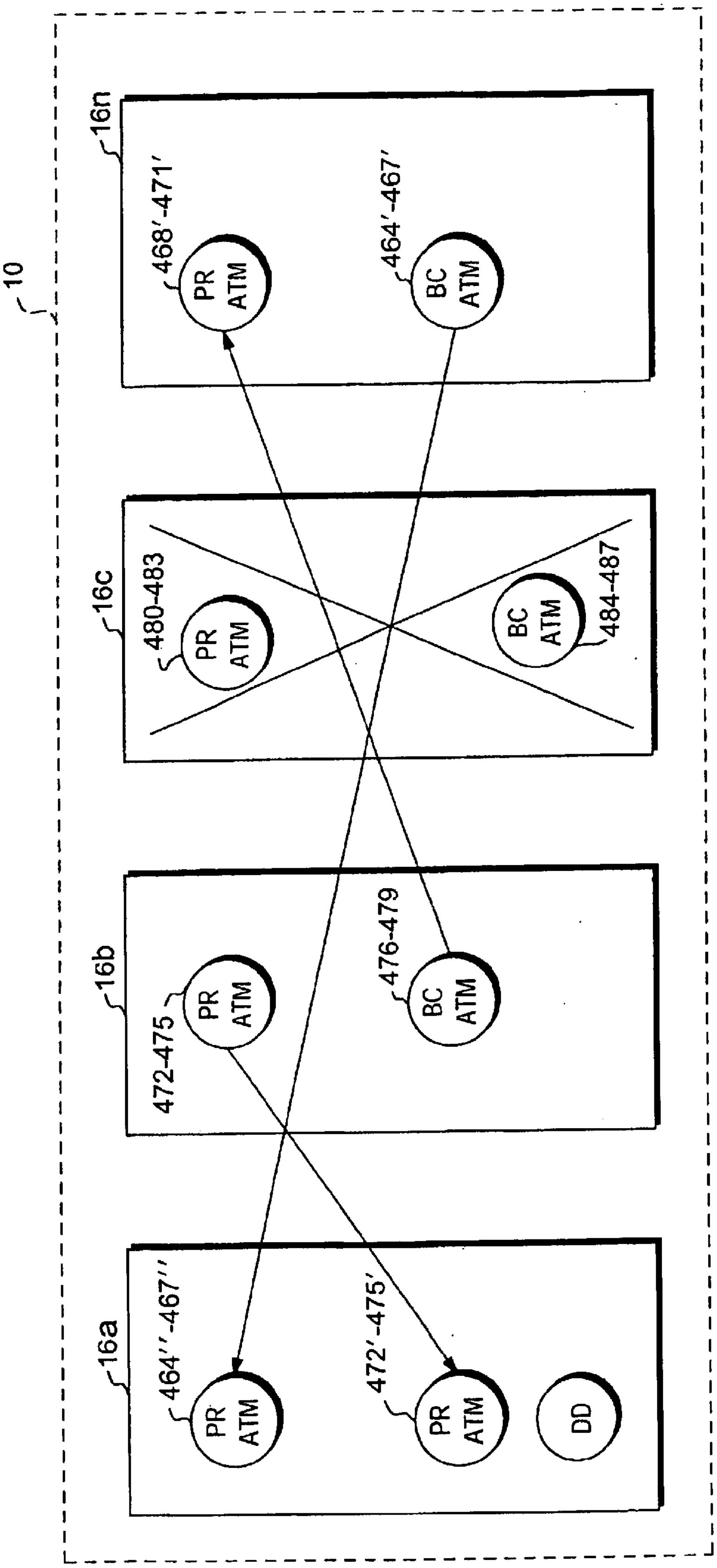

Instead of failing-over from line card 16*n* back to line card 16*a* or 16*a*' and risking further service disruption, line card 16*a* or 16*a*' may serve as the new backup line card with line card 16*n* serving as the primary line card. If line cards 16*b*, 16*c* or 16*n* experience a fault, a fail-over to line card 16*a* is initiated as discussed above and the primary line card that failed (or a replacement of that line card) serves as the new backup line card. This is referred to as a "floating" backup element. Referring to FIG. 33*d*, if, for example, line card 16*c* experiences a fault, primary processes 480'–483' are started on backup line card 16*a* and active state is retrieved from backup processes 464'–467' on line card 16*n*. After line card 16*c* is rebooted or replaced and rebooted, it serves as the new backup line card for primary line cards 16*a*, 16*b* and 16*n*.

Alternatively, computer system 10 may be physically configured to only allow a line card in a particular chassis slot, for example, line card 16*n*, to serve as the backup line card. This may be the case where physically, the slot line card 16*n* is inserted within is wired to provide the necessary connections to allow line card 16*n* to communicate with each of the other line cards but no other slot provides these connections. In addition, even where the computer system is capable of allowing line cards in other chassis slots to act as the backup line card, the person acting as network manager, may prefer to have the backup line card in each of his computer systems in the same slot. In either case, where only line card 16*n* serves as the backup line card, once line card 16*a* (or any other failed primary line card) is ready to act as a primary line card again, a fail-over, as described above, is initiated from line card 16*n* to the primary line card to allow line card 16*n* to again serve as a backup line card to each of the primary line cards.

Balancing Resources

Figure 34A:
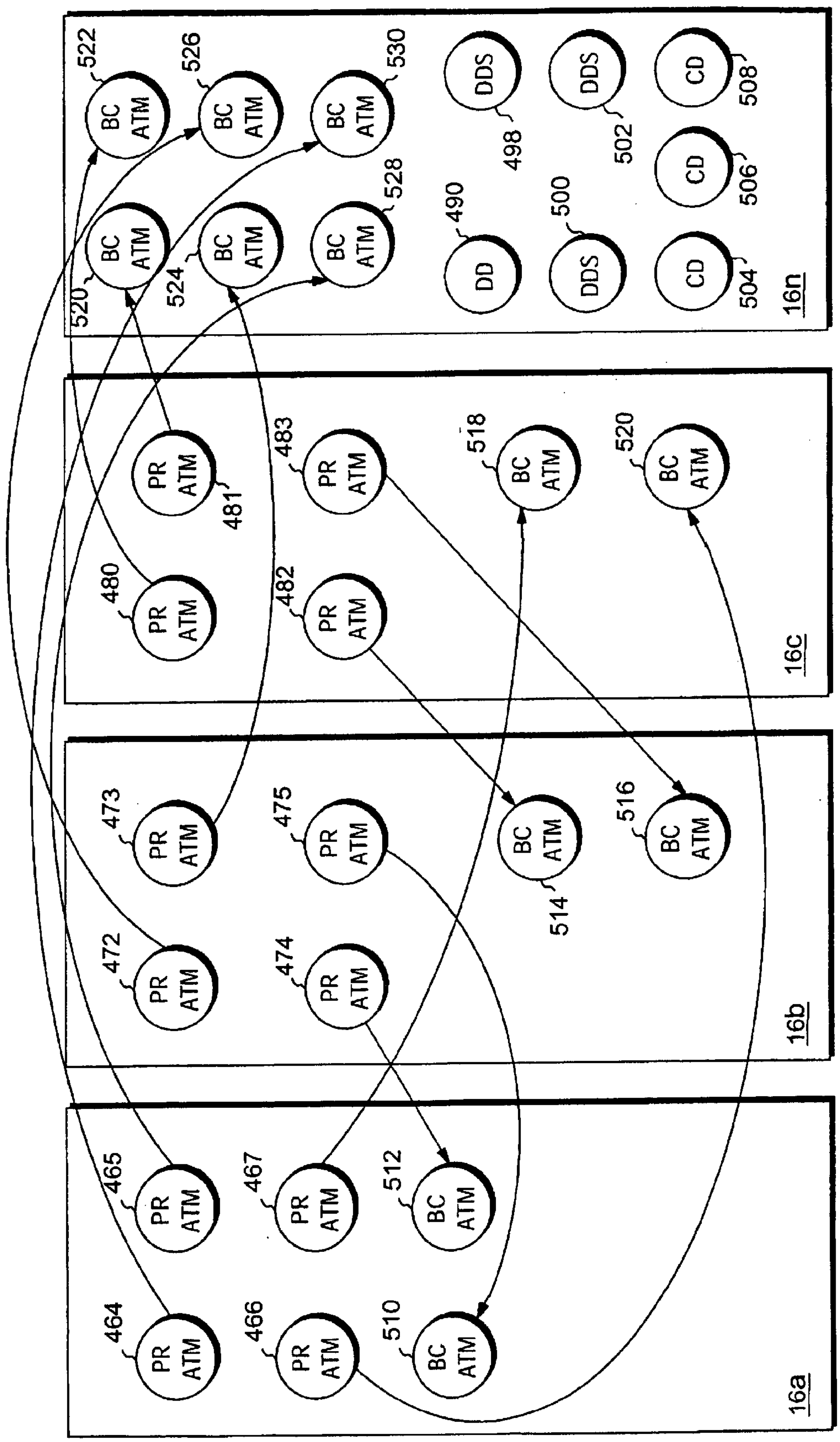

Typically, multiple processes or applications are executed on each primary line card. Referring to FIG. 34*a*, in one embodiment, each primary line card 16*a*, 16*b*, 16*c* executes four applications. Due to physical limitations (e.g., memory space, processor power), each primary line card may not be capable of fully backing up four applications executing on another primary line card. The distributed redundancy architecture allows backup processes to be spread across multiple line cards, including any backup line cards, to more efficiently use all system resources.

For instance, primary line card 16*a* executes backup processes 510 and 512 corresponding to primary processes 474 and 475 executing on primary line card 16*b*. Primary line card 16*b* executes backup processes 514 and 516 corresponding to primary processes 482 and 483 executing on primary line card 16*c*, and primary line card 16*c* executes backup processes 518 and 520 corresponding to primary processes 466 and 467 executing on primary line card 16*a*. Backup line card 16*n* executes backup processes 520, 522, 524, 526, 528 and 530 corresponding to primary processes 464, 465, 472, 473, 480 and 481 executing on each of the primary line cards. Having each primary line card execute backup processes for only two primary processes executing on another primary line card reduces the primary line card resources required for backup. Since backup line card 16*n* is not executing primary processes, more resources are available for backup. Hence, backup line card 16*n* executes six backup processes corresponding to six primary processes executing on primary line cards. In addition, backup line card 16*n* is partially operational and is executing device driver processes 490 and storing device driver backup state 498, 500 and 502 corresponding to the device drivers on each of the primary elements and network connection data 504, 506 and 508 corresponding to the network connections established by each of the primary line cards.

Alternatively, each primary line card could execute more or less than two backup processes. Similarly, each primary line card could execute no backup processes and backup line card 16*n* could execute all backup processes. Many alternatives are possible and backup processes need not be spread evenly across all primary line cards or all primary line cards and the backup line card.

Figure 34B:
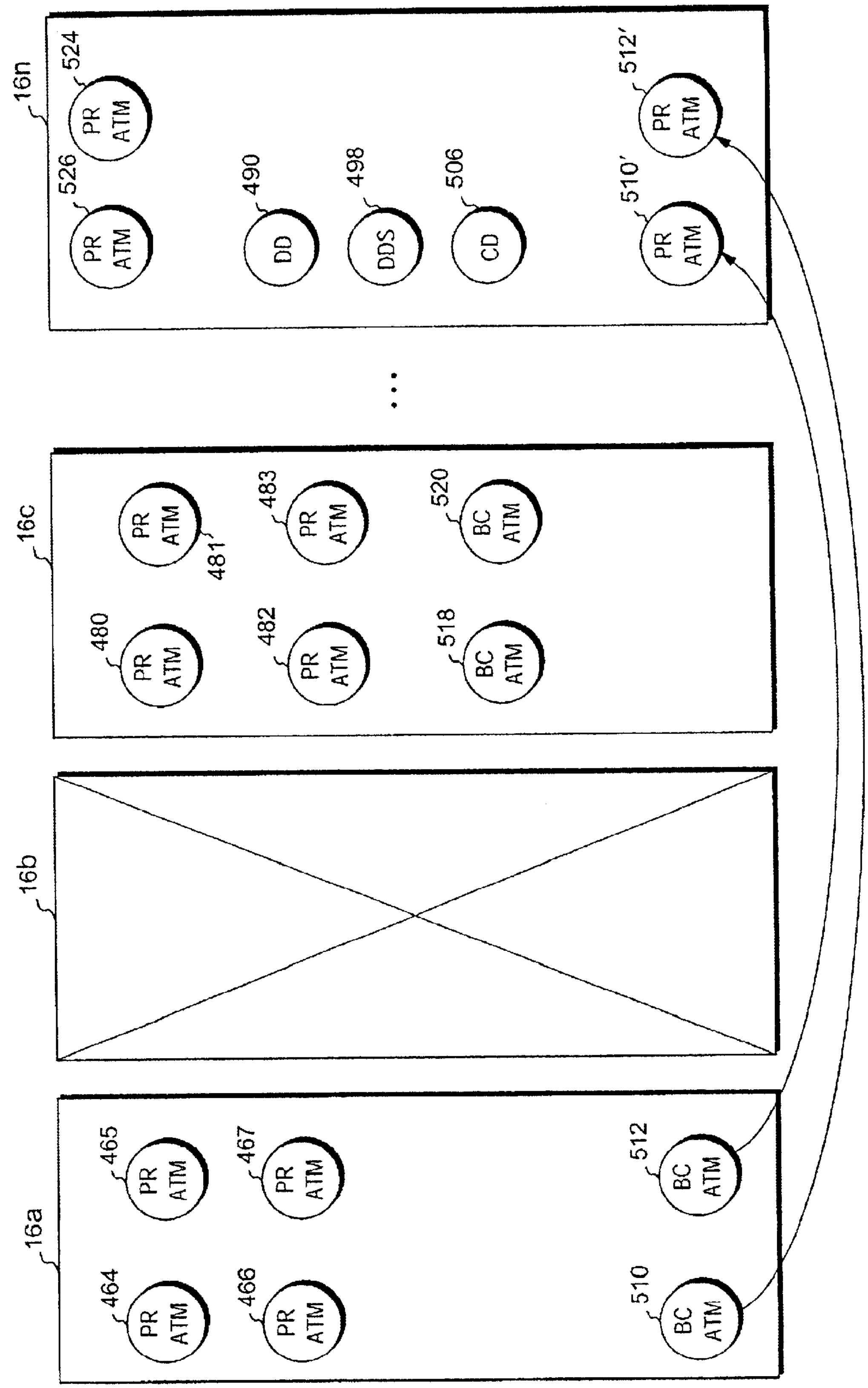

Referring to FIG. 34*b*, if primary line card 16*b* experiences a failure, device drivers 490 on backup line card 16*n* begins using the device driver state, for example, DDS 498, corresponding to the device drivers on primary line card 16*b* and the network connection data, for example, CD 506, corresponding to the connections established by primary line card 16*b* to continue transferring network data. Simultaneously, backup line card 16*n* starts substitute primary processes 510' and 512' corresponding to the primary processes 474 and 475 on failed primary line card 16*b*. Substitute primary processes 510' and 512' retrieve active state from backup processes 510 and 512 executing on primary line card 16*a*. In addition, the slave SRM on backup line card 16*n* informs backup processes 526 and 524 corresponding to primary processes 472 and 473 on failed primary line card 16*b* that they are now primary processes. The new primary applications then synchronize with the rest of the system such that new network connections may be established and old network connections torn down. That is, backup line card 16*n* begins operating as if it were primary line card 16*b*.

Multiple Backup Elements

In the examples given above, one backup line card is shown. Alternatively, multiple backup line cards may be provided in a computer system. In one embodiment, a computer system includes multiple different primary line cards. For example, some primary line cards may support the Asynchronous Transfer Mode (ATM) protocol while others support the Multi-Protocol Label Switching (MPLS) protocol, and one backup line card may be provided for the ATM primary line cards and another backup line card may be provided for the MPLS primary line cards. As another example, some primary line cards may support four ports while others support eight ports and one backup line card may be provided for the four port primaries and another backup line card may be provided for the eight port primaries. One or more backup line cards may be provided for each different type of primary line card.

Data Plane

Referring to FIG. 35, a network device 540 includes a central processor 542, a redundant central processor 543 and a Fast Ethernet control bus 544 similar to central processors 12 and 13 and Ethernet 32 discussed above with respect to computer system 10. In addition, network device 540 includes forwarding cards (FC) 546*a*–546*e*, 548*a*–548*e*, 550*a*–550*e* and 552*a*–552*e* that are similar to line cards 16*a*–16*n* discussed above with respect to computer system 10. Network device 540 also includes (and computer system 10 may also include) universal port (UP) cards 554*a*–554*h*, 556*a*–556*h*, 558*a*–558*h*, and 560*a*–560*h*, cross-connection (XC) cards 562*a*–562*b*, 564*a*–564*b*, 566*a*–566*b*, and 568*a*–568*b*, and switch fabric (SF) cards 570*a*–570*b*. In one embodiment, network device 540 includes four quadrants where each quadrant includes five forwarding cards (e.g.,

546*a*–546*e*), two cross connection cards (e.g., 562*a*–562*b*) and eight universal port cards (e.g., 554*a*–554*h*). Network device 540 is a distributed processing system. Each of the cards includes a processor and is connected to the Ethernet control bus. In addition, each of the cards are configured as described above with respect to line cards.

In one embodiment, the forwarding cards have a 1:4 hardware redundancy structure and distributed software redundancy as described above. For example, forwarding card 546*e* is the hardware backup for primary forwarding cards 546*a*–546*d* and each of the forwarding cards provide software backup. The cross-connection cards are 1:1 redundant. For example, cross-connection card 562*b* provides both hardware and software backup for cross-connection card 562*a*. Each port on the universal port cards may be 1:1, 1+1, 1:N redundant or not redundant at all depending upon the quality of service paid for by the customer associated with that port. For example, port cards 554*e*–554*h* may be the hardware and software backup cards for port cards 554*a*–554*d* in which case the port cards are 1:1 or 1+1 redundant. As another example, one or more ports on port card 554*a* may be backed-up by separate ports on one or more port cards (e.g., port cards 554*b* and 554*c*) such that each port is 1:1 or 1+1 redundant, one or more ports on port card 554*a* may not be backed-up at all (i.e., not redundant) and two or more ports on 554*a* may be backed-up by one port on another port card (e.g., port card 554*b*) such that those ports are 1:N redundant. Many redundancy structures are possible using the LID to PID Card table (LPCT) 100 (FIG. 14*b*) and LID to PID Port table (LPPT) as described above.

Each port card includes one or more ports for connecting to external network connections. One type of network connection is an optical fiber carrying an OC-48 SONET stream, and as described above, an OC-48 SONET stream may include connections to one or more end points using one or more paths. A SONET fiber carries a time division multiplexed (TDM) byte stream of aggregated time slots (TS). A time slot has a bandwidth of 51 Mbps and is the fundamental unit of bandwidth for SONET. An STS-1 path has one time slot within the byte stream dedicated to it, while an STS-3c path (i.e., three concatenated STS-1s) has three time slots within the byte stream dedicated to it. The same or different protocols may be carried over different paths within the same TDM byte stream. In other words, ATM over SONET may be carried on an STS-1 path within a TDM byte stream that also includes IP over SONET on another STS-1 path or on an STS-3c path.

Through network management system 60 on workstation 62, after a user connects an external network connection to a port, the user may enable that port and one or more paths within that port (described below). Data received on a port card path is passed to the cross-connection card in the same quadrant as the port card, and the cross-connection card passes the path data to one of the five forwarding cards or eight port cards also within the same quadrant. The forwarding card determines whether the payload (e.g., packets, frames or cells) it is receiving includes user payload data or network control information. The forwarding card itself processes certain network control information and sends certain other network control information to the central processor over the Fast Ethernet control bus. The forwarding card also generates network control payloads and receives network control payloads from the central processor. The forwarding card sends any user data payloads from the cross-connection card or control information from itself or the central processor as path data to the switch fabric card. The switch fabric card then passes the path data to one of the forwarding cards in any quadrant, including the forwarding card that just sent the data to the switch fabric card. That forwarding card then sends the path data to the cross-connection card within its quadrant, which passes the path data to one of the port cards within its quadrant.

Figure 36A:
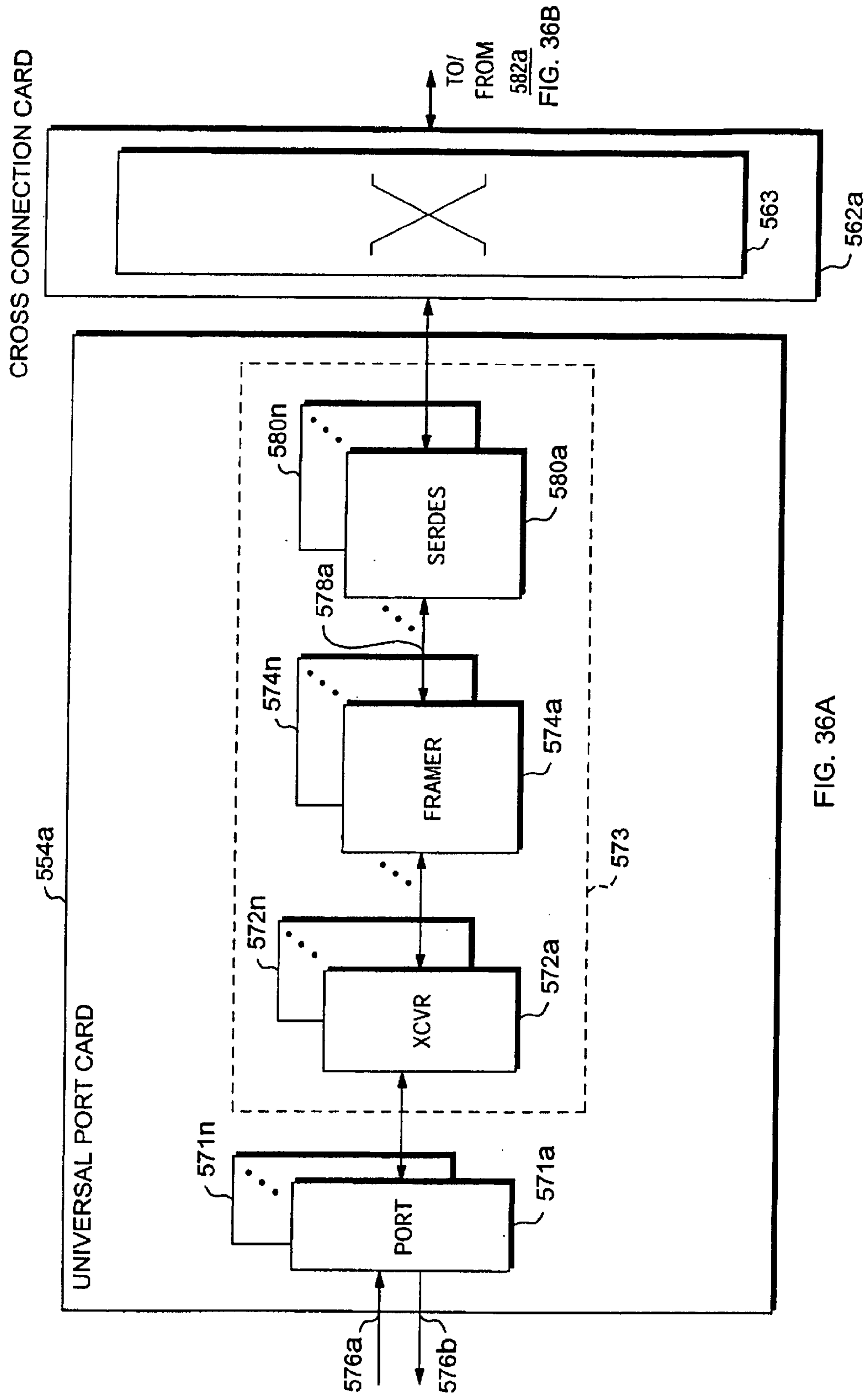
FIG. 36 is a block diagram of a portion of a data plane of a network device.
Figure 36B:
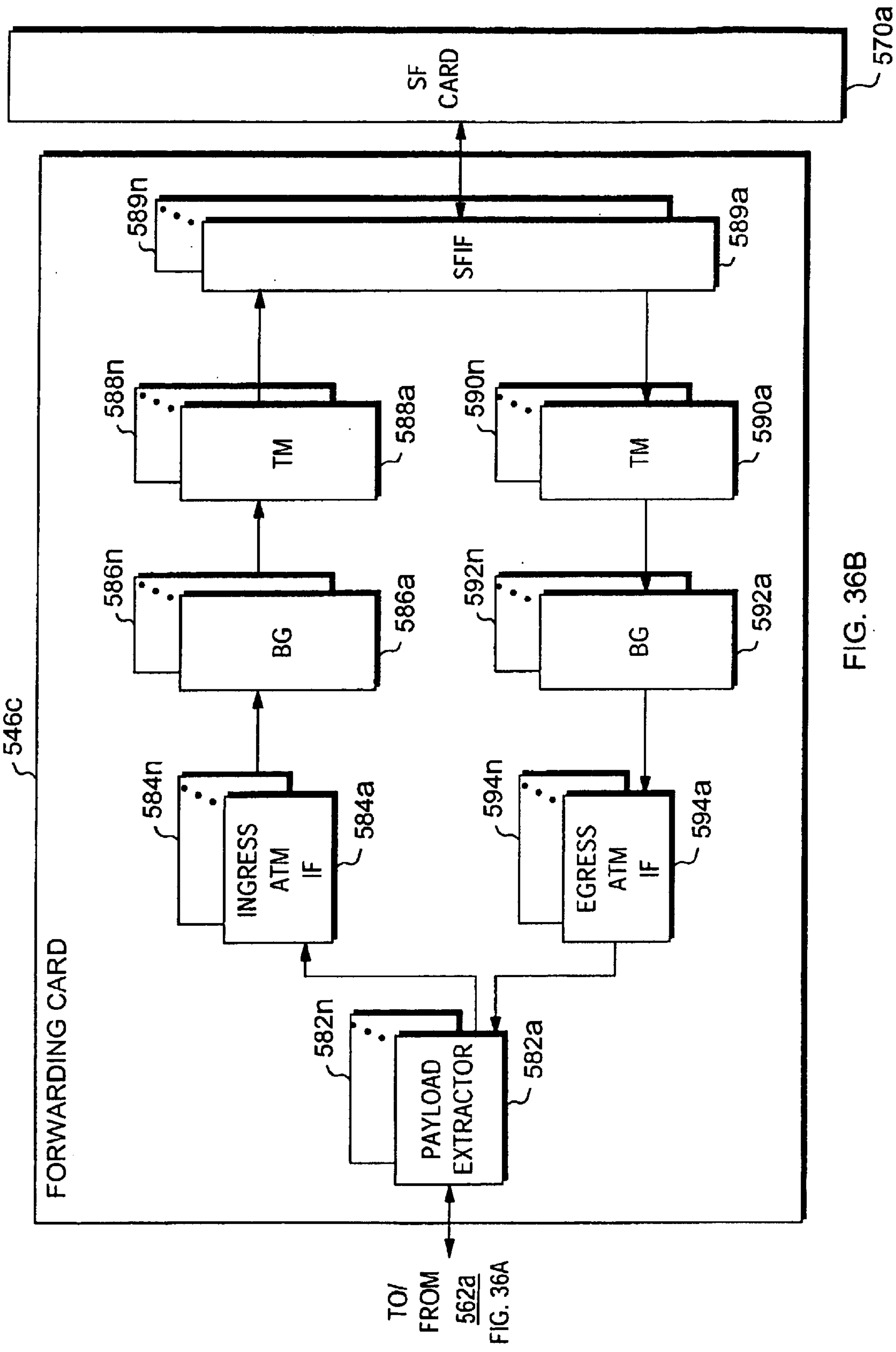

Referring to FIG. 36, in one embodiment, a universal port card 554*a* includes one or more ports 571*a*–571*n* connected to one or more transceivers 572*a*–572*n*. The user may connect an external network connection to each port. As one example, port 571*a* is connected to an ingress optical fiber 576*a* carrying an OC-48 SONET stream and an egress optical fiber 576*b* carrying an OC-48 SONET stream. Port 571*a* passes optical data from the SONET stream on fiber 576*a* to transceiver 572*a*. Transceiver 572*a* converts the optical data into electrical signals that it sends to a SONET framer 574*a*.

The SONET framer organizes the data it receives from the transceiver into SONET frames. SONET framer 574*a* sends data over a telecommunications bus 578*a* to a serializer-deserializer (SERDES) 580*a* that serializes the data into four serial lines with twelve STS-1 time slots each and transmits the four serial lines to cross-connect card 562*a*.

Each cross-connection card is a switch that provides connections between port cards and forwarding cards within its quadrant. Each cross-connection card is programmed to transfer each serial line on each port card within its quadrant to a forwarding card within its quadrant or to serial line on a port card, including the port card that transmitted the data to the cross-connection card. The programming of the cross-connect card is discussed in more detail below under Policy Based Provisioning.

Each forwarding card (e.g., forwarding card 546*c*) receives SONET frames over serial lines from the cross-connection card in its quadrant through a payload extractor chip (e.g., payload extractor 582*a*). In one embodiment, each forwarding card includes four payload extractor chips where each payload extractor chip represents a "slice" and each serial line input represents a forwarding card "port". Each payload extractor chip receives four serial line inputs, and since each serial line includes twelve STS-1 time slots, the payload extractor chips combine and separate time slots where necessary to output data paths with the appropriate number of time slots. Each STS-1 time slot may represent a separate data path, or multiple STS-1 time slots may need to be combined to form a data path. For example, an STS-3c path requires the combination of three STS-1 time slots to form a data path while an STS-48c path requires the combination of all forty-eight STS-1 time slots. Each path represents a separate network connection, for example, an ATM cell stream.

The payload extractor chip also strips off all vestigial SONET frame information and transfers the data path to an ingress interface chip. The ingress interface chip will be specific to the protocol of the data within the path. As one example, the data may be formatted in accordance with the ATM protocol and the ingress interface chip is an ATM interface chip (e.g., ATM IF 584*a*). Other protocols can also be implemented including, for example, Internet Protocol (IP), Multi-Protocol Label Switching (MPLS) protocol or Frame Relay.

The ingress ATM IF chip performs many functions including determining connection information (e.g., virtual circuit or virtual path information) from the ATM header in the payload. The ATM IF chip uses the connection information as well as a forwarding table to perform an address translation from the external address to an internal address.

The ATM IF chip passes ATM cells to an ingress bridge chip (e.g., BG 586*a*–586*b*) which serves as an interface to an ingress traffic management chip or chip set (e.g., TM 588*a*–588*n*).

The traffic management chips ensure that high priority traffic, for example, voice data, is passed to switch fabric card 570*a* faster than lower priority traffic, for example, e-mail data. The traffic management chips may buffer lower priority traffic while higher priority traffic is transmitted, and in times of traffic congestion, the traffic management chips will ensure that low priority traffic is dropped prior to any high priority traffic. The traffic management chips also perform an address translation to add the address of the traffic management chip to which the data is going to be sent by the switch fabric card. The address corresponds to internal virtual circuits set up between forwarding cards by the software and available to the traffic management chips in tables.

The traffic management chips send the modified ATM cells to switch fabric interface chips (SFIF) 589*a*–589*n* that then transfer the ATM cells to switch fabric card 570*a*. The switch fabric card uses the address provided by the ingress traffic management chips to pass ATM cells to the appropriate egress traffic management chips (e.g., TM 590*a*–590*n*) on the various forwarding cards. In one embodiment, the switch fabric card 570*a* is a 320 Gbps, non-blocking fabric. Since each forwarding card serves as both an ingress and egress, the switching fabric card provides a high degree of flexibility in directing the data between any of the forwarding cards, including the forwarding card that sent the data to the switch fabric card.

When a forwarding card (e.g., forwarding card 546*c*) receives ATM cells from switch fabric card 570*a,* the egress traffic management chips re-translate the address of each cell and pass the cells to egress bridge chips (e.g., BG 592*a*–592*b*). The bridge chips pass the cells to egress ATM interface chips (e.g., ATM IF 594*a*–594*n*), and the ATM interface chips add a re-translated address to the payload representing an ATM virtual circuit. The ATM interface chips then send the data to the payload extractor chips (e.g., payload extractor 582*a*–582*n*) that separate, where necessary, the path data into STS-1 time slots and combine twelve STS-1 time slots into four serial lines and send the serial lines back through the cross-connection card to the appropriate port card.

The port card SERDES chips receive the serial lines from the cross-connection card and de-serialize the data and send it to SONET framer chips 574*a*–574*n.* The Framers properly format the SONET overhead and send the data back through the transceivers that change the data from electrical to optical before sending it to the appropriate port and SONET fiber.

Although the port card ports above were described as connected to a SONET fiber carrying an OC-48 stream, other SONET fibers carrying other streams (e.g., OC-12) and other types of fibers and cables, for example, Ethernet, may be used instead. The transceivers are standard parts available from many companies, including Hewlett Packard Company and Sumitomo Corporation. The SONET framer may be a Spectra chip available from PMC-Sierra, Inc. in British Columbia. A Spectra 2488 has a maximum bandwidth of 2488 Mbps and may be coupled with a 1xOC48 transceiver coupled with a port connected to a SONET optical fiber carrying an OC-48 stream also having a maximum bandwidth of 2488 Mbps. Instead, four SONET optical fibers carrying OC-12 streams each having a maximum bandwidth of 622 Mbps may be connected to four 1xOC12 transceivers and coupled with one Spectra 2488. Alternatively, a Spectra 4x155 may be coupled with four OC-3 transceivers that are coupled with ports connected to four SONET fibers carrying OC-3 streams each having a maximum bandwidth of 155 Mbps. Many variables are possible.

The SERDES chip may be a Telecommunications Bus Serializer (TBS) chip from PMC-Sierra, and each cross-connection card may include a Time Switch Element (TSE) from PMC-Sierra, Inc. Similarly, the payload extractor chips may be MACH 48 chips and the ATM interface chips may be ATLAS chips both of which are available from PMC-Sierra. Several chips are available from Extreme Packet Devices (EPD), a subsidiary of PMC-Sierra, including PP3 bridge chips and Data Path Element (DPE) traffic management chips. The switch fabric interface chips may include a Switch Fabric Interface (SIF) chip also from EPD. Other switch fabric interface chips are available from Abrizio, also a subsidiary of PMC-Sierra, including a data slice chip and an enhanced port processor (EPP) chip. The switch fabric card may also include chips from Abrizio, including a cross-bar chip and a scheduler chip.

Although the port cards, cross-connection cards and forwarding cards have been shown as separate cards, this is by way of example only and they may be combined into one or more different cards.

Multiple Redundancy Schemes

Coupling universal port cards to forwarding cards through a cross-connection card provides flexibility in data transmission by allowing data to be transmitted from any path on any port to any port on any forwarding card. In addition, decoupling the universal port cards and the forwarding cards enables redundancy schemes (e.g., 1:1, 1+1, 1:N, no redundancy) to be set up separately for the forwarding cards and universal port cards. The same redundancy scheme may be set up for both or they may be different. As described above, the LID to PID card and port tables are used to setup the various redundancy schemes for the line cards (forwarding or universal port cards) and ports. Network devices often implement industry standard redundancy schemes, such as those defined by the Automatic Protection Switching (APS) standard. In network device 540 (FIG. 35), an APS standard redundancy scheme may be implemented for the universal port cards while another redundancy scheme is implemented for the forwarding cards.

Referring again to FIG. 35, further data transmission flexibility may be provided by connecting (i.e., connections 565) each cross-connection card 562*a*–562*b,* 564*a*–564*b,* 566*a*–566*b* and 568*a*–568*b* to each of the other cross-connection cards. Through connections 565, a cross-connection card (e.g., cross-connection card 562*a*) may transmit data between any port or any path on any port on a universal port card (e.g., universal port cards 554*a*–554*h*) in its quadrant to a cross-connection card (e.g., cross-connection card 568*a*) in any other quadrant, and that cross-connection card (e.g., cross-connection card 568*a*) may transmit the data to any forwarding card (e.g., forwarding cards 552*a*–552*e*) or universal port card (e.g., universal port cards 560*a*–560*h*) in its quadrant. Similarly, any cross-connection card may transmit data received from any forwarding card in its quadrant to any other cross-connection card and that cross-connection card may transmit the data to any universal port card port in its quadrant.

Alternatively, the cross-connection cards in each quadrant may be coupled only with cross-connection cards in one other quadrant. For example, cross-connection cards in quadrants 1 and 2 may be connected and cross-connection cards in quadrants 3 and 4 may be connected. Similarly, the cross-connection cards in each quadrant may be coupled with cross-connection cards in only two other quadrants, or only the cross-connection cards in one quadrant (e.g., quadrant 1) may be connected to cross-connection cards in another quadrant (e.g., quadrant 2) while the cross-connection cards in the other quadrants (e.g., quadrants 3 and 4) are not connected to other cross-connection cards or are connected only to cross-connection cards in one quadrant (e.g., quadrant 2). Many variations are possible. Although these connections do not provide the flexibility of having all cross-connection cards inter-connected, these connections require less routing resources and still provide some increase in the data transmission flexibility of the network device.

The additional flexibility provided by inter-connecting one or more cross-connection cards may be used to optimize the efficiency of network device 540. For instance, a redundant forwarding card in one quadrant may be used as a backup for primary forwarding cards in other quadrants thereby reducing the number of backup modules and increasing the network device's service density. Similarly, a redundant universal port card or a redundant port on a universal port card in one quadrant may be used as a backup for primary universal port cards or ports in other quadrants. As previously mentioned, each primary forwarding card may support a different protocol (e.g., ATM, MPLS, IP, Frame Relay). Similarly, each universal port card may support a different protocol (e.g., SONET, Ethernet). A backup or spare forwarding card or universal port card must support the same protocol as the primary card or cards. If forwarding or universal port cards in one quadrant support multiple protocols and the cross-connection cards are not interconnected, then each quadrant may need multiple backup forwarding and universal port cards (i.e., one for each protocol supported). If each of the quadrants includes forwarding and universal port cards that support different protocols then each quadrant may include multiple backup forwarding and universal port cards further decreasing the network device's service density.

By inter-connecting the cross-connection cards, a forwarding card in one quadrant may serve as a backup for primary forwarding cards in its own quadrant and in other quadrants. Similarly, a universal port card or port in one quadrant may serve as a backup for a primary universal port card or port in its own quadrant and in other quadrants. For example, forwarding card 546*e* in quadrant 1 that supports a particular protocol (e.g., the ATM protocol) may serve as the backup forwarding card for primary forwarding cards supporting ATM in its own quadrant (e.g., forwarding cards 546*a*–546*b*) as well as for primary forwarding cards supporting ATM in quadrant 2 (e.g., forwarding cards 548*b*–548*c*) or all quadrants (e.g., forwarding card 550*c* in quadrant 3 and forwarding cards 552*b*–552*d* in quadrant 4). Similarly, forwarding card 548*e* in quadrant 2 that supports a different protocol (e.g., the MPLS protocol) may serve as the backup forwarding card for primary forwarding cards supporting MPLS in its own quadrant (e.g., forwarding cards 548*a* and 548*d*) as well as for primary forwarding cards supporting MPLS in quadrant 1 (e.g., forwarding card 546*c*) or all quadrants (e.g., forwarding card 550*a* in quadrant 3 and forwarding card 552*a* in quadrant 4). Even with this flexibility, to provide sufficient redundancy, multiple backup modules supporting the same protocol may be used, especially where a large number of primary modules support one protocol.

As previously discussed, each port on a universal port card may be connected to an external network connection, for example, an optical fiber transmitting data according to the SONET protocol. Each external network connection may provide multiple streams or paths and each stream or path may include data being transmitted according to a different protocol over SONET. For example, one path may include data being transmitted according to ATM over SONET while another path may include data being transmitted according to MPLS over SONET. The cross-connection cards may be programmed (as described below) to transmit protocol specific data (e.g., ATM, MPLS, IP, Frame Relay) from ports on universal port cards within their quadrants to forwarding cards within any quadrant that support the specific protocol. Because the traffic management chips on the forwarding cards provide protocol-independent addresses to be used by switch fabric cards 570*a*–570*b*, the switch fabric cards may transmit data between any of the forwarding cards regardless of the underlying protocol.

Alternatively, the network manager may dedicate each quadrant to a specific protocol by putting forwarding cards in each quadrant according to the protocol they support. Within each quadrant then, one forwarding card may be a backup card for each of the other forwarding cards (1:N, for network device 540, 1:4). Protocol specific data received from ports or paths on ports on universal port cards within any quadrant may then be forwarded by one or more cross-connection cards to forwarding cards within the protocol specific quadrant. For instance, quadrant 1 may include forwarding cards for processing data transmissions using the ATM protocol, quadrant 2 may include forwarding cards for processing data transmissions using the IP protocol, quadrant 3 may include forwarding cards for processing data transmissions using the MPLS protocol and quadrant 4 may be used for processing data transmissions using the Frame Relay protocol. ATM data received on a port path is then transmitted by one or more cross-connection cards to a forwarding card in quadrant 1, while MPLS data received on another path on that same port or on a path in another port is transmitted by one or more cross-connection cards to a forwarding card in quadrant 3.

Policy Based Provisioning

Unlike the switch fabric card, the cross-connection card does not examine header information in a payload to determine where to send the data. Instead, the cross-connection card is programmed to transmit payloads, for example, SONET frames, between a particular serial line on a universal port card port and a particular serial line on a forwarding card port regardless of the information in the payload. As a result, one port card serial line and one forwarding card serial line will transmit data to each other through the cross-connection card until that programmed connection is changed.

In one embodiment, connections established through a path table and service endpoint table (SET) in a configuration database are passed to path managers on port cards and service endpoint managers (SEMs) on forwarding cards, respectively. The path managers and service endpoint managers then communicate with a cross-connect manager (CCM) on the cross-connection card in their quadrant to provide connection information. The CCM uses the connection information to generate a connection program table that is used by one or more components (e.g., a TSE chip 563) to program internal connection paths through the cross-connection card.

Typically, connections are fixed or are generated according to a predetermined map with a fixed set of rules. Unfortunately, a fixed set of rules may not provide flexibility for future network device changes or the different needs of different users/customers. Instead, within network device 540, each time a user wishes to enable/configure a path on a port on a universal port card, a Policy Provisioning Manager (PPM) 599 (FIG. 37) executing on central processor 542 selects the forwarding card port to which the port card port will be connected based on a configurable provisioning policy (PP) 603 in configuration database 42. The configurable provisioning policy may take into consideration many factors such as available system resources, balancing those resources and quality of service. Similar to other programs and files stored within the configuration database of computer system 10 described above, the provisioning policy may be modified while network device 540 is running to allow to policy to be changed according to a user's changing needs or changing network device system requirements.

Figure 37:
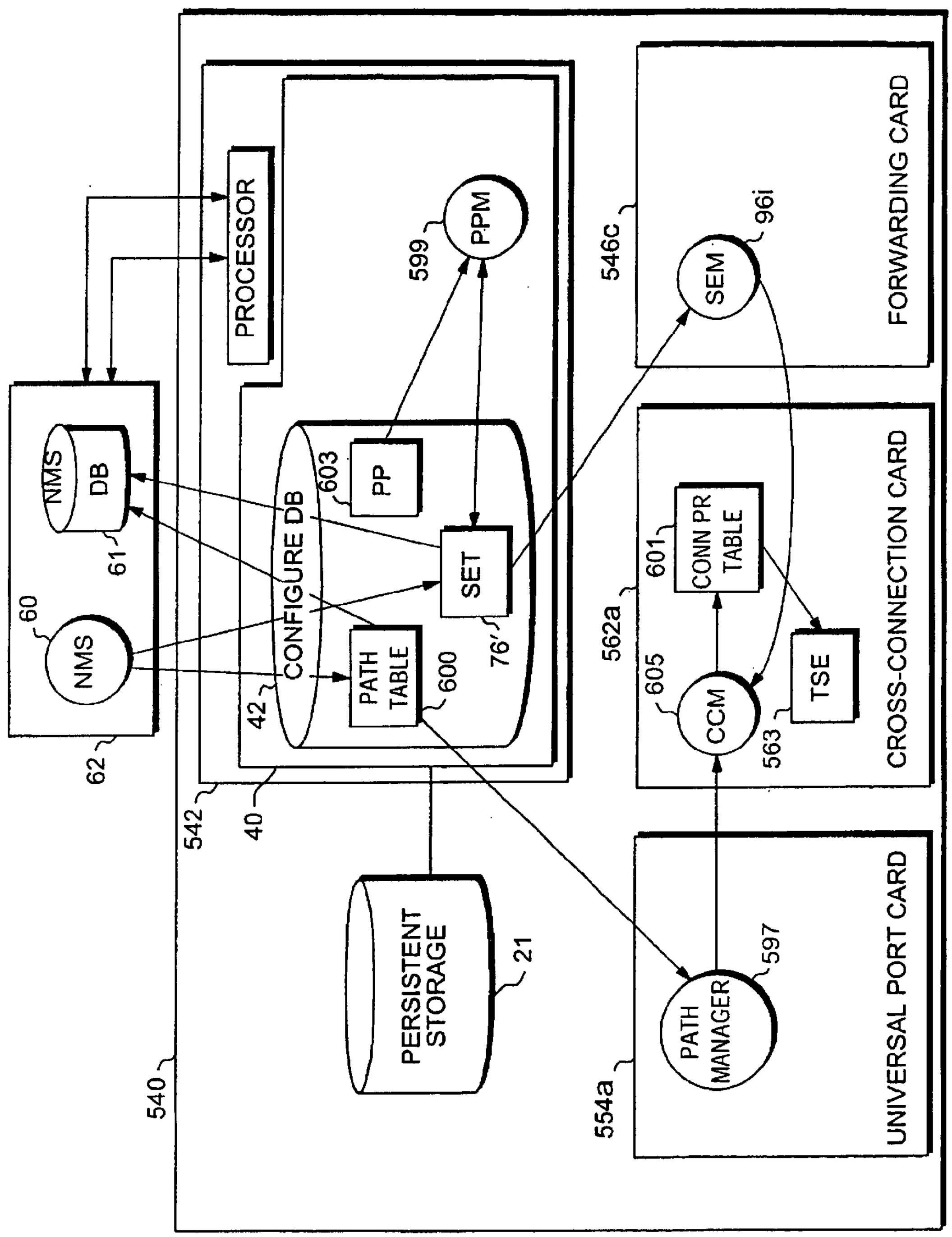
FIG. 37 is a block and flow diagram of a network device incorporating a policy provisioning manager.

When a user connects an external network connection to a particular port on a universal port card, the user notifies the NMS as to which port on which universal port card should be enabled, which path or paths should be enabled, and the number of time slots in each path. The user may also notify the NMS as to a new path and its number of time slots on an already enabled port that was not fully utilized or the user may notify the NMS of a modification to one or more paths on already enabled ports and the number of time slots required for that path or paths. With this information, the NMS fills in a Path table 600 (FIGS. 37 and 38) and partially fills in a Service Endpoint Table (SET) 76' (FIGS. 37 and 39).

When a record in the path table is filled in, the configuration database sends an active query notification to a path manager (e.g., path manager 597) executing on a universal port card (e.g., port card 554*a*) corresponding to the universal port card port LID (e.g., port 1231, FIG. 38) in the path table record (e.g., record 602).

Leaving some fields in the SET blank or assigning a particular value (e.g., zero), causes the configuration database to send an active query notification to Policy Provisioning Manager (PPM) 599. The PPM then determines—using provisioning policy 603—which forwarding card (FC) port or ports to assign to the new path or paths. For example, the PPM may first compare the new path's requirements, including its protocol (e.g., ATM over SONET), the number of time slots, the number of virtual circuits and virtual circuit scheduling restrictions, to the available forwarding card resources in the quadrant containing the universal port card port and path. The PPM also takes other factors into consideration including quality of service, for example, redundancy requirements or dedicated resource requirements, and balancing resource usage (i.e., load balancing) evenly within a quadrant.

As an example, a user connects SONET optical fiber 576*a* (FIG. 36) to port 571*a* on universal port card 554*a* and wants to enable a path with three time slots (i.e., STS-3c). The NMS assigns a path LID number (e.g., path LID 1666) and fills in a record (e.g., row 602) in Path Table 600 to include path LID 1666, a universal port card port LID (e.g., UP port LID 1231) previously assigned by the NMS and retrieved from the Logical to Physical Port Table, the first time slot (e.g., time slot 4) in the SONET stream corresponding with the path and the total number of time slots—in this example, 3—in the path. Other information may also be filled into Path Table 600.

The NMS also partially fills in a record (e.g., row 604) in SET 76' by filling in the quadrant number—in this example, 1—and the assigned path LID 1666 and by assigning a service endpoint number 878. The SET table also includes other fields, for example, a forwarding card LID field 606, a forwarding card slice 608 (i.e., port) and a forwarding card serial line 610. In one embodiment, the NMS fills in these fields with a particular value (e.g., zero), and in another embodiment, the NMS leaves these fields blank.

In either case, the particular value or a blank field causes the configuration database to send an active query notice to the PPM indicating a new path LID, quadrant number and service endpoint number. It is up to the PPM to decide which forwarding card, slice (i.e., payload extractor chip) and time slot (i.e., port) to assign to the new universal port card path. Once decided, the PPM fills in the SET Table fields. Since the user and NMS do not completely fill in the SET record, this may be referred to as a "self-completing configuration record." Self-completing configuration records reduce the administrative workload of provisioning a network.

The SET and path table records may be automatically copied to persistent storage 21 to insure that if network device 540 is re-booted these configuration records are maintained. If the network device shuts down prior to the PPM filling in the SET record fields and having those fields saved in persistent storage, when the network device is rebooted, the SET will still include blank fields or fields with particular values which will cause the configuration database to again send an active query to the PPM.

When the forwarding card LID (e.g., 1667) corresponding, for example, to forwarding card 546*c*, is filled into the SET table, the configuration database sends an active query notification to an SEM (e.g., SEM 96*i*) executing on that forwarding card and corresponding to the assigned slice and/or time slots. The active query notifies the SEM of the newly assigned service endpoint number (e.g., SE 878) and the forwarding card slice (e.g., payload extractor 582*a*) and time slots (i.e., 3 time slots from one of the serial line inputs to payload extractor 582*a*) dedicated to the new path.

Path manager 597 and SEM 96*i* both send connection information to a cross-connection manager 605 executing on cross-connection card 562*a*—the cross-connection card within their quadrant. The CCM uses the connection information to generate a connection program table 601 and uses this table to program internal connections through one or more components (e.g., a TSE chip 563) on the cross-connection card. Once programmed, cross-connection card 562*a* transmits data between new path LID 1666 on SONET fiber 576*a* connected to port 571*a* on universal port card 554*a* and the serial line input to payload extractor 582*a* on forwarding card 546*c*.

An active query notification is also sent to NMS database 61, and the NMS then displays the new system configuration to the user.

Alternatively, the user may choose which forwarding card to assign to the new path and notify the NMS. The NMS would then fill in the forwarding card LID in the SET, and the PPM would only determine which time slots and slice within the forwarding card to assign.

In the description above, when the PPM is notified of a new path, it compares the requirements of the new path to the available/unused forwarding card resources. If the necessary resources are not available, the PPM may signal an error. Alternatively, the PPM could move existing forwarding card resources to make the necessary forwarding card resources available for the new path. For example, if no payload extractor chip is completely available in the entire quadrant, one path requiring only one time slot is assigned to payload extractor chip 582*a* and a new path requires forty-eight time slots, the one path assigned to payload extractor chip 582*a* may be moved to another payload extractor chip, for example, payload extractor chip 582*b* that has at least one time slot available and the new path may be assigned all of the time slots on payload extractor chip 582*a*. Moving the existing path is accomplished by having the PPM modify an existing SET record. The new path is configured as described above.

Moving existing paths may result in some service disruption. To avoid this, the provisioning policy may include certain guidelines to hypothesize about future growth. For example, the policy may require small paths—for example, three or less time slots—to be assigned to payload extractor chips that already have some paths assigned instead of to completely unassigned payload extractor chips to provide a higher likelihood that forwarding card resources will be available for large paths—for example, sixteen or more time slots—added in the future.

Multi-Layer Network Device in One Telco Rack

Referring again to FIG. 35, in one embodiment, each universal port card includes four ports, each of which is capable of being connected to an OC-48 SONET fiber. Since an OC-48 SONET fiber is capable of transferring data at 2.5 Giga bits per second (Gbps), each universal port card is capable of transferring data at 10 Gbps (4×2.5=10). With eight port cards per quadrant, the cross-connection card must be capable of transferring data at 80 Gbps. Typically, however, the eight port cards will be 1:1 redundant and only transfer 40 Gbps. In one embodiment, each forwarding card is capable of transferring 10 Gbps, and with five forwarding cards per quadrant, the switch fabric cards must be capable of transferring data at 200 Gbps. Typically, however, the five forwarding cards will be 1:N redundant and only transfer data at 40 Gbps. With four quadrants and full redundancy (1:1 for port cards and 1:N for forwarding cards), network device 540 is capable of transferring data at 160 Gbps.

In other embodiments, each port card includes one port capable of being connected to an OC-192 SONET fiber. Since OC-192 SONET fibers are capable of transferring data at 10 Gbps, a fully redundant network device 540 is again capable of transferring 160 Gbps. In the embodiment employing one OC-192 connection per port card, each port card may include one hundred and ninety-two logical DS3 connections using sub-rate data multiplexing (SDRM). In addition, each port card may differ in its number and type of ports to provide more or less data through put. As previously mentioned, ports other than SONET ports may be provided, for example, Ethernet ports, Plesiochronous Digital Hierarchy ports (i.e., DS0, DS1, DS3, E0, E1, E3, J0, J1, J3) and Synchronous Digital Hierarchy (SDH) ports (i.e., STM1, STM4, STM16, STM64).

The universal port cards and cross-connect cards in each quadrant are in effect a physical layer switch, and the forwarding cards and switch fabric cards are effectively an upper layer switch. Prior systems have packaged these two switches into separate network devices. One reason for this is the large number of signals that need to be routed. Taken separately, each cross-connect card 562*a*–562*b*, 564*a*–564*b*, 566*a*–566*b* and 568*a*–568*b* is essentially a switch fabric or mesh allowing switching between any path on any universal port card to any serial input line on any forwarding card in its quadrant and each switch fabric card 570*a*–570*b* allows switching between any paths on any forwarding cards. Approximately six thousand, seven hundred and twenty etches are required to support a 200 Gbps switch fabric, and about eight hundred and thirty-two etches are required to support an 80 Gbps cross-connect. Combining such high capacity multi-layer switches into one network device in a single telco rack (seven feet by nineteen inches by 24 inches) has not been thought possible by those skilled in the art of telecommunications network devices.

To fit network device 540 into a single telco rack, dual mid-planes are used. All of the functional printed circuit boards connect to at least one of the mid-planes, and the switch fabric cards and certain control cards connect to both mid-planes thereby providing connections between the two mid-planes. In addition, to efficiently utilize routing resources, instead of providing a single cross-connection card, the cross-connection functionality is separated into four cross-connection cards—one for each quadrant—(as shown in FIG. 35). Further, routing through the lower mid-plane is improved by flipping the forwarding cards and cross-connection cards in the bottom half of the front of the chassis upside down to be the mirror image of the forwarding cards and cross-connection cards in the top of the front half of the chassis.

Figure 40:
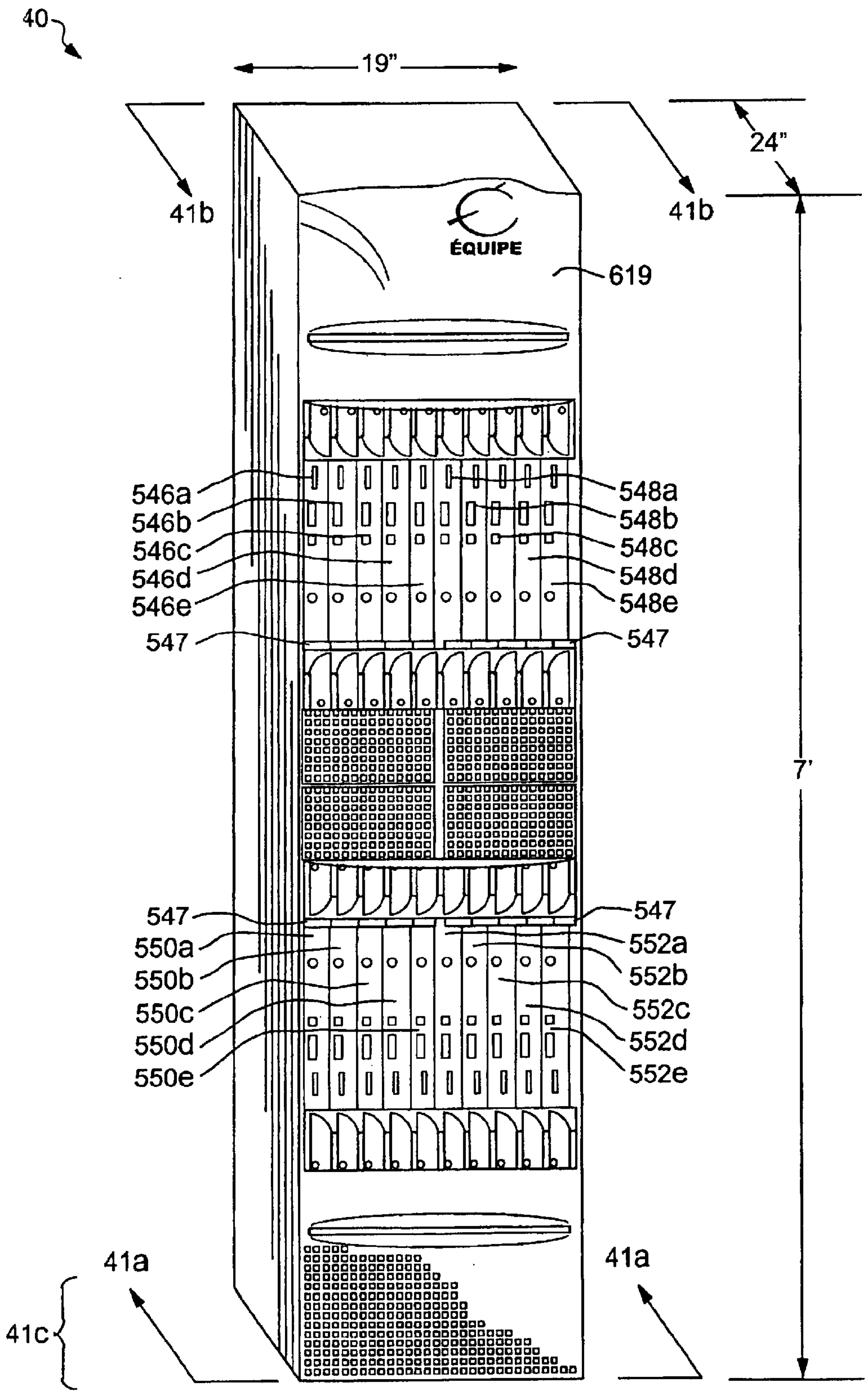
FIG. 40 is an isometric view of a network device.
Figure 41C:
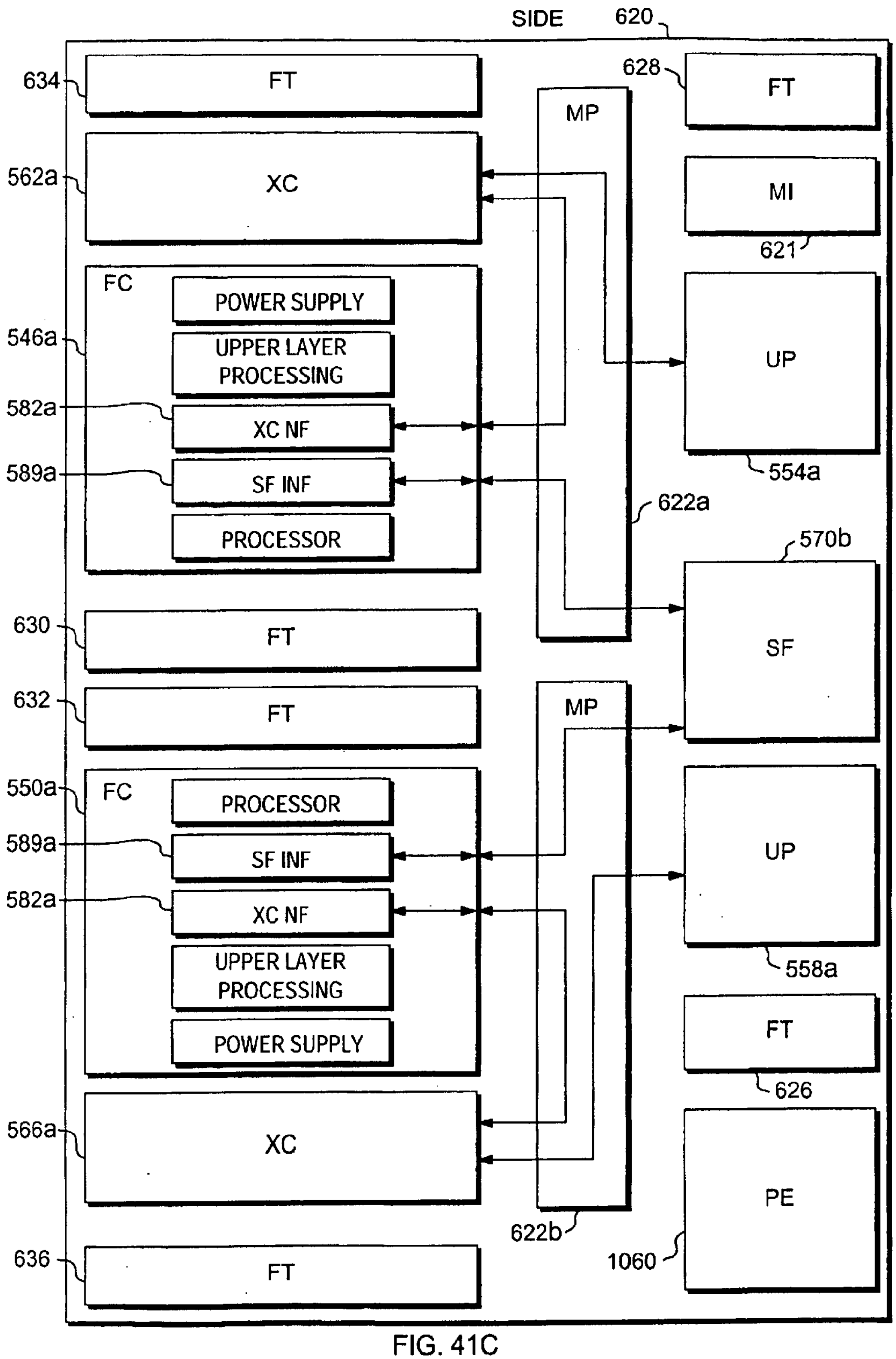

Referring to FIG. 40, a network device 540 is packaged in a box 619 conforming to the telco standard rack of seven feet in height, nineteen inches in width and 24 inches in depth. Referring also to FIGS. 41*a*–41*c*, a chassis 620 within box 619 provides support for forwarding cards 546*a*–546*e*, 548*a*–548*e*, 550*a*–550*e* and 552*a*–552*e*, universal port cards 554*a*–554*h*, 556*a*–556*h*, 558*a*–558*h* and 560*a*–560*h*, and cross-connection cards 562*a*–562*b*, 564*a*–564*b*, 566*a*–566*b* and 568*a*–568*b*. As is typical of telco network devices, the forwarding cards (FC) are located in the front portion of the chassis where network administrators may easily add and remove these cards from the box, and the universal port cards (UP) are located in the back portion of the chassis where external network attachments/cables may be easily connected.

The chassis also supports switch fabric cards 570*a* and 570*b*. As shown, each switch fabric card may include multiple switch fabric (SF) cards and a switch scheduler (SS) card. In addition, the chassis supports multiple central processor cards (542 and 543, FIG. 35). Instead of having a single central processor card, the external control functions and the internal control functions may be separated onto different cards as described in U.S. patent application Ser. No. 09/574,343, filed May 20, 2000 and entitled "Functional Separation of Internal and External Controls in Network Devices", which is hereby incorporated herein by reference. As shown, the chassis may support internal control (IC) processor cards 542*a* and 543*a* and external control (EC) processor cards 542*b* and 543*b*. Auxiliary processor (AP) cards 542*c* and 543*c* are provided for future expansion to allow more external control cards to be added, for example, to handle new upper layer protocols. In addition, a management interface (MI) card 621 for connecting to an external network management system (62, FIG. 35) is also provided.

The chassis also support two mid-plane printed circuit boards 622*a* and 622*b* (FIG. 41*c*) located toward the middle of chassis 620. Mid-plane 622*a* is located in the top portion of chassis 620 and is connected to quadrant 1 and 2 forwarding cards 546*a*–546*e* and 548*a*–548*e*, universal port cards 554*a*–554*h* and 556*a*–556*h*, and cross-connection cards 562*a*–562*b* and 564*a*–564*b*. Similarly, mid-plane 622*b* is located in the bottom portion of chassis 620 and is connected to quadrant 3 and 4 forwarding cards 550*a*–550*e* and 552*a*–552*e*, universal port cards 558*a*–558*h* and 560*a*–560*h*, and cross-connection cards 566*a*–566*b* and 568*a*–568*b*. Through each mid-plane, the cross-connection card in each quadrant may transfer network packets between any of the universal port cards in its quadrant and any of the forwarding cards in its quadrant. In addition, through mid-plane 622*a* the cross-connection cards in quadrants 1 and 2 may be connected to allow for transfer of network packets between any forwarding cards and port cards in quadrants 1 and 2, and through mid-plane 622*b* the cross-connection cards in quadrants 3 and 4 may be connected to allow for transfer of network packets between any forwarding cards and port cards in quadrants 3 and 4.

Mid-plane 622*a* is also connected to external control processor cards 542*b* and 543*b* and management interface card 621. Mid-plane 622*b* is also connected to auxiliary processor cards 542*c* and 543*c*.

Switch fabric cards 570*a* and 570*b* are located in the back portion of chassis 620, approximately mid-way between the top and bottom of the chassis. The switch fabric cards are connected to both mid-planes 622*a* and 622*b* to allow the switch fabric cards to transfer signals between any of the forwarding cards in any quadrant. In addition, the cross-connection cards in quadrants 1 and 2 may be connected through the mid-planes and switch fabric cards to the cross-connection cards in quadrants 3 and 4 to enable network packets to be transferred between any universal port card and any forwarding card.

To provide for better routing efficiency through mid-plane 622*b*, forwarding cards 550*a*–550*e* and 552*a*–552*e* and cross-connection cards 566*a*–566*b* and 568*a*–568*b* in quadrants 3 and 4, located in the bottom portion of the chassis, are flipped over when plugged into mid-plane 622*b*. This permits the switch fabric interface 589*a*–589*n* on each of the lower forwarding cards to be oriented nearest the switch fabric cards and the cross-connection interface 582*a*–582*n* on each of the lower forwarding cards to be oriented nearest the cross-connection cards in quadrants 3 and 4. This orientation avoids having to cross switch fabric and cross-connection etches in mid-plane 622*b*.

Typically, airflow for cooling a network device is brought in at the bottom of the device and released at the top of the device. For example, in the back portion of chassis 620, a fan tray (FT) 626 pulls air into the device from the bottom portion of the device and a fan tray 628 blows air out of the top portion of the device. When the lower forwarding cards are flipped over, the airflow/cooling pattern is reversed. To accommodate this reversal, fan trays 630 and 632 pull air into the middle portion of the device and then fan trays 634 and 636 pull the air upwards and downwards, respectively, and blow the heated air out the top and bottom of the device, respectively.

The quadrant 3 and 4 universal port cards 558*a*–558*h* and 560*a*–560*h* may also be flipped over to orient the port card's cross-connection interface nearest the cross-connection cards and more efficiently use the routing resources. It is preferred, however, not to flip the universal port cards for serviceability reasons and airflow issues. The network managers at the telco site expect network attachments/cables to be in a certain pattern. Reversing this pattern could cause confusion in a large telco site with many different types of network devices. Also, flipping the port cards will change the airflow and cooling pattern and require a similar airflow pattern and fan tray configuration as implemented in the front of the chassis. However, with the switch fabric and internal control processor cards in the middle of the back portion of the chassis, it may be impossible to implement this fan tray configuration.

Figure 42A:
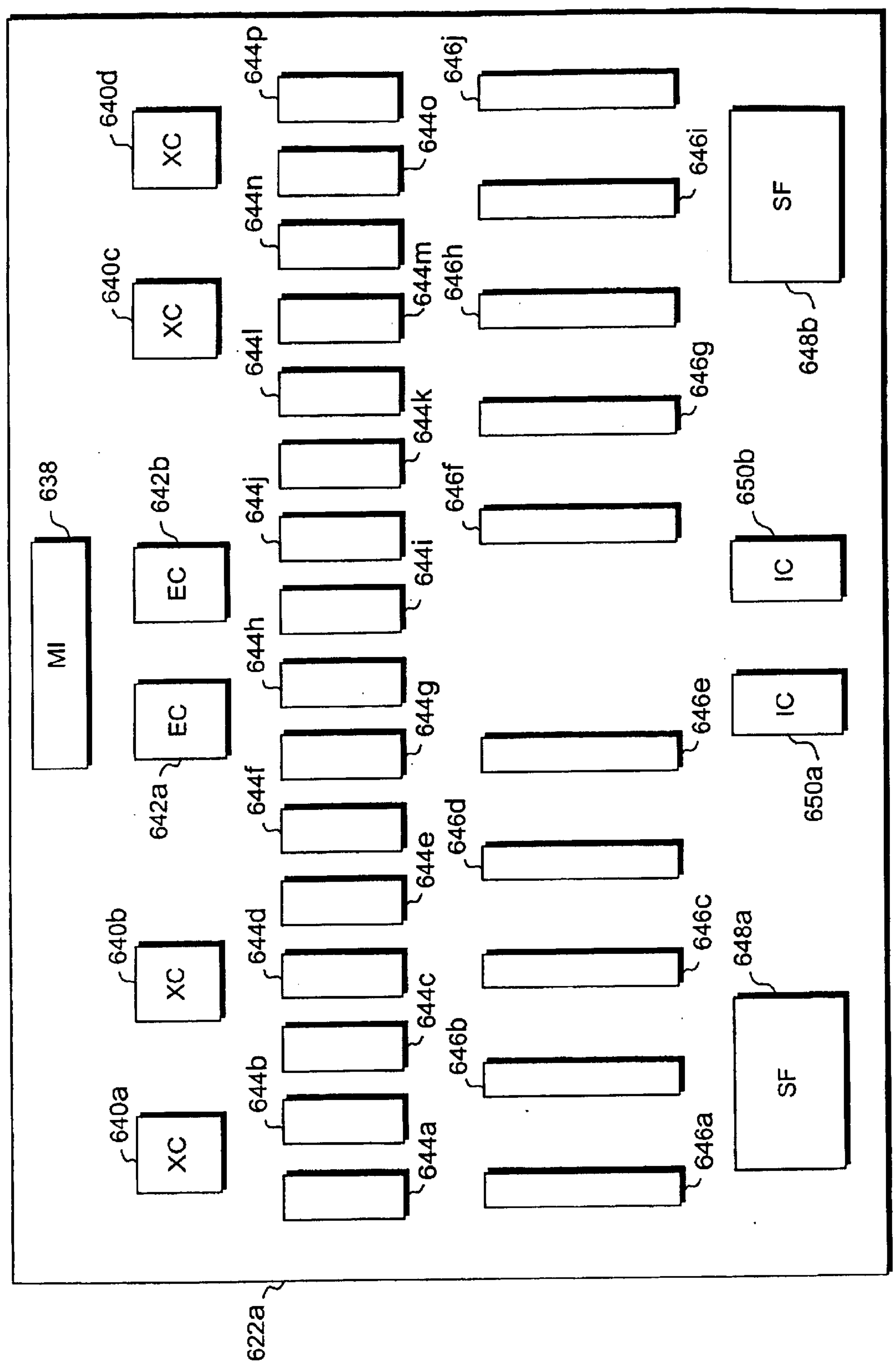
FIG. 42 is a block diagram of dual mid-planes.
Figure 42B:
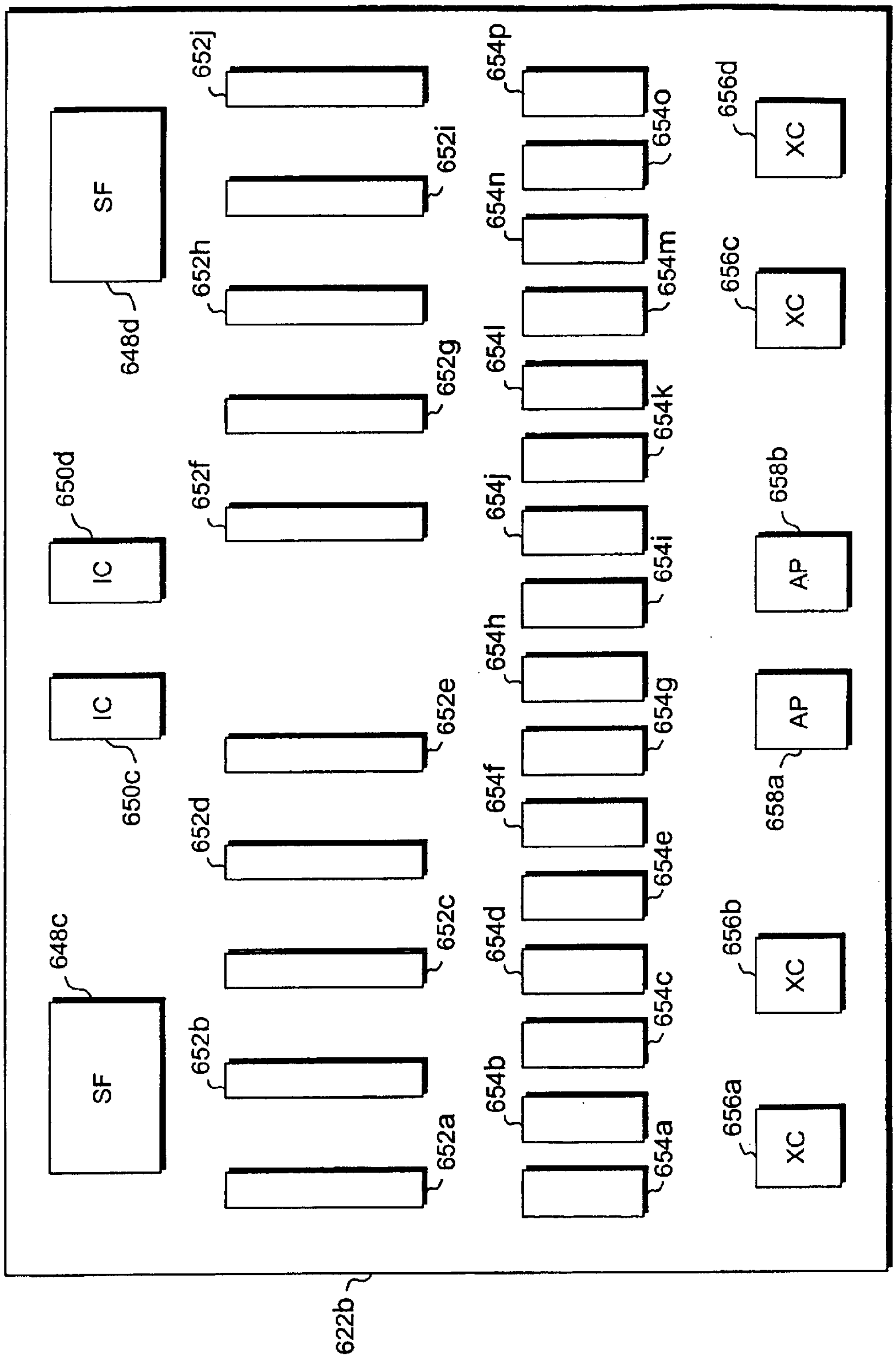

Referring to FIG. 42, mid-plane 622*a* includes connectors 638 mounted on the back side of the mid-plane ("back mounted") for the management interface card, connectors 640*a*–640*d* mounted on the front side of the mid-plane ("front mounted") for the quadrant 1 and 2 cross-connection cards, and front mounted connectors 642*a*–642*b* for the external control processor cards. Multiple connectors may be used for each card. Mid-plane 622*a* also includes back mounted connectors 644*a*–644*p* for the quadrant 1 and 2 universal port cards and front mounted connectors 646*a*–646*j* for the quadrant 1 and 2 forwarding cards.

Both mid-planes 622*a* and 622*b* include back mounted connectors 648*a*–648*d* for the switch fabric cards and back mounted connectors 650*a*–650*d* for the internal control cards. Mid-plane 622*b* further includes front, reverse mounted connectors 652*a*–652*j* for the quadrant 3 and 4 forwarding cards and back mounted connectors 654*a*–654*p* for the quadrant 3 and 4 universal port cards. In addition, mid-plane 622*b* also includes front, reverse mounted connectors 656*a*–656*d* for the quadrant 3 and 4 cross-connection cards and front mounted connectors 658*a*–658*b* for the auxiliary processor cards.

Combining both physical layer switch/router subsystems and upper layer switch/router subsystems in one network device allows for intelligent layer 1 switching. For example, the network device may be used to establish dynamic network connections on the layer 1 network to better utilize resources as service subscriptions change. In addition, network management is greatly simplified since the layer 1 and multiple upper layer networks may be managed by the same network management system and grooming fees are eliminated. Combining the physical layer switch/router and upper layer switch/routers into a network device that fits into one telco rack provides a less expensive network device and saves valuable telco site space.

Splitting the cross-connection function into four separate cards/quadrants enables the cross-connection routing requirements to be spread between the two mid-planes and alleviates the need to route cross-connection signals through the center of the device where the switch fabric is routed. In addition, segmenting the cross-connection function into multiple, independent subsystems allows customers/network managers to add functionality to network device 540 in pieces and in accordance with network service subscriptions. When a network device is first installed, a network manager may need only a few port cards and forwarding cards to service network customers. The modularity of network device 540 allows the network manager to purchase and install only one cross-connection card and the required number of port and forwarding cards.

As the network becomes more subscribed, the network manager may add forwarding cards and port cards and eventually additional cross-connection cards. Since network devices are often very expensive, this modularity allows network managers to spread the cost of the system out in accordance with new service requests. The fees paid by customers to the network manager for the new services can then be applied to the cost of the new cards.

Although the embodiment describes the use of two mid-planes, it should be understood that more than two mid-planes may be used. Similarly, although the embodiment described flipped/reversed the forwarding cards and cross-connection cards in the lower half of the chassis, alternatively, the forwarding cards and cross-connection cards in the upper half of the chassis could be flipped.

Distributed Switch Fabric

A network device having a distributed switch fabric locates a portion of the switch fabric functionality on cards separate from the remaining/central switch fabric functionality. For example, a portion of the switch fabric may be distributed on each forwarding card. There are a number of difficulties associated with distributing a portion of the switch fabric. For instance, distributing the switch fabric makes mid-plane/back-plane routing more difficult which further increases the difficulty of fitting the network device into one telco rack, switch fabric redundancy and timing are also made more difficult, valuable forwarding card space must be allocated for switch fabric components and the cost of each forwarding card is increased. However, since the entire switch fabric need not be included in a minimally configured network device, the cost of the minimal configuration is reduced allowing network service providers to more quickly recover the initial cost of the device. As new services are requested, additional functionality, including both forwarding cards (with additional switch fabric functionality) and universal port cards may be added to the network device to handle the new requests, and the fees for the new services may be applied to the cost of the additional functionality. Consequently, the cost of the network device more closely tracks the service fees received by network providers.

Referring again to FIG. 36, as described above, each forwarding card (e.g., 546*c*) includes traffic management chips (e.g., 588*a*–588*n* and 590*a*–590*b*) that ensure high priority network data/traffic (e.g., voice) is transferred faster than lower priority traffic (e.g., e-mail). Each forwarding card also includes switch fabric interface (SFIF) chips (e.g., 589*a*–589*n*) that transfer network data between the traffic management chips and the switch fabric cards 570*a*–570*b*.

Figure 43:
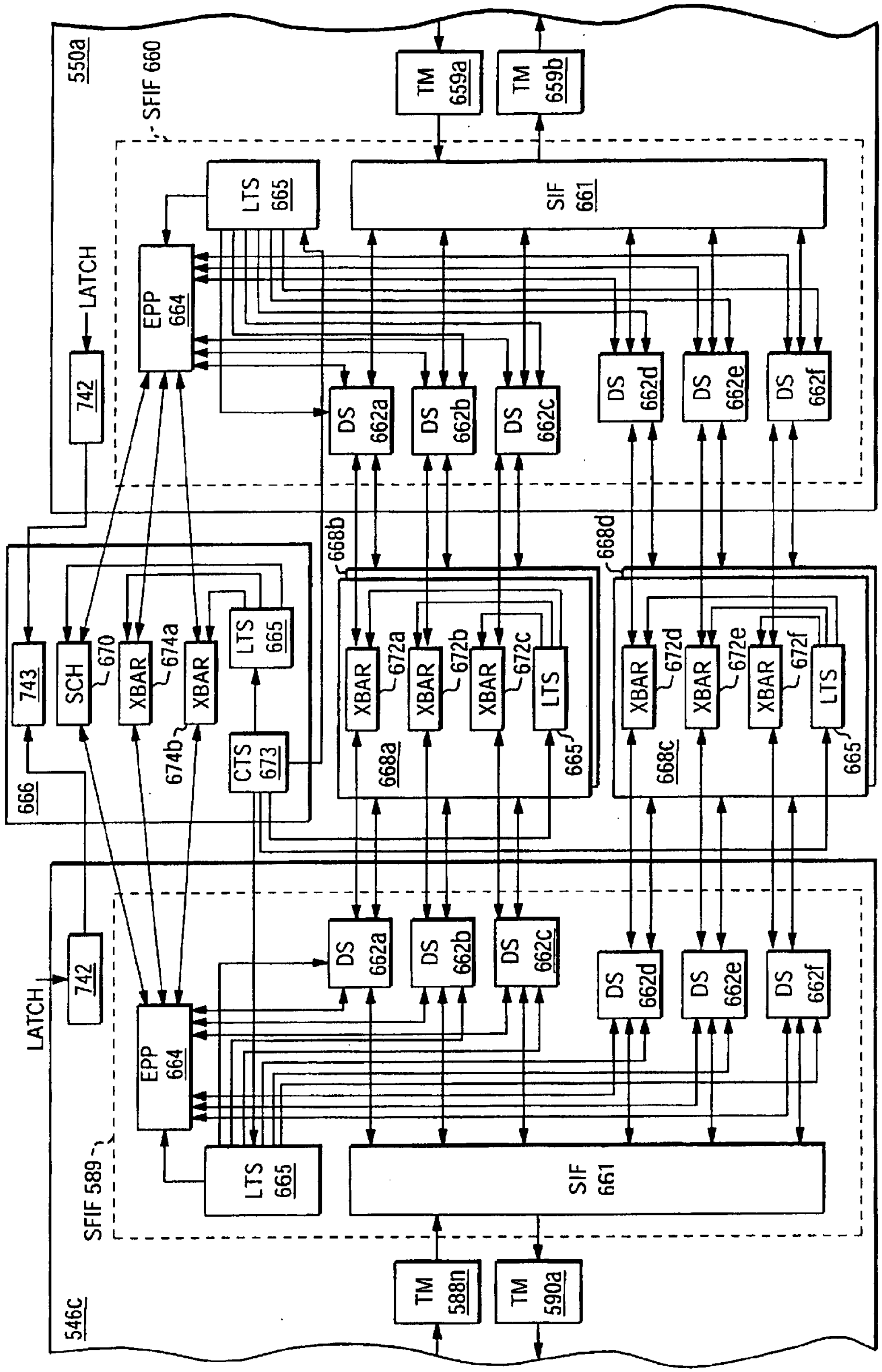
FIG. 43 is a block diagram of two distributed switch fabrics and a central switch fabric.

Referring also to FIG. 43, forwarding card 546*c* includes traffic management (TM) chips 588*n* and 590*a* and SFIF chips 589, and forwarding card 550*a* includes traffic management chips 659*a* and 659*b* and SFIF chips 660. (FIG. 43 includes only two forwarding cards for convenience but it is to be understood that many forwarding cards may be included in a network device as shown in FIG. 35.) SFIF chips 589 and 660 on both boards include a switch fabric interface (SIF) chip 661, data slice chips 662*a*–662*f*, an enhanced port processor (EPP) chip 664 and a local timing subsystem (LTS) 665. The SFIF chips receive data from ingress TM chips 588*n* and 659*a* and forward it to the switch fabric cards 570*a*–570*b* (FIG. 36). Similarly, the SFIF chips receive data from the switch fabric cards and forward it to the egress TM chips 590*a* and 659*b*.

Due to the size and complexity of the switch fabric, each switch fabric card 570*a*–570*b* may include multiple separate cards. In one embodiment, each switch fabric card 570*a*–570*b* includes a control card 666 and four data cards 668*a*–668*d*. A scheduler chip 670 on control card 666 works with the EPP chips on each of the forwarding cards to transfer network data between the data slice chips on the forwarding cards through cross-bar chips 672*a*–672*l* (only chips 672*a*–672*f* are shown) on data cards 668*a*–668*d*. Each of the data slice chips on each of the forwarding cards is connected to two of the cross-bar chips on the data cards. Switch fabric control card 666 and each of the switch fabric data cards 668*a*–668*d* also include a switch fabric local timing subsystem (LTS) 665, and a switch fabric central timing subsystem (CTS) 673 on control card 666 provides a start of segment (SOS) reference signal to each LTS 665 on each of the forwarding cards and switch fabric cards.

The traffic management chips perform upper level network traffic management within the network device while scheduler chip 670 on control card 666 performs the lower level data transfer between forwarding cards. The traffic management chips determine the priority of received network data and then forward the highest priority data to SIF chips 661. The traffic management chips include large buffers to store lower priority data until higher priority data has been transferred. The traffic management chips also store data in these buffers when the local EPP chip indicates that data transfers are to be stopped (i.e., back pressure). The scheduler chip works with the EPP chips to stop or hold-off data transfers when necessary, for example, when buffers on one forwarding card are close to full, the local EPP chip sends notice to each of the other EPP chips and the scheduler to hold off sending more data. Back pressure may be applied to all forwarding cards when a new switch fabric control card is added to the network device, as described below.

The traffic management chips forward network data in predefined segments to the SIF chips. In the case of ATM data, each ATM cell is a segment. In the case of IP and MPLS, where the amount of network data in each packet may vary, the data is first arranged into appropriately sized segments before being sent to the SIF chips. This may be accomplished through segmentation and reassembly (SAR) chips (not shown).

When the SIF chip receives a segment of network data, it organizes the data into a segment consistent with that expected by the switch fabric components, including any required header information. The SIF chip may be a PMC9324-TC chip available from Extreme Packet Devices (EPD), a subsidiary of PMC-Sierra, and the data slice chips may be PM9313-HC chips and the EPP chip may be a PM9315-HC chip available from Abrizio, also a subsidiary of PMC-Sierra. In this case, the SIF chip organizes each segment of data—including header information—in accordance with a line-card-to-switch two (LCS-2) protocol. The SIF chip then divides each data segment into twelve slices and sends two slices to each data slice chip 662*a*–662*f*. Two slices are sent because each data slice chip includes the functionality of two data slices.

When the data slice chips receive the LCS segments, the data slice chips strip off the header information, including both a destination address and quality of service (QoS) information, and send the header information to the local EPP chip. Alternatively, the SIF chip may send the header information directly to the EPP chip and send only data to the data slice chips. However, the manufacturer teaches that the SIF chip should be on the forwarding card and the EPP and data slice chips should be on a separate switch fabric card within the network device or in a separate box connected to the network device. Minimizing connections between cards is important, and where the EPP and data slice chips are not on the same card as the SIF chips, the header information is sent with the data by the SIF chip to reduce the required inter-card connections, and the data slice chips then strip off this information and send it to the EPP chip.

The EPP chips on all of the forwarding cards communicate and synchronize through cross-bar chips 674*a*–674*b* on control card 666. For each time interval (e.g., every 40 nanoseconds, "ns"), the EPP chips inform the scheduler chip as to which data segment they would like to send and the data slice chips send a segment of data previously set up by the scheduler and EPP chips. The EPP chips and the scheduler use the destination addresses to determine if there are any conflicts, for example, to determine if two or more forwarding cards are trying to send data to the same forwarding card. If a conflict is found, then the quality of service information is used to determine which forwarding card is trying to send the higher priority data. The highest priority data will likely be sent first. However, the scheduler chips include an algorithm that takes into account both the quality of service and a need to keep the switch fabric data cards 668*a*–668*d* full (maximum data through put). Where a conflict exists, the scheduler chip may inform the EPP chip to send a different, for example, lower priority, data segment from the data slice chip buffers or to send an empty data segment during the time interval.

Scheduler chip 670 informs each of the EPP chips which data segment is to be sent and received in each time interval. The EPP chips then inform their local data slice chips as to which data segments are to be sent in each interval and which data segments will be received in each interval. As previously mentioned, the forwarding cards each send and receive data. The data slice chips include small buffers to hold certain data (e.g., lower priority) while other data (e.g., higher priority) data is sent and small buffers to store received data. The data slice chips also include header information with each segment of data sent to the switch fabric cards. The header information is used by cross-bar chips 672*a*–672*l* (only cross-bar chips 672*a*–672*f* are shown) to switch the data to the correct forwarding card. The cross-bar chips may be PM9312-UC chips and the scheduler chip may be a PM9311-UC chip both of which are available from Abrizio.

Specifications for the EPD, Abrizio and PMC-Sierra chips may be found at www.pmcsierra.com and are hereby incorporated herein by reference.

Distributed Switch Fabric Timing

As previously mentioned, a segment of data (e.g., an ATM cell) is transferred between the data slice chips through the cross-bar chips every predetermined time interval. In one embodiment, this time interval is 40ns and is established by a 25 MHz start of segment (SOS) signal. A higher frequency clock (e.g., 200 MHz, having a 5 ns time interval) is used by the data slice and cross-bar chips to transfer the bits of data within each segment such that all the bits of data in a segment are transferred within one 40 ns interval. More specifically, in one embodiment, each switch fabric component multiplies the 200 MHz clock signal by four to provide an 800 MHz internal clock signal allowing data to be transferred through the data slice and cross-bar components at 320 Gbps. As a result, every 40 ns one segment of data (e.g., an ATM cell) is transferred. It is crucial that the EPP, scheduler, data slice and cross-bar chips transfer data according to the same/synchronized timing signals (e.g., clock and SOS), including both frequency and phase. Transferring data at different times, even slightly different times, may lead to data corruption, the wrong data being sent and/or a network device crash.

When distributed signals (e.g., reference SOS or clock signals) are used to synchronize actions across multiple components (e.g., the transmission of data through a switch fabric), any time-difference in events (e.g., clock pulse) on the distributed signals is generally termed "skew". Skew between distributed signals may result in the actions not occurring at the same time, and in the case of transmission of data through a switch fabric, skew can cause data corruption and other errors. Many variables can introduce skew into these signals. For example, components used to distribute the clock signal introduce skew, and etches on the mid-plane(s) introduce skew in proportion to the differences in their length (e.g., about 180 picoseconds per inch of etch in FR 4 printed circuit board material).

To minimize skew, one manufacturer teaches that all switch fabric components (i.e., scheduler, EPP, data slice and cross-bar chips) should be located on centralized switch fabric cards. That manufacturer also suggests distributing a central clock reference signal (e.g., 200 MHz) and a separate SOS signal (e.g., 25 MHz) to the switch fabric components on the switch fabric cards. Such a timing distribution scheme is difficult but possible where all the components are on one switch fabric card or on a limited number of switch fabric cards that are located near each other within the network device or in a separate box connected to the network device. Locating the boards near each other within the network device or in a separate box allows etch lengths on the mid-plane for the reference timing signals to be more easily matched and, thus, introduce less skew.

When the switch fabric components are distributed, maintaining a very tight skew becomes difficult due to the long lengths of etches required to reach some of the distributed cards and the routing difficulties that arise in trying to match the lengths of all the etches across the mid-plane(s). Because the clock signal needs to be distributed not only to the five switch fabric cards but also the forwarding cards (e.g., twenty), it becomes a significant routing problem to distribute all clocks to all loads with a fixed etch length.

Since timing is so critical to network device operation, typical network devices include redundant central timing subsystems. Certainly, the additional reference timing signals from a redundant central timing subsystem to each of the forwarding cards and switch fabric cards create further routing difficulties. In addition, if the two central timing subsystems (i.e., sources) are not synchronous with matched distribution etches, then all of the loads (i.e., LTSs) must use the same reference clock source to avoid introducing clock skew—that is, unless both sources are synchronous and have matched distribution networks, the reference timing signals from both sources are likely to be skewed with respect to each other and, thus, all loads must use the same source/reference timing signal or be skewed with respect to each other.

A redundant, distributed switch fabric greatly increases the number of reference timing signals that must be routed over the mid-planes and yet remain accurately synchronized. In addition, since the timing signals must be sent to each card having a distributed switch fabric, the distance between the cards may vary greatly and, thus, make matching the lengths of timing signal etches on the mid-planes difficult. Further, the lengths of the etches for the reference timing signals from both the primary and redundant central timing subsystems must be matched. Compounding this with a fast clock signal and low skew component requirements makes distributing the timing very difficult.

The network device of the present invention, though difficult, includes two synchronized central timing subsystems (CTS) 673 (one is shown in FIG. 43). The etch lengths of reference timing signals from both central timing subsystems are matched to within, for example, +/−50 mils, and both central timing subsystems distribute only reference start of segment (SOS) signals to a local timing subsystem (LTS) 665 on each forwarding card and switch fabric card. The LTSs use the SOS reference signals to generate both an SOS signal and a higher frequency clock signal. This adds components and complexity to the LTSs, however, distributing only the SOS reference signals and not both the SOS and clock reference signals significantly reduces the number of reference timing signals that must be routed across the mid-plane on matched etch lengths.

Both electro-magnetic radiation and electro-physical limitations prevent the 200 MHz reference clock signal from being widely distributed as required in a network device implementing distributed switch fabric subsystems. Such a fast reference clock increases the overall noise level generated by the network device and wide distribution may cause the network device to exceed Electro-Magnetic Interference (EMI) limitations. Clock errors are often measured as a percentage of the clock period, the smaller the clock period (5 ns for a 200 MHz clock), the larger the percentage of error a small skew can cause. For example, a skew of 3 ns represents a 60% error for a 5 ns clock period but only a 7.5% error for a 40 ns clock period. Higher frequency clock signals (e.g., 200 MHz) are susceptible to noise error and clock skew. The SOS signal has a larger clock period than the reference clock signal (40 ns versus 5 ns) and, thus, is less susceptible to noise error and reduces the percentage of error resulting from clock skew.

Figure 44:
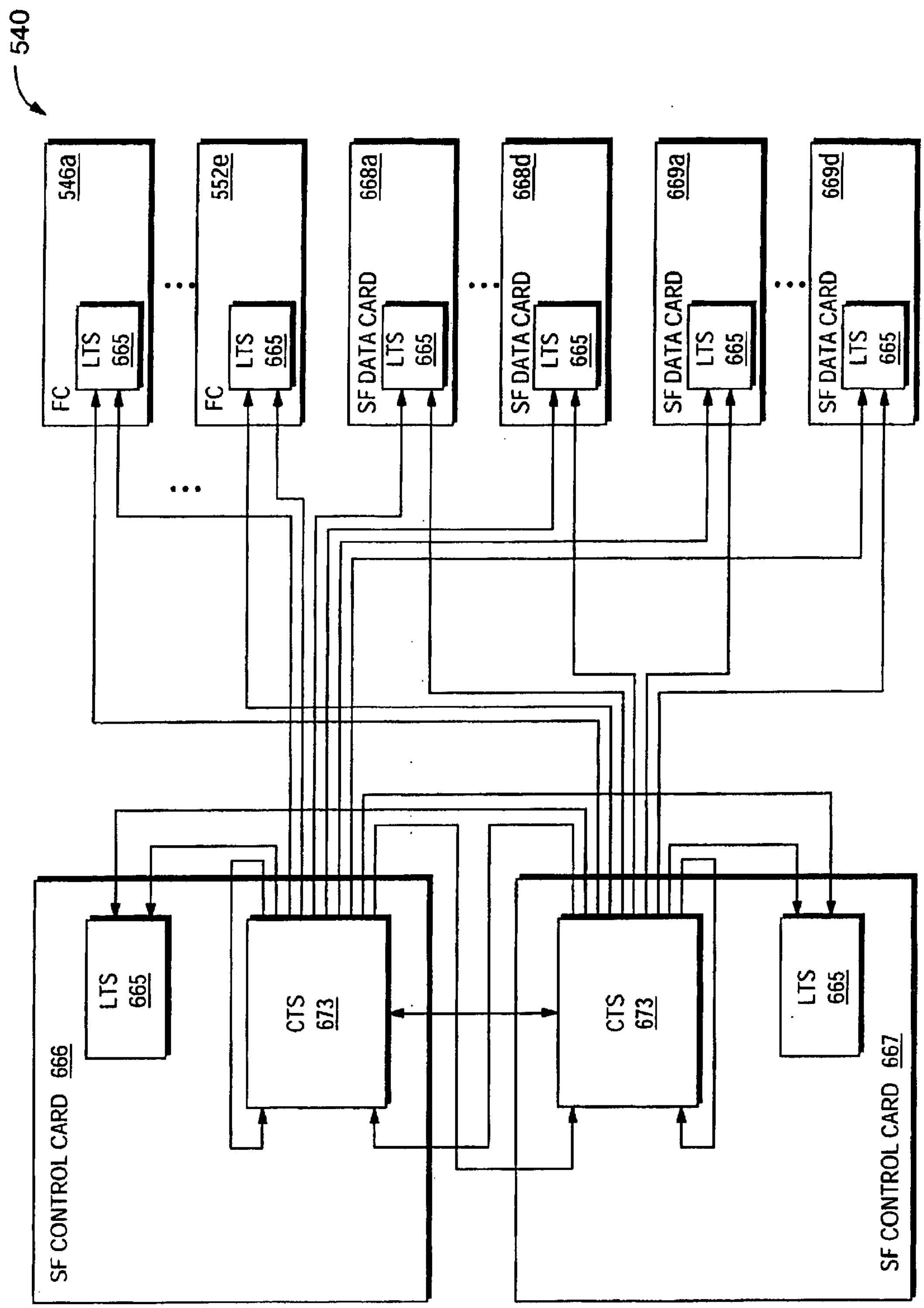
FIG. 44 is a block diagram of the interconnections between switch fabric central timing subsystems and switch fabric local timing subsystems.

As previously mentioned, the network device may include redundant switch fabric cards 570*a* and 570*b* (FIG. 36) and as described above with reference to FIG. 43, each switch fabric card 570*a* and 570*b* may include a control card and four or more data cards. Referring to FIG. 44, network device 540 may include switch fabric control card 666 (part of central switch fabric 570*a*) and redundant switch fabric control card 667 (part of redundant switch fabric 570*b*). Each control card 666 and 667 includes a central timing subsystem (CTS) 673. One CTS behaves as the master and the other CTS behaves as a slave and locks its output SOS signal to the master's output SOS signal. In one embodiment, upon power-up or system re-boot the CTS on the primary switch fabric control card 666 begins as the master and if a problem occurs with the CTS on the primary control card, then the CTS on redundant control card 667 takes over as master without requiring a switch over of the primary switch fabric control card.

Still referring to FIG. 44, each CTS sends a reference SOS signal to the LTSs on each forwarding card, switch fabric data cards 668*a*–668*d* and redundant switch fabric data cards 669*a*–669*b*. In addition, each CTS sends a reference SOS signal to the LTS on its own switch fabric control card and the LTS on the other switch fabric control card. As described in more detail below, each LTS then selects which reference SOS signal to use. Each CTS 673 also sends a reference SOS signal to the CTS on the other control card. The master CTS ignores the reference SOS signal from the slave CTS but the slave CTS locks its reference SOS signal to the reference SOS signal from the master, as described below. Locking the slave SOS signal to the master SOS signal synchronizes the slave signal to the master signal such that in the event that the master CTS fails and the LTSs switchover to the slave CTS reference SOS signal and the slave CTS becomes the master CTS, minimal phase change and no signal disruption is encountered between the master and slave reference SOS signals received by the LTSs.

Each of the CTS reference SOS signals sent to the LTSs and the other CTS over mid-plane etches are the same length (i.e., matched) to avoid introducing skew. The CTS may be on its own independent card or any other card in the system. Even when it is located on a switch fabric card, such as the control card, that has an LTS, the reference SOS signal is routed through the mid-plane with the same length etch as the other reference SOS signals to avoid adding skew.

Central Timing Subsystem (CTS)

Figure 45A:
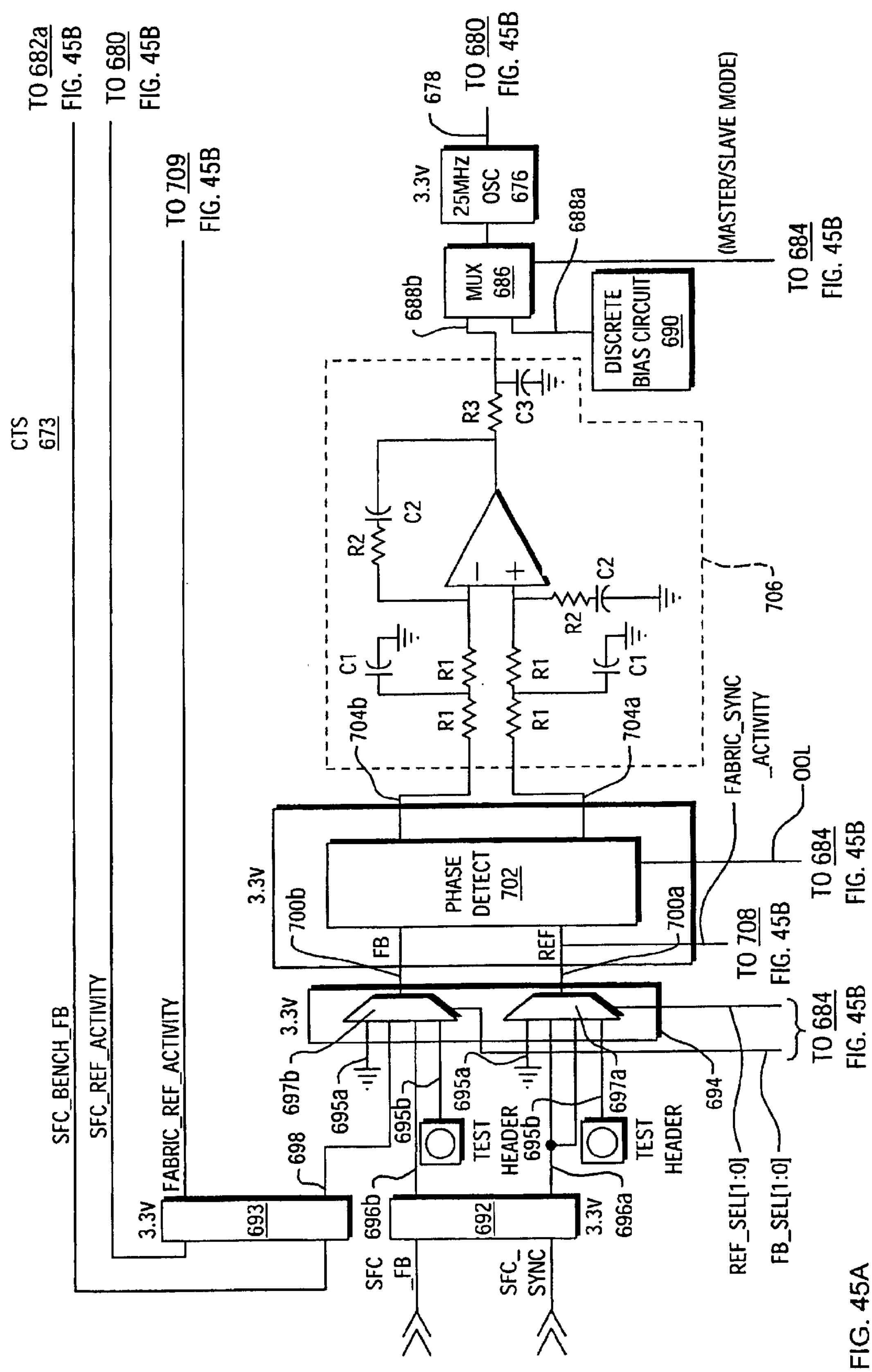
FIG. 45 is a block diagram of a switch fabric central timing subsystem.
Figure 45B:
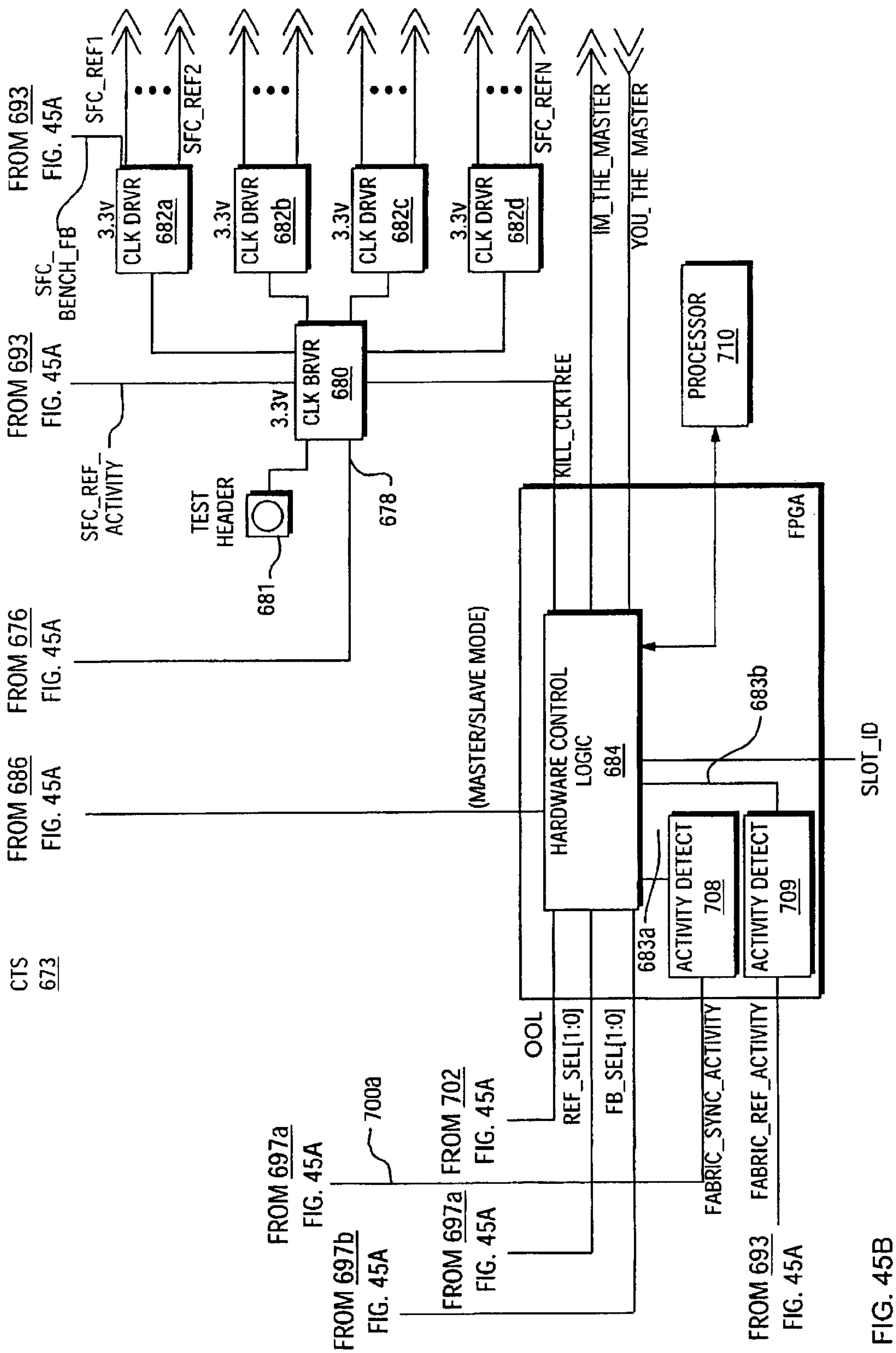

Referring to FIG. 45, central timing subsystem (CTS) 673 includes a voltage controlled crystal oscillator (VCXO) 676 that generates a 25MHz reference SOS signal 678. The SOS signal must be distributed to each of the local timing subsystems (LTSs) and is, thus, sent to a first level clock driver 680 and then to second level clock drivers 682*a*–682*d* that output reference SOS signals SFC_BENCH_FB and SFC_REF1-SFC_REFn. SFC_BENCH_FB is a local feedback signal returned to the input of the CTS. One of SFC_REF1-SFC_REFn is sent to each LTS, the other CTS, which receives it on SFC_SYNC, and one is routed over a mid-plane and returned as a feedback signal SFC_FB to the input of the CTS that generated it. Additional levels of clock drivers may be added as the number of necessary reference SOS signals increases.

VCXO 676 may be a VF596ES50 25 MHz LVPECL available from Conner-Winfield. Positive Emitter Coupled Logic (PECL) is preferred over Transistor-Transistor Logic (TTL) for its lower skew properties. In addition, though it requires two etches to transfer a single clock reference—significantly increasing routing resources—, differential PECL is preferred over PECL for its lower skew properties and high noise immunity. The clock drivers are also differential PECL and may be one to ten (1:10) MC100 LVEP111 clock drivers available from On Semiconductor. A test header 681 may be connected to clock driver 680 to allow a test clock to be input into the system.

Hardware control logic 684 determines (as described below) whether the CTS is the master or slave, and hardware control logic 684 is connected to a multiplexor (MUX) 686 to select between a predetermined voltage input (i.e., master voltage input) 688*a* and a slave VCXO voltage input 688*b*. When the CTS is the master, hardware control logic 684 selects predetermined voltage input 688*a* from discrete bias circuit 690 and slave VCXO voltage input 688*b* is ignored. The predetermined voltage input causes VCXO 676 to generate a constant 25 MHz SOS signal; that is, the VCXO operates as a simple oscillator.

Hardware control logic may be implemented in a field programmable gate array (FPGA) or a programmable logic device (PLD). MUX 686 may be a 74CBTLV3257 FET 2:1 MUX available from Texas Instruments.

When the CTS is the slave, hardware control logic 684 selects slave VCXO voltage signal 688*b*. This provides a variable voltage level to the VCXO that causes the output of the VCXO to track or follow the SOS reference signal from the master CTS. Referring still to FIG. 45, the CTS receives the SOS reference signal from the other CTS on SFC_SYNC. Since this is a differential PECL signal, it is first passed through a differential PECL to TTL translator 692 before being sent to MUX 697*a* within dual MUX 694. In addition, two feedback signals from the CTS itself are supplied as inputs to the CTS. The first feedback signal SFC_FB is an output signal (e.g., one of SFC_REF1-SFC_REFn) from the CTS itself which has been sent out to the mid-plane and routed back to the switch fabric control card. This is done so that the feedback signal used by the CTS experiences identical conditions as the reference SOS signal delivered to the LTSs and skew is minimized. The second feedback signal SFC_BENCH_FB is a local signal from the output of the CTS, for example, clock driver 682*a*. SFC_BENCH_FB may be used as the feedback signal in a test mode, for example, when the control card is not plugged into the network device chassis and SFC_SB is unavailable. SFC_BENCH_FB and SFC_FB are also differential PECL signals and must be sent through translators 693 and 692, respectively, prior to being sent to MUX 697*b* within dual MUX 694. Hardware control logic 684 selects which inputs are used by MUX 694 by asserting signals on REF_SEL (1:0) and FB_SEL(1:0). In regular use, inputs 696*a* and 696*b* from translator 692 are selected. In test modes, grounded inputs 695*a,* test headers 695*b* or local feedback signal 698 from translator 693 may be selected. Also in regular use (and in test modes where a clock signal is not inserted through the test headers), copies of the selected input signals are provided on the test headers.

The reference output 700*a* and the feedback output 700*b* are then sent from the MUX to phase detector circuit 702.

The phase detector compares the rising edge of the two input signals to determine the magnitude of any phase shift between the two. The phase detector then generates variable voltage pulses on outputs 704*a* and 704*b* representing the magnitude of the phase shift. The phase detector outputs are used by discrete logic circuit 706 to generate a voltage on a slave VCXO voltage signal 688*b* representing the magnitude of the phase shift. The voltage is used to speed up or slow down (i.e., change the phase of) the VCXO's output SOS signal to allow the output SOS signal to track any phase change in the reference SOS signal from the other CTS (i.e., SFC_SYNC). The discrete logic components implement filters that determine how quickly or slowly the VCXO's output will track the change in phase detected on the reference signal. The combination of the dual MUX, phase detector, discrete logic, VCXO, clock drivers and feedback signal forms a phase locked loop (PLL) circuit allowing the slave CTS to synchronize its reference SOS signal to the master CTS reference SOS signal. MUX 686 and discrete bias circuit 690 are not found in phase locked loop circuits.

The phase detector circuit may be implemented in a programmable logic device (PLD), for example a MACH4LV-32 available from Lattice/Vantis Semiconductor. Dual MUX 694 may be implemented in the same PLD. Preferably, however, dual MUX 694 is an SN74CBTLV3253 available from Texas Instruments, which has better skew properties than the PLD. The differential PECL to TTL translators may be MC100EPT23 dual differential PECL/TTL translators available from On Semiconductor.

Since quick, large phase shifts in the reference signal are likely to be the results of failures, the discrete logic implements a filter, and for any detected phase shift, only small incremental changes over time are made to the voltage provided on slave VCXO control signal 688*b*. As one example, if the reference signal from the master CTS dies, the slave VCXO control signal 688*b* only changes phase slowly over time meaning that the VCXO will continue to provide a reference SOS signal. If the reference signal from the master CTS is suddenly returned, the slave VCXO control signal 688*b* again only changes phase slowly over time to cause the VCXO signal to re-synchronize with the reference signal from the master CTS. This is a significant improvement over distributing a clock signal directly to components that use the signal because, in the case of direct clock distribution, if one clock signal dies (e.g., broken wire), then the components connected to that signal stop functioning causing the entire switch fabric to fail.

Slow phase changes on the reference SOS signals from both the master and slave CTSs are also important when LTSs switch over from using the master CTS reference signal to using the slave CTS reference signal. For example, if the reference SOS signal from the master CTS dies or other problems are detected (e.g., a clock driver dies), then the slave CTS switches over to become the master CTS and each of the LTSs begin using the slave CTS' reference SOS signal. For these reasons, it is important that the slave CTS reference SOS signal be synchronized to the master reference signal but not quickly follow large phase shifts in the master reference signal.

It is not necessary for every LTS to use the reference SOS signals from the same CTS. In fact, some LTSs may use reference SOS signals from the master CTS while one or more are using the reference SOS signals from the slave CTS. In general, this is a transitional state prior to or during switch over. For example, one or more LTSs may start using the slave CTS's reference SOS signal prior to the slave CTS switching over to become the master CTS.

It is important for both the CTSs and the LTSs to monitor the activity of the reference SOS signals from both CTSs such that if there is a problem with one, the LTSs can begin using the other SOS signal immediately and/or the slave CTS can quickly become master. Reference output signal 700*a*—the translated reference SOS signal sent from the other CTS and received on SFC_SYNC—is sent to an activity detector circuit 708. The activity detector circuit determines whether the signal is active—that is, whether the signal is "stuck at" logic 1 or logic 0. If the signal is not active (i.e., stuck at logic 1 or 0), the activity detector sends a signal 683*a* to hardware control logic 684 indicating that the signal died. The hardware control logic may immediately select input 688*a* to MUX 686 to change the CTS from slave to master. The hardware control logic also sends an interrupt to a local processor 710 and software being executed by the processor detects the interrupt. Hardware control allows the CTS switch over to happen very quickly before a bad clock signal can disrupt the system.

Similarly, an activity detector 709 monitors the output of the first level clock driver 680 regardless of whether the CTS is master or slave. Instead, the output of one the second level clock drivers could be monitored, however, a failure of a different second level clock will not be detected. SFC_REF_ACTIVITY is sent from the first level clock driver to differential PECL to TTL translator 693 and then as FABRIC_REF_ACTIVITY to activity detector 709. If activity detector 709 determines that the signal is not active, which may indicate that the clock driver, oscillator or other component(s) within the CTS have failed, then it sends a signal 683*b* to the hardware control logic. The hardware control logic asserts KILL_CLKTREE to stop the clock drivers from sending any signals and notifies a processor chip 710 on the switch fabric control card through an interrupt. Software being executed by the processor chip detects the interrupt. The slave CTS activity detector 708 detects a dead signal from the master CTS either before or after the hardware control logic sends KILL_CLKTREE and asserts error signal 683*a* to cause the hardware control logic to change the input selection on MUX 686 from 688*b* to 688*a* to become the master CTS. As described below, the LTSs also detect a dead signal from the master CTS either before or after the hardware control logic sends KILL_CLKTREE and switch over to the reference SOS signal from the slave CTS either before or after the slave CTS switches over to become the master.

As previously mentioned, in the past, a separate, common clock selection signal or etch was sent to each card in the network device to indicate whether to use the master or slave clock reference signal. This approach required significant routing resources, was under software control and resulted in every load selecting the same source at any given time. Hence, if a clock signal problem was detected, components had to wait for the software to change the separate clock selection signal before beginning to use the standby clock signal and all components (i.e., loads) were always locked to the same source. This delay can cause data corruption errors, switch fabric failure and a network device crash.

Forcing a constant logic one or zero (i.e., "killing") clock signals from a failed source and having hardware in each LTS and CTS detect inactive (i.e., "dead" or stuck at logic one or zero) signals allows the hardware to quickly begin using the standby clock without the need for software intervention. In addition, if only one clock driver (e.g., 682*b*) dies in the master CTS, LTSs receiving output signals from that clock driver may immediately begin using signals from the slave CTS clock driver while the other LTSs continue to use the master CTS. Interrupts to the processor from each of the LTSs connected to the failed master CTS clock driver allow software, specifically the SRM, to detect the failure and initiate a switch over of the slave CTS to the master CTS. The software may also override the hardware control and force the LTSs to use the slave or master reference SOS signal.

When the slave CTS switches over to become the master CTS, the remaining switch fabric control card functionality (e.g., scheduler and cross-bar components) continue operating. The SRM (described above) decides—based on a failure policy—whether to switch over from the primary switch fabric control card to the secondary switch fabric control card. There may be instances where the CTS on the secondary switch fabric control card operates as the master CTS for a period of time before the network device switches over from the primary to the secondary switch fabric control card, or instead, there may be instances where the CTS on the secondary switch fabric control card operates as the master CTS for a period of time and then the software directs the hardware control logic on both switch fabric control cards to switch back such that the CTS on the primary switch fabric control card is again master. Many variations are possible since the CTS is independent of the remaining functionality on the switch fabric control card.

Phase detector 702 also includes an out of lock detector that determines whether the magnitude of change between the reference signal and the feedback signal is larger than a predetermined threshold. When the CTS is the slave, this circuit detects errors that may not be detected by activity detector 708 such as where the reference SOS signal from the master CTS is failing but is not dead. If the magnitude of the phase change exceeds the predetermined threshold, then the phase detector asserts an OOL signal to the hardware control logic. The hardware control logic may immediately change the input to MUX 686 to cause the slave CTS to switch over to Master CTS and send an interrupt to the processor, or the hardware control logic may only send the interrupt and wait for software (e.g., the SRM) to determine whether the slave CTS should switch over to master.

Master/Slave CTS Control

In order to determine which CTS is the master and which is the slave, hardware control logic 684 implements a state machine. Each hardware control logic 684 sends an IM_THE_MASTER signal to the other hardware control logic 684 which is received as a YOU_THE_MASTER signal. If the IM_THE_MASTER signal—and, hence, the received YOU_THE_MASTER signal—is asserted then the CTS sending the signal is the master (and selects input 688*a* to MUX 686, FIG. 45) and the CTS receiving the signal is the slave (and selects input 688*b* to MUX 686). Each IM_THE_MASTER/YOU_THE_MASTER etch is pulled down to ground on the mid-planes such that if one of the CTSs is missing, the YOU_THE_MASTER signal received by the other CTS will be a logic 0 causing the receiving CTS to become the master. This situation may arise, for example, if a redundant control card including the CTS is not inserted within the network device. In addition, each of the hardware control logics receive SLOT_ID signals from pull-down/pull-up resistors on the chassis mid-plane indicating the slot in which the switch fabric control card is inserted.

Figure 46:
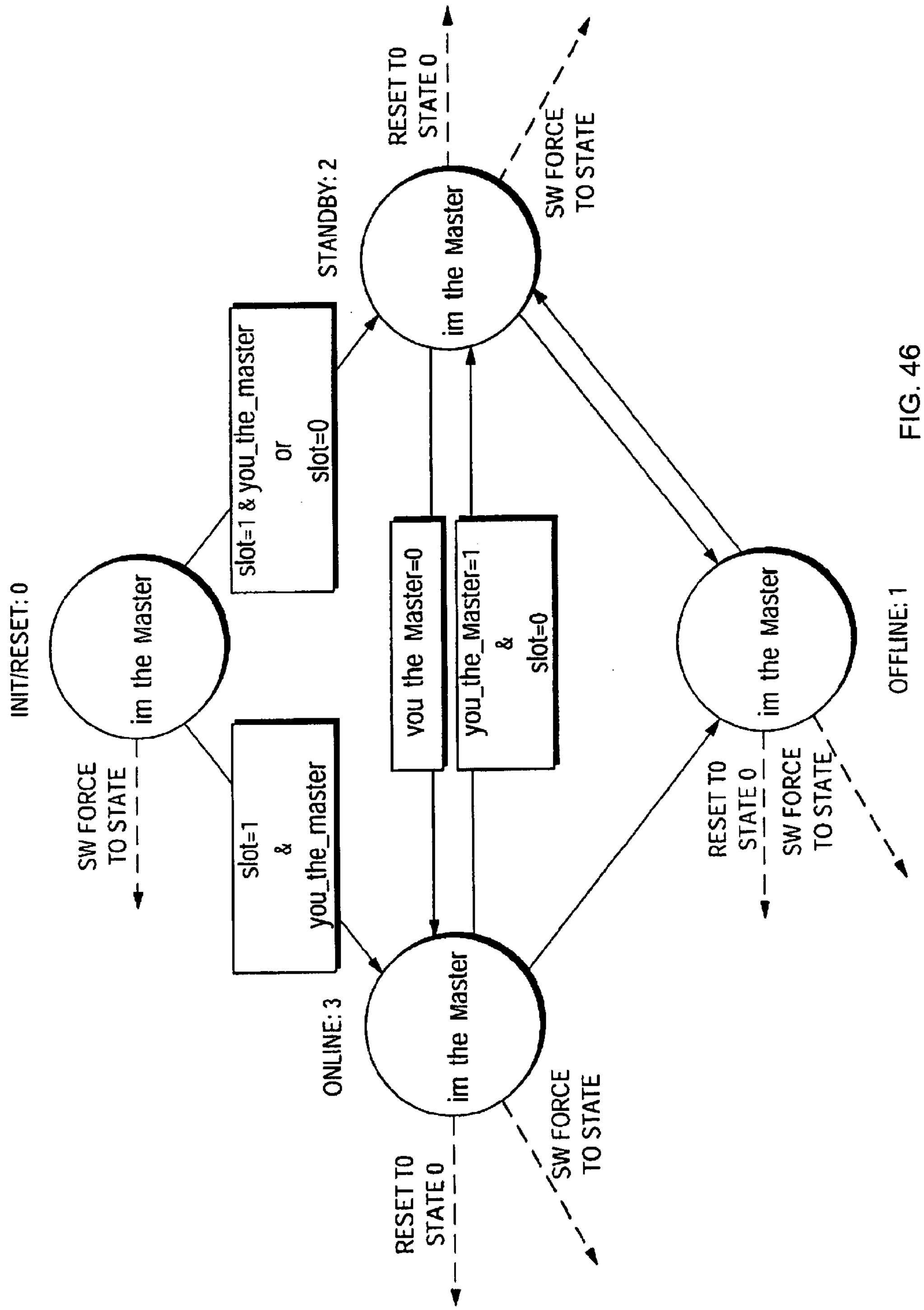
FIG. 46 is a state diagram of master/slave selection for switch fabric central timing subsystems.

Referring to FIG. 46, on power-up or after a system or card or CTS re-boot, the hardware control logic state machine begins in INIT/RESET state 0 and does not assert IM_THE_MASTER. If the SLOT_ID signals indicate that the control card is inserted in a preferred slot (e.g., slot one), and the received YOU_THE_MASTER is not asserted (i.e., 0), then the state machine transitions to the ONLINE state 3 and the hardware control logic asserts IM_THE_MASTER indicating its master status to the other CTS and selects input 688*a* to MUX 686. While in the ONLINE state 3, if a failure is detected or the software tells the hardware logic to switch over, the state machine enters the OFFLINE state 1 and the hardware control logic stops asserting IM_THE_MASTER and asserts KILL_CLKTREE. While in the OFFLINE state 1, the software may reset or reboot the control card or just the CTS and force the state machine to enter the STANDBY state 2 as the slave CTS and the hardware control logic stops asserting KILL_CLKTREE and selects input 688*b* to MUX 686.

While in INIT/RESET state 0, if the SLOT_ID signals indicate that the control card is inserted in a non-preferred slot, (e.g., slot 0), then the state machine will enter STANDBY state 2 as the slave CTS and the hardware control logic will not assert IM_THE_MASTER and will select input 688*b* to MUX 686. While in INIT/RESET state 0, even if the SLOT_ID signals indicate that the control card is inserted in the preferred slot, if YOU_THE_MASTER is asserted, indicating that the other CTS is master, then the state machine transfers to STANDBY state 2. This situation may arise after a failure and recovery of the CTS in the preferred slot (e.g., reboot, reset or new control card).

While in the STANDBY state 2, if the YOU_THE_MASTER signal becomes zero (i.e., not asserted), indicating that the master CTS is no longer master, the state machine will transition to ONLINE state 3 and the hardware control logic will assert IM_THE_MASTER and select input 688*a* to MUX 686 to become master. While in ONLINE state 3, if the YOU_THE_MASTER signal is asserted and SLOT_ID indicating slot 0 the state machine enters STANDBY state 2 and the hardware control logic stops asserting IM_THE_MASTER and selects input 688*b* to MUX 686. This is the situation where the original master CTS is back up and running. The software may reset the state machine at any time or set the state machine to a particular state at any time.

Local Timing Subsystem

Figure 47A:
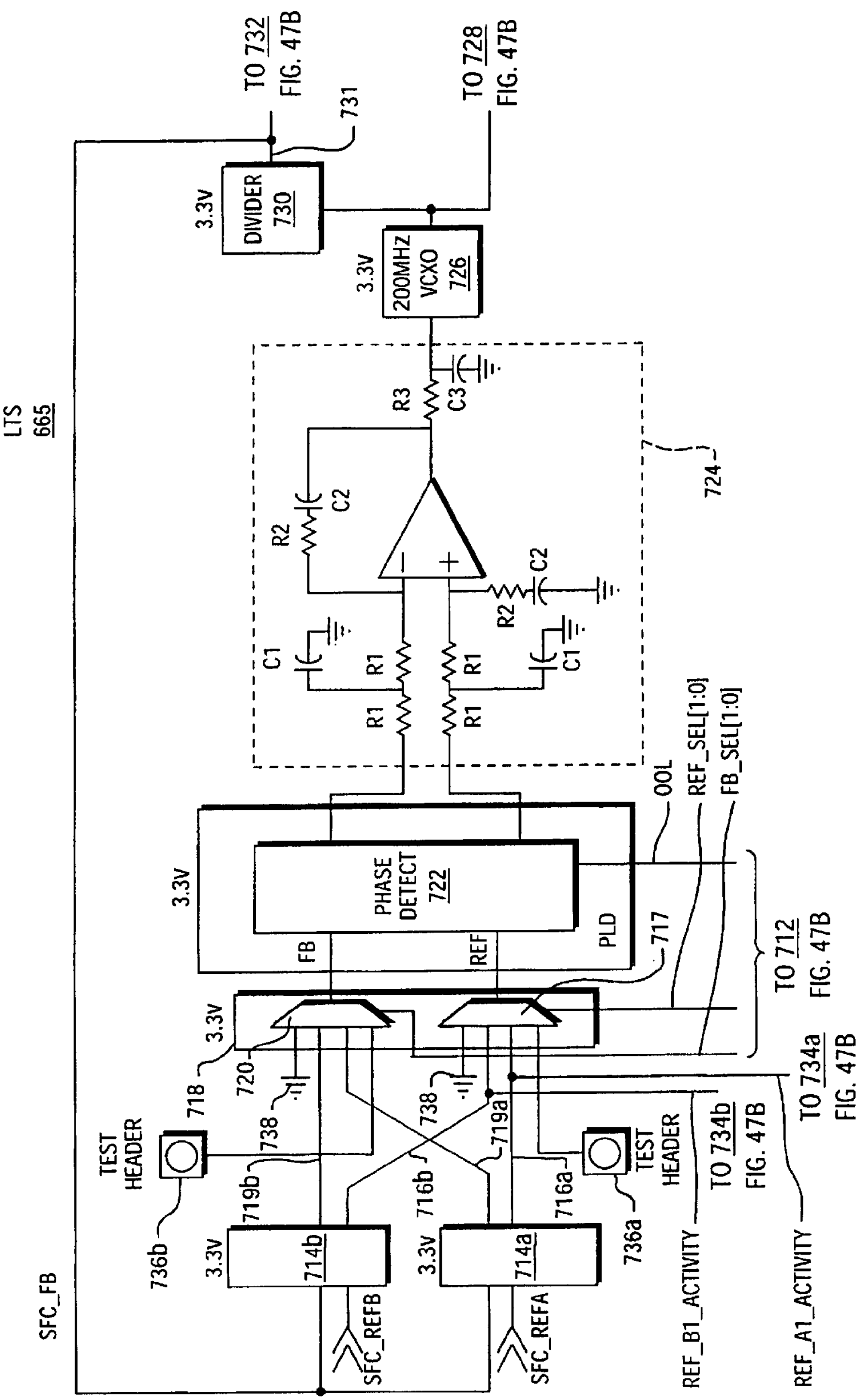
FIG. 47 is a block diagram of a switch fabric local timing subsystem.
Figure 47B:
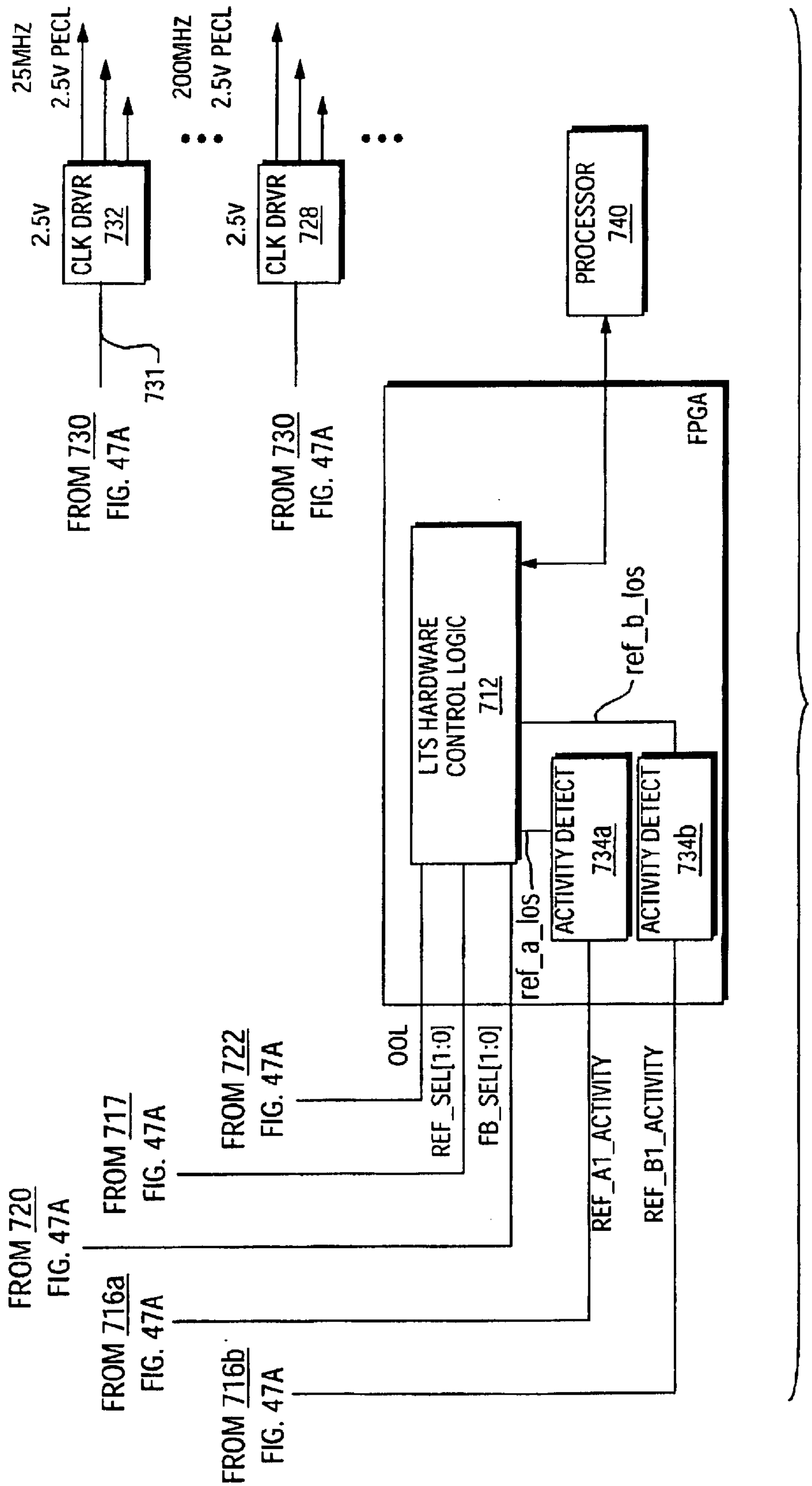

Referring to FIG. 47, each local timing subsystem (LTS) 665 receives a reference SOS signal from each CTS on SFC_REFA and SFC_REFB. Since these are differential PECL signals, each is passed through a differential PECL to TTL translator 714*a* or 714*b*, respectively. A feedback signal SFC_FB is also passed from the LTS output to both translators 714*a* and 714*b*. The reference signal outputs 716*a* and 716*b* are fed into a first MUX 717 within dual MUX 718, and the feedback signal outputs 719*a* and 719*b* are fed into a second MUX 720 within dual MUX 718. LTS hardware control logic 712 controls selector inputs REF_SEL (1:0) and FB_SEL (1:0) to dual MUX 718. With regard to the feedback signals, the LTS hardware control logic selects the feedback signal that went through the same translator as the reference signal that is selected to minimize the effects of any skew introduced by the two translators.

A phase detector 722 receives the feedback (FB) and reference (REF) signals from the dual MUX and, as explained above, generates an output in accordance with the magnitude of any phase shift detected between the two signals. Discrete logic circuit 724 is used to filter the output of the phase detector, in a manner similar to discrete logic 706 in the CTS, and provide a signal to VCXO 726 representing a smaller change in phase than that output from the phase detector. Within the LTSs, the VCXO is a 200 MHz oscillator as opposed to the 25 MHz oscillator used in the CTS. The output of the VCXO is the reference switch fabric clock. It is sent to clock driver 728, which fans the signal out to each of the local switch fabric components. For example, on the forwarding cards, the LTSs supply the 200 MHz reference clock signal to the EPP and data slice chips, and on the switch fabric data cards, the LTSs supply the 200 MHz reference clock signal to the cross-bar chips. On the switch fabric control card, the LTSs supply the 200 MHz clock signal to the scheduler and cross-bar components.

The 200 MHz reference clock signal from the VCXO is also sent to a divider circuit or component 730 that divides the clock by eight to produce a 25 MHz reference SOS signal 731. This signal is sent to clock driver 732, which fans the signal out to each of the same local switch fabric components that the 200 MHz reference clock signal was sent to. In addition, reference SOS signal 731 is provided as feedback signal SFC_FB to translator 714*b*. The combination of the dual MUX, phase detector, discrete logic, VCXO, clock drivers and feedback signal forms a phase locked loop circuit allowing the 200 MHz and 25 MHz signals generated by the LTS to be synchronized to either of the reference SOS signals sent from the CTSs.

The divider component may be a SY100EL34L divider by Synergy Semiconductor Corporation.

Figure 48:
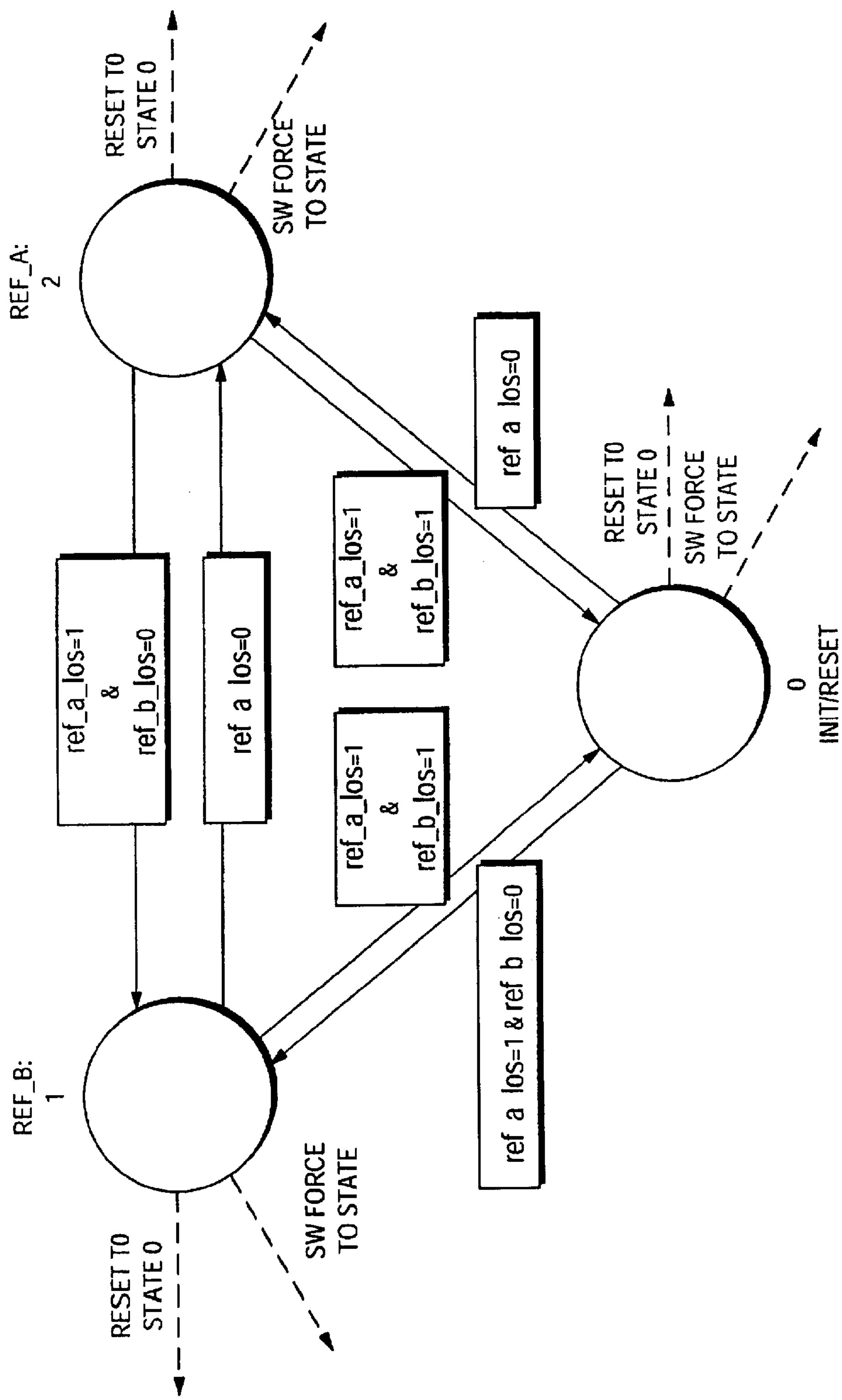
FIG. 48 is a state diagram of reference signal selection for switch fabric local timing subsystems.

Reference signals 716*a* and 716*b* from translator 714*a* are also sent to activity detectors 734*a* and 734*b*, respectively. These activity detectors perform the same function as the activity detectors in the CTSs and assert error signals ref_a_los or ref_b_los to the LTS hardware control logic if reference signal 716*a* or 716*b*, respectively, die. On power-up, reset or reboot, a state machine (FIG. 48) within the LTS hardware control logic starts in INIT/RESET state 0. Arbitrarily, reference signal 716*a* is the first signal considered. If activity detector 734*a* is not sending an error signal (i.e., ref_a_los is 0), indicating that that reference signal 716*a* is active, then the state machine changes to REF_A state 2 and sends signals over REF_SEL(1:0) to MUX 717 to select reference input 716*a* and sends signals over FB_SEL(1:0) to MUX 720 to select feedback input 719*a*. While in INIT/RESET state 0, if ref_a_los is asserted, indicating no signal on reference 716*a*, and if ref_b_los is not asserted, indicating there is a signal on reference 716*b*, then the state machine changes to REF_B state 1 and changes REF_SEL(1:0) and FB_SEL(1:0) to select reference input 716*b* and feedback signal 719*b*.

While in REF_A state 2, if activity detector 734*a* detects a loss of reference signal 716*a* and asserts ref_a_los, the state machine will change to REF_B state 1 and change REF_SEL(1:0) and FB_SEL(1:0) to select inputs 716*b* and 719*b*. Similarly, while in REF_B state 1, if activity detector 734*b* detects a loss of signal 716*b* and asserts ref_b_los, the state machine will change to REF_A state 2 and change REF_SEL(1:0) and FB_SEL(1:0) to select inputs 716*a* and 719*a*. While in either REF_A state 2 or REF_B state 1, if both ref_a_los and ref_b_los are asserted, indicating that both reference SOS signals have died, the state machine changes back to INIT/RESET state 0 and change REF_SEL (1:0) and FB_SEL(1:0) to select no inputs or test inputs 736*a* and 736*b* or ground 738. For a period of time, the LTS will continue to supply a clock and SOS signal to the switch fabric components even though it is receiving no input reference signal.

When ref_a_los and/or ref_b_los are asserted, the LTS hardware control logic notifies its local processor 740 through an interrupt. The SRM will decide, based on a failure policy, what actions to take, including whether to switch over from the master to slave CTS. Just as the phase detector in the CTS sends an out of lock signal to the CTS hardware control logic, the phase detector 722 also sends an out of lock signal OOL to the LTS hardware control logic if the magnitude of the phase difference between the reference and feedback signals exceeds a predetermined threshold. If the LTS hardware receives an asserted OOL signal, it notifies its local processor (e.g., 740) through an interrupt. The SRM will decide based on a failure policy what actions to take.

Shared LTS Hardware

In the embodiment described above, the switch fabric data cards are four independent cards. More data cards may also be used. Alternatively, all of the cross-bar components may be located on one card. As another alternative, half of the cross-bar components may be located on two separate cards and yet attached to the same network device faceplate and share certain components. A network device faceplate is something the network manager can unlatch and pull on to remove cards from the network device. Attaching two switch fabric data cards to the same faceplate effectively makes them one board since they are added to and removed from the network device together. Since they are effectively one board, they may share certain hardware as if all components were on one physical card. In one embodiment, they may share a processor, hardware control logic and activity detectors. This means that these components will be on one of the physical cards but not on the other and signals connected to the two cards allow activity detectors on the one card to monitor the reference and feedback signals on the other card and allow the hardware control logic on the one card to select the inputs for dual MUX 718 on the other card.

Scheduler

Another difficulty with distributing a portion of the switch fabric functionality involves the scheduler component on the switch fabric control cards. In current systems, the entire switch fabric, including all EPP chips, are always present in a network device. Registers in the scheduler component are configured on power-up or re-boot to indicate how many EPP chips are present in the current network device, and in one embodiment, the scheduler component detects an error and switches over to the redundant switch fabric control card when one of those EPP chips is no longer active. When the EPP chips are distributed to different cards (e.g., forwarding cards) within the network device, an EPP chip may be removed from a running network device when the printed circuit board on which it is located is removed ("hot swap", "hot removal") from the network device. To prevent the scheduler chip from detecting the missing EPP chip as an error (e.g., a CRC error) and switching over to the redundant switch fabric control card, prior to the board being removed from the network device, software running on the switch fabric control card re-configures the scheduler chip to disable the scheduler chip's links to the EPP chip that is being removed.

To accomplish this, a latch 547 (FIG. 40) on the faceplate of each of the printed circuit boards on which a distributed switch fabric is located is connected to a circuit 742 (FIG. 44) also on the printed circuit board that detects when the latch is released. When the latch is released, indicating that the board is going to be removed from the network device, circuit 742 sends a signal to a circuit 743 on both switch fabric control cards indicating that the forwarding card is about to be removed. Circuit 743 sends an interrupt to the local processor (e.g., 710, FIG. 45) on the switch fabric control card. Software (e.g., slave SRM) being executed by the local processor detects the interrupt and sends a notice to software (e.g., master SRM) being executed by the processor (e.g., 24, FIG. 1) on the network device centralized processor card (e.g., 12, FIG. 1, 542 or 543, FIG. 35). The master SRM sends a notice to the slave SRMs being executed by the processors on the switch fabric data cards and forwarding cards to indicate the removal of the forwarding card. The redundant forwarding card switches over to become a replacement for the failed primary forwarding card. The master SRM also sends a notice to the slave SRM on the cross-connection card (e.g., 562–562*b,* 564*a*–564*b,* 566*a*–566*b,* 568*a*–565*b,* FIG. 35) to re-configure the connections between the port cards (e.g., 554*a*–554*h,* 556*a*–556*h,* 558*a*–558*h,* 560*a*–560*h,* FIG. 35) and the redundant forwarding card. The slave SRM on the switch fabric control card re-configures the registers in the scheduler component to disable the scheduler's links to the EPP chip on the forwarding card that's being removed from the network device. As a result, when the forwarding card is removed, the scheduler will not detect an error due to a missing EPP chip.

Similarly, when a forwarding card is added to the network device, circuit 742 detects the closing of the latch and sends an interrupt to the processor. The slave SRM running on the local processor sends a notice to the Master SRM which then sends a notice to the slave SRMs being executed by the processors on the switch fabric control cards, data cards and forwarding cards indicating the presence of the new forwarding card. The slave SRM on the cross-connection cards may be re-configured, and the slave SRM on the switch fabric control card may re-configure the scheduler chip to establish links with the new EPP chip to allow data to be transferred to the newly added forwarding card.

Switch Fabric Control Card Switch-Over

Typically, the primary and secondary scheduler components receive the same inputs, maintain the same state and generate the same outputs. The EPP chips are connected to both scheduler chips but only respond to the master/primary scheduler chip. If the primary scheduler or control card experiences a failure a switch over is initiated to allow the secondary scheduler to become the primary. When the failed switch fabric control card is re-booted, re-initialized or replaced, it and its scheduler component serve as the secondary switch fabric control card and scheduler component.

In currently available systems, a complex sequence of steps is required to "refresh" or synchronize the state of the newly added scheduler component to the primary scheduler component and for many of these steps, network data transfer through the switch fabric is temporarily stopped (i.e., back pressure). Stopping network data transfer may affect the availability of the network device. When the switch fabric is centralized and all on one board or only a few boards or in its own box, the refresh steps are quickly completed by one or only a few processors limiting the amount of time that network data is not transferred. When the switch fabric includes distributed switch fabric subsystems, the processors that are local to each of the distributed switch fabric subsystems must take part in the series of steps. This may increase the amount of time that data transfer is stopped further affecting network device availability.

To limit the amount of time that data transfer is stopped in a network device including distributed switch fabric subsystems, the local processors each set up for a refresh while data is still being transferred. Communications between the processors take place over the Ethernet bus (e.g., 32, FIG. 1, 544, FIG. 35) to avoid interrupting network data transfer. When all processors have indicated (over the Ethernet bus) that they are ready for the refresh, the processor on the master switch fabric control card stops data transfer and sends a refresh command to each of the processors on the forwarding cards and switch fabric cards. Since all processors are waiting to complete the refresh, it is quickly completed. Each processor notifies the processor on the master switch fabric control card that the refresh is complete, and when all processors have completed the refresh, the master switch fabric control card re-starts the data transfer.

During the time in which the data transfer is stopped, the buffers in the traffic management chips are used to store data coming from external network devices. It is important that the data transfer be complete quickly to avoid overrunning the traffic management chip buffers.

Since the switch over of the switch fabric control cards is very complex and requires that data transfer be stopped, even if briefly, it is important that the CTSs on each switch fabric control card be independent of the switch fabric functionality. This independence allows the master CTS to switch over to the slave CTS quickly and without interrupting the switch fabric functionality or data transmission.

As described above, locating the EPP chips and data slice chips of the switch fabric subsystem on the forwarding cards is difficult and against the teachings of a manufacturer of these components. However, locating these components on the forwarding cards allows the base network device—that is, the minimal configuration—to include only a necessary portion of the switching fabric reducing the cost of a minimally configured network device. As additional forwarding cards are added to the minimal configuration—to track an increase in customer demand—additional portions of the switch fabric are simultaneously added since a portion of the switch fabric is located on each forwarding card. Consequently, switch fabric growth tracks the growth in customer demands and fees. Also, typical network devices include 1:1 redundant switch fabric subsystems. However, as previously mentioned, the forwarding cards may be 1:N redundant and, thus, the distributed switch fabric on each forwarding card is also 1:N redundant further reducing the cost of a minimally configured network device.

External Network Data Transfer Timing

In addition to internal switch fabric timing, a network device must also include external network data transfer timing to allow the network device to transfer network data synchronously with other network devices. Generally, multiple network devices in the same service provider site synchronize themselves to Building Integrated Timing Supply (BITS) lines provided by a network service provider. BITS lines are typically from highly accurate stratum two clock sources. In the United States, standard T1 BITS lines (2.048 MHz) are provided, and in Europe, standard E1 BITS lines (1.544 MHz) are provided. Typically, a network service provider provides two T1 lines or two E1 lines from different sources for redundancy. Alternatively, if there are no BITS lines or when network devices in different sites want to synchronously transfer data, one network device may extract a timing signal received on a port connected to the other network device and use that timing signal to synchronize its data transfers with the other network device.

Figure 49:
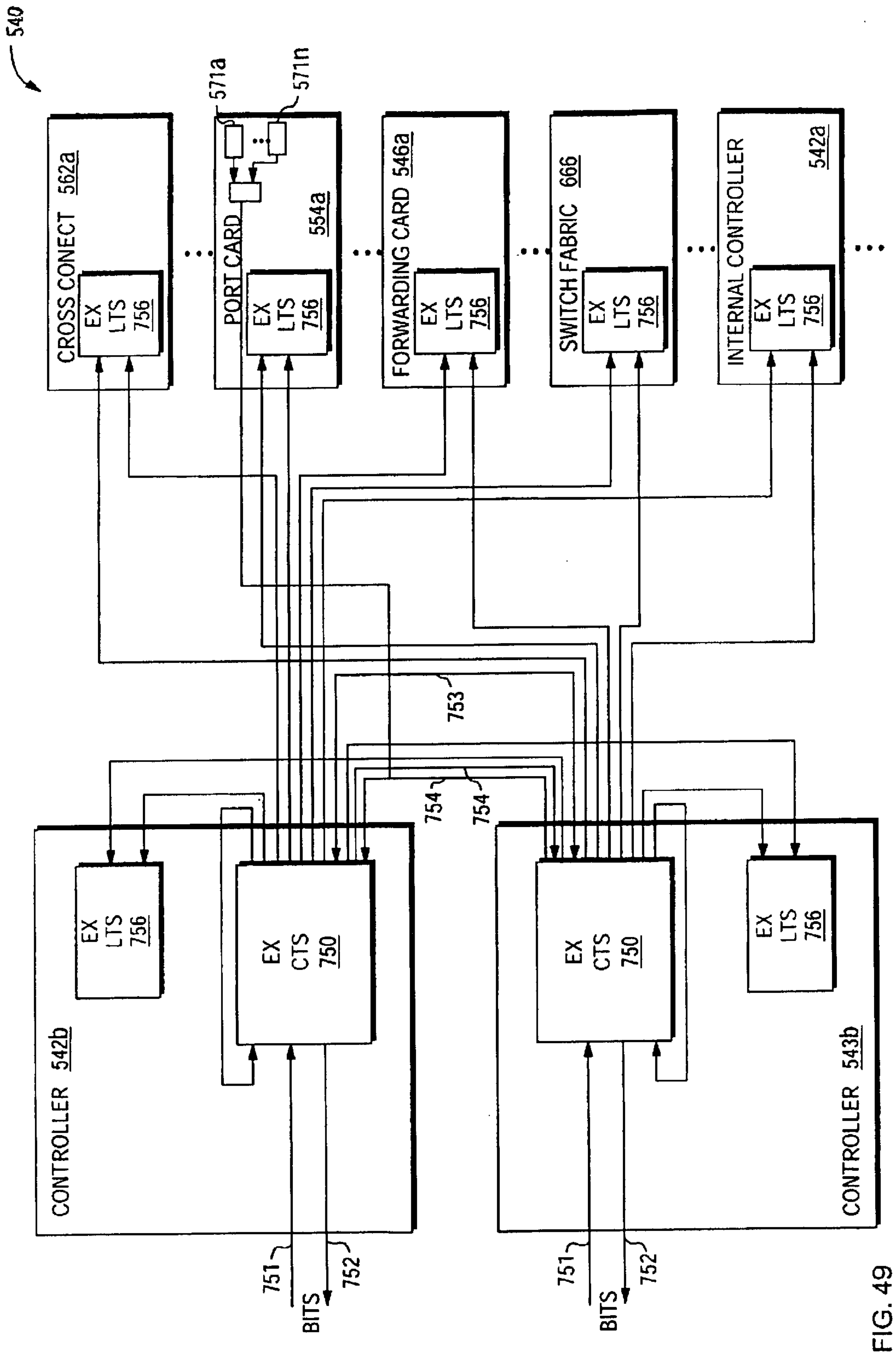
FIG. 49 is a block diagram of the interconnections between external central timing subsystems and external local timing subsystems.

Referring to FIG. 49, controller card 542*b* and redundant controller card 543*b* each include an external central timing subsystem (EX CTS) 750. Each EX CTS receives BITS lines 751 and provide BITS lines 752. In addition, each EX CTS receives a port timing signal 753 from each port card (554*a*–554*h,* 556*a*–556*h,* 558*a*–558*h,* 560*a*–560*h,* FIG. 35), and each EX CTS also receives an external timing reference signal 754 from itself and an external timing reference signal 755 from the other EX CTS.

One of the EX CTSs behaves as a master and the other EX CTS behaves as a slave. The master EX CTS may synchronize its output external reference timing signals to one of BITS lines 751 or one of the port timing signals 753, while the slave EX CTS synchronizes its output external reference timing signals to the received master external reference timing signal 755. Upon a master EX CTS failure, the slave EX CTS may automatically switch over to become the master EX CTS or software may upon an error or at any time force the slave EX CTS to switch over to become the master EX CTS.

An external reference timing signal from each EX CTS is sent to each external local timing subsystem (EX LTS) 756 on cards throughout the network device, and each EX LTS generates local external timing signals synchronized to one of the received external reference timing signals. Generally, external reference timing signals are sent only to cards including external data transfer functionality, for example, cross connection cards 562*a*–562*b*, 564*a*–564*b*, 566*a*–566*b* and 568*a*–568*b* (FIG. 35) and universal port cards 554*a*–554*h*, 556*a*–556*h*, 558*a*–558*h*, 560*a*–560*h*.

In network devices having multiple processor components, an additional central processor timing subsystem is needed to generate processor timing reference signals to allow the multiple processors to synchronize certain processes and functions. The addition of both external reference timing signals (primary and secondary) and processor timing reference signals (primary and secondary) require significant routing resources. In one embodiment of the invention, the EX CTSs embed a processor timing reference signal within each external timing reference signal to reduce the number of timing reference signals needed to be routed across the mid-plane(s). The external reference timing signals are then sent to EX LTSs on each card in the network device having a processor component, for example, cross connection cards 562*a*–562*b*, 564*a*–564*b*, 566*a*–566*b*, 568*a*–568*b*, universal port cards 554*a*–554*h*, 556*a*–556*h*, 558*a*–558*h*, 560*a*–560*h*, forwarding cards 546*a*–546*e*, 548*a*–548*e*, 550*a*–550*e*, 552*a*–552*e*, switch fabric cards 666, 667, 668*a*–668*d*, 669*a*–669*d* (FIG. 44) and both the internal controller cards 542*a*, 543*a* (FIG. 41*b*) and external controller cards 542*b* and 543*b*.

All of the EX LTSs extract out the embedded processor reference timing signal and send it to their local processor component. Only the cross-connection cards and port cards use the external reference timing signal to synchronize external network data transfers. As a result, the EX LTSs include extra circuitry not necessary to the function of cards not including external data transfer functionality, for example, forwarding cards, switch fabric cards and internal controller cards. The benefit of reducing the necessary routing resources, however, out weighs any disadvantage related to the excess circuitry. In addition, for the cards including external data transfer functionality, having one EX LTS that provides both local signals actually saves resources on those cards, and separate processor central timing subsystems are not necessary. Moreover, embedding the processor timing reference signal within the highly accurate, redundant external timing reference signal provides a highly accurate and redundant processor timing reference signal. Furthermore having a common EX LTS on each card allows access to the external timing signal for future modifications and having a common EX LTS, as opposed to different LTSs for each reference timing signal, results in less design time, less debug time, less risk, design re-use and simulation re-use.

Although the EX CTSs are described as being located on the external controllers 542*b* and 543*b*, similar to the switch fabric CTSs described above, the EX CTSs may be located on their own independent cards or on any other cards in the network device, for example, internal controllers 542*a* and 543*a*. In fact, one EX CTS could be located on an internal controller while the other is located on an external controller. Many variations are possible. In addition, just as the switch fabric CTSs may switch over from master to slave without affecting or requiring any other functionality on the local printed circuit board, the EX CTSs may also switch over from master to slave without affecting or requiring any other functionality on the local printed circuit board.

External Central Timing Subsystem (EX CTS)

Figure 50A:
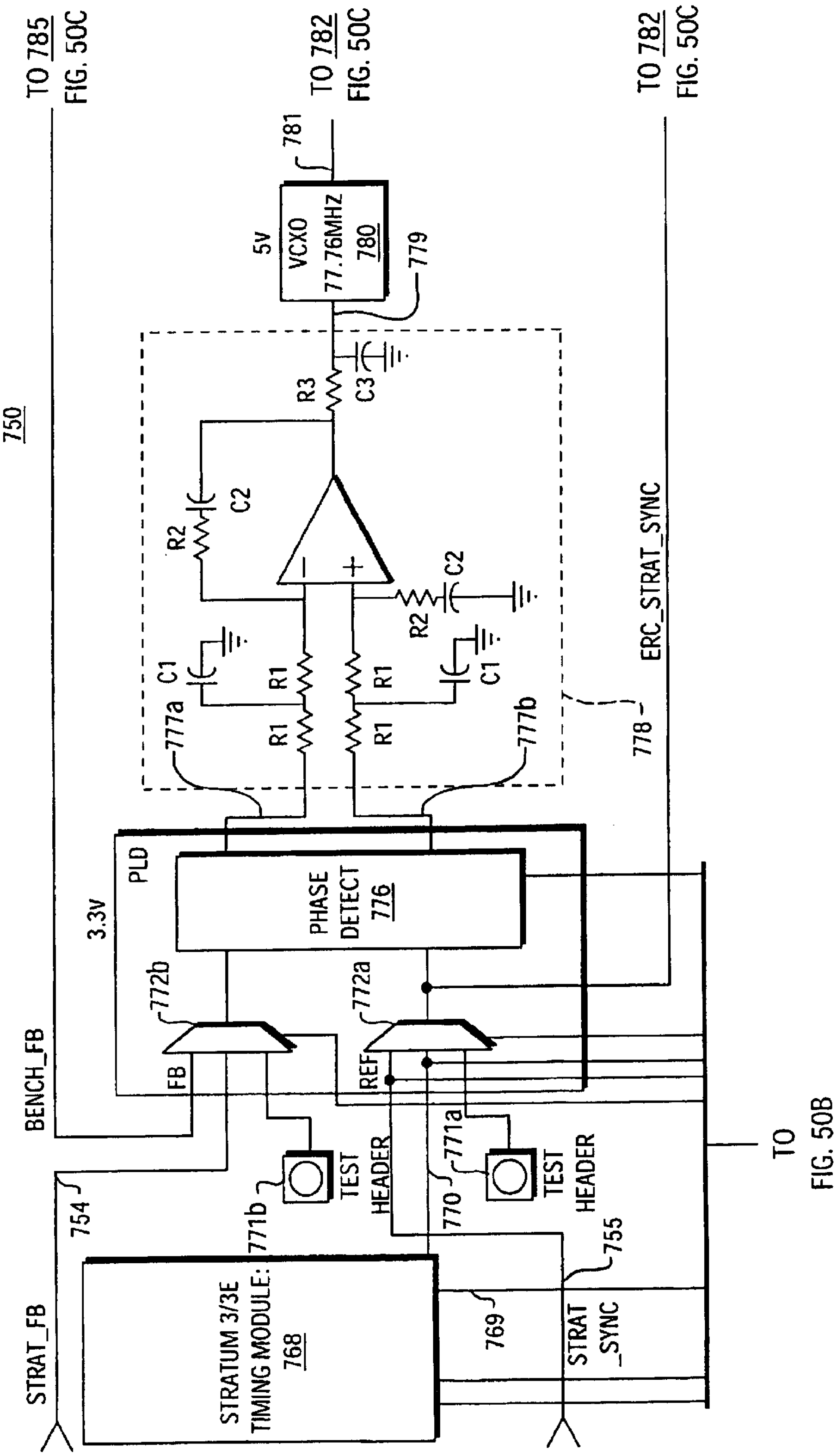
FIG. 50 is a block diagram of an external central timing subsystem.
Figure 50B:
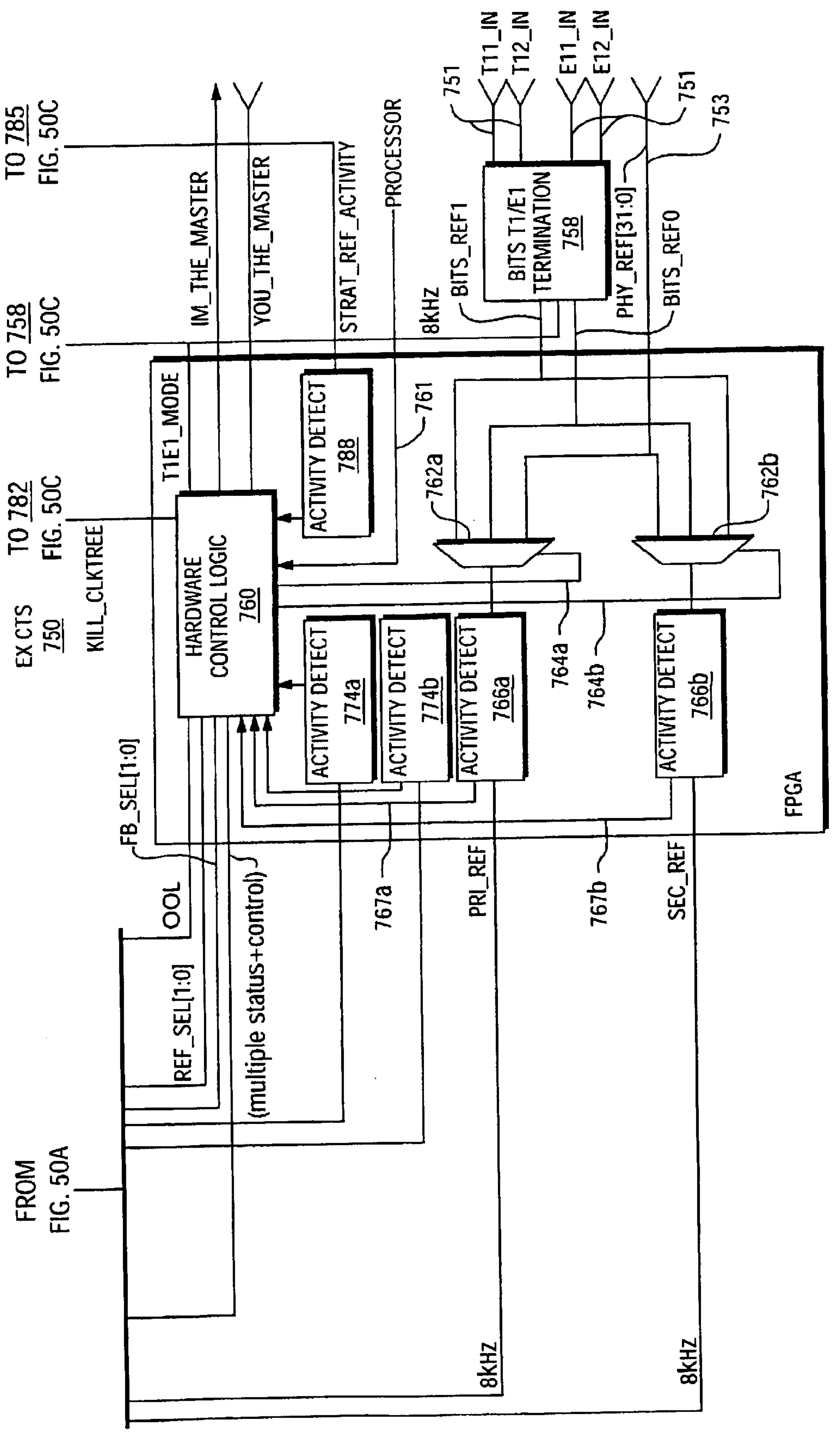
Figure 50C:
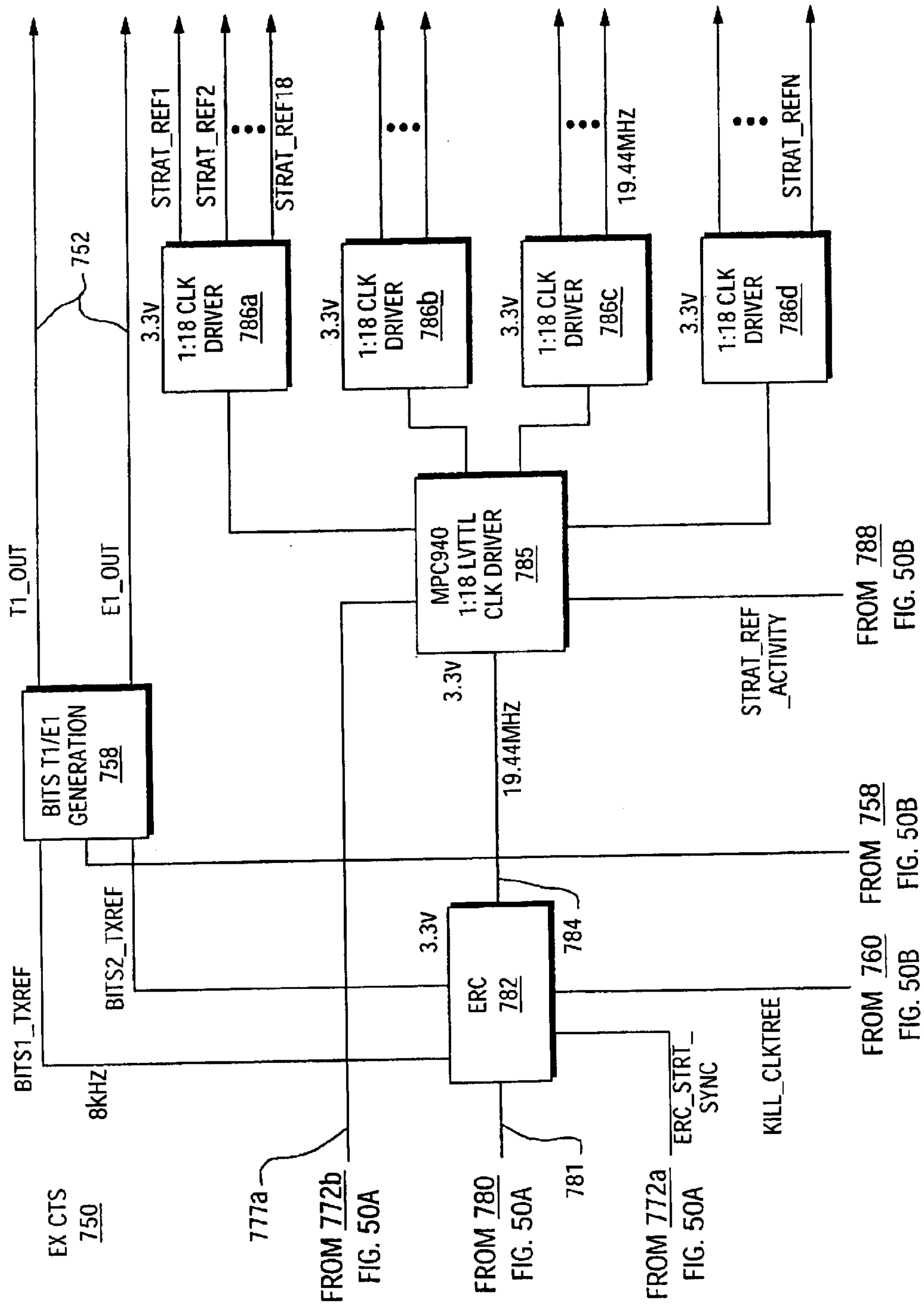

Referring to FIG. 50, EX CTS 750 includes a T1/E1 framer/LIU 758 for receiving and terminating BITS signals 751 and for generating and sending BITS signals 752. Although T1/E1 framer is shown in two separate boxes in FIG. 50, it is for convenience only and may be the same circuit or component. In one embodiment, two 5431 T1/E1 Framer Line Interface Units (LIU) available from PMC-Sierra are used. The T1/E1 framer supplies 8 KHz BITS_REF0 and BITS_REF1 signals and receives 8 KHz BITS1_TXREF and BITS2_TXREF signals. A network administrator notifies NMS 60 (FIG. 35) as to whether the BITS signals are T1 or E1, and the NMS notifies software running on the network device. Through signals 761 from a local processor, hardware control logic 760 within the EX CTS is configured for T1 or E1 and sends an T1E1_MODE signal to the T1/E1 framer indicating T1 or E1 mode. The T1/E1 framer then forwards BITS_REF0 and BITS_REF1 to dual MUXs 762*a* and 762*b*.

Port timing signals 753 are also sent to dual MUXs 762*a* and 762*b*. The network administrator also notifies the NMS as to which timing reference signals should be used, the BITS lines or the port timing signals. The NMS again notifies software running on the network device and through signals 761, the local processor configures the hardware control logic. The hardware control logic then uses select signals 764*a* and 764*b* to select the appropriate output signals from the dual MUXs.

Activity detectors 766*a* and 766*b* provide status signals 767*a* and 767*b* to the hardware control logic indicating whether the PRI_REF signal and the SEC_REF signal are active or inactive (i.e., stuck at 1 or 0). The PRI_REF and SEC_REF signals are sent to a stratum 3 or stratum 3E timing module 768. Timing module 768 includes an internal MUX for selecting between the PRI_REF and SEC_REF signals, and the timing module receives control and status signals 769 from the hardware control logic indicating whether PRI_REF or SEC_REF should be used. If one of the activity detectors 766*a* or 766*b* indicates an inactive status to the hardware control logic, then the hardware control logic sends appropriate information over control and status signals 769 to cause the timing module to select the active one of PRI_REF or SEC_REF.

The timing module also includes an internal phase locked loop (PLL) circuit and an internal stratum 3 or 3E oscillator. The timing module synchronizes its output signal 770 to the selected input signal (PRI_REF or SEC_REF). The timing module may be an MSTM-S3 available from Conner-Winfield or an ATIMe-s or ATIMe-3E available from TF systems. The hardware control logic, activity detectors and dual MUXs may be implemented in an FPGA. The timing module also includes a Free-run mode and a Hold-Over mode. When there is no input signal to synchronize to, the timing module enter a free-run mode and uses the internal oscillator to generate a clock output signal. If the signal being synchronized to is lost, then the timing module enters a hold-over mode and maintains the frequency of the last known clock output signal for a period of time.

The EX CTS 750 also receives an external timing reference signal from the other EX CTS on STRAT_SYNC 755 (one of STRAT_REF1-STRAT_REFN from the other EX CTS). STRAT_SYNC and output 770 from the timing module are sent to a MUX 772*a*. REF_SEL(1:0) selection signals are sent from the hardware control logic to MUX 772*a* to select STRAT_SYNC when the EX CTS is the slave and output 770 when the EX CTS is the master. When in a test mode, the hardware control logic may also select a test input from a test header 771*a*.

An activity detector 774*a* monitors the status of output 770 from the timing module and provides a status signal to the hardware control logic. Similarly, an activity detector 774*b* monitors the status of STRAT_SYNC and provides a status signal to the hardware control logic. When the EX CTS is master, if the hardware control logic receives an inactive status from activity detector 774*a,* then the hardware control logic automatically changes the REF_SEL signals to select STRAT_SYNC forcing the EX CTS to switch over and become the slave. When the EX CTS is slave, if the hardware control logic receives an inactive status from activity detector 774*b,* then the hardware control logic may automatically change the REF_SEL signals to select output 770 from the timing module forcing the EX CTS to switch over and become master.

A MUX 772*b* receives feedback signals from the EX CTS itself. BENCH_FB is an external timing reference signal from the EX CTS that is routed back to the MUX on the local printed circuit board. STRAT_FB 754 is an external timing reference signal from the EX CTS (one of STRAT_REF1-STRAT_REFN) that is routed onto the mid-plane(s) and back onto the local printed circuit board such that is most closely resembles the external timing reference signals sent to the EX LTSs and the other EX CTS in order to minimize skew. The hardware control logic sends FB_SEL (1:0) signals to MUX 772*b* to select STRAT_FB in regular use or BENCH_FB or an input from a test header 771*b* in test mode.

The outputs of both MUX 772*a* and 772*b* are provided to a phase detector 776. The phase detector compares the rising edge of the two input signals to determine the magnitude of any phase shift between the two. The phase detector then generates variable voltage pulses on outputs 777*a* and 777*b* representing the magnitude of the phase shift. The phase detector outputs are used by discrete logic circuit 778 to generate a voltage on signal 779 representing the magnitude of the phase shift. The voltage is used to speed up or slow down (i.e., change the phase of) a VCXO 780 to allow the output signal 781 to track any phase change in the external timing reference signal received from the other EX CTS (i.e., STRAT_SYNC) or to allow the output signal 781 to track any phase change in the output signal 770 from the timing module. The discrete logic components implement a filter that determines how quickly or slowly the VCXO's output tracks the change in phase detected on the reference signal.

The phase detector circuit may be implemented in a programmable logic device (PLD).

The output 781 of the VCXO is sent to an External Reference Clock (ERC) circuit 782 which may also be implemented in a PLD. ERC_STRAT_SYNC is also sent to ERC 782 from the output of MUX 772*a*. When the EX CTS is the master, the ERC circuit generates the external timing reference signal 784 with an embedded processor timing reference signal, as described below, based on the output signal 781 and synchronous with ERC_STRAT_SYNC (corresponding to timing module output 770). When the EX CTS is the slave, the ERC generates the external timing reference signal 784 based on the output signal 781 and synchronous with ERC_STRAT_SYNC (corresponding to STRAT_SYNC 755 from the other EX CTS).

External reference signal 784 is then sent to a first level clock driver 785 and from there to second level clock drivers 786*a*–786*d* which provide external timing reference signals (STRAT_REF1-STRAT_REFN) that are distributed across the mid-plane(s) to EX LTSs on the other network device cards and the EX LTS on the same network device card, the other EX CTS and the EX CTS itself. The ERC circuit also generates BITS1_TXREF and BITS2_TXREF signals that are provided to BITS T1/E1 framer 758.

The hardware control logic also includes an activity detector 788 that receives STRAT_REF_ACTIVITY from clock driver 785. Activity detector 788 sends a status signal to the hardware control logic, and if the status indicates that STRAT_REF_ACTIVITY is inactive, then the hardware control logic asserts KILL_CLKTREE. Whenever KILL_CLKTREE is asserted, the activity detector 774*b* in the other EX CTS detects inactivity on STRAT_SYNC and may become the master by selecting the output of the timing module as the input to MUX 772*a.*

Similar to hardware control logic 684 (FIG. 45) within the switch fabric CTS, hardware control logic 760 within the EX CTS implements a state machine (similar to the state machine shown in FIG. 46) based on IM_THE_MASTER and YOU_THE_MASTER signals sent between the two EX CTSs and also on slot identification signals (not shown).

In one embodiment, ports (e.g., 571*a*–571*n,* FIG. 49) on network device 540 are connected to external optical fibers carrying signals in accordance with the synchronous optical network (SONET) protocol and the external timing reference signal is a 19.44 MHz signal that may be used as the SONET transmit reference clock. This signal may also be divided down to provide an 8 KHz SONET framing pulse (i.e., J0FP) or multiplied up to provide higher frequency signals. For example, four times 19.44 MHz is 77.76 MHz which is the base frequency for a SONET OC1 stream, two times 77.76 MHz provides the base frequency for an OC3 stream and eight times 77.76 MHz provides the base frequency for an OC12 stream.

In one embodiment, the embedded processor timing reference signal within the 19.44 MHz external timing reference signal is 8 KHz. Since the processor timing reference signal and the SONET framing pulse are both 8 KHz, the embedded processor timing reference signal may used to supply both. In addition, the embedded processor timing reference signal may also be used to supply BITS1_TXREF and BITS2_TXREF signals to BITS T1/E1 framer 758.

Figure 51:
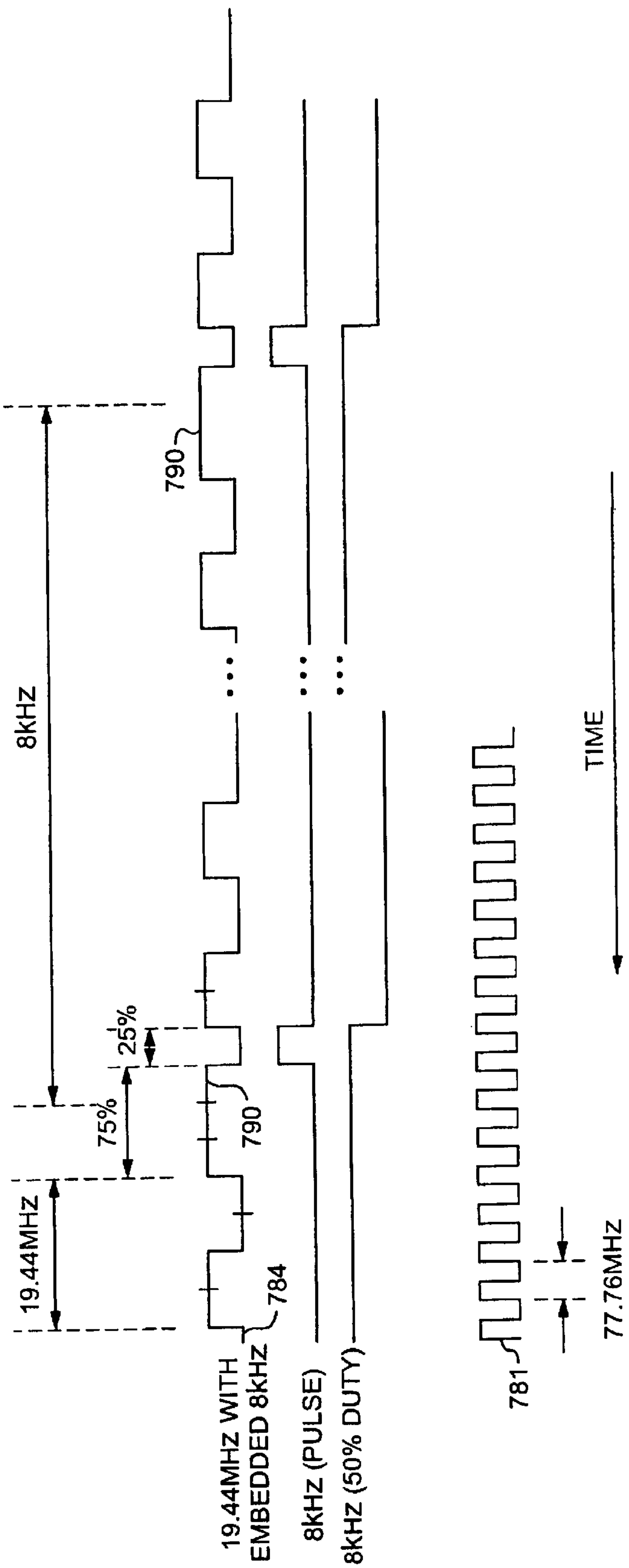
FIG. 51 is a timing diagram of a first timing reference signal with an embedded second timing signal.

Referring to FIG. 51, the 19.44 MHz external reference timing signal with embedded 8 KHz processor timing reference signal from ERC 782 (i.e., output signal 784) includes a duty-cycle distortion 790 every 125 microseconds (us) representing the embedded 8 KHz signal. In this embodiment, VCXO 780 is a 77.76 MHz VCXO providing a 77.76 MHz clock output signal 781. The ERC uses VCXO output signal 781 to generate output signal 784 as described in more detail below. Basically, every 125 us, the ERC holds the output signal 784 high for one extra 77.76 MHz clock cycle to create a 75%/25% duty cycle in output signal 784. This duty cycle distortion is used by the EX LTSs and EX CTSs to extract the 8 KHz signal from output signal 784, and since the EX LTS's use only the rising edge of the 19.44 MHz signal to synchronize local external timing signals, the duty cycle distortion does not affect that synchronization.

External Reference Clock (ERC) Circuit

Figure 52:
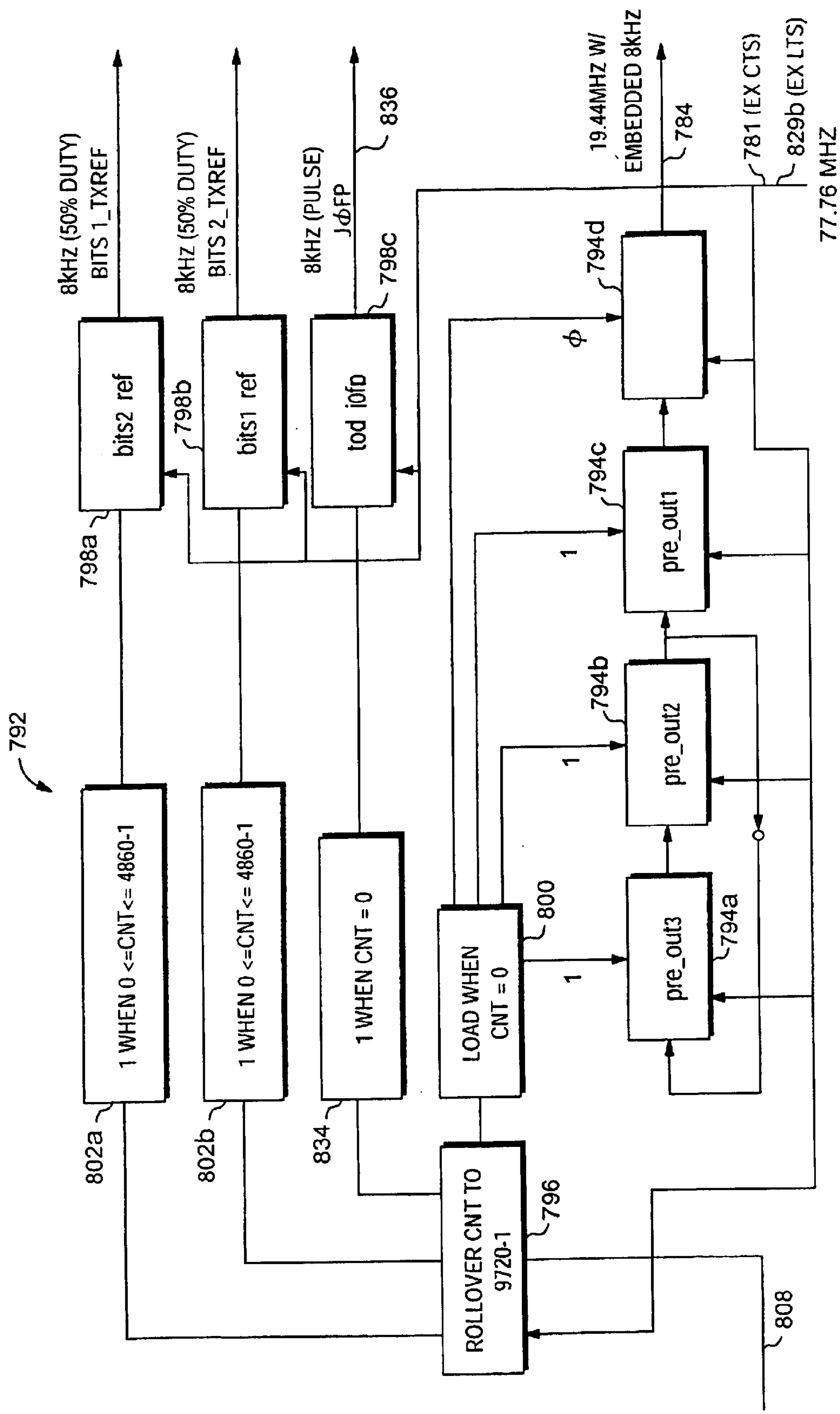
FIG. 52 is a block diagram of an embeddor circuit.

Referring to FIG. 52, an embeddor circuit 792 within the ERC receives VCXO output signal 781 (77.76 MHz) at four embedding registers 794*a*–794*d,* a 9720–1 rollover counter 796 and three 8 KHz output registers 798*a*–798*b*. Each embedding register passes its value (logic 1 or 0) to the next embedding register, and embedding register 794*d* provides ERC output signal 784 (19.44 MHz external timing reference signal with embedded 8 KHz processor timing reference signal). The output of embedding register 794*b* is also inverted and provided as an input to embedding register 794*a*. When running, therefore, the embedding registers maintain a repetitive output 784 of a high for two 77.76 MHz clock pulses and then low for two 77.76 MHz which provides a 19.44 MHz signal. Rollover counter 796 and a load circuit 800 are used to embed the 8 KHz signal. The rollover counter increments on each 77.76 MHz clock tick and at 9720–1 (9720–1 times 77.76 MHz=8 KHz), the counter rolls over to zero. Load circuit 800 detects when the counter value is zero and loads a logic 1 into embedding registers 794*a,* 794*b* and 794*c* and a logic zero into embedding register 794*d.* As a result, the output of embedding register 794*d* is held high for three 77.76 MHz clock pulses (since logic ones are loaded into three embedding registers) which forces the duty cycle distortion into the 19.44 MHz output signal 784.

BITS circuits 802*a* and 802*b* also monitor the value of the rollover counter. While the value is less than or equal to 4860–1 (half of 8 KHz), the BITS circuits provide a logic one to 8 KHz output registers 798*a* and 798*b,* respectively. When the value changes to 4860, the BITS circuits toggle from a logic one to a logic zero and continue to send a logic zero to 8 KHz output registers 798*a* and 798*b,* respectively, until the rollover counter rolls over. As a result, 8 KHz output registers 798*a* and 798*b* provide 8 KHz signals with a 50% duty cycle on BITS1_TXREF and BITS2_TXREF to the BITS T1/E1 framer.

As long as a clock signal is received over signal 781 (77.76 MHz), rollover counter 796 continues to count causing BITS circuits 802*a* and 802*b* to continue toggling 8 KHz registers 798*a* and 798*b* and causing load circuit 800 to continue to load logic 1110 into the embedding registers every 8 KHz. As a result, the embedding registers will continue to provide a 19 MHz clock signal with an embedded 8 KHz signal on line 784. This is often referred to as "fly wheeling."

Figure 53:
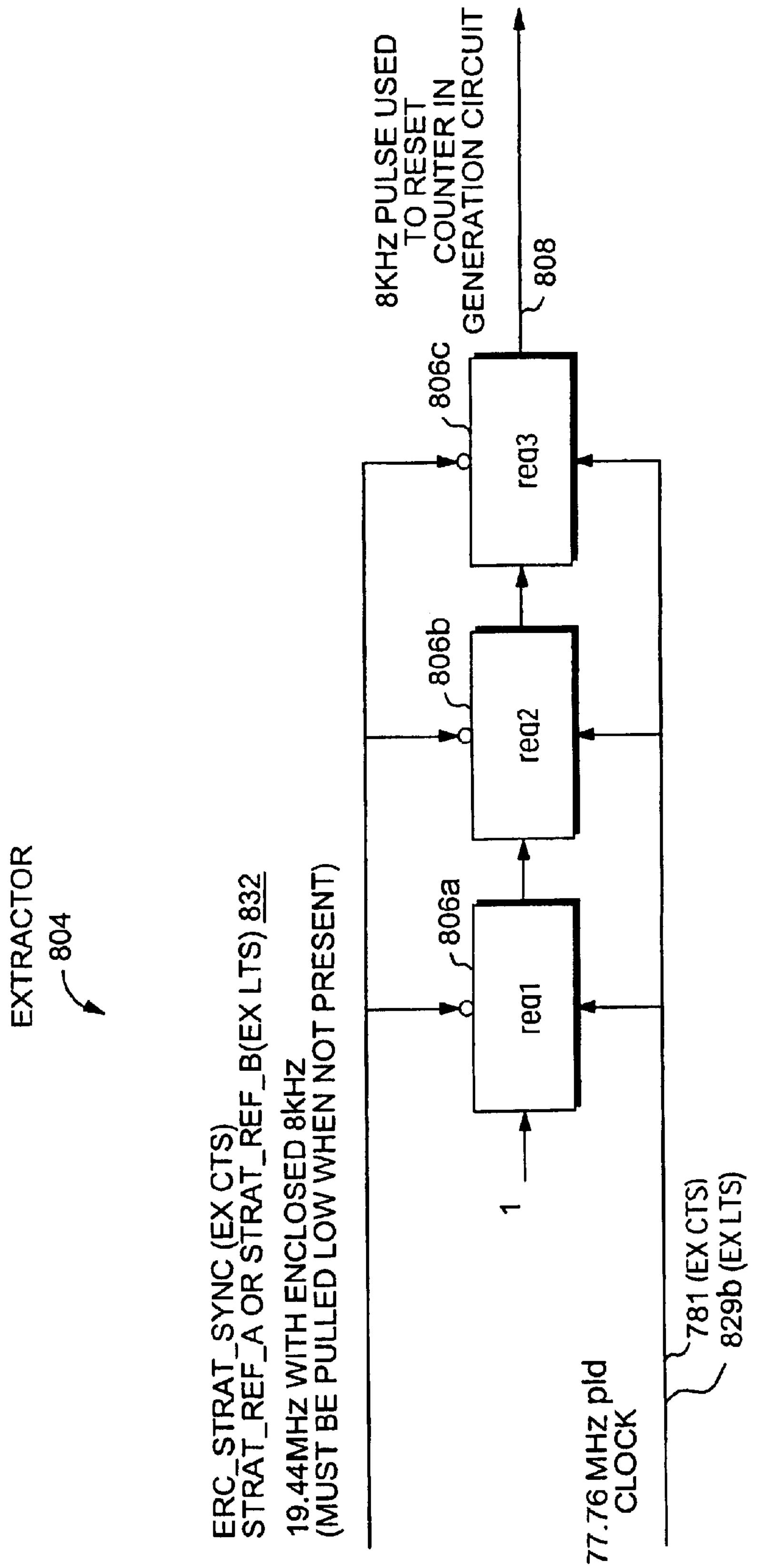
FIG. 53 is a block diagram of an extractor circuit.

Referring to FIG. 53, an extractor circuit 804 within the ERC is used to extract the embedded 8 KHz signal from ERC_STRAT_SYNC. When the EX CTS is the master, ERC_STRAT_SYNC corresponds to the output signal 770 from the timing module 768 (pure 19.44 MHz), and thus, no embedded 8 KHz signal is extracted. When the EX CTS is the slave, ERC_STRAT_SYNC corresponds to the external timing reference signal provided by the other EX CTS (i.e., STRAT_SYNC 755; 19.44 MHz with embedded 8 KHz) and the embedded 8 KHz signal is extracted. The extractor circuit includes three extractor registers 806*a*–806*c*. Each extractor register is connected to the 77.76 MHz VCXO output signal 781, and on each clock pulse, extractor register 806*a* receives a logic one input and passes its value to extractor register 806*b* which passes its value to extractor register 806*c* which provides an 8 KHz pulse 808. The extractor registers are also connected to ERC_SRAT_SYNC which provides an asynchronous reset to the extractor registers—that is, when ERC_STRAT_SYNC is logic zero, the registers are reset to zero. Every two 77.76 MHz clock pulses, therefore, the extractor registers are reset and for most cycles, extractor register 806*c* passes a logic zero to output signal 808. However, when the EX CTS is the slave, every 8 KHz ERC_STRAT_SYNC remains a logic one for three 77.76 MHz clock pulses allowing a logic one to be passed through each register and onto output signal 808 to provide an 8 KHz pulse.

8 KHz output signal 808 is passed to extractor circuit 804 and used to reset the rollover counter to synchronize the rollover counter to the embedded 8 KHz signal within ERC_STRAT_SYNC when the EX CTS is the slave. As a result, the 8 KHz embedded signal generated by both EX CTSs are synchronized.

External Local Timing Subsystem (EX LTS)

Figure 54A:
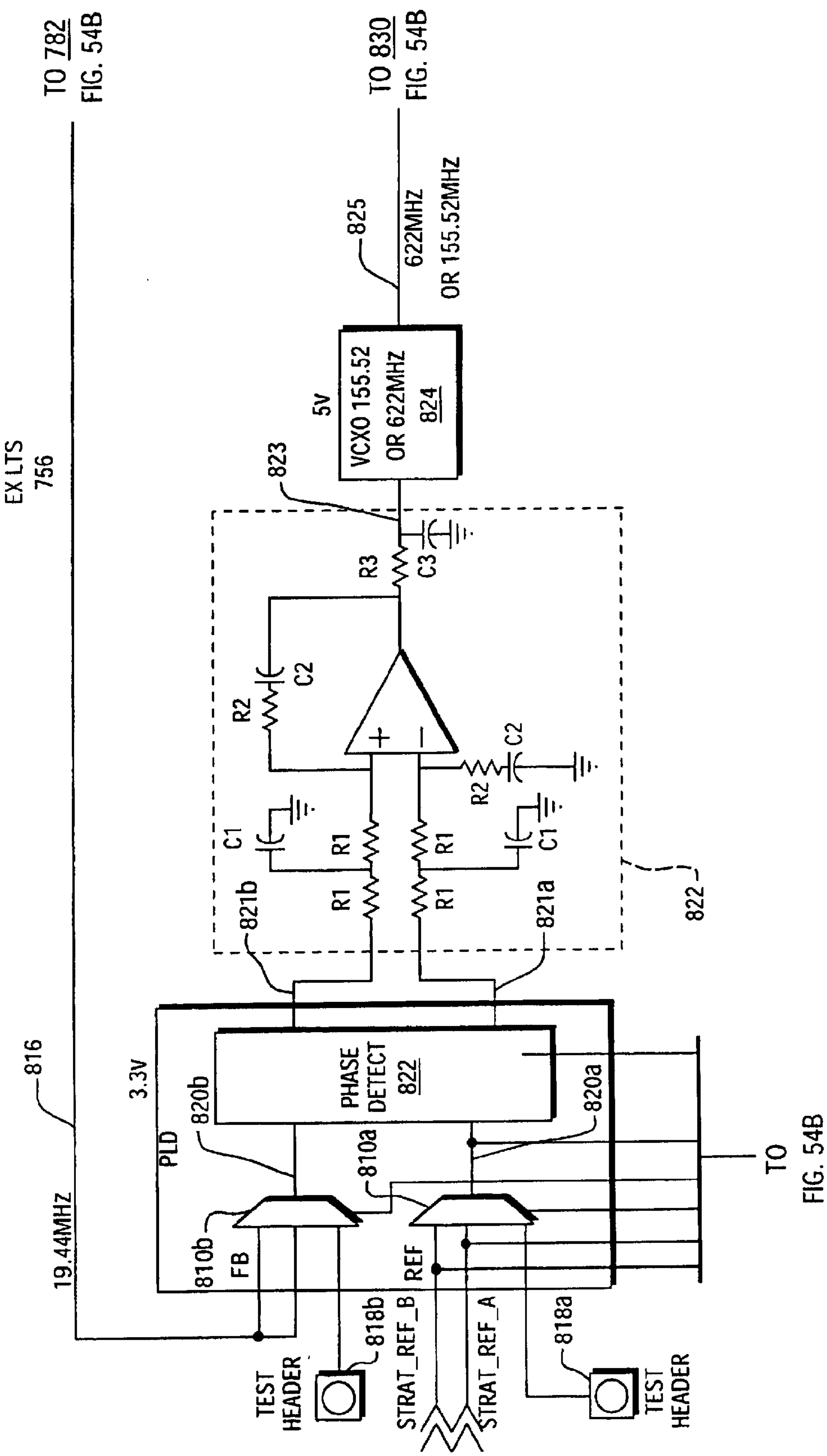
FIG. 54 is a block diagram of an external local timing subsystem.
Figure 54B:
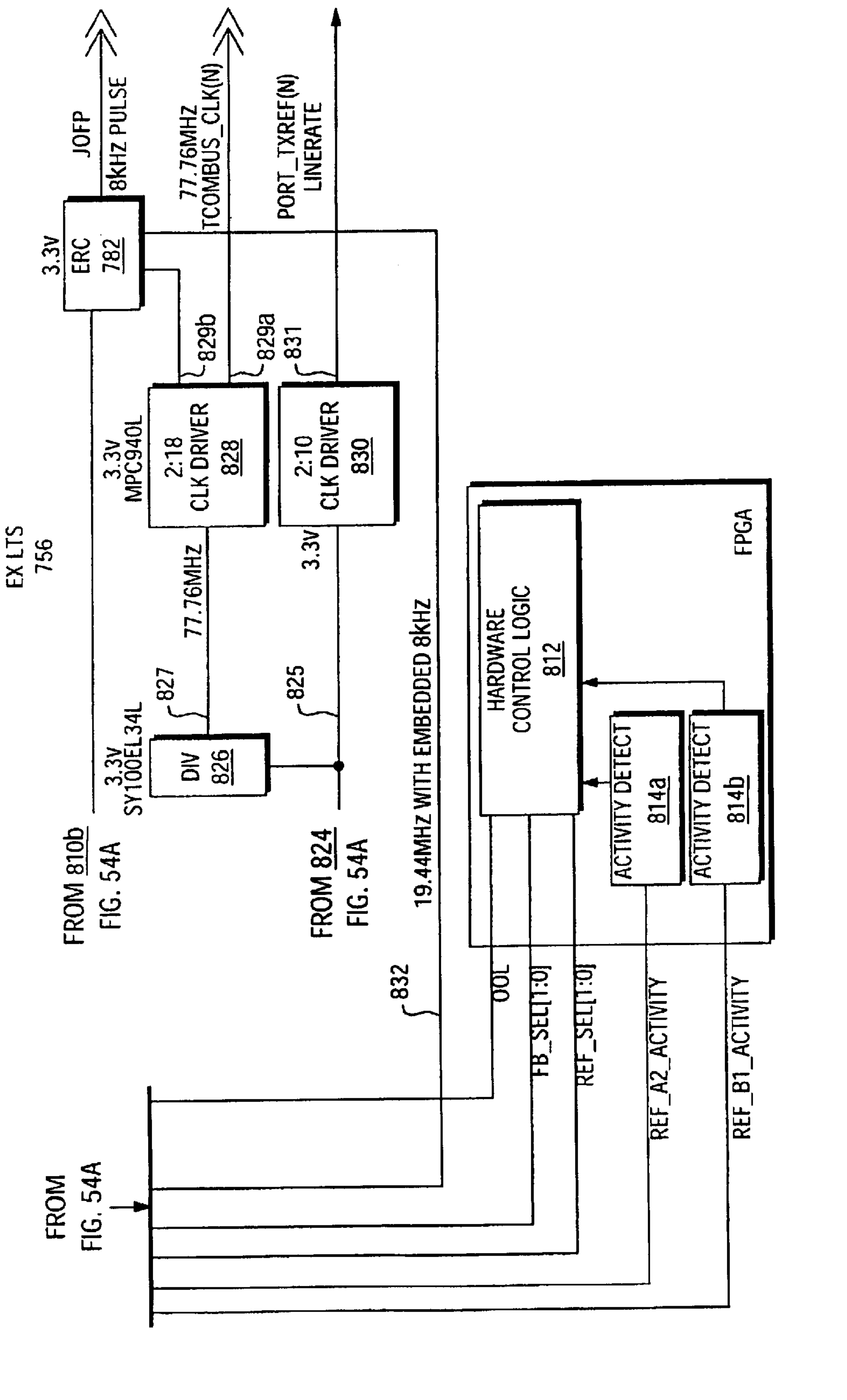

Referring to FIG. 54, EX LTS 756 receives STRAT_REF_B from one EX CTS and STRAT_REF_A from the other EX CTS. STRAT_REF_B and STRAT_REF_A correspond to one of STRAT_REF1-STRAT_REFN (FIG. 50) output from each EX CTS. STRAT_REF_B and STRAT_REF_A are provided as inputs to a MUX 810*a* and a hardware control logic 812 within the EX LTS selects the input to MUX 810*a* using REF_SEL (1:0) signals. An activity detector 814*a* monitors the activity of STRAT_REF_A and sends a signal to hardware control logic 812 if it detects an inactive signal (i.e., stuck at logic one or zero). Similarly, an activity detector 814*b* monitors the activity of STRAT_REF_B and sends a signal to hardware control logic 812 if it detects an inactive signal (i.e., stuck at logic one or zero). If the hardware control logic receives a signal from either activity detector indicating that the monitored signal is inactive, the hardware control logic automatically changes the REF_SEL (1:0) signals to cause MUX 810*a* to select the other input signal and send an interrupt to the local processor.

A second MUX 810*b* receives a feed back signal 816 from the EX LTS itself. Hardware control logic 812 uses FB_SEL(1:0) to select either a feedback signal input to MUX 810*b* or a test header 818*b* input to MUX 810*b.* The test header input is only used in a test mode. In regular use, feedback signal 816 is selected. Similarly, in a test mode, the hardware control logic may use REF_SEL(1:0) to select a test header 818*a* input to MUX 810*a.*

Output signals 820*a* and 820*b* from MUXs 810*a* and 810*b,* respectively, are provided to phase detector 822. The phase detector compares the rising edge of the two input signals to determine the magnitude of any phase shift between the two. The phase detector then generates variable voltage pulses on outputs 821*a* and 821*b* representing the magnitude of the phase shift. The phase detector outputs are used by discrete logic circuit 822 to generate a voltage on signal 823 representing the magnitude of the phase shift. The voltage is used to speed up or slow down (i.e., change the phase of) of an output 825 of a VCXO 824 to track any phase change in STRAT_REF_A or STRAT_REF_B. The discrete logic components implement filters that determine how quickly or slowly the VCXO's output will track the change in phase detected on the reference signal.

In one embodiment, the VCXO is a 155.51 MHz or a 622 MHz VCXO. This value is dependent upon the clock speeds required by components, outside the EX LTS but on the local card, that are responsible for transferring network data over the optical fibers in accordance with the SONET protocol. On at least the universal port card, the VCXO output 825 signal is sent to a clock driver 830 for providing local data transfer components with a 622 MHz or 155.52 MHz clock signal 831.

The VCXO output 825 is also sent to a divider chip 826 for dividing the signal down and outputting a 77.76 MHz output signal 827 to a clock driver chip 828. Clock driver chip 828 provides 77.76 MHz output signals 829*a* for use by components on the local printed circuit board and provides 77.76 MHz output signal 829*b* to ERC circuit 782. The ERC circuit also receives input signal 832 corresponding to the EX LTS selected input signal either STRAT_REF_B or STRAT_REF_A. As shown, the same ERC circuit that is used in the EX CTS may be used in the EX LTS to extract an 8 KHz J0FP pulse for use by data transfer components on the local printed circuit board. Alternatively, the ERC circuit could include only a portion of the logic in ERC circuit 782 on the EX CTS.

Similar to hardware control logic 712 (FIG. 47) within the switch fabric LTS, hardware control logic 812 within the EX LTS implements a state machine (similar to the state machine shown in FIG. 48) based on signals from activity detectors 814*a* and 814*b*.

External Reference Clock (ERC) Circuit

Referring again to FIGS. 52 and 53, when the ERC circuit is within an EX LTS circuit, the inputs to extractor circuit 804 are input signal 832 corresponding to the LTS selected input signal either STRAT REF_B or STRAT_REF_A and 77.76 MHz clock input signal 829*b*. The extracted 8 KHz pulse 808 is again provided to embeddor circuit 792 and used to reset rollover counter 796 in order to synchronize the counter with the embedded 8 KHz signal with STRAT_REF_A or STRAT_REF_B. Because the EX CTSs that provide STRAT_REF_A and STRAT_REF_B are synchronous, the embedded 8 KHz signals within both signals are also synchronous. Within the EX LTS, the embedding registers 794*a*–794*d* and BITS registers 798*a* and 798*b* are not used. Instead, a circuit 834 monitors the value of the rollover counter and when the rollover counter rolls over to a value of zero, circuit 834 sends a logic one to 8 KHz register 798*c* which provides an 8 KHz pulse signal 836 that may be sent by the LTS to local data transfer components (i.e., J0FP) and processor components as a local processor timing signal.

Again, as long as a clock signal is received over signal 829*b* (77.76 MHz), rollover counter 796 continues to count causing circuit 834 to continue pulsing 8 KHz register 798*c*.

External Central Timing Subsystem (EX CTS) Alternate Embodiment

Figure 55A:
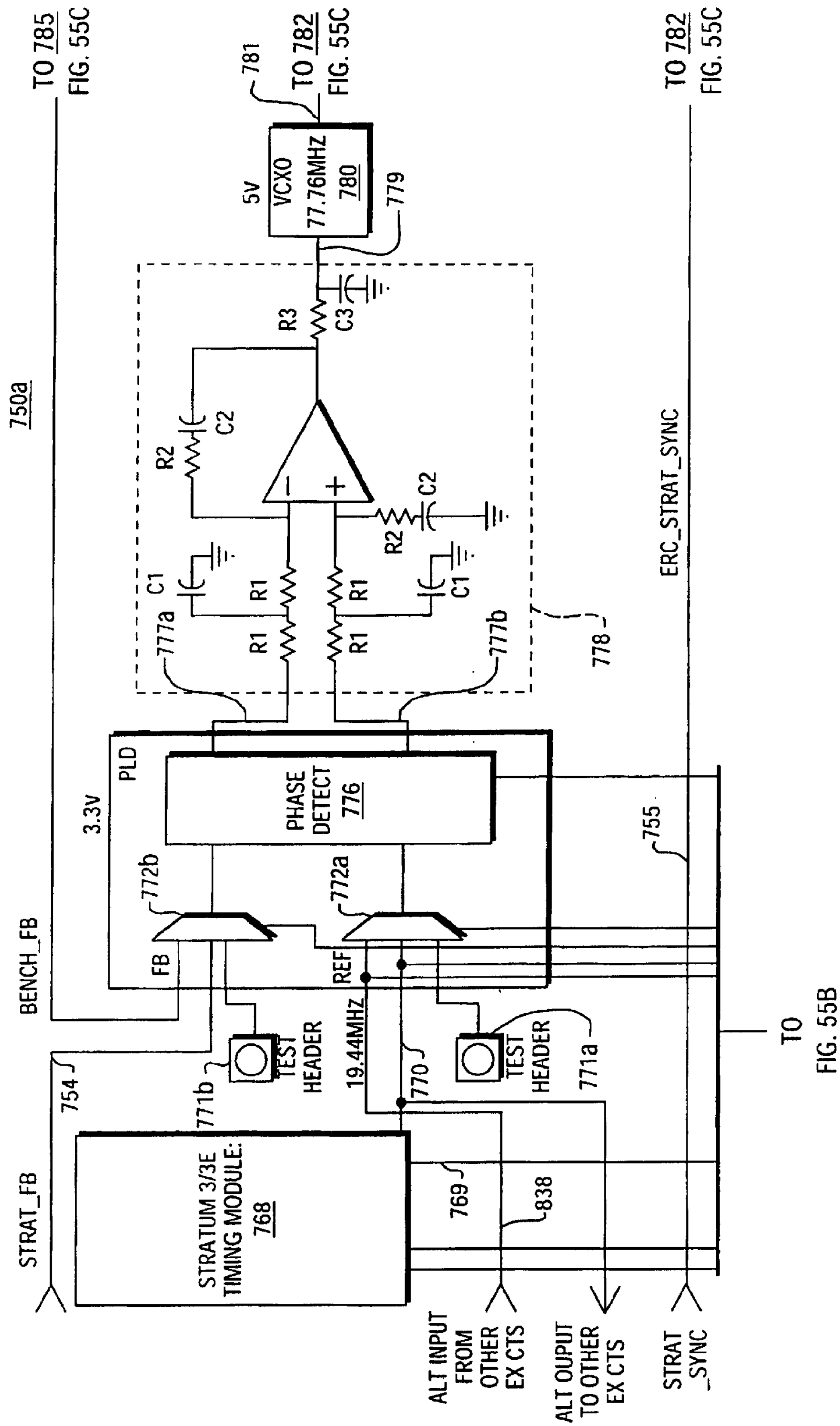
FIG. 55 is a block diagram of an external central timing subsystem.
Figure 55B:
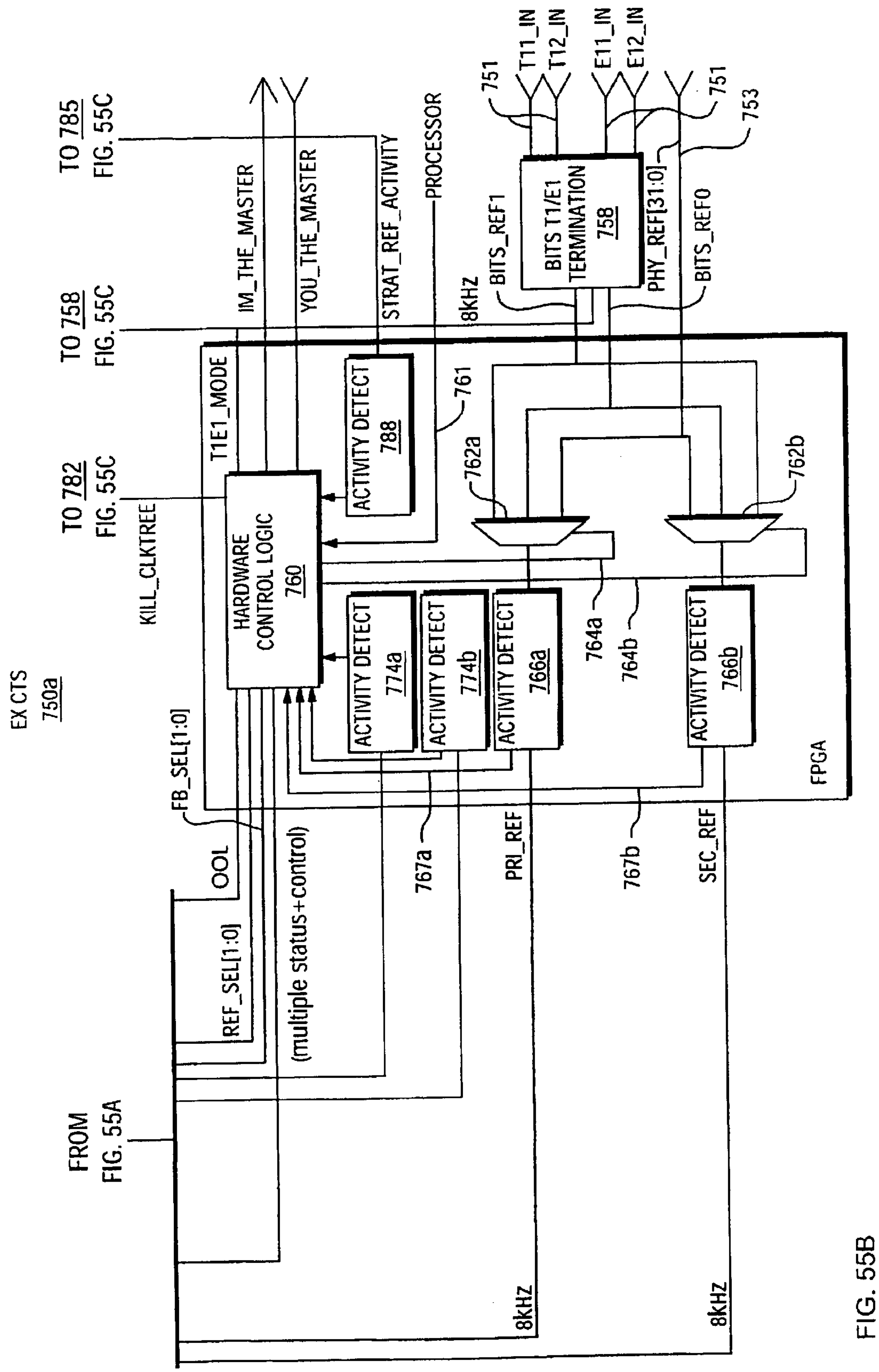
Figure 55C:
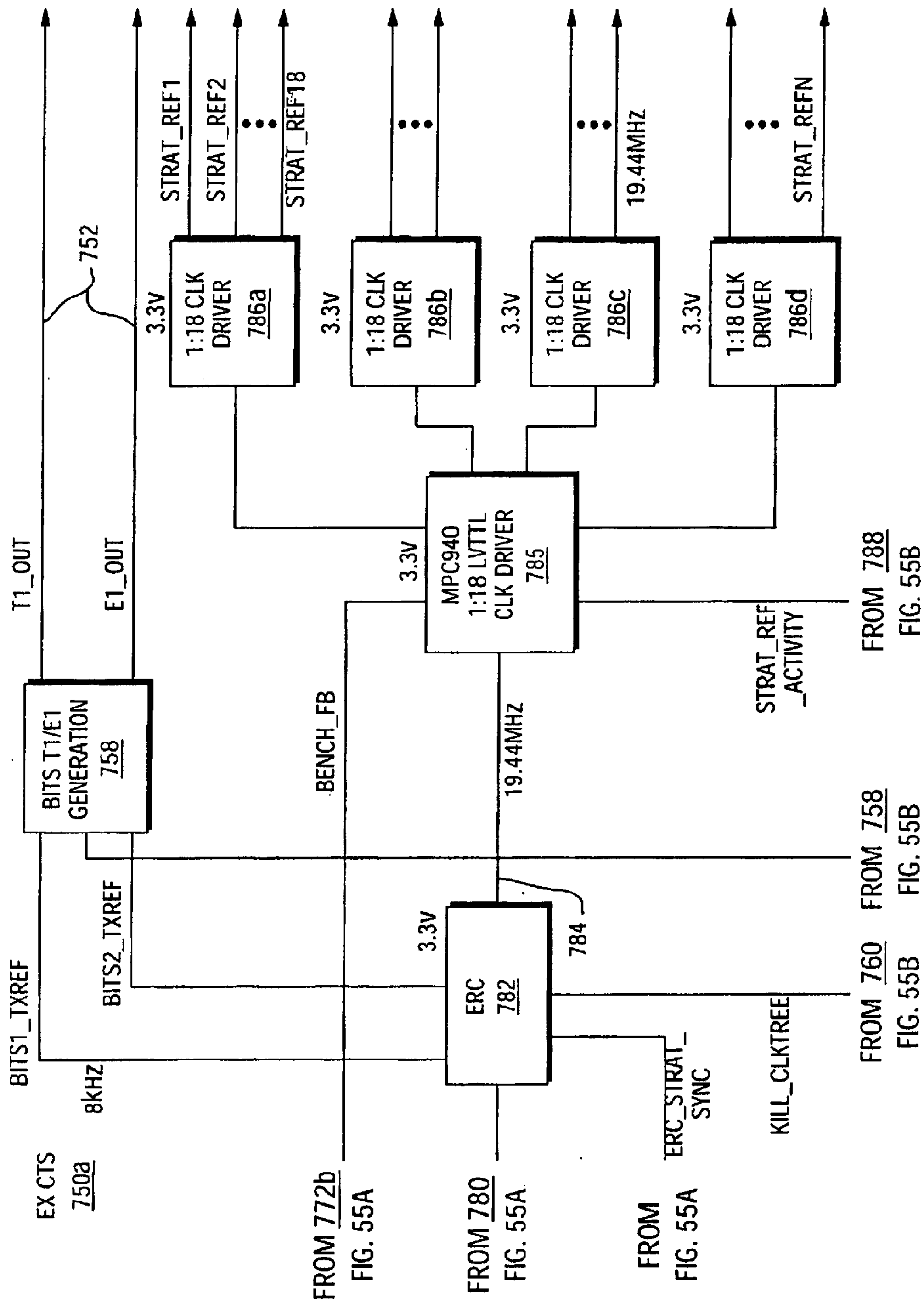

Referring to FIG. 55, instead of using one of the STRAT_REF1-STRAT_REFN signals from the other EX CTS as an input to MUX 772*a*, the output 770 (marked "Alt. Output to other EX CTS") of timing module 768 may be provided to the other EX CTS and received as input 838 (marked "Alt. Input from other EX CTS"). The PLL circuit, including MUXs 772*a* and 772*b*, phase detector 776, discrete logic circuit 778 and VCXO 780, is necessary to synchronize the output of the VCXO with either output 770 of the timing module or a signal from the other EX CTS. However, PLL circuits may introduce jitter into their output signals (e.g., output 781), and passing the PLL output signal 781 via one of the STRAT_REF1-STRAT_REFN signals from one EX CTS into the PLL of the other EX CTS—that is, PLL to PLL—may introduce additional jitter into output signal 781. Since accurate timing signals are critical for proper data transfer with other network devices and SONET standards specifically set maximum allowable jitter transmission at interfaces (Bellcore GR-253-CORE and SONET Transport Systems Common Carrier Criteria), jitter should be minimized. Passing the output 770 of the timing module within the EX CTS to the input 838 of the other EX CTS avoids passing the output of one PLL to the input of the second PLL and thereby reduces the potential introduction of jitter.

It is still necessary to send one of the STRAT_REF1-STRAT_REFN signals to the other EX CTS (received as STRAT_SYNC 755) in order to provide ERC 782 with a 19.44 MHz signal with an embedded 8 KHz clock for use when the EX CTS is a slave. The ERC circuit only uses ERC_STRAT_SYNC in this instance when the EX CTS is the slave.

Layer One Test Port

The present invention provides programmable physical layer (i.e., layer one) test ports within an upper layer network device (e.g., network device 540, FIG. 35). The test ports may be connected to external test equipment (e.g., an analyzer) to passively monitor data being received by and transmitted from the network device or to actively drive data to the network device. Importantly, data provided at a test port accurately reflects data received by or transmitted by the network device with minimal modification and no upper layer translation or processing. Moreover, data is supplied to the test ports without disrupting or slowing the service provided by the network device.

Referring to FIGS. 35 and 36, network device 540 includes at least one cross-connection card 562*a*–562*b*, 564*a*–564*b*, 566*a*–566*b*, 568*a*–568*b*, at least one universal port card 554*a*–554*h*, 556*a*–556*h*, 558*a*–558*h*, 560*a*–560*h*, and at least one forwarding card 546*a*–546*e*, 548*a*–548*e*, 550*a*–550*e*, 552*a*–552*e*. Each port card includes at least one port 571*a*–571*n* for connecting to external physical network attachments 576*a*–576*b*, and each port card transfers data to a cross-connection card. The cross-connection card transfers data between port cards and forwarding cards and between port cards. In one embodiment, each forwarding card includes at least one port/payload extractor 582*a*–582*n* for receiving data from the cross-connection cards.

Figure 56:
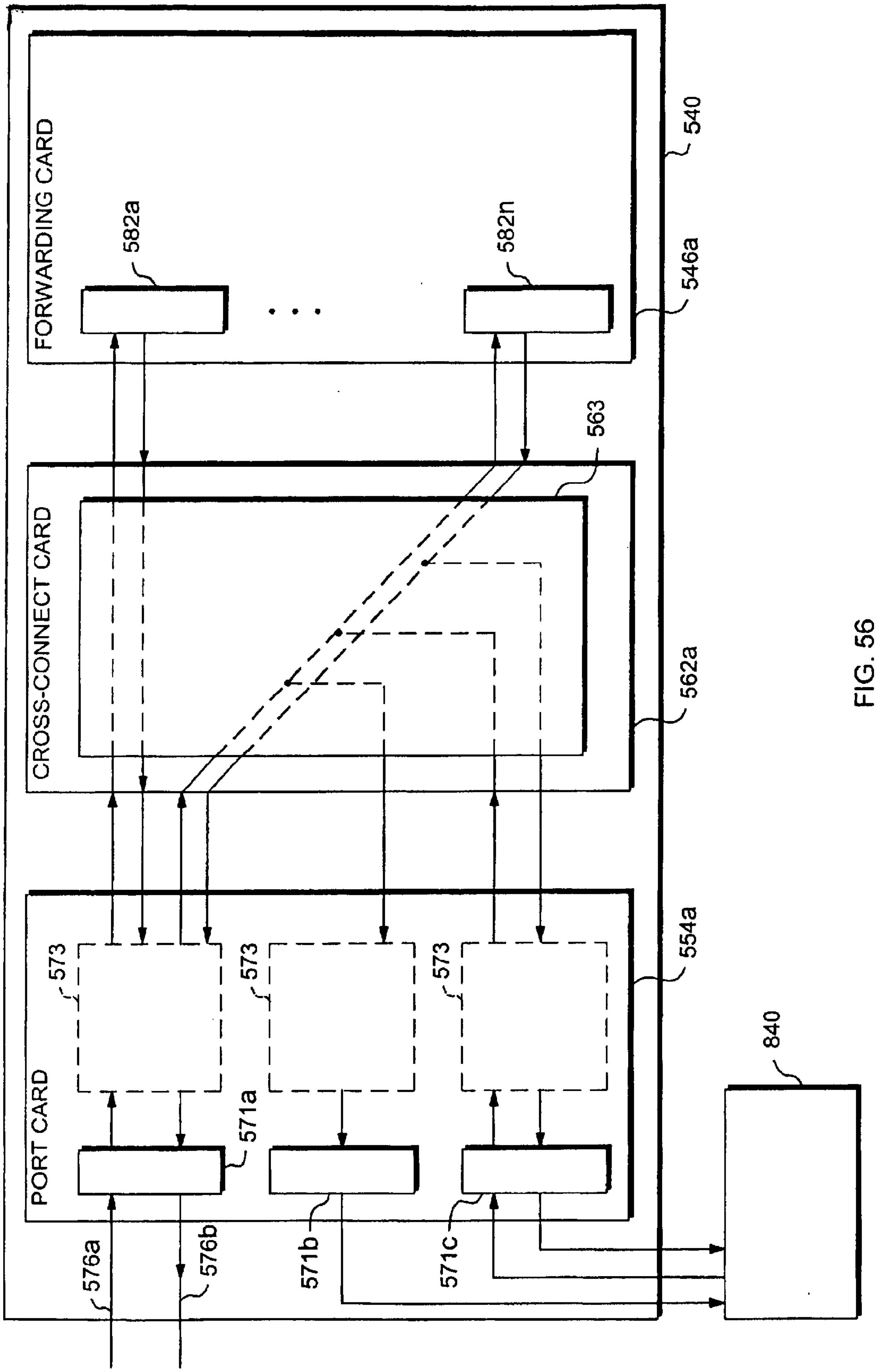
FIG. 56 is a block diagram of a network device connected to test equipment through programmable physical layer test ports.

Referring to FIG. 56, a port 571*a* on a port card 554*a* within network device 540 may be connected to another network device (not shown) through physical external network attachments 576*a* and 576*b*. As described above, components 573 on the port card transfer data between port 571*a* and cross-connection card 562*a*, and components 563 on the cross-connection card transfer data on particular paths between the port cards and the forwarding cards or between port cards. For convenience, only one port card, forwarding card and cross-connection card are shown.

Figure 57:
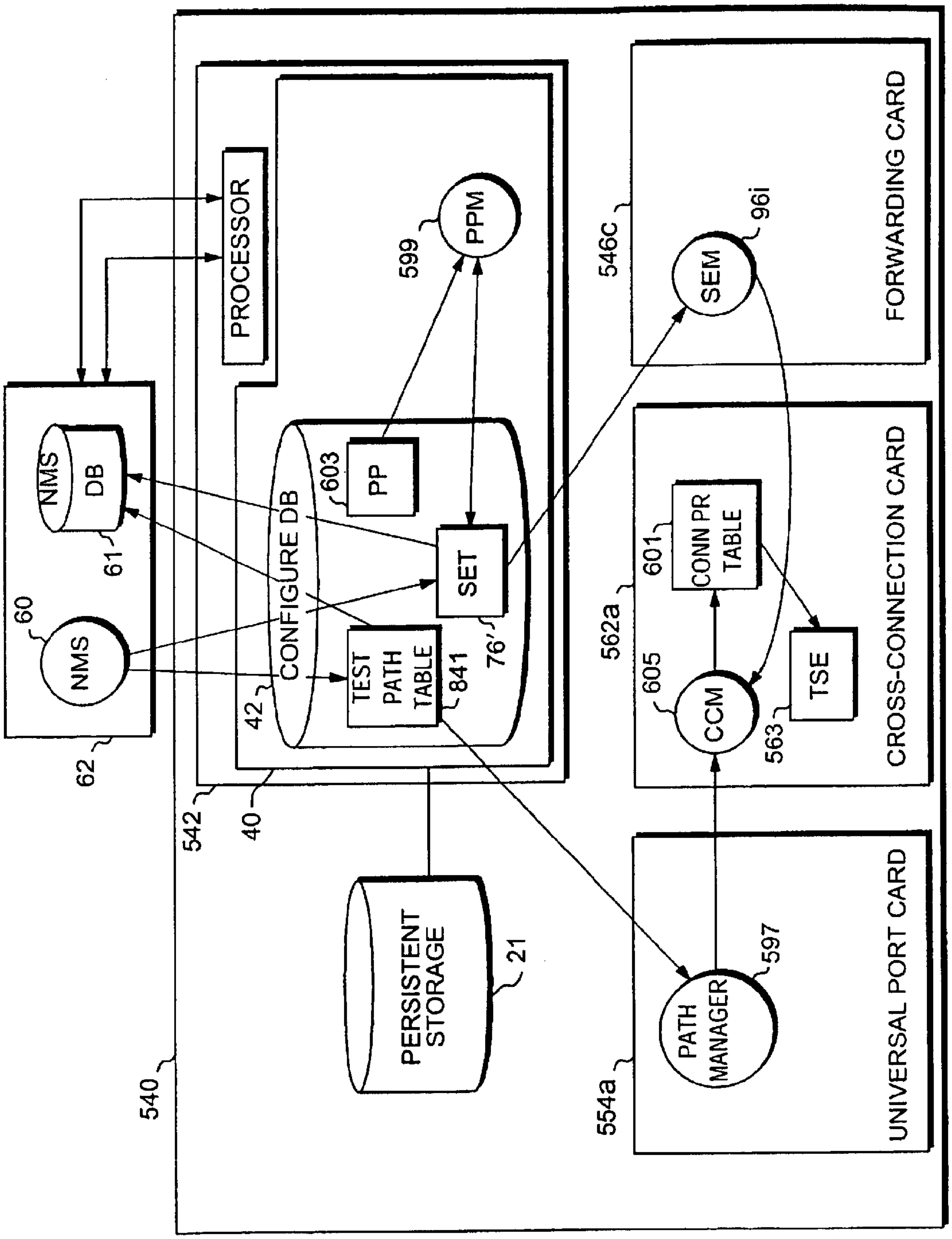
FIG. 57 is a block and flow diagram of a network device incorporating programmable physical layer test ports.

For many reasons, including error diagnosis, a service administrator may wish to monitor the data received on a particular path or paths at a particular port, for example, port 571*a*, and/or the data transmitted on a particular path or paths from port 571*a*. To accomplish this, the network administrator may connect test equipment, for example, an analyzer 840 (e.g., an Omniber analyzer available from Hewlett Packard Company), to the transmit connection of port 571*b* to monitor data received at port 571*a* and/or to the transmit connection of port 571*c* to monitor data transmitted from port 571*a*. The network administrator then notifies the NMS (e.g., NMS 60 running on PC 62, FIG. 35) as to which port or ports on which port card or port cards should be enabled and whether the transmitter and/or receiver for each port should be enabled. The network administrator also notifies the NMS as to which path or paths are to be sent to each test port, and the time slot for each path. With this information, the NMS fills in test path table 841 (FIGS. 57 and 58) in configuration database 42.

Similar to the process of enabling a working port through path table 600 (FIGS. 37 and 38), when a record in the test path table is filled in, the configuration database sends an active query notification to the path manager (e.g., path manager 597) executing on the universal port card (e g., port card 554*a*) corresponding to the universal port card port LID in the path table record. For example, port 571*b* may have a port LID of 1232 (record 842, FIG. 58) and port 571*b* may have a port LID of 1233 (record 843). An active query notification is also sent to NMS database 61, and once the NMS database is updated, the NMS displays the new system configuration, including the test ports, to the user.

Through the test path table, the path manager learns that the transmitters of ports 571*b* and 571*c* need to be enabled and which path or paths are to be transferred to each port. As shown in path table 600 (FIG. 38), path LID 1666 corresponds to working port LID 1231 (port 571*a*), and as shown in test path table 841 (FIG. 58), path LID 1666 is also assigned to test port LIDs 1232 and 1233 (ports 571*b* and 571*c,* respectively). Record 842 indicates that the receive portion of path 1666 (i.e., "ingress" in Monitor column 844) is to be sent to port LID 1232 (i.e., port 571*b*) and then transmitted (i.e., "no" in Enable Port Receiver column 845) from port LID 1232, and similarly, record 843 indicates that the transmit portion of path 1666 (i.e., "egress" in Monitor column 844) is to be sent to port LID 1233 (i.e., port 571*c*) and then transmitted (i.e., "no" in Enable Port Receiver column 845) from port LID 1233.

The path manager passes the path connection information to cross-connection manager 605 executing on the cross-connection card 562*a*. The CCM uses the connection information to generate a new connection program table 601 and uses this table to program internal connections through one or more components (e.g., a TSE chip 563) on the cross-connection card. After re-programming, cross-connection card 562*a* continues to transmit data corresponding to path LID 1666 between port 571*a* on universal port card 554*a* and the serial line input to payload extractor 582*a* on forwarding card 546*c*. However, after reprogramming, cross-connection card 562*a* also multicasts the data corresponding to path LID 1666 and received on port 571*a* to port 571*b* and data corresponding to path LID 1666 and transmitted to port 571*a* by forwarding card 546*c* to port 571*c*.

Analyzer 840 may then be used to monitor both the network data received on port 571*a* and the network data being transmitted from port 571*a*. Alternatively, analyzer 840 may only be connected to one test port to monitor either the data received on port 571*a* or the data transmitted from port 571*a*. The data received on port 571*a* may be altered by the components on the port card(s) and the cross-connection cards before the data reaches the test port but any modification is minimal. For example, where the external network attachment 576*a* is a SONET optical fiber, the port card components may convert the optical signals into electrical signals that are passed to the cross-connection card and then back to the test ports, which reconvert the electrical signals into optical signals before the signals are passed to analyzer 840. Since the data received at port 571*a* has not been processed or translated by the upper layer processing components on the forwarding card, the data accurately reflects the data received at the port. For example, the physical layer (e.g., SONET) information and format is accurately reflected in the data received.

To passively monitor both the data received and transmitted by a particular port, two transmitters are necessary and, thus, two ports are consumed for testing and cannot be used for normal data transfer. Because the test ports are programmable through the cross-connection card, however, the test ports may be re-programmed at any time to be used for normal data transfer. In addition, redundant ports may be used as test ports to avoid consuming ports needed for normal data transfer. Current network devices often have a dedicated test port that can provide both the data received and transmitted by a working port. The dedicated test port, however, contains specialized hardware that is different from the working ports and, thus, cannot be used as a working port. Hence, although two ports may be consumed for monitoring the input and output of one working port, they are only temporarily consumed and may be re-programmed at any time. Similarly, if the port card on which a test port is located fails, the test port(s) may be quickly and easily reprogrammed to another port on another port card that has not failed.

Instead of passively monitoring the data received at port 571*a,* test equipment 840 may be connected to the receiver of a test port and used to drive data to network device 540. For example, the network administrator may connect test equipment 840 to the receiver of test port 571*c* and then notify the NMS to enable the receiver on port 571*c* to receive path 1666. With this information, the NMS modifies test path table 841. For example, record 844 (FIG. 58) indicates that the receive portion of path 1666 (i.e., "ingress" in Monitor column 844) is to be driven (i.e., "yes" in Enable Port Receiver column 845) externally with data from port LID 1233 (i.e., port 571*c*). Again, an active query notification is sent to path manager 597. Path manager 597 then disables the receiver corresponding to port LID 1231 (i.e., port 571 a) and enables the receiver corresponding to port LID 1233 (i.e., port 571*c*) and passes the path connection information to cross-connection manager 605 indicating that port LID 1231 will supply the receive portion of path 1666. The cross-connection manager uses the connection information to generate a new connection program table 601 to re-program the internal connections through the cross-connection card. In addition, the network administrator may also indicate that the transmitter of port 571*a* should be disabled, and path manager 597 would disable the transmitter of port 571*a* and pass the connection information to the cross connection manager.

After re-programming, cross-connection card 562*a* data is sent from test equipment 840 to test port 571*c* and then through the cross-connection card to forwarding card 546*c*. The cross-connection card may multicast the data from forwarding card 546*c* to both working port 571*a* and to test port 571*c,* or just to test port 571*c* or just working port 571*a*.

Instead of having test equipment 840 drive data to the network device over a test port, internal components on a port card, cross-connection card or forwarding card within the network device may drive data to the other cards and to other network devices over external physical attachments connected to working ports and/or test ports. For example, the internal components may be capable of generating a pseudo-random bit sequence (PRBS). Test equipment 840 connected to one or more test ports may then be used to passively monitor the data sent from and/or received by the working port, and the internal components may be capable of detecting a PRBS over the working port and/or test port(s).

Although the test ports have been shown on the same port card as the working port being tested, it should be understood, that the test ports may be on any port card in the same quadrant as the working port. Where cross-connection cards are interconnected, the test ports may be on any port card in a different quadrant so long as the cross-connection card in the different quadrant is connected to the cross-connection card in same quadrant as the working port. Similarly, the test ports may be located on different port cards with respect to each other. A different working port may be tested by re-programming the cross-connection card to multicast data corresponding to the different working port to the test port(s). In addition, multiple working ports may be tested simultaneously by re-programming the cross-connection card to multicast data from different paths on different working ports to the same test port(s) or to multiple different test ports. A network administrator may choose to dedicate certain ports as test ports prior to any testing needing to be done or the network administrator may choose certain ports as test ports when problems arise.

The programmable physical layer test port or ports allow a network administrator to test data received at or transmitted from any working port or ports and also to drive data to any upper layer card (i.e., forwarding card) within the network device. Only the port card(s) and cross-connection card need be working properly to passively monitor data received at and sent from a working port. Testing and re-programming test ports may take place during normal operation without disrupting data transfer through the network device to allow for diagnosis without network device disruption.

NMS Server Scalability

As described above, a network device (e.g., 10, FIG. 1 and 540, FIG. 35) may include a large number (e.g., millions) of configurable/manageable objects. Manageable objects are typically considered physical or logical. Physical managed objects correspond to the physical components of the network device such as the network device itself, one or more chassis within the network device, shelves in each chassis, slots in each shelf, cards inserted in each slot, physical ports on particular cards (e.g., universal port cards), etc. Logical managed objects correspond to configured elements of the network device such as SONET paths, internal logical ports (e.g., forwarding card ports), ATM interfaces, virtual ATM interfaces, virtual connections, paths/interfaces related to other network protocols (e.g., MPLS, IP, Frame Relay, Ethernet), etc.

If multiple NMS clients request access to multiple different network devices and the NMS server is required to retrieve and store data for all managed objects corresponding to each network device, then the NMS server's local memory will likely be quickly filled and repeated retrievals of data from each network device will likely be necessary. Retrieval of a large amount of data from each network device limits the scalability of the NMS server and reduces the NMS server's response time to NMS client requests.

To improve the scalability of the NMS server and improve data request response times, only physical managed objects are initially retrieved from a selected network device and logical managed objects are retrieved only when necessary. To further increase NMS server scalability and response time, proxies for managed objects (preferably physical managed objects and only a limited number of global logical managed objects) are stored in memory local to each NMS client. Moreover, to increase NMS server scalability and response time, unique identification numbers corresponding to each managed object are also stored in memory local to the NMS client (for example, in proxies or GUI tables) and used by the NMS server to quickly retrieve data requested by the NMS client. Each NMS client, therefore, maintains its user context of interest, eliminating the need for client-specific device context management by the NMS server.

Figure 59:
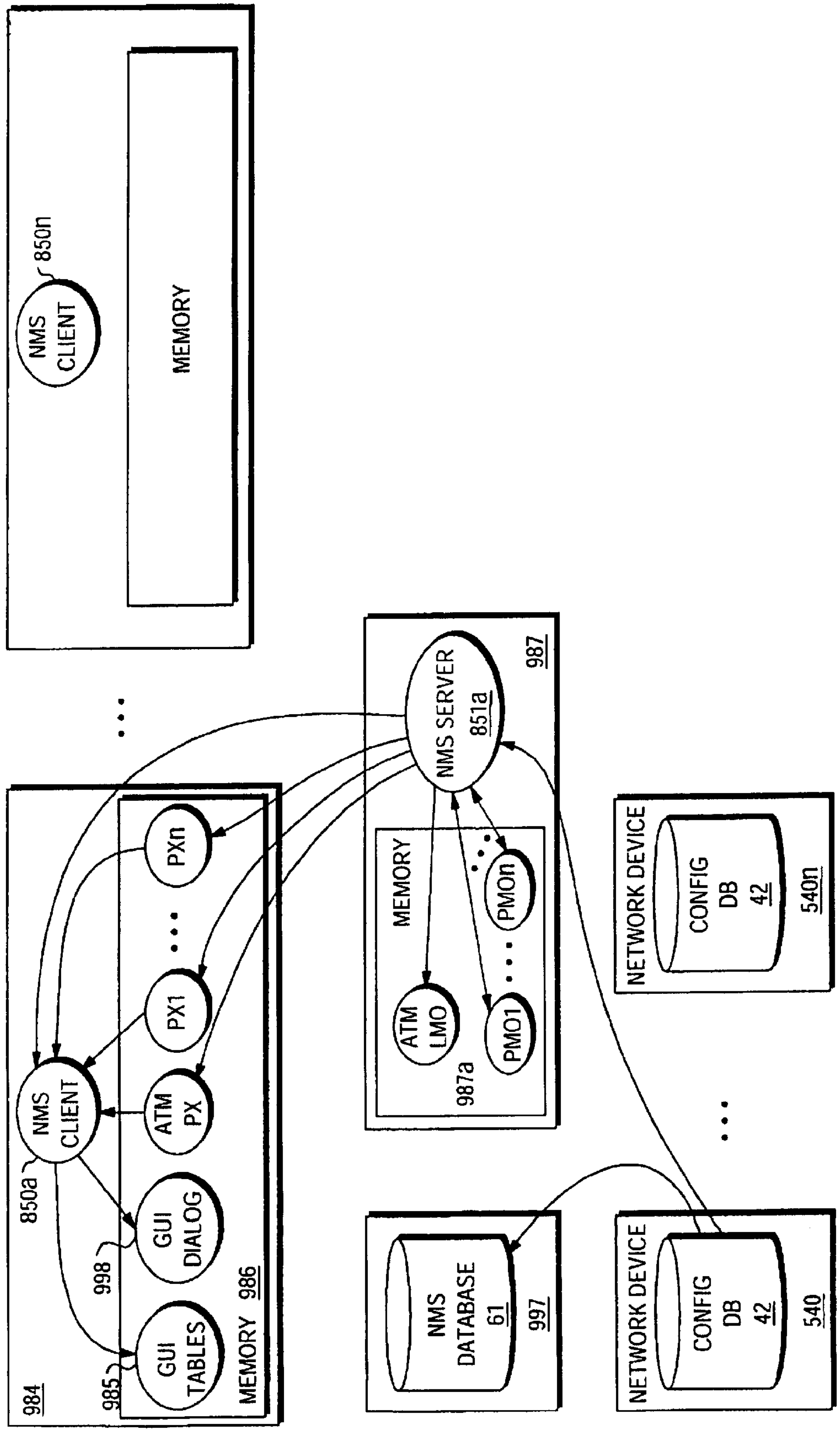
FIG. 59 is a block and flow diagram of a network management system incorporating proxies to improve NMS server scalability.

Referring to FIG. 59, an NMS client 850*a* runs on a personal computer or workstation 984 and uses data in graphical user interface (GUI) tables 985 stored in local memory 986 to display a GUI to a user (e.g., network administrator, provisioner, customer) after the user has logged in. In one embodiment, the GUI is GUI 895 described above with reference to FIGS. 4*a*–4*z*, 5*a*–5*z*, 6*a*–6*p*, 7*a*–7*y*, 8*a*–8*e*, 9*a*–9*n*, 10*a*–10*i* and 11*a*–11*g*. When GUI 895 is initially displayed (see FIG. 4*a*), only navigation tree 898 is displayed and under Device branch 898*a* a list 898*b* of IP addresses and/or domain name server (DNS) names may be displayed corresponding to network devices that may be managed by the user in accordance with the user's profile.

If the user selects one of the IP addresses (e.g., 192.168.9.202, FIG. 4*f*) in list 898*b*, then the client checks local memory 986 (FIG. 59) for proxies (described below) corresponding to the selected network device and if such proxies are not in local memory 986, the NMS client sends a network device access request including the IP address of the selected network device to an NMS server, for example, NMS server 851*a*. The NMS server may be executed on the same computer or workstation as the client or, more likely, on a separate computer 987. The NMS server checks local memory 987*a* for managed objects corresponding to the network device to be accessed and if the managed objects are not in local memory 987*a*, the NMS server sends database access commands to the configuration database 42 within the network device corresponding to the IP address sent by the NMS client. The database access commands retrieve only data corresponding to physical components of the network device.

In one embodiment, data is stored within configuration database 42 as a series of containers. Since the configuration database is a relational database, data is stored in tables and containment is accomplished using pointers from lower level tables (children) to upper level tables (parents). As previously discussed with reference to FIGS. 12*a*–12*c*, after the network device is powered-up, the Master MCD (Master Control Driver) 38 takes a physical inventory of the network device (e.g., computer system 10, FIG. 1, network device 540, FIGS. 35, 59) and assigns a unique physical identification number (PID) to each physical component within the system, including the network device itself, each chassis in the network device, each shelf in each chassis, each slot in each shelf, each card inserted in each slot, and each port on each card having a physical port (e.g., universal port cards). As previously stated, the PID is a unique logical number unrelated to any physical aspect of the component.

The MCD then fills in tables for each type of physical component, such tables being provided by a default configuration within the configuration database. Alternatively, the MCD could create and fill in each table. In one embodiment, the configuration database includes a managed device table 983 (FIG. 60*a*), a chassis table 988 (FIG. 60*b*), a shelf table 989 (FIG. 60*c*), a slot table 990 (FIG. 60*d*), a card table 47' (FIG. 60*e*), and a port table 49' (FIG. 60*f*). The MCD enters the assigned unique PID for each physical component in a row (i.e., record) in one of the tables. Consequently, each unique PID serves as a primary key within the configuration database for the row/data corresponding to each physical component. Where available, the MCD also enters data representing attributes (e.g., card type, port type, relative location, version number, etc.) for the component in each table row. In addition, with the exception of the managed device table, each row includes a unique PID corresponding to a parent table. The unique PID corresponding to a parent table is a pointer and provides data "containment" by linking each child table to its parent table (i.e., provides a table hierarchy). The unique PID corresponding to the parent table may also be referred to as a foreign key for association.

Referring to FIG. 60*a,* since the managed device is the top physical level, managed device table 983 includes one row 983*a* representing the one managed device (e.g., 540, FIGS. 35 and 59) including a unique managed device PID 983*b* (e.g., 1; i.e., primary key) and attributes A1–An corresponding to the managed device but the managed device table does not include a parent PID (i.e., foreign key for association). In the current embodiment, chassis table 988 includes one row 988*a* representing the one chassis (e.g., 620, FIGS. 41*a*–41*b*) in the managed device. Other network devices may have multiple chassis and a row would be added to the chassis table for each chassis and each row would include the same managed device PID (e.g., 1). Each row in the chassis table includes a unique chassis PID 988*b* (e.g., 2; i.e., primary key) and attributes A1–An corresponding to the chassis and a managed device PID 988*c* (i.e., parent PID/foreign key for association). Referring to FIG. 60*c,* shelf table 989 includes one row for each shelf in the chassis and each row includes a unique shelf PID 989*a* (e.g., 3–18; i.e., primary key) and attributes A1–An corresponding to each shelf and a chassis PID 989*b* (i.e., foreign key for association). Since all the shelves are in the same chassis in this embodiment, they each list the same chassis PID (e.g., 2). Referring to FIG. 60*d,* slot table 990 includes one row for each slot in the chassis and each row includes a unique slot PID 990*a* (e.g., 20–116; i.e., primary key) and attributes A1–An corresponding to each slot and a shelf PID 990*b* (i.e., foreign key for association). Since there may be many shelves in the chassis, the shelf PID in each row corresponds to the shelf in which the slot is located. For example, a row 990*c* includes slot PID 20 corresponding to a shelf PID of 3, and a row 990*d* includes slot PID 116 corresponding to a different shelf PID of 18.

Referring to FIG. 60*e,* card table 47' includes one row for each card inserted within a slot in the chassis and each row includes a unique card PID 47*a* (i.e., primary key), attributes (e.g., CWD Type, Version No., etc.) corresponding to each card and a slot PID 47*b* (i.e., foreign key for association) corresponding to the slot in which the card is inserted. Referring to FIG. 60*f,* port table 49' includes one row for each physical port located on a universal port card in the chassis and each row includes a unique port PID 49*a* (i.e., primary key), attributes (e.g., port type, version no., etc.) corresponding to each port and a card PID 49*b* (i.e., foreign key for association) corresponding to the card on which the port is located.

Even after initial power-up, master MCD 38 continues to take physical inventories of the network device to determine if physical components have been added or removed. For example, cards may be added to empty slots or removed from slots. When changes are detected, master MCD 38 updates the tables (e.g., card table 47' and port table 49') accordingly, and through the active query feature, the configuration database updates an external NMS database (e.g., 61, FIG. 59) and notifies the NMS server. In one embodiment, each time a physical component is changed, the NMS server sends the NMS client a full set of updated proxies to ensure that the NMS client is fully synchronized with the network device. Alternatively, only those proxies that are affected may be updated. As described below, however, proxies may include pointers to both a parent proxy and children proxies, and if so, even a change to only one physical component requires changes to the proxy for that component and any related parent and/or children proxies.

In this embodiment, therefore, when the server sends database access commands to the configuration database within the network device to retrieve all data corresponding to physical components of the network device, the database access commands request data from each row in each of the physical tables (e.g., managed device table 983, chassis table 988, shelf table 989, slot table 990, card table 47' and port table 49'). The data from these tables is then sent to the NMS server, and the server creates physical managed objects (PMO1–PMOn, FIG. 59) for each row in each table and stores them in local memory 987*a.*

Figure 61A:
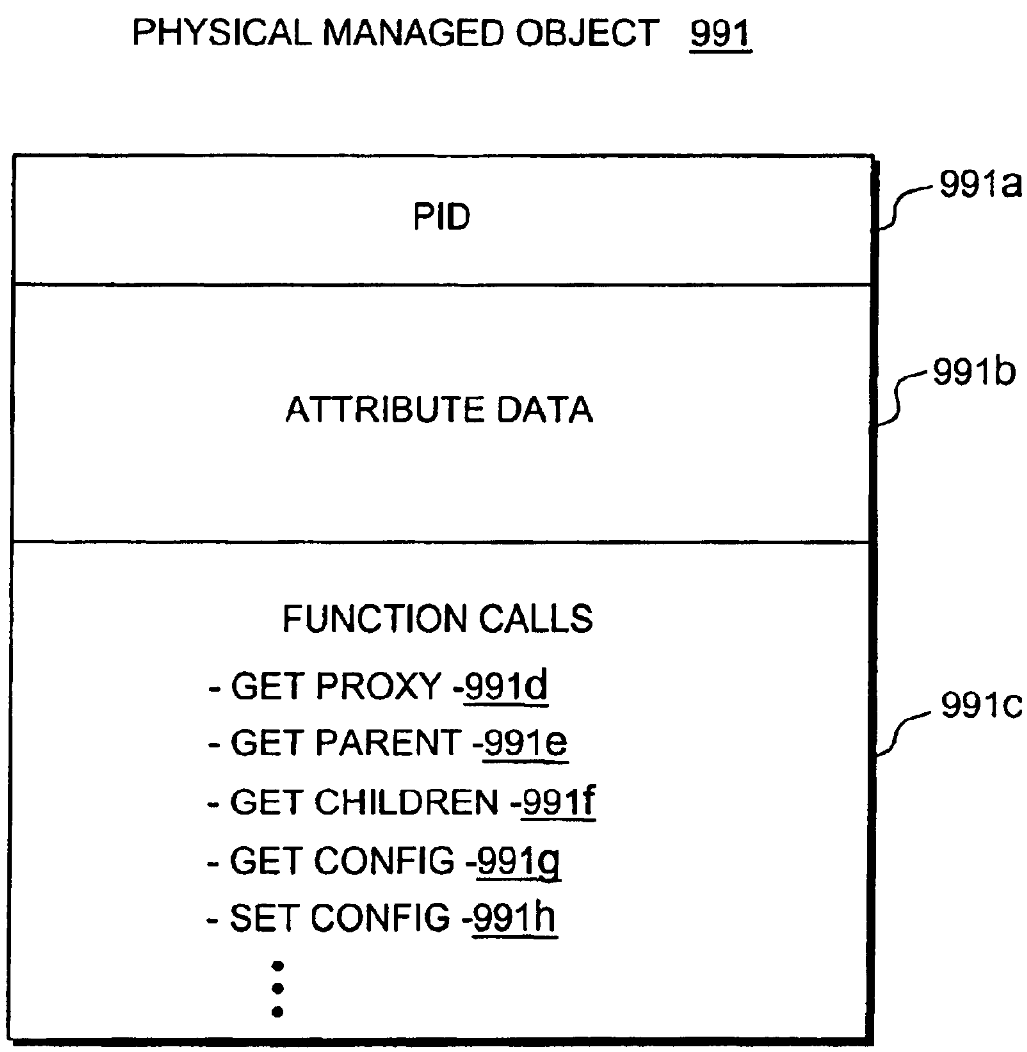
FIG. 61*a* is a block diagram representing a physical managed object.

Referring to FIG. 61*a,* each physical managed object 991 created by the NMS server includes the unique PID 991*a* and the attribute data 991*b* associated with the particular row/record in the configuration database table and function calls 991*c.* With the exception of the managed device physical managed object, the attribute data includes a pointer (i.e., PID) for the corresponding parent physical component, and with the exception of the port physical managed objects, each managed object's attribute data also includes one or more pointers (i.e., PIDs) corresponding to any children physical components. In this embodiment, the port managed objects are the lowest level physical component and, therefore, do not include pointers to children physical components.

In one embodiment, all physical managed objects include a "Get Parent" 991*e* function call to cause the NMS server to retrieve data corresponding to the parent physical component. A Get Parent function call to the managed device managed object receives a null message since the managed device does not have a parent component. The Get Parent function call may be used for constraint checking. For example, prior to configuring a particular card as a backup for another card, the Get Parent function call may be placed twice by the NMS server to ensure that both cards are within the same shelf—that is, the network device may have a constraint that redundant boards must be within the same shelf. The first Get Parent function call determines which slot each card is in and the second Get Parent function call determines which shelf each slot is in. If the shelves match, then the constraint is met.

In one embodiment, all physical managed objects include a "Get Children" 991*f* function call to cause the NMS server to retrieve data from the configuration database for children physical components related to the physical managed object. A Get Children function call to a port managed object receives a null message since the port does not have any physical children components. The data retrieved with the Get Children function call is used to fill in the tables in the physical tabs (e.g., system tab 934 (FIG. 4*s*), module tab 936 (FIG. 4*t*), ports tab 938 (FIG. 4*u*) and SONET Interfaces tab 940 (FIG. 4*v*)) within configuration/status window 897 (FIG. 5*q*). Some or all of the data from each row in the configuration database tables may be used to fill in these tables.

In addition to Get Children and Get Parent function calls, each physical managed object includes a "Get Config" 991*g* and a "Set Config" 991*h* function call. The Get Config function call is used to retrieve data for dialog boxes when a user double clicks the left mouse button on an entry in one of the tabs in status window 897. The Set Config function call is used to implement changes to managed objects received from a user through a dialog box.

Instead of a "Get Children" function call, the port managed object includes a "Get SONET Path Table" function call to cause the server to retrieve all SONET paths (logical managed objects) configured for that particular port for display in SONET Paths tab 942 (FIG. 5*q*). Since SONET paths are children to a port, the "Get SONET Path Table"

corresponds to the "Get Children" function call in the other physical managed objects. However, the pointers (i.e., logical identification numbers (LIDs)) to the children are not stored in the port managed object attribute data. This is because the number of SONET paths that the SONET port would need to point may be large and would have to be regularly updated as SONET Paths are created and deleted. The port managed object also includes a "Create SONET Path" function call and a "Delete SONET Path" function call to cause the server to create or delete, respectively, a SONET path for that particular port. As described below, the port managed object may also include other function calls related to logical components.

Figure 61B:
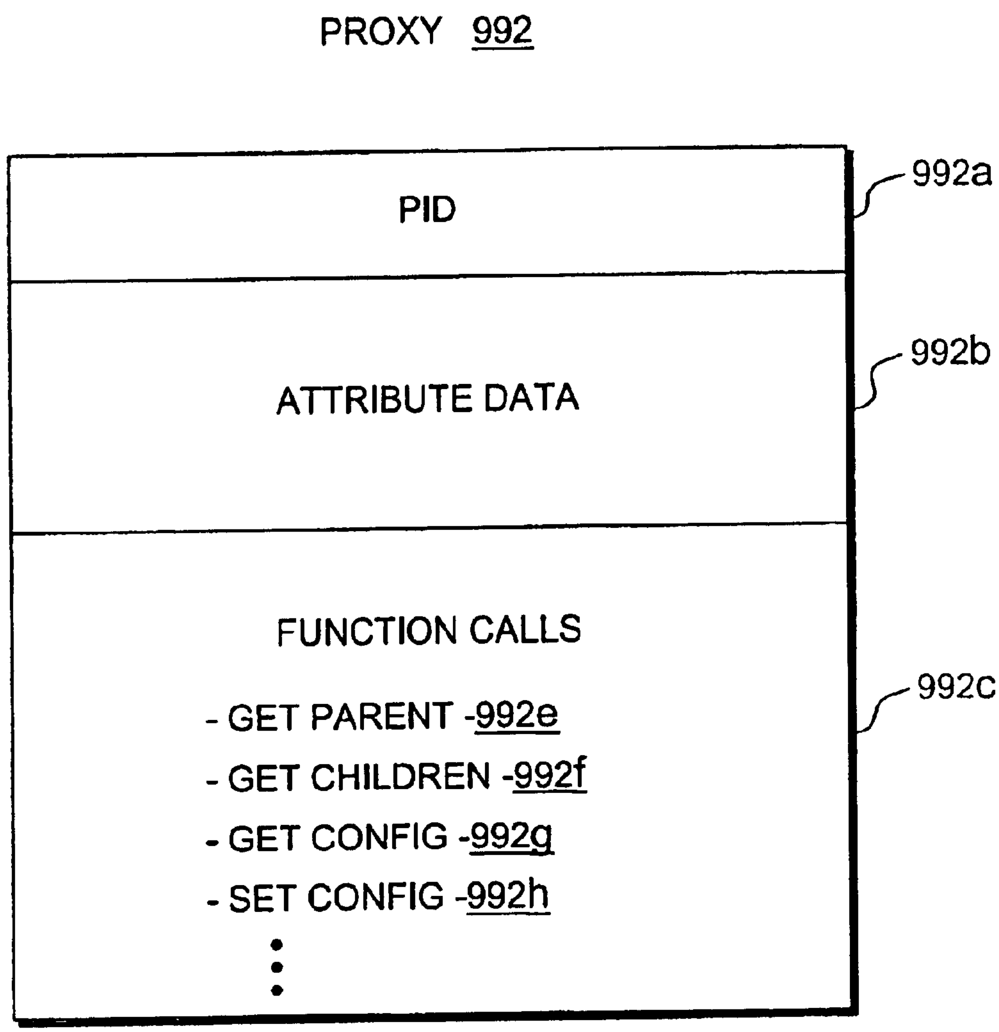
FIG. 61*b* is a block diagram representing a proxy.

Each managed object 991 also includes a "Get Proxy" function call 991*d,* and after creating each managed object, the NMS server places a get proxy function call to the managed object. Placing the get proxy call causes the NMS server to create a proxy (PX) for the managed object and send the proxy (e.g., PX1–PXn) to memory 986 local to the NMS client that requested the network device access. Referring to FIG. 61*b,* each proxy includes the PID 992*a* and some or all of the attribute data 992*b* from the corresponding managed object. The decision to include some or all of the attribute data within the proxy may depend upon the size of the memory 986 local to the NMS client. This may be a static design decision based on the expected size of the memory local to the typical NMS client, or this may be a dynamic decision based on the actual size of the memory local to the NMS client that requested access to the network device. If sufficiently large, the proxy may include all the attribute data. If not sufficiently large, then perhaps only attribute data regularly accessed by users may be included in the proxy. For example, for a port managed object perhaps only the port name, connection type and relative position within the network device is included in the proxy.

In addition, each proxy may include function calls 992*c* similar to one or more function calls in the corresponding managed object, with the exception of the "Get Proxy" function call. Unlike the managed object function calls, however, the proxy function calls cause the NMS client to send messages to the NMS server in, for example, JAVA RMI. For instance, the SONET Port proxy like the SONET Port managed object includes the "Get SONET Path Table", "Create SONET Paths" and "Delete SONET Paths" function calls. However, proxy function calls cause the NMS client to send JAVA RMI messages to the NMS server to cause the server to place similar function calls to the managed object. The managed object function calls cause the server to generate database access commands to the configuration database in the network device.

Initially, the NMS client uses data from the received proxies (PX1–PXn, FIG. 59) to update GUI tables 985 which causes the GUI to display device mimic 896*a* (FIG. 4*f*) in graphic window 896*b* and system tab 934 (FIG. 4*s*) in configuration/service status window 897. Limiting the initial data retrieval from the configuration database to only data corresponding to physical components of the network device—as opposed to both physical and logical components—reduces the amount of time required to transfer the data from the configuration database to the NMS server and on to the NMS client. Thus, the NMS client is able to display the device mimic and system tab more quickly than if data corresponding to both the physical and logical components were retrieved. To further increase the speed with which the device mimic and system tab are displayed, the NMS server may first transfer the proxies necessary for the device mimic and the system tab and then transfer the proxies corresponding to other physical tabs, including module (i.e., card) tab 936 (FIG. 4*t*), port tab 938 (FIG. 4*u*) and SONET Interfaces tab 940 (FIG. 4*v*).

If a user selects a different network device from navigation tree 898 (FIG. 5*h*) using NMS client 850*a,* NMS client 850*a* searches local memory 986 for proxies associated with the selected network device and if not found, the NMS client sends JAVA RMI messages to the NMS server to cause the NMS server to retrieve all physical data from the selected network device, create physical managed objects, store them in local memory 987*a,* create proxies for each physical managed object and send the proxies to the NMS client. If memory 986 local to the NMS client is sufficiently large, then the proxies for the first selected network device may remain in memory along with the proxies for the second selected network device. Consequently, if the user re-selects the first selected network device, the proxies are located in local memory by the NMS client, and the NMS client does not have to access the NMS server.

In addition to reducing the time required to display physical information through GUI 895, limiting the initial data retrieval to only physical data reduces the amount of memory 987*a* local to the NMS server required to store the managed objects. Moreover, once the data from the proxies are added to the GUI tables, the GUI can respond to a user request for any of the device views within the mimic (as shown in FIGS. 4*f*–4*r*) and to a user request for any physical tab without having to send data requests to the NMS server. Consequently, the GUI response time is increased, traffic between the NMS client and server is reduced and the burden on the server to respond to client requests is reduced.

If the proxies include all of the attribute data from the managed objects, then once the proxies are transferred to the NMS client, it is not necessary for the NMS server to continue storing the corresponding physical managed objects. If, however, a proxy includes only some of the attribute data from its corresponding managed object, then continuing to store the managed object at the NMS server saves time if the user requests access to data not included in the proxy. For example, a proxy may only include data for attributes displayed in a tab in status window 897. If a user desires more data, the user may double click the left mouse button on an entry in the tab to cause a dialog box to be displayed including additional attribute data. This causes the NMS client to place a Get Config function call to the corresponding proxy which causes the NMS client to send JAVA RMI messages to the NMS server. If the managed object is still in local memory 987*a,* then the response time to the client is faster than if the server needs to access the configuration database again to retrieve the data.

Maintaining the managed objects for a particular network device in local memory 987*a* is also advantageous if another NMS client requests access to the same network device. As previously mentioned, when the NMS server receives a network device access request, it first checks local memory 987*a*. If the managed objects are already present, then the NMS server may respond more quickly than if the server again needs to retrieve the data from the network device.

Due to the advantages described above, in one embodiment, the NMS server does not automatically delete managed objects from its local memory after proxies are sent to the NMS client. However, because the NMS server's local memory is a limited resource, as clients request access to more and more different network devices, it may become necessary for the NMS server to overwrite managed objects within local memory 987*a* such that they are no longer available. As previously mentioned, sending proxies to the NMS clients allows the clients to display physical data through GUI 895 without accessing the NMS server. Thus, even when the NMS server is forced to overwrite corresponding managed objects in local memory 987*a,* the client is able to continue displaying physical data through GUI 895.

Importantly, through the unique PID and the function calls, the proxies also provide an improved mechanism for accessing logical data and physical data not included within the proxies. As mentioned above, if the user requests access to physical data not in the proxy, then the NMS client places a Get Config function call to the NMS server. The function call is made more efficient by including the unique PID stored in the proxy. The NMS server uses the PID to first search local memory 987*a*—perhaps the NMS server searches a hash table in cache. If the PID is found, then the NMS quickly sends the data from the corresponding managed object to the NMS client. If the PID is not found in local memory 987*a,* then the NMS server uses the PID as a primary key to retrieve the physical data from the configuration database within the network device and again builds the corresponding physical managed object. The NMS server then sends the data from the managed object to the NMS client.

Without the PID, the NMS server would be forced to walk through the hierarchical physical tables until the correct physical component was found. For example, if the NMS server needs data relevant to a particular port, the NMS server would begin by locating the managed device, the chassis, then the correct shelf within the chassis, then the correct slot within the chassis, then the module within the slot and then finally the correct port on the module. This will likely take several database accesses and will certainly take more time than directly accessing the port data using a primary key that provides absolute context.

The process is similar if the data requested is logical. For example, if a user selects a particular port (e.g., port 939*a,* FIG. 5*a*) and then selects SONET Paths tab 942 (FIG. 5*h*), the logical data associated with the SONET paths configured for the selected port (e.g., SONET paths 942*a* and 942*b*) is needed. To do this, the NMS client places a "Get SONET Path Table" function call to the port proxy which causes the NMS client to issue JAVA RMI messages to the NMS server including a request for the SONET paths configured for the physical port associated with the unique port PID stored in the proxy. The NMS server first searches local memory 987*a* for the PID. If a managed object including the PID is found in local memory, then the NMS server places a similar "Get SONET Path Table" function call through the port managed object. If the PID is not found in local memory, then the NMS server uses the port PID as a primary key to quickly retrieve the data from the configuration database stored in the table row corresponding to the selected port. The NMS server again builds the managed object for the port and then places the "Get SONET Path Table" function call through the managed object. The Get SONET Path Table function call within the managed object causes the NMS server to generate database access commands to the configuration database within the network device to retrieve data corresponding to each SONET path configured for the selected port. Only some of the data in each row may be necessary to fill in the fields in the tab (e.g., SONET Paths tab 942, FIG. 4*w*).

Similar to the physical data, logical data is stored in tables within configuration database 42 (FIG. 59). The tables may be provided as part of a default configuration within the configuration database, or the tables may be created within the configuration database as each different type of table is needed. In one embodiment, configuration database 42 includes a SONET Path Table (e.g., 600', FIG. 60*g*), a Service End Point Table (e.g., 76", FIG. 60*h*), an ATM Interface Table (e.g., 114", FIG. 60*i*), a Virtual ATM Interface Table (e.g., 993, FIG. 60*j*), a Virtual Connection Table (e.g., 994, FIG. 60*k*), a Virtual Link Table (e.g., 995, FIG. 60*l*) and a Cross-Connect Table (e.g., 996, FIG. 60*m*). Tables corresponding to other physical layer or upper layer network protocols may also be included within configuration database 42.

The database access commands corresponding to the Get SONET Path Table function call include the port PID (from the proxy/JAVA RMI messages) associated with the selected port. When the database access commands corresponding to the Get SONET Path Table function call are received by the configuration database, the configuration database locates each row in SONET Path Table 600' (FIG. 60*g*) including the selected port PID and returns to the NMS server the data from each row necessary for the SONET Paths tab. Thus, the retrieved data is limited to those rows/records corresponding to the selected port and the data necessary for the tab. This allows the NMS server and NMS client to quickly respond to the user's request for logical data. If all SONET paths configured for all SONET ports within the network device (or worse, all logical data) were retrieved, then the response time would likely be much slower.

For each row of data the NMS server formats the data according to the SONET Paths tab display and sends it to the NMS client. The NMS client adds the data to the GUI tables which causes the GUI tables to display the SONET paths (e.g., 942*a* and 942*b,* FIG. 5*h*) configured for the selected port. Along with the data necessary for the SONET Paths tab, the NMS server also sends the LID for each logical managed object (i.e., each SONET path) and the NMS client saves the LID within the GUI tables, in one embodiment, within a column hidden from the user.

As previously discussed, to retrieve additional attribute data or change attribute data for a managed object, the user may simply double click the left mouse button on an entry in a tab in configuration/status window 897 (FIG. 5*q*) to cause a dialog box to appear. When the user double clicks the left mouse button on the entry, the NMS client places a "Get Config" function call to the corresponding proxy and simultaneously opens a GUI dialog 998 (FIG. 59) in local memory 986. If the selected entry is for a physical component of the network device, then the function call causes the NMS client to populate GUI dialog 998 with attribute data from the proxy. If the selected entry is for a logical component of the network device, for example, a SONET path, then the NMS client needs data from the configuration database within the network device to populate GUI dialog 998.

Figure 62:
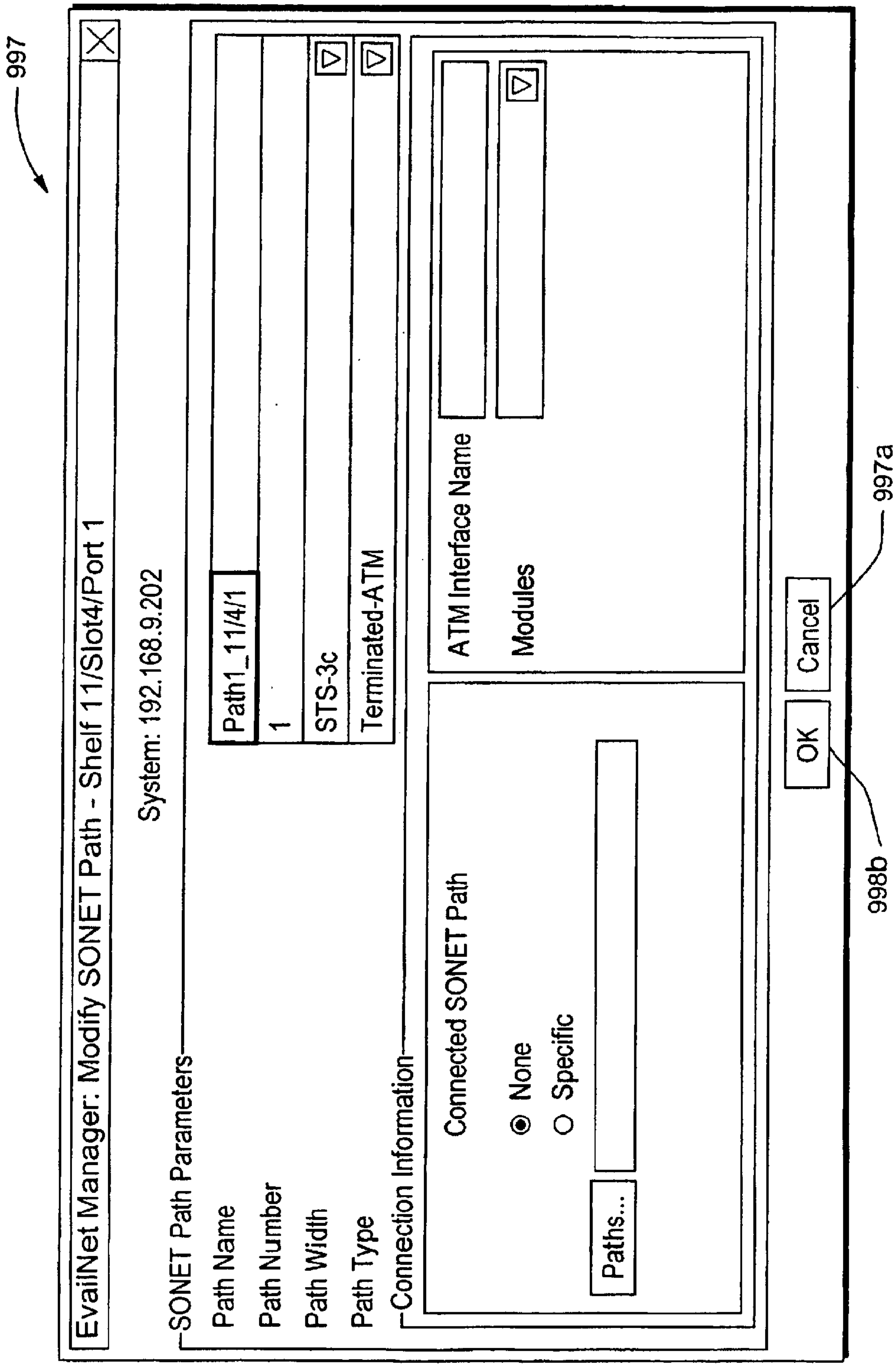
FIG. 62 is a screen display of a dialog box.

For example, if a user selects SONET path 942*a* (FIG. 5*q*) from SONET Paths tab 942 and double clicks the left mouse button, the NMS client displays a SONET Path dialog box 997 (FIG. 62). To do this, when the user double clicks the left mouse button on the entry, the NMS client places a "Get Config" function call to the corresponding port proxy and simultaneously opens a GUI dialog 998 (FIG. 59) in local memory 986. The function call causes the NMS client to send JAVA RMI messages to the NMS server including both the port PID from the proxy and the SONET path LID from the GUI table. The NMS server first searches local memory 987*a* for the port PID. If a managed object including the port PID is found, then the NMS server issues a "Get Config" function call to the managed object including the SONET Path LID. If the port PID is not found, then the NMS server uses the port PID as a primary key into the configuration database to retrieve data from the row/record corresponding to the port. The NMS server then creates the port managed object, stores it in local memory and issues the "Get Config" function call. The function call causes the NMS server to generate database access commands and send them to the configuration database within the selected network device.

The database access commands cause the configuration database to retrieve all the attribute data in the row in SONET Path Table 600' (FIG. 60*g*) corresponding to the SONET path LID. The server uses the retrieved data to build a configuration object and sends the configuration object to the NMS client. The NMS client then uses the configuration object to populate GUI dialog 998 with the data which causes the dialog box 997 (FIG. 62) to display the data to the user.

If the user then selects a Cancel button 997*a* or OK button 997*b,* then the NMS client closes the dialog box. If the user selects Cancel button 997*a,* then the NMS client closes and deletes GUI dialog 998 and takes no further action. If the user selects OK button 997*b,* then it is assumed that the user made changes to one or more SONET path attributes and now wants those changes implemented. To implement any changes made to the SONET path attributes, when the NMS client detects the selection of the OK button, the NMS client places a "Set Config" function call to the corresponding port proxy. The function call causes the NMS client to send JAVA RMI messages to the NMS server including both the port PID from the proxy and the SONET path LID from the GUI table and the attributes for the SONET path. The NMS server first searches local memory 987*a* for the port PID. If a managed object including the port PID is found, then the NMS server issues a "Set Config" function call to the managed object including the SONET Path LID. If the port PID is not found, then the NMS server uses the port PID as a primary key into the configuration database to retrieve data from the row/record corresponding to the port. The NMS server then creates the port managed object, stores it in local memory and issues the "Set Config" function call. The function call causes the NMS server to generate database access commands and send them to the configuration database within the selected network device.

The database access commands cause the configuration database to locate the row in SONET Path Table 600' (FIG. 60*g*) corresponding to the SONET path LID and replace the attributes in that row with the attributes included in the database access commands. As discussed in detail above, when tables in the configuration database are updated an active query feature is used to notify other processes of the changes. For example, NMS database 61 (FIG. 59) is automatically updated with any changes. NMS database 61 may be located within computer/workstation 987 or 984 or within a separate computer/workstation 997. In addition, the changes are sent to the NMS server which uses the data to re-build the configuration object. The NMS server then sends the configuration object to the NMS client. The NMS client uses the configuration object as an indication that the Set Config function call was successful. The NMS client then closes and deletes GUI dialog 998 and uses the received data to update the GUI tables 985.

Alternatively, proxies may be created for each logical managed object and sent to the NMS client. In a typical network device, however, there may be millions of logical managed objects making storage of all logical proxies in memory local to an NMS client difficult if not impossible. Moreover, since logical managed objects change frequently (as opposed to physical managed objects which do not change as frequently), the stored logical proxies would need to be updated frequently leading to an increased burden on both the NMS server and NMS client. Thus, in the preferred embodiment, only physical proxies are created and stored local to the NMS client.

Using the unique PIDs as primary keys allows for faster response times by the NMS server. First the PIDs are used to quickly check local memory 987*a*—perhaps hash tables in a cache. If the data is not in local memory, the PIDS are used as primary keys to perform a fast data retrieval from configuration database 42. If the PIDs were not used, the NMS server would need to navigate through the hierarchy of tables—possibly performing multiple database accesses—to locate the data of interest and, thus, response time would be much slower. As primary keys, the PIDs allow the NMS server to directly retrieve required data (i.e., table rows/records) without having to navigate through upper level tables.

Since logical data corresponds to configured objects, rows are added to the tables when logical objects are configured. In addition, the NMS server assigns a unique logical identification number (LID) for each configured object and inserts this within each corresponding row. The LID, like the PID, is used as a primary key within the configuration database for the row/data corresponding to each logical component. The NMS server and MCD use the same numbering space for LIDs, PIDs and other assigned numbers to ensure that the numbers are different (no collisions). In each row, the NMS server also inserts a unique PID or LID corresponding to a parent table (i.e., a foreign key for association) to provide data "containment".

As described above with reference to FIGS. 5*a*–5*p,* a user may select a port or a SONET interface and then access a SONET path configuration wizard to configure SONET paths on the selected port/interface. When the user selects OK button 944*r,* the NMS client places a "Create SONET Path" function call to the proxy corresponding to the selected port/interface including the port PID in the proxy and the parameters provided by the user through the SONET path configuration wizard. The function call causes the NMS client to send JAVA/RMI messages to the NMS server. The NMS server first searches local memory 987*a* for the port PID. If a managed object including the port PID is found, then the NMS server issues a "Create SONET Path" function call to the managed object including the port PID and the parameters sent by the NMS client. If the port PID is not found, then the NMS server uses the port PID as a primary key into the configuration database to retrieve data corresponding to the port. The NMS server then creates the port managed object, stores it in local memory and then issues the "Create SONET Path" function call. The function call causes the NMS server to generate database access commands and send them to the configuration database within the selected network device.

The database access commands cause the configuration database to add a row in SONET Path Table 600' (FIG. 60*g*) for each SONET path created by the user. The NMS server assigns a unique path LID 600*a* (i.e., primary key) to each SONET path and inserts this within the corresponding row. The NMS server also enters data representing attributes for each SONET path (e.g., time slot, number of time slots, etc.) and the unique port PID 600*b* (i.e., foreign key for association) corresponding to the selected port.

As previously discussed, each SONET path corresponds to a port (e.g., 571*a,* FIG. 36) on a universal port card (e.g., 554*a*) and is connected through a cross-connection card (e.g., 562*a*) to a service end point corresponding to a port (i.e., slice) on a forwarding card (e.g., 546*c*). In one embodiment, after filling in one or more rows in SONET Path Table 600', the NMS server also fills in one or more corresponding rows in Service EndPoint Table (SET) 76" (FIG. 60*h*). The NMS server assigns a unique service endpoint LID 76*a* (i.e., primary key) to each service endpoint and inserts the service endpoint LID within a corresponding row. The NMS server also inserts the corresponding path LID 76*b* (i.e., foreign key for association) within each row and may also insert attributes associated with each service endpoint. For example, the NMS server may insert the quadrant number corresponding to the selected port and may also insert other attributes (if provided by the user) such as the forwarding card slice PID (76*d*) corresponding to the service end point, the forwarding card PID (76*c*) on which the port/slice is located and the forwarding card time slot (76*e*). Alternatively, the NMS server only provides the quadrant number attribute and a policy provisioning manager (PPM) 599 (FIG. 37) decides which forwarding card, slice (i.e., payload extractor chip) and time slot (i.e., port) to assign to the new universal port card path, and once decided, the PPM fills in SET Table 76" attribute fields (i.e., self-completing configuration record).

For each service endpoint created, the database access commands also cause the configuration database to add a row in an interface table. For example, for each service endpoint corresponding to a SONET path configured for ATM service—that is, service field 942*h* (FIG. 5*q*) indicates ATM service—a row is added to ATM Interface Table 114" (FIG. 60*i*). Alternatively, if service field 942*h* is configured for another service, for example, IP, MPLS or Frame Relay, then a row would be added to an interface table corresponding to that upper layer network protocol. The NMS server assigns a unique ATM interface (IF) LID 114*a* (i.e., primary key) and within each row inserts both the assigned ATM IF LID 114*a* and the service endpoint LID 114*b* (i.e., foreign key for association) corresponding to each ATM interface. The NMS server also inserts in each row data representing attributes (e.g., ATM group number) for each ATM interface. The attribute data may be default values and/or data received within the database access commands.

Again, when tables in the configuration database are updated an active query feature is used to notify other processes including NMS database 61 (FIG. 59) and any NMS server currently connected to the network device, for example, NMS server 851*a*. Each NMS server builds a configuration object for each changed logical managed object and sends the configuration object to any NMS clients that currently have access to the network device corresponding to the changed logical managed objects, for example, NMS client 850*a*. The NMS clients use the received configured object to update GUI tables 985 and display the configuration changes to a user. Thus, the user that created the SONET path(s) would then be able to see the new paths displayed in SONET path tab 942 (FIG. 5*q*) and new ATM interfaces displayed in ATM interface tab 946 (FIG. 5*r*).

Similarly, a user may select Virtual ATM Interfaces tab 947 (FIG. 5*s*) and then select Add button 947*b* to add a virtual ATM interface to an ATM interface selected in navigation tree 947*a*. When the user selects OK button 950*e* (FIG. 5*t*) in virtual ATM interfaces dialog box 950, the NMS client places an "Add Virtual ATM Interface" function call to the proxy corresponding to the port associated with the selected ATM interface. The function call includes the ATM interface LID (stored in the GUI table), the corresponding port PID and the parameters provided by the user through the ATM interfaces dialog box. The function call causes the NMS client to send JAVA RMI messages to the NMS server. The NMS server first searches local memory 987*a* for the port PID. If a managed object including the port PID is found, then the NMS server issues an "Add Virtual ATM Interface" function call to the managed object including the ATM interfaces LID and the parameters sent by the NMS client. If the port PID is not found, then the NMS server uses the port PID as a primary key into the configuration database to retrieve data corresponding to the port. The NMS server then creates the port managed object, stores it in local memory and issues the "Add Virtual ATM Interface" function call. The function call causes the NMS server to generate database access commands and send them to the configuration database within the selected network device.

The database access commands cause the configuration database to add a row in Virtual ATM Interfaces Table 993 (FIG. 60*d*) corresponding to the virtual ATM interface created by the user. The NMS server assigns a unique virtual ATM interface LID 993*a* (i.e., primary key) to the virtual ATM interface and inserts this within the corresponding row. The NMS server also enters data representing attributes (e.g., A1–An) for the virtual ATM interface and the unique ATM interface LID 993*b* (i.e., foreign key for association) corresponding to the selected ATM interface in navigation tree 947*a* (FIG. 5*s*). Again, through the active query feature, the NMS database and NMS server are notified of the changes made to the configuration database. The NMS server builds a configuration object and sends it to the NMS client which updates the GUI tables to display the added virtual ATM interface (e.g., 947*c*, FIG. 5*u*) to Virtual ATM Interfaces tab 947. The configuration object may be temporarily stored in local memory 986. However, once the GUI tables are updated, the NMS client deletes the configured object from local memory 986.

Because there may be many upper layer network protocol interfaces in network device 540, the port managed object and port proxy may become very large as more and more function calls (e.g., Add Virtual ATM Interface, Add Virtual MPLS Interface, etc.) are added for each type of interface. To limit the size of the port managed object and port proxy, all interface function calls may be added to logical proxies corresponding to logical upper layer protocol nodes. For example, an ATM node table 999 (FIG. 60*n*) may be included in configuration database 42, and when ATM service is first configured by a user on network device 540, the NMS server assigns an ATM node LID 999*a* (e.g., 5000) and inserts the ATM node LID and the managed device PID 999*b* (e.g., 1) in one row 999*c* in the ATM node table. The NMS server may also insert any attributes (A1–An). The NMS server then retrieves the data in the row and creates an ATM logical managed object (ATM LMO). Like the physical managed objects, the ATM logical managed object includes the assigned LID (e.g., 5000), attribute data and function calls. The function calls include Get Proxy and interface related function calls like Add Virtual ATM Interface. The NMS server stores the ATM LMO in local memory 987*a* and issues a Get Proxy function call. After creating the ATM proxy (ATM PX), the NMS server sends the ATM proxy to memory 986 local to NMS client 850*a*. The NMS client uses the ATM proxy to update GUI tables 985, and then uses it to later make function calls to get ATM interface related data from configuration database 42.

Thus, after the user selects OK button 950*e* (FIG. 5*t*) in virtual ATM interfaces dialog box 950, the NMS client places an "Add Virtual ATM Interface" function call to the ATM node proxy. The function call includes the ATM interface LID (stored in the GUI table), the corresponding ATM node LID and the parameters provided by the user through the ATM interfaces dialog box. The function call causes the NMS client to send JAVA RMI messages to the NMS server. The NMS server first searches local memory 987*a* for the ATM node LID. If a managed object including the ATM node LID is found, then the NMS server issues an "Add Virtual ATM Interface ATM interface LID and the parameters sent by the NMS client. If the ATM node LID is not found, then the NMS server uses the ATM node LID as a primary key into the configuration database to retrieve data corresponding to the port. The NMS server then creates the ATM node logical managed object, stores it in local memory and issues the "Add Virtual ATM Interface" function call. The function call causes the NMS server to generate database access commands and send them to the configuration database within the selected network device.

The database access commands cause the configuration database to add a row in Virtual ATM Interfaces Table 993 (FIG. 60*d*) corresponding to the virtual ATM interface created by the user. The NMS server assigns a unique virtual ATM interface LID 993*a* (i.e., primary key) to the virtual ATM interface and inserts this within the corresponding row. The NMS server also enters data representing attributes (e.g., A1–An) for the virtual ATM interface and the unique ATM interface LID 993*b* (i.e., foreign key for association) corresponding to the selected ATM interface in navigation tree 947*a* (FIG. 5*s*). Again, through the active query feature, the NMS database and NMS server are notified of the changes made to the configuration database. The NMS server builds a configuration object and sends it to the NMS client which updates the GUI tables to display the added virtual ATM interface (e.g., 947*c,* FIG. 5*u*) to Virtual ATM Interfaces tab 947. The NMS client then deletes the logical managed objects from local memory 986." function call to the managed object including the In the discussion below, virtual connections are added using the ATM node proxy. It should be understood, however, that a port proxy including the virtual connection function calls could be used instead.

As explained above, to add a virtual connection, the user may select a port (e.g., 941*a,* FIG. 5*v*) and then select the "Add Virtual Connection" option from pull down menu 943 or the user may select a virtual ATM interface (e.g., 947*c,* FIG. 5*v*) in Virtual ATM Interfaces tab 947 and then select Virtual Connections button 947*d.* After creating a virtual connection through Virtual Connection Wizard 952 (FIGS. 5*w*–5*x*), the user selects Finish button 953*w.* This causes the NMS client to place an "Add Virtual Connection" function call to the ATM node proxy. The function call includes the virtual ATM interface LID (stored in the GUI table), the corresponding ATM node PID and the parameters provided by the user through the Virtual Connection Wizard. The function call causes the NMS client to send JAVA RMI messages to the NMS server. The NMS server first searches local memory 987*a* for the ATM node LID. If a managed object including the ATM node LID is found, then the NMS server issues an "Add Virtual Connection" function call to the managed object including the virtual ATM interface LID and the parameters sent by the NMS client. If the ATM node LID is not found, then the NMS server uses the ATM node LID as a primary key into the configuration database to retrieve data corresponding to the ATM node. The NMS server then creates the ATM node logical managed object, stores it in local memory and then issues the "Add Virtual Connection" function call. The function call causes the NMS server to generate database access commands and send them to the configuration database within the selected network device.

The database access commands cause the configuration database to add a row in Virtual Connection Table 994 (FIG. 60*k*) corresponding to the virtual connection created by the user. The NMS server assigns a unique virtual connection LID 994*a* (i.e., primary key) to the virtual connection and inserts this within the corresponding row. The NMS server also enters data representing attributes (e.g., A1–An) for the virtual connection and the unique virtual ATM interface LID 994*b* (i.e., foreign key for association) corresponding to the selected virtual ATM interface in Virtual ATM Interfaces tab 947 (FIG. 5*v*).

In addition to adding a row to Virtual Connection table 994, when a virtual connection is created one or more rows are also added to Virtual Link Table 995 (FIG. 60*l*) and Cross-Connection Table 996 (FIG. 60*m*). With regard to Virtual Link Table 995, the NMS server assigns a unique virtual link LID 995*a* (i.e., primary key) to each endpoint in the virtual connection and inserts each endpoint LID within a row in the Virtual Link Table. The NMS server also enters data in each row representing attributes (e.g., A1–An) for the corresponding endpoint and the unique virtual connection LID 995*b* (i.e., foreign key for association) corresponding to the newly created virtual connection 994*a* (FIG. 60*k*). For a point-to-point connection there will be two end points—that is, two rows are added to the Virtual Link Table each including a unique endpoint LID 995*a* and the same virtual connection LID 995*b* (corresponding to the same virtual connection LID 994*a,* FIG. 60*k*). For a point to multipoint connection there will be one source endpoint and multiple destination endpoints—that is, more than two rows are added to the Virtual Link Table, one row corresponding to the source endpoint and one row corresponding to each destination endpoint, where each row includes a unique endpoint LID 995*a* and the same virtual connection LID 995*b* (corresponding to the same virtual connection LID 994*a,* FIG. 60*k*).

Each row/record in Cross-Connection Table 60*g,* represents the relationship between the various endpoints and virtual connections. One row is created for each point-to-point connection while multiple rows are created for each point-to-multipoint connection. The NMS server assigns a unique cross-connection LID 996*a* (i.e., primary key) to each cross-connection and inserts each cross-connection LID within a row in the Cross-Connection Table. The NMS server also enters data in each row representing attributes (e.g., A1–An) for the corresponding cross-connection. The NMS server then enters two foreign keys for association: Virtual Link 1 LID 996*b* and Virtual Link 2 LID 996*c.* Within Virtual Link 1 LID 996*b* the NMS server inserts the source endpoint LID for the virtual connection. Within Virtual Link 2 LID 996*c,* the NMS server inserts a destination endpoint LID for the virtual connection. For each of these Virtual Link LIDs in Virtual Link Table 995, the NMS server also inserts Cross-Connection LID 995*c* (corresponding to Cross-Connection LID 996*a* in Cross-Connection Table 996). Since a point-to-point connection includes only one destination endpoint, only one row in the Cross-Connection table is needed to fully represent the connection. One or more rows are necessary, however, to represent a point-to-multipoint connection. In each of the other rows, Virtual Link 1 LID 996*b* representing the source endpoint remains the same but in each row a different Virtual Link 2 LID 996*c* is added representing the various destination endpoints.

Again, through the active query feature, the NMS database and NMS server are notified of the changes made to the Virtual Connection Table, Virtual Link Table and Cross- Connection Table in the configuration database. The NMS server creates configuration objects for each changed row and sends the configuration objects to the NMS client which updates the GUI tables to display the added virtual connection (e.g., 948*a,* FIG. 5*z*) in the Virtual Connections tab 948.

In addition to adding rows to tables when logical managed objects are configured, rows are also removed from tables when logical managed objects are deleted. For example, if a user selects a SONET path (e.g., 942*a,* FIG. 5*q*) from SONET Paths Tab 942 and then selects Delete button 942*g,* the NMS client places a "Delete SONET Path" function call to the proxy corresponding to the selected port. The function call includes the selected port PID as well as the SONET Path LID corresponding to the SONET path to be deleted. The function call causes the NMS client to send JAVA RMI messages to the NMS server. The NMS server first searches local memory 987*a* for the port PID. If a managed object including the port PID is found, then the NMS server issues a "Delete SONET Path" function call to the managed object including the SONET path LID. If the port PID is not found, then the NMS server uses the port PID as a primary key into the configuration database to retrieve data from the row/record corresponding to the port.

The NMS server then creates the port managed object, stores it in local memory and issues the "Delete SONET Path" function call. The function call causes the NMS server to generate database access commands and send them to the configuration database within the selected network device.

The database access commands cause the configuration database to directly delete the specific row within SONET Path Table 600' (FIG. 60*g*) corresponding to the SONET path LID (primary key). Through the active query feature, the NMS database and NMS server are notified of the changes made to the SONET Path Table in the configuration database. The NMS server sends JAVA RMI messages to the NMS client to cause the client to update the GUI tables to remove the deleted SONET Path from the SONET Paths tab 942.

Many different function calls may be generated by the NMS client and NMS server to carry out configuration changes requested by users.

As described above, memory local to each NMS client is utilized to store proxies corresponding to managed objects associated with physical components within a network device selected by a user. Proxies for logical managed objects corresponding to upper layer network protocol nodes (e.g., ATM node, IP node, MPLS node, Frame Relay node, etc.) may also be stored in memory local to each NMS client to limit the size of physical port proxies. The proxies reduce the load on the network/NMS server by allowing the NMS client to respond to user requests for physical network device data and views without having to access the NMS server. Storing data local to the NMS client improves the scalability of the NMS server by not requiring the NMS server to maintain the managed objects in memory local to the server. Thus, as multiple NMS clients request access to different network devices, the NMS server may, if necessary, overwrite managed objects within its local memory without disrupting the NMS client's ability to display physical network device information to the user and issue function calls to the NMS server. Response time to a user's request for access to a network device is also improved by initially only retrieving physical data as opposed to retrieving both physical and logical data.

In addition, unique identification numbers—both PLDs and LIDs—may also be stored in memory local to the NMS client (e.g., within proxies or GUI tables) to provide improved data request response times. Instead of navigating through the hierarchy of tables within the relational configuration database internal to the network device, the NMS server is able to use the unique identification numbers as primary keys to directly retrieve the specific data needed. Providing the unique identification numbers from the NMS client to the NMS server insures that even if the NMS server needed to overwrite managed objects within memory local to the NMS server, the NMS server will be able to quickly re-generate the managed objects and quickly retrieve the necessary data.

The unique identification numbers—both PIDs and LIDs—may be used in a variety of ways. For example, as previously mentioned, the device mimic 896*a* (FIG. 4*t*) is linked with status window 897, such that selecting a module in device mimic 896*a* causes the Module tab to highlight a line in the inventory corresponding to that card. The unique PIDs and LIDs are utilized to make this link between the status window and the device mimic.

Network Device Authentication

When a user selects an IP address (i.e., 192.168.9.202, FIG. 4*e*) representing a particular network device from device list 898*b* in GUI 895, a network management system (NMS) client (e.g., 850*a,* FIG. 2*b*) sends a message to an NMS server (e.g., 851*a*) and the NMS server uses the IP address to connect to the network device (e.g., 540) to which that IP address is assigned. The NMS server may connect to a network device port on a universal port card for in-band management or a port on an external Ethernet bus 41 (FIGS. 13*b* and 35) for out-of-band management.

For out-of-band management, the NMS server uses the IP address over a separate management network, typically a local area network (LAN), to reach an interface 1036 (FIG. 63) on the network device to external Ethernet bus 41. Any intermediate network may exist between the local network to which the NMS is connected and the local network (i.e., Ethernet 41) to which the network device is connected. A Media Access Control (MAC) address (hereinafter referred to as the network device's external MAC address) is then used on Ethernet 41 to bridge the packet, containing the IP address, to the network device.

The Institute of Electrical and Electronics Engineers (IEEE) is responsible for creating and assigning MAC addresses, and since one independent party has this responsibility, MAC addresses are assured to be globally unique. Network hardware manufacturers apply to the IEEE for a block (e.g., sixteen thousand, sixteen million) of MAC addresses. MAC addresses are normally 48 bits (6 bytes) and the first three bytes represent an Organization Unique Identifier (OUI) assigned by the IEEE. During manufacturing, the network hardware manufacturer assigns a MAC address to each piece of hardware having an external LAN connection. For example, a MAC address is assigned to each network device card on which an external Ethernet port is located when the card is manufactured. Typically, MAC addresses are stored in non-volatile memory within the hardware, for example, a programmable read only memory chip (PROM), which cannot be changed. Thus, MAC addresses provide a unique physical identifier for the assigned hardware and may be used as unique global identifiers for individual network device cards including external Ethernet ports.

Figure 63A:
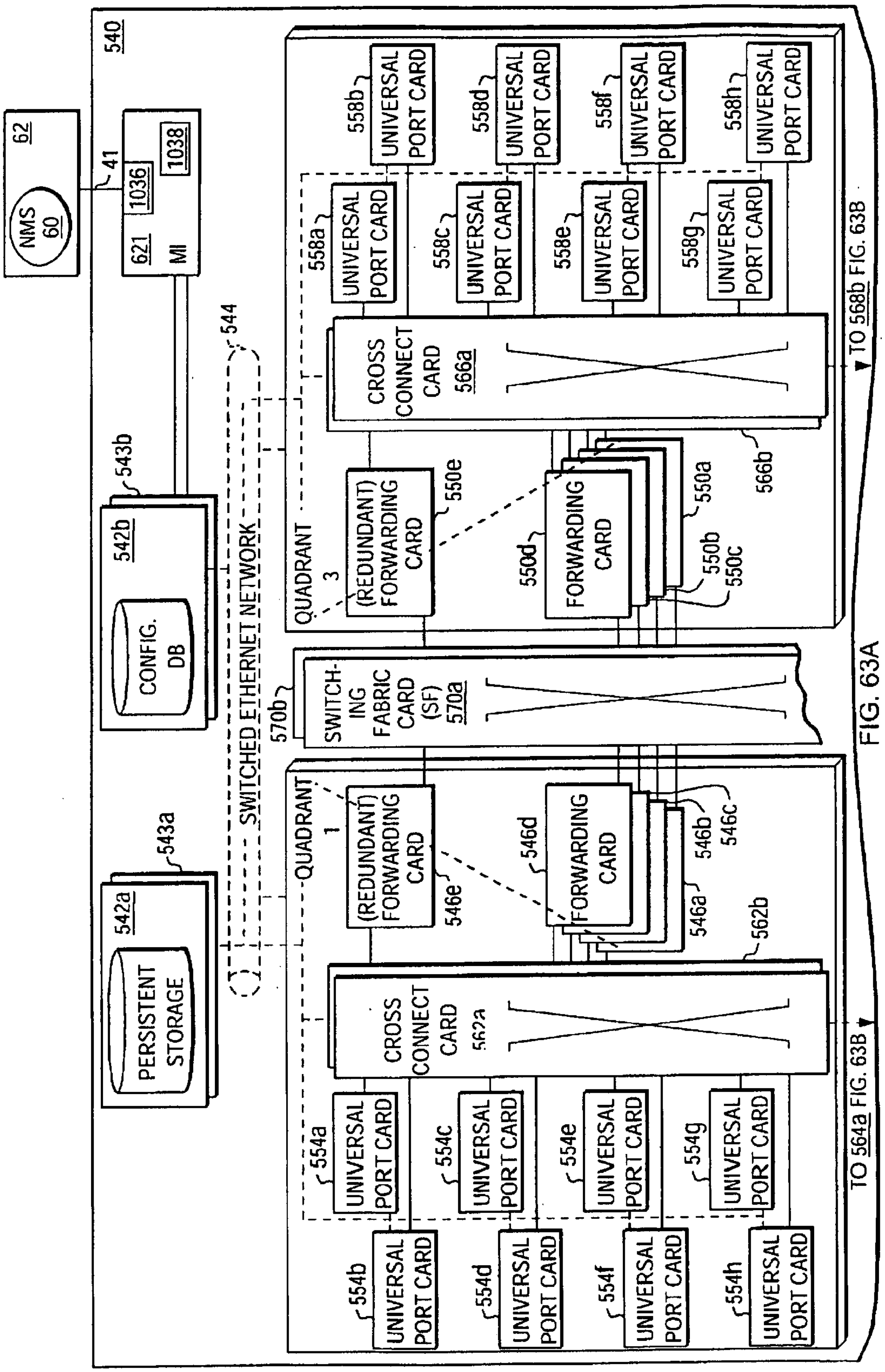
FIG. 63 is a block diagram of a network device connected to an NMS.
Figure 63B:
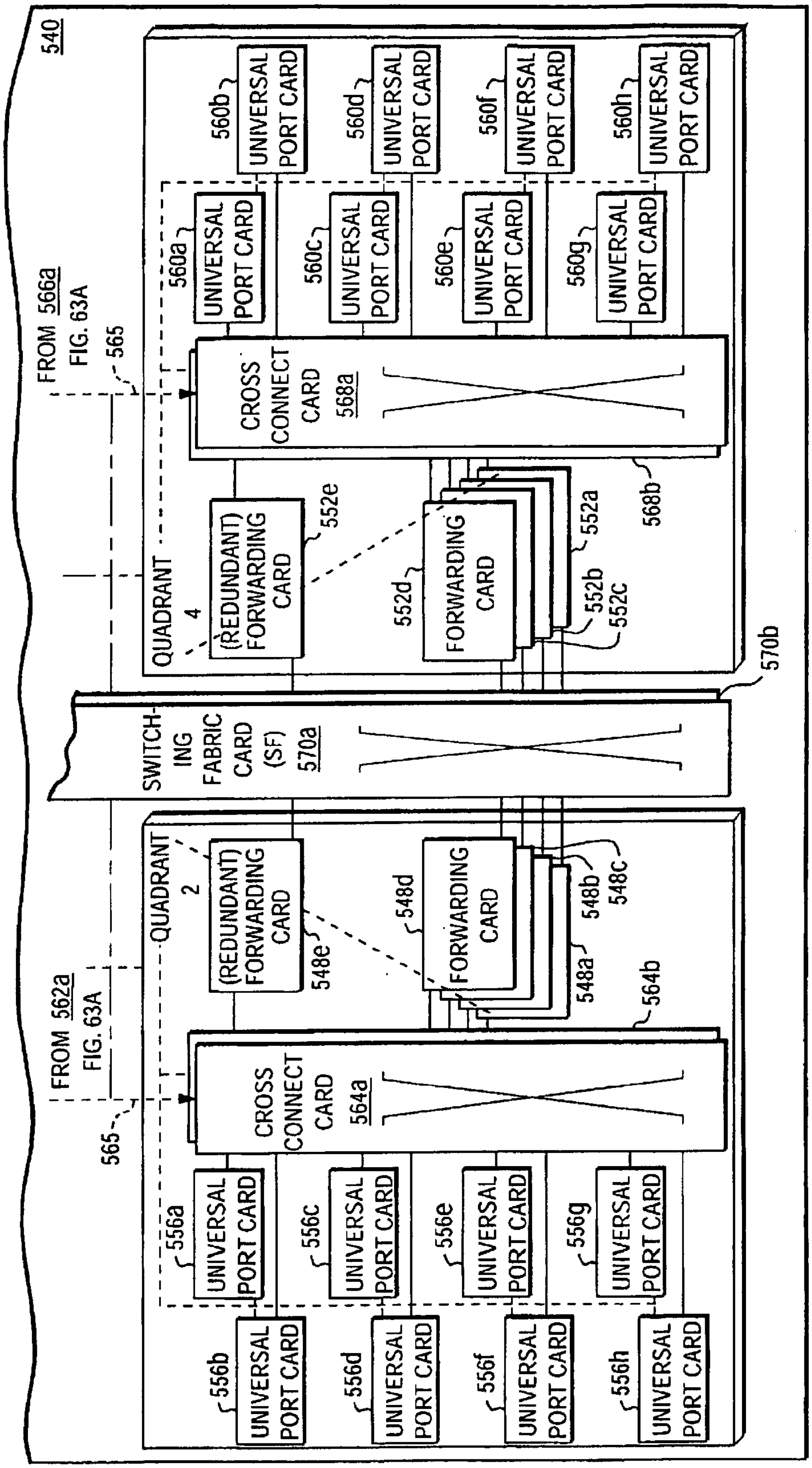

Referring to FIG. 63, in one embodiment, an external Ethernet network interface 1036 for connecting network device 540 to external Ethernet 41 is located on management interface (MI) card 621 (see also FIG. 41*a*), and the IEEE provided MAC address (i.e., external MAC address) assigned to the MI card is stored in PROM 1038.

Preferably the network device includes an internal Ethernet bus 544 (or 32 in FIG. 1) to which each card including a processor is connected. In this embodiment, MI card 621 does not connect directly to internal Ethernet bus 544 but instead connects to external control card 542*b* and redundant external control card 543*b*. Each card that connects to internal Ethernet bus 544—for example, external control cards 542*b* and 543*b,* internal control cards 542*a* and 543*a,* switch fabric cards 570*a* and 570*b,* forwarding cards 546*a*–546*e,* 548*a*–548*e,* 550*a*–550*e,* and 552*a*–552*e,* universal port cards 554*a*–554*h,* 556*a*–556*h,* 558*a*–558*h* and 560*a*–560*h,* and cross connection cards 562*a*–562*b,* 564*a*–564*b,* 566*a*–566*b* and 568*a*–568*b*—includes an internal Ethernet network interface and may communicate with each of the other cards connected to the internal Ethernet using an internal address. In one embodiment, the internal address for each card is an assigned IEEE provided MAC address, which is stored in non-volatile memory (e.g., a PROM) on the card. Since IEEE assigned MAC addresses are limited and since traffic on internal Ethernet 544 is not sent directly over external Ethernet 41, instead of using IEEE assigned MAC addresses as internal addresses, another unique identifier may be used. For example, the unique serial number of each card may be stored within and readable from a register on each card and may be used as the internal address. The serial number may also be combined with other identifiers specific to the card, for example, the card's part number. The serial number or the combination of serial number and part number for each card may then be used as a unique internal address and physical identifier for the card.

As previously discussed, the IP addresses listed in device list 898*b* (FIG. 4*e*) come from a user profile previously created for the user. Since the IP address assigned to each network device may change after the user profile is created, the NMS needs a mechanism in addition to the IP address that will ensure that the device to which it is connected is the same network device associated with the set of network device attributes (i.e., capabilities and current configuration) corresponding to the IP address in the user profile. Each time a user selects a network device in device list 898*b* and/or periodically, for example, every six hours, the NMS will then use the mechanism to authenticate the identity of the network device.

In one embodiment, the authentication mechanism uses two or more of the network device's physical identifiers. For example, the external MAC address (i.e., IEEE assigned) may be used for authentication with one or more of the internal addresses (i.e., IEEE assigned MAC addresses or other unique identifiers such as serial numbers). As another example, two or more internal addresses may be used for authentication. As a result, a combination of a user entered identifier—the IP address assigned to the network device—and two or more physical identifiers—the external MAC address and/or one or more internal addresses—are used to guarantee the identity of each network device in the network.

As described above, when a network device is added to a network, an administrator selects an Add Device option in a pop-up menu 898*c* (FIG. 6*a*) in GUI 895 to cause a dialog box (e.g., 898*d,* FIG. 6*b;* 1013, FIG. 11*s*) to be displayed. After entering the required information into the dialog box, the user selects an Add button (e.g., 898*f,* FIG. 6*b;* 1013*h,* FIG. 11*s*). Selection of the Add button causes the NMS client to send the data from the dialog box to the NMS server. The NMS server adds a row to Administration Managed Device table 1014' (FIG. 64) and inputs the data sent from the NMS client into the new row. In addition, the NMS server uses the IP address in the data sent from the NMS client to connect with the network device and retrieve two or more physical identifiers. The physical identifiers may then be stored in columns (e.g., 1014*e*' and 1014*f*') of the Administration Managed Device table. Although only two physical identifier (ID) columns are shown in FIG. 64, the Administration Managed Device table may include additional columns for additional physical identifiers.

Since MAC addresses are 48 bits in length, they may be too large to store as integers within the NMS database when the NMS database is a relational database. When one or more MAC addresses are used as physical identifiers, therefore, the NMS server converts the 48 bit MAC addresses into strings before storing them in columns 1014*e*' and 1014*f*' in the new row of the Administration Managed Device table.

The NMS server may be programmed to retrieve the physical identifier associated with any card within the network device for input into the Administration Managed Device table. Preferably, the retrieved physical identifiers correspond to cards least likely to fail and least likely to be removed from the network device. Cards with the smallest number of components or less complex hardware may be least likely to fail and may be least likely to be removed from the network device and replaced with an upgraded card.

With respect to the current embodiment, MI card 621 includes the smallest number of components and may be the card least likely to fail or be removed from network device 540. Thus, the external MAC address for MI card 621 may be retrieved by the NMS server and input into one of the physical identifier columns in the Administration Managed Device table. Since the network device requires at least one internal control card 542*a* or 543*a* to be present in order to operate, the internal address associated with one of the internal control cards may be retrieved and input into one of the physical identifier columns in the Administration Managed Device table along with the physical identifier for MI card 621. Since internal control card 542*b* is a backup card for internal control card 542*a* and at least one is required to be operational, it is highly unlikely that both cards will fail or be removed from the network device simultaneously. Therefore, instead of or in addition to retrieving the external MAC address associated with MI card 621, the internal addresses for both internal control cards may be retrieved by the NMS server and input into the physical identifier columns in the Administration Managed Device table. Similarly, the internal addresses for the external control cards or the switch fabric cards may be retrieved and input into the physical identifier columns in the Administration Managed Device table. The internal addresses corresponding to the forwarding cards, universal port cards and cross connection cards may also be retrieved and input into the Administration Managed Device table, however, since these cards support customer demands which are likely to change, it is highly likely that these cards will be removed or replaced within the network device and, therefore, these internal addresses are not preferred as the physical identifiers for authentication.

Authentication may be accomplished using two or more physical identifiers retrieved from a network device regardless of whether the network device includes an internal Ethernet. As described above, each network device card may include a serial number stored in a register on the card. Alternatively, another type of unique identifier may be stored in non-volatile memory. In either case, since the unique identifier is tied to the card, it is a physical identifier, and authentication may be accomplished by retrieving the physical identifier—through the in-band network—from two or more cards within the network device.

As described above, the Administration Managed Device table provides a centralized set of device records shared by all NMS servers. The LID in column 1014*a*', therefore, provides a single "global" identifier for each network device that is unique across the network and accessible by each NMS server, and each record in the Administration Managed Device table provides a footprint that uniquely identifies each device. The global identifier (i.e., the LID from column 1014*a*') may be used for a variety of other network level activities. For example, the global identifier may be sent by the NMS server to the network device and included in accounting/statistical data (or in the file names containing the data) by Usage Data Server (UDS) 412*a* or FTP client 412*b* (FIG. 13*c*) sent from the network device to external file system 425. Since all data gathered within the network is associated with a unique global identifier, data collector server 857 may then run reports across all devices in the network. For example, a report may be run to determine which network device is least utilized and another report may be run to determine which network device is most utilized. The network administrator may then use these reports to transfer services from the most utilized to the least utilized to better balance the load of the network.

As described above, after the data from dialog box 1040 (FIG. 64) is added to the Administration Managed Device table, the data corresponding to the network device is added to user profile logical managed objects (LMOs) when users authorized to access the network device log into an NMS client. Once added to a user profile LMO, the IP address associated with that network device is added to device list 898*b* (FIG. 4*e*). In one embodiment, each time a user selects a network device IP address in device list 898*b*, the NMS server connects to the network device and authenticates the network device by retrieving the physical identifiers from the appropriate cards in the network device. In addition or alternatively, an NMS server may periodically connect to each network device in the telecommunications network and authenticate each network device by retrieving the physical identifiers from the appropriate cards in the network device.

In one embodiment, the network device is authenticated by comparing the physical identifiers retrieved from the network device to the physical identifiers stored either in the Administration Managed Device table or each user profile. If both physical identifiers match, then the network device is authenticated. In addition, if only one physical identifier matches, the network device is also authenticated. One physical identifier may not match because the associated card may have been removed from the network device and replaced with a different card having a different physical identifier. In this event, the NMS server still automatically authenticates the network device without user intervention and may also change the physical identifier in the Administration Managed Device table and perhaps the user profile immediately or schedule an update during a time in which network activity is generally low.

Since electronic hardware may fail, it is important that all network device electronic hardware be removable and replaceable. However, if all electronic hardware is removable, no permanent electrical hardware storing a physical identifier may be used to definitively identify the network device. Using multiple physical identifiers to uniquely identify network devices provides fault tolerance and supports the modularity of electronic hardware (e.g., cards) within a network device. That is, using multiple physical identifiers for authentication allows for the fact that cards associated with physical identifiers used for authentication may be removed from the network device. Through the use of multiple physical identifiers, even if a card associated with a physical identifier used for authentication is removed from the network device, the network device may be authenticated using the physical identifier of another card. If more than two physical identifiers are used for authentication, a network device may still be authenticated even if more than one card within the device is removed as long as at least one card corresponding to a physical identifier being used for authentication is within the device during authentication.

Importantly, the present invention allows for dynamic authentication, that is, the NMS is able to update its records, including physical identifiers, over time as cards within network devices are removed and replaced. As long as one card associated with a physical identifier within the user profile LMO is in the network device when authentication is performed, the network device will be authenticated and the NMS may then update its records to reflect any changes to physical identifiers associated with other cards. That is, for cards that are removed and replaced, the NMS will update the Administration Managed Device table with the new physical identifiers corresponding to those cards and if a card was removed and not replaced, the NMS will remove the physical identifier corresponding to that card from the Administration Managed Device table. For example, in the embodiment described above, if the card associated with the physical identifier stored in physical ID A is removed and replaced and the card associated with the physical identifier stored in physical ID B is in the network device during authentication, the network device will be authenticated and the NMS may insert the new physical identifier corresponding to the new card in physical ID A. Then if the card associated with the physical identifier stored in physical ID B is removed and replaced, the network device will still be authenticated during the next authentication so long as the card associated with the new physical identifier stored in physical ID A is in the network device.

Instead of storing multiple physical identifiers in the Administration Managed Device table, a single string representing a composite of two or more physical identifiers may be stored in one column of the Administration Managed Device table. For example, the physical identifiers corresponding to two or more cards within the network device may be multiplied together as integers and the result of the multiplication converted into and stored as one string value in one column of the Administration Managed Device table. With regard to the current embodiment, physical ID A and physical ID B may be multiplied together and stored as a single string. For authentication, the composite string may be converted back into a long integer, be divided by a first retrieved physical identifier corresponding to physical ID A and the result compared with the second retrieved physical identifier corresponding to physical ID B. If the result matches, then the device is authenticated. Otherwise, the converted composite value is divided by the second retrieved physical identifier corresponding to physical ID B and the result is compared with the first retrieved physical identifier corresponding to physical ID A. If the result matches, then the device is authenticated. Storing a multiplied product of physical identifiers works similarly for more than two physical identifiers, and other composite values and corresponding comparisons may also be used to provide authentication of multiple physical identifiers. In addition, since the composite value will be a single, unique value derived from two or more physical identifiers, it may be inserted in LID column 1014a' of the Administration Managed Device table instead of a separate column.

If all cards associated with physical identifiers being used for authentication are removed and/or replaced within a network device, then the NMS server will be unable to authenticate the network device and the NMS server will notify the NMS client which will notify the user. The user may confirm through a dialog box that the network device to which the NMS server was connected using the IP address in the user profile is indeed the correct network device in which case the NMS server would update the physical identifiers in the Administration Managed Device table and/or the user profile immediately or at a predetermined future time. If the user indicates that the network device is not the same, then the NMS server removes the IP address from the record in the Administration Managed Device table and/or requests the user to provide a new IP address for that network device. As a result, a network administrator may re-configure a network and assign new IP addresses to a variety of network devices and the set of attributes associated with each network device will not be lost. Instead the user may be prompted to input the new IP address for each network device corresponding to a changed IP address. As a result, the present invention also allows for dynamic authentication over time as the IP addresses assigned to network devices are changed.

The above discussion uses MAC addresses, serial numbers and a combination of serial numbers and part numbers as examples of physical identifiers that may be used to authenticate a network device. It is to be understood that a network device may be authenticated through multiple other physical identifiers. For example, memory on each network card may include a different unique identifier, perhaps provided by a user. In addition to storing the IP address and physical identifiers in the Administration Managed Device record, additional identifiers may also be included in each record. For example, a user may be prompted to supply a unique identifier for each network device.

Internal Dynamic Health Monitoring

To improve network device availability, many current network devices include internal monitoring and evaluation of particular network resource attributes. The evaluations, however, are based upon simple threshold values and fixed expressions. In addition, the resource attributes that may be monitored are limited to particular predetermined resource attributes. The present invention allows network managers to dynamically select a threshold evaluation expression from a list of available expressions or input a new threshold evaluation expression. In addition, any attribute associated with an identifiable resource within the network device may be evaluated against the chosen or input expression.

Figure 65:
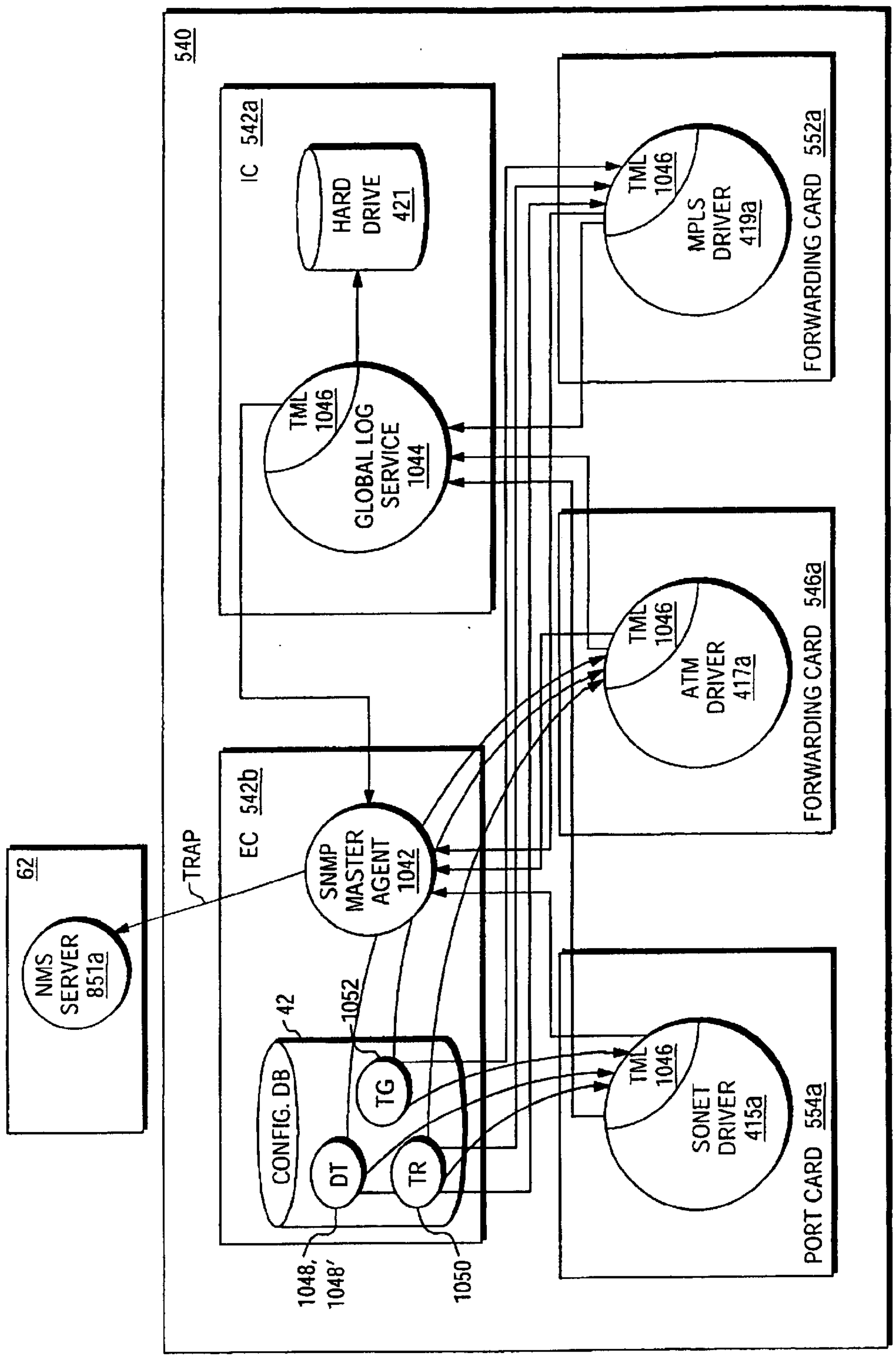
FIG. 65 is a block and flow diagram of a threshold management system.

Referring to FIG. 65, processes within network device 540 may include attributes (i.e., parameters) corresponding to network device resources that a network manager may wish to check against particular threshold expressions (i.e., rules). For each of these processes, a Threshold Monitoring Library (TML) 1046 is linked in when they are built. For example, within network device 540, SONET drivers (e.g., 415a) and ATM drivers (e.g., 417a) link in TML 1046 when built to allow resource attributes corresponding to those applications to be checked against threshold rules. When an application including the TML is first loaded within network device 540, the TML linked into each application causes the applications to retrieve the threshold rules and other threshold data from tables within configuration database 42. In one embodiment, these tables include a Dynamic Threshold table 1048, a Threshold Rule table 1050 and a Threshold Group table 1052, described in detail below. The application/TML also establishes active queries (discussed above) for table entries relevant to each application such that if entries are added to or removed from these tables, the configuration database automatically notifies the appropriate application/TML of the change.

The TML maintains a sampling timer for each resource attribute corresponding to its associated application and selected by the user for threshold evaluation. The sampling frequency for each resource attribute is retrieved from the Dynamic Threshold table, and at the appropriate sampling frequency, the TML retrieves each resource attribute value, from the corresponding application and checks the resource attribute value against a threshold rule and other variables retrieved from the Dynamic Threshold table. If the threshold rule is met, then, in accordance with a reporting structure also retrieved from the Dynamic Threshold table, the application/TML may do nothing or notify an SNMP master agent 1042 and/or a global log service 1044. The SNMP master agent causes SNMP traps to be sent to appropriate NMS servers (e.g., 851a), while the Global Log Service logs the event in one or more files within hard drive 421.

Figure 66A:
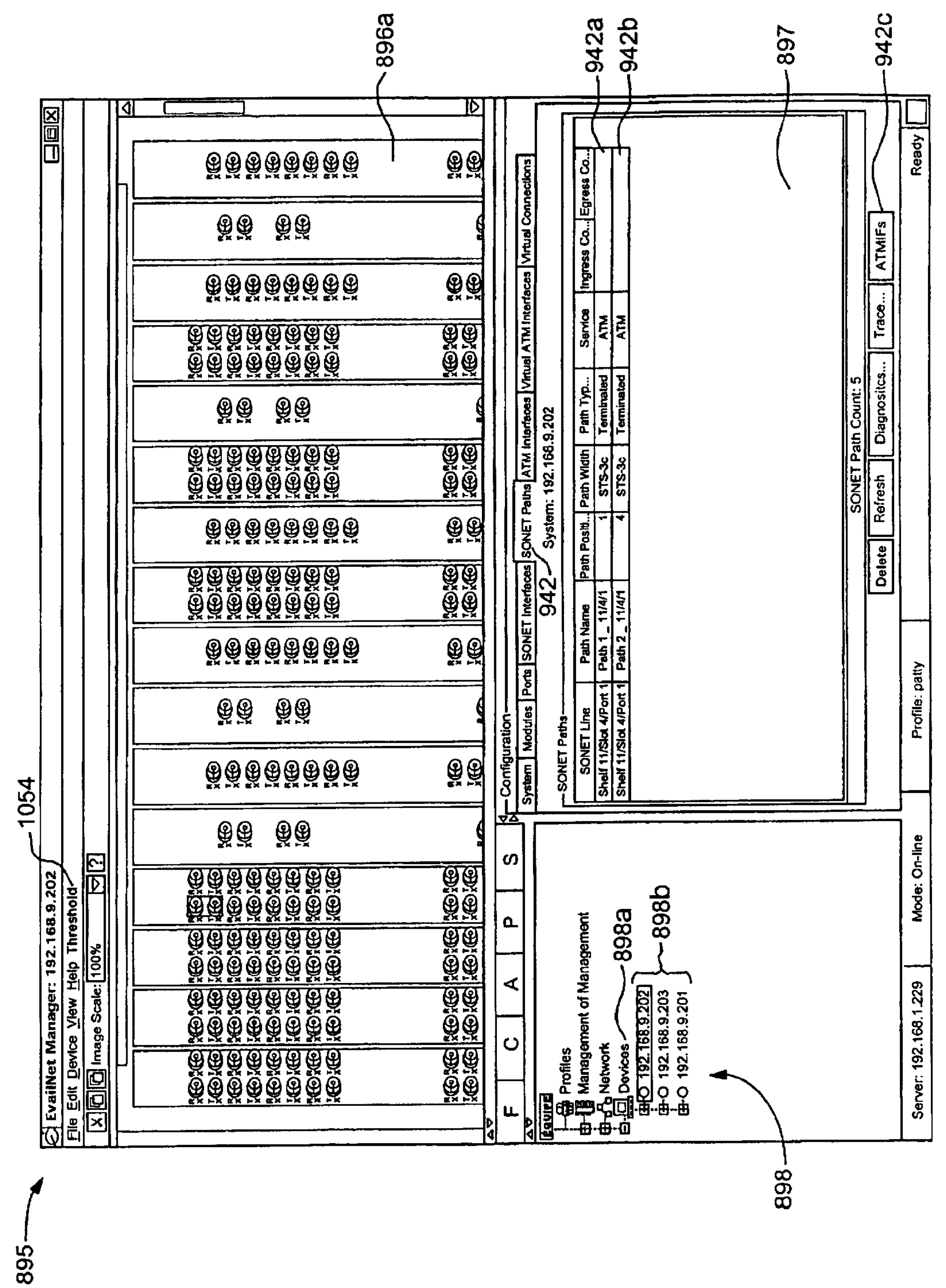
FIGS. 66*a*–66*e* are screen displays of a graphical user interface.
Figure 66B:
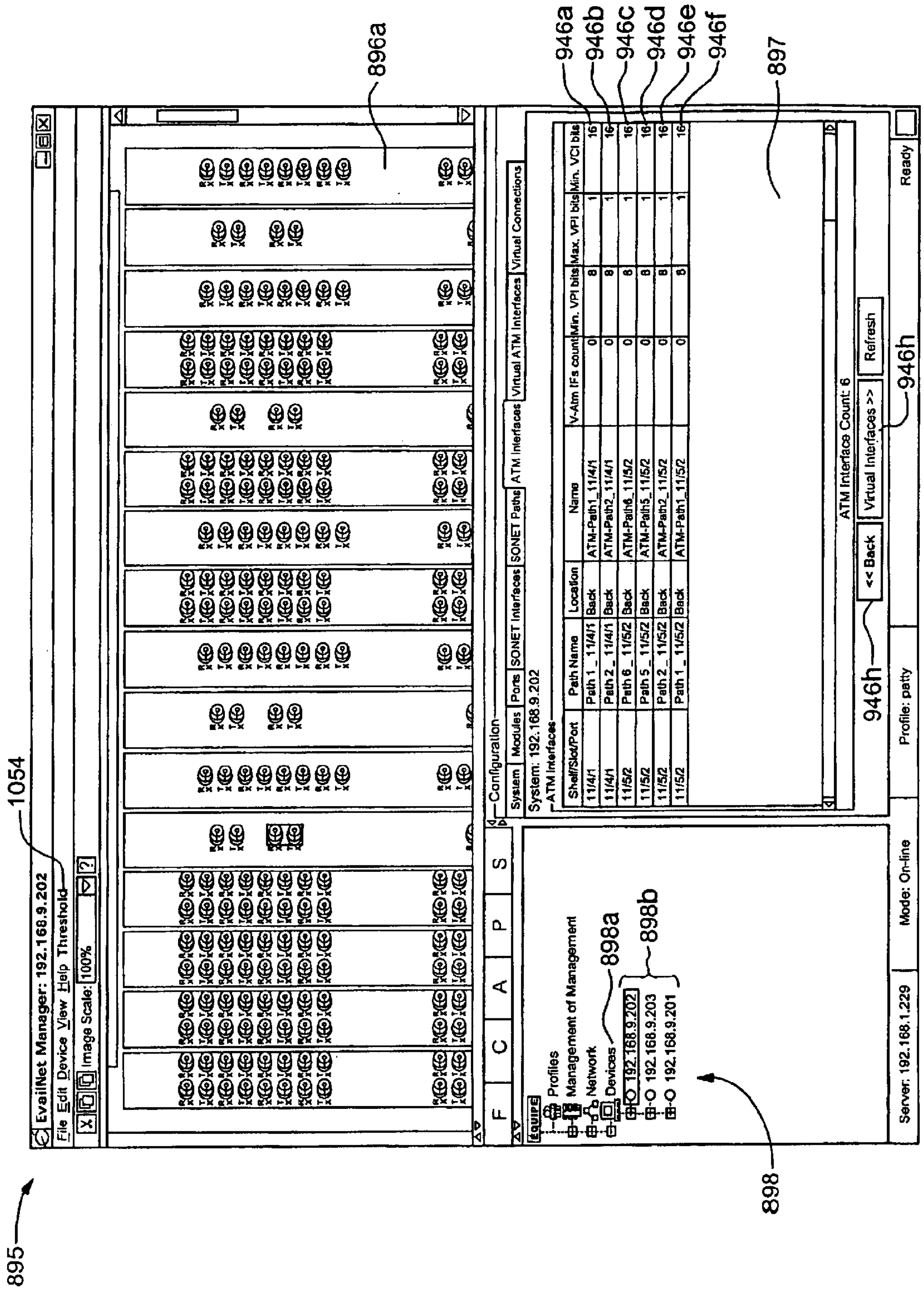
Figure 66C:
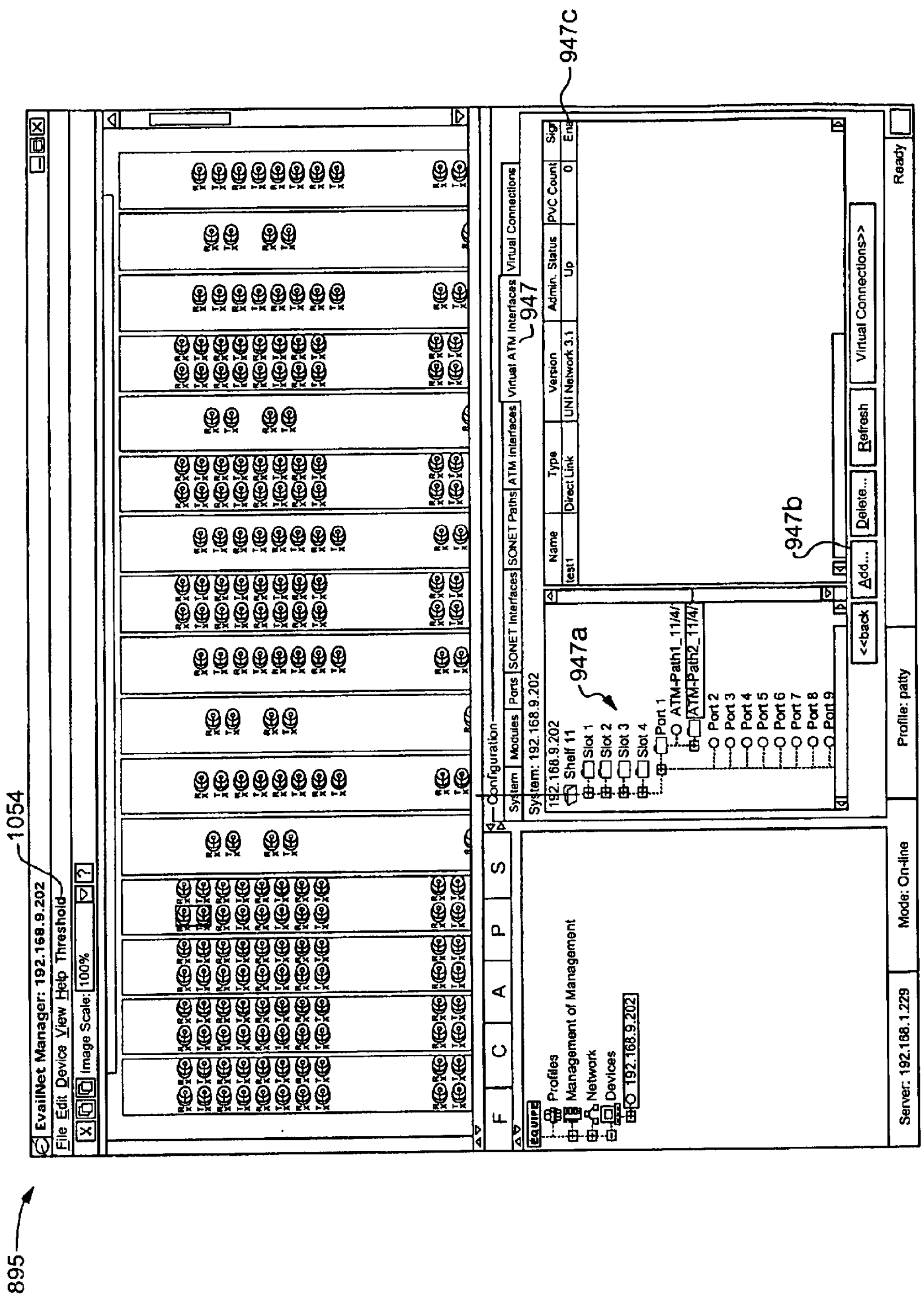
Figure 66D:
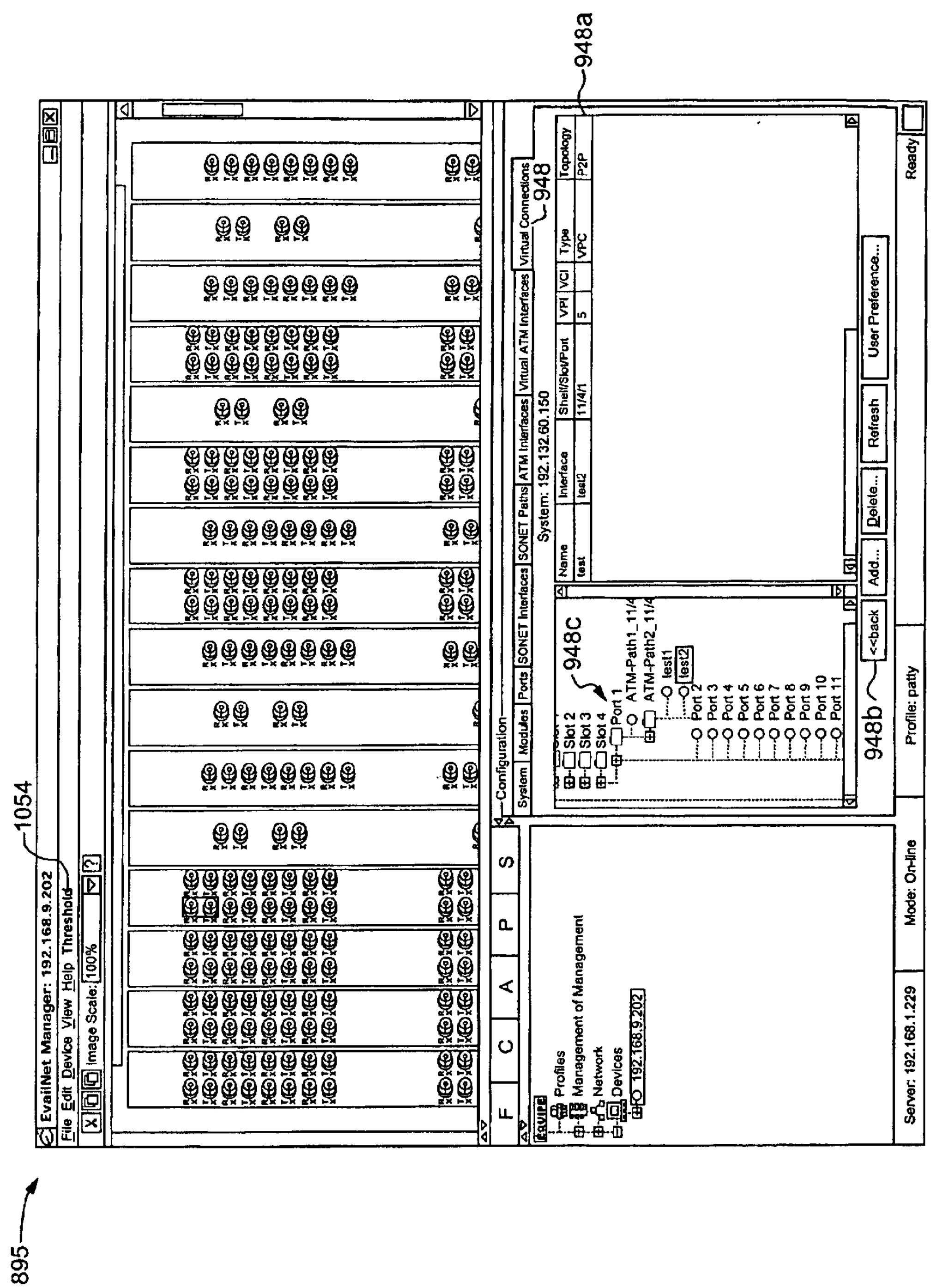
Figure 66E:
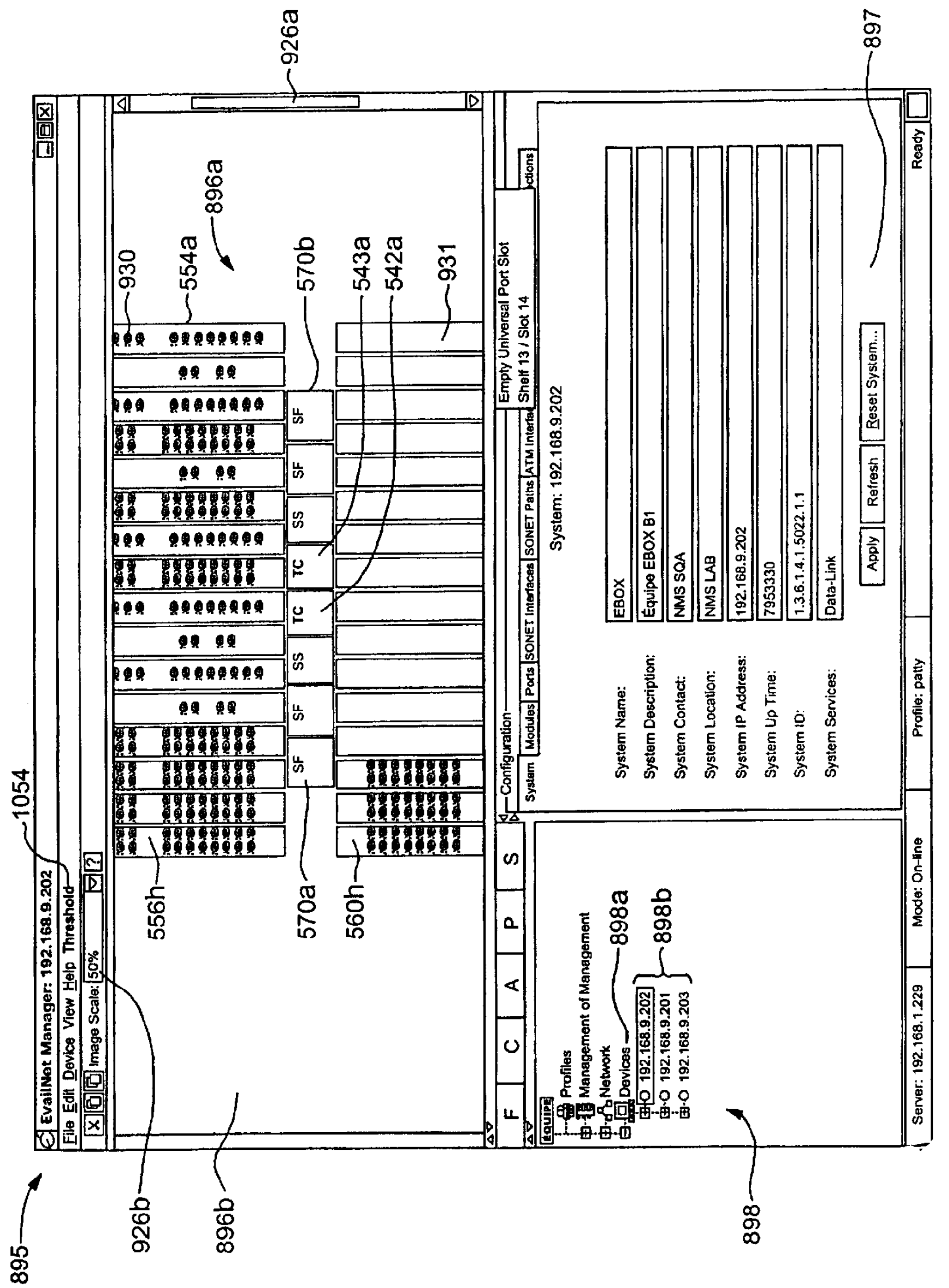
Figure 67:
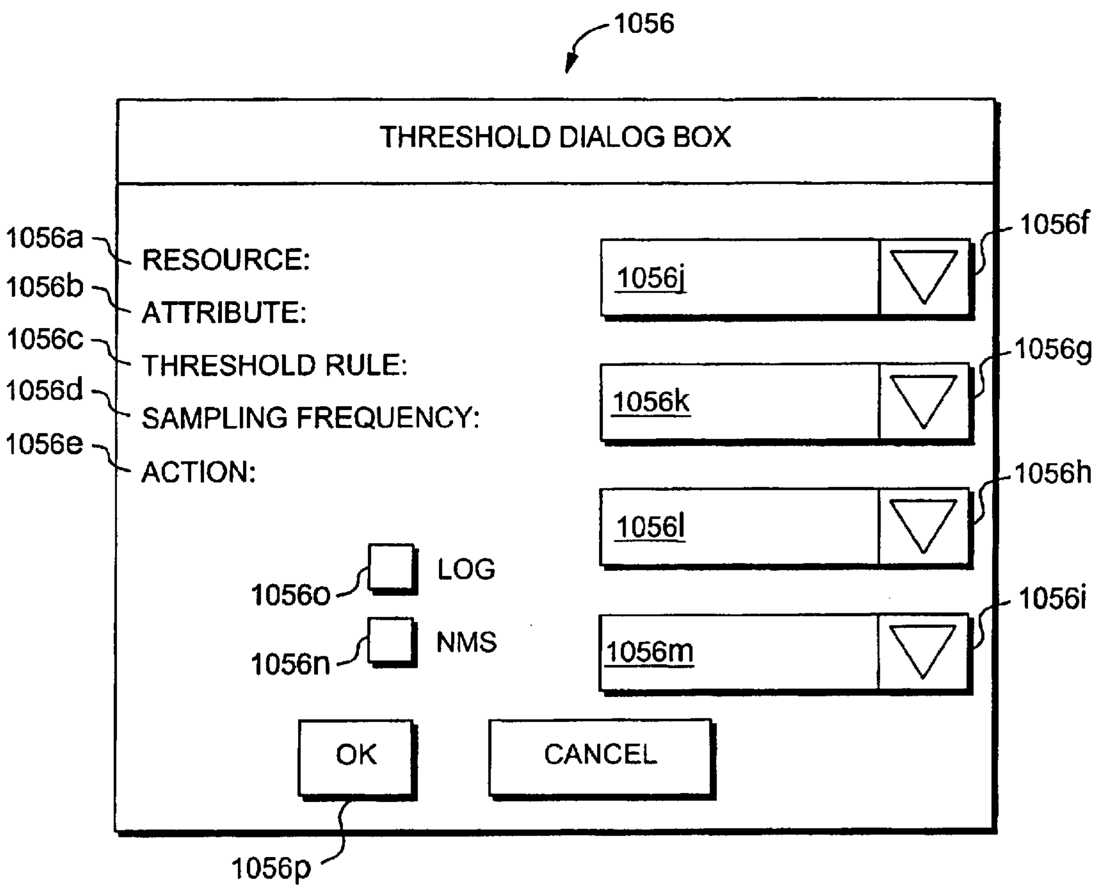
FIG. 67 is a screen display of a threshold dialog box.

In one embodiment, to establish a threshold evaluation for a resource attribute, a user (e.g., a network manager) selects a resource in graphical user interface (GUI) 895 (FIGS. 66a–66e) and then selects a Threshold menu option 1054 to cause a Threshold dialog box 1056 (FIG. 67) to be displayed. For example, a user may select SONET Path 942a (FIG. 66a), ATM Interface 946b (FIG. 66b), Virtual ATM Interface 947c (FIG. 66c) or Virtual Connection 948a (FIG. 66d) and then Threshold menu option 1054 to cause a Threshold dialog box 1056 (FIG. 67) to be displayed. As another example, for attributes related to network device hardware resources—for example, unused hard drive space—the user may select a card (e.g., internal processor control card 542a, FIG. 66e) corresponding to the hardware resource (e.g., hard drive 421, FIG. 65) and attribute (e.g., hard drive space) and then select Threshold menu option 1054 to cause the Threshold dialog box to be displayed. The Threshold dialog box may include many different elements. In one embodiment, the Threshold dialog box includes a Resource element 1056a, an Attribute element 1056b, a Threshold Rule element 1056c, a Sampling Frequency element 1056d and an Action element 1056e. The resource element window 1056j is automatically filled in with a resource name corresponding to the resource selected by the user. If the user's selection (e.g., a hardware component) is associated with more than one resource, a default resource name is entered in window 1056j and the user may accept that resource name or choose a different resource name from pull down menu 1056f. Default values may also be inserted in attribute window 1056k, the threshold rule window 1056L and the sampling frequency window 1056m. Again, the user may accept these default values or select a value from corresponding pull-down menus 1056h–1056i.

The Attribute element identifies the specific resource attribute that is to be examined against the threshold rule. For example, the resource may be a SONET path and the attribute may be "unavailable seconds" indicating that the user wants to check the number of seconds the selected SONET path is unavailable against the threshold rule. The corresponding applications—in this case, SONET drivers—maintain values (for example, in counters) associated with the attribute or have access to other applications that maintain values associated with the attribute. For example, a SONET driver may maintain a counter for seconds that a SONET path is unavailable or the attribute may correspond to a Management Information Base (MIB) Object Identifier (OID) and the SONET driver may access an SNMP subagent to retrieve the current value for the MIB OID. The MIB OID identifies a table and statistic maintained by the SNMP subagent.

As described above, user profiles may be used to limit each user's access to particular network device resources. In addition, a user profile may be used to limit which network device resource attributes a user may evaluate against thresholds. For example, a user profile may list only those attributes the user associated with the profile may evaluate, and this list of attributes may be made available to the user through the Threshold dialog box attribute element pull-down menu 1056*g*.

With respect to the Threshold Rule element and Sampling Frequency element, in addition to choosing the default value or a value from the corresponding pull-down menu, the user may type a different value into windows 1056L and 1056*m*. For example, pull-down menu 1056*h* may list ten possible rules or expressions, one of which is chosen as the default value and automatically listed in window 1056L. The user may accept the default value, select one of the other nine rules listed in the pull-down menu or type in a new expression in window 1056L.

The Threshold Rule element identifies the expression against which the attribute for the selected resource will be checked. For example, the threshold rule may be a simple expression such as "if attribute >10", "if attribute is <5", "if attribute is >10 or <5" or "if attribute=0". As another example, the threshold rule may be a more complex expression such as an expression using the Remote Monitoring (RMON) MIB as a model. Since network devices generally have peak time periods when a large amount of network traffic is transmitted and received and off-peak time periods when less network traffic is transmitted and received, a user may want a threshold rule to include the time of day. For example, the user may want to be notified if an attribute (e.g., failed call attempts) for a resource (e.g., ATM interface) is greater than 10 during the hours between 8:00 am and 7:00 pm or greater than 5 between the hours of 7:00 pm and 8:00 am. To accomplish this, the user might select or input the following expression: "if failed call attempts >10 between 8:00 am–7:00 pm or >5 between 7:00 pm–8:00 am". As another example, the user may want to be notified when a particular attribute exceeds a threshold and then only if it remains over that threshold for a particular number of sampling periods (hereinafter referred to as frequency of events (FOE) threshold rule). Again, the user may simply select or enter an expression for the FOE threshold rule. The NMS client may add any new rules to pull-down menu 1056*h*.

The Sampling Frequency element identifies the periodicity with which the attribute for the selected resource will be checked against the threshold rule. As described below, the user may select a sampling frequency (e.g., seconds, minutes, hours, days, weeks, etc.) from a pull-down menu or type in a new sampling frequency (e.g., 6 hours). In general, users set sampling frequencies based upon the criticality of the failure. That is, sampling frequencies will be shorter for those attributes that are used to detect critical network device failures. A short sampling frequency (e.g., five minutes) on a critical resource attribute may allow the network manager to be quickly notified of any issues such that the network manager may address the issue and prevent the failure.

To receive notices of a threshold event for the selected resource, the user selects NMS element 1056*n* within Action element 1056*e* of the Threshold dialog box. Selecting NMS element 1056*n* causes TMLs within applications including that resource attribute to report threshold events to SNMP master agent 1042 (FIG. 65) or another central process used to manage the distribution of events/traps. The SNMP master agent then sends an SNMP trap to the appropriate NMS server, which notifies the appropriate NMS client, which displays a notice to the user through GUI 895. Alternatively or in addition, the user may select Log element 1056*o* within Action element 1056*e* of the Threshold dialog box to cause threshold events to be logged. Selecting Log element 1056*o* causes TMLs within applications including the selected resource attribute to report threshold events to Global Log Service 1044 (FIG. 65). The Global Log Service then stores the event in one or more log files within hard drive 421.

When the user is finished selecting and entering values for the elements within the Threshold dialog box, the user selects an OK button 1056*p*. The NMS client sends the data from the Threshold dialog box to an NMS server (e.g., NMS server 851*a*, FIG. 65). As described above, although hidden from the user, the NMS client saves the logical identification (LID) or physical identification (PID) associated with each resource within the GUI tables, and the data sent by the NMS client to the NMS server includes the LID/ PID associated with the selected resource. For example, SONET path 942*a* (FIG. 66*a*) may have been assigned LID 901 (FIG. 60*g*), and any threshold data sent from an NMS client to an NMS server and corresponding to SONET path 942*a* will include LID 901. The NMS server uses the received data to update tables in configuration database 42 of the network device selected in GUI 895.

Referring to FIG. 68, specifically, within Dynamic Threshold table 1048, the NMS server enters the resource ID (LID or PID) into column 1048*a*, the attribute into column 1048*c*, the sampling frequency into column 1048*d*, the reporting structure (log and/or SNMP trap) into action column 1048*e* and the threshold evaluation expression into rule column 1048*f*. The evaluation expression is stored as a string value in rule column 1048*f*. To avoid having duplicate records for the same resource ID and threshold name, the NMS server first searches Dynamic Threshold table 1048 for records (i.e., rows) including the same resource ID and attribute. If a match is found, then the NMS server updates the values in the other columns with the new data received from the NMS client. If a match is not found, then the NMS server creates a new row and inserts all the data received from the NMS client.

The network manager is likely to want to evaluate many similar resources in a similar way. For example, a network manager may want to evaluate a large number of SONET paths against the same attributes and rules using the same sampling frequency and reporting structure. That is, for each of these many SONET paths, the network manager may want to evaluate the same attribute (e.g., path errors (path end), path errors (far end), unavailable seconds (path end), unavailable seconds (far end), etc.) using the same evaluation expression (e.g., attribute >10), sampling frequency (e.g., 15 minutes) and reporting structure (e.g., SNMP trap). Having a row for each resource ID in the Dynamic Threshold table, therefore, leads to a large amount of repetitive data.

To reduce the amount of repetitive data, one or more rows in the Dynamic Threshold table may represent a threshold group that may be associated with multiple resource IDs. Referring to FIG. 69*a*, Dynamic Threshold table 1048' includes a threshold group LID column 1048*a*' and a resource column 1048*b*' instead of the resource ID column (e.g., 1048a, FIG. 68) found in Dynamic Threshold table 1048. Threshold group LID column 1048a' corresponds to threshold group LID column 1052b in Threshold Group table 1052 (FIG. 69b). Threshold Group table 1052 further includes a resource ID column 1052a.

The TML in each application uses the Threshold Group table to associate each resource ID with a threshold group LID. As a result, one or more resource IDs may be associated with the same threshold group LID. For example, within Threshold Group table 1052, SONET path LIDs 901 and 903 are associated with threshold group LID 8312. Within Dynamic Threshold table 1048', threshold group LID 8312 corresponds to three rows each of which corresponds to a different attribute (e.g., section errors, line errors (line end) and line errors (far end)). As a result, instead of having three rows for each SONET path LID 901 and 903, the Dynamic Threshold table 1048' includes only three rows shared by both SONET path LIDs. The TMLs within the SONET drivers corresponding to SONET path LIDs 901 and 903, therefore, each use the attributes, sampling frequencies, reporting structures and rules in the three rows corresponding to threshold group LID 8312. Although not shown, additional SONET path LIDs may also be associated with threshold group 8312, and other SONET path LIDs (e.g., 902) may be associated with other threshold groups (e.g., 8313).

As previously mentioned, SONET paths are only one type of resource and many other types of resources with various constraints may be checked against threshold rules. For example, an ATM interface assigned an LID of 5054 may be associated with threshold group 8433 in Threshold group table 1052, and threshold group 8433 may include multiple records in Dynamic Threshold table 1048' each of which corresponds to a different attribute, for example, failed call attempts and has errors. As another example, a virtual connection assigned an LID of 7312 may be associated with threshold group 8542, and threshold group 8542 may also include multiple records in Dynamic Threshold table 1048' each of which corresponds to a different attribute, for example, received (Rx) traffic and transmitted (Tx) traffic. Any resource including an assigned LID or PID and at least one measurable attribute may be checked against a threshold expression.

Where Dynamic Threshold table 1048' is implemented, once the NMS server receives threshold data from the NMS client, the NMS server searches the Threshold Group table for the resource LID/PID. If a match is found, then the NMS server searches the Dynamic Threshold table for records associated with the threshold group LID corresponding to the resource LID/PID. The NMS server then compares the attribute in the data received from the NMS client to the attributes retrieved from each record in the Dynamic Threshold table. If a match is found, the NMS server compares the remaining data received from the NMS client to the data retrieved from that record in the Dynamic Threshold table. If any of the data does not match, then the NMS server first searches Threshold Group table 1052 for the threshold group LID to determine if any other resources correspond to that group LID. If no, then the NMS server does not need to create a new threshold group and simply updates the group records in the Dynamic Threshold table. If yes, then the NMS server needs to create a new threshold group and does so by adding a new row in the Dynamic Threshold table, inserting the data received from the NMS client, and assigning a new threshold group LID. The NMS server then updates the record in the Threshold Group table associated with the resource LID/PID with the new threshold group LID. The NMS server also copies over any additional records associated with the original threshold group LID but for different attributes into new records in the Dynamic Threshold table and inserts the new threshold group LID.

Many threshold groups may use the same basic rule/evaluation expression with the same or different variables. For example, a common threshold evaluation expression may be "if attribute >a", where 'a' is a variable. A network manager may want to be notified if the section errors on a SONET path exceed 10 and if the has errors on an ATM interface exceed 13. Within Dynamic Threshold table 1048 (FIG. 68), rule column 1048f for both records 1048g and 1048h would include different strings because although the basic expression is the same, the threshold variable (e.g., 10, 13) is different for both records. To allow rules to be shared by many threshold groups, Dynamic Threshold table 1048" (FIG. 70a) includes a rule LID column 1048f" and threshold variable columns 1048g"–1048t". More or less variable columns may be included in the Dynamic Threshold table.

The identification numbers stored in rule LID column 1048f" correspond to identification numbers stored in rule LID column 1050a (FIG. 70b) in Threshold Rule table 1050. The Threshold Rule table also includes an expression column 1050b within which are stored the basic rules that may be shared by one or more threshold groups in Dynamic Threshold table 1048". For example, row 1050c in the Threshold Rule table includes a rule LID of 9421 and an expression of "if attribute >a". This rule LID of 9421 may be included in both rows 1048u" and 1048v" of Dynamic Threshold table 1048" to allow both threshold groups 8312 and 8433 to share that expression string. In addition, each variable needed by the expression is stored in one of the variable columns 1048g"–1048t". Thus, for threshold group LID 8312 in record 1048u", the expression is converted into "if section errors >10", and for threshold group LID 8433, the expression is converted into "if hcs errors >13".

When the user adds a new expression to Threshold dialog box 1056 (FIG. 67), the NMS server adds a row to Threshold Rule table 1050, strips the new expression of values to provide a basic new expression and inserts the basic new expression in column 1050b of the new row. The NMS server also assigns a new rule LID and inserts that into column 1050a of the new row. Within Dynamic Threshold table 1048", the NMS server then adds the new rule LID to column 1048f" in the record associated with the threshold group LID corresponding to the resource listed in the Threshold dialog box. The NMS server also adds any variable values to columns 1048g"–1048t" of this same record.

Instead of having the TML maintain a sampling timer for a particular resource attribute, the application may continuously track an attribute and then notify the TML if an event occurs. For example, an application, such as Global Log Service 1044 (FIG. 65), may monitor the amount of unused space in hard drive 421 and if that amount falls below a certain level, the Global Log Service application may notify its linked-in TML 1046. Then, in accordance with the action listed in the Dynamic Threshold table, the TML will send a notice to SNMP master agent 1042 to cause the SNMP master agent to issue an SNMP trap to an NMS server and/or the TML will cause the Global Log Service to log the event.

As explained above, many different threshold expressions may be used to evaluate resource attributes. In addition, one or more expressions may be cascaded together—that is, a detected threshold event corresponding to a first threshold expression may cause the TML to begin using a second threshold expression. Referring to FIG. 71, Dynamic Threshold table 1048''' may include an Active/Inactive column 1048w''' and each threshold group LID may include two or more rows corresponding to the same resource and attribute. For example, rows 1048x''' and 1048y''' correspond to threshold group LID 8588, the hard drive resource and the unused disk space attribute. Each row, however, includes a different rule LID 9428, 9424 in Rule LID column 1048f''' and, in accordance with Active/Inactive column 1048w''', row 1048x''' starts out as an active threshold evaluation and row 1048y''' starts out as an inactive threshold evaluation. As defined in Threshold Rule table 1050, rule LID 9428 corresponds to the expression "if attribute is <a, go to rule LID b". Within row 1048x''', this converts to "if unused disk space is <80%, go to rule LID 9424". Thus, if the TML detects that less than 80% of unused disk space is available in hard drive 421, the TML will, in accordance with Action column 1048e''', cause the Global Log Service to log the threshold event and then change the status of row 1048x''' to inactive and the status of row 1048y''' to active. Rule 9424 in the Threshold Rule table corresponds to expression "if attribute <a" and with respect to row 1048y''', this converts to "if unused disk space is <20%". Thus, once the TML detects that the unused disk space is less than 80% (row 1048x'''), the TML begins using an increased sampling frequency of every 30 seconds in accordance with row 1048y''' and if the unused disk space is determined to be less than 20% (row 1048y'''), then the TML, in accordance with Action column 1048e''' sends a notice to SNMP master agent 1042 to cause the SNMP master agent to send an SNMP trap to the NMS server. Thus, rules 9428 and 9424 are cascaded together.

Action column 1048e''' in the Dynamic Threshold table may include any possible action that a process within network device 540 may take. For example, in addition to notifying the Global Log Service and the Master SNMP agent, the process may notify a process capable of sending an e-mail message or a page to the user. Thus, if a network resource attribute causes a threshold event and that resource attribute corresponds to a potentially critical failure, the network manager may want to be paged in order to address the issue as quickly as possible to attempt to avoid the actual failure.

Linking the TML into each application having resource attributes that may be checked against thresholds, removes the need to hard code thresholding into these applications. Upgrading or modifying thresholding is, therefore, simplified since only the TML needs to be changed and then re-linked into each application to effect the upgrade/modification. Importantly, the thresholding metadata received from the user, stored in the one or more tables within the configuration database and retrieved by the TML provides massive flexibility to the TML such that TML modifications and upgrades should be very infrequent. For example, in the past, to add new threshold rules, network device software needed to be upgraded and re-released and the network device had to be re-booted. In the present invention, users may directly enter new rules, which are then automatically used within the network device without the need to change or re-release software or reboot the network device. Thus, neither the applications nor the TML need to be changed or re-released to allow the applications and TML to use a new rule. In addition, Threshold dialog box and configuration tables allow the user to continuously change the threshold rules and variables, the resources and attributes that are evaluated, the sampling frequency and the reporting structure. Thus, the user may proactively manage their network by gathering data over time and then change thresholding as needed. In essence, users may customize their network device health monitoring dynamically at their local site, for example, at a network carrier's premises.

The TML and the tables in the configuration database are not application specific or resource type specific. As a result, when new applications are created, they are simply linked with the TML when the application is built and prior to loading the application in the network device. Once added to the network, the resources available through the new application are made available to the user through GUI 895 and the user may establish threshold evaluations as described above through the Threshold dialog box. For example, a new type of forwarding card (e.g., 552a, FIG. 65) that is capable of transmitting network traffic in accordance with the MPLS protocol may be added to network device 540. To allow threshold evaluations of MPLS resources, a new MPLS driver (e.g., 419a) is linked with TML 1046 when the MPLS driver is built and prior to loading the MPLS driver into network device 540. Once loaded, GUI 895 will show the new board as present in the network device mimic 896a (FIG. 66a) and MPLS related tabs (e.g., MPLS interfaces) will be added to status window 897. The user may select an MPLS interface from an MPLS interfaces tab and then select Threshold menu option 1054 as described above with respect to ATM interfaces. Consequently, changes to or newly added applications are independent of the TML and changes to the TML are independent of the applications with the exception that the applications need to be re-linked with the TML if either are changed.

Flexibility is also added by allowing users to evaluate any resource attribute within the network device against a threshold rule. This is possible because when a user selects a resource, the data sent from the NMS client to the NMS server includes the resource's unique LID or PID. Since each resource may be uniquely identified, each resource attribute may also be checked against a threshold rule. For example, a user may want to be notified if a power supply within the network device fails within a sampling period of every 6 hours. Since the power supply has a unique PID and may be selected by the user in GUI 895, the user may establish this threshold evaluation. As another example, a network manager may have noticed that nightly backups scheduled for 2:00 am are not being completed. For each virtual connection through which the backups are normally completed, the network manager may establish a threshold evaluation to determine whether other traffic is present on these connections at that time of night. In addition, if excess traffic were present on those connections, since each resource may be associated with one or more customer groups, the network manager would be able to determine which customers were using those connections at that time and whether they had paid for such service. As yet another example, a network manager may wish to know how often automatic protection switching is executed—that is, how often a primary module fails over to a backup module. The TML may be linked into the automatic protection switching application and since each module includes a unique PID, the network manager is able to establish a threshold evaluation to make the necessary determination.

Power Distribution

Typically, telecommunications network devices include a central power supply system or a distributed power supply system. A central power supply system includes a centrally located power supply that receives power feeds (AC or unregulated DC) from an external source, converts the raw power into regulated voltages (e.g., 5 v, 3.3 v, 1.5 v, 1.2 v) and then distributes the regulated voltages through a backplane or midplane to the appropriate modules in the network device. A distributed power supply system includes power supply circuitry on each module needing power. Unregulated DC power feeds from an external source or sources are connected to filters in the network device and from the filters the unregulated power is distributed to each module in the device needing power. The power supply circuitry on each module then converts the unregulated power into the regulated voltages necessary for that particular module. The filters are used primarily to meet emissions requirements and also provide some protection against external noise.

For fully configured/loaded network devices a central power supply system is often less expensive than a distributed power supply system. For network devices that may be configured/loaded over time—that is, modules may be purchased as network demands increase—the distributed power supply system reduces the cost of the base network device by pushing the cost of the power supply onto each module. Distributed power supply systems also allow for more variation in the types of components used and the voltages required by those components since the power supply circuitry on each module can be designed to provide the particular voltages required by the module. The central power supply usually cannot supply all necessary voltages without consuming extensive backplane/midplane routing space.

In addition, a new module requiring unique voltages may be added to a distributed power supply system since the power supply circuitry on the module itself is designed to provide the unique voltages. Such a module cannot be added to a network device with a central power supply system without either modifying the central power supply to provide the additional voltages and then building a new backplane/midplane to deliver the new voltages or implementing a distributed power supply on the new module to convert an available voltage from the existing central power supply into the needed voltages. The additional distributed power supply, however, will increase the cost and consume more space and power. Each power supply (i.e., the central and distributed power supply) consumes power: typically, 10–20% is consumed in each power supply. The increase in power consumption also leads to an increase in heat dissipation, which may result in thermal problems.

Distributed power supply systems may also improve network device reliability and availability since the power supply circuitry is located on multiple modules—that is, if the power supply circuitry of one module fails, it will not affect the remaining modules. If a central power supply is used, a more complicated redundancy scheme is required, which usually results in lower reliability. In either case, whether a central power supply system or a distributed power supply system is chosen, a network device generally includes an identical, redundant power supply system to increase reliability and availability, and the redundant power supply is preferably attached to a separate external power source.

Many network devices include central power supply systems that are removable. Thus, one advantage to such a central power supply system is that if one system fails it may be removed and replaced while the other power supply system continues to function. Unfortunately with distributed power supply systems, the connections to the external raw power source and the filters used to reduce noise are fixed, perhaps through rivets, to the network device chassis. As a result, these components are not replaceable, and if one of these components needs to be replaced, the network device must be shut down. Network service providers are generally required to provide five 9's availability or 99.999% network up time. Shutting down a network device to replace failed power supply components directly impacts the network device's availability.

As network devices have become larger, multiple power feeds have been required. In such instances, central power supply systems include multiple, independent central power supply subsystems each connected to a separate power feed and each separately removable from the network device. The independence of each subsystem increases the network device's reliability and availability. However, each of these units generally requires considerable space within the network device, which may reduce the number of functional modules that may be included in the network device.

In recent years, deregulation has forced incumbent telecommunications companies to lease out space to competitors. The equipment owned by the different companies within these sites is generally kept in separate locked cages. Consequently, a competitor may not have access to the site's power source circuit breakers. In response to this situation, many network device providers connect a circuit breaker to each power feed and expose the circuit breaker switch to allow network managers to switch off the power delivered to the device when necessary. Each circuit breaker switch, however, requires a large amount of space (e.g., 3 by 4 inches) on the front or back of the device and may reduce the number of functional network modules that may be included in the device.

Figure 72A:
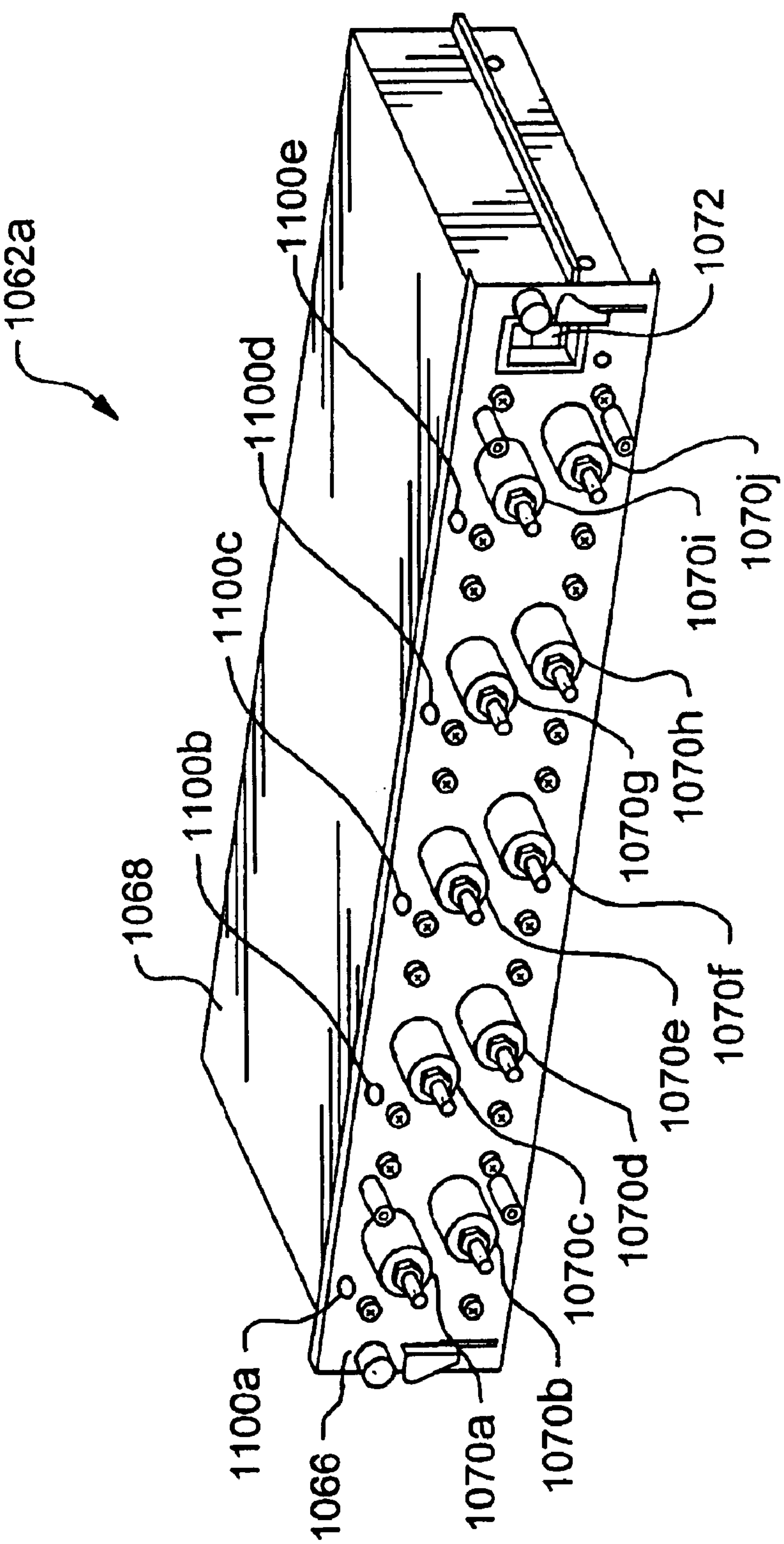
FIG. 72*a* is a front, isometric view of a power distribution unit.
Figure 72B:
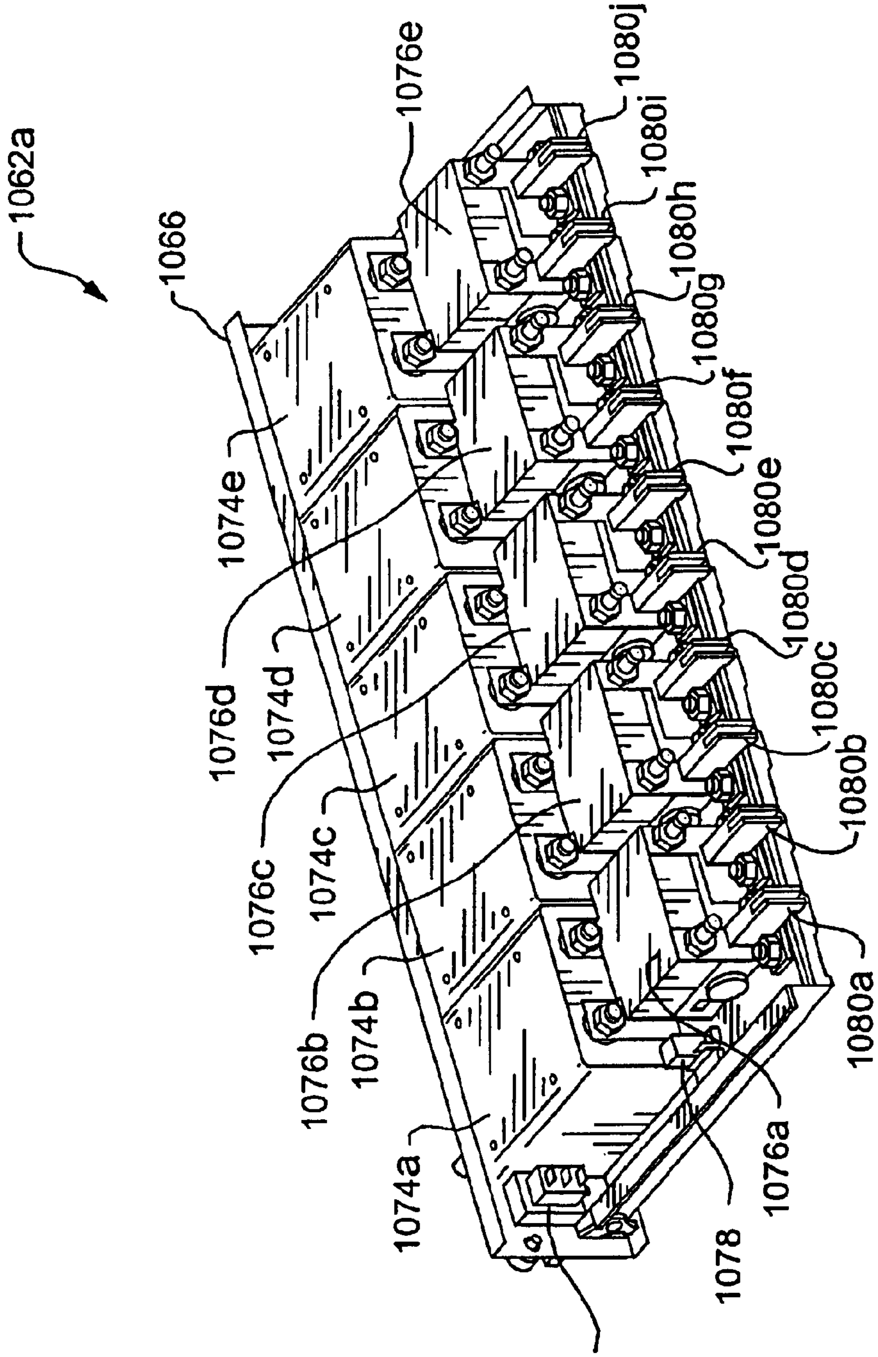
FIG. 72*b* is a rear, isometric view of the power distribution unit of FIG. 72*a* without a cover.
Figure 73A:
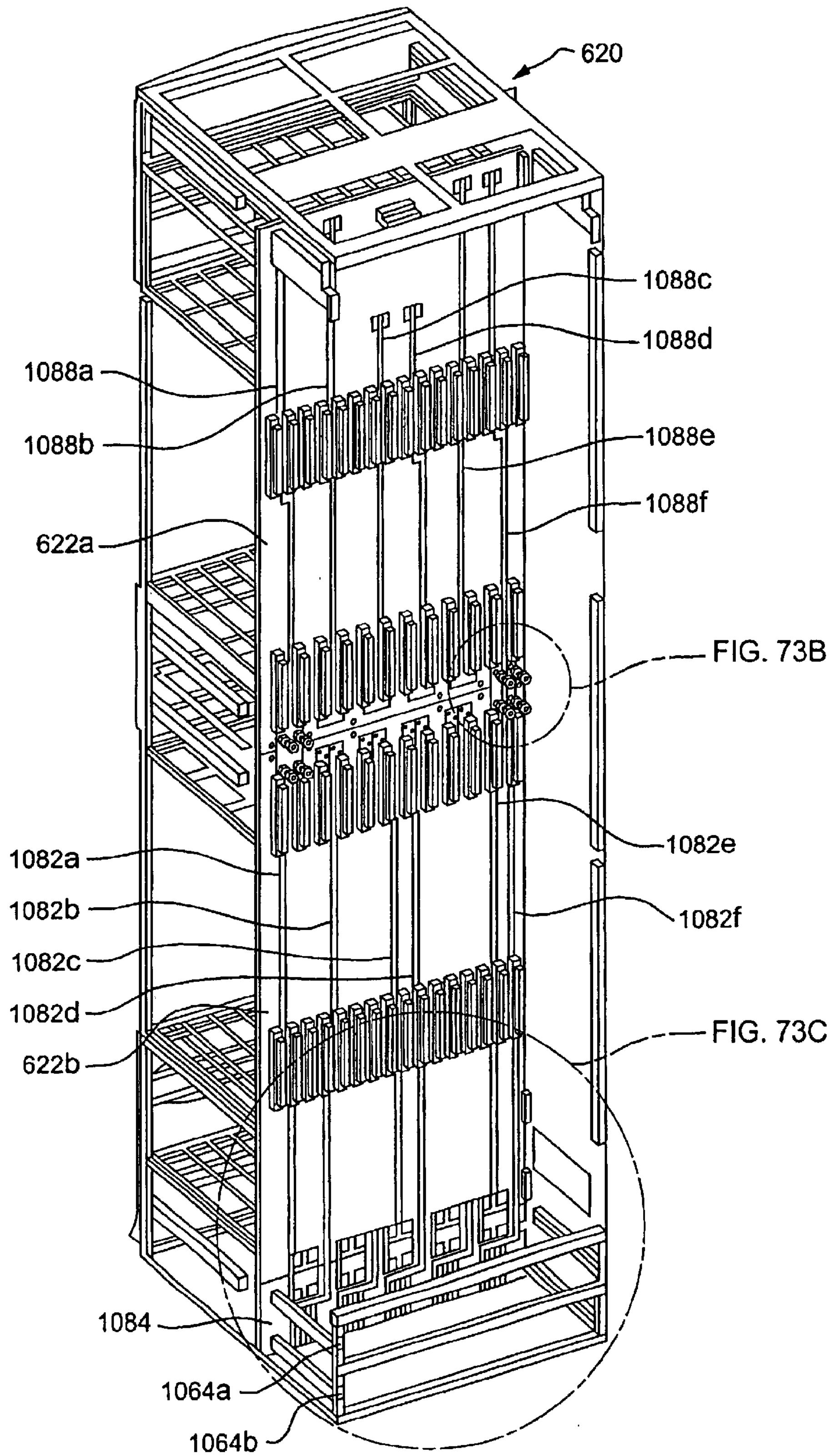
FIG. 73*a* is a rear, isometric view of a network device chassis including dual midplanes.

In one embodiment, network device 540 (FIG. 2*a*) includes a distributed power supply system. External power feeds from external power sources are connected to the network device through power entry (PE) unit 1060 (FIG. 41*c*). In one embodiment, PE unit 1060 includes two independent, removable, redundant power distribution units (PDUs) 1062*a* and 1062*b* (FIGS. 72*a* and 72*b*). Only PDU 1062*a* is shown for convenience. It should be understood, however, that PDU 1062*b* is identical to PDU 1062*a*. Each PDU is inserted within a separate slot 1064*a* and 1064*b* (FIG. 73*a*) in chassis 620.

Each PDU 1062*a*, 1062*b* includes a faceplate 1066 and a cover 1068 (FIG. 72*a*). The faceplate will be exposed on the rear of the chassis when the PDU is inserted in one of the chassis slots 1064*a* or 1064*b*. In one embodiment, each PDU 1062*a*, 1062*b* receives power from five power feeds through connectors 1070*a*–1070*j* extending from faceplate 1066, where each power feed is connected to two connectors (e.g., 1070*a* and 1070*b*). The faceplate also includes an on/off toggle switch 1072. Including five power feeds in one replaceable PDU provides a higher power density (Amps/cubic inch) over systems that include replaceable subsystems for each power feed. For example, each PDU 1062*a* and 1062*b* may be 17×9×2.25 inches (i.e., 344 cubic inches) and connected to five 60 Amp power feeds such that each PDU provides 300 Amps of power in a very small amount of space for a total power density of 0.87 Amps/cu. in.

As can be seen with cover 1068 removed (FIG. 72*b*), each PDU 1062*a*, 1062*b* includes independent filter circuitry 1074*a*–1074*e*. Each filter is connected to a pair of connectors and to an independent circuit breaker/motor combination device 1076*a*–1076*e*. For example, filter 1074*a* is connected to connectors 1070*i* and 1070*j* and circuit breaker device 1076*a*. On/off toggle switch 1072 is connected to on/off logic circuitry 1078 (partially shown) which is connected in series with each of the circuit breaker/motor devices 1076*a*–1076*e*. When on/off toggle switch 1072 is toggled from on to off or off to on, the switch sends signals to each of the circuit breaker/motor devices 1076*a*–1076*e* to cause the motor to physically switch the circuit breaker from on to off or off to on, respectively. Thus, power delivery to the network device through each of the five power feeds of one PDU is controlled by a single on/off toggle switch.

In one embodiment, the filter circuitry is an EMI filter part number A60SPL0751 from Aerovox EMI Filters Corporation in El Paso, Tex., and the circuit breaker/motor combination device is a magnetic/hydraulic circuit breaker part number CA1-X0-07-503-321-C from Carlingswitch Corporation in Plainville, Conn. Each circuit breaker/motor device also monitors the voltage it receives from the power feed to which it is connected. If the voltage falls outside a predetermined range, for example, lower than 37.5 v or higher than 75 v, then the circuit breaker/motor device automatically switches to an off position. This allows the power distribution unit to also function as a power controller unit. If the on/off switch is in an on position and one of the circuit breaker/motor devices switches to an off position, on/off logic circuitry 1078 causes a light emitting diode (LED) 1100*a*–1100*e* (FIG. 72*a*)—corresponding to the off circuit breaker—on faceplate 1066 to be illuminated. Alternatively, switches may be used instead of the circuit breaker/motor combination devices. The circuit breaker device is preferred, however, since the circuit breaker provides protection against certain failures within the network device.

The single on/off switch does not allow the circuit breakers for each power feed to be independently controlled. However, the single on/off switch does eliminate the need to expose the circuit breaker for each power feed on faceplate 1066, which significantly reduces the surface area of the network device consumed for power distribution. Since the surface area of network devices is limited, many network devices do not include on/off switches and external circuit breakers must be toggled to provide and remove power from the power feeds connected to the network devices. In a telecommunications site where access to such external circuit breakers is limited, arrangements must be made with the facilities owner to schedule service times, often a difficult arrangement since the facilities owner is usually an incumbant carrier (i.e., a competitor). Ability to turn power off may be required for device reconfigurations, upgrades, or in the event of catastrophic failure (i.e., a fire). Thus, an on/off switch provides the benefit of allowing direct control over power application to the network device, and connecting many circuit breakers within the network device to one on/off switch reduces the network device surface space required for power distribution. Reducing the surface space required may allow additional functional modules to be contained within the network device which generally allows the network device to have increased network service capacity.

Each circuit breaker/motor device 1076*a*–1076*e* includes two bus bar connectors 1080*a*–1080*j* which extend from cover 1068 (FIG. 72*a*) to allow them to be connected with bus bars 1086*a*–1086*j* (FIGS. 73*a* and 73*c*) mounted on an insulation board 1084. For example, circuit breaker/motor device 1076*a* is connected to connectors 1080*a* and 1080*b* which are connected to bus bar 1086*i* if the PDU is inserted in slot 1064*a* or bus bar 1086*j* if the PDU is inserted in slot 1064*b*. The insulation board is mounted within chassis 620 adjacent to and below the lower midplane 622*b*. The bus bars and bus bar connectors provide direct, blind mating connections for the multiple power feeds on each PDU.

Figure 73B:
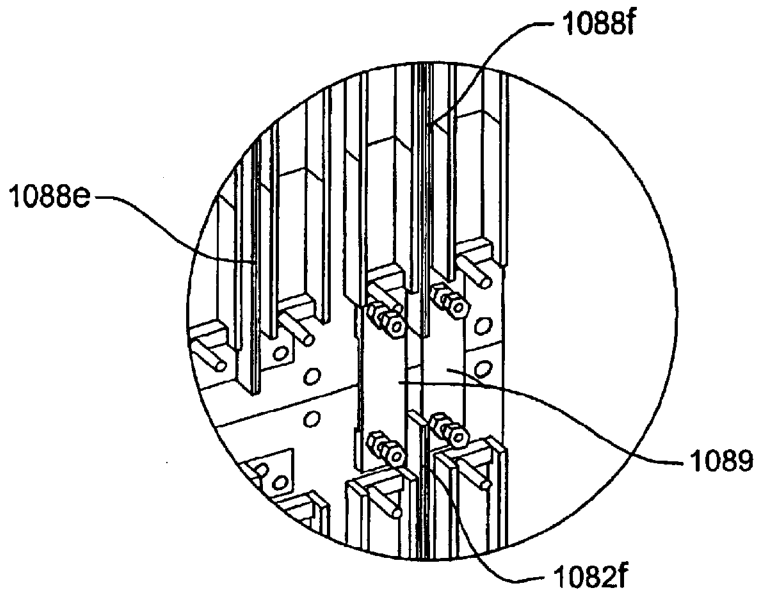
FIGS. 73*b*–73*c* are enlarged views of portions of FIG. 73*a;*.
Figure 73C:
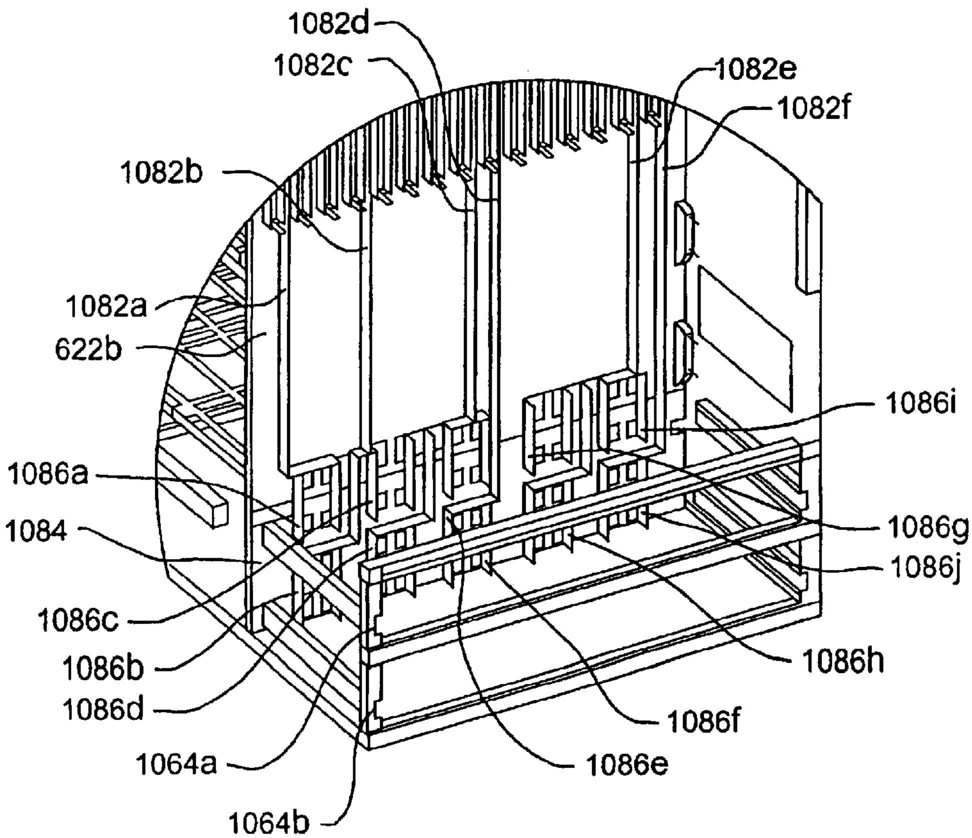

The bus bars are used to distribute power through the midplanes to each of the modules requiring power that are plugged into connectors (see FIG. 42) on the midplanes. Bus bars 1086*a* and 1086*b* are connected with bus bars 1082*a* and 1082*b*, respectively, on the lower midplane which are connected with bus bars 1088*a* and 1088*b*, respectively, on the upper midplane 622*a*. Similarly, bus bars 1086*e*, 1086*f*, 1086*i* and 1086*j* are connected with bus bars 1082*c*, 1082*d*, 1082*e* and 1082*f*, respectively, on the lower midplane which are connected with bus bars 1088*c*, 1088*d*, 1088*e* and 1088*f*, respectively, on the upper midplane. The bus bars on the midplanes are connected using metal straps 1089 (FIG. 73*b*). Bus bars 1086*c*, 1086*d*, 1086*g* and 1086*f* are connected with etches (not shown) located on internal layers within the lower midplane which are then connected with etches (not shown) located on internal layers within the upper midplane.

Bus bar connectors on the PDU inserted in upper chassis slot 1064*a* connect to bus bars 1086*a*, 1086*c*, 1086*e*, 1086*g* and 1086*i*, while bus bar connectors on the PDU inserted in lower chassis slot 1064*b* connect to bus bars 1086*b*, 1086*d*, 1086*f*, 1086*h* and 1086*j*. Thus, there are five redundant bus bar pairs, for example, bus bars 1086*a* and 1086*b* are a redundant pair as are bus bars 1086*c* and 1086*d*, 1086*e* and 1086*f*, 1086*g* and 1086*h* and 1086*i* and 1086*j*. Each module requiring power receives power through connectors on one or both of the midplanes from a redundant bus bar pair. In one embodiment, one bus bar pair is dedicated to each quadrant, for example, bus bar pair 1086*a* and 1086*b* may be dedicated to supplying power to modules inserted in quadrant two, and the fifth bus bar pair provides power to modules that are common to all quadrants, for example, switch fabric cards.

Figure 74:
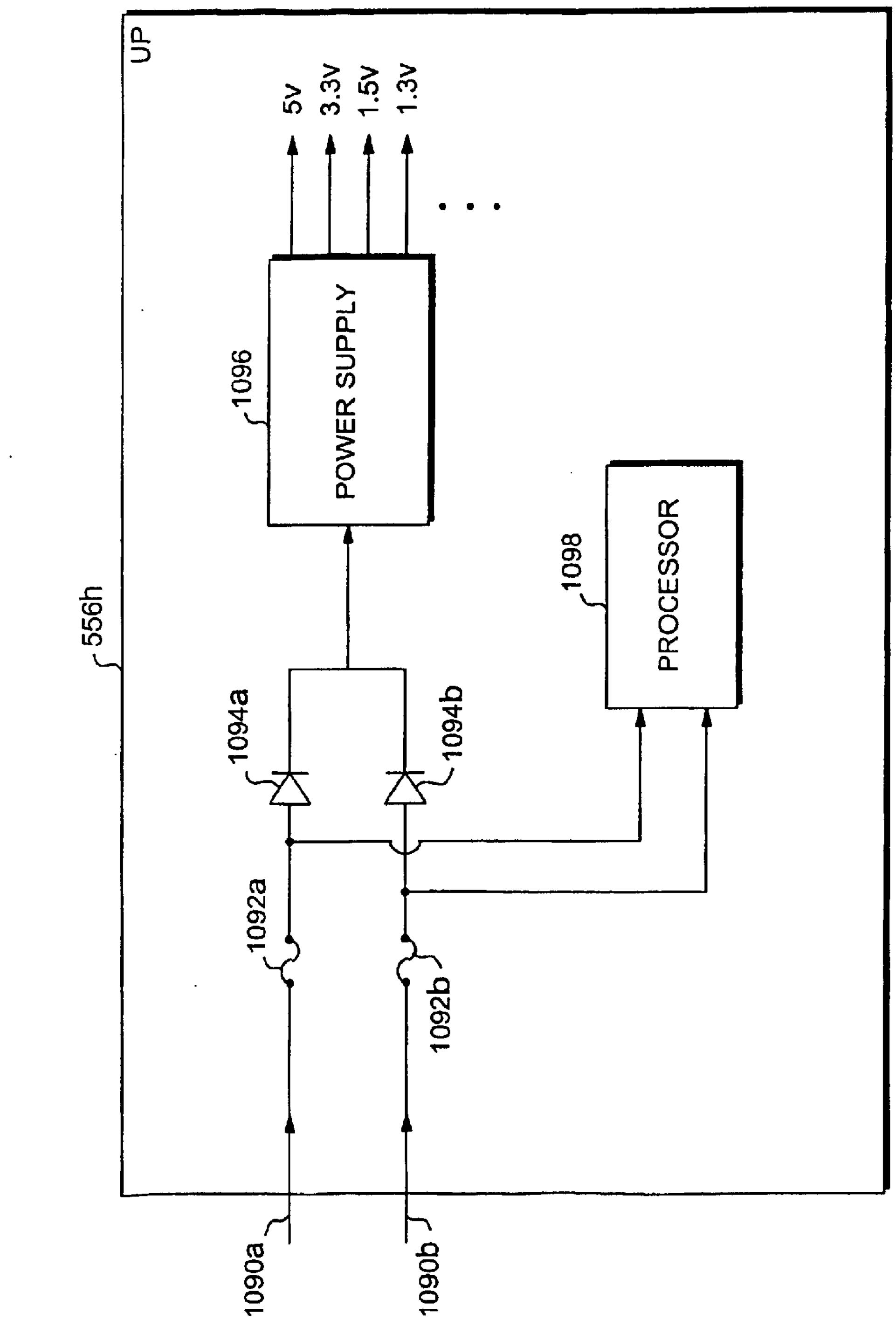
FIG. 74 is a block and schematic diagram of a portion of a module including a power supply circuit.

Referring to FIG. 74, for, example, a universal port (UP) card 556*h* receives power from redundant bus bar pair 1088*a* and 1088*b* on input lines 1090*a* and 1090*b*, respectively. Input lines 1090*a* and 1090*b* are connected to fuses 1092*a* and 1092*b*, respectively, and the outputs of the fuses are connected to diodes 1094*a* and 1094*b*, respectively. Diodes 1094*a* and 1094*b* are connected to form a diode OR circuit. As a result, a power supply circuit 1096 receives power from whichever diode 1094*a* or 1094*b* provides greater power. Consequently, if either PDU 1062*a* or 1062*b* fails, power supply circuit 1096 will continue to receive power through the diode OR from the other PDU. Power supply circuit 1096 then converts the unregulated DC power received from the diode OR into the particular voltages required by that module, for example, 5 v, 3.3 v, 1.5 v and 1.3 v. Perhaps other voltages may also be provided or perhaps only one or more of these voltages may be provided.

The outputs of fuses 1092*a* and 1092*b* may also be sent to a processor component or circuit 1098. If one of the outputs fails or falls below a predetermined threshold, then the processor may send an error to the network management system such that a network manager may be notified of the failure.

Redundant PDUs increase the availability and reliability of the network device. A single, replaceable, multi-feed PDU provides a higher power density than separate replaceable units for each power feed, and a single on/off switch per PDU saves significant surface space on the network device over network devices that provide an on/off switch per power feed. In addition, mounting the filter circuits required for a distributed power supply system in a replaceable PDU allows them to be removed, replaced and/or upgraded along with other power distribution components in the replaceable PDU. For example, if a filter circuit fails, the PDU may be switched off using the toggle switch and removed from the chassis. The removed PDU may be repaired and re-inserted within the chassis or a new PDU may be inserted within the chassis. As another example, if a new filter circuit is designed to provide improved noise reduction or an improved circuit breaker component becomes available, one of the PDUs may be switched off using the toggle switch and replaced with a new PDU including the new filter circuit or circuit breaker. In any case, while one PDU is switched off, the redundant PDU provides power to the network device to keep it running. Once the replaced PDU is up and running, the other PDU may then be switched off and replaced with a new PDU including the new filter circuit or circuit breaker. Similar upgrades may be made for the other PDU components.

It will be understood that variations and modifications of the above described methods and apparatuses will be apparent to those of ordinary skill in the art and may be made without departing from the inventive concepts described herein. Accordingly, the embodiments described herein are to be viewed merely as illustrative, and not limiting, and the inventions are to be limited solely by the scope and spirit of the appended claims.

What is claimed is:

1. A method for operating a telecommunications network device including a modular architecture, comprising:

operating the network device using a first set of software components from a first release;

receiving a request for a hot upgrade to a second release;

determining if signatures for software components in the first set of software components match signatures for corresponding software components in a second set of software components from the second release;

continuing to operate the network device using software components in the first set of software components having signatures that match the signatures of corresponding software components in the second set of software components; and operating the network device using software components in the second set of software components having signatures that did not match the signatures of corresponding software components in the first set of software components.

2. The method of claim 1, further comprising:

operating the network device using software components in the second set of software components that do not have corresponding software components in the first set of software components.

3. The method of claim 1, wherein determining if signatures for software components in the first set of software components match signatures for corresponding software components in a second set of software components from the second release, comprises:

opening a first packaging list from the first release, wherein the first packaging list includes a list of software components in the first release and a list of corresponding signatures for the software components in the first release;

opening a second packaging list from the second release, wherein the second packaging list includes a list of software components in the second release and a list of corresponding signatures for the software components in the second release; and comparing, for each software component, the signatures in the first packaging list to the signatures in the second packaging list.

4. The method of claim 1, wherein operating the network device using software components in the second set of software components having signatures that did not match the signatures of corresponding software components in the first set of software components, comprises:

implementing the software components in the second set of software components having signatures that did not match the signatures of corresponding software components in the first set of software components in accordance with an upgrade instructions file in the second release.

5. The method of claim 1, wherein the upgrade request is from an external network management system.

6. The method of claim 1, wherein prior to receiving a request for a hot upgrade to a second release, the method further comprises:

detecting an installation of the second release within the network device; and providing an indication of the installation of the second release to an external network management system.

7. The method of claim 6, wherein providing an indication of the installation of the second release to an external network management system, comprises:

sending a notification to the external network management system.

8. The method of claim 6, wherein providing an indication of the installation of the second release to an external network management system, comprises:

adding a record to a table internal to the network device indicating the second release has been installed, wherein the table is periodically polled by the external network device.

9. The method of claim 1, further comprising:

terminating software components in the first set of software components having signatures that did not match the signatures of software components in the second set of software components.

10. A method for operating a telecommunications network device including a modular architecture, comprising:

operating the network device using a first set of software components from a first release;

receiving a request for a hot upgrade to a second release;

opening a first packaging list from the first release, wherein the first packaging list includes a list of software components in the first release and a list of corresponding signatures for the software components in the first release;

opening a second packaging list from the second release, wherein the second packaging list includes a list of software components in the second release and a list of corresponding signatures for the software components in the second release;

comparing, for each software component, the signatures in the first packaging list to the signatures in the second packaging list;

continuing to operate the network device using software components in the first set of software components having signatures that match the signatures of corresponding software components in the second set of software components; and operating the network device using software components in the second set of software components having signatures that did not match the signatures of corresponding software components in the first set of software components.

11. A method for generating software for a telecommunications network device including a modular architecture, comprising:

creating a set of software components;

generating a signature for each software component using a signature generating program;

appending the signature for each software component to each software component;

generating a packaging list including a list of each software component and a list of the signatures for each software component; and building a release including the software components and the packaging list.

12. The method of claim 11, wherein the set of software components is a first set of software components, the packaging list is a first packaging list and the release is a first release and wherein the method further comprises:

modifying at least one software component in the first set of software components;

including the at least one modified software component and the remaining software components from the first set of software components in a second set of software components;

generating a signature for each software component in the second set of software components using the signature generating program;

appending the signature for each software component in the second set of software components to each software component;

generating a second packaging list including a list of each software component in the second set of software components and a list of the signatures for each software component in the second set of software components; and building a new release including the second set of software components and the second packaging list.

13. The method of claim 12, wherein prior to generating a signature for each software component in the second set of software components using the signature generating program, the method further comprises:

creating a new software component; and including the new software component in the second set of software components.

14. The method of claim 11, wherein prior to generating a signature for each software component using a signature generating program, the method further comprises:

blocking out extraneous data within each software component.

15. The method of claim 11, wherein prior to generating a signature for each software component using a signature generating program, the method further comprises:

removing extraneous data within each software component; and wherein appending the signature for each software component in the second set of software components to each software component, includes:

replacing the removed extraneous data within each software component.

16. The method of claim 11, wherein the signature generating program comprises a cryptographic program.

17. The method of claim 16, wherein the cryptographic program comprises the Sha-1 cryptographic utility.

18. The method of claim 16, wherein the cryptographic program comprises the MD2, MD4 or MD5 hash function.

19. The method of claim 16, wherein the cryptographic program comprises the Ripemd128 or Ripemd160 hash function.

20. The method of claim 11, wherein the signature generating program comprises a checksum program.

21. A telecommunications network device, comprising:

a modular software architecture including:

a first release, including a first set of software components, for operating the network device;

a second release, including a second set of software components, for operating the network device;

a first process capable of receiving a request for a hot upgrade from the first release to the second release;

a second process capable of determining if signatures for software components in the first set of software components match signatures for corresponding software components in the second set of software components; and a third process capable of continuing to operate the network device using software components in the first set of software components having signatures that match the signatures of corresponding software components in the second set of software components and capable of operating the network device using software components in the second set of software components having signatures that did not match the signatures of corresponding software components in the first set of software components.

22. The telecommunications network device of claim 21, wherein the first, second and third processes comprise the same process.

23. The telecommunications network device of claim 21, wherein the first and second processes comprise different processes.

24. The telecommunications network device of claim 21, wherein the first release comprises a first packaging list, including a list of software components in the first release and a list of corresponding signatures for the software components in the first release, and wherein the second release comprises a second packaging list, including a list of software components in the second release and a list of corresponding signatures for the software components in the second release, and wherein the second process determines if signatures for software components in the first set of software components match signatures for corresponding software components in a second set of software components by opening the first and second packaging lists and comparing, for each software component, the signatures in the first packaging list with the signatures in the second packaging list.

25. The telecommunications network device of claim 21, wherein the third process is further capable of operating the network device using software components in the second set of software components that do not have corresponding software components in the first set of software components.

* * * * *